US007276567B2

(12) United States Patent
Voskoboynikov et al.

(10) Patent No.: US 7,276,567 B2
(45) Date of Patent: Oct. 2, 2007

(54) HETEROCYCLIC SUBSTITUTED METALLOCENE COMPOUNDS FOR OLEFIN POLYMERIZATION

(75) Inventors: Alexander Z. Voskoboynikov, Moscow (RU); Artyom Y. Lebedev, Moscow (RU); Vyatcheslav V. Izmer, Moscow (RU); Alexey N. Ryabov, Moscow (RU); Mikhail V. Nikulin, Moscow (RU); Jo Ann M. Canich, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 87 days.

(21) Appl. No.: 11/078,920

(22) Filed: Mar. 11, 2005

(65) Prior Publication Data

US 2005/0261449 A1 Nov. 24, 2005

Related U.S. Application Data

(60) Provisional application No. 60/562,861, filed on Apr. 16, 2004.

(51) Int. Cl.
*C08F 4/6392* (2006.01)
*C08F 4/64* (2006.01)
*C07F 17/00* (2006.01)

(52) U.S. Cl. ...................... 526/161; 526/160; 526/165; 526/133; 526/134; 526/348; 526/352; 502/103; 502/155; 556/53

(58) Field of Classification Search ................. 556/53; 502/103, 155; 526/160, 943, 161, 165, 133, 526/134, 348, 352

See application file for complete search history.

(56) References Cited

U.S. PATENT DOCUMENTS

| | | | | |
|---|---|---|---|---|
| 4,794,096 | A | 12/1988 | Ewen et al. | 502/117 |
| 5,585,509 | A | 12/1996 | Langhauser et al. | 556/11 |
| 5,756,608 | A | 5/1998 | Langhauser et al. | 526/127 |
| 5,840,644 | A | 11/1998 | Küber et al. | 502/117 |
| 5,936,053 | A | 8/1999 | Fukuoka et al. | 526/351 |
| 6,153,776 | A | 11/2000 | Patton et al. | 556/11 |
| 6,169,051 | B1 | 1/2001 | Mitani et al. | 502/103 |
| 6,326,493 | B1 | 12/2001 | Mitani et al. | 546/4 |
| 6,458,982 | B1 | 10/2002 | Schottek et al. | 556/53 |
| 6,479,646 | B1 * | 11/2002 | Nakano et al. | 534/10 |
| 2001/0031834 | A1 | 10/2001 | Ushioda et al. | 525/240 |
| 2001/0053833 | A1 | 12/2001 | Nakano et al. | 526/127 |
| 2002/0002261 | A1 | 1/2002 | Yahata et al. | 526/351 |
| 2003/0032549 | A1 | 2/2003 | Vogel | 502/102 |

FOREIGN PATENT DOCUMENTS

| | | |
|---|---|---|
| DE | 344 30 87 | 5/1986 |
| DE | 100 52 162 | 5/2001 |
| EP | 0 670 325 | 9/1995 |
| EP | 1 033 371 | 9/2000 |
| JP | 3323347 | 7/1996 |
| JP | 08183814 | 7/1996 |
| JP | 2002037795 | 2/2002 |
| WO | 95/25757 | 9/1995 |
| WO | 99/41289 | 8/1999 |
| WO | 99/42467 | 8/1999 |
| WO | 00/43406 | 7/2000 |
| WO | 00/69871 | 11/2000 |
| WO | 02/098930 | 12/2002 |
| WO | 2004/013194 | 2/2004 |

OTHER PUBLICATIONS

Satoshi, "Polymerization of Alpha-Olefin", Patent Abstracts of Japan (Publication No. 08183814).

Hiroshi, "Metallocene Compound Having Indenyl Ligand and Catalyst Containing the Same and Used for Polymerizing Olefin", Patent Abstracts of Japan (Publication No. 2002037795).

Wild et al., "*ansa*-Metallocene Derivatives, IV.*Synthesis and Molecular Structures of Chiral *ansa*-Titanocene Derivatives with Bridged Tetrahydroindenyl Ligands", Journal of Organometallic Chemistry, 232 (1982) pp. 233-247.

Coates et al., "Oscillating Stereocontrol: A Strategy for the Synthesis of Thermoplastic Elastomeric Polypropylene", Science, vol. 267, Jan. 13, 1995, pp. 217-219.

(Continued)

*Primary Examiner*—Caixia Lu
(74) *Attorney, Agent, or Firm*—Catherine L. Bell

(57) ABSTRACT

This invention relates to compounds represented by formula:

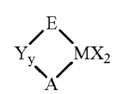

wherein
M is a group 3, 4, 5 or 6 transition, lanthanide, or actinide metal atom;
E is an indenyl ligand substituted in any position with at least one aromatic or pseudoaromatic heterocyclic substituent that is bonded to the indenyl ring through a nitrogen or phosphorous ring heteroatom;
A is a substituted or unsubstituted cyclopentadienyl, heterocyclopentadienyl, indenyl, heteroindenyl, fluorenyl, or heterofluorenyl ligand, or other mono-anionic ligand, or A may, independently, be E;
Y is an optional bridging group;
y is zero or one;
X are, independently, univalent anionic ligands, and provided that when A is E, and y is one, and Y is bonded to the one position of each indenyl ligand, and per indenyl ligand there is only one aromatic heterocyclic or pseudoaromatic heterocyclic that is bonded to the indenyl ligand.

49 Claims, 3 Drawing Sheets

OTHER PUBLICATIONS

Kravchenko et al., "Propylene Polymerization with Chiral and Achiral Unbridged 2-Arylindene Metallocenes", Organometallics, 1997, 16, pp. 3635-3639.

Dreier et al., "2-Hetaryl-Substituted Bis(indenyl)zirconium Complexes as Catalyst Precursors for Elastomeric Polypropylene Formation", Organometallics, 2000, 19, pp. 4095-4103.

Dreier et al., "Structural and Dynamic Features of Bis[2-(2 furyl)indenyl] zirconium Derivatives", Organometallics, 2001, 20, pp. 5067-5075.

Dreier et al., "Group 4 metallocenes containing hetaryl substituents at their π-ligands: synthesis and characterization of the parent bis[2-(2-furyl)indenyl]zirconocene system", Journal of Organometallic Chemistry, 622 (2001) pp. 143-148.

Dreier et al., "Conformational features of a furyl-substituted bis(tetrahydroindenyl)zirconium dichloride system", Journal of Physical Organic Chemistry, 2002, 15, pp. 582-589.

Yamazaki et al., "Novel High Performance *ansa*-Zirconocene Catalysts for Isospecific Polymerization of Propylene", Chemistry Letters, 1999, pp. 1311-1312.

Plenio et al., "Aminozirconocenes: a new class of zirconocenes with a nitrogen atom directly bonded to an $\eta^5$ -cyclopentadienyl (indenyl) ligand", Journal of Organometallic Chemistry, 519 (1996) pp. 269-272.

Knüppel et al., Probing the Dynamic Features of Bis(aminocyclopentadienyl) and Bis(aminoindenyl) Zirconium Complexes, Organometallics, 2000, 19, pp. 1262-1268

* cited by examiner

Structural Representation of *bis*-(2-(pyrrol-1-yl)indenyl)zirconium dichloride (13) from X-ray crystallography.

Structural Representation of *bis*-(2-(2,3-dimethyl)indol-1-yl)indenyl)zirconium dichloride (17) from X-ray crystallography.

Structural Representation of *bis*-(2-(1,2,3,4-tetrahydrocarbazol-9-yl)indenyl) hafnium dichloride (21) from X-ray crystallography.

HETEROCYCLIC SUBSTITUTED METALLOCENE COMPOUNDS FOR OLEFIN POLYMERIZATION

This application claims the benefit of application Ser. No. 60/562,861 filed Apr. 16, 2004.

FIELD

A series of novel heterocyclic substituted transition metal compounds have been synthesized, and when activated, have been shown to be useful as olefin polymerization catalysts.

BACKGROUND

Various processes and catalysts exist for the homopolymerization or copolymerization of olefins. For many applications, it is desirable for a polyolefin to have a high weight average molecular weight while having a relatively narrow molecular weight distribution. A high weight average molecular weight, when accompanied by a narrow molecular weight distribution, provides a polyolefin with high strength properties.

Traditional Ziegler-Natta catalysts systems—a transition metal compound co-catalyzed by an aluminum alkyl—are typically capable of producing polyolefins having a high molecular weight, but with a broad molecular weight distribution.

More recently a catalyst system has been developed wherein the transition metal compound has one or more cyclopentadienyl ring ligands (typically two)—such transition metal compound being referred to herein as a "metallocene—which catalyzes the production of olefin monomers to polyolefins. Accordingly, titanocenes, zirconocenes and hafnocenes, have been utilized as the transition metal component in such "metallocene" containing catalyst system for the production of polyolefins and ethylene-alpha-olefin copolymers.

Catalysts that produce isotactic polyolefins are disclosed in U.S. Pat. No. 4,794,096. This patent discloses a chiral, stereorigid metallocene catalyst which is activated by an alumoxane cocatalyst which is reported to polymerize olefins to isotactic polyolefin forms. Alumoxane co-catalyzed metallocene structures which have been reported to polymerize alpha-olefins stereoregularly include the ethylene bridged bis-indenyl and bis-tetrahydroindenyl titanium and zirconium (IV) catalyst. Such catalyst systems were synthesized and studied in Wild et al., J. Organomet. Chem. 232, 233-47 (1982), and were later reported in Ewen and Kaminsky et al., mentioned above, to polymerize alpha-olefins stereoregularly. Further reported in West German Off DE 3443087A1 (1986), but without giving experimental verification, is that the bridge length of such stereorigid metallocenes can vary from a $C_1$ to $C_4$ hydrocarbon and the metallocene rings can be simple or bi-cyclic but must be asymmetric. When substituted or unsubstituted indenyl or tetrahydroindenyl based, these metallocenes are bridged in the "1-position" of the (hydro)indenyl ring, and are of C2 symmetry. Generally speaking, it is the C2 symmetric structure (also referred to as the d/l-enantiomers or racemic complexes) that produces isotactic poly-alpha-olefins. An alternate form is the Cs symmetric or meso form that produces atactic poly-alpha-olefins.

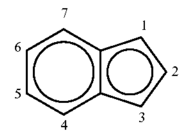

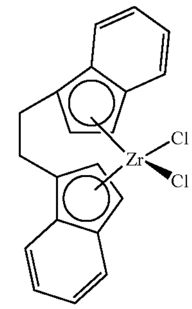

C2 symmetric;
racemic form

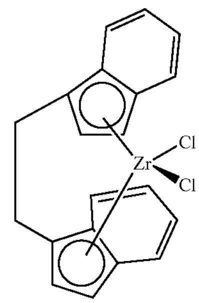

Cs symmetric;
meso form

The use of metallocene compositions in olefin polymerization is generally known. Metallocenes containing substituted, bridged indenyl derivatives are noted for their ability to produce isotactic propylene polymers having high isotacticity and narrow molecular weight distribution. Considerable effort has been made toward obtaining metallocene produced propylene polymers having ever-higher molecular weight and melting point, while maintaining suitable catalyst activity. Researchers currently believe that there is a direct relationship between the way in which a metallocene is substituted, and the molecular structure of the resulting polymer. For the substituted, bridged indenyl type metallocenes, it is believed that the type and arrangement of substituents on the indenyl groups, as well as the type of bridge connecting the indenyl groups, determines such polymer attributes as molecular weight and melting point. Unfortunately, it is impossible at this time to accurately correlate specific substitution patterns with specific polymer attributes, though minor trends may be identified, from time to time.

For example, U.S. Pat. No. 5,840,644 describes certain metallocenes containing aryl-substituted indenyl derivatives as ligands, which are said to provide propylene polymers having high isotacticity, narrow molecular weight distribution and very high molecular weight.

Likewise, U.S. Pat. No. 5,936,053 describes certain metallocene compounds said to be useful for producing high molecular weight propylene polymers. These metallocenes have a specific hydrocarbon substituent at the 2 position and an unsubstituted aryl substituent at the 4 position, on each indenyl group of the metallocene compound.

Also known in the art are unbridged indenyl based metallocenes having bulky substituents on the indenyl ligand, thus providing "fluxionality" to the activated catalyst. Metallocenes of this type are believed to produce "elastomeric" polypropylene. Science, 1995, 267, 217; WO 95/25757; and Organometallics, 1997, 16, 3635 discuss such catalysts.

References containing aromatic heterocyclic substituents on cyclopentadienyl or indenyl based metallocenes (non-bridged), but that are not bonded to the cyclopentadienyl or indenyl ring via the heteroatom include: Organometallics 2000, 19, 4095; Organometallics 2001, 20, 5067; J. Organometallic Chem. 2001, 622, 143; J. Phys. Org. Chem. 2002, 15, 582; U.S. Pat. No. 6,458,982 B1; EP 1,033,371 A1; US 2001/0031834 A1; U.S. Pat. No. 6,479,646 B1; and US 2002/0002261 A1.

References containing aromatic heterocyclic substituents on cyclopentadienyl or indenyl based metallocenes (bridged), but that are not bonded to the cyclopentadienyl or indenyl ring via the heteroatom include: Chem. Lett. 1999, 1311; U.S. Pat. Nos. 6,169,051 B1; 6,326,493 B1; and WO 00/43406.

References containing non-aromatic heterocyclic substituents on cyclopentadienyl or indenyl based metallocenes (bridged), and that are bonded to the cyclopentadienyl or indenyl ring via the heteroatom include: J. Organometallic Chem. 1996, 519, 269; Organometallics 2000, 19, 1262; U.S. Pat. Nos. 5,756,608; 5,585.509; and EP 0 670 325 B1.

JP3323347B2 discloses specific aromatic heterocyclic substituents (pyrrol-1-yl substituent including ring-fused hydrocarbyl substituted pyrrol-1-yl substituents) on bridged indenyl based metallocenes. U.S. Pat. No. 6,479,646 B1 discloses metallocene compounds having a heteroatom containing substituent off of the indenyl ring. Examples are all to the 2-positions of the cyclic heteroatom group. US 2002/0002261 A1 discloses bis[2-(2-furyl)indenyl]zirconium dichloride and or bis[2-(2-furyl)-4-phenylindenyl]zirconium dichloride for use in making polypropylene. Likewise US 2001/0031834 A1 discloses polypropylene compositions made using indenyl metallocenes. U.S. 2001/0053833 A1 discloses compounds that are bridged indenes that have heterocyclic substituents on the indene. with the proviso that at least one of the heterocyclic substituents has another substituent on it. Examples are all with 2-substitutend heterocycles including bis(2-(2-(5-methyl)-furyl)-4,5-benzoindenyl)zirconium dichloride, bis(2-(2-(5-phenyl)-furyl)-indenyl)zirconium dichloride, rac-dimethylsilylene bis(2-(2-(5-methyl)-furyl)-4-phenylindenyl)zirconium dichloride, and rac-dimethylsilylene bis(2-(2-(5-methyl)-furyl)-indenyl)zirconium dichloride.

SUMMARY OF THE INVENTION

This invention relates to metallocene compounds represented by formula (1):

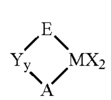

wherein

M is a group 3, 4, 5 or 6 transition metal atom, or a lanthanide metal atom, or actinide metal atom;

E is an indenyl ligand that is substituted in any position of the indenyl ligand with at least one aromatic heterocyclic substituent or pseudoaromatic heterocyclic substituent that is bonded to the indenyl ring through a nitrogen or phosphorous ring heteroatom, and additionally, E may be substituted with 0, 1, 2, 3, 4, 5 or 6 R groups, where each R is, independently, a hydrocarbyl, substituted hydrocarbyl, halocarbyl, substituted halocarbyl, silylcarbyl, substituted silylcarbyl, germylcarbyl, or substituted germylcarbyl substituent, and optionally, two or more adjacent R substituents may join together to form a substituted or unsubstituted, saturated, partially unsaturated, or aromatic cyclic or polycyclic substituent;

A is a substituted or unsubstituted cyclopentadienyl ligand, a substituted or unsubstituted heterocyclopentadienyl ligand, a substituted or unsubstituted indenyl ligand, a substituted or unsubstituted heteroindenyl ligand, a substituted or unsubstituted fluorenyl ligand, a substituted or unsubstituted heterofluorenyl ligand, or other mono-anionic ligand, or A may, independently, be defined as E;

Y is an optional bridging group that is bonded to E and A, and is present when y is one and absent when y is zero;

y is zero or one;

X are, independently, univalent anionic ligands, or both X are joined and bound to the metal atom to form a metallocycle ring, or both X join to form a chelating ligand, a diene ligand, or an alkylidene ligand; and provided that when A is independently defined as E, and y is one, and Y is bonded to the one position of each indenyl ligand, and per indenyl ligand there is only one aromatic heterocyclic substituent or pseudoaromatic heterocyclic substituent that is bonded to the indenyl ligand, such substituent being bonded to the 4-position of the indenyl ligand, then such substituent is not an unsubstituted or hydrocarbyl substituted pyrrol-1-yl substituent including ring-fused hydrocarbyl substituted pyrrol-1-yl substituents such as indol-1-yl, isoindol-2-yl, carbazol-9-yl, 2,3,4,9-tetrahydrocarbazol-9-yl, and 1,2,3,4-tetrahydrocyclopenta[b]indol-4-yl.

This invention further relates to a catalyst system comprised of the above metallocenes combined with an activator, and to a process to polymerize unsaturated monomers using such catalyst system.

DEFINITIONS

Figure 1:
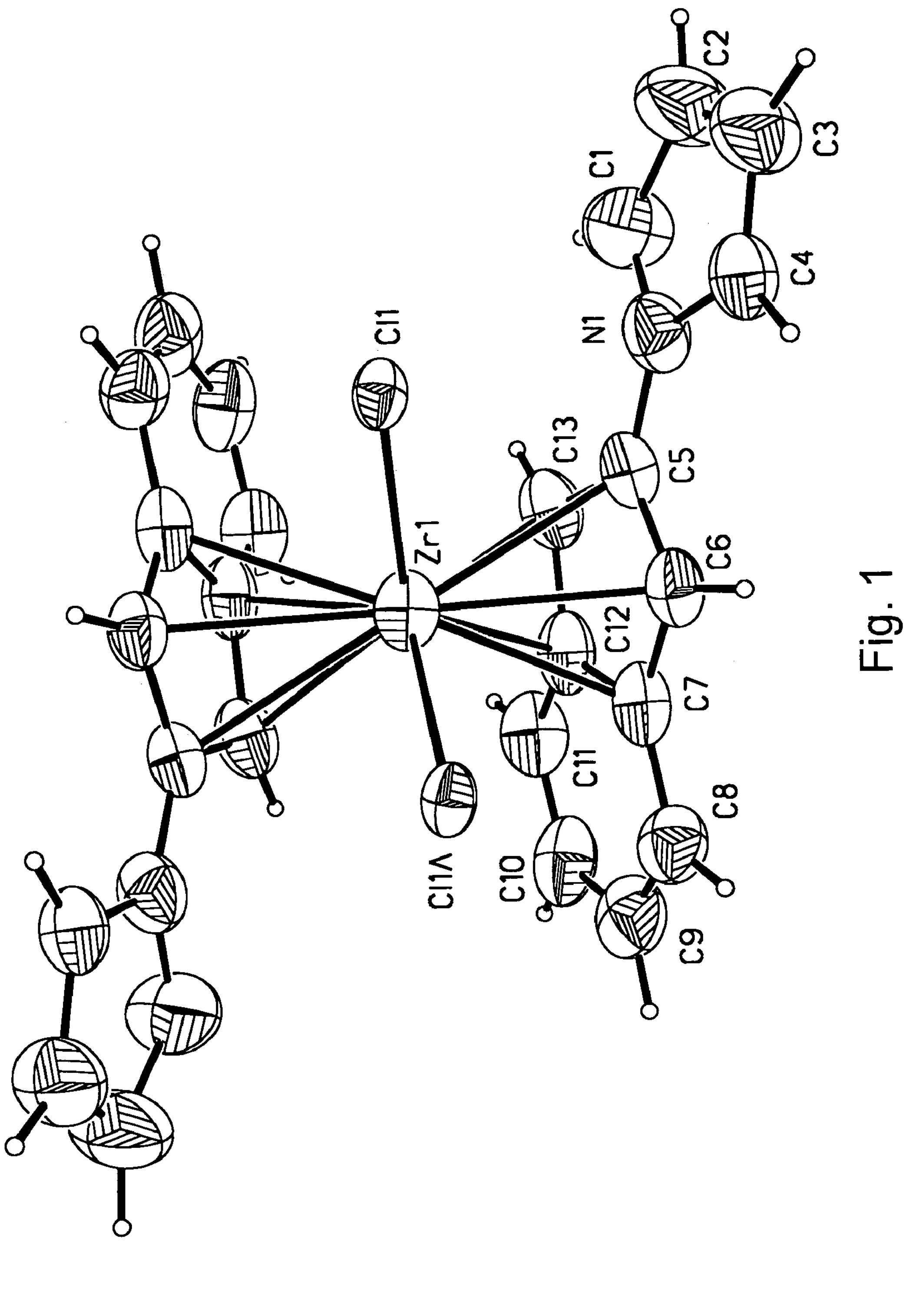
FIG. 1. Structural Representation of bis-(2-(pyrrol-1-yl) indenyl)zirconium dichloride (13) from X-ray crystallography.
Figure 2:
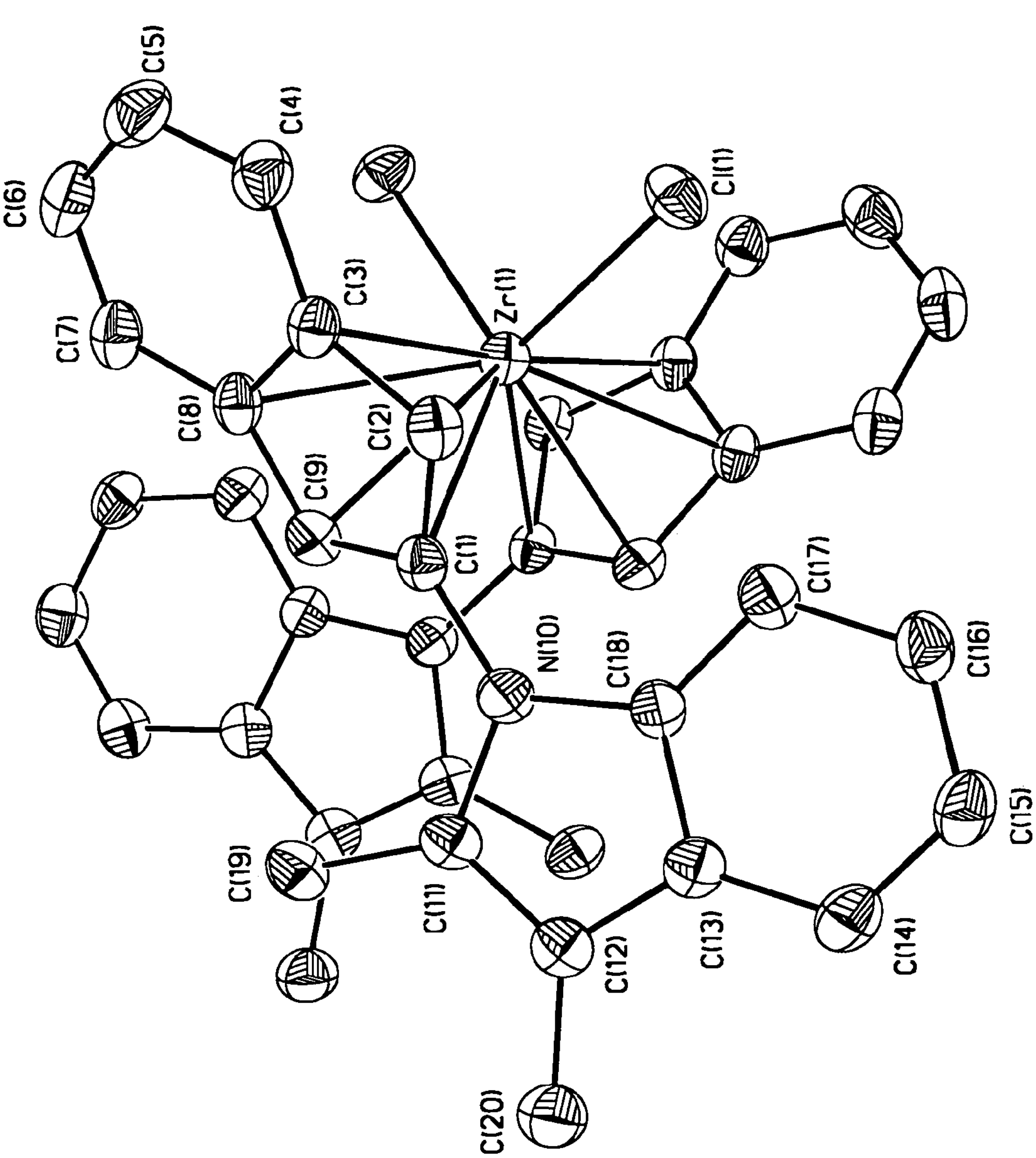
FIG. 2. Structural Representation of bis-(2-(2,3-dimethylindol-1-yl)indenyl)zirconium dichloride (17) from X-ray crystallography.
Figure 3:
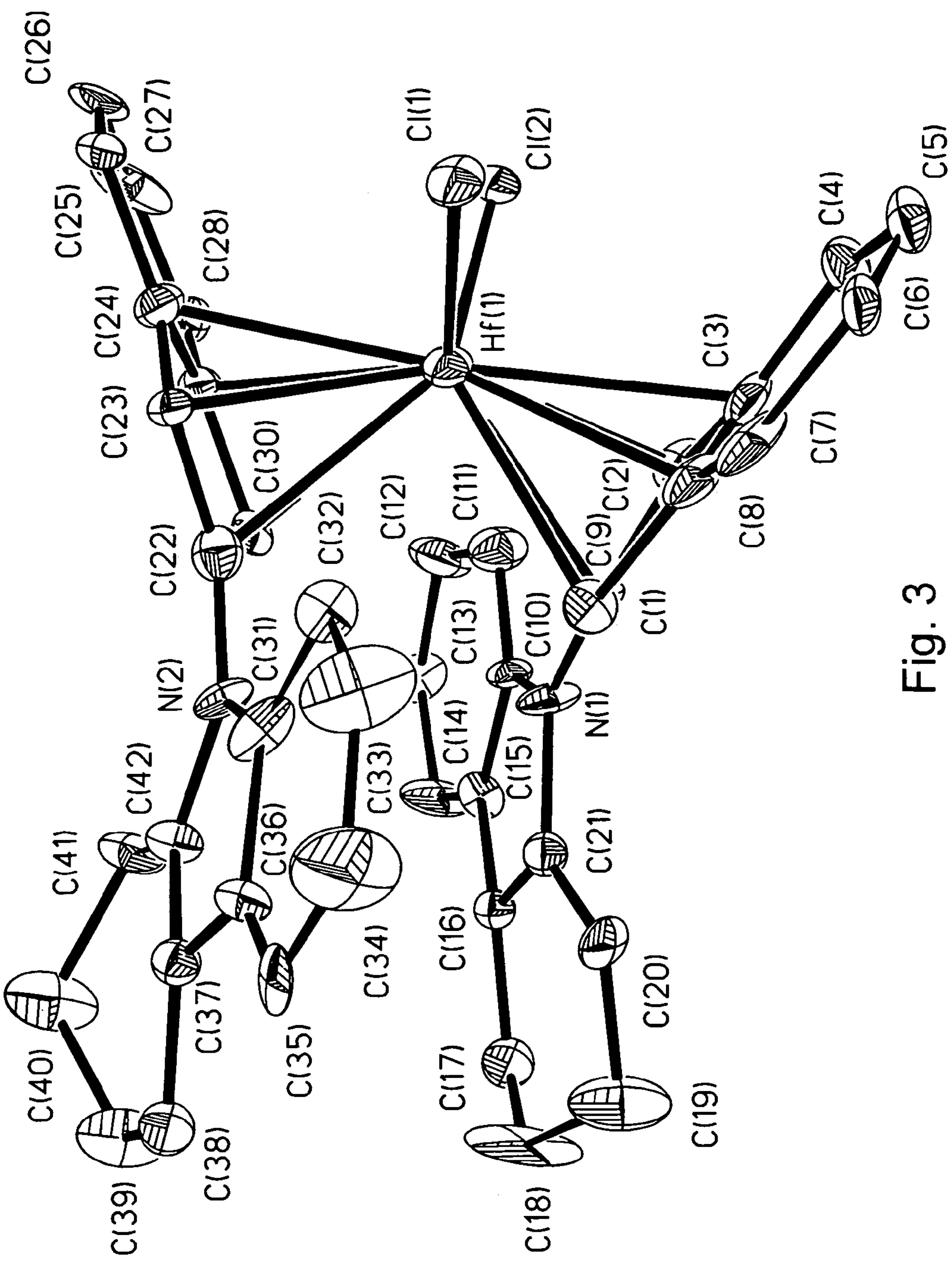
FIG. 3. Structural Representation of bis-(2-(1,2,3,4-tetrahydrocarbazol-9-yl)indenyl) hafnium dichloride (21) from X-ray crystallography.

As used herein, the numbering scheme for the Periodic Table Groups is the new notation as set out in CHEMICAL AND ENGINEERING NEWS, 63(5), 27 (1985).

As used herein, Me is methyl, t-Bu and $^t$Bu are tertiary butyl, iPr and $^i$Pr are isopropyl, Cy is cyclohexyl, and Ph is phenyl.

The terms "hydrocarbyl radical," "hydrocarbyl" and "hydrocarbyl group" are used interchangeably throughout this document. Likewise the terms "group", "radical", and "substituent" are also used interchangeably in this document. For purposes of this disclosure, "hydrocarbyl radical" is defined to be $C_1$-$C_{100}$ radicals, that may be linear, branched, or cyclic, and when cyclic, aromatic or non-aromatic, and include substituted hydrocarbyl radicals, halocarbyl radicals, and substituted halocarbyl radicals, silylcarbyl radicals, and germylcarbyl radicals as these terms are defined below.

Substituted hydrocarbyl radicals are radicals in which at least one hydrogen atom has been substituted with at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$ and the like or where at least one non-hydrocarbon atom or group has been inserted within the hydrocarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Si$(R^*)_2$—, —Ge$(R^*)_2$—, —Sn$(R^*)_2$—, —Pb$(R^*)_2$— and the like, where R* is independently a hydrocarbyl or halocarbyl radical, and two or more R* may join together to form a substituted or unsubstituted saturated, partially unsaturated or aromatic cyclic or polycyclic ring structure.

Halocarbyl radicals are radicals in which one or more hydrocarbyl hydrogen atoms have been substituted with at least one halogen (e.g. F, Cl, Br, I) or halogen-containing group (e.g. $CF_3$).

Substituted halocarbyl radicals are radicals in which at least one halocarbyl hydrogen or halogen atom has been substituted with at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$ and the like or where at least one non-carbon atom or group has been inserted within the halocarbyl radical such as —O—, —S—, —Se—, —Te—, —N(R*)—, =N—, —P(R*)—, =P—, —As(R*)—, =As—, —Sb(R*)—, =Sb—, —B(R*)—, =B—, —Si$(R^*)_2$—, —Ge$(R^*)_2$—, —Sn$(R^*)_2$—, —Pb$(R^*)_2$— and the like, where R* is independently a hydrocarbyl or halocarbyl radical provided that at least one halogen atom remains on the original halocarbyl radical. Additionally, two or more R* may join together to form a substituted or unsubstituted saturated, partially unsaturated or aromatic cyclic or polycyclic ring structure.

Silylcarbyl radicals (also called silylcarbyls) are groups in which the silyl functionality is bonded directly to the indicated atom or atoms. Examples include $SiH_3$, $SiH_2R^*$, $SiHR^*_2$, $SiR^*_3$, $SiH_2(OR^*)$, $SiH(OR^*)_2$, $Si(OR^*)_3$, $SiH_2(NR^*_2)$, $SiH(NR^*_2)_2$, $Si(NR^*_2)_3$, and the like where R* is independently a hydrocarbyl or halocarbyl radical and two or more R* may join together to form a substituted or unsubstituted saturated, partially unsaturated or aromatic cyclic or polycyclic ring structure.

Germylcarbyl radicals (also called germylcarbyls) are groups in which the germyl functionality is bonded directly to the indicated atom or atoms. Examples include $GeH_3$, $GeH_2R^*$, $GeHR^*_2$, $GeR^5_3$, $GeH_2(OR^*)$, $GeH(OR^*)_2$, $Ge(OR^*)_3$, $GeH_2(NR^*_2)$, $GeH(NR^*_2)_2$, $Ge(NR^*_2)_3$, and the like where R* is independently a hydrocarbyl or halocarbyl radical and two or more R* may join together to form a substituted or unsubstituted saturated, partially unsaturated or aromatic cyclic or polycyclic ring structure.

Polar radicals or polar groups are groups in which the heteroatom functionality is bonded directly to the indicated atom or atoms. They include heteroatoms of groups 1-17 of the periodic table either alone or connected to other elements by covalent or other interactions such as ionic, van der Waals forces, or hydrogen bonding. Examples of functional groups include carboxylic acid, acid halide, carboxylic ester, carboxylic salt, carboxylic anhydride, aldehyde and their chalcogen (Group 14) analogues, alcohol and phenol, ether, peroxide and hydroperoxide, carboxylic amide, hydrazide and imide, amidine and other nitrogen analogues of amides, nitrile, amine and imine, azo, nitro, other nitrogen compounds, sulfur acids, selenium acids, thiols, sulfides, sulfoxides, sulfones, phosphines, phosphates, other phosphorus compounds, silanes, boranes, borates, alanes, aluminates. Functional groups may also be taken broadly to include organic polymer supports or inorganic support material such as alumina, and silica. Preferred examples of polar groups include $NR^*_2$, $OR^*$, $SeR^*$, $TeR^*$, $PR^*_2$, $AsR^*_2$, $SbR^*_2$, $SR^*$, $BR^*_2$, $SnR^*_3$, $PbR^*_3$ and the like where R* is independently a hydrocarbyl, substituted hydrocarbyl, halocarbyl or substituted halocarbyl radical as defined above and two R* may join together to form a substituted or unsubstituted saturated, partially unsaturated or aromatic cyclic or polycyclic ring structure.

In using the terms "substituted or unsubstituted cyclopentadienyl ligand", "substituted or unsubstituted heterocyclopentadienyl ligand", "substituted or unsubstituted indenyl ligand", "substituted or unsubstituted heteroindenyl ligand", "substituted or unsubstituted fluorenyl ligand", "substituted or unsubstituted heterofluorenyl ligand", "substituted or unsubstituted pentadienyl ligand", "substituted or unsubstituted allyl ligand", and "substituted or unsubstituted boratabenzene ligand", the substitution to the aforementioned ligand may be hydrocarbyl, substituted hydrocarbyl, halocarbyl, substituted halocarbyl, silylcarbyl, or germylcarbyl.

The term "pseudoaromatic heterocycle" refers to heterocyclic substituents that have similar properties and structures (nearly planar) to aromatic heterocyclic ligands, but are not by definition aromatic. The use of the term "psuedoaromatic heterocycle" or "pseudoaromatic heterocyclic" includes the following substituents: phenothiazin-10-yl, phenoxazin-10-yl, phenoselenazin-10-yl, phenotellurazin-10-yl, and hydrocarbyl substituted versions thereof including methylphenothiazin-10-yl, dimethylphenothiazin-10-yl, trimethylphenothiazin-10-yl, tetramethylphenothiazin-10-yl, pentamethylphenothiazin-10-yl, hexamethylphenothiazin-10-yl, heptamethylphenothiazin-10-yl, octamethylphenothiazin-10-yl, phenylphenothiazin-10-yl, diphenylphenothiazin-10-yl, phenylmethylphenothiazin-10-yl, diphenylmethylphenothiazin-10-yl and the like.

In some embodiments, the hydrocarbyl radical is independently selected from methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, triacontynyl, butadienyl, pentadienyl, hexadienyl, heptadienyl, octadienyl, nonadienyl, and decadienyl. Also included are isomers of saturated, partially unsaturated and aromatic cyclic and polycyclic structures wherein the radical may additionally be subjected to the types of substitutions described above. Examples include phenyl, methylphenyl, dimethylphenyl, ethylphenyl, diethylphenyl, propylphenyl, dipropylphenyl, benzyl, methylbenzyl, naphthyl, anthracenyl, cyclopentyl, cyclopentenyl, cyclohexyl, cyclohexenyl, methylcyclohexyl, cycloheptyl, cycloheptenyl, norbornyl, norbornenyl, adamantyl and the like. For this disclosure, when a radical is listed, it indicates that radical type and all other radicals formed when that radical type is subjected to the substitutions defined above. Alkyl, alkenyl and alkynyl radicals listed include all isomers including where appropriate cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and neopentyl (and analogous substituted cyclobutyls and cyclopropyls); butenyl includes E and Z forms of 1-butenyl, 2-butenyl, 3-butenyl, 1-methyl-1-propenyl, 1-methyl-2-propenyl, 2-methyl-1-propenyl and 2-methyl-2-propenyl (and cyclobutenyls and cyclopropenyls). Cyclic compound having substitutions include all isomer forms, for example, methylphenyl would include ortho-methylphenyl, meta-methylphenyl and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

For nomenclature purposes, the following numbering schemes are used for cyclopentadienyl, indenyl and fluorenyl rings. For cyclopentadienyl drawn below as an anionic ligand, all five numbered positions are equivalent. For indenyl also drawn below as an anionic ligand, positions 1 and 3 are equivalent, 4 and 7 are equivalent, and 5 and 6 are equivalent. For fluorenyl drawn below as an anionic ligand, positions 1 and 8 are equivalent, 2 and 7 are equivalent, 3 and 6 are equivalent, and 4 and 5 are equivalent.

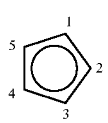

Cyclopentadienyl

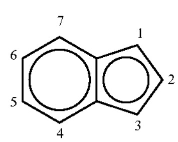

Indenyl

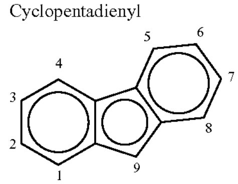

Fluorenyl

A similar numbering and nomenclature scheme is used for heteroindenyl and heterofluorenyl rings as illustrated below where Z and Q independently represent the heteroatoms O, S, Se, or Te, or heteroatom groups, NR', PR', AsR', or SbR' where R' is hydrogen, or a hydrocarbyl, substituted hydrocarbyl, halocarbyl, substituted halocarbyl, silylcarbyl, or germylcarbyl substituent. The number scheme shown below is for heteroindenyl ligands or heterofluorenyl ligands that are bridged to another ligand via a bridging group. For unbridged compounds, the numbering scheme begins at a heteroatom and proceeds in the direction that gives the lowest set of locants to the heteroatoms.

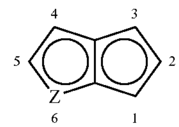

Examples include:
Cyclopenta[b]thienyl (Z = S)
Cyclopenta[b]furanyl (Z = O)
Cyclopenta[b]selenophenyl (Z = Se)
Cyclopenta[b]tellurophenyl (Z = Te)
6-Methyl-cyclopenta[b]pyrrolyl (Z = N—Me)
6-Methyl-cyclopenta[b]phospholyl (Z = P—Me)
6-Methyl-cyclopenta[b]arsolyl (Z = As—Me)
6-Methyl-cyclopenta[b]stibolyl (Z = Sb—Me)

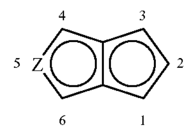

Examples include:
Cyclopenta[c]thienyl (Z = S)
Cyclopenta[c]furanyl (Z = O)
Cyclopenta[c]selenophenyl (Z = Se)
Cyclopenta[c]tellurophenyl (Z = Te)
5-Methyl-cyclopenta[c]pyrrolyl (Z = N—Me)
5-Methyl-cyclopenta[c]phospholyl (Z = P—Me)
5-Methyl-cyclopenta[c]arsolyl (Z = As—Me)
5-Methyl-cyclopenta[c]stibolyl (Z = Sb—Me)

heterofluorenyl ligands

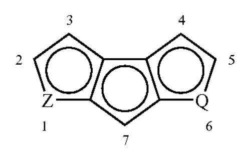

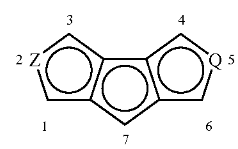

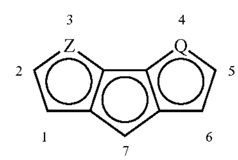

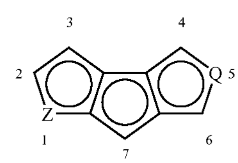

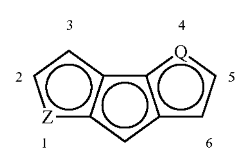

-continued

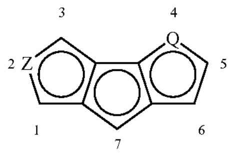

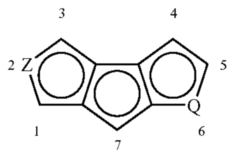

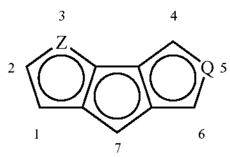

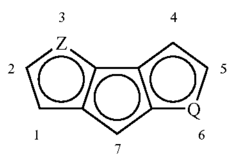

A similar numbering and nomenclature scheme is used for heterocyclopentadienyl rings as illustrated below where G and J independently represent the heteroatoms N, P, As, Sb or B. For these ligands when bridged to another ligand via a bridging group, the one position is usually chosen to be the ring carbon position where the ligand is bonded to the bridging group, hence a numbering scheme is not illustrated below. For unbridged compounds, the numbering scheme begins at a heteroatom and proceeds in the direction that gives the lowest set of locants to the heteroatoms.

Examples include:
Azacyclopentadiene (G = N)
Phosphacyclopentadiene (G = P)
Stibacyclopentadiene (G = Sb)
Arscyclopentadiene (G = As)
Boracyclopentadiene (G = B)

Depending on the position of the bridging ligand when present, the numbering for the following ligands will change; 1,3 and 1,2 are only used in this case to illustrate the position of the heteroatoms relative to one another.

Examples include:
1,3-Diazacyclopentadiene (G = J = N)
1,3-Diphosphacyclopentadiene (G = J = P)
1,3-Distibacyclopentadiene (G = J = Sb)
1,3-Diarsacyclopentadiene (G = J = As)

-continued 1,3-Dibomcyclopentadiene (G = J = B)
1,3-Azaphosphacyclopentadiene (G = N; J = P)
1,3-Azastibacyclopentadiene (G = N; J = Sb)
1,3-Azarsacyclopentadiene (G = N; J = As)
1,3-Azaboracyclopentadiene (G = N; J = B)
1,3-Arsaphosphacyclopentadiene (G = As; J = P)
1,3-Arsastibacyclopentadiene (G = As; J = Sb)
1,3-Arsaboracyclopentadiene (G = As; J = B)
1,3-Boraphosphacyclopentadiene (G = B; J = P)
1,3-Borastibacyclopentadiene (G = B; J = Sb)
1,3-Phosphastibacyclopentadiene (G = P; J = Sb)

Examples include:
1,2-Diazacyclopentadiene (G = J = N)
1,2-Diphosphacyclopentadiene (G = J = P)
1,2-Distibacyclopentadiene (G = J = Sb)
1,2-Diarsacyclopentadiene (G = J = As)
1,2-Diboracyclopentadiene (G = J = B)
1,2-Azaphosphacyclopentadiene (G = N; J = P)
1,2-Azastibacyclopentadiene (G = N; J = Sb)
1,2-Azarsacyclopentadiene (G = N; J = As)
1,2-Azaboracyclopentadiene (G = N; J = B)
1,2-Arsaphosphacyclopentadiene (G = As; J = P)
1,2-Arsastibacyclopentadiene (G = As; J = Sb)
1,2-Arsaboracyclopentadiene(G =As; J = B)
1,2-Boraphosphacyclopentadiene (G = B; J = P)
1,2-Borastibacyclopentadiene (G = B; J = Sb)
1,2-Phosphastibacyclopentadiene (G = P; J = Sb)

A "ring heteroatom" is a heteroatom that is within a cyclic ring structure. A "heteroatom substituent" is heteroatom containing group that is directly bonded to a ring structure through the heteroatom. By definition, a "heteroatom substituent" can also be a "ring heteroatom". For example 1-pyrrolyl-cyclopentadienyl has a nitrogen atom that is a "ring heteroatom" and is a "heteroatom substituent" to the cyclopentadienyl group. The terms "ring heteroatom" and "heteroatom substituent" are illustrated below where Z and R' are as defined above, and N represents the element, nitrogen.

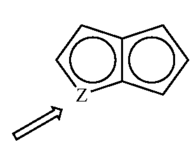

"ring heteroatom"

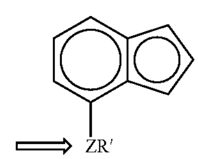

"heteroatom substituent"

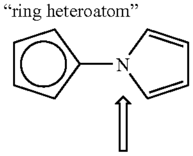

"a ring heteroatom that is also a heteroatom substituent"

A "ring carbon atom" is a carbon atom that is part of a cyclic ring structure. By this definition, an indenyl ligand has nine ring carbon atoms.

A "bondable ring position" is a ring position that is capable of bearing a substituent or bridging substituent. For example, cyclopenta[b]thienyl has five bondable ring positions (at the carbon atoms) and one non-bondable ring position (the sulfur atom); cyclopenta[b]pyrrolyl has six bondable ring positions (at the carbon atoms and at the nitrogen atom).

In the context of this document, "homopolymerization" would produce a polymer made from one monomer. For example, homopolymerization of propylene would produce homopolypropylene. Homopolymerization of ethylene would produce homopolyethylene. Likewise, "copolymerization" would produce polymers with more than one monomer type. For example, ethylene copolymers include polymers of ethylene with α-olefins, cyclic olefins and diolefins, vinylaromatic olefins, α-olefinic diolefins, substituted α-olefins, and/or acetylenically unsaturated monomers. Non-limiting examples of α-olefins include propylene, 1-butene, 1-pentene, 1-hexene, 1-heptene, 1-octene, 1-nonene, 1-decene, 1-undecene 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 3-methyl-1-pentene, 5-methyl-1-nonene, 3,5,5-trimethyl-1-hexene, vinylcyclohexane, and vinylnorbornane. Non-limiting examples of cyclic olefins and diolefins include cyclobutene, cyclopentene, cyclohexene, cycloheptene, cyclooctene, cyclononene, cyclodecene, norbornene, 4-methylnorbornene, 2-methylcyclopentene, 4-methylcyclopentene, vinylcyclohexane, norbornadiene, dicyclopentadiene, 5-ethylidene-2-norbornene, vinylcyclohexene, 5-vinyl-2-norbornene, 1,3-divinylcyclopentane, 1,2-divinylcyclohexane, 1,3-divinylcyclohexane, 1,4-divinylcyclohexane, 1,5-divinylcyclooctane, 1-allyl-4-vinylcyclohexane, 1,4-diallylcyclohexane, 1-allyl-5-vinylcyclooctane, and 1,5-diallylcyclooctane. Non-limiting examples of vinylaromatic olefins include styrene, para-methylstyrene, para-t-butylstyrene, vinylnaphthylene, vinyltoluene, and divinylbenzene. Non-limiting examples of α-olefinic dienes include 1,4-hexadiene, 1,5-hexadiene, 1,5-heptadiene, 1,6-heptadiene, 6-methyl-1,6-heptadiene, 1,7-octadiene, 7-methyl-1,7-octadiene, 1,9-decadiene, 1,11-dodecene, 1,13-tetradecene and 9-methyl-1,9-decadiene. Substituted α-olefins (also called functional group containing α-olefins) include those containing at least one non-carbon Group 13 to 17 atom bound to a carbon atom of the substituted α-olefin where such substitution if silicon may be adjacent to the double bond or terminal to the double bond, or anywhere in between, and where inclusion of non-carbon and non-silicon atoms such as for example B, O, S, Se, Te, N, P, Ge, Sn, Pb, As, F, Cl, Br, or I, are contemplated, where such non-carbon or non-silicon moieties are sufficiently far removed from the double bond so as not to interfere with the coordination polymerization reaction with the catalyst and so to retain the generally hydrocarbyl characteristic. By sufficiently far removed from the double bond we intend that the number of carbon atoms, or the number of carbon and silicon atoms, separating the double bond and the non-carbon or non-silicon moiety is preferably 6 or greater, e.g. 7, or 8, or 9, or 10, or 11, or 12, or 13, or 14 or more. The number of such carbon atoms, or carbon and silicon atoms, is counted from immediately adjacent to the double bond to immediately adjacent to the non-carbon or non-silicon moiety. Examples include allyltrimethylsilane, divinylsilane, 8,8,8-trifluoro-1-octene, 8-methoxyoct-1-ene, 8-methylsulfanyloct-1-ene, 8-dimethylaminooct-1-ene, or combinations thereof. The use of functional group-containing α-olefins where the functional group is closer to the double bond is also within the scope of embodiments of the invention when such olefins may be incorporated in the same manner as are their α-olefin analogs. See, "Metallocene Catalysts and Borane Reagents in The Block/Graft Reactions of Polyolefins", T. C. Chung, et al, *Polym. Mater. Sci. Eng.*, v. 73, p. 463 (1995), and the masked α-olefin monomers of U.S. Pat. No. 5,153,282. Such monomers permit the preparation of both functional-group containing copolymers capable of subsequent derivatization, and of functional macromers which may be used as graft and block type polymeric segments. Copolymerization can also incorporate α-olefinic macromonomers of up to 2000 mer units.

For purposes of this disclosure, the term oligomer refers to compositions having 2-75 mer units and the term polymer refers to compositions having 76 or more mer units. A mer is defined as a unit of an oligomer or polymer that originally corresponded to the monomer(s) used in the oligomerization or polymerization reaction. For example, the mer of polyethylene would be ethylene.

The term "catalyst system" is defined to mean a catalyst precursor/activator pair. When "catalyst system" is used to describe such a pair before activation, it means the unactivated catalyst (precatalyst) together with an activator and, optionally, a co-activator. When it is used to describe such a pair after activation, it means the activated catalyst and the activator or other charge-balancing moiety.

The transition metal compound may be neutral as in a precatalyst, or a charged species with a counter ion as in an activated catalyst system.

Catalyst precursor is also often referred to as precatalyst, catalyst, catalyst compound, catalyst precursor, transition metal compound or transition metal complex. These words are used interchangeably. Activator and cocatalyst are also used interchangeably. A scavenger is a compound that is typically added to facilitate oligomerization or polymerization by scavenging impurities. Some scavengers may also act as activators and may be referred to as co-activators. A co-activator, that is not a scavenger, may also be used in conjunction with an activator in order to form an active catalyst. In some embodiments a co-activator can be pre-mixed with the transition metal compound to form an alkylated transition metal compound, also referred to as an alkylated invention compound.

Noncoordinating anion (NCA) is defined to mean an anion either that does not coordinate to the catalyst metal cation or that does coordinate to the metal cation, but only weakly. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the noncoordinating anion. Suitable metals include, but are not limited to, aluminum, gold, and platinum. Suitable metalloids include, but are not limited to, boron, aluminum, phosphorus, and silicon.

A stoichiometric activator can be either neutral or ionic. The terms ionic activator, and stoichiometric ionic activator can be used interchangeably. Likewise, the terms neutral stoichiometric activator, and Lewis acid activator can be used interchangeably.

DETAILED DESCRIPTION OF THE INVENTION

The metallocene compounds according to the invention can be used as a catalyst component for the production of polymers or oligomers, including homopolymers, such as homopolyethylene or homopolypropylene, copolymers of ethylene with other olefins including alpha-olefins, and copolymers of propylene with other olefins including alpha-olefins.

In a preferred embodiment this invention relates to transition metal compounds represented by formula (2):

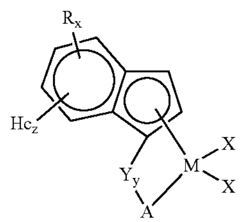

where:

M is a group 3, 4, 5 or 6 transition metal atom, or a lanthanide metal atom, or actinide metal atom, preferably a Group 4 transition metal atom selected from titanium, zirconium or hafnium;

each Hc is, independently, an aromatic heterocyclic substituent or pseudoaromatic heterocyclic substituent that is bonded to any position of the indenyl ligand (e.g., the 1, 2, 3, 4, 5, 6, or 7 position) through a nitrogen or phosphorous ring heteroatom;

z represents the number of Hc substituents bonded to the indenyl ligand and is 1, 2, 3 or 4, preferably 1 or 2;

each R is bonded to any position of the indenyl ligand (e.g., the 1, 2, 3, 4, 5, 6, or 7 position) and is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents, and optionally, adjacent R groups may join together to form a substituted or unsubstituted, saturated, partially unsaturated, or aromatic cyclic or polycyclic substituent;

x represents the number of R substituents bonded to the indenyl ligand and is 2, 3, 4, 5, or 6;

Y is an optional bridging group, and is present when y is one and absent when y is zero, and when present Y is preferably selected from $R'_2C$, $R'_2Si$, $R'_2Ge$, $R'_2CCR'_2$, $R'_2CCR'_2CR'_2$, $R'C{=}CR'$, $R'C{=}CR'CR'_2$, $R'_2CSiR'_2$, $R'_2SiSiR'_2$, $R'_2CSiR'_2CR'_2$, $R'_2SiCR'_2SiR'_2$, $R'C{=}CR'SiR'_2$, $R'_2CGeR'_2$, $R'_2GeGeR'_2$, $R'_2CGeR'_2CR'_2$, $R'_2GeCR'_2GeR'_2$, $R'_2SiGeR'_2$, $R'C{=}CR'GeR'_2$, R'B, $R'_2C—BR'$, $R'_2C—BR'—CR'_2$, R'N, $R'_2C—NR'$, $R'_2C—NR'—CR'_2$, R'P, $R'_2C—PR'$, and $R'_2C—PR'—CR'_2$ where R' is, independently, hydrogen, hydrocarbyl, substituted hydrocarbyl, halocarbyl, substituted halocarbyl, silylcarbyl, or germylcarbyl, and two or more R' on the same atom or on adjacent atoms may join together to form a substituted or unsubstituted, saturated, partially unsaturated, or aromatic cyclic or polycyclic substituent;

y is 0 or 1;

x+y+z=7;

A is a substituted or unsubstituted cyclopentadienyl ligand, a substituted or unsubstituted heterocyclopentadienyl ligand, a substituted or unsubstituted indenyl ligand, a substituted or unsubstituted heteroindenyl ligand, a substituted or unsubstituted fluorenyl ligand, or a substituted or unsubstituted heterofluorenyl ligand where A is optionally bonded to Y through any bondable ring position; or A is a mono-anionic ligand such as a substituted or unsubstituted pentadienyl ligand, a substituted or unsubstituted allyl ligand, or a substituted or unsubstituted boratabenzene;

X are, independently, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand; or both X may, independently, be a halogen, alkoxide, aryloxide, amide, phosphide or other univalent anionic ligand or both X can also be joined to form a anionic chelating ligand; and provided that when A is an indenyl ligand substituted with one aromatic heterocyclic substituent or psuedoaromatic heterocyclic substituent that is bonded to the indenyl ring through a nitrogen or phosphorous ring heteroatom (Hc), and y is one, and Y is bonded to the one position of each indenyl ligand, and z is one, and each Hc is bonded to each indenyl ligand in the 4-position of the indenyl ligand, then Hc is not an unsubstituted or hydrocarbyl substituted pyrrol-1-yl substituent including ring-fused hydrocarbyl substituted pyrrol-1-yl substituents such as indol-1-yl, isoindol-2-yl, carbazol-9-yl, 2,3,4,9-tetrahydrocarbazol-9-yl, and 1,2,3,4-tetrahydrocyclopenta[b]indol-4-yl.

More preferably this invention relates to compounds represented by formula (3):

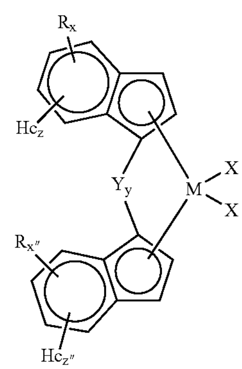

where:

M is a group 3, 4, 5 or 6 transition metal atom, or a lanthanide metal atom, or actinide metal atom, preferably a Group 4 transition metal atom selected from titanium, zirconium or hafnium;

each Hc is, independently, an aromatic heterocyclic substitutent or pseudoaromatic heterocyclic substituent that is bonded to any position of the indenyl ligand through a nitrogen or phosphorous ring heteroatom;

each z and z" represents the number of Hc substituents bonded to each respective indenyl ligand and is, independently, 1, 2, 3 or 4, preferably 1 or 2;

each R is bonded to any position of the indenyl ligand and is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents, and optionally, adjacent R groups may join together to form a substituted or unsubstituted, saturated, partially unsaturated, or aromatic cyclic or polycyclic substituent;

each x and x" represents the number of R substituents bonded to each respective indenyl ligand and is, independently, 2, 3, 4, 5, or 6;

Y is an optional bridging group, and is present when y is one and absent when y is zero, and when Y is present, Y is preferably selected from $R'_2C$, $R'_2Si$, $R'_2Ge$, $R'_2CCR'_2$, $R'_2CCR'_2CR'_2$, R'C═CR', R'C═CR'CR'$_2$, $R'_2CSiR'_2$, $R'_2SiSiR'_2$, $R'_2CSiR'_2CR'_2$, $R'_2SiCR'_2SiR'_2$, R'C═CR'SiR'$_2$, $R'_2CGeR'_2$, $R'_2GeGeR'_2$, $R'_2CGeR'_2CR'_2$, $R'_2GeCR'_2GeR'_2$, $R'_2SiGeR'_2$, R'C═CR'GeR'$_2$, R'B, R'$_2$C—BR', R'$_2$C—BR'—CR'$_2$, R'N, R'$_2$C—NR', R'$_2$C—NR'—CR'$_2$, R'P, R'$_2$C—PR', and R'$_2$C—PR'—CR'$_2$ where R' is, independently, hydrogen, hydrocarbyl, substituted hydrocarbyl, halocarbyl, substituted halocarbyl, silylcarbyl, or germylcarbyl, and two or more R' on the same atom or on adjacent atoms may join together to form a substituted or unsubstituted, saturated, partially unsaturated, or aromatic cyclic or polycyclic substituent;

y is 0 or 1;

x+y+z=7;

x"+y+z"=7;

X are, independently, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand; or both X may, independently, be a halogen, alkoxide, aryloxide, amide, phosphide or other univalent anionic ligand or both X can also be joined to form a anionic chelating ligand; and provided that when y is one, and z is one, and z" is one, and each Hc is bonded to each indenyl ligand in the 4-position of the indenyl ligand, then Hc is not an unsubstituted or hydrocarbyl substituted pyrrol-1-yl substituent including ring-fused hydrocarbyl substituted pyrrol-1-yl substituents such as indol-1-yl, isoindol-2-yl, carbazol-9-yl, 2,3,4,9-tetrahydrocarbazol-9-yl, and 1,2,3,4-tetrahydrocyclopenta[b]indol-4-yl.

Another embodiment of this invention relates to compounds represented by formula (4):

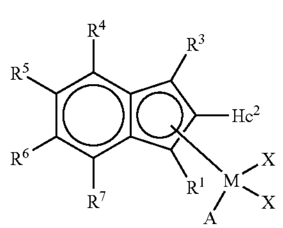

or formula (5):

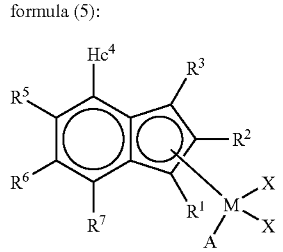

or

-continued formula (6):

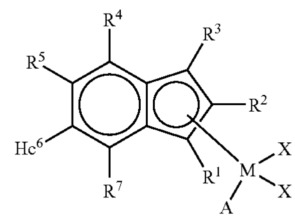

or formula (7)

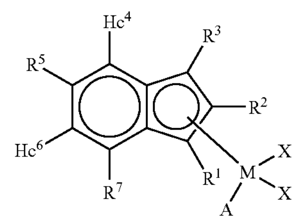

where:

M is a group 3, 4, 5 or 6 transition metal atom, or a lanthanide metal atom, or actinide metal atom, preferably a Group 4 transition metal atom selected from titanium, zirconium or hafnium;

each $Hc^2$, $Hc^4$, and $Hc^6$ is, independently, an aromatic heterocyclic substitutent or pseudoaromatic heterocyclic substituent that is bonded to the indenyl ligand through a nitrogen or phosphorous ring heteroatom;

each $R^1$, $R^2$, $R^3$, $R^4$, $R^5$, $R^6$, and $R^7$ is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents, and optionally, adjacent $R^1$, $R^2$, $R^3$, $R^4$, $R^5$, $R^6$, or $R^7$ groups may join together to form a substituted or unsubstituted, saturated, partially unsaturated, or aromatic cyclic or polycyclic substituent;

A is a substituted or unsubstituted cyclopentadienyl ligand, a substituted or unsubstituted heterocyclopentadienyl ligand, a substituted or unsubstituted indenyl ligand, a substituted or unsubstituted heteroindenyl ligand, a substituted or unsubstituted fluorenyl ligand, or a substituted or unsubstituted heterofluorenyl ligand where A; or A is a mono-anionic ligand such as a substituted or unsubstituted pentadienyl ligand, a substituted or unsubstituted allyl ligand, or a substituted or unsubstituted boratabenzene; and X are, independently, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand; or both X may, independently, be a halogen, alkoxide, aryloxide, amide, phosphide or other univalent anionic ligand or both X can also be joined to form a anionic chelating ligand.

More preferably this invention relates to compounds represented by formula (8):

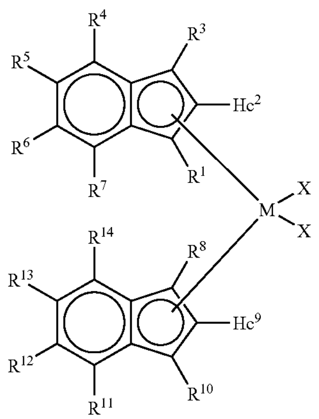

or formula (9):

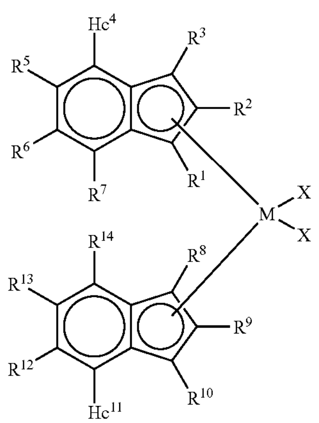

or formula (10):

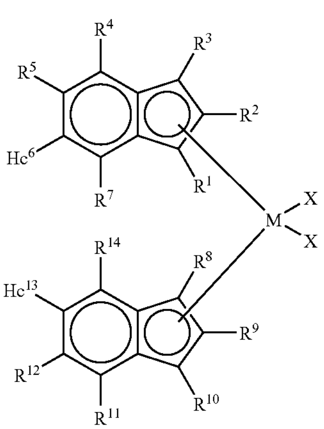

or

-continued formula (11):

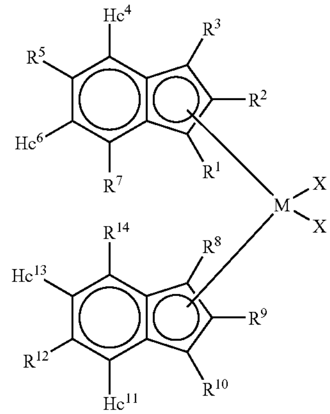

where:

M is a group 3, 4, 5 or 6 transition metal atom, or a lanthanide metal atom, or actinide metal atom, preferably a Group 4 transition metal atom selected from titanium, zirconium or hafnium;

each $Hc^2$, $Hc^4$, $Hc^6$, $Hc^9$, $Hc^{11}$, and $Hc^{13}$ is, independently, an aromatic heterocyclic substitutent or pseudoaromatic heterocyclic substituent that is bonded to the indenyl ligand through a nitrogen or phosphorous ring heteroatom;

each $R^1$, $R^2$, $R^3$, $R^4$, $R^5$, $R^6$, $R^7$, $R^8$, $R^9$, $R^{10}$, $R^{11}$, $R^{12}$, $R^{13}$, and $R^{14}$ is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents, and optionally, adjacent $R^1$, $R^2$, $R^3$, $R^4$, $R^5$, $R^6$, $R^7$, $R^8$, $R^9$, $R^{10}$, $R^{11}$, $R^{12}$, $R^{13}$, or $R^{14}$ groups may join together to form a substituted or unsubstituted, saturated, partially unsaturated, or aromatic cyclic or polycyclic substituent;

X are, independently, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand; or both X may, independently, be a halogen, alkoxide, aryloxide, amide, phosphide or other univalent anionic ligand or both X can also be joined to form a anionic chelating ligand.

Still in another embodiment of this invention relates to compounds represented by formula (12):

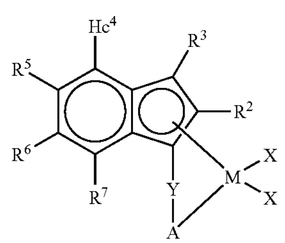

or

-continued formula (13):

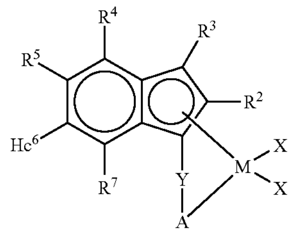

or formula (14):

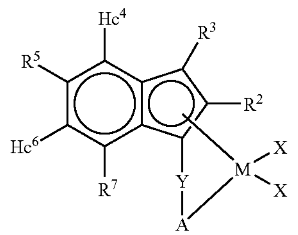

where:

M is a group 3, 4, 5 or 6 transition metal atom, or a lanthanide metal atom, or actinide metal atom, preferably a Group 4 transition metal atom selected from titanium, zirconium or hafnium;

each $Hc^4$ and $Hc^6$ is, independently, an aromatic heterocyclic substitutent or pseudoaromatic heterocyclic substituent that is bonded to the indenyl ligand through a nitrogen or phosphorous ring heteroatom;

each $R^2$, $R^3$, $R^4$, $R^5$, $R^6$, and $R^7$ is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents, and optionally, adjacent $R^2$, $R^3$, $R^4$, $R^5$, $R^6$, or $R^7$ groups may join together to form a substituted or unsubstituted, saturated, partially unsaturated, or aromatic cyclic or polycyclic substituent;

Y is a bridging group and is preferably selected from $R'_2C$, $R'_2Si$, $R'_2Ge$, $R'_2CCR'_2$, $R'_2CCR'_2CR'_2$, R'C═CR', R'C═CR'CR'$_2$, $R'_2CSiR'_2$, $R'_2SiSiR'_2$, $R'_2CSiR'_2CR'_2$, $R'_2SiCR'_2SiR'_2$, R'C═CR'SiR'$_2$, $R'_2CGeR'_2$, $R'_2GeGeR'_2$, $R'_2CGeR'_2CR'_2$, $R'_2GeCR'_2GeR'_2$, $R'_2SiGeR'_2$, R'C═CR'GeR'$_2$, R'B, $R'_2C$—BR', $R'_2C$—BR'—CR'$_2$, R'N, $R'_2C$—NR', $R'_2C$—NR'—CR'$_2$, R'P, $R'_2C$—PR', and $R'_2C$—PR'—CR'$_2$ where R' is, independently, hydrogen, hydrocarbyl, substituted hydrocarbyl, halocarbyl, substituted halocarbyl, silylcarbyl, or germylcarbyl, and two or more R' on the same atom or on adjacent atoms may join together to form a substituted or unsubstituted, saturated, partially unsaturated, or aromatic cyclic or polycyclic substituent;

A is a substituted or unsubstituted cyclopentadienyl ligand, a substituted or unsubstituted heterocyclopentadienyl ligand, a substituted or unsubstituted indenyl ligand, a substituted or unsubstituted heteroindenyl ligand, a substituted or unsubstituted fluorenyl ligand, or a substituted or unsubstituted heterofluorenyl ligand where A is bonded to Y through any bondable ring position; or A is a mono-anionic ligand such as a substituted or unsubstituted pentadienyl ligand, a substituted or unsubstituted allyl ligand, or a substituted or unsubstituted boratabenzene; and X are, independently, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand; or both X may, independently, be a halogen, alkoxide, aryloxide, amide, phosphide or other univalent anionic ligand or both X can also be joined to form a anionic chelating ligand; and provided that in formula 12, when A is an indenyl ligand bonded to Y in the one position of the indenyl ring and A is substituted with one aromatic heterocyclic substitutent or pseudoaromatic heterocyclic substituent that is bonded to the indenyl ring through a nitrogen or phosphorous ring heteroatom (Hc), and each Hc is bonded to each indenyl ligand in the 4-position of the indenyl ligand, then Hc is not an unsubstituted or hydrocarbyl substituted pyrrol-1-yl substituent including ring-fused hydrocarbyl substituted pyrrol-1-yl substituents such as indol-1-yl, isoindol-2-yl, carbazol-9-yl, 2,3,4,9-tetrahydrocarbazol-9-yl, and 1,2,3,4-tetrahydrocyclopenta[b]indol-4-yl.

More preferably this invention relates to compounds represented by formula (15):

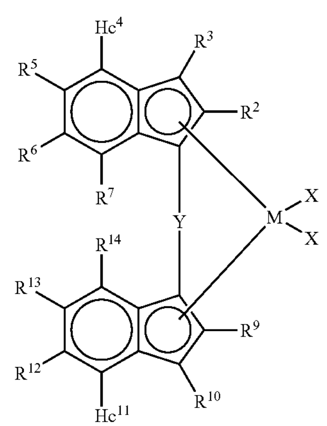

or formula (16):

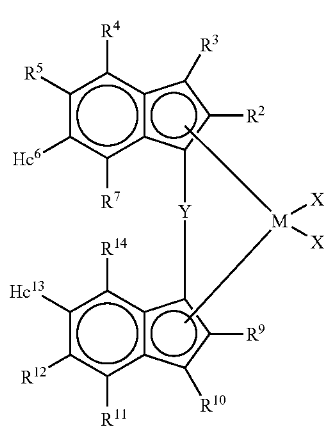

or

-continued formula (17):

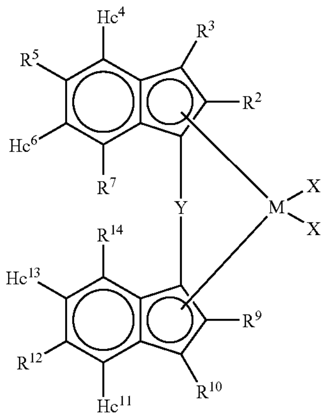

where:

M is a group 3, 4, 5 or 6 transition metal atom, or a lanthanide metal atom, or actinide metal atom, preferably a Group 4 transition metal atom selected from titanium, zirconium or hafnium;

each $Hc^4$, $Hc^6$, $Hc^{11}$, and $Hc^{13}$ is, independently, an aromatic heterocyclic substitutent or pseudoaromatic heterocyclic substituent that is bonded to the indenyl ligand through a nitrogen or phosphorous ring heteroatom;

each $R^2$, $R^3$, $R^4$, $R^5$, $R^6$, $R^7$, $R^9$, $R^{11}$, $R^{12}$, $R^{13}$, and $R^{14}$ is, in hydrogen, or a hydrocarbyl, substituted hydrocarbyl, halocarbyl, substituted halocarbyl, silylcarbyl, substituted silylcarbyl, germylcarbyl, or substituted germylcarbyl substituents, and optionally, adjacent $R^2$, $R^3$, $R^4$, $R^5$, $R^6$, $R^7$, $R^9$, $R^{10}$, $R^{11}$, $R^{12}$, $R^{13}$, or $R^{14}$ groups may join together to form a substituted or unsubstituted, saturated, partially unsaturated, or aromatic cyclic or polycyclic substituent;

Y is a bridging group and is preferably selected from $R'_2C$, $R'_2Si$, $R'_2Ge$, $R'_2CCR'_2$, $R'_2CCR'_2CR'_2$, R'C═CR', R'C═CR'CR'$_2$, $R'_2CSiR'_2$, $R'_2SiSiR'_2$, $R'_2CSiR'_2CR'_2$, $R'_2SiCR'_2SiR'_2$, R'C═CR'SiR'$_2$, $R'_2CGeR'_2$, $R'_2GeGeR'_2$, $R'_2CGeR'_2CR'_2$, $R'_2GeCR'_2GeR'_2$, $R'_2SiGeR'_2$, R'C═CR'GeR'$_2$, R'B, $R'_2C$—BR', $R'_2C$—BR'—CR'$_2$, R'N, $R'_2C$—NR', $R'_2C$—NR'—CR'$_2$, R'P, $R'_2C$—PR', and $R'_2C$—PR'—CR'$_2$ where R' is, independently, hydrogen, hydrocarbyl, substituted hydrocarbyl, halocarbyl, substituted halocarbyl, silylcarbyl, or germylcarbyl, and two or more R' on the same atom or on adjacent atoms may join together to form a substituted or unsubstituted, saturated, partially unsaturated, or aromatic cyclic or polycyclic substituent;

X are, independently, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand; or both X may, independently, be a halogen, alkoxide, aryloxide, amide, phosphide or other univalent anionic ligand or both X can also be joined to form a anionic chelating ligand; and provided that for formula 15, each Hc is not an unsubstituted or hydrocarbyl substituted pyrrol-1-yl substituent including ring-fused hydrocarbyl substituted pyrrol-1-yl substituents such as indol-1-yl, isoindol-2-yl, carbazol-9-yl, 2,3,4,9-tetrahydrocarbazol-9-yl, and 1,2,3,4-tetrahydrocyclopenta[b]indol-4-yl.

Examples of specific preferred embodiments are tabulated below in Table 1, where some representative components are listed. Not listed, is M which is defined above; M is, preferably, titanium, zirconium, or hafnium. When alkyl, alkenyl and alkynyl radicals are disclosed in this application the term includes all isomers and all substitution types, as previously described, unless otherwise stated. Listings for the ligand "A" include all bondable ring positions and all possible isomers. For example, a listing under "A" of indenyl would include 1-indenyl, 2-indenyl, 4-indenyl and 5-indenyl where the number indicates the bridging position; a listing of methylindenyl would include 2-(1-methylindenyl), 3-(1-methylindenyl), 4-(1-methylindenyl), 5-(1-methylindenyl), 6-(1-methylindenyl), 7-(1-methylindenyl), 1-(2-methylindenyl), 4-(2-methylindenyl), 5-(2-methylindenyl), 1-(4-methylindenyl), 2-(4-methylindenyl), 3-(4-methylindenyl), 5-(4-methylindenyl), 6-(4-methylindenyl), 7-(4-methylindenyl), 1-(5-methylindenyl), 2-(5-methylindenyl), 3-(5-methylindenyl), 4-(5-methylindenyl), 6-(5-methylindenyl), and 7-(5-methylindenyl) where the number outside the parenthesis indicates the bridging position. When more than one substituent is listed, for example, propylphenylindenyl, propyl and phenyl are each substituents on the indenyl ring, as compared to (propylphenyl)indenyl where propyl is a substituent on the phenyl ring which in turn is a substituent on the indenyl ring. The column labeled "R" shows some examples of substituents that can serve as R, $R^1$, $R^2$, $R^3$, $R^4$, $R^5$, $R^6$, $R^7$, $R^8$, $R^9$, $R^{10}$, $R^{11}$, $R^{12}$, $R^{13}$ and $R^{14}$ The selection of one substituent is independent of the selection any other substituent. In other words, the invention allows $R=R^1=R^2=R^3=R^4=R^5=R^6=R^7=R^8=R^9=R^{10}=R^{11}=R^{12}=R^{13}=R^{14}$, but does not demand it. Likewise, each X may be chosen independently of one another. Each "Hc" may also be chosen independently of one another. To illustrate members of the transition metal component, select a transition metal, and select any combination of the species listed in Table 1 for any given formulae 2 through 17 illustrated above. For example, using formula 2, zirconium as the transition metal, and the substituents/ligands in the first row of Table 1, the compound dimethylsilylene(pyrrol-1-ylindenyl)(cyclopenta[b]thienyl)zirconium dihydride is illustrated. Any combination of components may be selected using the above formulae 2 through 17, and any Group 3, 4, 5 or 6 transition metal atom (preferably Ti, Zr or Hf). While Table 1 does not specify the bridging position of the ligand Y (when present), formulae 2, 12, 13, and 14 indicate the bridge is in the one position of the substituted indenyl ligand, and to any possible bridging position of the ligand A—for example using formula 2 with y=1, the compound 1,2'-dimethylsilylene(2-pyrazol-1-ylindenyl)(indenyl)zirconium dichloride, where the dimethylsilylene bridging ligand is bonded to the one position of the 2-pyrazol-1-ylindenyl ligand and to the two position of the indenyl ligand (indicated by the 2'). Formulae 3, 15, 16, and 17 indicate the bonding of the bridging ligand is in the one position of each substituted indenyl ligand—for example using formula 15, the compound 1,1'-dimethylgermyl-bis(4-imidazol-1-ylindenyl)zirconium dichloride is bridged in the one position of each 4-imidazol-1-ylindenyl ligand. When two different ligands are being bridged by a bridging group, the first number represents the position the bridge is bonded to the first ligand and the second number (typically a number followed by an ') represents the position the bridge is bonded to the second ligand. If the bridging position is not specified, it is assumed to be in the 1 and 1' positions of the ligands being bridged, for example, 1,1'-dipropylsilylene-bis(4-imidazol-1-ylindenyl)zirconium dichloride is the same as dipropylsilylene-bis(4-imidazol-1-ylindenyl)zirconium dichloride.

Additional examples illustrated would include:

1,1'-methylphenylsilylene(4-phosphol-1-ylindenyl)(2-carbazol-9-yl)hafnium dibromide, 1,1'-(1,2-ethylene)bis(4-phenothaizin-10-ylindenyl)titanium methyl chloride, (2-(3-methylpyrrol-1-yl)indenyl)(cyclopentadienyl)zirconium dimethyl, (2-methyl-4-(4-methylimidazol-1-yl)indenyl)(fluorenyl)zirconium dichloride, bis(pyrazol-1-ylindenyl)titanium butadiene, 1,1'-cyclotetramethylenesilylene-bis(2-([1,3]azaphosphol-1-yl)indenyl)hafnium methylidene, and the like.

TABLE 1

| Y |
|---|
| dimethylsilylene |
| diethylsilylene |
| dipropylsilylene |
| dibutylsilylene |
| dipentylsilylene |
| dihexylsilylene |
| diheptylsilylene |
| dioctylsilylene |
| dinonylsilylene |
| didecylsilylene |
| diundecylsilylene |
| didodecylsilylene |
| ditridecylsilylene |
| ditetradecylsilylene |
| dipentadecylsilylene |
| dihexadecylsilylene |
| diheptadecylsilylene |
| dioctadecylsilylene |
| dinonadecylsilylene |
| dieicosylsilylene |
| diheneicosylsilylene |
| didocosylsilylene |
| ditricosylsilylene |
| ditetracosylsilylene |
| dipentacosylsilylene |
| dihexacosylsilylene |
| diheptacosylsilylene |
| dioctacosylsilylene |
| dinonacosylsilylene |
| ditriacontylsilylene |
| dicyclohexylsilylene |
| dicyclopentylsilylene |
| dicycloheptylsilylene |
| dicyclooctylsilylene |
| dicyclodecylsilylene |
| dicyclododecylsilylene |
| dinapthylsilylene |
| diphenylsilylene |
| ditolylsilylene |
| dibenzylsilylene |
| diphenethylsilylene |
| di(butylphenethyl)-silylene |
| methylethylsilylene |
| methylpropylsilylene |
| methylbutylsilylene |
| methylhexylsilylene |
| methylphenylsilylene |
| ethylphenylsilylene |
| ethylpropylsilylene |
| ethylbutylsilylene |
| propylphenylsilylene |
| tetramethyldisilylene |
| dimethylgermylene |

TABLE 1-continued

| |
|---|
| diethylgermylene |
| diphenylgermylene |
| methylphenylgermylene |
| cyclotrimethylenesilylene |
| cyclotetramethylenesilylene |
| cyclopentamethylenesilylene |
| methylene |
| dimethylmethylene |
| diethylmethylene |
| dibutylmethylene |
| dipropylmethylene |
| diphenylmethylene |
| ditolylmethylene |
| di(butylphenyl)methylene |
| di(trimethylsilylphenyl)-methylene |
| di(triethylsilylphenyl)-methylene |
| dibenzylmethylene |
| cyclotetramethylene-methylene |
| cyclopentamethylene-methylene |
| ethylene |
| methylethylene |
| dimethylethylene |
| trimethylethylene |
| tetramethylethylene |
| cyclopropylene |
| cyclobutylene |
| cyclopentylene |
| cyclohexylene |
| cycloheptylene |
| cyclooctylene |
| propanediyl |
| methylpropanediyl |
| dimethylpropanediyl |
| trimethylpropanediyl |
| tetramethylpropanediyl |
| pentamethylpropanediyl |
| hexamethylpropanediyl |
| tetramethyldisiloxylene |
| vinylene |
| ethene-1,1-diyl |
| divinylsilylene |
| dipropenylsilylene |
| dibutenylsilylene |
| methylvinylsilylene |
| methylpropenylsilylene |
| methylbutenylsilylene |
| dimethylsilylmethylene |
| diphenylsilylmethylene |
| dimethylsilylethylene |
| diphenylsilylethylene |
| dimethylsilylpropylene |
| diphenylsilylpropylene |
| dimethylstannylene |
| diphenylstannylene |
| methylphenylstannylene |
| cyclohexylazanediyl |
| methylazanediyl |
| ethylazanediyl |
| propylazanediyl |
| butylazanediyl |
| pentylazanediyl |
| hexylazanediyl |
| phenylazanediyl |
| perfluorophenylazanediyl |
| methylphosphanediyl |
| ethylphosphanediyl |
| propylphosphanediyl |
| butylphosphanediyl |
| pentylphosphanediyl |
| hexylphosphanediyl |
| cyclohexylphosphanediyl |
| phenylphosphanediyl |
| methylboranediyl |
| ethylboranediyl |
| propylboranediyl |

TABLE 1-continued

| |
|---|
| butylboranediyl |
| pentylboranediyl |
| hexylboranediyl |
| phenylboranediyl |
| cyclohexylboranediyl |
| A |
| cyclopenta[b]thienyl |
| cyclopenta[b]furanyl |
| cyclopenta[b]selenophenyl |
| cyclopenta[b]tellurophenyl |
| cyclopenta[b]pyrrolyl |
| cyclopenta[b]phospholyl |
| cyclopenta[b]arsolyl |
| cyclopenta[b]stibolyl |
| methylcyclopenta[b]thienyl |
| methylcyclopenta[b]furanyl |
| methylcyclopenta[b]selenophenyl |
| methylcyclopenta[b]tellurophenyl |
| methylcyclopenta[b]pyrrolyl |
| methylcyclopenta[b]phospholyl |
| methylcyclopenta[b]arsolyl |
| methylcyclopenta[b]stibolyl |
| dimethylcyclopenta[b]thienyl |
| dimethylcyclopenta[b]furanyl |
| dimethylcyclopenta[b]pyrrolyl |
| dimethylcyclopenta[b]phospholyl |
| trimethylcyclopenta[b]thienyl |
| trimethylcyclopenta[b]furanyl |
| trimethylcyclopenta[b]pyrrolyl |
| trimethylcyclopenta[b]phospholyl |
| tetramethylcyclopenta[b]thienyl |
| tetramethylcyclopenta[b]furanyl |
| tetramethylcyclopenta[b]pyrrolyl |
| tetramethylcyclopenta[b]phospholyl |
| pentamethylcyclopenta[b]thienyl (y = 0) |
| pentamethylcyclopenta[b]furanyl (y = 0) |
| pentamethylcyclopenta[b]pyrrolyl |
| pentamethylcyclopenta[b]phospholyl |
| hexamethylcyclopenta[b]pyrrolyl (y = 0) |
| hexamethylcyclopenta[b]phospholyl (y = 0) |
| ethylcyclopenta[b]thienyl |
| ethylcyclopenta[b]furanyl |
| ethylcyclopenta[b]pyrrolyl |
| ethylcyclopenta[b]phospholyl |
| diethylcyclopenta[b]thienyl |
| diethylcyclopenta[b]furanyl |
| diethylcyclopenta[b]pyrrolyl |
| diethylcyclopenta[b]phospholyl |
| triethylcyclopenta[b]thienyl |
| triethylcyclopenta[b]furanyl |
| triethylcyclopenta[b]pyrrolyl |
| triethylcyclopenta[b]phospholyl |
| propylcyclopenta[b]thienyl |
| propylcyclopenta[b]furanyl |
| propylcyclopenta[b]pyrrolyl |
| propylcyclopenta[b]phospholyl |
| dipropylcyclopenta[b]thienyl |
| dipropylcyclopenta[b]furanyl |
| dipropylcyclopenta[b]pyrrolyl |
| dipropylcyclopenta[b]phospholyl |
| tripropylcyclopenta[b]thienyl |
| tripropylcyclopenta[b]furanyl |
| tripropylcyclopenta[b]pyrrolyl |
| tripropylcyclopenta[b]phospholyl |
| butylcyclopenta[b]thienyl |
| butylcyclopenta[b]furanyl |
| butylcyclopenta[b]pyrrolyl |
| butylcyclopenta[b]phospholyl |
| dibutylcyclopenta[b]thienyl |
| dibutylcyclopenta[b]furanyl |
| dibutylcyclopenta[b]pyrrolyl |
| dibutylcyclopenta[b]phospholyl |
| tributylcyclopenta[b]thienyl |
| tributylcyclopenta[b]furanyl |
| tributylcyclopenta[b]pyrrolyl |
| tributylcyclopenta[b]phospholyl |
| ethylmethylcyclopenta[b]thienyl |

TABLE 1-continued

| |
|---|
| ethylmethylcyclopenta[b]furanyl |
| ethylmethylcyclopenta[b]pyrrolyl |
| ethylmethylcyclopenta[b]phospholyl |
| methylpropylcyclopenta[b]thienyl |
| methylpropylcyclopenta[b]furanyl |
| methylpropylcyclopenta[b]pyrrolyl |
| methylpropylcyclopenta[b]phospholyl |
| butylmethylcyclopenta[b]thienyl |
| butylmethylcyclopenta[b]furanyl |
| butylmethylcyclopenta[b]pyrrolyl |
| butylmethylcyclopenta[b]phospholyl |
| cyclopenta[c]thienyl |
| cyclopenta[c]furanyl |
| cyclopenta[c]selenophenyl |
| cyclopenta[c]tellurophenyl |
| cyclopenta[c]pyrrolyl |
| cyclopenta[c]phospholyl |
| cyclopenta[c]arsolyl |
| cyclopenta[c]stibolyl |
| methylcyclopenta[c]thienyl |
| methylcyclopenta[c]furanyl |
| methylcyclopenta[c]selenophenyl |
| methylcyclopenta[c]tellurophenyl |
| methylcyclopenta[c]pyrrolyl |
| methylcyclopenta[c]phospholyl |
| methylcyclopenta[c]arsolyl |
| methylcyclopenta[c]stibolyl |
| dimethylcyclopenta[c]thienyl |
| dimethylcyclopenta[c]furanyl |
| dimethylcyclopenta[c]pyrrolyl |
| dimethylcyclopenta[c]phospholyl |
| trimethylcyclopenta[c]thienyl |
| trimethylcyclopenta[c]furanyl |
| trimethylcyclopenta[c]pyrrolyl |
| trimethylcyclopenta[c]phospholyl |
| tetramethylcyclopenta[c]thienyl |
| tetramethylcyclopenta[c]furanyl |
| tetramethylcyclopenta[c]pyrrolyl |
| tetramethylcyclopenta[c]phospholyl |
| pentaamethylcyclopenta[c]thienyl (y = 0) |
| pentamethylcyclopenta[c]furanyl (y = 0) |
| pentamethylcyclopenta[c]pyrrolyl |
| pentamethylcyclopenta[c]phospholyl |
| hexamethylcyclopenta[c]pyrrolyl (y = 0) |
| hexamethylcyclopenta[c]phospholyl (y = 0) |
| ethylcyclopenta[c]thienyl |
| ethylcyclopenta[c]furanyl |
| ethylcyclopenta[c]pyrrolyl |
| ethylcyclopenta[c]phospholyl |
| diethylcyclopenta[c]thienyl |
| diethylcyclopenta[c]furanyl |
| diethylcyclopenta[c]pyrrolyl |
| diethylcyclopenta[c]phospholyl |
| triethylcyclopenta[c]thienyl |
| triethylcyclopenta[c]furanyl |
| triethylcyclopenta[c]pyrrolyl |
| triethylcyclopenta[c]phospholyl |
| propylcyclopenta[c]thienyl |
| propylcyclopenta[c]furanyl |
| propylcyclopenta[c]pyrrolyl |
| propylcyclopenta[c]phospholyl |
| dipropylcyclopenta[c]thienyl |
| dipropylcyclopenta[c]furanyl |
| dipropylcyclopenta[c]pyrrolyl |
| dipropylcyclopenta[c]phospholyl |
| tripropylcyclopenta[c]thienyl |
| tripropylcyclopenta[c]furanyl |
| tripropylcyclopenta[c]pyrrolyl |
| tripropylcyclopenta[c]phospholyl |
| butylcyclopenta[c]thienyl |
| butylcyclopenta[c]furanyl |
| butylcyclopenta[c]pyrrolyl |
| butylcyclopenta[c]phospholyl |
| dibutylcyclopenta[c]thienyl |
| dibutylcyclopenta[c]furanyl |
| dibutylcyclopenta[c]pyrrolyl |
| dibutylcyclopenta[c]phospholyl |

TABLE 1-continued

| |
|---|
| tributylcyclopenta[c]thienyl |
| tributylcyclopenta[c]furanyl |
| tributylcyclopenta[c]pyrrolyl |
| tributylcyclopenta[c]phospholyl |
| ethylmethylcyclopenta[c]thienyl |
| ethylmethylcyclopenta[c]furanyl |
| ethylmethylcyclopenta[c]pyrrolyl |
| ethylmethylcyclopenta[c]phospholyl |
| methylpropylcyclopenta[c]thienyl |
| methylpropylcyclopenta[c]furanyl |
| methylpropylcyclopenta[c]pyrrolyl |
| methylpropylcyclopenta[c]phospholyl |
| butylmethylcyclopenta[c]thienyl |
| butylmethylcyclopenta[c]furanyl |
| butylmethylcyclopenta[c]pyrrolyl |
| butylmethylcyclopenta[c]phospholyl |
| indenyl |
| methylindenyl |
| dimethylindenyl |
| trimethylindenyl |
| tetramethylindenyl |
| pentamethylindenyl |
| hexamethylindenyl |
| heptamethylindenyl (y = 0) |
| ethylindenyl |
| diethylindenyl |
| triethylindenyl |
| propylindenyl |
| dipropylindenyl |
| tripropylindenyl |
| butylindenyl |
| dibutylindenyl |
| tributylindenyl |
| pentylindenyl |
| dipentylindenyl |
| tripentylindenyl |
| hexylindenyl |
| dihexylindenyl |
| trihexylindenyl |
| heptylindenyl |
| octylindenyl |
| nonylindenyl |
| decylindenyl |
| phenylindenyl |
| methylphenylindenyl |
| ethylphenylindenyl |
| propylphenylindenyl |
| butylphenylindenyl |
| pentylphenylindenyl |
| hexylphenylindenyl |
| heptylphenylindenyl |
| octylphenylindenyl |
| nonylphenylindenyl |
| decylphenylindenyl |
| dimethylphenylindenyl |
| trimethylphenylindenyl |
| dipropylphenylindenyl |
| methylpropylphenylindenyl |
| tolylindenyl |
| methyltolylindenyl |
| ethyltolylindenyl |
| propyltolylindenyl |
| butyltolylindenyl |
| pentyltolylindenyl |
| hexyltolylindenyl |
| heptyltolylindenyl |
| octyltolylindenyl |
| nonyltolylindenyl |
| decyltolylindenyl |
| dimethyltolylindenyl |
| trimethyltolylindenyl |
| dipropyltolylindenyl |
| methylpropyltolylindenyl |
| naphthylindenyl |
| methylnaphthylindenyl |
| ethylnaphthylindenyl |
| propylnaphthylindenyl |
| butylnaphthylindenyl |
| pentylnaphthylindenyl |

TABLE 1-continued

| |
|---|
| hexylnaphthylindenyl |
| heptylnaphthylindenyl |
| octylnaphthylindenyl |
| nonylnaphthylindenyl |
| decylnaphthylindenyl |
| dimethylnaphthylindenyl |
| trimethylnaphthylindenyl |
| dipropylnaphthylindenyl |
| methylpropylnaphthylindenyl |
| (propylphenyl)indenyl |
| methyl(propylphenyl)indenyl |
| ethyl(propylphenyl)indenyl |
| propyl(propylphenyl)indenyl |
| butyl(propylphenyl)indenyl |
| dimethyl(propylphenyl)indenyl |
| trimethyl(propylphenyl)indenyl |
| methylpropyl(propylphenyl)indenyl |
| (dipropylphenyl)indenyl |
| methyl(dipropylphenyl)indenyl |
| ethyl(dipropylphenyl)indenyl |
| propyl(dipropylphenyl)indenyl |
| butyl(dipropylphenyl)indenyl |
| dimethyl(dipropylphenyl)indenyl |
| trimethyl(dipropylphenyl)indenyl |
| methylpropyl(dipropylphenyl)indenyl |
| (dimethylphenyl)indenyl |
| methyl(dimethylphenyl)indenyl |
| ethyl(dimethylphenyl)indenyl |
| propyl(dimethylphenyl)indenyl |
| butyl(dimethylphenyl)indenyl |
| trimethyl(dimethylphenyl)indenyl |
| trimethyl(dimethylphenyl)indenyl |
| methylpropyl(dimethylphenyl)indenyl |
| (trimethylphenyl)indenyl |
| methyl(trimethylphenyl)indenyl |
| ethyl(trimethylphenyl)indenyl |
| propyl(trimethylphenyl)indenyl |
| butyl(trimethylphenyl)indenyl |
| dimethyl(trimethylphenyl)indenyl |
| trimethyl(trimethylphenyl)indenyl |
| methylpropyl(trimethylphenyl)indenyl |
| trimethylsilylindenyl |
| trifluormethylindenyl |
| trifluoromethylphenylindenyl |
| (benzothiopheneyl)indenyl |
| (benzofuranyl)indenyl |
| (fluorophenyl)indenyl |
| (difluorophenyl)indenyl |
| (trifluorophenyl)indenyl |
| (tetrafluorophenyl)indenyl |
| (pentafluorophenyl)indenyl |
| (trifluoromethylphenyl)indenyl |
| (thienyl)indenyl |
| (furanyl)indenyl |
| (pyrrolyl)indenyl |
| (phospholyl)indenyl |
| (methylthienyl)indenyl |
| (methylfuranyl)indenyl |
| (methylpyrrolyl)indenyl |
| (methylphospholyl)indenyl |
| (dimethylthienyl)indenyl |
| (dimethylfuranyl)indenyl |
| (dimethylpyrrolyl)indenyl |
| (dimethylphospholyl)indenyl |
| (ethylthienyl)indenyl |
| (ethylfuranyl)indenyl |
| (ethylpyrrolyl)indenyl |
| (ethylphospholyl)indenyl |
| (propylthienyl)indenyl |
| (propylfuranyl)indenyl |
| (propylpyrrolyl)indenyl |
| (propylphospholyl)indenyl |
| (butylthienyl)indenyl |
| (butylfuranyl)indenyl |
| (butylpyrrolyl)indenyl |
| (butylphospholyl)indenyl |
| methyl(benzothiopheneyl)indenyl |
| methyl(benzofuranyl)indenyl |
| methyl(fluorophenyl)indenyl |

TABLE 1-continued

| |
|---|
| methyl(difluorophenyl)indenyl |
| methyl(trifluorophenyl)indenyl |
| methyl(tetrafluorophenyl)indenyl |
| methyl(pentafluorophenyl)indenyl |
| methyl(trifluoromethylphenyl)indenyl |
| methyl(thienyl)indenyl |
| methyl(furanyl)indenyl |
| methyl(pyrrolyl)indenyl |
| methyl(phospholyl)indenyl |
| methyl(methylthienyl)indenyl |
| methyl(methylfuranyl)indenyl |
| methyl(methylpyrrolyl)indenyl |
| methyl(methylphospholyl)indenyl |
| methyl(dimethylthienyl)indenyl |
| methyl(dimethylfuranyl)indenyl |
| methyl(dimethylpyrrolyl)indenyl |
| methyl(dimethylphospholyl)indenyl |
| methyl(ethylthienyl)indenyl |
| methyl(ethylfuranyl)indenyl |
| methyl(ethylpyrrolyl)indenyl |
| methyl(ethylphospholyl)indenyl |
| methyl(propylthienyl)indenyl |
| methyl(propylfuranyl)indenyl |
| methyl(propylpyrrolyl)indenyl |
| methyl(propylphospholyl)indenyl |
| methyl(butylthienyl)indenyl |
| methyl(butylfuranyl)indenyl |
| methyl(butylpyrrolyl)indenyl |
| methyl(butylphospholyl)indenyl |
| propyl(benzothiopheneyl)indenyl |
| propyl(benzofuranyl)indenyl |
| propyl(fluorophenyl)indenyl |
| propyl(difluorophenyl)indenyl |
| propyl(trifluorophenyl)indenyl |
| propyl(tetrafluorophenyl)indenyl |
| propyl(pentafluorophenyl)indenyl |
| propyl(trifluoromethylphenyl)indenyl |
| propyl(thienyl)indenyl |
| propyl(furanyl)indenyl |
| propyl(pyrrolyl)indenyl |
| propyl(phospholyl)indenyl |
| propyl(methylthienyl)indenyl |
| propyl(methylfuranyl)indenyl |
| propyl(methylpyrrolyl)indenyl |
| propyl(methylphospholyl)indenyl |
| propyl(dimethylthienyl)indenyl |
| propyl(dimethylfuranyl)indenyl |
| propyl(dimethylpyrrolyl)indenyl |
| propyl(dimethylphospholyl)indenyl |
| propyl(ethylthienyl)indenyl |
| propyl(ethylfuranyl)indenyl |
| propyl(ethylpyrrolyl)indenyl |
| propyl(ethylphospholyl)indenyl |
| propyl(propylthienyl)indenyl |
| propyl(propylfuranyl)indenyl |
| propyl(propylpyrrolyl)indenyl |
| propyl(propylphospholyl)indenyl |
| propyl(butylthienyl)indenyl |
| propyl(butylfuranyl)indenyl |
| propyl(butylpyrrolyl)indenyl |
| propyl(butylphospholyl)indenyl |
| tetrahydroindenyl |
| methyltetrahydroindenyl |
| dimethyltetrahydroindenyl |
| trimethyltetrahydroindenyl |
| tetramethyltetrahydroindenyl |
| pentamethyltetrahydroindenyl |
| hexamethyltetrahydroindenyl |
| heptamethyltetrahydroindenyl (y = 0) |
| ethyltetrahydroindenyl |
| propyltetrahydroindenyl |
| butyltetrahydroindenyl |
| pentyltetrahydroindenyl |
| hexyltetrahydroindenyl |
| heptyltetrahydroindenyl |
| octyltetrahydroindenyl |
| nonyltetrahydroindenyl |
| decyltetrahydroindenyl |
| phenyltetrahydroindenyl |

TABLE 1-continued

| |
|---|
| methylphenyltetrahydroindenyl |
| ethylphenyltetrahydroindenyl |
| propylphenyltetrahydroindenyl |
| butylphenyltetrahydroindenyl |
| pentylphenyltetrahydroindenyl |
| hexylphenyltetrahydroindenyl |
| heptylphenyltetrahydroindenyl |
| octylphenyltetrahydroindenyl |
| nonylphenyltetrahydroindenyl |
| decylphenyltetrahydroindenyl |
| dimethylphenyltetrahydroindenyl |
| trimethylphenyltetrahydroindenyl |
| dipropylphenyltetrahydroindenyl |
| methylpropylphenyltetrahydroindenyl |
| tolyltetrahydroindenyl |
| methyltolyltetrahydroindenyl |
| ethyltolyltetrahydroindenyl |
| propyltolyltetrahydroindenyl |
| butyltolyltetrahydroindenyl |
| dimethyltolyltetrahydroindenyl |
| trimethyltolyltetrahydroindenyl |
| dipropyltolyltetrahydroindenyl |
| methylpropyltolyltetrahydroindenyl |
| naphthyltetrahydroindenyl |
| methylnaphthyltetrahydroindenyl |
| ethylnaphthyltetrahydroindenyl |
| propylnaphthyltetrahydroindenyl |
| butylnaphthyltetrahydroindenyl |
| dimethylnaphthyltetrahydroindenyl |
| trimethylnaphthyltetrahydroindenyl |
| dipropylnaphthyltetrahydroindenyl |
| methylpropylnaphthyltetrahydroindenyl |
| (propylphenyl)tetrahydroindenyl |
| methyl(propylphenyl)tetrahydroindenyl |
| ethyl(propylphenyl)tetrahydroindenyl |
| propyl(propylphenyl)tetrahydroindenyl |
| butyl(propylphenyl)tetrahydroindenyl |
| dimethyl(propylphenyl)tetrahydroindenyl |
| trimethyl(propylphenyl)tetrahydroindenyl |
| methylpropyl(propylphenyl)tetrahydroindenyl |
| (dipropylphenyl)tetrahydroindenyl |
| methyl(dipropylphenyl)tetrahydroindenyl |
| ethyl(dipropylphenyl)tetrahydroindenyl |
| propyl(dipropylphenyl)tetrahydroindenyl |
| butyl(dipropylphenyl)tetrahydroindenyl |
| dimethyl(dipropylphenyl)tetrahydroindenyl |
| trimethyl(dipropylphenyl)tetrahydroindenyl |
| methylpropyl(dipropylphenyl)tetrahydro-indenyl |
| (dimethylphenyl)tetrahydroindenyl |
| methyl(dimethylphenyl)tetrahydroindenyl |
| ethyl(dimethylphenyl)tetrahydroindenyl |
| propyl(dimethylphenyl)tetrahydroindenyl |
| butyl(dimethylphenyl)tetrahydroindenyl |
| trimethyl(dimethylphenyl)tetrahydroindenyl |
| trimethyl(dimethylphenyl)tetrahydroindenyl |
| methylpropyl(dimethylphenyl)tetrahydro-indenyl |
| (trimethylphenyl)tetrahydroindenyl |
| methyl(trimethylphenyl)tetrahydroindenyl |
| ethyl(trimethylphenyl)tetrahydroindenyl |
| propyl(trimethylphenyl)tetrahydroindenyl |
| butyl(trimethylphenyl)tetrahydroindenyl |
| dimethyl(trimethylphenyl)tetrahydroindenyl |
| trimethyl(trimethylphenyl)tetrahydroindenyl |
| methylpropyl(trimethylphenyl)tetrahydro-indenyl |
| cyclopentadienyl |
| methylcyclopentadienyl |
| dimethylcyclopentadienyl |
| trimethylcyclopentadienyl |
| tetramethylcyclopentadienyl |
| pentamethylcyclopentadienyl (y = 0) |
| ethylcyclopentadienyl |
| diethylcyclopentadienyl |
| triethylcyclopentadienyl |
| tetraethylcyclopentadienyl |
| pentaethylcyclopentadienyl (y = 0) |
| propylcyclopentadienyl |

TABLE 1-continued

| |
|---|
| dipropylcyclopentadienyl |
| tripropylcyclopentadienyl |
| tetrapropylcyclopentadienyl |
| pentapropylcyclopentadienyl (y = 0) |
| butylcyclopentadienyl |
| dibutylcyclopentadienyl |
| tributylcyclopentadienyl |
| tetrabutylcyclopentadienly |
| pentabutylcyclopentadienyl (y = 0) |
| pentylcyclopentadienyl |
| dipentylcyclopentadienyl |
| tripentylcyclopentadienyl |
| tetrapentylcyclopentadienly |
| pentapentylcyclopentadienyl (y = 0) |
| hexylcyclopentadienyl |
| dihexylcyclopentadienyl |
| trihexylcyclopentadienyl |
| tetrahexylcyclopentadienly |
| pentahexylcyclopentadienyl (y = 0) |
| heptylcyclopentadienyl |
| diheptylcyclopentadienyl |
| octylcyclopentadienyl |
| dioctylcyclopentadienyl |
| nonylcyclopentadienyl |
| dinonylcyclopentadienyl |
| decylcyclopentadienyl |
| didecylcyclopentadienyl |
| undecylcyclopentadienyl |
| dodecylcyclopentadienyl |
| tridecylcyclopentadienyl |
| tetradecylcyclopentadienyl |
| pentadecylcyclopentadienyl |
| hexadecylcyclopentadienyl |
| heptadecylcyclopentadienyl |
| octadecylcyclopentadienyl |
| nonadecylcyclopentadienyl |
| eicosylcyclopentadienyl |
| heneicosylcyclopentadienyl |
| docosylcyclopentadienyl |
| tricosylcyclopentadienyl |
| tetracosylcyclopentadienyl |
| pentacosylcyclopentadienyl |
| hexacosylcyclopentadienyl |
| heptacosylcyclopentadienyl |
| octacosylcyclopentadienyl |
| nonacosylcyclopentadienyl |
| triacontylcyclopentadienyl |
| vinylcyclopentadienyl |
| allylcyclopentadienyl |
| propenylcyclopentadienyl |
| butenylcyclopentadienyl |
| propynylcyclopentadienyl |
| butynylcyclopentadienyl |
| cyclopropylcyclopentadienyl |
| cyclobutylcyclopentadienyl |
| cyclopentylcyclopentadienyl |
| cyclohexylcyclopentadienyl |
| phenylcyclopentadienyl |
| (dimethylphenyl)cyclopentadienyl |
| tolylcyclopentadienyl |
| benzylcyclopentadienyl |
| phenethylcyclopentadienyl |
| trimethylsilylcyclopentadienyl |
| trimethylgermylcyclopentadienyl |
| trimethylstannylcyclopentadienyl |
| triethylsilylcyclopentadienyl |
| dimethylethylsilylcyclopentadienyl |
| biphenylcyclopentadienyl |
| pyrenylcyclopentadienyl |
| trifluoromethylcyclopentadienyl |
| trifluoromethylmethylcyclopentadienyl |
| norbornylcyclopentadienyl |
| methylethylcyclopentadienyl |
| methylpropylcyclopentadienyl |
| methylbutylylcyclopentadienyl |
| methylphenylcyclopentadienyl |
| methylcyclohexylcylopentadienyl |
| methyltolylcyclopentadienyl |
| trimethylsilylmethylcylopentadienyl |

TABLE 1-continued

| |
|---|
| methylbenzylcylopentadienyl |
| methylphenethylcylopentadienyl |
| methylvinylcylopentadienyl |
| methylallylcylopentadienyl |
| (benzothiopheneyl)cyclopentadienyl |
| (benzofuranyl)cyclopentadienyl |
| (fluorophenyl)cyclopentadienyl |
| (difluorophenyl)cyclopentadienyl |
| (trifluorophenyl)cyclopentadienyl |
| (tetrafluorophenyl)cyclopentadienyl |
| (pentafluorophenyl)cyclopentadienyl |
| (trifluoromethylphenyl)cyclopentadienyl |
| (thienyl)cyclopentadienyl |
| (furanyl)cyclopentadienyl |
| (pyrrolyl)cyclopentadienyl |
| (phospholyl)cyclopentadienyl |
| (methylthienyl)cyclopentadienyl |
| (methylfuranyl)cyclopentadienyl |
| (methylpyrrolyl)cyclopentadienyl |
| (methylphospholyl)cyclopentadienyl |
| (dimethylthienyl)cyclopentadienyl |
| (dimethylfuranyl)cyclopentadienyl |
| (dimethylpyrrolyl)cyclopentadienyl |
| (dimethylphospholyl)cyclopentadienyl |
| methyl(benzothiopheneyl)cyclopentadienyl |
| methyl(benzofuranyl)cyclopentadienyl |
| methyl(fluorophenyl)cyclopentadienyl |
| methyl(difluorophenyl)cyclopentadienyl |
| methyl(trifluorophenyl)cyclopentadienyl |
| methyl(tetrafluorophenyl)cyclopentadienyl |
| methyl(pentafluorophenyl)cyclopentadienyl |
| methyl(trifluoromethylphenyl)cyclopentadienyl |
| methyl(thienyl)cyclopentadienyl |
| methyl(furanyl)cyclopentadienyl |
| methyl(pyrrolyl)cyclopentadienyl |
| methyl(phospholyl)cyclopentadienyl |
| methyl(methylthienyl)cyclopentadienyl |
| methyl(methylfuranyl)cyclopentadienyl |
| methyl(methylpyrrolyl)cyclopentadienyl |
| methyl(methylphospholyl)cyclopentadienyl |
| methyl(dimethylthienyl)cyclopentadienyl |
| methyl(dimethylfuranyl)cyclopentadienyl |
| methyl(dimethylpyrrolyl)cyclopentadienyl |
| methyl(dimethylphospholyl)cyclopentadienyl |
| fluorenyl |
| methylfluorenyl |
| dimethylfluorenyl |
| trimethylfluorenyl |
| tetramethylfluorenyl |
| ethylfluorenyl |
| diethylfluorenyl |
| triethylfluorenyl |
| tetraethylfluorenyl |
| propylfluorenyl |
| dipropylfluorenyl |
| tripropylfluorenyl |
| tetrapropylfluorenyl |
| butylfluorenyl |
| dibutylfluorenyl |
| tributylfluorenyl |
| tetrabutylfluorenyl |
| pentylfluorenyl |
| dipentylfluorenyl |
| tripentylfluorenyl |
| tetrapentylfluorenyl |
| hexylfluorenyl |
| dihexylfluorenyl |
| trihexylfluorenyl |
| tetrahexylfluorenyl |
| heptylfluorenyl |
| diheptylfluorenyl |
| octylfluorenyl |
| dioctylfluorenyl |
| nonylfluorenyl |
| dinonylfluorenyl |
| decylfluorenyl |
| didecylfluorenyl |
| dodecylfluorenyl |
| didodecylfluorenyl |

TABLE 1-continued

| |
|---|
| trifluoromethylfluorenyl |
| bis(trifluoromethyl)fluorenyl |
| trimethylsilylfluorenyl |
| bis(trimethylsilyl)fluorenyl |
| cyclohexylfluorenyl |
| bis(cyclohexyl)fluorenyl |
| phenylfluorenyl |
| diphenylfluorenyl |
| tolylfluorenyl |
| bis(tolyl)fluorenyl |
| octahydrofluorenyl |
| methyloctahydrofluorenyl |
| dimethyloctahydrofluorenyl |
| trimethyloctahydrofluorenyl |
| tetramethyloctahydrofluorenyl |
| ethyloctahydrofluorenyl |
| diethyloctahydrofluorenyl |
| propyloctahydrofluorenyl |
| dipropyloctahydrofluorenyl |
| butyloctahydrofluorenyl |
| dibutyloctahydrofluorenyl |
| pentyloctahydrofluorenyl |
| dipentyloctahydrofluorenyl |
| hexyloctahydrofluorenyl |
| dihexyloctahydrofluorenyl |
| heptyloctahydrofluorenyl |
| diheptyloctahydrofluorenyl |
| octyloctahydrofluorenyl |
| dioctyloctahydrofluorenyl |
| methyloctahydrodibenzyl[b, h]fluorenyl |
| dimethyloctahydrodibenzyl[b, h]-fluorenyl |
| trimethyloctahydrodibenzyl[b, h]-fluorenyl |
| tetramethyloctahydrodibenzyl[b, h-] fluorenyl |
| pentamethyloctahydrodibenzyl[b, h]-fluorenyl |
| hexamethyloctahydrodibenzyl[b, h]-fluorenyl |
| heptamethyloctahydrodibenzyl[b, h]-fluorenyl |
| octamethyloctahydrodibenzyl[b, h]-fluorenyl |
| (benzothiopheneyl)fluorenyl |
| (benzofuranyl)fluorenyl |
| (fluorophenyl)fluorenyl |
| (difluorophenyl)fluorenyl |
| (trifluorophenyl)fluorenyl |
| (tetrafluorophenyl)fluorenyl |
| (pentafluorophenyl)fluorenyl |
| (trifluoromethylphenyl)fluorenyl |
| (thienyl)fluorenyl |
| (furanyl)fluorenyl |
| (pyrrolyl)fluorenyl |
| (phospholyl)fluorenyl |
| (methylthienyl)fluorenyl |
| (methylfuranyl)fluorenyl |
| (methylpyrrolyl)fluorenyl |
| (methylphospholyl)fluorenyl |
| (dimethylthienyl)fluorenyl |
| (dimethylfuranyl)fluorenyl |
| (dimethylpyrrolyl)fluorenyl |
| (dimethylphospholyl)fluorenyl |
| bis(benzothiopheneyl)fluorenyl |
| bis(benzofuranyl)fluorenyl |
| bis(fluorophenyl)fluorenyl |
| bis(difluorophenyl)fluorenyl |
| bis(trifluorophenyl)fluorenyl |
| bis(tetrafluorophenyl)fluorenyl |
| bis(pentafluorophenyl)fluorenyl |
| bis(trifluoromethylphenyl)fluorenyl |
| bis(thienyl)fluorenyl |
| bis(furanyl)fluorenyl |
| bis(pyrrolyl)fluorenyl |
| bis(phospholyl)fluorenyl |
| bis(methylthienyl)fluorenyl |
| bis(methylfuranyl)fluorenyl |
| bis(methylpyrrolyl)fluorenyl |

TABLE 1-continued

| |
|---|
| bis(methylphospholyl)fluorenyl |
| bis(dimethylthienyl)fluorenyl |
| bis(dimethylfuranyl)fluorenyl |
| bis(dimethylpyrrolyl)fluorenyl |
| bis(dimethylphospholyl)fluorenyl |
| azacyclopentadienyl |
| phosphacyclopentadienyl |
| stibacyclopentadienyl |
| arsacyclopentadienyl |
| boracyclopentadienyl |
| methylazacyclopentadienyl |
| methylphosphacyclopentadienyl |
| methylstibacyclopentadienyl |
| methylarsacyclopentadienyl |
| methylboracyclopentadienyl |
| 1,2-diazacyclopentadienyl |
| 1,2-diphosphacyclopentadienyl |
| 1,2-distibacyclopentadienyl |
| 1,2-diarsacyclopentadienyl |
| 1,2-diboracyclopentadienyl |
| 1,2-azaphosphacyclopentadienyl |
| 1,2-azastibacyclopentadienyl |
| 1,2-azarsacyclopentadienyl |
| 1,2-azaboracyclopentadienyl |
| 1,2-arsaphosphacyclopentadienyl |
| 1,2-arsastibacyclopentadienyl |
| 1,2-arsaboracyclopentadienyl |
| 1,2-boraphosphacyclopentadienyl |
| 1,2-borastibacyclopentadienyl |
| 1,2-phosphastibacyclopentadienyl |
| 1,3-diazacyclopentadienyl |
| 1,3-diphosphacyclopentadienyl |
| 1,3-distibacyclopentadienyl |
| 1,3-diarsacyclopentadienyl |
| 1,3-diboracyclopentadienyl |
| 1,3-azaphosphacyclopentadienyl |
| 1,3-azastibacyclopentadienyl |
| 1,3-azarsacyclopentadienyl |
| 1,3-azaboracyclopentadienyl |
| 1,3-arsaphosphacyclopentadienyl |
| 1,3-arsastibacyclopentadienyl |
| 1,3-arsaboracyclopentadienyl |
| 1,3-boraphosphacyclopentadienyl |
| 1,3-borastibacyclopentadienyl |
| 1,3-phosphastibacyclopentadienyl |
| pentadienyl |
| methylpentadienyl |
| dimethylpentadienyl |
| trimethylpentadienyl |
| tetramethylpentadienyl |
| pentamethylpentadienyl |
| hexamethylpentadienyl |
| heptamethylpentadienyl (y = 0) |
| allyl |
| methylallyl |
| dimethylallyl |
| trimethylallyl |
| tetramethylallyl |
| pentamethylallyl (y = 0) |
| boratabenzene |
| methylboratabenzene |
| phenylboratabenzene |
| N,N-dimethylaminoboratabenzene |
| N,N-diethylaminoboratabenzene |
| N,N-dipropylaminoboratabenzene |
| Hc, $Hc^2$, $Hc^4$, $Hc^6$, $Hc^9$, $Hc^{11}$, and $Hc^{13}$ |
| pyrrol-1-yl |
| methylpyrrol-1-yl |
| dimethylpyrrol-1-yl |
| trimethylpyrrol-1-yl |
| tetramethylpyrrol-1-yl |
| ethylpyrrol-1-yl |
| diethylpyrrol-1-yl |
| triethylpyrrol-1-yl |
| tetraethylpyrrol-1-yl |
| propylpyrrol-1-yl |
| dipropylpyrrol-1-yl |
| tripropylpyrrol-1-yl |

TABLE 1-continued

| |
|---|
| tetrapropylpyrrol-1-yl |
| butylpyrrol-1-yl |
| dibutylpyrrol-1-yl |
| tributylpyrrol-1-yl |
| tetrabutylpyrrol-1-yl |
| pentylpyrrol-1-yl |
| dipentylpyrrol-1-yl |
| tripentylpyrrol-1-yl |
| tetrapentylpyrrol-1-yl |
| hexylpyrrol-1-yl |
| dihexylpyrrol-1-yl |
| trihexylpyrrol-1-yl |
| tetrahexylpyrrol-1-yl |
| heptylpyrrol-1-yl |
| diheptylpyrrol-1-yl |
| triheptylpyrrol-1-yl |
| tetraheptylpyrrol-1-yl |
| octylpyrrol-1-yl |
| dioctylpyrrol-1-yl |
| trioctylpyrrol-1-yl |
| tetraoctylpyrrol-1-yl |
| nonylpyrrol-1-yl |
| dinonylpyrrol-1-yl |
| trinonylpyrrol-1-yl |
| tetranonylpyrrol-1-yl |
| decylpyrrol-1-yl |
| didecylpyrrol-1-yl |
| tridecylpyrrol-1-yl |
| tetradecylpyrrol-1-yl |
| undecylpyrrol-1-yl |
| diundecylpyrrol-1-yl |
| dodecenylpyrrol-1-yl |
| didodecenylpyrrol-1-yl |
| tridecenylpyrrol-1-yl |
| ditridecenylpyrrol-1-yl |
| tetradecenylpyrrol-1-yl |
| ditetradecenylpyrrol-1-yl |
| pentadecenylpyrrol-1-yl |
| dipentadecenylpyrrol-1-yl |
| hexadecenylpyrrol-1-yl |
| dihexadecenylpyrrol-1-yl |
| heptadecenylpyrrol-1-yl |
| diheptadecenylpyrrol-1-yl |
| octadecenylpyrrol-1-yl |
| dioctadecenylpyrrol-1-yl |
| nonadecenylpyrrol-1-yl |
| dinonadecenylpyrrol-1-yl |
| eicosenylpyrrol-1-yl |
| dieicosenylpyrrol-1-yl |
| heneicosenylpyrrol-1-yl |
| diheneicosenylpyrrol-1-yl |
| docosenylpyrrol-1-yl |
| didocosenylpyrrol-1-yl |
| tricosenylpyrrol-1-yl |
| ditricosenylpyrrol-1-yl |
| tetracosenylpyrrol-1-yl |
| ditetracosenylpyrrol-1-yl |
| pentacosenylpyrrol-1-yl |
| dipentacosenylpyrrol-1-yl |
| hexacosenylpyrrol-1-yl |
| dihexacosenylpyrrol-1-yl |
| heptacosenylpyrrol-1-yl |
| diheptacosenylpyrrol-1-yl |
| octacosenylpyrrol-1-yl |
| dioctacosenylpyrrol-1-yl |
| nonacosenylpyrrol-1-yl |
| dinonacosenylpyrrol-1-yl |
| triacontenylpyrrol-1-yl |
| ditriacontenylpyrrol-1-yl |
| ethylmethylpyrrol-1-yl |
| propylmethylpyrrol-1-yl |
| butylmethylpyrrol-1-yl |
| pentylmethylpyrrol-1-yl |
| hexylmethylpyrrol-1-yl |
| heptylmethylpyrrol-1-yl |
| octylmethylpyrrol-1-yl |
| nonylmethylpyrrol-1-yl |
| decylmethylpyrrol-1-yl |
| undecylmethylpyrrol-1-yl |

TABLE 1-continued

| |
|---|
| dodecylmethylpyrrol-1-yl |
| tridecylmethylpyrrol-1-yl |
| tetradecylmethylpyrrol-1-yl |
| pentadecylmethylpyrrol-1-yl |
| hexadecylmethylpyrrol-1-yl |
| heptadecylmethylpyrrol-1-yl |
| octadecylmethylpyrrol-1-yl |
| nonadecylmethylpyrrol-1-yl |
| eicosylmethylpyrrol-1-yl |
| heneicosylmethylpyrrol-1-yl |
| docosylmethylpyrrol-1-yl |
| tricosylmethylpyrrol-1-yl |
| tetracosylmethylpyrrol-1-yl |
| pentacosylmethylpyrrol-1-yl |
| hexacosylmethylpyrrol-1-yl |
| heptacosylmethylpyrrol-1-yl |
| octacosylmethylpyrrol-1-yl |
| nonacosylmethylpyrrol-1-yl |
| triacontylmethylpyrrol-1-yl |
| vinylpyrrol-1-yl |
| propenylpyrrol-1-yl |
| butenylpyrrol-1-yl |
| pentenylpyrrol-1-yl |
| hexenylpyrrol-1-yl |
| cyclopropylpyrrol-1-yl |
| cyclobutylpyrrol-1-yl |
| cyclopentylpyrrol-1-yl |
| cyclohexylpyrrol-1-yl |
| cycloheptylpyrrol-1-yl |
| cyclooctylpyrrol-1-yl |
| cyclononylpyrrol-1-yl |
| cyclodecylpyrrol-1-yl |
| cycloundecylpyrrol-1-yl |
| cyclododecylpyrrol-1-yl |
| cyclotetradecylpyrrol-1-yl |
| cyclopentenylpyrrol-1-yl |
| cyclohexenylpyrrol-1-yl |
| cycloheptenylpyrrol-1-yl |
| cyclooctenylpyrrol-1-yl |
| cyclodecenylpyrrol-1-yl |
| cyclododecenylpyrrol-1-yl |
| methylvinylpyrrol-1-yl |
| methylpropenylpyrrol-1-yl |
| methylbutenylpyrrol-1-yl |
| methylpentenylpyrrol-1-yl |
| methylhexenylpyrrol-1-yl |
| methylcyclopropylpyrrol-1-yl |
| methylcyclobutylpyrrol-1-yl |
| methylcyclopentylpyrrol-1-yl |
| methylcyclohexylpyrrol-1-yl |
| methylcycloheptylpyrrol-1-yl |
| methylcyclooctylpyrrol-1-yl |
| methylcyclononylpyrrol-1-yl |
| methylcyclodecylpyrrol-1-yl |
| methylcycloundecylpyrrol-1-yl |
| methylcyclododecylpyrrol-1-yl |
| methylcyclotetradecylpyrrol-1-yl |
| methylcyclopentenylpyrrol-1-yl |
| methylcyclohexenylpyrrol-1-yl |
| methylcycloheptenylpyrrol-1-yl |
| methylcyclooctenylpyrrol-1-yl |
| methylcyclodecenylpyrrol-1-yl |
| methylcyclododecenylpyrrol-1-yl |
| phenylpyrrol-1-yl |
| tolylpyrrol-1-yl |
| mesitylpyrrol-1-yl |
| (ethylphenyl)pyrrol-1-yl |
| (propylphenyl)pyrrol-1-yl |
| (butylphenyl)pyrrol-1-yl |
| (pentylphenyl)pyrrol-1-yl |
| (hexylphenyl)pyrrol-1-yl |
| (dimethylphenyl)pyrrol-1-yl |
| (trimethylphenyl)pyrrol-1-yl |
| (diethylphenyl)pyrrol-1-yl |
| (diethylmethylphenyl)pyrrol-1-yl |
| (dipropylphenyl)pyrrol-1-yl |
| (dipropylmethylphenyl)pyrrol-1-yl |
| benzylpyrrol-1-yl |
| (phenethyl)pyrrol-1-yl |

TABLE 1-continued

| |
|---|
| napthylpyrrol-1-yl |
| (trifluoromethyl)pyrrol-1-yl |
| methylphenylpyrrol-1-yl |
| methyltolylpyrrol-1-yl |
| methylmesitylpyrrol-1-yl |
| methyl(ethylphenyl)pyrrol-1-yl |
| methyl(propylphenyl)pyrrol-1-yl |
| methyl(butylphenyl)pyrrol-1-yl |
| methyl(pentylphenyl)pyrrol-1-yl |
| methyl(hexylphenyl)pyrrol-1-yl |
| methyl(dimethylphenyl)pyrrol-1-yl |
| methyl(trimethylphenyl)pyrrol-1-yl |
| methyl(diethylphenyl)pyrrol-1-yl |
| methyl(diethylmethylphenyl)pyrrol-1-yl |
| methyl(dipropylphenyl)pyrrol-1-yl |
| methyl(dipropylmethylphenyl)pyrrol-1-yl |
| methylbenzylpyrrol-1-yl |
| methyl(phenethyl)pyrrol-1-yl |
| methylnapthylpyrrol-1-yl |
| methyl(trifluoromethyl)pyrrol-1-yl |
| imidazol-1-yl |
| methylimidazol-1-yl |
| dimethylimidazol-1-yl |
| trimethylimidazol-1-yl |
| ethylimidazol-1-yl |
| propylimidazol-1-yl |
| butylimidazol-1-yl |
| pentylimidazol-1-yl |
| hexylimidazol-1-yl |
| heptylimidazol-1-yl |
| octylimidazol-1-yl |
| nonylimidazol-1-yl |
| decylimidazol-1-yl |
| undecylimidazol-1-yl |
| dodecylimidazol-1-yl |
| methylethylimidazol-1-yl |
| methylpropylimidazol-1-yl |
| methylbutylimidazol-1-yl |
| methylpentylimidazol-1-yl |
| methylhexylimidazol-1-yl |
| methylheptylimidazol-1-yl |
| methyloctylimidazol-1-yl |
| methylnonylimidazol-1-yl |
| methyldecylimidazol-1-yl |
| methylundecylimidazol-1-yl |
| methyldodecylimidazol-1-yl |
| phenylimidazol-1-yl |
| tolylimidazol-1-yl |
| benzylimidazol-1-yl |
| (trifluoromethyl)imidazol-1-yl |
| cyclopropylimidazol-1-yl |
| cyclobutylimidazol-1-yl |
| cyclopentylimidazol-1-yl |
| cyclohexylimidazol-1-yl |
| cycloheptylimidazol-1-yl |
| cyclooctylimidazol-1-yl |
| cyclononylimidazol-1-yl |
| cyclodecylimidazol-1-yl |
| cycloundecylimidazol-1-yl |
| cyclododecylimidazol-1-yl |
| methylphenylimidazol-1-yl |
| methyltolylimidazol-1-yl |
| methylbenzylimidazol-1-yl |
| methyl(trifluoromethyl)imidazol-1-yl |
| methylcyclopropylimidazol-1-yl |
| methylcyclobutylimidazol-1-yl |
| methylcyclopentylimidazol-1-yl |
| methylcyclohexylimidazol-1-yl |
| methylcycloheptylimidazol-1-yl |
| methylcyclooctylimidazol-1-yl |
| methylcyclononylimidazol-1-yl |
| methylcyclodecylimidazol-1-yl |
| methylcycloundecylimidazol-1-yl |
| methylcyclododecylimidazol-1-yl |
| diethylimidazol-1-yl |
| dipropylimidazol-1-yl |
| dibutylimidazol-1-yl |
| dipentylimidazol-1-yl |
| dihexylimidazol-1-yl |

TABLE 1-continued

| |
|---|
| pyrazol-1-yl |
| methylpyrazol-1-yl |
| dimethylpyrazol-1-yl |
| trimethylpyrazol-1-yl |
| ethylpyrazol-1-yl |
| propylpyrazol-1-yl |
| butylpyrazol-1-yl |
| pentylpyrazol-1-yl |
| hexylpyrazol-1-yl |
| heptylpyrazol-1-yl |
| octylpyrazol-1-yl |
| nonylpyrazol-1-yl |
| decylpyrazol-1-yl |
| undecylpyrazol-1-yl |
| dodecylpyrazol-1-yl |
| methylethylpyrazol-1-yl |
| methylpropylpyrazol-1-yl |
| methylbutylpyrazol-1-yl |
| methylpentylpyrazol-1-yl |
| methylhexylpyrazol-1-yl |
| methylheptylpyrazol-1-yl |
| methyloctylpyrazol-1-yl |
| methylnonylpyrazol-1-yl |
| methyldecylpyrazol-1-yl |
| methylundecylpyrazol-1-yl |
| methyldodecylpyrazol-1-yl |
| phenylpyrazol-1-yl |
| tolylpyrazol-1-yl |
| benzylpyrazol-1-yl |
| (trifluoromethyl)pyrazol-1-yl |
| cyclopropylpyrazol-1-yl |
| cyclobutylpyrazol-1-yl |
| cyclopentylpyrazol-1-yl |
| cyclohexylpyrazol-1-yl |
| cycloheptylpyrazol-1-yl |
| cyclooctylpyrazol-1-yl |
| cyclononylpyrazol-1-yl |
| cyclodecylpyrazol-1-yl |
| cycloundecylpyrazol-1-yl |
| cyclododecylpyrazol-1-yl |
| methylphenylpyrazol-1-yl |
| methyltolylpyrazol-1-yl |
| methylbenzylpyrazol-1-yl |
| methyl(trifluoromethyl)pyrazol-1-yl |
| methylcyclopropylpyrazol-1-yl |
| methylcyclobutylpyrazol-1-yl |
| methylcyclopentylpyrazol-1-yl |
| methylcyclohexylpyrazol-1-yl |
| methylcycloheptylpyrazol-1-yl |
| methylcyclooctylpyrazol-1-yl |
| methylcyclononylpyrazol-1-yl |
| methylcyclodecylpyrazol-1-yl |
| methylcycloundecylpyrazol-1-yl |
| methylcyclododecylpyrazol-1-yl |
| diethylpyrazol-1-yl |
| dipropylpyrazol-1-yl |
| dibutylpyrazol-1-yl |
| dipentylpyrazol-1-yl |
| dihexylpyrazol-1-yl |
| triazol-#-yl (# = 1, 2 or 4) |
| methyltriazol-#-yl (# = 1, 2 or 4) |
| dimethyltriazol-#-yl (# = 1, 2 or 4) |
| ethyltriazol-#-yl (# = 1, 2 or 4) |
| propyltriazol-#-yl (# = 1, 2 or 4) |
| butyltriazol-#-yl (# = 1, 2 or 4) |
| pentyltriazol-#-yl (# = 1, 2 or 4) |
| hexyltriazol-#-yl (# = 1, 2 or 4) |
| heptyltriazol-#-yl (# = 1, 2 or 4) |
| octyltriazol-#-yl (# = 1, 2 or 4) |
| nonyltriazol-#-yl (# = 1, 2 or 4) |
| decyltriazol-#-yl (# = 1, 2 or 4) |
| undecyltriazol-#-yl (# = 1, 2 or 4) |
| dodecyltriazol-#-yl (# = 1, 2 or 4) |
| methylethyltriazol-#-yl (# = 1, 2 or 4) |
| methylpropyltriazol-#-yl (# = 1, 2 or 4) |
| methylbutyltriazol-#-yl (# = 1, 2 or 4) |
| methylpentyltriazol-#-yl (# = 1, 2 or 4) |
| methylhexyltriazol-#-yl (# = 1, 2 or 4) |
| methylheptyltriazol-#-yl (# = 1, 2 or 4) |

TABLE 1-continued

| |
|---|
| methyloctyltriazol-#-yl (# = 1, 2 or 4) |
| methylnonyltriazol-#-yl (# = 1, 2 or 4) |
| methyldecyltriazol-#-yl (# = 1, 2 or 4) |
| methylundecyltriazol-#-yl (# = 1, 2 or 4) |
| methyldodecyltriazol-#-yl (# = 1, 2 or 4) |
| phenyltriazol-#-yl (# = 1, 2 or 4) |
| tolyltriazol-#-yl (# = 1, 2 or 4) |
| benzyltriazol-#-yl (# = 1, 2 or 4) |
| (trifluoromethyl)triazol-#-yl (# = 1, 2 or 4) |
| cyclopropyltriazol-#-yl (# = 1, 2 or 4) |
| cyclobutyltriazol-#-yl (# = 1, 2 or 4) |
| cyclopentyltriazol-#-yl (# = 1, 2 or 4) |
| cyclohexyltriazol-#-yl (# = 1, 2 or 4) |
| cycloheptyltriazol-#-yl (# = 1, 2 or 4) |
| cyclooctyltriazol-#-yl (# = 1, 2 or 4) |
| cyclononyltriazol-#-yl (# = 1, 2 or 4) |
| cyclodecyltriazol-#-yl (# = 1, 2 or 4) |
| cycloundecyltriazol-#-yl (# = 1, 2 or 4) |
| cyclododecyltriazol-#-yl (# = 1, 2 or 4) |
| methylphenyltriazol-#-yl (# = 1, 2 or 4) |
| methyltolyltriazol-#-yl (# = 1, 2 or 4) |
| methylbenzyltriazol-#-yl (# = 1, 2 or 4) |
| methyl(trifluoromethyl)triazol-#-yl (# = 1, 2 or 4) |
| methylcyclopropyltriazol-#-yl (# = 1, 2 or 4) |
| methylcyclobutyltriazol-#-yl (# = 1, 2 or 4) |
| methylcyclopentyltriazol-#-yl (# = 1, 2 or 4) |
| methylcyclohexyltriazol-#-yl (# = 1, 2 or 4) |
| methylcycloheptyltriazol-#-yl (# = 1, 2 or 4) |
| methylcyclooctyltriazol-#-yl (# = 1, 2 or 4) |
| methylcyclononyltriazol-#-yl (# = 1, 2 or 4) |
| methylcyclodecyltriazol-#-yl (# = 1, 2 or 4) |
| methylcycloundecyltriazol-#-yl (# = 1, 2 or 4) |
| methylcyclododecyltriazol-#-yl (# = 1, 2 or 4) |
| diethyltriazol-#-yl (# = 1, 2 or 4) |
| dipropyltriazol-#-yl (# = 1, 2 or 4) |
| dibutyltriazol-#-yl (# = 1, 2 or 4) |
| dipentyltriazol-#-yl (# = 1, 2 or 4) |
| dihexyltriazol-#-yl (# = 1, 2 or 4) |
| triphosphol-#-yl (# = 1, 2 or 4) |
| methyltriphosphol-#-yl (# = 1, 2 or 4) |
| dimethyltriphosphol-#-yl (# = 1, 2 or 4) |
| ethyltriphosphol-#-yl (# = 1, 2 or 4) |
| propyltriphosphol-#-yl (# = 1, 2 or 4) |
| butyltriphosphol-#-yl (# = 1, 2 or 4) |
| pentyltriphosphol-#-yl (# = 1, 2 or 4) |
| hexyltriphosphol-#-yl (# = 1, 2 or 4) |
| heptyltriphosphol-#-yl (# = 1, 2 or 4) |
| octyltriphosphol-#-yl (# = 1, 2 or 4) |
| nonyltriphosphol-#-yl (# = 1, 2 or 4) |
| decyltriphosphol-#-yl (# = 1, 2 or 4) |
| undecyltriphosphol-#-yl (# = 1, 2 or 4) |
| dodecyltriphosphol-#-yl (# = 1, 2 or 4) |
| methylethyltriphosphol-#-yl (# = 1, 2 or 4) |
| methylpropyltriphosphol-#-yl (# = 1, 2 or 4) |
| methylbutyltriphosphol-#-yl (# = 1, 2 or 4) |
| methylpentyltriphosphol-#-yl (# = 1, 2 or 4) |
| methylhexyltriphosphol-#-yl (# = 1, 2 or 4) |
| methylheptyltriphosphol-#-yl (# = 1, 2 or 4) |
| methyloctyltriphosphol-#-yl (# = 1, 2 or 4) |
| methylnonyltriphosphol-#-yl (# = 1, 2 or 4) |
| methyldecyltriphosphol-#-yl (# = 1, 2 or 4) |
| methylundecyltriphosphol-#-yl (# = 1, 2 or 4) |
| methyldodecyltriphosphol-#-yl (# = 1, 2 or 4) |
| phenyltriphosphol-#-yl (# = 1, 2 or 4) |
| tolyltriphosphol-#-yl (# = 1, 2 or 4) |
| benzyltriphosphol-#-yl (# = 1, 2 or 4) |
| (trifluoromethyl)triphosphol-#-yl (# = 1, 2 or 4) |
| cyclopropyltriphosphol-#-yl (# = 1, 2 or 4) |
| cyclobutyltriphosphol-#-yl (# = 1, 2 or 4) |
| cyclopentyltriphosphol-#-yl (# = 1, 2 or 4) |
| cyclohexyltriphosphol-#-yl (# = 1, 2 or 4) |
| cycloheptyltriphosphol-#-yl (# = 1, 2 or 4) |
| cyclooctyltriphosphol-#-yl (# = 1, 2 or 4) |
| cyclononyltriphosphol-#-yl (# = 1, 2 or 4) |
| cyclodecyltriphosphol-#-yl (# = 1, 2 or 4) |
| cycloundecyltriphosphol-#-yl (# = 1, 2 or 4) |
| cyclododecyltriphosphol-#-yl (# = 1, 2 or 4) |
| methylphenyltriphosphol-#-yl (# = 1, 2 or 4) |

TABLE 1-continued

| |
|---|
| methyltolyltriphosphol-#-yl (# = 1, 2 or 4) |
| methylbenzyltriphosphol-#-yl (# = 1, 2 or 4) |
| methyl(trifluoromethyl)triphosphol-#-yl (# = 1, 2 or 4) |
| methylcyclopropyltriphosphol-#-yl (# = 1, 2 or 4) |
| methylcyclobutyltriphosphol-#-yl (# = 1, 2 or 4) |
| methylcyclopentyltriphosphol-#-yl (# = 1, 2 or 4) |
| methylcyclohexyltriphosphol-#-yl (# = 1, 2 or 4) |
| methylcycloheptyltriphosphol-#-yl (# = 1, 2 or 4) |
| methylcyclooctyltriphosphol-#-yl (# = 1, 2 or 4) |
| methylcyclononyltriphosphol-#-yl (# = 1, 2 or 4) |
| methylcyclodecyltriphosphol-#-yl (# = 1, 2 or 4) |
| methylcycloundecyltriphosphol-#-yl (# = 1, 2 or 4) |
| methylcyclododecyltriphosphol-#-yl (# = 1, 2 or 4) |
| diethyltriphosphol-#-yl (# = 1, 2 or 4) |
| dipropyltriphosphol-#-yl (# = 1, 2 or 4) |
| dibutyltriphosphol-#-yl (# = 1, 2 or 4) |
| dipentyltriphosphol-#-yl (# = 1, 2 or 4) |
| dihexyltriphosphol-#-yl (# = 1, 2 or 4) |
| phosphol-1-yl |
| methylphosphol-1-yl |
| dimethylphosphol-1-yl |
| trimethylphosphol-1-yl |
| tetramethylphosphol-1-yl |
| ethylphosphol-1-yl |
| propylphosphol-1-yl |
| butylphosphol-1-yl |
| pentylphosphol-1-yl |
| hexylphosphol-1-yl |
| heptylphosphol-1-yl |
| octylphosphol-1-yl |
| nonylphosphol-1-yl |
| decylphosphol-1-yl |
| undecylphosphol-1-yl |
| dodecylphosphol-1-yl |
| methylethylphosphol-1-yl |
| methylpropylphosphol-1-yl |
| methylbutylphosphol-1-yl |
| methylpentylphosphol-1-yl |
| methylhexylphosphol-1-yl |
| methylheptylphosphol-1-yl |
| methyloctylphosphol-1-yl |
| methylnonylphosphol-1-yl |
| methyldecylphosphol-1-yl |
| methylundecylphosphol-1-yl |
| methyldodecylphosphol-1-yl |
| phenylphosphol-1-yl |
| tolylphosphol-1-yl |
| benzylphosphol-1-yl |
| (trifluoromethyl)phosphol-1-yl |
| cyclopropylphosphol-1-yl |
| cyclobutylphosphol-1-yl |
| cyclopentylphosphol-1-yl |
| cyclohexylphosphol-1-yl |
| cycloheptylphosphol-1-yl |
| cyclooctylphosphol-1-yl |
| cyclononylphosphol-1-yl |
| cyclodecylphosphol-1-yl |
| cycloundecylphosphol-1-yl |
| cyclododecylphosphol-1-yl |
| methylphenylphosphol-1-yl |
| methyltolylphosphol-1-yl |
| methylbenzylphosphol-1-yl |
| methyl(trifluoromethyl)phosphol-1-yl |
| methylcyclopropylphosphol-1-yl |
| methylcyclobutylphosphol-1-yl |
| methylcyclopentylphosphol-1-yl |
| methylcyclohexylphosphol-1-yl |
| methylcycloheptylphosphol-1-yl |
| methylcyclooctylphosphol-1-yl |
| methylcyclononylphosphol-1-yl |

TABLE 1-continued

| |
|---|
| methylcyclodecylphosphol-1-yl |
| methylcycloundecylphosphol-1-yl |
| methylcyclododecylphosphol-1-yl |
| diethylphosphol-1-yl |
| dipropylphosphol-1-yl |
| dibutylphosphol-1-yl |
| dipentylphosphol-1-yl |
| dihexylphosphol-1-yl |
| azaphosphol-#-yl (# = 1, 2 or 3) |
| methylazaphosphol-#-yl (# = 1, 2 or 3) |
| dimethylazaphosphol-#-yl (# = 1, 2 or 3) |
| trimethylazaphosphol-#-yl (# = 1, 2 or 3) |
| ethylazaphosphol-#-yl (# = 1, 2 or 3) |
| propylazaphosphol-#-yl (# = 1, 2 or 3) |
| butylazaphosphol-#-yl (# = 1, 2 or 3) |
| pentylazaphosphol-#-yl (# = 1, 2 or 3) |
| hexylazaphosphol-#-yl (# = 1, 2 or 3) |
| heptylazaphosphol-#-yl (# = 1, 2 or 3) |
| octylazaphosphol-#-yl (# = 1, 2 or 3) |
| nonylazaphosphol-#-yl (# = 1, 2 or 3) |
| decylazaphosphol-#-yl (# = 1, 2 or 3) |
| undecylazaphosphol-#-yl (# = 1, 2 or 3) |
| dodecylazaphosphol-#-yl (# = 1, 2 or 3) |
| methylethylazaphosphol-#-yl (# = 1, 2 or 3) |
| methylpropylazaphosphol-#-yl (# = 1, 2 or 3) |
| methylbutylazaphosphol-#-yl (# = 1, 2 or 3) |
| methylpentylazaphosphol-#-yl (# = 1, 2 or 3) |
| methylhexylazaphosphol-#-yl (# = 1, 2 or 3) |
| methylheptylazaphosphol-#-yl (# = 1, 2 or 3) |
| methyloctylazaphosphol-#-yl (# = 1, 2 or 3) |
| methylnonylazaphosphol-#-yl (# = 1, 2 or 3) |
| methyldecylazaphosphol-#-yl (# = 1, 2 or 3) |
| methylundecylazaphosphol-#-yl (# = 1, 2 or 3) |
| methyldodecylazaphosphol-#-yl (# = 1, 2 or 3) |
| phenylazaphosphol-#-yl (# = 1, 2 or 3) |
| tolylazaphosphol-#-yl (# = 1, 2 or 3) |
| benzylazaphosphol-#-yl (# = 1, 2 or 3) |
| (trifluoromethyl)azaphosphol-#-yl (# = 1, 2 or 3) |
| cyclopropylazaphosphol-#-yl (# = 1, 2 or 3) |
| cyclobutylazaphosphol-#-yl (# = 1, 2 or 3) |
| cyclopentylazaphosphol-#-yl (# = 1, 2 or 3) |
| cyclohexylazaphosphol-#-yl (# = 1, 2 or 3) |
| cycloheptylazaphosphol-#-yl (# = 1, 2 or 3) |
| cyclooctylazaphosphol-#-yl (# = 1, 2 or 3) |
| cyclononylazaphosphol-#-yl (# = 1, 2 or 3) |
| cyclodecylazaphosphol-#-yl (# = 1, 2 or 3) |
| cycloundecylazaphosphol-#-yl (# = 1, 2 or 3) |
| cyclododecylazaphosphol-#-yl (# = 1, 2 or 3) |
| methylphenylazaphosphol-#-yl (# = 1, 2 or 3) |
| methyltolylazaphosphol-#-yl (# = 1, 2 or 3) |
| methylbenzylazaphosphol-#-yl (# = 1, 2 or 3) |
| methyl(trifluoromethyl)azaphosphol-#-yl (# = 1, 2 or 3) |
| methylcyclopropylazaphosphol-#-yl (# = 1, 2 or 3) |
| methylcyclobutylazaphosphol-#-yl (# = 1, 2 or 3) |
| methylcyclopentylazaphosphol-#-yl (# = 1, 2 or 3) |
| methylcyclohexylazaphosphol-#-yl (# = 1, 2 or 3) |
| methylcycloheptylazaphosphol-#-yl (# = 1, 2 or 3) |
| methylcyclooctylazaphosphol-#-yl (# = 1, 2 or 3) |
| methylcyclononylazaphosphol-#-yl (# = 1, 2 or 3) |
| methylcyclodecylazaphosphol-#-yl (# = 1, 2 or 3) |
| methylcycloundecylazaphosphol-#-yl (# = 1, 2 or 3) |
| methylcyclododecylazaphosphol-#-yl (# = 1, 2 or 3) |
| diethylazaphosphol-#-yl (# = 1, 2 or 3) |
| dipropylazaphosphol-#-yl (# = 1, 2 or 3) |
| dibutylazaphosphol-#-yl (# = 1, 2 or 3) |
| dipentylazaphosphol-#-yl (# = 1, 2 or 3) |
| dihexylazaphosphol-#-yl (# = 1, 2 or 3) |

TABLE 1-continued

| |
|---|
| diazaphosphol-#-yl (# = 1, 2, 3 or 4) |
| methyldiazaphosphol-#-yl (# = 1, 2, 3 or 4) |
| dimethyldiazaphosphol-#-yl (# = 1, 2, 3 or 4) |
| ethyldiazaphosphol-#-yl (# = 1, 2, 3 or 4) |
| propyldiazaphosphol-#-yl (# = 1, 2, 3 or 4) |
| butyldiazaphosphol-#-yl (# = 1, 2, 3 or 4) |
| pentyldiazaphosphol-#-yl (# = 1, 2, 3 or 4) |
| hexyldiazaphosphol-#-yl (# = 1, 2, 3 or 4) |
| heptyldiazaphosphol-#-yl (# = 1, 2, 3 or 4) |
| octyldiazaphosphol-#-yl (# = 1, 2, 3 or 4) |
| nonyldiazaphosphol-#-yl (# = 1, 2, 3 or 4) |
| decyldiazaphosphol-#-yl (# = 1, 2, 3 or 4) |
| undecyldiazaphosphol-#-yl (# = 1, 2, 3 or 4) |
| dodecyldiazaphosphol-#-yl (# = 1, 2, 3 or 4) |
| methylethyldiazaphosphol-#-yl (# = 1, 2, 3 or 4) |
| methylpropyldiazaphosphol-#-yl (# = 1, 2, 3 or 4) |
| methylbutyldiazaphosphol-#-yl (# = 1, 2, 3 or 4) |
| methylpentyldiazaphosphol-#-yl (# = 1, 2, 3 or 4) |
| methylhexyldiazaphosphol-#-yl (# = 1, 2, 3 or 4) |
| methylheptyldiazaphosphol-#-yl (# = 1, 2, 3 or 4) |
| methyloctyldiazaphosphol-#-yl (# = 1, 2, 3 or 4) |
| methylnonyldiazaphosphol-#-yl (# = 1, 2, 3 or 4) |
| methyldecyldiazaphosphol-#-yl (# = 1, 2, 3 or 4) |
| methylundecyldiazaphosphol-#-yl (# = 1, 2, 3 or 4) |
| methyldodecyidiazaphosphol-#-yl (# = 1, 2, 3 or 4) |
| phenyldiazaphosphol-#-yl (# = 1, 2, 3 or 4) |
| tolyldiazaphosphol-#-yl (# = 1, 2, 3 or 4) |
| benzyldiazaphosphol-#-yl (# = 1, 2, 3 or 4) |
| (trifluoromethyl) diazaphosphol-#-yl (# = 1, 2, 3 or 4) |
| cyclopropyldiazaphosphol-#-yl (# = 1, 2, 3 or 4) |
| cyclobutyldiazaphosphol-#-yl (# = 1, 2, 3 or 4) |
| cyclopentyldiazaphosphol-#-yl (# = 1, 2, 3 or 4) |
| cyclohexyldiazaphosphol-#-yl (# = 1, 2, 3 or 4) |
| cycloheptyldiazaphosphol-#-yl (# = 1, 2, 3 or 4) |
| cyclooctyldiazaphosphol-#-yl (# = 1, 2, 3 or 4) |
| cyclononyldiazaphosphol-#-yl (# = 1, 2, 3 or 4) |
| cyclodecyldiazaphosphol-#-yl (# = 1, 2, 3 or 4) |
| cycloundecyldiazaphosphol-#-yl (# = 1, 2, 3 or 4) |
| cyclododecyldiazaphosphol-#-yl (# = 1, 2, 3 or 4) |
| methylphenyldiazaphosphol-#-yl (# = 1, 2, 3 or 4) |
| methyltolyldiazaphosphol-#-yl (# = 1, 2, 3 or 4) |
| methylbenzyldiazaphosphol-#-yl (# = 1, 2, 3 or 4) |
| methyl(trifluoromethyl)diazaphosphol-#-yl (# = 1, 2, 3 or 4) |
| methylcyclopropyldiazaphosphol-#-yl (# = 1, 2, 3 or 4) |
| methylcyclobutyldiazaphosphol-#-yl (# = 1, 2, 3 or 4) |
| methylcyclopentyldiazaphosphol-#-yl (# = 1, 2, 3 or 4) |
| methylcyclohexyldiazaphosphol-#-yl (# = 1, 2, 3 or 4) |
| methylcycloheptyldiazaphosphol-#-yl (# = 1, 2, 3 or 4) |
| methylcyclooctyldiazaphosphol-#-yl (# = 1, 2, 3 or 4) |
| methylcyclononyldiazaphosphol-#-yl (# = 1, 2, 3 or 4) |
| methylcyclodecyldiazaphosphol-#-yl (# = 1, 2, 3 or 4) |
| methylcycloundecyldiazaphosphol-#-yl (# = 1, 2, 3 or 4) |
| methylcyclododecyldiazaphosphol-#-yl (# = 1, 2, 3 or 4) |
| diethyldiazaphosphol-#-yl (# = 1, 2, 3 or 4) |
| dipropyldiazaphosphol-#-yl (# = 1, 2, 3 or 4) |

TABLE 1-continued

| |
|---|
| dibutyldiazaphosphol-#-yl (# = 1, 2, 3 or 4) |
| dipentyldiazaphosphol-#-yl (# = 1, 2, 3 or 4) |
| dihexyldiazaphosphol-#-yl (# = 1, 2, 3 or 4) |
| azadiphosphol-1-yl |
| methylazadiphosphol-1-yl |
| dimethylazadiphosphol-1-yl |
| ethylazadiphosphol-1-yl |
| propylazadiphosphol-1-yl |
| butylazadiphosphol-1-yl |
| pentylazadiphosphol-1-yl |
| hexylazadiphosphol-1-yl |
| heptylazadiphosphol-1-yl |
| octylazadiphosphol-1-yl |
| nonylazadiphosphol-1-yl |
| decylazadiphosphol-1-yl |
| undecylazadiphosphol-1-yl |
| dodecylazadiphosphol-1-yl |
| methylethylazadiphosphol-1-yl |
| methylpropylazadiphosphol-1-yl |
| methylbutylazadiphosphol-1-yl |
| methylpentylazadiphosphol-1-yl |
| methylhexylazadiphosphol-1-yl |
| methylheptylazadiphosphol-1-yl |
| methyloctylazadiphosphol-1-yl |
| methylnonylazadiphosphol-1-yl |
| methyldecylazadiphosphol-1-yl |
| methylundecylazadiphosphol-1-yl |
| methyldodecylazadiphosphol-1-yl |
| phenylazadiphosphol-1-yl |
| tolylazadiphosphol-1-yl |
| benzylazadiphosphol-1-yl |
| (trifluoromethyl)azadiphosphol-1-yl |
| cyclopropylazadiphosphol-1-yl |
| cyclobutylazadiphosphol-1-yl |
| cyclopentylazadiphosphol-1-yl |
| cyclohexylazadiphosphol-1-yl |
| cycloheptylazadiphosphol-1-yl |
| cyclooctylazadiphosphol-1-yl |
| cyclononylazadiphosphol-1-yl |
| cyclodecylazadiphosphol-1-yl |
| cycloundecylazadiphosphol-1-yl |
| cyclododecylazadiphosphol-1-yl |
| methylphenylazadiphosphol-1-yl |
| methyltolylazadiphosphol-1-yl |
| methylbenzylazadiphosphol-1-yl |
| methyl(trifluoromethyl)azadiphosphol-1-yl |
| methylcyclopropylazadiphosphol-1-yl |
| methylcyclobutylazadiphosphol-1-yl |
| methylcyclopentylazadiphosphol-1-yl |
| methylcyclohexylazadiphosphol-1-yl |
| methylcycloheptylazadiphosphol-1-yl |
| methylcyclooctylazadiphosphol-1-yl |
| methylcyclononylazadiphosphol-1-yl |
| methylcyclodecylazadiphosphol-1-yl |
| methylcycloundecylazadiphosphol-1-yl |
| methylcyclododecylazadiphosphol-1-yl |
| diethylazadiphosphol-1-yl |
| dipropylazadiphosphol-1-yl |
| dibutylazadiphosphol-1-yl |
| dipentylazadiphosphol-1-yl |
| dihexylazadiphosphol-1-yl |
| indol-1-yl |
| methylindol-1-yl |
| dimethylindol-1-yl |
| trimethylindol-1-yl |
| tetramethylindol-1-yl |
| pentamethylindol-1-yl |
| hexamethylindol-1-yl |
| ethylindol-1-yl |
| propylindol-1-yl |
| butylindol-1-yl |
| pentylindol-1-yl |
| hexylindol-1-yl |
| heptylindol-1-yl |
| octylindol-1-yl |
| nonylindol-1-yl |
| decylindol-1-yl |
| undecylindol-1-yl |
| dodecylindol-1-yl |

TABLE 1-continued

| |
|---|
| methylethylindol-1-yl |
| methylpropylindol-1-yl |
| methylbutylindol-1-yl |
| methylpentylindol-1-yl |
| methylhexylindol-1-yl |
| methylheptylindol-1-yl |
| methyloctylindol-1-yl |
| methylnonylindol-1-yl |
| methyldecylindol-1-yl |
| methylundecylindol-1-yl |
| methyldodecylindol-1-yl |
| phenylindol-1-yl |
| tolylindol-1-yl |
| benzylindol-1-yl |
| (trifluoromethyl)indol-1-yl |
| cyclopropylindol-1-yl |
| cyclobutylindol-1-yl |
| cyclopentylindol-1-yl |
| cyclohexylindol-1-yl |
| cycloheptylindol-1-yl |
| cyclooctylindol-1-yl |
| cyclononylindol-1-yl |
| cyclodecylindol-1-yl |
| cycloundecylindol-1-yl |
| cyclododecylindol-1-yl |
| methylphenylindol-1-yl |
| methyltolylindol-1-yl |
| methylbenzylindol-1-yl |
| methyl(trifluoromethyl)indol-1-yl |
| methylcyclopropylindol-1-yl |
| methylcyclobutylindol-1-yl |
| methylcyclopentylindol-1-yl |
| methylcyclohexylindol-1-yl |
| methylcycloheptylindol-1-yl |
| methylcyclooctylindol-1-yl |
| methylcyclononylindol-1-yl |
| methylcyclodecylindol-1-yl |
| methylcycloundecylindol-1-yl |
| methylcyclododecylindol-1-yl |
| diethylindol-1-yl |
| dipropylindol-1-yl |
| dibutylindol-1-yl |
| dipentylindol-1-yl |
| dihexylindol-1-yl |
| isoindol-2-yl |
| methylisoindol-2-yl |
| dimethylisoindol-2-yl |
| trimethylisoindol-2-yl |
| tetramethylisoindol-2-yl |
| pentamethylisoindol-2-yl |
| hexamethylisoindol-2-yl |
| ethylisoindol-2-yl |
| propylisoindol-2-yl |
| butylisoindol-2-yl |
| pentylisoindol-2-yl |
| hexylisoindol-2-yl |
| heptylisoindol-2-yl |
| octylisoindol-2-yl |
| nonylisoindol-2-yl |
| decylisoindol-2-yl |
| undecylisoindol-2-yl |
| dodecylisoindol-2-yl |
| methylethylisoindol-2-yl |
| methylpropylisoindol-2-yl |
| methylbutylisoindol-2-yl |
| methylpentylisoindol-2-yl |
| methylhexylisoindol-2-yl |
| methylheptylisoindol-2-yl |
| methyloctylisoindol-2-yl |
| methylnonylisoindol-2-yl |
| methyldecylisoindol-2-yl |
| methylundecylisoindol-2-yl |
| methyldodecylisoindol-2-yl |
| phenylisoindol-2-yl |
| tolylisoindol-2-yl |
| benzylisoindol-2-yl |
| (trifluoromethyl) isoindol-2-yl |
| cyclopropylisoindol-2-yl |
| cyclobutylisoindol-2-yl |

TABLE 1-continued

| |
|---|
| cyclopentylisoindol-2-yl |
| cyclohexylisoindol-2-yl |
| cycloheptylisoindol-2-yl |
| cyclooctylisoindol-2-yl |
| cyclononylisoindol-2-yl |
| cyclodecylisoindol-2-yl |
| cycloundecylisoindol-2-yl |
| cyclododecylisoindol-2-yl |
| methylphenylisoindol-2-yl |
| methyltolylisoindol-2-yl |
| methylbenzylisoindol-2-yl |
| methyl(trifluoromethyl)isoindol-2-yl |
| methylcyclopropylisoindol-2-yl |
| methylcyclobutylisoindol-2-yl |
| methylcyclopentylisoindol-2-yl |
| methylcyclohexylisoindol-2-yl |
| methylcycloheptylisoindol-2-yl |
| methylcyclooctylisoindol-2-yl |
| methylcyclononylisoindol-2-yl |
| methylcyclodecylisoindol-2-yl |
| methylcycloundecylisoindol-2-yl |
| methylcyclododecylisoindol-2-yl |
| diethylisoindol-2-yl |
| dipropylisoindol-2-yl |
| dibutylisoindol-2-yl |
| dipentylisoindol-2-yl |
| dihexylisoindol-2-yl |
| isophosphindol-2-yl |
| methylisophosphindol-2-yl |
| dimethylisophosphindol-2-yl |
| trimethylisophosphindol-2-yl |
| tetramethylisophosphindol-2-yl |
| pentamethylisophosphindol-2-yl |
| hexamethylisophosphindol-2-yl |
| ethylisophosphindol-2-yl |
| propylisophosphindol-2-yl |
| butylisophosphindol-2-yl |
| pentylisophosphindol-2-yl |
| hexylisophosphindol-2-yl |
| heptylisophosphindol-2-yl |
| octylisophosphindol-2-yl |
| nonylisophosphindol-2-yl |
| decylisophosphindol-2-yl |
| undecylisophosphindol-2-yl |
| dodecylisophosphindol-2-yl |
| methylethylisophosphindol-2-yl |
| methylpropylisophosphindol-2-yl |
| methylbutylisophosphindol-2-yl |
| methylpentylisophosphindol-2-yl |
| methylhexylisophosphindol-2-yl |
| methylheptylisophosphindol-2-yl |
| methyloctylisophosphindol-2-yl |
| methylnonylisophosphindol-2-yl |
| methyldecylisophosphindol-2-yl |
| methylundecylisophosphindol-2-yl |
| methyldodecylisophosphindol-2-yl |
| phenylisophosphindol-2-yl |
| tolylisophosphindol-2-yl |
| benzylisophosphindol-2-yl |
| (trifluoromethyl)isophosphindol-2-yl |
| cyclopropylisophosphindol-2-yl |
| cyclobutylisophosphindol-2-yl |
| cyclopentylisophosphindol-2-yl |
| cyclohexylisophosphindol-2-yl |
| cycloheptylisophosphindol-2-yl |
| cyclooctylisophosphindol-2-yl |
| cyclononylisophosphindol-2-yl |
| cyclodecylisophosphindol-2-yl |
| cycloundecylisophosphindol-2-yl |
| cyclododecylisophosphindol-2-yl |
| methylphenylisophosphindol-2-yl |
| methyltolylisophosphindol-2-yl |
| methylbenzylisophosphindol-2-yl |
| methyl(trifluoromethyl) isophosphindol-2-yl |
| methylcyclopropylisophosphindol-2-yl |
| methylcyclobutylisophosphindol-2-yl |
| methylcyclopentylisophosphindol-2-yl |
| methylcyclohexylisophosphindol-2-yl |
| methylcycloheptylisophosphindol-2-yl |

TABLE 1-continued

| |
|---|
| methylcyclooctylisophosphindol-2-yl |
| methylcyclononylisophosphindol-2-yl |
| methylcyclodecylisophosphindol-2-yl |
| methylcycloundecylisophosphindol-2-yl |
| methylcyclododecylisophosphindol-2-yl |
| diethylisophosphindol-2-yl |
| dipropylisophosphindol-2-yl |
| dibutylisophosphindol-2-yl |
| dipentylisophosphindol-2-yl |
| dihexylisophosphindol-2-yl |
| carbazol-9-yl |
| methylcarbazol-9-yl |
| dimethylcarbazol-9-yl |
| trimethylcarbazol-9-yl |
| tetramethylcarbazol-9-yl |
| pentamethylcarbazol-9-yl |
| hexamethylcarbazol-9-yl |
| heptamethylcarbazol-9-yl |
| octamethylcarbazol-9-yl |
| ethylcarbazol-9-yl |
| propylcarbazol-9-yl |
| butylcarbazol-9-yl |
| pentylcarbazol-9-yl |
| hexylcarbazol-9-yl |
| heptylcarbazol-9-yl |
| octylcarbazol-9-yl |
| nonylcarbazol-9-yl |
| decylcarbazol-9-yl |
| undecylcarbazol-9-yl |
| dodecylcarbazol-9-yl |
| methylethylcarbazol-9-yl |
| methylpropylcarbazol-9-yl |
| methylbutylcarbazol-9-yl |
| methylpentylcarbazol-9-yl |
| methylhexylcarbazol-9-yl |
| methylheptylcarbazol-9-yl |
| methyloctylcarbazol-9-yl |
| methylnonylcarbazol-9-yl |
| methyldecylcarbazol-9-yl |
| methylundecylcarbazol-9-yl |
| methyldodecylcarbazol-9-yl |
| phenylcarbazol-9-yl |
| tolylcarbazol-9-yl |
| benzylcarbazol-9-yl |
| (trifluoromethyl)carbazol-9-yl |
| cyclopropylcarbazol-9-yl |
| cyclobutylcarbazol-9-yl |
| cyclopentylcarbazol-9-yl |
| cyclohexylcarbazol-9-yl |
| cycloheptylcarbazol-9-yl |
| cyclooctylcarbazol-9-yl |
| cyclononylcarbazol-9-yl |
| cyclodecylcarbazol-9-yl |
| cycloundecylcarbazol-9-yl |
| cyclododecylcarbazol-9-yl |
| methylphenylcarbazol-9-yl |
| methyltolylcarbazol-9-yl |
| methylbenzylcarbazol-9-yl |
| methyl(trifluoromethyl)carbazol-9-yl |
| methylcyclopropylcarbazol-9-yl |
| methylcyclobutylcarbazol-9-yl |
| methylcyclopentylcarbazol-9-yl |
| methylcyclohexylcarbazol-9-yl |
| methylcycloheptylcarbazol-9-yl |
| methylcyclooctylcarbazol-9-yl |
| methylcyclononylcarbazol-9-yl |
| methylcyclodecylcarbazol-9-yl |
| methylcycloundecylcarbazol-9-yl |
| methylcyclododecylcarbazol-9-yl |
| diethylcarbazol-9-yl |
| dipropylcarbazol-9-yl |
| dibutylcarbazol-9-yl |
| dipentylcarbazol-9-yl |
| dihexylcarbazol-9-yl |
| 4,5,6,7-tetrahyroindol-1-yl |
| methyl-4,5,6,7-tetrahyroindol-1-yl |
| dimethyl-4,5,6,7-tetrahyroindol-1-yl |
| ethyl-4,5,6,7-tetrahyroindol-1-yl |
| propyl-4,5,6,7-tetrahyroindol-1-yl |

TABLE 1-continued

| |
|---|
| butyl-4,5,6,7-tetrahyroindol-1-yl |
| pentyl-4,5,6,7-tetrahyroindol-1-yl |
| hexyl-4,5,6,7-tetrahyroindol-1-yl |
| heptyl-4,5,6,7-tetrahyroindol-1-yl |
| octyl-4,5,6,7-tetrahyroindol-1-yl |
| nonyl-4,5,6,7-tetrahyroindol-1-yl |
| decyl-4,5,6,7-tetrahyroindol-1-yl |
| undecyl-4,5,6,7-tetrahyroindol-1-yl |
| dodecyl-4,5,6,7-tetrahyroindol-1-yl |
| methylethyl-4,5,6,7-tetrahyroindol-1-yl |
| methylpropyl-4,5,6,7-tetrahyroindol-1-yl |
| methylbutyl-4,5,6,7-tetrahyroindol-1-yl |
| methylpentyl-4,5,6,7-tetrahyroindol-1-yl |
| methylhexyl-4,5,6,7-tetrahyroindol-1-yl |
| methylheptyl-4,5,6,7-tetrahyroindol-1-yl |
| methyloctyl-4,5,6,7-tetrahyroindol-1-yl |
| methylnonyl-4,5,6,7-tetrahyroindol-1-yl |
| methyldecyl-4,5,6,7-tetrahyroindol-1-yl |
| methylundecyl-4,5,6,7-tetrahyroindol-1-yl |
| methyldodecyl-4,5,6,7-tetrahyroindol-1-yl |
| phenyl-4,5,6,7-tetrahyroindol-1-yl |
| tolyl-4,5,6,7-tetrahyroindol-1-yl |
| benzyl-4,5,6,7-tetrahyroindol-1-yl |
| (trifluoromethyl)-4,5,6,7-tetrahyroindol-1-yl |
| cyclopropyl-4,5,6,7-tetrahyroindol-1-yl |
| cyclobutyl-4,5,6,7-tetrahyroindol-1-yl |
| cyclopentyl-4,5,6,7-tetrahyroindol-1-yl |
| cyclohexyl-4,5,6,7-tetrahyroindol-1-yl |
| cycloheptyl-4,5,6,7-tetrahyroindol-1-yl |
| cyclooctyl-4,5,6,7-tetrahyroindol-1-yl |
| cyclononyl-4,5,6,7-tetrahyroindol-1-yl |
| cyclodecyl-4,5,6,7-tetrahyroindol-1-yl |
| cycloundecyl-4,5,6,7-tetrahyroindol-1-yl |
| cyclododecyl-4,5,6,7-tetrahyroindol-1-yl |
| methylphenyl-4,5,6,7-tetrahyroindol-1-yl |
| methyltolyl-4,5,6,7-tetrahyroindol-1-yl |
| methylbenzyl-4,5,6,7-tetrahyroindol-1-yl |
| methyl(trifluoromethyl)-4,5,6,7-tetrahyroindol-1-yl |
| methylcyclopropyl-4,5,6,7-tetrahyroindol-1-yl |
| methylcyclobutyl-4,5,6,7-tetrahyroindol-1-yl |
| methylcyclopentyl-4,5,6,7-tetrahyroindol-1-yl |
| methylcyclohexyl-4,5,6,7-tetrahyroindol-1-yl |
| methylcycloheptyl-4,5,6,7-tetrahyroindol-1-yl |
| methylcyclooctyl-4,5,6,7-tetrahyroindol-1-yl |
| methylcyclononyl-4,5,6,7-tetrahyroindol-1-yl |
| methylcyclodecyl-4,5,6,7-tetrahyroindol-1-yl |
| methylcycloundecyl-4,5,6,7-tetrahyroindol-1-yl |
| methylcyclododecyl-4,5,6,7-tetrahyroindol-1-yl |
| diethyl-4,5,6,7-tetrahyroindol-1-yl |
| dipropyl-4,5,6,7-tetrahyroindol-1-yl |
| dibutyl-4,5,6,7-tetrahyroindol-1-yl |
| dipentyl-4,5,6,7-tetrahyroindol-1-yl |
| dihexyl-4,5,6,7-tetrahyroindol-1-yl |
| phosphindol-1-yl |
| methylphosphindol-1-yl |
| dimethylphosphindol-1-yl |
| trimethylphosphindol-1-yl |
| tetramethylphosphindol-1-yl |
| pentamethylphosphindol-1-yl |
| hexamethylphosphindol-1-yl |
| ethylphosphindol-1-yl |
| propylphosphindol-1-yl |
| butylphosphindol-1-yl |
| pentylphosphindol-1-yl |
| hexylphosphindol-1-yl |
| heptylphosphindol-1-yl |
| octylphosphindol-1-yl |
| nonylphosphindol-1-yl |
| decylphosphindol-1-yl |
| undecylphosphindol-1-yl |
| dodecylphosphindol-1-yl |
| methylethylphosphindol-1-yl |
| methylpropylphosphindol-1-yl |
| methylbutylphosphindol-1-yl |
| methylpentylphosphindol-1-yl |
| methylhexylphosphindol-1-yl |
| methylheptylphosphindol-1-yl |
| methyloctylphosphindol-1-yl |

TABLE 1-continued

| |
|---|
| methylnonylphosphindol-1-yl |
| methyldecylphosphindol-1-yl |
| methylundecylphosphindol-1-yl |
| methyldodecylphosphindol-1-yl |
| phenylphosphindol-1-yl |
| tolylphosphindol-1-yl |
| benzylphosphindol-1-yl |
| (trifluoromethyl)phosphindol-1-yl |
| cyclopropylphosphindol-1-yl |
| cyclobutylphosphindol-1-yl |
| cyclopentylphosphindol-1-yl |
| cyclohexylphosphindol-1-yl |
| cycloheptylphosphindol-1-yl |
| cyclooctylphosphindol-1-yl |
| cyclononylphosphindol-1-yl |
| cyclodecylphosphindol-1-yl |
| cycloundecylphosphindol-1-yl |
| cyclododecylphosphindol-1-yl |
| methylphenylphosphindol-1-yl |
| methyltolylphosphindol-1-yl |
| methylbenzylphosphindol-1-yl |
| methyl(trifluoromethyl)phosphindol-1-yl |
| methylcyclopropylphosphindol-1-yl |
| methylcyclobutylphosphindol-1-yl |
| methylcyclopentylphosphindol-1-yl |
| methylcyclohexylphosphindol-1-yl |
| methylcycloheptylphosphindol-1-yl |
| methylcyclooctylphosphindol-1-yl |
| methylcyclononylphosphindol-1-yl |
| methylcyclodecylphosphindol-1-yl |
| methylcycloundecylphosphindol-1-yl |
| methylcyclododecylphosphindol-1-yl |
| diethylphosphindol-1-yl |
| dipropylphosphindol-1-yl |
| dibutylphosphindol-1-yl |
| dipentylphosphindol-1-yl |
| dihexylphosphindol-1-yl |
| 1,2,3,4-tetrahydrocarbazol-9-yl |
| methyl-1,2,3,4-tetrahydrocarbazol-9-yl |
| dimethyl-1,2,3,4-tetrahydrocarbazol-9-yl |
| trimethyl-1,2,3,4-tetrahydrocarbazol-9-yl |
| tetramethyl-1,2,3,4-tetrahydrocarbazol-9-yl |
| ethyl-1,2,3,4-tetrahydrocarbazol-9-yl |
| propyl-1,2,3,4-tetrahydrocarbazol-9-yl |
| butyl-1,2,3,4-tetrahydrocarbazol-9-yl |
| pentyl-1,2,3,4-tetrahydrocarbazol-9-yl |
| hexyl-1,2,3,4-tetrahydrocarbazol-9-yl |
| heptyl-1,2,3,4-tetrahydrocarbazol-9-yl |
| octyl-1,2,3,4-tetrahydrocarbazol-9-yl |
| nonyl-1,2,3,4-tetrahydrocarbazol-9-yl |
| decyl-1,2,3,4-tetrahydrocarbazol-9-yl |
| undecyl-1,2,3,4-tetrahydrocarbazol-9-yl |
| dodecyl-1,2,3,4-tetrahydrocarbazol-9-yl |
| methylethyl-1,2,3,4-tetrahydrocarbazol-9-yl |
| methylpropyl-1,2,3,4-tetrahydrocarbazol-9-yl |
| methylbutyl-1,2,3,4-tetrahydrocarbazol-9-yl |
| methylpentyl-1,2,3,4-tetrahydrocarbazol-9-yl |
| methylhexyl-1,2,3,4-tetrahydrocarbazol-9-yl |
| methylheptyl-1,2,3,4-tetrahydrocarbazol-9-yl |
| methyloctyl-1,2,3,4-tetrahydrocarbazol-9-yl |
| methylnonyl-1,2,3,4-tetrahydrocarbazol-9-yl |
| methyldecyl-1,2,3,4-tetrahydrocarbazol-9-yl |
| methylundecyl-1,2,3,4-tetrahydrocarbazol-9-yl |
| methyldodecyl-1,2,3,4-tetrahydrocarbazol-9-yl |
| phenyl-1,2,3,4-tetrahydrocarbazol-9-yl |
| tolyl-1,2,3,4-tetrahydrocarbazol-9-yl |
| benzyl-1,2,3,4-tetrahydrocarbazol-9-yl |
| (trifluoromethyl)-1,2,3,4-tetrahydrocarbazol-9-yl |
| cyclopropyl-1,2,3,4-tetrahydrocarbazol-9-yl |
| cyclobutyl-1,2,3,4-tetrahydrocarbazol-9-yl |
| cyclopentyl-1,2,3,4-tetrahydrocarbazol-9-yl |
| cyclohexyl-1,2,3,4-tetrahydrocarbazol-9-yl |
| cycloheptyl-1,2,3,4-tetrahydrocarbazol-9-yl |
| cyclooctyl-1,2,3,4-tetrahydrocarbazol-9-yl |
| cyclononyl-1,2,3,4-tetrahydrocarbazol-9-yl |
| cyclodecyl-1,2,3,4-tetrahydrocarbazol-9-yl |
| cycloundecyl-1,2,3,4-tetrahydrocarbazol-9-yl |
| cyclododecyl-1,2,3,4-tetrahydrocarbazol-9-yl |

TABLE 1-continued

| |
|---|
| methylphenyl-1,2,3,4-tetrahydrocarbazol-9-yl |
| methyltolyl-1,2,3,4-tetrahydrocarbazol-9-yl |
| methylbenzyl-1,2,3,4-tetrahydrocarbazol-9-yl |
| methyl(trifluoromethyl)-1,2,3,4-tetrahydrocarbazol-9-yl |
| methylcyclopropyl-1,2,3,4-tetrahydrocarbazol-9-yl |
| methylcyclobutyl-1,2,3,4-tetrahydrocarbazol-9-yl |
| methylcyclopentyl-1,2,3,4-tetrahydrocarbazol-9-yl |
| methylcyclohexyl-1,2,3,4-tetrahydrocarbazol-9-yl |
| methylcycloheptyl-1,2,3,4-tetrahydrocarbazol-9-yl |
| methylcyclooctyl-1,2,3,4-tetrahydrocarbazol-9-yl |
| methylcyclononyl-1,2,3,4-tetrahydrocarbazol-9-yl |
| methylcyclodecyl-1,2,3,4-tetrahydrocarbazol-9-yl |
| methylcycloundecyl-1,2,3,4-tetrahydrocarbazol-9-yl |
| methylcyclododecyl-1,2,3,4-tetrahydrocarbazol-9-yl |
| diethyl-1,2,3,4-tetrahydrocarbazol-9-yl |
| dipropyl-1,2,3,4-tetrahydrocarbazol-9-yl |
| dibutyl-1,2,3,4-tetrahydrocarbazol-9-yl |
| dipentyl-1,2,3,4-tetrahydrocarbazol-9-yl |
| dihexyl-1,2,3,4-tetrahydrocarbazol-9-yl |
| benzoimidazol-1-yl |
| methylbenzoimidazol-1-yl |
| dimethylbenzoimidazol-1-yl |
| trimethylbenzoimidazol-1-yl |
| tetramethylbenzoimidazol-1-yl |
| pentamethylbenzoimidazol-1-yl |
| ethylbenzoimidazol-1-yl |
| propylbenzoimidazol-1-yl |
| butylbenzoimidazol-1-yl |
| pentylbenzoimidazol-1-yl |
| hexylbenzoimidazol-1-yl |
| heptylbenzoimidazol-1-yl |
| octylbenzoimidazol-1-yl |
| nonylbenzoimidazol-1-yl |
| decylbenzoimidazol-1-yl |
| undecylbenzoimidazol-1-yl |
| dodecylbenzoimidazol-1-yl |
| methylethylbenzoimidazol-1-yl |
| methylpropylbenzoimidazol-1-yl |
| methylbutylbenzoimidazol-1-yl |
| methylpentylbenzoimidazol-1-yl |
| methylhexylbenzoimidazol-1-yl |
| methylheptylbenzoimidazol-1-yl |
| methyloctylbenzoimidazol-1-yl |
| methylnonylbenzoimidazol-1-yl |
| methyldecylbenzoimidazol-1-yl |
| methylundecylbenzoimidazol-1-yl |
| methyldodecylbenzoimidazol-1-yl |
| phenylbenzoimidazol-1-yl |
| tolylbenzoimidazol-1-yl |
| benzylbenzoimidazol-1-yl |
| (trifluoromethyl)benzoimidazol-1-yl |
| cyclopropylbenzoimidazol-1-yl |
| cyclobutylbenzoimidazol-1-yl |
| cyclopentylbenzoimidazol-1-yl |
| cyclohexylbenzoimidazol-1-yl |
| cycloheptylbenzoimidazol-1-yl |
| cyclooctylbenzoimidazol-1-yl |
| cyclononylbenzoimidazol-1-yl |
| cyclodecylbenzoimidazol-1-yl |
| cycloundecylbenzoimidazol-1-yl |
| cyclododecylbenzoimidazol-1-yl |
| methylphenylbenzoimidazol-1-yl |
| methyltolylbenzoimidazol-1-yl |
| methylbenzylbenzoimidazol-1-yl |
| methyl(trifluoromethyl)benzoimidazol-1-yl |
| methylcyclopropylbenzoimidazol-1-yl |
| methylcyclobutylbenzoimidazol-1-yl |
| methylcyclopentylbenzoimidazol-1-yl |

TABLE 1-continued

| |
|---|
| methylcyclohexylbenzoimidazol-1-yl |
| methylcycloheptylbenzoimidazol-1-yl |
| methylcyclooctylbenzoimidazol-1-yl |
| methylcyclononylbenzoimidazol-1-yl |
| methylcyclodecylbenzoimidazol-1-yl |
| methylcycloundecylbenzoimidazol-1-yl |
| methylcyclododecylbenzoimidazol-1-yl |
| diethylbenzoimidazol-1-yl |
| dipropylbenzoimidazol-1-yl |
| dibutylbenzoimidazol-1-yl |
| dipentylbenzoimidazol-1-yl |
| dihexylbenzoimidazol-1-yl |
| indazol-1-yl |
| methylindazol-1-yl |
| dimethylindazol-1-yl |
| trimethylindazol-1-yl |
| tetramethylindazol-1-yl |
| pentamethylindazol-1-yl |
| ethylindazol-1-yl |
| propylindazol-1-yl |
| butylindazol-1-yl |
| pentylindazol-1-yl |
| hexylindazol-1-yl |
| heptylindazol-1-yl |
| octylindazol-1-yl |
| nonylindazol-1-yl |
| decylindazol-1-yl |
| undecylindazol-1-yl |
| dodecylindazol-1-yl |
| methylethylindazol-1-yl |
| methylpropylindazol-1-yl |
| methylbutylindazol-1-yl |
| methylpentylindazol-1-yl |
| methylhexylindazol-1-yl |
| methylheptylindazol-1-yl |
| methyloctylindazol-1-yl |
| methylnonylindazol-1-yl |
| methyldecylindazol-1-yl |
| methylundecylindazol-1-yl |
| methyldodecylindazol-1-yl |
| phenylindazol-1-yl |
| tolylindazol-1-yl |
| benzylindazol-1-yl |
| (trifluoromethyl)indazol-1-yl |
| cyclopropylindazol-1-yl |
| cyclobutylindazol-1-yl |
| cyclopentylindazol-1-yl |
| cyclohexylindazol-1-yl |
| cycloheptylindazol-1-yl |
| cyclooctylindazol-1-yl |
| cyclononylindazol-1-yl |
| cyclodecylindazol-1-yl |
| cycloundecylindazol-1-yl |
| cyclododecylindazol-1-yl |
| methylphenylindazol-1-yl |
| methyltolylindazol-1-yl |
| methylbenzylindazol-1-yl |
| methyl(trifluoromethyl)indazol-1-yl |
| methylcyclopropylindazol-1-yl |
| methylcyclobutylindazol-1-yl |
| methylcyclopentylindazol-1-yl |
| methylcyclohexylindazol-1-yl |
| methylcycloheptylindazol-1-yl |
| methylcyclooctylindazol-1-yl |
| methylcyclononylindazol-1-yl |
| methylcyclodecylindazol-1-yl |
| methylcycloundecylindazol-1-yl |
| methylcyclododecylindazol-1-yl |
| diethylindazol-1-yl |
| dipropylindazol-1-yl |
| dibutylindazol-1-yl |
| dipentylindazol-1-yl |
| dihexylindazol-1-yl |
| benzotriazol-1-yl |
| methylbenzotriazol-1-yl |
| dimethylbenzotriazol-1-yl |
| trimethylbenzotriazol-1-yl |
| tetramethylbenzotriazol-1-yl |
| ethylbenzotriazol-1-yl |

TABLE 1-continued

| |
|---|
| propylbenzotriazol-1-yl |
| butylbenzotriazol-1-yl |
| pentylbenzotriazol-1-yl |
| hexylbenzotriazol-1-yl |
| heptylbenzotriazol-1-yl |
| octylbenzotriazol-1-yl |
| nonylbenzotriazol-1-yl |
| decylbenzotriazol-1-yl |
| undecylbenzotriazol-1-yl |
| dodecylbenzotriazol-1-yl |
| methylethylbenzotriazol-1-yl |
| methylpropylbenzotriazol-1-yl |
| methylbutylbenzotriazol-1-yl |
| methylpentylbenzotriazol-1-yl |
| methylhexylbenzotriazol-1-yl |
| methylheptylbenzotriazol-1-yl |
| methyloctylbenzotriazol-1-yl |
| methylnonylbenzotriazol-1-yl |
| methyldecylbenzotriazol-1-yl |
| methylundecylbenzotriazol-1-yl |
| methyldodecylbenzotriazol-1-yl |
| phenylbenzotriazol-1-yl |
| tolylbenzotriazol-1-yl |
| benzylbenzotriazol-1-yl |
| (trifluoromethyl)benzotriazol-1-yl |
| cyclopropylbenzotriazol-1-yl |
| cyclobutylbenzotriazol-1-yl |
| cyclopentylbenzotriazol-1-yl |
| cyclohexylbenzotriazol-1-yl |
| cycloheptylbenzotriazol-1-yl |
| cyclooctylbenzotriazol-1-yl |
| cyclononylbenzotriazol-1-yl |
| cyclodecylbenzotriazol-1-yl |
| cycloundecylbenzotriazol-1-yl |
| cyclododecylbenzotriazol-1-yl |
| methylphenylbenzotriazol-1-yl |
| methyltolylbenzotriazol-1-yl |
| methylbenzylbenzotriazol-1-yl |
| methyl(trifluoromethyl)benzotriazol-1-yl |
| methylcyclopropylbenzotriazol-1-yl |
| methylcyclobutylbenzotriazol-1-yl |
| methylcyclopentylbenzotriazol-1-yl |
| methylcyclohexylbenzotriazol-1-yl |
| methylcycloheptylbenzotriazol-1-yl |
| methylcyclooctylbenzotriazol-1-yl |
| methylcyclononylbenzotriazol-1-yl |
| methylcyclodecylbenzotriazol-1-yl |
| methylcycloundecylbenzotriazol-1-yl |
| methylcyclododecylbenzotriazol-1-yl |
| diethylbenzotriazol-1-yl |
| dipropylbenzotriazol-1-yl |
| dibutylbenzotriazol-1-yl |
| dipentylbenzotriazol-1-yl |
| dihexylbenzotriazol-1-yl |
| dibenzophosphol-5-yl |
| methyldibenzophosphol-5-yl |
| dimethyldibenzophosphol-5-yl |
| trimethyldibenzophosphol-5-yl |
| tetramethyldibenzophosphol-5-yl |
| pentamethyldibenzophosphol-5-yl |
| hexamethyldibenzophosphol-5-yl |
| heptamethyldibenzophosphol-5-yl |
| octamethyldibenzophosphol-5-yl |
| ethyldibenzophosphol-5-yl |
| propyldibenzophosphol-5-yl |
| butyldibenzophosphol-5-yl |
| pentyldibenzophosphol-5-yl |
| hexyldibenzophosphol-5-yl |
| heptyldibenzophosphol-5-yl |
| octyldibenzophosphol-5-yl |
| nonyldibenzophosphol-5-yl |
| decyldibenzophosphol-5-yl |
| undecyldibenzophosphol-5-yl |
| dodecyldibenzophosphol-5-yl |
| methylethyldibenzophosphol-5-yl |
| methylpropyldibenzophosphol-5-yl |
| methylbutyldibenzophosphol-5-yl |
| methylpentyldibenzophosphol-5-yl |
| methylhexyldibenzophosphol-5-yl |

TABLE 1-continued

| |
|---|
| methylheptyldibenzophosphol-5-yl |
| methyloctyldibenzophosphol-5-yl |
| methylnonyldibenzophosphol-5-yl |
| methyldecyldibenzophosphol-5-yl |
| methylundecyldibenzophosphol-5-yl |
| methyldodecyldibenzophosphol-5-yl |
| phenyldibenzophosphol-5-yl |
| tolyldibenzophosphol-5-yl |
| benzyldibenzophosphol-5-yl |
| (trifluoromethyl)dibenzophosphol-5-yl |
| cyclopropyldibenzophosphol-5-yl |
| cyclobutyldibenzophosphol-5-yl |
| cyclopentyldibenzophosphol-5-yl |
| cyclohexyldibenzophosphol-5-yl |
| cycloheptyldibenzophosphol-5-yl |
| cyclooctyldibenzophosphol-5-yl |
| cyclononyldibenzophosphol-5-yl |
| cyclodecyldibenzophosphol-5-yl |
| cycloundecyldibenzophosphol-5-yl |
| cyclododecyldibenzophosphol-5-yl |
| methylphenyldibenzophosphol-5-yl |
| methyltolyldibenzophosphol-5-yl |
| methylbenzyldibenzophosphol-5-yl |
| methyl(trifluoromethyl)dibenzophosphol-5-yl |
| methylcyclopropyldibenzophosphol-5-yl |
| methylcyclobutyldibenzophosphol-5-yl |
| methylcyclopentyldibenzophosphol-5-yl |
| methylcyclohexyldibenzophosphol-5-yl |
| methylcycloheptyldibenzophosphol-5-yl |
| methylcyclooctyldibenzophosphol-5-yl |
| methylcyclononyldibenzophosphol-5-yl |
| methylcyclodecyldibenzophosphol-5-yl |
| methylcycloundecyldibenzophosphol-5-yl |
| methylcyclododecyldibenzophosphol-5-yl |
| diethyldibenzophosphol-5-yl |
| dipropyldibenzophosphol-5-yl |
| dibutyldibenzophosphol-5-yl |
| dipentyldibenzophosphol-5-yl |
| dihexyldibenzophosphol-5-yl |
| 1,2,3,4-tetrahydrocyclopenta[b]indol-4-yl |
| methyl-1,2,3,4-tetrahydrocyclopenta[b]indol-4-yl |
| dimethyl-1,2,3,4-tetrahydrocyclopenta[b]indol-4-yl |
| trimethyl-1,2,3,4-tetrahydrocyclopenta[b]indol-4-yl |
| ethyl-1,2,3,4-tetrahydrocyclopenta[b]indol-4-yl |
| propyl-1,2,3,4-tetrahydrocyclopenta[b]indol-4-yl |
| butyl-1,2,3,4-tetrahydrocyclopenta[b]indol-4-yl |
| pentyl-1,2,3,4-tetrahydrocyclopenta[b]indol-4-yl |
| hexyl-1,2,3,4-tetrahydrocyclopenta[b]indol-4-yl |
| heptyl-1,2,3,4-tetrahydrocyclopenta[b]indol-4-yl |
| octyl-1,2,3,4-tetrahydrocyclopenta[b]indol-4-yl |
| nonyl-1,2,3,4-tetrahydrocyclopenta[b]indol-4-yl |
| decyl-1,2,3,4-tetrahydrocyclopenta[b]indol-4-yl |
| undecyl-1,2,3,4-tetrahydrocyclopenta[b]indol-4-yl |
| dodecyl-1,2,3,4-tetrahydrocyclopenta[b]indol-4-yl |
| methylethyl-1,2,3,4-tetrahydrocyclopenta[b]indol-4-yl |
| methylpropyl-1,2,3,4-tetrahydrocyclopenta[b]indol-4-yl |
| methylbutyl-1,2,3,4-tetrahydrocyclopenta[b]indol-4-yl |
| methylpentyl-1,2,3,4-tetrahydrocyclopenta[b]indol-4-yl |
| methylhexyl-1,2,3,4-tetrahydrocyclopenta[b]indol-4-yl |
| methylheptyl-1,2,3,4-tetrahydrocyclopenta[b]indol-4-yl |
| methyloctyl-1,2,3,4-tetrahydrocyclopenta[b]indol-4-yl |

TABLE 1-continued

| |
|---|
| methylnonyl-1,2,3,4-tetrahydrocyclopenta[b]indol-4-yl |
| methyldecyl-1,2,3,4-tetrahydrocyclopenta[b]indol-4-yl |
| methylundecyl-1,2,3,4-tetrahydrocyclopenta[b]indol-4-yl |
| methyldodecyl-1,2,3,4-tetrahydrocyclopenta[b]indol-4-yl |
| phenyl-1,2,3,4-tetrahydrocyclopenta[b]indol-4-yl |
| tolyl-1,2,3,4-tetrahydrocyclopenta[b]indol-4-yl |
| benzyl-1,2,3,4-tetrahydrocyclopenta[b]indol-4-yl |
| (trifluoromethyl) 1,2,3,4-tetrahydrocyclopenta[b]indol-4-yl |
| cyclopropyl-1,2,3,4-tetrahydrocyclopenta[b]indol-4-yl |
| cyclobutyl-1,2,3,4-tetrahydrocyclopenta[b]indol-4-yl |
| cyclopentyl-1,2,3,4-tetrahydrocyclopenta[b]indol-4-yl |
| cyclohexyl-1,2,3,4-tetrahydrocyclopenta[b]indol-4-yl |
| cycloheptyl-1,2,3,4-tetrahydrocyclopenta[b]indol-4-yl |
| cyclooctyl-1,2,3,4-tetrahydrocyclopenta[b]indol-4-yl |
| cyclononyl-1,2,3,4-tetrahydrocyclopenta[b]indol-4-yl |
| cyclodecyl-1,2,3,4-tetrahydrocyclopenta[b]indol-4-yl |
| cycloundecyl-1,2,3,4-tetrahydrocyclopenta[b]indol-4-yl |
| cyclododecyl-1,2,3,4-tetrahydrocyclopenta[b]indol-4-yl |
| methylphenyl-1,2,3,4-tetrahydrocyclopenta[b]indol-4-yl |
| methyltolyl-1,2,3,4-tetrahydrocyclopenta[b]indol-4-yl |
| methylbenzyl-1,2,3,4-tetrahydrocyclopenta[b]indol-4-yl |
| methyl(trifluoromethyl)-1,2,3,4-tetrahydrocyclopenta[b]indol-4-yl |
| methylcyclopropyl-1,2,3,4-tetrahydrocyclopenta[b]indol-4-yl |
| methylcyclobutyl-1,2,3,4-tetrahydrocyclopenta[b]indol-4-yl |
| methylcyclopentyl-1,2,3,4-tetrahydrocyclopenta[b]indol-4-yl |
| methylcyclohexyl-1,2,3,4-tetrahydrocyclopenta[b]indol-4-yl |
| methylcycloheptyl-1,2,3,4-tetrahydrocyclopenta[b]indol-4-yl |
| methylcyclooctyl-1,2,3,4-tetrahydrocyclopenta[b]indol-4-yl |
| methylcyclononyl-1,2,3,4-tetrahydrocyclopenta[b]indol-4-yl |
| methylcyclodecyl-1,2,3,4-tetrahydrocyclopenta[b]indol-4-yl |
| methylcycloundecyl-1,2,3,4-tetrahydrocyclopenta[b]indol-4-yl |
| methylcyclododecyl-1,2,3,4-tetrahydrocyclopenta[b]indol-4-yl |
| diethyl-1,2,3,4-tetrahydrocyclopenta[b]indol-4-yl |
| dipropyl-1,2,3,4-tetrahydrocyclopenta[b]indol-4-yl |
| dibutyl-1,2,3,4-tetrahydrocyclopenta[b]indol-4-yl |
| dipentyl-1,2,3,4-tetrahydrocyclopenta[b]indol-4-yl |
| dihexyl-1,2,3,4-tetrahydrocyclopenta[b]indol-4-yl |
| tetrahydro-8-phospha-cyclopenta[a]inden-1-yl |
| phenothaizin-10-yl |
| methylphenothaizin-10-yl |
| dimethylphenothaizin-10-yl |
| trimethylphenothaizin-10-yl |
| ethylphenothaizin-10-yl |

TABLE 1-continued

| |
|---|
| propylphenothaizin-10-yl |
| butylphenothaizin-10-yl |
| pentylphenothaizin-10-yl |
| hexylphenothaizin-10-yl |
| heptylphenothaizin-10-yl |
| octylphenothaizin-10-yl |
| nonylphenothaizin-10-yl |
| decylphenothaizin-10-yl |
| undecylphenothaizin-10-yl |
| dodecylphenothaizin-10-yl |
| methylethylphenothaizin-10-yl |
| methylpropylphenothaizin-10-yl |
| methylbutylphenothaizin-10-yl |
| methylpentylphenothaizin-10-yl |
| methylhexylphenothaizin-10-yl |
| methylheptylphenothaizin-10-yl |
| methyloctylphenothaizin-10-yl |
| methylnonylphenothaizin-10-yl |
| methyldecylphenothaizin-10-yl |
| methylundecylphenothaizin-10-yl |
| methyldodecylphenothaizin-10-yl |
| phenylphenothaizin-10-yl |
| tolylphenothaizin-10-yl |
| benzylphenothaizin-10-yl |
| (trifluoromethyl)phenothaizin-10-yl |
| cyclopropylphenothaizin-10-yl |
| cyclobutylphenothaizin-10-yl |
| cyclopentylphenothaizin-10-yl |
| cyclohexylphenothaizin-10-yl |
| cycloheptylphenothaizin-10-yl |
| cyclooctylphenothaizin-10-yl |
| cyclononylphenothaizin-10-yl |
| cyclodecylphenothaizin-10-yl |
| cycloundecylphenothaizin-10-yl |
| cyclododecylphenothaizin-10-yl |
| methylphenylphenothaizin-10-yl |
| methyltolylphenothaizin-10-yl |
| methylbenzylphenothaizin-10-yl |
| methyl(trifluoromethyl)phenothaizin-10-yl |
| methylcyclopropylphenothaizin-10-yl |
| methylcyclobutylphenothaizin-10-yl |
| methylcyclopentylphenothaizin-10-yl |
| methylcyclohexylphenothaizin-10-yl |
| methylcycloheptylphenothaizin-10-yl |
| methylcyclooctylphenothaizin-10-yl |
| methylcyclononylphenothaizin-10-yl |
| methylcyclodecylphenothaizin-10-yl |
| methylcycloundecylphenothaizin-10-yl |
| methylcyclododecylphenothaizin-10-yl |
| diethylphenothaizin-10-yl |
| dipropylphenothaizin-10-yl |
| dibutylphenothaizin-10-yl |
| dipentylphenothaizin-10-yl |
| dihexylphenothaizin-10-yl |
| phenoxazin-10-yl |
| methylphenoxazin-10-yl |
| dimethylphenoxazin-10-yl |
| trimethylphenoxazin-10-yl |
| ethylphenoxazin-10-yl |
| propylphenoxazin-10-yl |
| butylphenoxazin-10-yl |
| pentylphenoxazin-10-yl |
| hexylphenoxazin-10-yl |
| heptylphenoxazin-10-yl |
| octylphenoxazin-10-yl |
| nonylphenoxazin-10-yl |
| decylphenoxazin-10-yl |
| undecylphenoxazin-10-yl |
| dodecylphenoxazin-10-yl |
| methylethylphenoxazin-10-yl |
| methylpropylphenoxazin-10-yl |
| methylbutylphenoxazin-10-yl |
| methylpentylphenoxazin-10-yl |
| methylhexylphenoxazin-10-yl |
| methylheptylphenoxazin-10-yl |
| methyloctylphenoxazin-10-yl |
| methylnonylphenoxazin-10-yl |
| methyldecylphenoxazin-10-yl |
| methylundecylphenoxazin-10-yl |

TABLE 1-continued

| |
|---|
| methyldodecylphenoxazin-10-yl |
| phenylphenoxazin-10-yl |
| tolylphenoxazin-10-yl |
| benzylphenoxazin-10-yl |
| (trifluoromethyl)phenoxazin-10-yl |
| cyclopropylphenoxazin-10-yl |
| cyclobutylphenoxazin-10-yl |
| cyclopentylphenoxazin-10-yl |
| cyclohexylphenoxazin-10-yl |
| cycloheptylphenoxazin-10-yl |
| cyclooctylphenoxazin-10-yl |
| cyclononylphenoxazin-10-yl |
| cyclodecylphenoxazin-10-yl |
| cycloundecylphenoxazin-10-yl |
| cyclododecylphenoxazin-10-yl |
| methylphenylphenoxazin-10-yl |
| methyltolylphenoxazin-10-yl |
| methylbenzylphenoxazin-10-yl |
| methyl(trifluoromethyl)phenoxazin-10-yl |
| methylcyclopropylphenoxazin-10-yl |
| methylcyclobutylphenoxazin-10-yl |
| methylcyclopentylphenoxazin-10-yl |
| methylcyclohexylphenoxazin-10-yl |
| methylcycloheptylphenoxazin-10-yl |
| methylcyclooctylphenoxazin-10-yl |
| methylcyclononylphenoxazin-10-yl |
| methylcyclodecylphenoxazin-10-yl |
| methylcycloundecylphenoxazin-10-yl |
| methylcyclododecylphenoxazin-10-yl |
| diethylphenoxazin-10-yl |
| dipropylphenoxazin-10-yl |
| dibutylphenoxazin-10-yl |
| dipentylphenoxazin-10-yl |
| dihexylphenoxazin-10-yl |
| phenoselenazin-10-yl |
| phenotellurazin-10-yl |
| 4H-[1,4]oxazin-4-yl |
| methyl-4H-[1,4]oxazin-4-yl |
| dimethyl-4H-[1,4]oxazin-4-yl |
| trimethyl-4H-[1,4]oxazin-4-yl |
| tetramethyl-4H-[1,4]oxazin-4-yl |
| ethyl-4H-[1,4]oxazin-4-yl |
| propyl-4H-[1,4]oxazin-4-yl |
| butyl-4H-[1,4]oxazin-4-yl |
| pentyl-4H-[1,4]oxazin-4-yl |
| hexyl-4H-[1,4]oxazin-4-yl |
| heptyl-4H-[1,4]oxazin-4-yl |
| octyl-4H-[1,4]oxazin-4-yl |
| nonyl-4H-[1,4]oxazin-4-yl |
| decyl-4H-[1,4]oxazin-4-yl |
| undecyl-4H-[1,4]oxazin-4-yl |
| dodecyl-4H-[1,4]oxazin-4-yl |
| methylethyl-4H-[1,4]oxazin-4-yl |
| methylpropyl-4H-[1,4]oxazin-4-yl |
| methylbutyl-4H-[1,4]oxazin-4-yl |
| methylpentyl-4H-[1,4]oxazin-4-yl |
| methylhexyl-4H-[1,4]oxazin-4-yl |
| methylheptyl-4H-[1,4]oxazin-4-yl |
| methyloctyl-4H-[1,4]oxazin-4-yl |
| methylnonyl-4H-[1,4]oxazin-4-yl |
| methyldecyl-4H-[1,4]oxazin-4-yl |
| methylundecyl-4H-[1,4]oxazin-4-yl |
| methyldodecyl-4H-[1,4]oxazin-4-yl |
| phenyl-4H-[1,4]oxazin-4-yl |
| tolyl-4H-[1,4]oxazin-4-yl |
| benzyl-4H-[1,4]oxazin-4-yl |
| (trifluoromethyl)-4H-[1,4]oxazin-4-yl |
| cyclopropyl-4H-[1,4]oxazin-4-yl |
| cyclobutyl-4H-[1,4]oxazin-4-yl |
| cyclopentyl-4H-[1,4]oxazin-4-yl |
| cyclohexyl-4H-[1,4]oxazin-4-yl |
| cycloheptyl-4H-[1,4]oxazin-4-yl |
| cyclooctyl-4H-[1,4]oxazin-4-yl |
| cyclononyl-4H-[1,4]oxazin-4-yl |
| cyclodecyl-4H-[1,4]oxazin-4-yl |
| cycloundecyl-4H-[1,4]oxazin-4-yl |
| cyclododecyl-4H-[1,4]oxazin-4-yl |
| methylphenyl-4H-[1,4]oxazin-4-yl |
| methyltolyl-4H-[1,4]oxazin-4-yl |

TABLE 1-continued

| |
|---|
| methylbenzyl-4H-[1,4]oxazin-4-yl |
| methyl(trifluoromethyl)-4H-[1,4]oxazin-4-yl |
| methylcyclopropyl-4H-[1,4]oxazin-4-yl |
| methylcyclobutyl-4H-[1,4]oxazin-4-yl |
| methylcyclopentyl-4H-[1,4]oxazin-4-yl |
| methylcyclohexyl-4H-[1,4]oxazin-4-yl |
| methylcycloheptyl-4H-[1,4]oxazin-4-yl |
| methylcyclooctyl-4H-[1,4]oxazin-4-yl |
| methylcyclononyl-4H-[1,4]oxazin-4-yl |
| methylcyclodecyl-4H-[1,4]oxazin-4-yl |
| methylcycloundecyl-4H-[1,4]oxazin-4-yl |
| methylcyclododecyl-4H-[1,4]oxazin-4-yl |
| diethyl-4H-[1,4]oxazin-4-yl |
| dipropyl-4H-[1,4]oxazin-4-yl |
| dibutyl-4H-[1,4]oxazin-4-yl |
| dipentyl-4H-[1,4]oxazin-4-yl |
| dihexyl-4H-[1,4]oxazin-4-yl |
| 4H-[1,4]thiazin-4-yl |
| methyl-4H-[1,4]thiazin-4-yl |
| dimethyl-4H-[1,4]thiazin-4-yl |
| trimethyl-4H-[1,4]thiazin-4-yl |
| tetramethyl-4H-[1,4]thiazin-4-yl |
| ethyl-4H-[1,4]thiazin-4-yl |
| propyl-4H-[1,4]thiazin-4-yl |
| butyl-4H-[1,4]thiazin-4-yl |
| pentyl-4H-[1,4]thiazin-4-yl |
| hexyl-4H-[1,4]thiazin-4-yl |
| heptyl-4H-[1,4]thiazin-4-yl |
| octyl-4H-[1,4]thiazin-4-yl |
| nonyl-4H-[1,4]thiazin-4-yl |
| decyl-4H-[1,4]thiazin-4-yl |
| undecyl-4H-[1,4]thiazin-4-yl |
| dodecyl-4H-[1,4]thiazin-4-yl |
| methylethyl-4H-[1,4]thiazin-4-yl |
| methylpropyl-4H-[1,4]thiazin-4-yl |
| methylbutyl-4H-[1,4]thiazin-4-yl |
| methylpentyl-4H-[1,4]thiazin-4-yl |
| methylhexyl-4H-[1,4]thiazin-4-yl |
| methylheptyl-4H-[1,4]thiazin-4-yl |
| methyloctyl-4H-[1,4]thiazin-4-yl |
| methylnonyl-4H-[1,4]thiazin-4-yl |
| methyldecyl-4H-[1,4]thiazin-4-yl |
| methylundecyl-4H-[1,4]thiazin-4-yl |
| methyldodecyl-4H-[1,4]thiazin-4-yl |
| phenyl-4H-[1,4]thiazin-4-yl |
| tolyl-4H-[1,4]thiazin-4-yl |
| benzyl-4H-[1,4]thiazin-4-yl |
| (trifluoromethyl)-4H-[1,4]thiazin-4-yl |
| cyclopropyl-4H-[1,4]thiazin-4-yl |
| cyclobutyl-4H-[1,4]thiazin-4-yl |
| cyclopentyl-4H-[1,4]thiazin-4-yl |
| cyclohexyl-4H-[1,4]thiazin-4-yl |
| cycloheptyl-4H-[1,4]thiazin-4-yl |
| cyclooctyl-4H-[1,4]thiazin-4-yl |
| cyclononyl-4H-[1,4]thiazin-4-yl |
| cyclodecyl-4H-[1,4]thiazin-4-yl |
| cycloundecyl-4H-[1,4]thiazin-4-yl |
| cyclododecyl-4H-[1,4]thiazin-4-yl |
| methylphenyl-4H-[1,4]thiazin-4-yl |
| methyltolyl-4H-[1,4]thiazin-4-yl |
| methylbenzyl-4H-[1,4]thiazin-4-yl |
| methyl(trifluoromethyl)-4H-[1,4]thiazin-4-yl |
| methylcyclopropyl-4H-[1,4]thiazin-4-yl |
| methylcyclobutyl-4H-[1,4]thiazin-4-yl |
| methylcyclopentyl-4H-[1,4]thiazin-4-yl |
| methylcyclohexyl-4H-[1,4]thiazin-4-yl |
| methylcycloheptyl-4H-[1,4]thiazin-4-yl |
| methylcyclooctyl-4H-[1,4]thiazin-4-yl |
| methylcyclononyl-4H-[1,4]thiazin-4-yl |
| methylcyclodecyl-4H-[1,4]thiazin-4-yl |
| methylcycloundecyl-4H-[1,4]thiazin-4-yl |
| methylcyclododecyl-4H-[1,4]thiazin-4-yl |
| diethyl-4H-[1,4]thiazin-4-yl |
| dipropyl-4H-[1,4]thiazin-4-yl |
| dibutyl-4H-[1,4]thiazin-4-yl |
| dipentyl-4H-[1,4]thiazin-4-yl |
| dihexyl-4H-[1,4]thiazin-4-yl |
| 4H-[1,4]selenazin-4-yl |
| methyl-4H-[1,4]selenazin-4-yl |

TABLE 1-continued

| |
|---|
| dimethyl-4H-[1,4]selenazin-4-yl |
| trimethyl-4H-[1,4]selenazin-4-yl |
| tetramethyl-4H-[1,4]selenazin-4-yl |
| 4H-[1,4]tellurazin-4-yl |
| methyl-4H-[1,4]tellurazin-4-yl |
| dimethyl-4H-[1,4]tellurazin-4-yl |
| trimethyl-4H-[1,4]tellurazin-4-yl |
| tetramethyl-4H-[1,4]tellurazin-4-yl |
| 1H-pyridin-1-yl-4-thione |
| methyl-1H-pyridin-1-yl-4-thione |
| dimethyl-1H-pyridin-1-yl-4-thione |
| trimethyl-1H-pyridin-1-yl-4-thione |
| tetramethyl-1H-pyridin-1-yl-4-thione |
| 1H-pyridin-1-yl-4-one |
| methyl-1H-pyridin-1-yl-4-one |
| dimethyl-1H-pyridin-1-yl-4-one |
| trimethyl-1H-pyridin-1-yl-4-one |
| tetramethyl-1H-pyridin-1-yl-4-one |
| 1H-pyridin-1-yl-4-selone |
| methyl-1H-pyridin-1-yl-4-selone |
| dimethyl-1H-pyridin-1-yl-4-selone |
| trimethyl-1H-pyridin-1-yl-4-selone |
| tetramethyl-1H-pyridin-1-yl-4-selone |
| 1H-pyridin-1-yl-4-tellone |
| methyl-1H-pyridin-1-yl-4-tellone |
| dimethyl-1H-pyridin-1-yl-4-tellone |
| trimethyl-1H-pyridin-1-yl-4-tellone |
| tetramethyl-1H-pyridin-1-yl-4-tellone |
| benzoazaphosphol-1-yl |
| benzoazaphosphol-3-yl |
| benzodiazaphosphol-1-yl |
| benzodiazaphosphol-3-yl |
| benzoazadiphosphol-1-yl |
| benzoazadiphosphol-3-yl |
| 1,2,3,4-tetrahydro-dibenzophosphol-5-yl |
| 1,2,3,8-tetrahydro-8-phospha-cyclopenta[a]inden-8-yl |
| tetrazol-1-yl |
| methyltetrazol-1-yl |
| ethyltetrazol-1-yl |
| propyltetrazol-1-yl |
| butyltetrazol-1-yl |
| pentyltetrazol-1-yl |
| hexyltetrazol-1-yl |
| phenyltetrazol-1-yl |
| tetrazol-2-yl |
| methyltetrazol-2-yl |
| ethyltetrazol-2-yl |
| propyltetrazol-2-yl |
| butyltetrazol-2-yl |
| pentyltetrazol-2-yl |
| hexyltetrazol-2-yl |
| phenyltetrazol-2-yl |

| R, $R^1$, $R^2$, $R^3$, $R^4$, $R^5$, $R^6$, $R^7$, $R^8$, $R^9$, $R^{10}$, $R^{11}$, $R^{12}$, $R^{13}$ and $R^{14}$ |
|---|
| hydrogen |
| methyl |
| ethyl |
| propyl |
| butyl |
| pentyl |
| hexyl |
| heptyl |
| octyl |
| nonyl |
| decyl |
| undecyl |
| dodecyl |
| tridecyl |
| tetradecyl |
| pentadecyl |
| hexadecyl |
| heptadecyl |
| octadecyl |
| nonadecyl |
| eicosyl |

TABLE 1-continued

| |
|---|
| heneicosyl |
| docosyl |
| tricosyl |
| tetracosyl |
| pentacosyl |
| hexacosyl |
| heptacosyl |
| octacosyl |
| nonacosyl |
| triacontyl |
| vinyl |
| propenyl |
| butenyl |
| pentenyl |
| hexenyl |
| heptenyl |
| octenyl |
| nonenyl |
| decenyl |
| undecenyl |
| dodecenyl |
| tridecenyl |
| tetradecenyl |
| pentadecenyl |
| hexadecenyl |
| heptadecenyl |
| octadecenyl |
| nonadecenyl |
| eicosenyl |
| heneicosenyl |
| docosenyl |
| tricosenyl |
| tetracosenyl |
| pentacosenyl |
| hexacosenyl |
| heptacosenyl |
| octacosenyl |
| nonacosenyl |
| triacontenyl |
| propynyl |
| butynyl |
| pentynyl |
| hexynyl |
| heptynyl |
| octynyl |
| nonynyl |
| decynyl |
| undecynyl |
| dodecynyl |
| tridecynyl |
| tetradecynyl |
| pentadecynyl |
| hexadecynyl |
| heptadecynyl |
| octadecynyl |
| nonadecynyl |
| eicosynyl |
| heneicosynyl |
| docosynyl |
| tricosynyl |
| tetracosynyl |
| pentacosynyl |
| hexacosynyl |
| heptacosynyl |
| octacosynyl |
| nonacosynyl |
| triacontynyl |
| cyclopropyl |
| cyclobutyl |
| cyclopentyl |
| cyclohexyl |
| cycloheptyl |
| cyclooctyl |
| cyclononyl |
| cyclodecyl |
| cycloundecyl |
| cyclododecyl |
| cyclotetradecyl |
| cyclopentenyl |

TABLE 1-continued

| |
|---|
| cyclohexenyl |
| cycloheptenyl |
| cyclooctenyl |
| cyclodecenyl |
| cyclododecenyl |
| methylcyclohexyl |
| ethylcyclohexyl |
| propylcyclohexyl |
| dimethylcyclohexyl |
| diethylcyclohexyl |
| dipropylcyclohexyl |
| phenyl |
| tolyl |
| mesityl |
| ethylphenyl |
| propylphenyl |
| butylphenyl |
| pentylphenyl |
| hexylphenyl |
| dimethylphenyl |
| trimethylphenyl |
| diethylphenyl |
| diethylmethylphenyl |
| dipropylphenyl |
| dipropylmethyl-phenyl |
| benzyl |
| phenethyl |
| napthyl |
| norbornyl |
| adamantyl |
| trifluoromethyl |
| methyltrifluoromethyl |
| trimethylsilyl |
| trimethylgermyl |
| trimethylstannyl |
| trimethylsilylmethyl |
| trimethylgermylmethyl |
| trimethylstannylmethyl |
| methoxymethyl |
| ethoxymethyl |
| propoxymethyl |
| butoxymethyl |
| phenoxymethyl |
| methylsulfanyl |
| ethylsulfanyl |
| propylsulfanyl |
| butylsulfanyl |
| phenylsulfanyl |
| dimethylaminomethyl |
| dimethylaminoethyl |
| diphenylaminomethyl |
| diphenylaminoethyl |
| phenylaminomethyl |
| phenylaminoethyl |
| methylaminomethyl |
| dimethylphosphinomethyl |
| dimethylphosphinoethyl |
| diphenylphosphinomethyl |
| phenylphosphinoethyl |
| methylphosphinomethyl |
| perfluoroethyl |
| perfluoropropyl |
| perfluorobutyl |
| perfluoropentyl |
| perfluorohexyl |
| perfluoroheptyl |
| perfluorooctyl |
| perfluorononyl |
| perfluorodecyl |
| perfluoroundecyl |
| perfluorododecyl |
| perfluorotridecyl |
| perfluorotetradecyl |
| perfluoropentadecyl |
| perfluorohexadecyl |
| perfluoroheptadecyl |
| perfluorooctadecyl |
| perfluorononadecyl |

TABLE 1-continued

| |
|---|
| perfluoroeicosyl |
| fluoromethyl |
| fluoroethyl |
| fluoropropyl |
| fluorobutyl |
| fluoropentyl |
| fluorohexyl |
| fluoroheptyl |
| fluorooctyl |
| fluorononyl |
| fluorodecyl |
| fluoroundecyl |
| fluorododecyl |
| fluorotridecyl |
| fluorotetradecyl |
| fluoropentadecyl |
| fluorohexadecyl |
| fluoroheptadecyl |
| fluorooctadecyl |
| fluorononadecyl |
| fluoroeicosyl |
| thienyl |
| furanyl |
| pyrrolyl |
| phospholyl |
| methylthienyl |
| methylfuranyl |
| methylpyrrolyl |
| methylphospholyl |
| ethylthienyl |
| ethylfuranyl |
| ethylpyrrolyl |
| ethylphospholyl |
| propylthienyl |
| propylfuranyl |
| propylpyrrolyl |
| propylphospholyl |
| butylthienyl |
| butylfuranyl |
| butylpyrrolyl |
| butylphospholyl |
| pentylthienyl |
| pentylfuranyl |
| pentylpyrrolyl |
| penylphospholyl |
| hexylthienyl |
| hexylfuranyl |
| hexylpyrrolyl |
| hexylphospholyl |
| heptylthienyl |
| heptylfuranyl |
| heptylpyrrolyl |
| heptylphospholyl |
| octylthienyl |
| octylfuranyl |
| octylpyrrolyl |
| octylphospholyl |
| nonylthienyl |
| nonylfuranyl |
| nonylpyrrolyl |
| nonylphospholyl |
| decylthienyl |
| decylfuranyl |
| decylpyrrolyl |
| decylphospholyl |
| undecylthienyl |
| undecylfuranyl |
| undecylpyrrolyl |
| undecylphospholyl |
| dodecylthienyl |
| dodecylfuranyl |
| dodecylpyrrolyl |
| dodecylphospholyl |
| dimethylthienyl |
| dimethylfuranyl |
| dimethylpyrrolyl |
| dimethylphospholyl |
| diethylthienyl |
| diethylfuranyl |

TABLE 1-continued

| |
|---|
| diethylpyrrolyl |
| diethylphospholyl |
| dipropylthienyl |
| dipropylfuranyl |
| dipropylpyrrolyl |
| dipropylphospholyl |
| dibutylthienyl |
| dibutylfuranyl |
| dibutylpyrrolyl |
| dibutylphospholyl |
| dipentylthienyl |
| dipentylfuranyl |
| dipentylpyrrolyl |
| dipenylphospholyl |
| dihexylthienyl |
| dihexylfuranyl |
| dihexylpyrrolyl |
| dihexylphospholyl |
| trimethylthienyl |
| trimethylfuranyl |
| trimethylpyrrolyl |
| trimethylphospholyl |
| benzothiopheneyl |
| benzofuranyl |
| phenylthienyl |
| phenylfuranyl |
| phenylpyrrolyl |
| phenylphospholyl |
| tolylthienyl |
| tolylfuranyl |
| tolylpyrrolyl |
| tolylphospholyl |
| mesitylthienyl |
| mesitylfuranyl |
| mesitylpyrrolyl |
| mesitylphospholyl |
| fluorophenyl |
| difluorophenyl |
| trifluorophenyl |
| tetrafluorophenyl |
| pentafluorophenyl |
| trifluoromethylphenyl |
| fluorobenzyl |
| difluorobenzyl |
| trifluorobenzyl |
| tetrafluorobenzyl |
| pentafluorobenzyl |
| trifluoromethylbenzyl |
| X |
| hydride |
| fluoride |
| chloride |
| bromide |
| iodide |
| methyl |
| ethyl |
| propyl |
| butyl |
| pentyl |
| hexyl |
| heptyl |
| octyl |
| nonyl |
| decyl |
| undecyl |
| dodecyl |
| tridecyl |
| tetradecyl |
| pentadecyl |
| hexadecyl |
| heptadecyl |
| octadecyl |
| nonadecyl |
| eicosyl |
| heneicosyl |
| docosyl |
| tricosyl |
| tetracosyl |

TABLE 1-continued

| |
|---|
| pentacosyl |
| hexacosyl |
| heptacosyl |
| octacosyl |
| nonacosyl |
| triacontyl |
| vinyl |
| propenyl |
| butenyl |
| pentenyl |
| hexenyl |
| heptenyl |
| octenyl |
| nonenyl |
| decenyl |
| undecenyl |
| dodecenyl |
| tridecenyl |
| tetradecenyl |
| pentadecenyl |
| hexadecenyl |
| heptadecenyl |
| octadecenyl |
| nonadecenyl |
| eicosenyl |
| heneicosenyl |
| docosenyl |
| tricosenyl |
| tetracosenyl |
| pentacosenyl |
| hexacosenyl |
| heptacosenyl |
| octacosenyl |
| nonacosenyl |
| triacontenyl |
| propynyl |
| butynyl |
| pentynyl |
| hexynyl |
| heptynyl |
| octynyl |
| nonynyl |
| decynyl |
| undecynyl |
| dodecynyl |
| tridecynyl |
| tetradecynyl |
| pentadecynyl |
| hexadecynyl |
| heptadecynyl |
| octadecynyl |
| nonadecynyl |
| eicosynyl |
| heneicosynyl |
| docosynyl |
| tricosynyl |
| tetracosynyl |
| pentacosynyl |
| hexacosynyl |
| heptacosynyl |
| octacosynyl |
| nonacosynyl |
| triacontynyl |
| cyclopropyl |
| cyclobutyl |
| cyclopentyl |
| cyclohexyl |
| cycloheptyl |
| cyclooctyl |
| cyclononyl |
| cyclodecyl |
| cycloundecyl |
| cyclododecyl |
| cyclotetradecyl |
| cyclopentenyl |
| cyclohexenyl |
| cycloheptenyl |
| cyclooctenyl |
| cyclodecenyl |

TABLE 1-continued

| |
|---|
| cyclododecenyl |
| methylcyclohexyl |
| ethylcyclohexyl |
| propylcyclohexyl |
| dimethylcyclohexyl |
| diethylcyclohexyl |
| dipropylcyclohexyl |
| phenyl |
| tolyl |
| mesityl |
| ethylphenyl |
| propylphenyl |
| butylphenyl |
| pentylphenyl |
| hexylphenyl |
| dimethylphenyl |
| trimethylphenyl |
| diethylphenyl |
| diethylmethylphenyl |
| dipropylphenyl |
| dipropylmethyl-phenyl |
| benzyl |
| phenethyl |
| napthyl |
| trifluoromethyl |
| methoxy |
| ethoxy |
| propoxy |
| butoxy |
| dimethylamido |
| diethylamido |
| methylethylamido |
| phenoxy |
| benzoxy |
| allyl |
| 1,1-dimethyl allyl |
| acetylacetonate |
| 1,1,1,5,5,5-hexafluoroacetylacetonate |
| 1,1,1-trifluoroacetylacetonate |
| 2-carboxymethylallyl |
| 1,1,1-trifluoro-5,5-dimethylacetylacetonate |
| methoxymethyl |
| ethoxymethyl |
| propoxymethyl |
| butoxymethyl |
| phenoxymethyl |
| methylsulfanyl |
| ethylsulfanyl |
| propylsulfanyl |
| butylsulfanyl |
| phenylsulfanyl |
| dimethylaminomethyl |
| dimethylaminoethyl |
| diphenylaminomethyl |
| diphenylaminoethyl |
| phenylaminomethyl |
| phenylaminoethyl |
| methylaminomethyl |
| dimethylphosphinomethyl |
| dimethylphosphinoethyl |
| diphenylphosphinomethyl |
| phenylphosphinoethyl |
| methylphosphinomethyl |
| trimethylsilylmethyl |
| trimethylgermylmethyl |
| trimethylstannylmethyl |
| fluoromethyl |
| fluoroethyl |
| fluoropropyl |
| fluorobutyl |
| fluoropentyl |
| fluorohexyl |
| fluoroheptyl |
| fluorooctyl |
| fluorononyl |
| fluorodecyl |

TABLE 1-continued

| |
|---|
| fluoroundecyl |
| fluorododecyl |
| fluorotridecyl |
| fluorotetradecyl |
| fluoropentadecyl |
| fluorohexadecyl |
| fluoroheptadecyl |
| fluorooctadecyl |
| fluorononadecyl |
| fluoroeicosyl |
| fluorobenzyl |
| difluorobenzyl |
| trifluorobenzyl |
| tetrafluorobenzyl |
| pentafluorobenzyl |
| trifluoromethylbenzyl |
| Both X |
| methylidene |
| ethylidene |
| propylidene |
| tetramethylene |
| pentamethylene |
| hexamethylene |
| butadiene |
| methylbutadiene |
| dimethylbutadiene |
| pentadiene |
| methylpentadiene |
| dimethylpentadiene |
| hexadiene |
| methylhexadiene |
| dimethylhexadiene |
| propandiyl |
| butandiyl |
| pentandiyl |
| hexandiyl |
| heptandiyl |
| octandiyl |
| nonandiyl |
| decandiyl |
| dodecandiyl |
| tetradecandiyl |
| hexadecandiyl |
| octadecandiyl |
| azapropandiyl |
| azabutandiyl |
| azapentandiyl |
| azahexandiyl |
| azaheptandiyl |
| azaoctandiyl |
| azanonandiyl |
| azadecandiyl |
| azadodecandiyl |
| phosphapropandiyl |
| phosphabutandiyl |
| phosphapentandiyl |
| thiapropandiyl |
| thiabutandiyl |
| thiapentandiyl |
| catecholate |
| butylcatecholate |
| diazabutandiyl |
| diazapentandiyl |
| diazahexandiyl |
| dioxabutandiyl |
| dioxapentandiyl |
| dioxahexandiyl |

Additionally, each Hc, $Hc^2$, $Hc^4$, $Hc^6$, $Hc^9$, $Hc^{11}$, and $Hc^{13}$ can be selected from the following structures where the radical (e.g. the dot ".")indicates the bonding position to the indenyl ligand:

Hc1

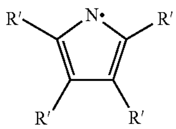

pyrrol-1-yl

Hc2

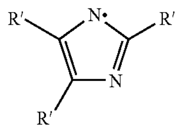

imidazol-1-yl

Hc3

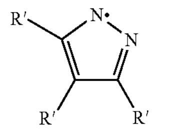

pyrazol-1-yl

Hc4

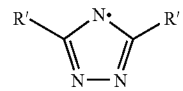

[1,2,4]triazol-4-yl

Hc5

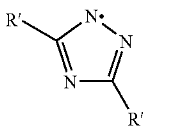

[1,2,4]triazol-1-yl

Hc6

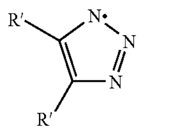

[1,2,3]triazol-1-yl

Hc7

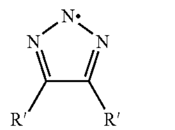

[1,2,3]triazol-2-yl

Hc8

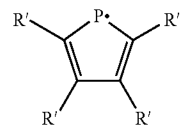

phosphol-1-yl

Hc9

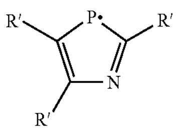

[1,3]azaphosphol-3-yl

Hc10

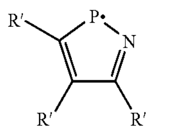

[1,2]azaphosphol-2-yl

Hc11

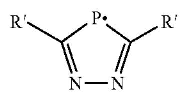

[1,2,4]-diazaphosphol-4-yl

Hc12

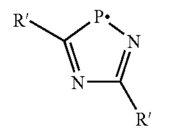

[1,4,2]-diazaphosphol-2-yl

Hc13

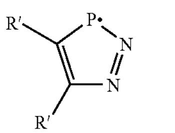

[1,2,3]-diazaphosphol-3-yl

Hc14

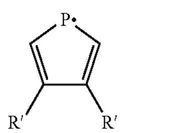

[1,3,2]-diazaphosphol-2-yl

Hc15

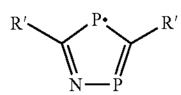

[1,2,4]-azadiphosphol-4-yl

Hc16

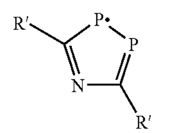

[1,3,4]-azadiphosphol-3-yl

Hc17

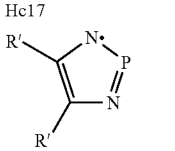

[1,2,3]-azadiphosphol-3-yl

Hc18

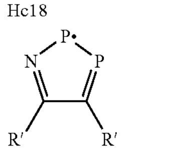

[1,2,3]-azadiphosphol-2-yl

Hc19

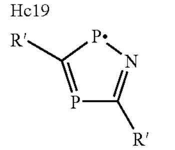

[1,2,4]-azadiphosphol-2-yl

Hc20

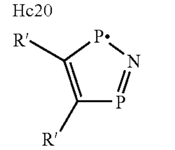

[1,2,5]-azadiphosphol-2-yl

Hc21

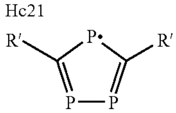

[1,2,4]triphosphol-3-yl

Hc22

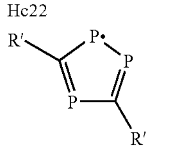

[1,2,4]triphosphol-1-yl

Hc23

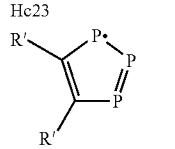

[1,2,3]triphosphol-1-yl

Hc24

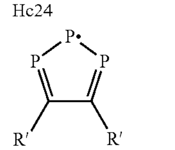

[1,2,3]triphosphol-2-yl

Hc25

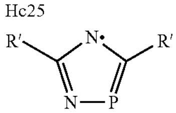

[1,4,2]-diazaphosphol-4-yl

Hc26

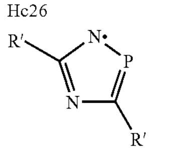

[1,4,2]-diazaphosphol-1-yl

Hc27

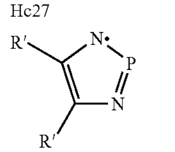

[1,3,2]-diazaphosphol-1-yl

Hc28

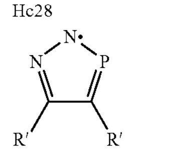

[1,2,3]-diazaphosphol-2-yl

Hc29

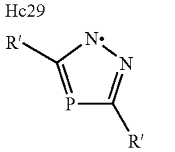

[1,2,4]-diazaphosphol-1-yl

Hc30

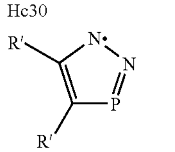

[1,2,3]-diazaphosphol-1-yl

Hc31

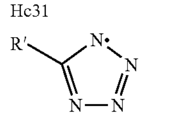

tetrazol-1-yl

Hc32

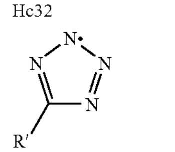

tetrazol-2-yl

-continued
Hc33
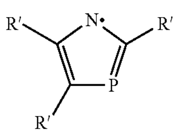
[1,3]azaphosphol-1-yl
Hc34
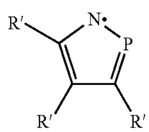
[1,2]azaphosphol-1-yl
Hc35
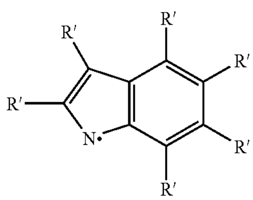
indol-1-yl
Hc36
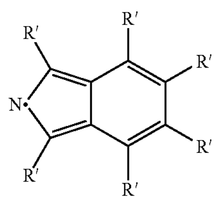
isoindol-2-yl
Hc37
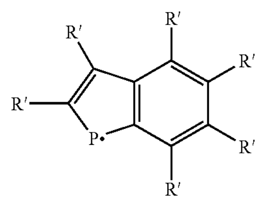
phosphindol-1-yl
Hc38
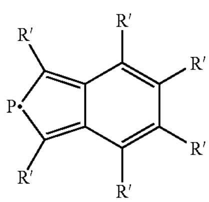
isophosphindol-2-yl
Hc39
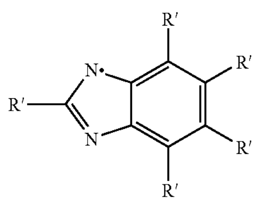
benzoimdazol-1-yl
Hc40
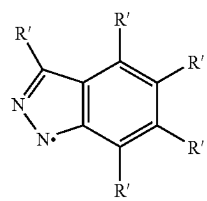
indazol-1-yl
Hc41
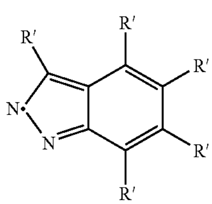
indazol-2-yl
Hc42
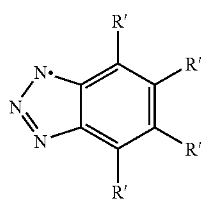
benzotriazol-1-yl
Hc43
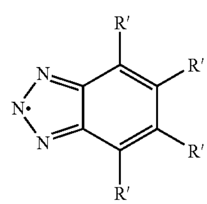
benzotriazol-2-yl
Hc44
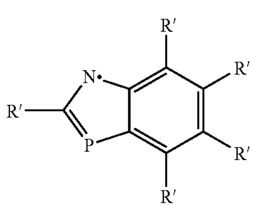
benzo[1,3]azaphosphol-1-yl
Hc45
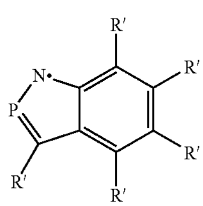
benzo[d][1,2]-azaphosphol-1-yl
Hc46
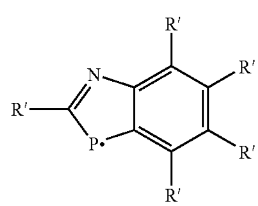
benzo[1,3]azaphosphol-3-yl
Hc47
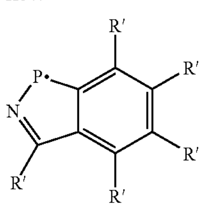
benzo[c][1,2]azaphosphol-1-yl
Hc48
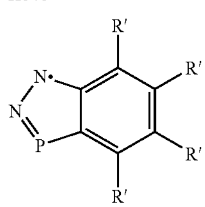
benzo[1,2,3]-diazaphosphol-1-yl
Hc49
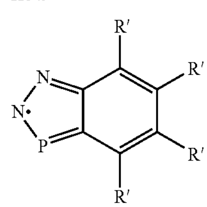
benzo[1,2,3]-diazaphosphol-2-yl -continued Hc50
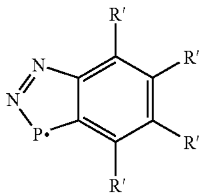
benzo[1,2,3]-
diazaphosphol-3-yl Hc51
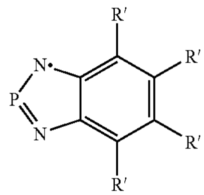
benzo[1,3,2]-
diazaphosphol-1-yl Hc52
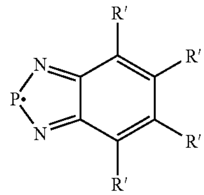
benzo[1,3,2]-
diazaphosphol-2-yl Hc53
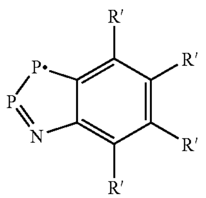
benzo[1,2,3]azadiphosphol-3-yl Hc54
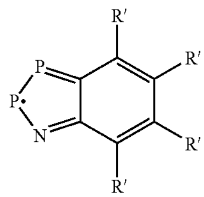
benzo[1,2,3]azadiphosphol-2-yl Hc55
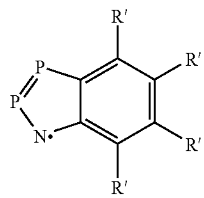
benzo[1,2,3]azadiphosphol-1-yl Hc56
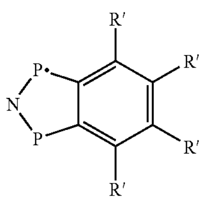
benzo[2,1,3]azadiphosphol-1-yl Hc57
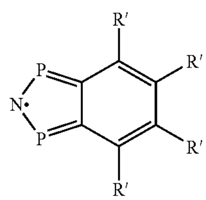
benzo[2,1,3]azadiphosphol-2-yl Hc58
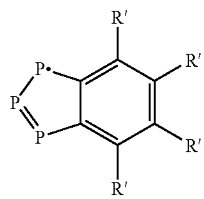
benzotriphosphol-1-yl Hc59
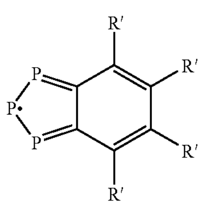
benzotriphosphol-2-yl Hc60
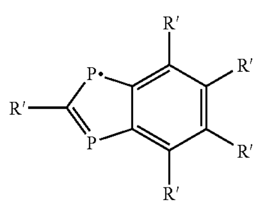
benzo[1,3]diphosphol-1-yl Hc61
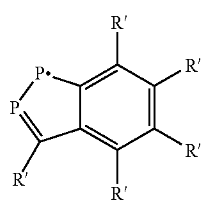
benzo[1,2]diphosphol-1-yl Hc62
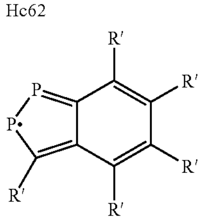
benzo[1,2]diphosphol-2-yl Hc63
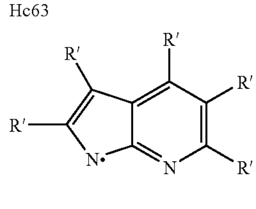
pyrrolo[2,3-b]pyridin-1-yl Hc64
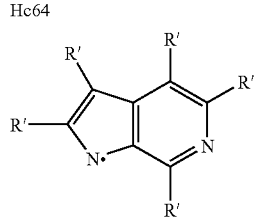
pyrrolo[2,3-c]pyridin-1-yl Hc65
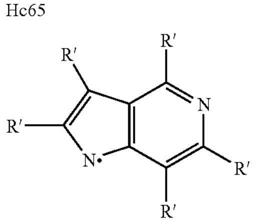
pyrrolo[3,2-c]pyridin-1-yl Hc66
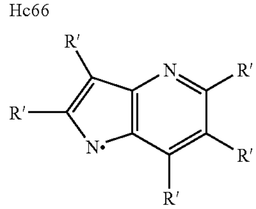
pyrrolo[3,2-b]pyridin-1-yl Hc67
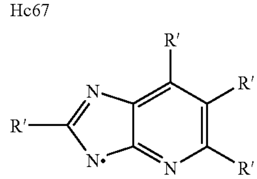
imidazo[4,5-b]pyridin-3-yl -continued Hc68

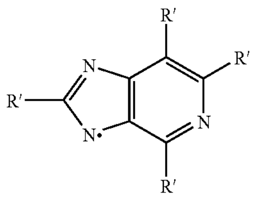

imidazo[4,5-c]pyridin-3-yl

Hc69

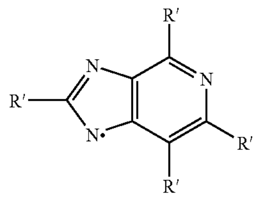

imidazo[4,5-c]pyridin-1-yl

Hc70

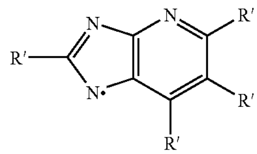

imidazo[4,5-b]pyridin-1-yl

Hc71

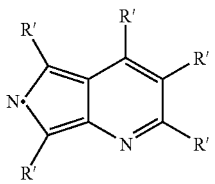

6H-pyrrolo[3,4-d]pyridin-6-yl

Hc72

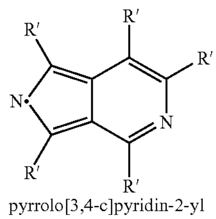

pyrrolo[3,4-c]pyridin-2-yl

Hc73

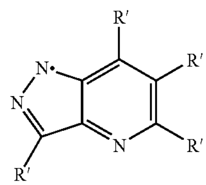

pyrazolo[4,3-b]pyridin-1-yl

Hc74

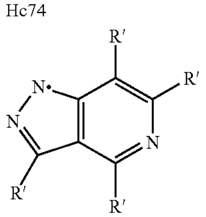

pyrazolo[4,3-c]pyridin-1-yl

Hc75

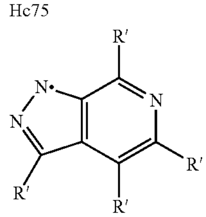

pyrazolo[3,4-c]pyridin-1-yl

Hc76

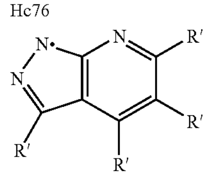

1H-Pyrazolo[3,4-b]pyridine

Hc77

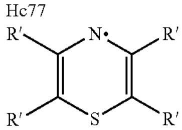

4H-[1,4]thiazin-4-yl

Hc78

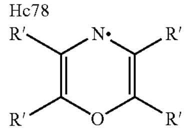

4H-[1,4]oxazin-4-yl

Hc79

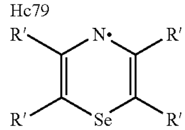

4H-[1,4]selenazin-4-yl

Hc80

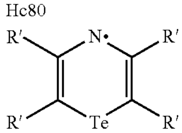

4H-[1,4]tellurazin-4-yl

Hc81

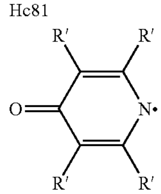

1H-pyridin-1-yl-4-one

Hc82

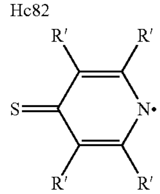

1H-pyridin-1-yl-4-thione

Hc83

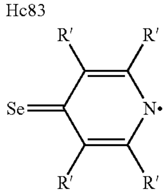

1H-pyridin-1-yl-4-selone

Hc84

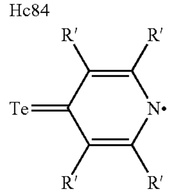

1H-pyridin-1-yl-4-tellone

Hc85

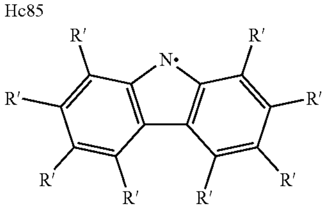

carbazol-9-yl

Hc86

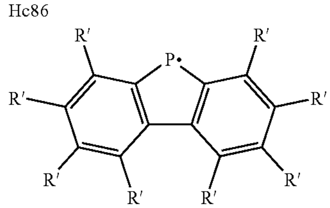

dibenzophosphol-5-yl

-continued

Hc87

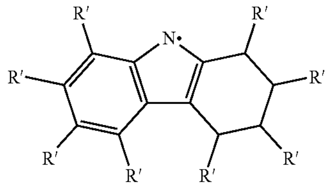

1,2,3,4-tetrahydro-carbazol-9-yl

Hc88

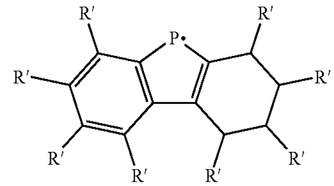

1,2,3,4-tetrahydro-dibenzophosphol-5-yl

Hc89

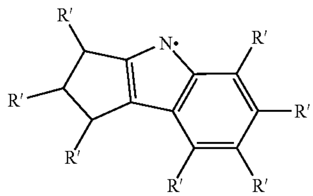

1,2,3,4-tetrahydro-cyclopenta[b]indol-4-yl

Hc90

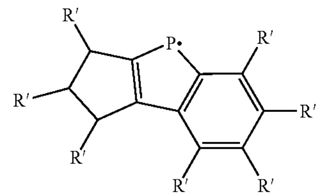

1,2,3,4-tetrahydro-cyclopenta[b]phosphindol-4-yl

Hc91

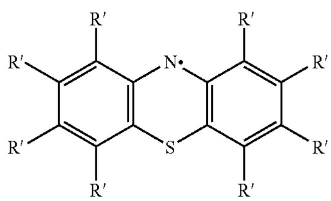

phenothiazin-10-yl

Hc92

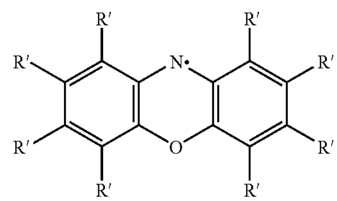

phenoxazin-10-yl

Hc93

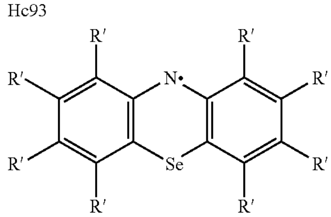

phenoselenazin-10-yl

Hc94

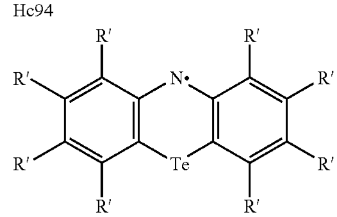

phenotellurazin-10-yl where each R' is selected from hydrogen, hydrocarbyl radicals, substituted hydrocarbyl radicals, halocarbyl radicals, substituted halocarbyl radicals, silylcarbyl radicals, and germylcarbyl radicals. Some invention embodiments select each R' from hydrogen or hydrocarbyl radicals including methyl, ethyl, ethenyl, ethynyl and all isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, and triacontynyl; from halocarbyls and all isomers of halocarbyls including perfluoropropyl, perfluorobutyl, perfluoropentyl, perfluorohexyl, perfluoroheptyl, perfluorooctyl, perfluorononyl, perfluorodecyl, perfluoroundecyl, perfluorododecyl, perfluorotridecyl, perfluorotetradecyl, perfluoropentadecyl, perfluorohexadecyl, perfluoroheptadecyl, perfluorooctadecyl, perfluorononadecyl, perfluoroeicosyl, perfluoroheneicosyl, perfluorodocosyl, perfluorotricosyl, perfluorotetracosyl, perfluoropentacosyl, perfluorohexacosyl, perfluoroheptacosyl, perfluorooctacosyl, perfluorononacosyl, perfluorotriacontyl, perfluorobutenyl, perfluorobutynyl, fluoropropyl, fluorobutyl, fluoropentyl, fluorohexyl, fluoroheptyl, fluorooctyl, fluorononyl, fluorodecyl, fluoroundecyl, fluorododecyl, fluorotridecyl, fluorotetradecyl, fluoropentadecyl, fluorohexadecyl, fluoroheptadecyl, fluorooctadecyl, fluorononadecyl, fluoroeicosyl, fluoroheneicosyl, fluorodocosyl, fluorotricosyl, fluorotetracosyl, fluoropentacosyl, fluorohexacosyl, fluoroheptacosyl, fluorooctacosyl, fluorononacosyl, fluorotriacontyl, difluorobutyl, trifluorobutyl, tetrafluorobutyl, pentafluorobutyl, hexafluorobutyl, heptafluorobutyl, octafluorobutyl; from substituted hydrocarbyl radicals and all isomers of substituted hydrocarbyl radicals including methoxypropyl, methoxybutyl, methoxypentyl, methoxyhexyl, methoxyheptyl, methoxyoctyl, methoxynonyl, methoxydecyl, methoxyundecyl, methoxydodecyl, methoxytridecyl, methoxytetradecyl, methoxypentadecyl, methoxyhexadecyl, methoxyheptadecyl, methoxyoctadecyl, methoxynonadecyl, methoxyeicosyl, methoxyheneicosyl, methoxydocosyl, methoxytricosyl, methoxytetracosyl, methoxypentacosyl, methoxyhexacosyl, methoxyheptacosyl, methoxyoctacosyl, methoxynonacosyl, methoxytriacontyl, butoxypropyl, butoxybutyl, butoxypentyl, butoxyhexyl, butoxyheptyl, butoxyoctyl, butoxynonyl, butoxydecyl, butoxyundecyl, butoxydodecyl, butoxytridecyl, butoxytetradecyl, butoxypentadecyl, butoxyhexadecyl, butoxyheptadecyl, butoxyoctadecyl, butoxynonadecyl, butoxyeicosyl, butoxyheneicosyl, butoxydocosyl, butoxytricosyl, butoxytetracosyl, butoxypentacosyl, butoxyhexacosyl, butoxyheptacosyl, butoxyoctacosyl, butoxynonacosyl, butoxytriacontyl, dimethylaminopropyl, dimethylaminobutyl, dimethylaminopentyl, dimethylaminohexyl, dimethylaminoheptyl, dimethylaminooctyl, dimethylaminononyl, dimethylaminodecyl, dimethylaminoundecyl, dimethylaminododecyl, dimethylaminotridecyl, dimethylaminotetradecyl, dimethylaminopentadecyl, dimethylaminohexadecyl, dimethylaminoheptadecyl, dimethylaminooctadecyl, dimethylaminononadecyl, dimethylaminoeicosyl, dimethylaminoheneicosyl, dimethylaminodocosyl, dimethylaminotricosyl, dimethylaminotetracosyl, dimethylaminopentacosyl, dimethylaminohexacosyl, dimethylaminoheptacosyl, dimethylaminooctacosyl, dimethylaminononacosyl, dimethylaminotriacontyl, trimethylsilylpropyl, trimethylsilylbutyl, trimethylsilylpentyl, trimethylsilylhexyl, trimethylsilylheptyl, trimethylsilyloctyl, trimethylsilylnonyl, trimethylsilyldecyl, trimethylsilylundecyl, trimethylsilyldodecyl, trimethylsilyltridecyl, trimethylsilyltetradecyl, trimethylsilylpentadecyl, trimethylsilylhexadecyl, trimethylsilylheptadecyl, trimethylsilyloctadecyl, trimethylsilylnonadecyl, trimethylsilyleicosyl, trimethylsilylheneicosyl, trimethylsilyldocosyl, trimethylsilyltricosyl, trimethylsilyltetracosyl, trimethylsilylpentacosyl, trimethylsilylhexacosyl, trimethylsilylheptacosyl, trimethylsilyloctacosyl, trimethylsilylnonacosyl, trimethylsilyltriacontyl and the like; from phenyl, and all isomers of hydrocarbyl substituted phenyl including methylphenyl, dimethylphenyl, trimethylphenyl, tetramethylphenyl, pentamethylphenyl ethylphenyl, diethylphenyl, triethylphenyl, tetraethylphenyl, pentaethylphenyl, propylphenyl, dipropylphenyl, tripropylphenyl, tetrapropylphenyl, pentapropylphenyl butylphenyl, dibutylphenyl, tributylphenyl, tetrabutylphenyl, pentabutylphenyl, hexylphenyl, dihexylphenyl, trihexylphenyl, tetrahexylphenyl, pentahexylphenyl, dimethylethylphenyl, dimethylpropylphenyl, dimethylbutylphenyl, dimethylpentylphenyl, dimethylhexylphenyl, diethylmethylphenyl, diethylpropylphenyl, diethylbutylphenyl, diethylpentylphenyl, diethylhexylphenyl, dipropylmethylphenyl, dipropylethylphenyl, dipropylbutylphenyl, dipropylpentylphenyl, dipropylhexylphenyl, dibutylmethylphenyl, dibutylethylphenyl, dibutylpropylphenyl, dibutylpentylphenyl, dibutylhexylphenyl, methylethylphenyl, methylpropylphenyl, methylbutylphenyl, methylpentylphenyl, methylhexylphenyl, ethylpropylphenyl, ethylbutylphenyl, ethylpentylphenyl, ethylhexylphenyl, propylbutylphenyl, propylpentylphenyl, propylhexylphenyl, butylpentylphenyl, butylhexylphenyl, trimethylsilylphenyl, trimethylgermylphenyl, trifluoromethylphenyl, bis(triflouromethyl)phenyl and the like; from all isomers of halo substituted phenyl (where halo is, independently, fluoro, chloro, bromo and iodo) including halophenyl, dihalophenyl, trihalophenyl, tetrahalophenyl, and pentahalophenyl; from all isomers of halo substituted hydrocarbyl substituted phenyl (where halo is, independently, fluoro, chloro, bromo and iodo) including halomethylphenyl, dihalomethylphenyl, trihalomethylphenyl, tetrahalomethylphenyl, haloethlyphenyl, dihaloethylphenyl, trihaloethylphenyl, tetrahaloethylphenyl, halopropylphenyl, dihalopropylphenyl, trihalopropylphenyl, tetrahalopropylphenyl, halobutylphenyl, dihalobutylphenyl, trihalobutylphenyl, tetrahalobutylphenyl, dihalodimethylphenyl, dihalo(trifluoromethyl)phenyl and the like; from all isomers of benzyl, and all isomers of hydrocarbyl substituted benzyl including methylbenzyl, dimethylbenzyl, trimethylbenzyl, tetramethylbenzyl, pentamethylbenzyl ethylbenzyl, diethylbenzyl, triethylbenzyl, tetraethylbenzyl, pentaethylbenzyl, propylbenzyl, dipropylbenzyl, tripropylbenzyl, tetrapropylbenzyl, pentapropylbenzyl butylbenzyl, dibutylbenzyl, tributylbenzyl, tetrabutylbenzyl, pentabutylbenzyl, hexylbenzyl, dihexylbenzyl, trihexylbenzyl, tetrahexylbenzyl, pentahexylbenzyl, dimethylethylbenzyl, dimethylpropylbenzyl, dimethylbutylbenzyl, dimethylpentylbenzyl, dimethylhexylbenzyl, diethylmethylbenzyl, diethylpropylbenzyl, diethylbutylbenzyl, diethylpentylbenzyl, diethylhexylbenzyl, dipropylmethylbenzyl, dipropylethylbenzyl, dipropylbutylbenzyl, dipropylpentylbenzyl, dipropylhexylbenzyl, dibutylmethylbenzyl, dibutylethylbenzyl, dibutylpropylbenzyl, dibutylpentylbenzyl, dibutylhexylbenzyl, methylethylbenzyl, methylpropylbenzyl, methylbutylbenzyl, methylpentylbenzyl, methylhexylbenzyl, ethylpropylbenzyl, ethylbutylbenzyl, ethylpentylbenzyl, ethylhexylbenzyl, propylbutylbenzyl, propylpentylbenzyl, propylhexylbenzyl, butylpentylbenzyl, butylhexylbenzyl, trimethylsilylbenzyl, bis(trimethylsilyl)benzyl, trimethylgermylbenzyl, diphenylmethyl and the like; from trihydrocarbyl-silyl, -germyls, -stannyls and -plumbyls including trimethylsilyl, trimethylgermyl, trimethylstannyl, trimethylplumbyl, triethylsilyl, triethylgermyl, dimethylethylsilyl, dimethylethylgermyl, diethylmethylsilyl, diethylmethylgermyl, triphenylsilyl, triphenylgermyl, and all isomers of tripropylsilyl, tripropylgermyl, tributylsilyl, tributylgermyl, tris(trifluormethyl)silyl, bis(perfluoromethyl)methylsilyl, and the like; from all isomers and hydrocarbyl substituted isomers of polycyclic areneyls including pyrenyl, aceanthrylenyl, acenaphthylene, acephenanthrylenyl, azulenyl biphenylenyl, chrysenyl, coronenyl, fluoranthenyl, fluorenyl, heptacenyl, heptalenyl, heptaphenyl, hexacenyl, hexaphenyl, as-indacenyl, s-indecenyl, indenyl, ovalenyl, pentacenyl, pentalenyl, pentaphenyl, perylenyl, phenalenyl, phenanthrenyl, picenyl, pleiadenyl, pyranhrenyl, rubicenyl, naphthacenyl, tetraphenylenyl, trinaphthylenyl, triphenylenyl, hexahelicenyl, naphthyl, anthracenyl, dibenza[a,b]anthracenyl, indanyl, acenaphthenyl, cholanthrenyl, aceanthrenyl, acephenanthrenyl, 1,2,3,4-tetrahydronapthalene, fullerenyl, and the like; from all isomers and hydrocarbyl substituted isomers of alicyclic monocyclic and polycyclic hydrocarbon rings including cyclopropyl, cyclobutyl, cyclopentyl, cyclohexyl, cyclohexenyl, cycloheptyl, cyclooctyl, cyclononyl, cyclodecyl, cycloundecyl, and cyclododecyl, dimethylcyclohexyl, norbornyl, norbornenyl, adamantyl, cubanyl, prismanyl, spiro[4,5]decanyl, and the like; from all isomers and hydrocarbyl substituted isomers of ring assemblies including biphenyl, bicyclopentyl, terphenyl, quatercyclohexanyl, binaphthyl, binorbornyl, phenyl-terphenyl, and the like; from all isomers and hydrocarbyl substituted isomers of bridged monocyclic and polycyclic arenyls including 1,1-diphenylmethano, 1,1-dinapthyletheno, and the like; from all isomers of heterocycles and hydrocarbyl substituted heterocycles including acridarsinyl, acridinyl, acridophosphinyl, 1H-acrindolinyl, anthrazinyl, anthyridinyl, arsanthridinyl, arsindolyl, arsindolizinyl, arsinolinyl, arsinolizinyl, benzofuranyl, carbazolyl, β-carbolinyl, chromenyl, thiochromenyl, cinnolinyl, furanyl, imidazolyl, indazolyl, indolyl, indolizinyl, isoarsindolyl, isoarsinolinyl, isobenzofuranyl, isochromenyl, isothiochromenyl, isoindolyl, isophosphindolyl, isophosphinolinyl, isoquinolinyl, isothiazolyl, isoxazolyl, naphthyridinyl, oxazolyl, perimidinyl, phenanthrazinyl, phenanthridinyl, phenanthrolinyl, phenazinyl, phosphanthridinyl, phosphindolyl, phosphindolizinyl, phosphinolizinyl, phthalazinyl, pteridinyl, phthaloperinyl, purinyl, pyranyl, thiopyranal, pyrazinyl, pyrazolyl, pyridazinyl, pyridinyl, pyrindinyl, pyrimidinyl, pyrrolyl, pyrrolizinyl, quinazolinyl, quindolinyl, 1H-quinindolinyl, quinolinyl, quinolizinyl, quinoxalinyl, selenophenyl, thebenidinyl, thiazolyl, thiophenyl, triphenodioxazinyl, triphenodithiazinyl, xanthenyl, chromanyl, thiochromanyl, imidazolidinyl, indolinyl, isochromanyl, isothiochromanyl, isoindolinyl, morpholinyl, piperazinyl, piperidinyl, pyrozolidinyl, pyrrolidinyl, quinuclidinyl, dimethylacridarsinyl, dimethylacridinyl, dimethylacridophosphinyl, dimethyl-1H-acrindolinyl, dimethylanthrazinyl, dimethylanthyridinyl, dimethylarsanthridinyl, dimethylarsindolyl, dimethylarsindolizinyl, dimethylarsinolinyl, dimethylarsinolizinyl, dibutylbenzofuranyl, dibutylcarbazolyl, dibutyl-β-carbolinyl, dibutylchromenyl, dibutylthiochromenyl, butylcinnolinyl, dibutylfuranyl, dimethylimidazolyl, dimethylindazolyl, dipropylindolyl, dipropylindolizinyl, dimethylisoarsindolyl, methylisoarsinolinyl, dimethylisobenzofuranyl, diphenylisochromenyl, dibutylisothiochromenyl, phenylisoindolyl, butylisophosphindolyl, dibutylisophosphinolinyl, dimethylisoquinolinyl, methylisothiazolyl, butylisoxazolyl, butylnaphthyridinyl, dimethyloxazolyl, methylphenylperimidinyl, tetrabutylphenanthrazinyl, propylphenanthridinyl, dibutylphenanthrolinyl, tetramethylphenazinyl, butylphosphanthridinyl, phenylphosphindolyl, dimethylphosphindolizinyl, methylphosphinolizinyl, dibutylphthalazinyl, trimethylpteridinyl, methylphthaloperinyl, dimethylpurinyl, dibutylpyranyl, dibutylthiopyranal, trimethylpyrazinyl, phenylpyrazolyl, dipropylpyridazinyl, dimethylpyridinyl, methylpropylpyrindinyl, triethylpyrimidinyl, dibutylpyrrolyl, diethylpyrrolizinyl, dibutylquinazolinyl, dibutylquindolinyl, dibutyl-1H-quinindolinyl, dimethylquinolinyl, propylquinolizinyl, methylquinoxalinyl, methylbutylselenophenyl, methylthebenidinyl, dimethylthiazolyl, trimethylthiophenyl, dibutyltriphenodioxazinyl, dibutyltriphenodithiazinyl, dibutylxanthenyl, trimethylchromanyl, dimethylthiochromanyl, dimethylimidazolidinyl, dimethylindolinyl, dibutylisochromanyl, dibutylisothiochromanyl, phenylisoindolinyl, dibutylmorpholinyl, dimethylpiperazinyl, dimethylpiperidinyl, dimethylpyrozolidinyl, dimethylpyrrolidinyl, bipyridyl, pyrido[2,1,6-de]quinolizinyl, hexamethylquinuclidinyl, 5,7-dioxa-6-phosphadibenzo[a,c]cycloheptene-6-oxide, 9-oxa-10-phosphaphenanthrene-10-oxide and the like.

In some embodiments of the invention, it is preferred that each R' is selected from, hydrogen, methyl, ethyl, n-propyl, iso-propyl, n-butyl, sec-butyl, iso-butyl, tert-butyl, pentyl, hexyl, cyclohexyl, phenyl, diphenylmethyl, or trifluoromethyl.

In some embodiments R' on adjacent atoms may join together to form a substituted or unsubstituted saturated, partially unsaturated or aromatic cyclic or polycyclic ring structure.

Particularly preferred Hc substituents include unsubstituted and hydrocarbyl substituted Hc1(pyrrol-1-yl), Hc2 (imidazol-1-yl), Hc3 (pyrazol-1-yl), Hc4 ([1,2,4]triazol-4-yl), Hc5 (1,2,4]triazol-1-1), Hc8 (phosphol-1-yl), Hc31 (tetrazol-1-yl), Hc32 (tetrazol-2-yl), Hc35 (indol-1-yl), Hc36 (isoindol-2-yl), Hc37 (phosphindol-1-yl), Hc38 (isophosphindol-2-yl), Hc39 (benzoimdazol-1-yl), Hc40(indazol-1-yl), Hc41 (indazol-2-yl), Hc42 (benzotriazol-1-yl), Hc43 (benzotriazol-2-yl), Hc85 (carbazol-9-yl), Hc86 (dibenzophosphol-5-yl), Hc87 (1,2,3,4-tetrahydrocarbazol-9-yl), Hc88 (1,2,3,4-tetrahydrodibenzophosphol-5-yl), Hc89 (1,2,3,4-tetrahydrocyclopenta[b]indol-4-yl), Hc90 (1,2,3,4-tetrahydrocyclopenta[b]phosphindol-4-yl), and Hc91 (phenothiazin-10-yl).

In a preferred embodiment of formula 2, A is the same as the indenyl ligand bonded to M. Particularly preferred embodiments of formula 2 include compounds where:

1) y is zero, z is one, and x is six; and/or
2) M is Ti, Zr, or Hf; and/or
3) each R is, independently, selected from the group consisting of hydrogen radicals, C1 to C20 hydrocarbyls, preferably methyl, ethyl, propyl, butyl, pentyl, hexyl, heptyl, octyl, nonyl, decyl, undecyl, dodecyl, phenyl, substituted phenyls, and all isomers thereof, preferably methyl, ethyl, n-propyl, iso-propyl, butyl, s-butyl, i-butyl, t-butyl, n-hexyl, cyclohexyl, phenyl, tolyl, mesityl, naphthyl; and/or
4) each Hc is, independently, selected from a group consisting of unsubstituted and C1-C20 hydrocarbyl substituted imidazol-1-yl, pyrazol-1-yl, [1,2,3]triazol-4-yl, [1,2,4]triazol-1-yl, tetrazol-1-yl, tetrazol-2-yl, phosphol-1-yl, phosphindol-1-yl, isophosphindol-2-yl, benzoimdazol-1-yl, indazol-1-yl, indazol-2-yl, benzotriazol-1-yl, benzotriazol-2-yl, dibenzophosphol-5-yl, 1,2,3,4-tetrahydrodibenzophosphol-5-yl, 1,2,3,4-tetrahydrocyclopenta[b]phosphindol-4-yl, phenothiazin-10-yl, preferably imidazol-1-yl, methylimidazol-1-yl, dimethylimidazol-1-yl, trimethylimidazol-1-yl, phenylimidazol-1-yl, ethylimidazol-1-yl, propylimidazol-1-yl, butylimidazol-1-yl, pentylimidazol-1-yl, hexylimidazol-1-yl, pyrazol-1-yl, methylpyrazol-1-yl, dimethylpyrazol-1-yl, trimethylpyrazol-1-yl, phenylpyrazol-1-yl, ethylpyrazol-1-yl, propylpyrazol-1-yl, butylpyrazol-1-yl, pentylpyrazol-1-yl, hexylpyrazol-1-yl, [1,2,3]triazol-4-yl, methyl[1,2,3]triazol-4-yl, dimethyl[1,2,3]triazol-4-yl, phenyl[1,2,3]triazol-4-yl, [1,2,4]triazol-1-yl, methyl[1,2,4]triazol-1-yl, dimethyl[1,2,4]triazol-1-yl, phenyl[1,2,4]triazol-1-yl, tetrazol-1-yl, methyltetrazol-1-yl, phenyltetrazol-1-yl, tetrazol-2-yl, methyltetrazol-2-yl, phenyltetrazol-2-yl, benzoimdazol-1-yl, methylbenzoimdazol-1-yl, dimethylbenzoimdazol-1-yl, trimethylbenzoimdazol-1-yl, tetramethylbenzoimdazol-1-yl, pentamethylbenzoimdazol-1-yl, phenylbenzoimdazol-1-yl, ethylbenzoimdazol-1-yl, propylbenzoimdazol-1-yl, butylbenzoimdazol-1-yl, pentylbenzoimdazol-1-yl, hexylbenzoimdazol-1-yl, indazol-1-yl, methylindazol-1-yl, dimethylindazol-1-yl, trimethylindazol-1-yl, tetramethylindazol-1-yl, pentamethylindazol-1-yl, -phenylindazol-1-yl, ethylindazol-1-yl, propylindazol-1-yl, butylindazol-1-yl, pentylindazol-1-yl, hexylindazol-1-yl, indazol-2-yl, methylindazol-2-yl, dimethylindazol-2-yl, trimethylindazol-2-yl, tetramethylindazol-2-yl, pentamethylindazol-2-yl, phenylindazol-2-yl, ethylindazol-2-yl, propylindazol-2-yl, butylindazol-2-yl, pentylindazol-2-yl, hexylindazol-2-yl, benzotriazol-1-yl, methylbenzotriazol-1-yl, dimethylbenzotriazol-1-yl, trimethylbenzotriazol-1-yl, tetramethylbenzotriazol-1-yl, phenylbenzotriazol-1-yl, ethylbenzotriazol-1-yl, propylbenzotriazol-1-yl, butylbenzotriazol-1-yl, pentylbenzotriazol-1-yl, hexylbenzotriazol-1-yl, benzotriazol-2-yl, methylbenzotriazol-2-yl, dimethylbenzotriazol-2-yl, trimethylbenzotriazol-2-yl, tetramethylbenzotriazol-2-yl, phenylbenzotriazol-2-yl, ethylbenzotriazol-2- yl, propylbenzotriazol-2-yl, butylbenzotriazol-2-yl, pentylbenzotriazol-2-yl, hexylbenzotriazol-2-yl, phenothiazin-10-yl, phenoxazin-10-yl; and/or 5) X is, independently, selected from the group consisting of chloride, bromide, fluoride, iodide, hydride, and C1 to C20 hydrocarbyls, preferably methyl, ethyl, propyl, butyl, pentyl, hexyl, phenyl, benzyl, and all isomers thereof, or two X together are selected from C4-C10 dienes, preferably butadiene, methylbutadiene, pentadiene, methylpentadiene, dimethylpentadiene, hexadiene, methylhexadiene, dimethylhexadiene, or from C1-C10 alkylidenes, preferably methylidene, ethylidene, propylidene, or from C3-C10 alkyldiyls, preferably propandiyl, butandiyl, pentandiyl, and hexandiyl.

In another preferred embodiment of formula 2, A is different from the indenyl ligand bonded to M. Particularly preferred embodiments of formula 2 include compounds where:

1) y is zero, z is one or two, x is five or six, and x+y+z=7; and/or

2) M is Ti, Zr, or Hf; and/or 3) each R is, independently, selected from the group consisting of hydrogen radicals, C1 to C20 hydrocarbyls, preferably methyl, ethyl, propyl, butyl, pentyl, hexyl, heptyl, octyl, nonyl, decyl, undecyl, dodecyl, phenyl, substituted phenyls, and all isomers thereof, preferably methyl, ethyl, n-propyl, iso-propyl, butyl, s-butyl, i-butyl, t-butyl, n-hexyl, cyclohexyl, phenyl, tolyl, mesityl, naphthyl; and/or 4) each Hc is, independently, selected from a group consisting of unsubstituted and C1-C20 hydrocarbyl substituted imidazol-1-yl, pyrazol-1-yl, [1,2,3]triazol-4-yl, [1,2,4]triazol-1-yl, tetrazol-1-yl, tetrazol-2-yl, phosphol-1-yl, phosphindol-1-yl, isophosphindol-2-yl, benzoimdazol-1-yl, indazol-1-yl, indazol-2-yl, benzotriazol-1-yl, benzotriazol-2-yl, dibenzophosphol-5-yl, 1,2,3,4-tetrahydrodibenzophosphol-5-yl, 1,2,3,4-tetrahydrocyclopenta[b]phosphindol-4-yl, phenothiazin-10-yl, preferably imidazol-1-yl, methylimidazol-1-yl, dimethylimidazol-1-yl, trimethylimidazol-1-yl, phenylimidazol-1-yl, ethylimidazol-1-yl, propylimidazol-1-yl, butylimidazol-1-yl, pentylimidazol-1-yl, hexylimidazol-1-yl, pyrazol-1-yl, methylpyrazol-1-yl, dimethylpyrazol-1-yl, trimethylpyrazol-1-yl, phenylpyrazol-1-yl, ethylpyrazol-1-yl, propylpyrazol-1-yl, butylpyrazol-1-yl, pentylpyrazol-1-yl, hexylpyrazol-1-yl, [1,2,3]triazol-4-yl, methyl[1,2,3]triazol-4-yl, dimethyl[1,2,3]triazol-4-yl, phenyl[1,2,3]triazol-4-yl, [1,2,4]triazol-1-yl, methyl[1,2,4]triazol-1-yl, dimethyl[1,2,4]triazol-1-yl, phenyl[1,2,4]triazol-1-yl, tetrazol-1-yl, methyltetrazol-1-yl, phenyltetrazol-1-yl, tetrazol-2-yl, methyltetrazol-2-yl, phenyltetrazol-2-yl, benzoimdazol-1-yl, methylbenzoimdazol-1-yl, dimethylbenzoimdazol-1-yl, trimethylbenzoimdazol-1-yl, tetramethylbenzoimdazol-1-yl, pentamethylbenzoimdazol-1-yl, phenylbenzoimdazol-1-yl, ethylbenzoimdazol-1-yl, propylbenzoimdazol-1-yl, butylbenzoimdazol-1-yl, pentylbenzoimdazol-1-yl, hexylbenzoimdazol-1-yl, indazol-1-yl, methylindazol-1-yl, dimethylindazol-1-yl, trimethylindazol-1-yl, tetramethylindazol-1-yl, pentamethylindazol-1-yl, phenylindazol-1-yl, ethylindazol-1-yl, propylindazol-1-yl, butylindazol-1-yl, pentylindazol-1-yl, hexylindazol-1-yl, indazol-2-yl, methylindazol-2-yl, dimethylindazol-2-yl, trimethylindazol-2-yl, tetramethylindazol-2-yl, pentamethylindazol-2-yl, phenylindazol-2-yl, ethylindazol-2-yl, propylindazol-2-yl, butylindazol-2-yl, pentylindazol-2-yl, hexylindazol-2-yl, benzotriazol-1-yl, methylbenzotriazol-1-yl, dimethylbenzotriazol-1-yl, trimethylbenzotriazol-1-yl, tetramethylbenzotriazol-1-yl, phenylbenzotriazol-1-yl, ethylbenzotriazol-1-yl, propylbenzotriazol-1-yl, butylbenzotriazol-1-yl, pentylbenzotriazol-1-yl, hexylbenzotriazol-1-yl, benzotriazol-2-yl, methylbenzotriazol-2-yl, dimethylbenzotriazol-2-yl, trimethylbenzotriazol-2-yl, tetramethylbenzotriazol-2-yl, phenylbenzotriazol-2-yl, ethylbenzotriazol-2-yl, propylbenzotriazol-2-yl, butylbenzotriazol-2-yl, pentylbenzotriazol-2-yl, hexylbenzotriazol-2-yl, phenothiazin-10-yl, phenoxazin-10-yl; and/or 5) X is, independently, selected from the group consisting of chloride, bromide, fluoride, iodide, hydride, and C1 to C20 hydrocarbyls, preferably methyl, ethyl, propyl, butyl, pentyl, hexyl, phenyl, benzyl, and all isomers thereof, or two X together are selected from C4-C10 dienes, preferably butadiene, methylbutadiene, pentadiene, methylpentadiene, dimethylpentadiene, hexadiene, methylhexadiene, dimethylhexadiene, or from C1-C10 alkylidenes, preferably methylidene, ethylidene, propylidene, or from C3-C10 alkyldiyls, preferably propandiyl, butandiyl, pentandiyl, hexandiyl, and/or 6) A is selected from the group consisting of substituted or unsubstituted indenyl, substituted or unsubstituted fluorenyl and substituted or unsubstituted cyclopentadienyl, more preferably, indenyl, methylindenyl, dimethylindenyl, methylphenylindenyl, methyltolylindenyl, methyl(dipropylphenyl)indenyl, methyl(dimethylphenyl)indenyl methylnaphthylindenyl, tetrahydroindenyl, fluorenyl, octahydrofluorenyl, dibutylfluorenyl, cyclopentadienyl, methylcyclopentadienyl, ethylcyclopentadienyl, propylcyclopentadienyl, butylcyclopentadienyl, methylpropylcyclopentadienyl, methylbutylcyclopentadienyl, dimethylcyclopentadienyl, trimethylcyclopentadienyl, tetramethylcyclopentadienyl, and pentamethylcyclopentadienyl.

Still, in another preferred embodiment of formula 2, A is the same as the indenyl ligand bonded to M, y is one, and the complex of formula 2 can be d/l enantiomeric (racemic) or meso, or a mixture of all three isomers. Particularly preferred embodiments of formula 2 include compounds where:

1) Y is 1, z is one or two, x is four or five, and x+y+z=7; and/or

2) M is Ti, Zr, or Hf; and/or 3) each R is, independently, selected from the group consisting of hydrogen radicals, C1 to C20 hydrocarbyls, preferably methyl, ethyl, propyl, butyl, pentyl, hexyl, heptyl, octyl, nonyl, decyl, undecyl, dodecyl, phenyl, substituted phenyls, and all isomers thereof, preferably methyl, ethyl, n-propyl, iso-propyl, butyl, s-butyl, i-butyl, t-butyl, n-hexyl, cyclohexyl, phenyl, tolyl, mesityl, naphthyl; and/or 4) each Hc is, independently selected from a group consisting of unsubstituted and C1-C20 hydrocarbyl substituted imidazol-1-yl, pyrazol-1-yl, [1,2,3]triazol-4-yl, [1,2,4]triazol-1-yl, tetrazol-1-yl, tetrazol-2-yl, phosphol-1-yl, phosphindol-1-yl, isophosphindol-2-yl, benzoimdazol-1-yl, indazol-1-yl, indazol-2-yl, benzotriazol-1-yl, benzotriazol-2-yl, dibenzophosphol-5-yl, 1,2,3,4-tetrahydrodibenzophosphol-5-yl, 1,2,3,4-tetrahydrocyclopenta[b]phosphindol-4-yl, phenothiazin-10-yl, preferably imidazol-1-yl, methylimidazol-1-yl, dimethylimidazol-1-yl, trimethylimidazol-1-yl, phenylimidazol-1-yl, ethylimidazol-1-yl, propylimidazol-1-yl, butylimidazol-1-yl, pentylimidazol-1-yl, hexylimidazol-1-yl, pyrazol-1-yl, methylpyrazol-1-yl, dimethylpyrazol-1-yl, trimethylpyrazol-1-yl, phenylpyrazol-1-yl, ethylpyrazol-1-yl, propylpyrazol-1-yl, butylpyrazol-1-yl, pentylpyrazol-1-yl, hexylpyrazol-1-yl, [1,2,3]triazol-4-yl, methyl[1,2,3]triazol-4-yl, dimethyl[1,2,3]triazol-4-yl, phenyl[1,2,3]triazol-4-yl, [1,2,4]triazol-1-yl, methyl[1,2,4]triazol-1-yl, dimethyl[1,2,4]triazol-1-yl, phenyl[1,2,4]triazol-1-yl, tetrazol-1-yl, methyltetrazol-1-yl, phenyltetrazol-1-yl, tetrazol-2-yl, methyltetrazol-2-yl, phenyltetrazol-2-yl, benzoimdazol-1-yl, methylbenzoimdazol-1-yl, dimethylbenzoimdazol-1-yl, trimethylbenzoimdazol-1-yl, tetramethylbenzoimdazol-1-yl, pentamethylbenzoimdazol-1-yl, phenylbenzoimdazol-1-yl, ethylbenzoimdazol-1-yl, propylbenzoimdazol-1-yl, butylbenzoimdazol-1-yl, pentylbenzoimdazol-1-yl, hexylbenzoimdazol-1-yl, indazol-1-yl, methylindazol-1-yl, dimethylindazol-1-yl, trimethylindazol-1-yl, tetramethylindazol-1-yl, pentamethylindazol-1-yl, phenylindazol-1-yl, ethylindazol-1-yl, propylindazol-1-yl, butylindazol-1-yl, pentylindazol-1-yl, hexylindazol-1-yl, indazol-2-yl, methylindazol-2-yl, dimethylindazol-2-yl, trimethylindazol-2-yl, tetramethylindazol-2-yl, pentamethylindazol-2-yl, phenylindazol-2-yl, ethylindazol-2-yl, propylindazol-2-yl, butylindazol-2-yl, pentylindazol-2-yl, hexylindazol-2-yl, benzotriazol-1-yl, methylbenzotriazol-1-yl, dimethylbenzotriazol-1-yl, trimethylbenzotriazol-1-yl, tetramethylbenzotriazol-1-yl, phenylbenzotriazol-1-yl, ethylbenzotriazol-1-yl, propylbenzotriazol-1-yl, butylbenzotriazol-1-yl, pentylbenzotriazol-1-yl, hexylbenzotriazol-1-yl, benzotriazol-2-yl, methylbenzotriazol-2-yl, dimethylbenzotriazol-2-yl, trimethylbenzotriazol-2-yl, tetramethylbenzotriazol-2-yl, phenylbenzotriazol-2-yl, ethylbenzotriazol-2-yl, propylbenzotriazol-2-yl, butylbenzotriazol-2-yl, pentylbenzotriazol-2-yl, hexylbenzotriazol-2-yl, phenothiazin-10-yl, phenoxazin-10-yl; and/or 5) Y is selected from the group consisting of silylene, germylene, carbylene and carbdiyls, azanediyl, phosphanediyl, boranediyl diradicals or combinations thereof, preferably selected from dihydrocarbylsilylenes including dimethylsilylene, diethylsilylene, dipropylsilylene, dibutylsilylene, dipentylsilylene, dihexylsilylene, methylphenylsilylene, diphenylsilylene, dicyclohexylsilylene, methylcyclohexylsilylene, dibenzylsilylene, tetramethyldisilylene, cyclotrimethylenesilylene, cyclotetramethylenesilylene, cyclopentamethylenesilylene, divinylsilylene, and tetramethyldisiloxylene; dihydrocarbylgermylenes including dimethylgermylene, diethylgermylene, dipropylgermylene, dibutylgermylene, dipentylgermylene, dihexylgermylene, methylphenylgermylene, diphenylgermylene, dicyclohexylgermylene, methylcyclohexylgermylene, cyclotrimethylenegermylene, cyclotetramethylenegermylene, and cyclopentamethylenegermylene; carbylenes and carbdiyls including methylene, dimethylmethylene, diethylmethylene, dibutylmethylene, dipropylmethylene, diphenylmethylene, ditolylmethylene, di(butylphenyl)methylene, di(trimethylsilylphenyl)methylene, dibenzylmethylene, cyclotetramethylenemethylene, cyclopentamethylenemethylene, ethylene, methylethylene, dimethylethylene, trimethylethylene, tetramethylethylene, cyclopropylene, cyclobutylene, cyclopentylene, cyclohexylene, propanediyl, methylpropanediyl, dimethylpropanediyl, trimethylpropanediyl, tetramethylpropanediyl, pentamethylpropanediyl, hexamethylpropanediyl, vinylene, and ethene-1,1-diyl; azanediyls including methylazanediyl, ethylazanediyl, propylazanediyl, butylazanediyl, pentylazanediyl, hexylazanediyl, cyclohexylazanediyl, and phenylazanediyl; phosphanediyls including methylphosphanediyl, ethylphosphanediyl, propylphosphanediyl, butylphosphanediyl, pentylphosphanediyl, hexylphosphanediyl, cyclohexylphosphanediyl, and phenylphosphanediyl; boranediyls including methylboranediyl, ethylboranediyl, propylboranediyl, butylboranediyl, pentylboranediyl, hexylboranediyl, cyclohexylboranediyl, and phenylboranediyl; and combinations thereof including dimethylsilylmethylene, diphenylsilylmethylene, dimethylsilylethylene, methylphenylsilylmethylene; and/or 6) X is, independently, selected from the group consisting of chloride, bromide, fluoride, iodide, hydride, and C1 to C20 hydrocarbyls, preferably methyl, ethyl, propyl, butyl, pentyl, hexyl, phenyl, benzyl, and all isomers thereof, or two X together are selected from C4-C10 dienes, preferably butadiene, methylbutadiene, pentadiene, methylpentadiene, dimethylpentadiene, hexadiene, methylhexadiene, dimethylhexadiene, or from C1-C10 alkylidenes, preferably methylidene, ethylidene, propylidene, or from C3-C10 alkyldiyls, preferably propandiyl, butandiyl, pentandiyl, and hexandiyl.

In a preferred embodiment of formula 3, particularly preferred embodiments include compounds where:

1) y is zero, z is one, z" is one, x is six, and x" is six; and/or

2) M is Ti, Zr, or Hf; and/or 3) each R is, independently, selected from the group consisting of hydrogen radicals, C1 to C20 hydrocarbyls, preferably methyl, ethyl, propyl, butyl, pentyl, hexyl, heptyl, octyl, nonyl, decyl, undecyl, dodecyl, phenyl, substituted phenyls, and all isomers thereof, preferably methyl, ethyl, n-propyl, iso-propyl, butyl, s-butyl, i-butyl, t-butyl, n-hexyl, cyclohexyl, phenyl, tolyl, mesityl, naphthyl; and/or 4) each Hc is, independently, selected from a group consisting of unsubstituted and C1-C20 hydrocarbyl substituted imidazol-1-yl, pyrazol-1-yl, [1,2,3]triazol-4-yl, [1,2,4]triazol-1-yl, tetrazol-1-yl, tetrazol-2-yl, phosphol-1-yl, phosphindol-1-yl, isophosphindol-2-yl, benzoimdazol-1-yl, indazol-1-yl, indazol-2-yl, benzotriazol-1-yl, benzotriazol-2-yl, dibenzophosphol-5-yl, 1,2,3,4-tetrahydrodibenzophosphol-5-yl, 1,2,3,4-tetrahydrocyclopenta[b]phosphindol-4-yl, phenothiazin-10-yl, preferably imidazol-1-yl, methylimidazol-1-yl, dimethylimidazol-1-yl, trimethylimidazol-1-yl, phenylimidazol-1-yl, ethylimidazol-1-yl, propylimidazol-1-yl, butylimidazol-1-yl, pentylimidazol-1-yl, hexylimidazol-1-yl, pyrazol-1-yl, methylpyrazol-1-yl, dimethylpyrazol-1-yl, trimethylpyrazol-1-yl, phenylpyrazol-1-yl, ethylpyrazol-1-yl, propylpyrazol-1-yl, butylpyrazol-1-yl, pentylpyrazol-1-yl, hexylpyrazol-1-yl, [1,2,3]triazol-4-yl, methyl[1,2,3]triazol-4-yl, dimethyl[1,2,3]triazol-4-yl, phenyl[1,2,3]triazol-4-yl, [1,2,4]triazol-1-yl, methyl[1,2,4]triazol-1-yl, dimethyl[1,2,4]triazol-1-yl, phenyl[1,2,4]triazol-1-yl, tetrazol-1-yl, methyltetrazol-1-yl, phenyltetrazol-1-yl, tetrazol-2-yl, methyltetrazol-2-yl, phenyltetrazol-2-yl, benzoimdazol-1-yl, methylbenzoimdazol-1-yl, dimethylbenzoimdazol-1-yl, trimethylbenzoimdazol-1-yl, tetramethylbenzoimdazol-1-yl, pentamethylbenzoimdazol-1-yl, phenylbenzoimdazol-1-yl, ethylbenzoimdazol-1-yl, propylbenzoimdazol-1-yl, butylbenzoimdazol-1-yl, pentylbenzoimdazol-1-yl, hexylbenzoimdazol-1-yl, indazol-1-yl, methylindazol-1-yl, dimethylindazol-1-yl, trimethylindazol-1-yl, tetramethylindazol-1-yl, pentamethylindazol-1-yl, phenylindazol-1-yl, ethylindazol-1-yl, propylindazol-1-yl, butylindazol-1-yl, pentylindazol-1-yl, hexylindazol-1-yl, indazol-2-yl, methylindazol-2-yl, dimethylindazol-2-yl, trimethylindazol-2-yl, tetramethylindazol-2-yl, pentamethylindazol-2-yl, phenylindazol-2-yl, ethylindazol-2-yl, propylindazol-2-yl, butylindazol-2-yl, pentylindazol-2-yl, hexylindazol-2-yl, benzotriazol-1-yl, methylbenzotriazol-1-yl, dimethylbenzotriazol-1-yl, trimethylbenzotriazol-1-yl, tetramethylbenzotriazol-1-yl, phenylbenzotriazol-1-yl, ethylbenzotriazol-1-yl, propylbenzotriazol-1-yl, butylbenzotriazol-1-yl, pentylbenzotriazol-1-yl, hexylbenzotriazol-1-yl, benzotriazol-2-yl, methylbenzotriazol-2-yl, dimethylbenzotriazol-2-yl, trimethylbenzotriazol-2-yl, tetramethylbenzotriazol-2-yl, phenylbenzotriazol-2-yl, ethylbenzotriazol-2-yl, propylbenzotriazol-2-yl, butylbenzotriazol-2-yl, pentylbenzotriazol-2-yl, hexylbenzotriazol-2-yl, phenothiazin-10-yl, phenoxazin-10-yl; and/or 5) X is, independently, selected from the group consisting of chloride, bromide, fluoride, iodide, hydride, and C1 to C20 hydrocarbyls, preferably methyl, ethyl, propyl, butyl, pentyl, hexyl, phenyl, benzyl, and all isomers thereof, or two X together are selected from C4-C10 dienes, preferably butadiene, methylbutadiene, pentadiene, methylpentadiene, dimethylpentadiene, hexadiene, methylhexadiene, dimethylhexadiene, or from C1-C10 alkylidenes, preferably methylidene, ethylidene, propylidene, or from C3-C10 alkyldiyls, preferably propandiyl, butandiyl, pentandiyl, and hexandiyl.

In another preferred embodiment of formula 3, y is one, and the complex can be d/l enantiomeric (racemic) or meso, or a mixture of all three isomers. Particularly preferred embodiments of formula 3 include compounds where:

1) z is one or two, z" is one or two, x is four or five, x" is four or five, x+y+z=7, and x"+y+z"=7, and preferably z=z" and x=x", and/or 2) M is Ti, Zr, or Hf; and/or 3) each R is, independently, selected from the group consisting of hydrogen radicals, C1 to C20 hydrocarbyls, preferably methyl, ethyl, propyl, butyl, pentyl, hexyl, heptyl, octyl, nonyl, decyl, undecyl, dodecyl, phenyl, substituted phenyls, and all isomers thereof, preferably methyl, ethyl, n-propyl, iso-propyl, butyl, s-butyl, i-butyl, t-butyl, n-hexyl, cyclohexyl, phenyl, tolyl, mesityl, naphthyl; and/or 4) each Hc is, independently, selected from a group consisting of unsubstituted and C1-C20 hydrocarbyl substituted imidazol-1-yl, pyrazol-1-yl, [1,2,3]triazol-4-yl, [1,2,4]triazol-1-yl, tetrazol-1-yl, tetrazol-2-yl, phosphol-1-yl, phosphindol-1-yl, isophosphindol-2-yl, benzoimdazol-1-yl, indazol-1-yl, indazol-2-yl, benzotriazol-1-yl, benzotriazol-2-yl, dibenzophosphol-5-yl, 1,2,3,4-tetrahydrodibenzophosphol-5-yl, 1,2,3,4-tetrahydrocyclopenta[b]phosphindol-4-yl, phenothiazin-10-yl, preferably imidazol-1-yl, methylimidazol-1-yl, dimethylimidazol-1-yl, trimethylimidazol-1-yl, phenylimidazol-1-yl, ethylimidazol-1-yl, propylimidazol-1-yl, butylimidazol-1-yl, pentylimidazol-1-yl, hexylimidazol-1-yl, pyrazol-1-yl, methylpyrazol-1-yl, dimethylpyrazol-1-yl, trimethylpyrazol-1-yl, phenylpyrazol-1-yl, ethylpyrazol-1-yl, propylpyrazol-1-yl, butylpyrazol-1-yl, pentylpyrazol-1-yl, hexylpyrazol-1-yl, [1,2,3]triazol-4-yl, methyl[1,2,3]triazol-4-yl, dimethyl[1,2,3]triazol-4-yl, phenyl[1,2,3]triazol-4-yl, [1,2,4]triazol-1-yl, methyl[1,2,4]triazol-1-yl, dimethyl[1,2,4]triazol-1-yl, phenyl[1,2,4]triazol-1-yl, tetrazol-1-yl, methyltetrazol-1-yl, phenyltetrazol-1-yl, tetrazol-2-yl, methyltetrazol-2-yl, phenyltetrazol-2-yl, benzoimdazol-1-yl, methylbenzoimdazol-1-yl, dimethylbenzoimdazol-1-yl, trimethylbenzoimdazol-1-yl, tetramethylbenzoimdazol-1-yl, pentamethylbenzoimdazol-1-yl, phenylbenzoimdazol-1-yl, ethylbenzoimdazol-1-yl, propylbenzoimdazol-1-yl, butylbenzoimdazol-1-yl, pentylbenzoimdazol-1-yl, hexylbenzoimdazol-1-yl, indazol-1-yl, methylindazol-1-yl, dimethylindazol-1-yl, trimethylindazol-1-yl, tetramethylindazol-1-yl, pentamethylindazol-1-yl, phenylindazol-1-yl, ethylindazol-1-yl, propylindazol-1-yl, butylindazol-1-yl, pentylindazol-1-yl, hexylindazol-1-yl, indazol-2-yl, methylindazol-2-yl, dimethylindazol-2-yl, trimethylindazol-2-yl, tetramethylindazol-2-yl, pentamethylindazol-2-yl, phenylindazol-2-yl, ethylindazol-2-yl, propylindazol-2-yl, butylindazol-2-yl, pentylindazol-2-yl, hexylindazol-2-yl, benzotriazol-1-yl, methylbenzotriazol-1-yl, dimethylbenzotriazol-1-yl, trimethylbenzotriazol-1-yl, tetramethylbenzotriazol-1-yl, phenylbenzotriazol-1-yl, ethylbenzotriazol-1-yl, propylbenzotriazol-1-yl, butylbenzotriazol-1-yl, pentylbenzotriazol-1-yl, hexylbenzotriazol-1-yl, benzotriazol-2-yl, methylbenzotriazol-2-yl, dimethylbenzotriazol-2-yl, trimethylbenzotriazol-2-yl, tetramethylbenzotriazol-2-yl, phenylbenzotriazol-2-yl, ethylbenzotriazol-2-yl, propylbenzotriazol-2-yl, butylbenzotriazol-2-yl, pentylbenzotriazol-2-yl, hexylbenzotriazol-2-yl, phenothiazin-10-yl, phenoxazin-10-yl; and/or 5) Y is selected from the group consisting of silylene, germylene, carbylene and carbdiyls, azanediyl, phosphanediyl, boranediyl diradicals or combinations thereof, preferably selected from dihydrocarbylsilylenes including dimethylsilylene, diethylsilylene, dipropylsilylene, dibutylsilylene, dipentylsilylene, dihexylsilylene, methylphenylsilylene, diphenylsilylene, dicyclohexylsilylene, methylcyclohexylsilylene, dibenzylsilylene, tetramethyldisilylene, cyclotrimethylenesilylene, cyclotetramethylenesilylene, cyclopentamethylenesilylene, divinylsilylene, and tetramethyldisiloxylene; dihydrocarbylgermylenes including dimethylgermylene, diethylgermylene, dipropylgermylene, dibutylgermylene, dipentylgermylene, dihexylgermylene, methylphenylgermylene, diphenylgermylene, dicyclohexylgermylene, methylcyclohexylgermylene, cyclotrimethylenegermylene, cyclotetramethylenegermylene, and cyclopentamethylenegermylene; carbylenes and carbdiyls including methylene, dimethylmethylene, diethylmethylene, dibutylmethylene, dipropylmethylene, diphenylmethylene, ditolylmethylene, di(butylphenyl)methylene, di(trimethylsilylphenyl)methylene, dibenzylmethylene, cyclotetramethylenemethylene, cyclopentamethylenemethylene, ethylene, methylethylene, dimethylethylene, trimethylethylene, tetramethylethylene, cyclopropylene, cyclobutylene, cyclopentylene, cyclohexylene, propanediyl, methylpropanediyl, dimethylpropanediyl, trimethylpropanediyl, tetramethylpropanediyl, pentamethylpropanediyl, hexamethylpropanediyl, vinylene, and ethene-1,1-diyl; azanediyls including methylazanediyl, ethylazanediyl, propylazanediyl, butylazanediyl, pentylazanediyl, hexylazanediyl, cyclohexylazanediyl, and phenylazanediyl; phosphanediyls including methylphosphanediyl, ethylphosphanediyl, propylphosphanediyl, butylphosphanediyl, pentylphosphanediyl, hexylphosphanediyl, cyclohexylphosphanediyl, and phenylphosphanediyl; boranediyls including methylboranediyl, ethylboranediyl, propylboranediyl, butylboranediyl, pentylboranediyl, hexylboranediyl, cyclohexylboranediyl, and phenylboranediyl; and combinations thereof including dimethylsilylmethylene, diphenylsilylmethylene, dimethylsilylethylene, methylphenylsilylmethylene; and/or 6) X is, independently, selected from the group consisting of chloride, bromide, fluoride, iodide, hydride, and C1 to C20 hydrocarbyls, preferably methyl, ethyl, propyl, butyl, pentyl, hexyl, phenyl, benzyl, and all isomers thereof, or two X together are selected from C4-C10 dienes, preferably butadiene, methylbutadiene, pentadiene, methylpentadiene, dimethylpentadiene, hexadiene, methylhexadiene, dimethylhexadiene, or from C1-C10 alkylidenes, preferably methylidene, ethylidene, propylidene, or from C3-C10 alkyldiyls, preferably propandiyl, butandiyl, pentandiyl, and hexandiyl.

In a preferred embodiment of formulae 4, 5, 6 and 7, A is the same as the indenyl ligand bonded to M. Particularly preferred embodiments of formulae 4, 5, 6 and 7 include compounds where:

1) M is Ti, Zr, or Hf; and/or
2) each $R^1$, $R^2$, $R^3$, $R^4$, $R^5$, $R^6$, and $R^7$ is, independently, selected from the group consisting of hydrogen radicals, C1 to C20 hydrocarbyls, preferably methyl, ethyl, propyl, butyl, pentyl, hexyl, heptyl, octyl, nonyl, decyl, undecyl, dodecyl, phenyl, substituted phenyls, and all isomers thereof, preferably methyl, ethyl, n-propyl, iso-propyl, butyl, s-butyl, i-butyl, t-butyl, n-hexyl, cyclohexyl, phenyl, tolyl, mesityl, naphthyl; and/or
3) each $Hc^2$, $Hc^4$, and $Hc^6$ is, independently, selected from a group consisting of unsubstituted and C1-C20 hydrocarbyl substituted imidazol-1-yl, pyrazol-1-yl, [1,2,3]triazol-4-yl, [1,2,4]triazol-1-yl, tetrazol-1-yl, tetrazol-2-yl, phosphol-1-yl, phosphindol-1-yl, isophosphindol-2-yl, benzoimdazol-1-yl, indazol-1-yl, indazol-2-yl, benzotriazol-1-yl, benzotriazol-2-yl, dibenzophosphol-5-yl, 1,2,3,4-tetrahydrodibenzophosphol-5-yl, 1,2,3,4-tetrahydrocyclopenta[b]phosphindol-4-yl, phenothiazin-10-yl, preferably imidazol-1-yl, methylimidazol-1-yl, dimethylimidazol-1-yl, trimethylimidazol-1-yl, phenylimidazol-1-yl, ethylimidazol-1-yl, propylimidazol-1-yl, butylimidazol-1-yl, pentylimidazol-1-yl, hexylimidazol-1-yl, pyrazol-1-yl, methylpyrazol-1-yl, dimethylpyrazol-1-yl, trimethylpyrazol-1-yl, phenylpyrazol-1-yl, ethylpyrazol-1-yl, propylpyrazol-1-yl, butylpyrazol-1-yl, pentylpyrazol-1-yl, hexylpyrazol-1-yl, [1,2,3]triazol-4-yl, methyl[1,2,3]triazol-4-yl, dimethyl[1,2,3]triazol-4-yl, phenyl[1,2,3]triazol-4-yl, [1,2,4]triazol-1-yl, methyl[1,2,4]triazol-1-yl, dimethyl[1,2,4]triazol-1-yl, phenyl[1,2,4]triazol-1-yl, tetrazol-1-yl, methyltetrazol-1-yl, phenyltetrazol-1-yl, tetrazol-2-yl, methyltetrazol-2-yl, phenyltetrazol-2-yl, benzoimdazol-1-yl, methylbenzoimdazol-1-yl, dimethylbenzoimdazol-1-yl, trimethylbenzoimdazol-1-yl, tetramethylbenzoimdazol-1-yl, pentamethylbenzoimdazol-1-yl, phenylbenzoimdazol-1-yl, ethylbenzoimdazol-1-yl, propylbenzoimdazol-1-yl, butylbenzoimdazol-1-yl, pentylbenzoimdazol-1-yl, hexylbenzoimdazol-1-yl, indazol-1-yl, methylindazol-1-yl, dimethylindazol-1-yl, trimethylindazol-1-yl, tetramethylindazol-1-yl, pentamethylindazol-1-yl, phenylindazol-1-yl, ethylindazol-1-yl, propylindazol-1-yl, butylindazol-1-yl, pentylindazol-1-yl, hexylindazol-1-yl, indazol-2-yl, methylindazol-2-yl, dimethylindazol-2-yl, trimethylindazol-2-yl, tetramethylindazol-2-yl, pentamethylindazol-2-yl, phenylindazol-2-yl, ethylindazol-2-yl, propylindazol-2-yl, butylindazol-2-yl, pentylindazol-2-yl, hexylindazol-2-yl, benzotriazol-1-yl, methylbenzotriazol-1-yl, dimethylbenzotriazol-1-yl, trimethylbenzotriazol-1-yl, tetramethylbenzotriazol-1-yl, phenylbenzotriazol-1-yl, ethylbenzotriazol-1-yl, propylbenzotriazol-1-yl, butylbenzotriazol-1-yl, pentylbenzotriazol-1-yl, hexylbenzotriazol-1-yl, benzotriazol-2-yl, methylbenzotriazol-2-yl, dimethylbenzotriazol-2-yl, trimethylbenzotriazol-2-yl, tetramethylbenzotriazol-2-yl, phenylbenzotriazol-2-yl, ethylbenzotriazol-2-yl, propylbenzotriazol-2-yl, butylbenzotriazol-2-yl, pentylbenzotriazol-2-yl, hexylbenzotriazol-2-yl, phenothiazin-10-yl, phenoxazin-10-yl; and/or
4) X is, independently, selected from the group consisting of chloride, bromide, fluoride, iodide, hydride, and C1 to C20 hydrocarbyls, preferably methyl, ethyl, propyl, butyl, pentyl, hexyl, phenyl, benzyl, and all isomers thereof, or two X together are selected from C4-C10 dienes, preferably butadiene, methylbutadiene, pentadiene, methylpentadiene, dimethylpentadiene, hexadiene, methylhexadiene, dimethylhexadiene, or from C1-$C_{10}$ alkylidenes, preferably methylidene, ethylidene, propylidene, or from C3-C10 alkyldiyls, preferably propandiyl, butandiyl, pentandiyl, and hexandiyl.

In another preferred embodiment of formulae 4, 5, 6 and 7, A is different from the indenyl ligand bonded to M. Particularly preferred embodiments of formulae 4, 5, 6 and 7 include compounds where:

1) M is Ti, Zr, or Hf; and/or
2) each $R^1$, $R^2$, $R^3$, $R^4$, $R^5$, $R^6$, and $R^7$ is, independently, selected from the group consisting of hydrogen radicals, C1 to C20 hydrocarbyls, preferably methyl, ethyl, propyl, butyl, pentyl, hexyl, heptyl, octyl, nonyl, decyl, undecyl, dodecyl, phenyl, substituted phenyls, and all isomers thereof, preferably methyl, ethyl, n-propyl, iso-propyl, butyl, s-butyl, i-butyl, t-butyl, n-hexyl, cyclohexyl, phenyl, tolyl, mesityl, naphthyl; and/or
3) each $Hc^2$, $Hc^4$, and $Hc^6$ is, independently, selected from a group consisting of unsubstituted and C1-C20 hydrocarbyl substituted imidazol-1-yl, pyrazol-1-yl, [1,2,3]triazol-4-yl, [1,2,4]triazol-1-yl, tetrazol-1-yl, tetrazol-2-yl, phosphol-1-yl, phosphindol-1-yl, isophosphindol-2-yl, benzoimdazol-1-yl, indazol-1-yl, indazol-2-yl, benzotriazol-1-yl, benzotriazol-2-yl, dibenzophosphol-5-yl, 1,2,3,4-tetrahydrodibenzophosphol-5-yl, 1,2,3,4-tetrahydrocyclopenta[b]phosphindol-4-yl, phenothiazin-10-yl, preferably imidazol-1-yl, methylimidazol-1-yl, dimethylimidazol-1-yl, trimethylimidazol-1-yl, phenylimidazol-1-yl, ethylimidazol-1-yl, propylimidazol-1-yl, butylimidazol-1-yl, pentylimidazol-1-yl, hexylimidazol-1-yl, pyrazol-1-yl, methylpyrazol-1-yl, dimethylpyrazol-1-yl, trimethylpyrazol-1-yl, phenylpyrazol-1-yl, ethylpyrazol-1-yl, propylpyrazol-1-yl, butylpyrazol-1-yl, pentylpyrazol-1-yl, hexylpyrazol-1-yl, [1,2,3]triazol-4-yl, methyl[1,2,3]triazol-4-yl, dimethyl[1,2,3]triazol-4-yl, phenyl[1,2,3]triazol-4-yl, [1,2,4]triazol-1-yl, methyl[1,2,4]triazol-1-yl, dimethyl[1,2,4]triazol-1-yl, phenyl[1,2,4]triazol-1-yl, tetrazol-1-yl, methyltetrazol-1-yl, phenyltetrazol-1-yl, tetrazol-2-yl, methyltetrazol-2-yl, phenyltetrazol-2-yl, benzoimdazol-1-yl, methylbenzoimdazol-1-yl, dimethylbenzoimdazol-1-yl, trimethylbenzoimdazol-1-yl, tetramethylbenzoimdazol-1-yl, pentamethylbenzoimdazol-1-yl, phenylbenzoimdazol-1-yl, ethylbenzoimdazol-1-yl, propylbenzoimdazol-1-yl, butylbenzoimdazol-1-yl, pentylbenzoimdazol-1-yl, hexylbenzoimdazol-1-yl, indazol-1-yl, methylindazol-1-yl, dimethylindazol-1-yl, trimethylindazol-1-yl, tetramethylindazol-1-yl, pentamethylindazol-1-yl, phenylindazol-1-yl, ethylindazol-1-yl, propylindazol-1-yl, butylindazol-1-yl, pentylindazol-1-yl, hexylindazol-1-yl, indazol-2-yl, methylindazol-2-yl, dimethylindazol-2-yl, trimethylindazol-2-yl, tetramethylindazol-2-yl, pentamethylindazol-2-yl, phenylindazol-2-yl, ethylindazol-2-yl, propylindazol-2-yl, butylindazol-2-yl, pentylindazol-2-yl, hexylindazol-2-yl, benzotriazol-1-yl, methylbenzotriazol-1-yl, dimethylbenzotriazol-1-yl, trimethylbenzotriazol-1-yl, tetramethylbenzotriazol-1-yl, phenylbenzotriazol-1-yl, ethylbenzotriazol-1-yl, propylbenzotriazol-1-yl, butylbenzotriazol-1-yl, pentylbenzotriazol-1-yl, hexylbenzotriazol-1-yl, benzotriazol-2-yl, methylbenzotriazol-2-yl, dimethylbenzotriazol-2-yl, trimethylbenzotriazol-2-yl, tetramethylbenzotriazol-2-yl, phenylbenzotriazol-2-yl, ethylbenzotriazol-2-yl, propylbenzotriazol-2-yl, butylbenzotriazol-2-yl, pentylbenzotriazol-2-yl, hexylbenzotriazol-2-yl, phenothiazin-10-yl, phenoxazin-10-yl; and/or 4) X is, independently, selected from the group consisting of chloride, bromide, fluoride, iodide, hydride, and C1 to C20 hydrocarbyls, preferably methyl, ethyl, propyl, butyl, pentyl, hexyl, phenyl, benzyl, and all isomers thereof, or two X together are selected from C4-C10 dienes, preferably butadiene, methylbutadiene, pentadiene, methylpentadiene, dimethylpentadiene, hexadiene, methylhexadiene, dimethylhexadiene, or from C1-C10 alkylidenes, preferably methylidene, ethylidene, propylidene, or from C3-C10 alkyldiyls, preferably propandiyl, butandiyl, pentandiyl, hexandiyl, and/or 5) A is selected from the group consisting of substituted or unsubstituted indenyl, substituted or unsubstituted fluorenyl and substituted or unsubstituted cyclopentadienyl, more preferably, indenyl, methylindenyl, dimethylindenyl, methylphenylindenyl, methyltolylindenyl, methyl(dipropylphenyl)indenyl, methyl(dimethylphenyl)indenyl methylnaphthylindenyl, tetrahydroindenyl, fluorenyl, octahydrofluorenyl, dibutylfluorenyl, cyclopentadienyl, methylcyclopentadienyl, ethylcyclopentadienyl, propylcyclopentadienyl, butylcyclopentadienyl, methylpropylcyclopentadienyl, methylbutylcyclopentadienyl, dimethylcyclopentadienyl, trimethylcyclopentadienyl, tetramethylcyclopentadienyl, and pentamethylcyclopentadienyl.

In a preferred embodiment of formulae 8, 9, 10 and 11, particularly preferred embodiments include compounds where:

1) M is Ti, Zr, or Hf; and/or 2) each $R^1$, $R^2$, $R^3$, $R^4$, $R^5$, $R^6$, $R^7$, $R^8$, $R^9$, $R^{10}$, $R^{11}$, $R^{12}$, $R^{13}$, and $R^{14}$ is, independently, selected from the group consisting of hydrogen radicals, C1 to C20 hydrocarbyls, preferably methyl, ethyl, propyl, butyl, pentyl, hexyl, heptyl, octyl, nonyl, decyl, undecyl, dodecyl, phenyl, substituted phenyls, and all isomers thereof, preferably methyl, ethyl, n-propyl, iso-propyl, butyl, s-butyl, i-butyl, t-butyl, n-hexyl, cyclohexyl, phenyl, tolyl, mesityl, naphthyl; and/or 3) each $Hc^2$, $Hc^4$, $Hc^6$, $Hc^9$, $Hc^{11}$ and $Hc^{13}$ is, independently, selected from a group consisting of unsubstituted and C1-C20 hydrocarbyl substituted imidazol-1-yl, pyrazol-1-yl, [1,2,3]triazol-4-yl, [1,2,4]triazol-1-yl, tetrazol-1-yl, tetrazol-2-yl, phosphol-1-yl, phosphindol-1-yl, isophosphindol-2-yl, benzoimdazol-1-yl, indazol-1-yl, indazol-2-yl, benzotriazol-1-yl, benzotriazol-2-yl, dibenzophosphol-5-yl, 1,2,3,4-tetrahydrodibenzophosphol-5-yl, 1,2,3,4-tetrahydrocyclopenta[b]phosphindol-4-yl, phenothiazin-10-yl, preferably imidazol-1-yl, methylimidazol-1-yl, dimethylimidazol-1-yl, trimethylimidazol-1-yl, phenylimidazol-1-yl, ethylimidazol-1-yl, propylimidazol-1-yl, butylimidazol-1-yl, pentylimidazol-1-yl, hexylimidazol-1-yl, pyrazol-1-yl, methylpyrazol-1-yl, dimethylpyrazol-1-yl, trimethylpyrazol-1-yl, phenylpyrazol-1-yl, ethylpyrazol-1-yl, propylpyrazol-1-yl, butylpyrazol-1-yl, pentylpyrazol-1-yl, hexylpyrazol-1-yl, [1,2,3]triazol-4-yl, methyl[1,2,3]triazol-4-yl, dimethyl[1,2,3]triazol-4-yl, phenyl[1,2,3]triazol-4-yl, [1,2,4]triazol-1-yl, methyl[1,2,4]triazol-1-yl, dimethyl[1,2,4]triazol-1-yl, phenyl[1,2,4]triazol-1-yl, tetrazol-1-yl, methyltetrazol-1-yl, phenyltetrazol-1-yl, tetrazol-2-yl, methyltetrazol-2-yl, phenyltetrazol-2-yl, benzoimdazol-1-yl, methylbenzoimdazol-1-yl, dimethylbenzoimdazol-1-yl, trimethylbenzoimdazol-1-yl, tetramethylbenzoimdazol-1-yl, pentamethylbenzoimdazol-1-yl, phenylbenzoimdazol-1-yl, ethylbenzoimdazol-1-yl, propylbenzoimdazol-1-yl, butylbenzoimdazol-1-yl, pentylbenzoimdazol-1-yl, hexylbenzoimdazol-1-yl, indazol-1-yl, methylindazol-1-yl, dimethylindazol-1-yl, trimethylindazol-1-yl, tetramethylindazol-1-yl, pentamethylindazol-1-yl, phenylindazol-1-yl, ethylindazol-1-yl, propylindazol-1-yl, butylindazol-1-yl, pentylindazol-1-yl, hexylindazol-1-yl, indazol-2-yl, methylindazol-2-yl, dimethylindazol-2-yl, trimethylindazol-2-yl, tetramethylindazol-2-yl, pentamethylindazol-2-yl, phenylindazol-2-yl, ethylindazol-2-yl, propylindazol-2-yl, butylindazol-2-yl, pentylindazol-2-yl, hexylindazol-2-yl, benzotriazol-1-yl, methylbenzotriazol-1-yl, dimethylbenzotriazol-1-yl, trimethylbenzotriazol-1-yl, tetramethylbenzotriazol-1-yl, phenylbenzotriazol-1-yl, ethylbenzotriazol-1-yl, propylbenzotriazol-1-yl, butylbenzotriazol-1-yl, pentylbenzotriazol-1-yl, hexylbenzotriazol-1-yl, benzotriazol-2-yl, methylbenzotriazol-2-yl, dimethylbenzotriazol-2-yl, trimethylbenzotriazol-2-yl, tetramethylbenzotriazol-2-yl, phenylbenzotriazol-2-yl, ethylbenzotriazol-2-yl, propylbenzotriazol-2-yl, butylbenzotriazol-2-yl, pentylbenzotriazol-2-yl, hexylbenzotriazol-2-yl, phenothiazin-10-yl, phenoxazin-10-yl; and/or 4) X is, independently, selected from the group consisting of chloride, bromide, fluoride, iodide, hydride, and C1 to C20 hydrocarbyls, preferably methyl, ethyl, propyl, butyl, pentyl, hexyl, phenyl, benzyl, and all isomers thereof, or two X together are selected from C4-C10 dienes, preferably butadiene, methylbutadiene, pentadiene, methylpentadiene, dimethylpentadiene, hexadiene, methylhexadiene, dimethylhexadiene, or from C1-C10 alkylidenes, preferably methylidene, ethylidene, propylidene, or from C3-C10 alkyldiyls, preferably propandiyl, butandiyl, pentandiyl, and hexandiyl.

In a preferred embodiment of formulae 12, 13, and 14, A is different from the indenyl ligand bonded to M. Particularly preferred embodiments of formulae 12, 13 and 14, include compounds where:

1) M is Ti, Zr, or Hf; and/or 2) each $R^2$, $R^3$, $R^4$, $R^5$, $R^6$, and $R^7$ is, independently, selected from the group consisting of hydrogen radicals, C1 to C20 hydrocarbyls, preferably methyl, ethyl, propyl, butyl, pentyl, hexyl, heptyl, octyl, nonyl, decyl, undecyl, dodecyl, phenyl, substituted phenyls, and all isomers thereof, preferably methyl, ethyl, n-propyl, iso-propyl, butyl, s-butyl, i-butyl, t-butyl, n-hexyl, cyclohexyl, phenyl, tolyl, mesityl, naphthyl; and/or 3) each $Hc^4$ and $Hc^6$ is, selected from a group consisting of unsubstituted and C1-C20 hydrocarbyl substituted imidazol-1-yl, pyrazol-1-yl, [1,2,3]triazol-4-yl, [1,2,4]triazol-1-yl, tetrazol-1-yl, tetrazol-2-yl, phosphol-1-yl, phosphindol-1-yl, isophosphindol-2-yl, benzoimdazol-1-yl, indazol-1-yl, indazol-2-yl, benzotriazol-1-yl, benzotriazol-2-yl, dibenzophosphol-5-yl, 1,2,3,4-tetrahydrodibenzophosphol-5-yl, 1,2,3,4-tetrahydrocyclopenta[b]phosphindol-4-yl, phenothiazin-10-yl, preferably imidazol-1-yl, methylimidazol-1-yl, dimethylimidazol-1-yl, trimethylimidazol-1-yl, phenylimidazol-1-yl, ethylimidazol-1-yl, propylimidazol-1-yl, butylimidazol-1-yl, pentylimidazol-1-yl, hexylimidazol-1-yl, pyrazol-1-yl, methylpyrazol-1-yl, dimethylpyrazol-1-yl, trimethylpyrazol-1-yl, phenylpyrazol-1-yl, ethylpyrazol-1-yl, propylpyrazol-1-yl, butylpyrazol-1-yl, pentylpyrazol-1-yl, hexylpyrazol- 1-yl, [1,2,3]triazol-4-yl, methyl[1,2,3]triazol-4-yl, dimethyl[1,2,3]triazol-4-yl, phenyl[1,2,3]triazol-4-yl, [1,2,4]triazol-1-yl, methyl[1,2,4]triazol-1-yl, dimethyl[1,2,4]triazol-1-yl, phenyl[1,2,4]triazol-1-yl, tetrazol-1-yl, methyltetrazol-1-yl, phenyltetrazol-1-yl, tetrazol-2-yl, methyltetrazol-2-yl, phenyltetrazol-2-yl, benzoimdazol-1-yl, methylbenzoimdazol-1-yl, dimethylbenzoimdazol-1-yl, trimethylbenzoimdazol-1-yl, tetramethylbenzoimdazol-1-yl, pentamethylbenzoimdazol-1-yl, phenylbenzoimdazol-1-yl, ethylbenzoimdazol-1-yl, propylbenzoimdazol-1-yl, butylbenzoimdazol-1-yl, pentylbenzoimdazol-1-yl, hexylbenzoimdazol-1-yl, indazol-1-yl, methylindazol-1-yl, dimethylindazol-1-yl, trimethylindazol-1-yl, tetramethylindazol-1-yl, pentamethylindazol-1-yl, phenylindazol-1-yl, ethylindazol-1-yl, propylindazol-1-yl, butylindazol-1-yl, pentylindazol-1-yl, hexylindazol-1-yl, indazol-2-yl, methylindazol-2-yl, dimethylindazol-2-yl, trimethylindazol-2-yl, tetramethylindazol-2-yl, pentamethylindazol-2-yl, phenylindazol-2-yl, ethylindazol-2-yl, propylindazol-2-yl, butylindazol-2-yl, pentylindazol-2-yl, hexylindazol-2-yl, benzotriazol-1-yl, methylbenzotriazol-1-yl, dimethylbenzotriazol-1-yl, trimethylbenzotriazol-1-yl, tetramethylbenzotriazol-1-yl, phenylbenzotriazol-1-yl, ethylbenzotriazol-1-yl, propylbenzotriazol-1-yl, butylbenzotriazol-1-yl, pentylbenzotriazol-1-yl, hexylbenzotriazol-1-yl, benzotriazol-2-yl, methylbenzotriazol-2-yl, dimethylbenzotriazol-2-yl, trimethylbenzotriazol-2-yl, tetramethylbenzotriazol-2-yl, phenylbenzotriazol-2-yl, ethylbenzotriazol-2-yl, propylbenzotriazol-2-yl, butylbenzotriazol-2-yl, pentylbenzotriazol-2-yl, hexylbenzotriazol-2-yl, phenothiazin-10-yl, phenoxazin-10-yl; and/or 4) Y is selected from the group consisting of silylene, germylene, carbylene and carbdiyls, azanediyl, phosphanediyl, boranediyl diradicals or combinations thereof, preferably selected from dihydrocarbylsilylenes including dimethylsilylene, diethylsilylene, dipropylsilylene, dibutylsilylene, dipentylsilylene, dihexylsilylene, methylphenylsilylene, diphenylsilylene, dicyclohexylsilylene, methylcyclohexylsilylene, dibenzylsilylene, tetramethyldisilylene, cyclotrimethylenesilylene, cyclotetramethylenesilylene, cyclopentamethylenesilylene, divinylsilylene, and tetramethyldisiloxylene; dihydrocarbylgermylenes including dimethylgermylene, diethylgermylene, dipropylgermylene, dibutylgermylene, dipentylgermylene, dihexylgermylene, methylphenylgermylene, diphenylgermylene, dicyclohexylgermylene, methylcyclohexylgermylene, cyclotrimethylenegermylene, cyclotetramethylenegermylene, and cyclopentamethylenegermylene; carbylenes and carbdiyls including methylene, dimethylmethylene, diethylmethylene, dibutylmethylene, dipropylmethylene, diphenylmethylene, ditolylmethylene, di(butylphenyl)methylene, di(trimethylsilylphenyl)methylene, dibenzylmethylene, cyclotetramethylenemethylene, cyclopentamethylenemethylene, ethylene, methylethylene, dimethylethylene, trimethylethylene, tetramethylethylene, cyclopropylene, cyclobutylene, cyclopentylene, cyclohexylene, propanediyl, methylpropanediyl, dimethylpropanediyl, trimethylpropanediyl, tetramethylpropanediyl, pentamethylpropanediyl, hexamethylpropanediyl, vinylene, and ethene-1,1-diyl; azanediyls including methylazanediyl, ethylazanediyl, propylazanediyl, butylazanediyl, pentylazanediyl, hexylazanediyl, cyclohexylazanediyl, and phenylazanediyl; phosphanediyls including methylphosphanediyl, ethylphosphanediyl, propylphosphanediyl, butylphosphanediyl, pentylphosphanediyl, hexylphosphanediyl, cyclohexylphosphanediyl, and phenylphosphanediyl; boranediyls including methylboranediyl, ethylboranediyl, propylboranediyl, butylboranediyl, pentylboranediyl, hexylboranediyl, cyclohexylboranediyl, and phenylboranediyl; and combinations thereof including dimethylsilylmethylene, diphenylsilylmethylene, dimethylsilylethylene, methylphenylsilylmethylene; and/or 5) X is, independently, selected from the group consisting of chloride, bromide, fluoride, iodide, hydride, and C1 to C20 hydrocarbyls, preferably methyl, ethyl, propyl, butyl, pentyl, hexyl, phenyl, benzyl, and all isomers thereof, or two X together are selected from C4-C10 dienes, preferably butadiene, methylbutadiene, pentadiene, methylpentadiene, dimethylpentadiene, hexadiene, methylhexadiene, dimethylhexadiene, or from C1-C10 alkylidenes, preferably methylidene, ethylidene, propylidene, or from C3-C10 alkyldiyls, preferably propandiyl, butandiyl, pentandiyl, hexandiyl, and/or 5) A is selected from the group consisting of substituted or unsubstituted indenyl, substituted or unsubstituted fluorenyl and substituted or unsubstituted cyclopentadienyl, more preferably, indenyl, methylindenyl, dimethylindenyl, methylphenylindenyl, methyltolylindenyl, methyl(dipropylphenyl)indenyl, methyl(dimethylphenyl)indenyl methylnaphthylindenyl, tetrahydroindenyl, fluorenyl, octahydrofluorenyl, dibutylfluorenyl, cyclopentadienyl, methylcyclopentadienyl, ethylcyclopentadienyl, propylcyclopentadienyl, butylcyclopentadienyl, methylpropylcyclopentadienyl, methylbutylcyclopentadienyl, dimethylcyclopentadienyl, trimethylcyclopentadienyl, and tetramethylcyclopentadienyl.

In a preferred embodiment of formula 15, the complex can be d/l enantiomeric (racemic) or meso, or a mixture of all three isomers. Particularly preferred embodiments of formula 15 include compounds where:

1) M is Ti, Zr, or Hf; and/or 2) each $R^2$, $R^3$, $R^5$, $R^6$, $R^7$, $R^9$, $R^{10}$, $R^{12}$, $R^{13}$, and $R^{14}$ is, independently, selected from the group consisting of hydrogen radicals, C1 to C20 hydrocarbyls, preferably methyl, ethyl, propyl, butyl, pentyl, hexyl, heptyl, octyl, nonyl, decyl, undecyl, dodecyl, phenyl, substituted phenyls, and all isomers thereof, preferably methyl, ethyl, n-propyl, iso-propyl, butyl, s-butyl, i-butyl, t-butyl, n-hexyl, cyclohexyl, phenyl, tolyl, mesityl, naphthyl; and/or 3) each $Hc^4$ and $Hc^{11}$ is, independently, selected from a group consisting of unsubstituted and C1-C20 hydrocarbyl substituted imidazol-1-yl, pyrazol-1-yl, [1,2,3]triazol-4-yl, [1,2,4]triazol-1-yl, tetrazol-1-yl, tetrazol-2-yl, phosphol-1-yl, phosphindol-1-yl, isophosphindol-2-yl, benzoimdazol-1-yl, indazol-1-yl, indazol-2-yl, benzotriazol-1-yl, benzotriazol-2-yl, dibenzophosphol-5-yl, 1,2,3,4-tetrahydrodibenzophosphol-5-yl, 1,2,3,4-tetrahydrocyclopenta[b]phosphindol-4-yl, phenothiazin-10-yl, preferably imidazol-1-yl, methylimidazol-1-yl, dimethylimidazol-1-yl, trimethylimidazol-1-yl, phenylimidazol-1-yl, ethylimidazol-1-yl, propylimidazol-1-yl, butylimidazol-1-yl, pentylimidazol-1-yl, hexylimidazol-1-yl, pyrazol-1-yl, methylpyrazol-1-yl, dimethylpyrazol-1-yl, trimethylpyrazol-1-yl, phenylpyrazol-1-yl, ethylpyrazol-1-yl, propylpyrazol-1-yl, butylpyrazol-1-yl, pentylpyrazol-1-yl, hexylpyrazol-1-yl, [1,2,3]triazol-4-yl, methyl[1,2,3]triazol-4-yl, dimethyl[1,2,3]triazol-4-yl, phenyl[1,2,3]triazol-4-yl, [1,2,4]triazol-1-yl, methyl[1,2,4]triazol-1-yl, dimethyl[1,2,4]triazol-1-yl, phenyl[1,2,4]triazol-1-yl, tetrazol-1-yl, methyltetrazol-1-yl, phenyltetrazol-1-yl, tetrazol-2-yl, methyltetrazol-2-yl, phenyltetrazol-2-yl, benzoimdazol-1-yl, methylbenzoimdazol-1-yl, dimethylbenzoimdazol-1-yl, trimethylbenzoimdazol-1-yl, tetramethylbenzoimdazol-1-yl, pentamethylbenzoimdazol-1-yl, phenylbenzoimdazol-1-yl, ethylbenzoimdazol-1-yl, propylbenzoimdazol-1-yl, butylbenzoimdazol-1-yl, pentylbenzoimdazol-1-yl, hexylbenzoimdazol-1-yl, indazol-1-yl, methylindazol-1-yl, dimethylindazol-1-yl, trimethylindazol-1-yl, tetramethylindazol-1-yl, pentamethylindazol-1-yl, phenylindazol-1-yl, ethylindazol-1-yl, propylindazol-1-yl, butylindazol-1-yl, pentylindazol-1-yl, hexylindazol-1-yl, indazol-2-yl, methylindazol-2-yl, dimethylindazol-2-yl, trimethylindazol-2-yl, tetramethylindazol-2-yl, pentamethylindazol-2-yl, phenylindazol-2-yl, ethylindazol-2-yl, propylindazol-2-yl, butylindazol-2-yl, pentylindazol-2-yl, hexylindazol-2-yl, benzotriazol-1-yl, methylbenzotriazol-1-yl, dimethylbenzotriazol-1-yl, trimethylbenzotriazol-1-yl, tetramethylbenzotriazol-1-yl, phenylbenzotriazol-1-yl, ethylbenzotriazol-1-yl, propylbenzotriazol-1-yl, butylbenzotriazol-1-yl, pentylbenzotriazol-1-yl, hexylbenzotriazol-1-yl, benzotriazol-2-yl, methylbenzotriazol-2-yl, dimethylbenzotriazol-2-yl, trimethylbenzotriazol-2-yl, tetramethylbenzotriazol-2-yl, phenylbenzotriazol-2-yl, ethylbenzotriazol-2-yl, propylbenzotriazol-2-yl, butylbenzotriazol-2-yl, pentylbenzotriazol-2-yl, hexylbenzotriazol-2-yl, phenothiazin-10-yl, phenoxazin-10-yl; and/or 4) Y is selected from the group consisting of silylene, germylene, carbylene and carbdiyls, azanediyl, phosphanediyl, boranediyl diradicals or combinations thereof, preferably selected from dihydrocarbylsilylenes including dimethylsilylene, diethylsilylene, dipropylsilylene, dibutylsilylene, dipentylsilylene, dihexylsilylene, methylphenylsilylene, diphenylsilylene, dicyclohexylsilylene, methylcyclohexylsilylene, dibenzylsilylene, tetramethyldisilylene, cyclotrimethylenesilylene, cyclotetramethylenesilylene, cyclopentamethylenesilylene, divinylsilylene, and tetramethyldisiloxylene; dihydrocarbylgermylenes including dimethylgermylene, diethylgermylene, dipropylgermylene, dibutylgermylene, dipentylgermylene, dihexylgermylene, methylphenylgermylene, diphenylgermylene, dicyclohexylgermylene, methylcyclohexylgermylene, cyclotrimethylenegermylene, cyclotetramethylenegermylene, and cyclopentamethylenegermylene; carbylenes and carbdiyls including methylene, dimethylmethylene, diethylmethylene, dibutylmethylene, dipropylmethylene, diphenylmethylene, ditolylmethylene, di(butylphenyl)methylene, di(trimethylsilylphenyl)methylene, dibenzylmethylene, cyclotetramethylenemethylene, cyclopentamethylenemethylene, ethylene, methylethylene, dimethylethylene, trimethylethylene, tetramethylethylene, cyclopropylene, cyclobutylene, cyclopentylene, cyclohexylene, propanediyl, methylpropanediyl, dimethylpropanediyl, trimethylpropanediyl, tetramethylpropanediyl, pentamethylpropanediyl, hexamethylpropanediyl, vinylene, and ethene-1,1-diyl; azanediyls including methylazanediyl, ethylazanediyl, propylazanediyl, butylazanediyl, pentylazanediyl, hexylazanediyl, cyclohexylazanediyl, and phenylazanediyl; phosphanediyls including methylphosphanediyl, ethylphosphanediyl, propylphosphanediyl, butylphosphanediyl, pentylphosphanediyl, hexylphosphanediyl, cyclohexylphosphanediyl, and phenylphosphanediyl; boranediyls including methylboranediyl, ethylboranediyl, propylboranediyl, butylboranediyl, pentylboranediyl, hexylboranediyl, cyclohexylboranediyl, and phenylboranediyl; and combinations thereof including dimethylsilylmethylene, diphenylsilylmethylene, dimethylsilylethylene, methylphenylsilylmethylene; and/or 5) X is, independently, selected from the group consisting of chloride, bromide, fluoride, iodide, hydride, and C1 to C20 hydrocarbyls, preferably methyl, ethyl, propyl, butyl, pentyl, hexyl, phenyl, benzyl, and all isomers thereof, or two X together are selected from C4-C10 dienes, preferably butadiene, methylbutadiene, pentadiene, methylpentadiene, dimethylpentadiene, hexadiene, methylhexadiene, dimethylhexadiene, or from C1-C10 alkylidenes, preferably methylidene, ethylidene, propylidene, or from C3-C10 alkyldiyls, preferably propandiyl, butandiyl, pentandiyl, and hexandiyl.

In a preferred embodiment of formulae 16 and 17, the complexes can be d/l enantiomeric (racemic) or meso, or a mixture of all three isomers. Particularly preferred embodiments of formulae 16 and 17 include compounds where:

1) M is Ti, Zr, or Hf; and/or 2) each $R^2$, $R^3$, $R^4$, $R^5$, $R^6$, $R^7$, $R^9$, $R^{10}$, $R^{11}$, $R^{12}$, $R^{13}$, and $R^{14}$ is, independently, selected from the group consisting of hydrogen radicals, C1 to C20 hydrocarbyls, preferably methyl, ethyl, propyl, butyl, pentyl, hexyl, heptyl, octyl, nonyl, decyl, undecyl, dodecyl, phenyl, substituted phenyls, and all isomers thereof, preferably methyl, ethyl, n-propyl, iso-propyl, butyl, s-butyl, i-butyl, t-butyl, n-hexyl, cyclohexyl, phenyl, tolyl, mesityl, naphthyl; and/or 3) each $Hc^4$, $Hc^6$, $Hc^{11}$ and $Hc^{13}$ is, independently, selected from a group consisting of unsubstituted and C1-C20 hydrocarbyl substituted pyrrol-1-yl, imidazol-1-yl, pyrazol-1-yl, phosphol-1-yl, [1,2,3]triazol-4-yl, [1,2,4]triazol-1-yl, tetrazol-1-yl, tetrazol-2-yl, indol-1-yl, isoindol-2-yl, phosphindol-1-yl, isophosphindol-2-yl, benzoimdazol-1-yl, indazol-1-yl, indazol-2-yl, benzotriazol-1-yl, benzotriazol-2-yl, carbazol-9-yl, dibenzophosphol-5-yl, 1,2,3,4-tetrahydrocarbazol-9-yl, 1,2,3,4-tetrahydrodibenzophosphol-5-yl, 1,2,3,4-tetrahydrocyclopenta[b]indol-4-yl, 1,2,3,4-tetrahydrocyclopenta[b]phosphindol-4-yl, phenothiazin-10-yl, preferably pyrrol-1-yl, methylpyrrol-1-yl, dimethylpyrrol-1-yl, trimethylpyrrol-1-yl, tetramethylpyrrol-1-yl, phenylpyrrol-1-yl, ethylpyrrol-1-yl, diethylpyrrol-1-yl, triethylpyrrol-1-yl, propylpyrrol-1-yl, butylpyrrol-1-yl, pentylpyrrol-1-yl, hexylpyrrol-1-yl, imidazol-1-yl, methylimidazol-1-yl, dimethylimidazol-1-yl, trimethylimidazol-1-yl, phenylimidazol-1-yl, ethylimidazol-1-yl, propylimidazol-1-yl, butylimidazol-1-yl, pentylimidazol-1-yl, hexylimidazol-1-yl, pyrazol-1-yl, methylpyrazol-1-yl, dimethylpyrazol-1-yl, trimethylpyrazol-1-yl, phenylpyrazol-1-yl, ethylpyrazol-1-yl, propylpyrazol-1-yl, butylpyrazol-1-yl, pentylpyrazol-1-yl, hexylpyrazol-1-yl, [1,2,3]triazol-4-yl, methyl[1,2,3]triazol-4-yl, dimethyl[1,2,3]triazol-4-yl, phenyl[1,2,3]triazol-4-yl, [1,2,4]triazol-1-yl, methyl[1,2,4]triazol-1-yl, dimethyl[1,2,4]triazol-1-yl, phenyl[1,2,4]triazol-1-yl, tetrazol-1-yl, methyltetrazol-1-yl, phenyltetrazol-1-yl, tetrazol-2-yl, methyltetrazol-2-yl, phenyltetrazol-2-yl, indol-1-yl, methylindol-1-yl, dimethylindol-1-yl, trimethylindol-1-yl, tetramethylindol-1-yl, pentamethylindol-1-yl, hexamethylindol-1-yl, phenylindol-1-yl, ethylindol-1-yl, propylindol-1-yl, butylindol-1-yl, pentylindol-1-yl, hexylindol-1-yl, isoindol-2-yl, methylisoindol-2-yl, dimethylisoindol-2-yl, trimethylisoindol-2-yl, tetramethylisoindol-2-yl, pentamethylisoindol-2-yl, hexamethylisoindol-2-yl, phenylisoindol-2-yl, ethylisoindol-2-yl, propylisoindol-2-yl, butylisoindol-2-yl, pentylisoindol-2- yl, hexylisoindol-2-yl, benzoimdazol-1-yl, methylbenzoimdazol-1-yl, dimethylbenzoimdazol-1-yl, trimethylbenzoimdazol-1-yl, tetramethylbenzoimdazol-1-yl, pentamethylbenzoimdazol-1-yl, phenylbenzoimdazol-1-yl, ethylbenzoimdazol-1-yl, propylbenzoimdazol-1-yl, butylbenzoimdazol-1-yl, pentylbenzoimdazol-1-yl, hexylbenzoimdazol-1-yl, indazol-1-yl, methylindazol-1-yl, dimethylindazol-1-yl, trimethylindazol-1-yl, tetramethylindazol-1-yl, pentamethylindazol-1-yl, phenylindazol-1-yl, ethylindazol-1-yl, propylindazol-1-yl, butylindazol-1-yl, pentylindazol-1-yl, hexylindazol-1-yl, indazol-2-yl, methylindazol-2-yl, dimethylindazol-2-yl, trimethylindazol-2-yl, tetramethylindazol-2-yl, pentamethylindazol-2-yl, phenylindazol-2-yl, ethylindazol-2-yl, propylindazol-2-yl, butylindazol-2-yl, pentylindazol-2-yl, hexylindazol-2-yl, benzotriazol-1-yl, methylbenzotriazol-1-yl, dimethylbenzotriazol-1-yl, trimethylbenzotriazol-1-yl, tetramethylbenzotriazol-1-yl, phenylbenzotriazol-1-yl, ethylbenzotriazol-1-yl, propylbenzotriazol-1-yl, butylbenzotriazol-1-yl, pentylbenzotriazol-1-yl, hexylbenzotriazol-1-yl, benzotriazol-2-yl, methylbenzotriazol-2-yl, dimethylbenzotriazol-2-yl, trimethylbenzotriazol-2-yl, tetramethylbenzotriazol-2-yl, phenylbenzotriazol-2-yl, ethylbenzotriazol-2-yl, propylbenzotriazol-2-yl, butylbenzotriazol-2-yl, pentylbenzotriazol-2-yl, hexylbenzotriazol-2-yl, carbazol-9-yl, 1,2,3,4-tetrahydrocarbazol-9-yl, phenothiazin-10-yl, phenoxazin-10-yl; and/or 4) Y is selected from the group consisting of silylene, germylene, carbylene and carbdiyls, azanediyl, phosphanediyl, boranediyl diradicals or combinations thereof, preferably selected from dihydrocarbylsilylenes including dimethylsilylene, diethylsilylene, dipropylsilylene, dibutylsilylene, dipentylsilylene, dihexylsilylene, methylphenylsilylene, diphenylsilylene, dicyclohexylsilylene, methylcyclohexylsilylene, dibenzylsilylene, tetramethyldisilylene, cyclotrimethylenesilylene, cyclotetramethylenesilylene, cyclopentamethylenesilylene, divinylsilylene, and tetramethyldisiloxylene; dihydrocarbylgermylenes including dimethylgermylene, diethylgermylene, dipropylgermylene, dibutylgermylene, dipentylgermylene, dihexylgermylene, methylphenylgermylene, diphenylgermylene, dicyclohexylgermylene, methylcyclohexylgermylene, cyclotrimethylenegermylene, cyclotetramethylenegermylene, and cyclopentamethylenegermylene; carbylenes and carbdiyls including methylene, dimethylmethylene, diethylmethylene, dibutylmethylene, dipropylmethylene, diphenylmethylene, ditolylmethylene, di(butylphenyl)methylene, di(trimethylsilylphenyl)methylene, dibenzylmethylene, cyclotetramethylenemethylene, cyclopentamethylenemethylene, ethylene, methylethylene, dimethylethylene, trimethylethylene, tetramethylethylene, cyclopropylene, cyclobutylene, cyclopentylene, cyclohexylene, propanediyl, methylpropanediyl, dimethylpropanediyl, trimethylpropanediyl, tetramethylpropanediyl, pentamethylpropanediyl, hexamethylpropanediyl, vinylene, and ethene-1,1-diyl; azanediyls including methylazanediyl, ethylazanediyl, propylazanediyl, butylazanediyl, pentylazanediyl, hexylazanediyl, cyclohexylazanediyl, and phenylazanediyl; phosphanediyls including methylphosphanediyl, ethylphosphanediyl, propylphosphanediyl, butylphosphanediyl, pentylphosphanediyl, hexylphosphanediyl, cyclohexylphosphanediyl, and phenylphosphanediyl; boranediyls including methylboranediyl, ethylboranediyl, propylboranediyl, butylboranediyl, pentylboranediyl, hexylboranediyl, cyclohexylboranediyl, and phenylboranediyl; and combinations thereof including dimethylsilylmethylene, diphenylsilylmethylene, dimethylsilylethylene, methylphenylsilylmethylene; and/or 5) X is, independently, selected from the group consisting of chloride, bromide, fluoride, iodide, hydride, and C1 to C20 hydrocarbyls, preferably methyl, ethyl, propyl, butyl, pentyl, hexyl, phenyl, benzyl, and all isomers thereof, or two X together are selected from C4-C10 dienes, preferably butadiene, methylbutadiene, pentadiene, methylpentadiene, dimethylpentadiene, hexadiene, methylhexadiene, dimethylhexadiene, or from C1-C10 alkylidenes, preferably methylidene, ethylidene, propylidene, or from C3-C10 alkyldiyls, preferably propandiyl, butandiyl, pentandiyl, and hexandiyl.

In an embodiment of the invention, compounds of formula 2 (where y=0), formula 3 (where y=0), formula 4 and formula 8 are preferred for use as catalyst components for producing elastomeric polymers, such as elastomeric polypropylenes and/or differentiated copolymers of ethylene and α-olefins. Compounds of formula 15, 16 and 17 in their racemic form are preferred for use as catalyst components for producing crystalline polypropylenes.

A set of exemplary catalyst precursors is set out below. These are by way of example only and are not intended to list every catalyst precursor that is within the scope of the invention. Particularly preferred transition metal compounds include:

bis-(2-(pyrrol-1-yl)indenyl)zirconium dichloride,
bis-(2-(2,4-dimethylpyrrol-1-yl)indenyl)zirconium dichloride,
bis-(2-(indol-1-yl)indenyl)zirconium dichloride,
bis-(2-(2-methylindol-1-yl)indenyl)zirconium dichloride,
bis-(2-(2,3-dimethylindol-1-yl)indenyl)zirconium dichloride,
bis-(2-(imidazol-1-yl)indenyl)zirconium dichloride,
bis-(2-(pyrazol-1-yl)indenyl)zirconium dichloride,
bis-(2-([1,2,4]triazol-4-yl)indenyl)zirconium dichloride,
bis-(2-([1,2,4]triazol-1-yl)indenyl)zirconium dichloride,
bis-(2-(phosphol-1-yl)indenyl)zirconium dichloride,
bis-(2-([1,3]azaphosphol-3-yl)indenyl)zirconium dichloride,
bis-(2-([1,2]azaphosphol-2-yl)indenyl)zirconium dichloride,
bis-(2-([1,3]azaphosphol-1-yl)indenyl)zirconium dichloride,
bis-(2-([1,2]azaphosphol-1-yl)indenyl)zirconium dichloride,
bis-(2-(tetrazol-1-yl)indenyl)zirconium dichloride,
bis-(2-(tetrazol-2-yl)indenyl)zirconium dichloride,
bis-(2-(isoindol-2-yl)indenyl)zirconium dichloride,
bis-(2-(phosphindol-1-yl)indenyl)zirconium dichloride,
bis-(2-(isophosphindol-2-yl)indenyl)zirconium dichloride,
bis-(2-(benzoimdazol-1-yl)indenyl)zirconium dichloride,
bis-(2-(indazol-1-yl)indenyl)zirconium dichloride,
bis-(2-(indazol-2-yl)indenyl)zirconium dichloride,
bis-(2-(benzotriazol-1-yl)indenyl)zirconium dichloride,
bis-(2-(benzotriazol-2-yl)indenyl)zirconium dichloride,
bis-(2-(dibenzophosphol-5-yl)indenyl)zirconium dichloride,
bis-(2-(1,2,3,4-tetrahydrodibenzophosphol-5-yl)indenyl)zirconium dichloride,
bis-(2-(1,2,3,4-tetrahydrocyclopenta[b]phosphindol-4-yl)indenyl)zirconium dichloride,
bis-(2-(phenothiazin-10-yl)indenyl)zirconium dichloride,
bis-(2-(1,2,3,4-tetrahydrocyclopenta[b]indol-4-yl)indenyl)zirconium dichloride,
bis-(2-(1,2,3,4-tetrahydrocarbazol-9-yl)indenyl)zirconium dichloride, bis-(2-(carbazol-9-yl)indenyl)zirconium dichloride,
bis-(4,7-dimethyl-2-(pyrrol-1-yl)indenyl)zirconium dichloride,
bis-(2-(pyrrol-1-yl)indenyl)hafnium dichloride,
bis-(2-(2,4-dimethylpyrrol-1-yl)indenyl)hafnium dichloride,
bis-(2-(indol-1-yl)indenyl)hafnium dichloride,
bis-(2-(2-methylindol-1-yl)indenyl)hafnium dichloride,
bis-(2-(2,3-dimethylindol-1-yl)indenyl)hafnium dichloride,
bis-(2-(imidazol-1-yl)indenyl)hafnium dichloride,
bis-(2-(pyrazol-1-yl)indenyl)hafnium dichloride,
bis-(2-([1,2,4]triazol-4-yl)indenyl)hafnium dichloride,
bis-(2-([1,2,4]triazol-1-yl)indenyl)hafnium dichloride,
bis-(2-(phosphol-1-yl)indenyl)hafnium dichloride,
bis-(2-([1,3]azaphosphol-3-yl)indenyl)hafnium dichloride,
bis-(2-([1,2]azaphosphol-2-yl)indenyl)hafnium dichloride,
bis-(2-([1,3]azaphosphol-1-yl)indenyl)hafnium dichloride,
bis-(2-([1,2]azaphosphol-1-yl)indenyl)hafnium dichloride,
bis-(2-(tetrazol-1-yl)indenyl)hafnium dichloride,
bis-(2-(tetrazol-2-yl)indenyl)hafnium dichloride,
bis-(2-(isoindol-2-yl)indenyl)hafnium dichloride,
bis-(2-(phosphindol-1-yl)indenyl)hafnium dichloride,
bis-(2-(isophosphindol-2-yl)indenyl)hafnium dichloride,
bis-(2-(benzoimdazol-1-yl)indenyl)hafnium dichloride,
bis-(2-(indazol-1-yl)indenyl)hafnium dichloride,
bis-(2-(indazol-2-yl)indenyl)hafnium dichloride,
bis-(2-(benzotriazol-1-yl)indenyl)hafnium dichloride,
bis-(2-(benzotriazol-2-yl)indenyl)hafnium dichloride,
bis-(2-(dibenzophosphol-5-yl)indenyl)hafnium dichloride,
bis-(2-(1,2,3,4-tetrahydrodibenzophosphol-5-yl)indenyl) hafnium dichloride,
bis-(2-(1,2,3,4-tetrahydrocyclopenta[b]phosphindol-4-yl) indenyl)hafnium dichloride,
bis-(2-(phenothiazin-10-yl)indenyl)hafnium dichloride,
bis-(2-(1,2,3,4-tetrahydrocyclopenta[b]indol-4-yl)indenyl) hafnium dichloride,
bis-(2-(1,2,3,4-tetrahydrocarbazol-9-yl)indenyl)hafnium dichloride,
bis-(2-(carbazol-9-yl)indenyl)hafnium dichloride,
bis-(4,7-dimethyl-2-(pyrrol-1-yl)indenyl)hafnium dichloride,
bis-(2-(pyrrol-1-yl)indenyl)titanium dichloride,
bis-(2-(2,4-dimethylpyrrol-1-yl)indenyl)titanium dichloride,
bis-(2-(indol-1-yl)indenyl)titanium dichloride,
bis-(2-(2-methylindol-1-yl)indenyl)titanium dichloride,
bis-(2-(2,3-dimethylindol-1-yl)indenyl)titanium dichloride,
bis-(2-(imidazol-1-yl)indenyl)titanium dichloride,
bis-(2-(pyrazol-1-yl)indenyl)titanium dichloride,
bis-(2-([1,2,4]triazol-4-yl)indenyl)titanium dichloride,
bis-(2-([1,2,4]triazol-1-yl)indenyl)titanium dichloride,
bis-(2-(phosphol-1-yl)indenyl)titanium dichloride,
bis-(2-([1,3]azaphosphol-3-yl)indenyl)titanium dichloride,
bis-(2-([1,2]azaphosphol-2-yl)indenyl)titanium dichloride,
bis-(2-([1,3]azaphosphol-1-yl)indenyl)titanium dichloride,
bis-(2-([1,2]azaphosphol-1-yl)indenyl)titanium dichloride,
bis-(2-(tetrazol-1-yl)indenyl)titanium dichloride,
bis-(2-(tetrazol-2-yl)indenyl)titanium dichloride,
bis-(2-(isoindol-2-yl)indenyl)titanium dichloride,
bis-(2-(phosphindol-1-yl)indenyl)titanium dichloride,
bis-(2-(isophosphindol-2-yl)indenyl)titanium dichloride,
bis-(2-(benzoimdazol-1-yl)indenyl)titanium dichloride,
bis-(2-(indazol-1-yl)indenyl)titanium dichloride,
bis-(2-(indazol-2-yl)indenyl)titanium dichloride,
bis-(2-(benzotriazol-1-yl)indenyl)titanium dichloride,
bis-(2-(benzotriazol-2-yl)indenyl)titanium dichloride,
bis-(2-(dibenzophosphol-5-yl)indenyl)titanium dichloride,
bis-(2-(1,2,3,4-tetrahydrodibenzophosphol-5-yl)indenyl)titanium dichloride,
bis-(2-(1,2,3,4-tetrahydrocyclopenta[b]phosphindol-4-yl) indenyl)titanium dichloride,
bis-(2-(phenothiazin-10-yl)indenyl)titanium dichloride,
bis-(2-(1,2,3,4-tetrahydrocyclopenta[b]indol-4-yl)indenyl) titanium dichloride,
bis-(2-(1,2,3,4-tetrahydrocarbazol-9-yl)indenyl)titanium dichloride,
bis-(2-(carbazol-9-yl)indenyl)titanium dichloride,
bis-(4,7-dimethyl-2-(pyrrol-1-yl)indenyl)titanium dichloride,
bis-(2-(pyrrol-1-yl)indenyl)zirconium dimethyl,
bis-(2-(2,4-dimethylpyrrol-1-yl)indenyl)zirconium dimethyl,
bis-(2-(indol-1-yl)indenyl)zirconium dimethyl,
bis-(2-(2-methylindol-1-yl)indenyl)zirconium dimethyl,
bis-(2-(2,3-dimethylindol-1-yl)indenyl)zirconium dimethyl,
bis-(2-(1,2,3,4-tetrahydrocyclopenta[b]indol-4-yl)indenyl) zirconium dimethyl,
bis-(2-(1,2,3,4-tetrahydrocarbazol-9-yl)indenyl)zirconium dimethyl,
bis-(2-(carbazol-9-yl)indenyl)zirconium dimethyl,
bis-(4,7-dimethyl-2-(pyrrol-1-yl)indenyl)zirconium dimethyl,
bis-(2-(1,2,3,4-tetrahydrocarbazol-9-yl)indenyl)hafnium dimethyl,
bis-(2-(pyrrol-1-yl)indenyl)zirconium methyl chloride,
bis-(2-(2,4-dimethylpyrrol-1-yl)indenyl)zirconium methyl chloride,
bis-(2-(indol-1-yl)indenyl)zirconium methyl chloride,
bis-(2-(2-methylindol-1-yl)indenyl)zirconium methyl chloride,
bis-(2-(2,3-dimethylindol-1-yl)indenyl)zirconium methyl chloride,
bis-(2-(1,2,3,4-tetrahydrocyclopenta[b]indol-4-yl)indenyl) zirconium methyl chloride,
bis-(2-(1,2,3,4-tetrahydrocarbazol-9-yl)indenyl)zirconium methyl chloride,
bis-(2-(carbazol-9-yl)indenyl)zirconium methyl chloride,
bis-(4,7-dimethyl-2-(pyrrol-1-yl)indenyl)zirconium methyl chloride,
bis-(2-(1,2,3,4-tetrahydrocarbazol-9-yl)indenyl)hafnium methyl chloride,
bis-(2-(pyrrol-1-yl)indenyl)zirconium difluoride,
bis-(2-(2,4-dimethylpyrrol-1-yl)indenyl)zirconium difluoride,
bis-(2-(indol-1-yl)indenyl)zirconium difluoride,
bis-(2-(2-methylindol-1-yl)indenyl)zirconium difluoride,
bis-(2-(2,3-dimethylindol-1-yl)indenyl)zirconium difluoride,
bis-(2-(1,2,3,4-tetrahydrocyclopenta[b]indol-4-yl)indenyl) zirconium difluoride,
bis-(2-(1,2,3,4-tetrahydrocarbazol-9-yl)indenyl)zirconium difluoride,
bis-(2-(carbazol-9-yl)indenyl)zirconium difluoride,
bis-(4,7-dimethyl-2-(pyrrol-1-yl)indenyl)zirconium difluoride,
bis-(2-(1,2,3,4-tetrahydrocarbazol-9-yl)indenyl)hafnium difluoride,
bis-(2-(pyrrol-1-yl)indenyl)zirconium dibromide,
bis-(2-(2,4-dimethylpyrrol-1-yl)indenyl)zirconium dibromide,
bis-(2-(indol-1-yl)indenyl)zirconium dibromide,
bis-(2-(2-methylindol-1-yl)indenyl)zirconium dibromide,
bis-(2-(2,3-dimethylindol-1-yl)indenyl)zirconium dibromide, bis-(2-(1,2,3,4-tetrahydrocyclopenta[b]indol-4-yl)indenyl) zirconium dibromide,
bis-(2-(1,2,3,4-tetrahydrocarbazol-9-yl)indenyl)zirconium dibromide,
bis-(2-(carbazol-9-yl)indenyl)zirconium dibromide,
bis-(4,7-dimethyl-2-(pyrrol-1-yl)indenyl)zirconium dibromide,
bis-(2-(1,2,3,4-tetrahydrocarbazol-9-yl)indenyl)hafnium dibromide,
bis-(2-(pyrrol-1-yl)indenyl)zirconium dibenzyl,
bis-(2-(2,4-dimethylpyrrol-1-yl)indenyl)zirconium dibenzyl,
bis-(2-(indol-1-yl)indenyl)zirconium dibenzyl,
bis-(2-(2-methylindol-1-yl)indenyl)zirconium dibenzyl,
bis-(2-(2,3-dimethylindol-1-yl)indenyl)zirconium dibenzyl,
bis-(2-(1,2,3,4-tetrahydrocyclopenta[b]indol-4-yl)indenyl) zirconium dibenzyl,
bis-(2-(1,2,3,4-tetrahydrocarbazol-9-yl)indenyl)zirconium dibenzyl,
bis-(2-(carbazol-9-yl)indenyl)zirconium dibenzyl,
bis-(4,7-dimethyl-2-(pyrrol-1-yl)indenyl)zirconium dibenzyl,
bis-(2-(1,2,3,4-tetrahydrocarbazol-9-yl)indenyl)hafnium dibenzyl,
(2-(pyrrol-1-yl)indenyl)(cyclopentadienyl)zirconium dichloride,
(2-(2,4-dimethylpyrrol-1-yl)indenyl)(cyclopentadienyl)zirconium dichloride,
(2-(indol-1-yl)indenyl)(cyclopentadienyl)zirconium dichloride,
(2-(2-methylindol-1-yl)indenyl)(cyclopentadienyl)zirconium dichloride,
(2-(2,3-dimethylindol-1-yl)indenyl)(cyclopentadienyl)zirconium dichloride,
(2-(imidazol-1-yl)indenyl)(cyclopentadienyl)zirconium dichloride,
(2-(pyrazol-1-yl)indenyl)(cyclopentadienyl)zirconium dichloride,
(2-([1,2,4]triazol-4-yl)indenyl)(cyclopentadienyl)zirconium dichloride,
(2-([1,2,4]triazol-1-yl)indenyl)(cyclopentadienyl)zirconium dichloride,
(2-(phosphol-1-yl)indenyl)(cyclopentadienyl)zirconium dichloride,
(2-([1,3]azaphosphol-3-yl)indenyl)(cyclopentadienyl)zirconium dichloride,
(2-([1,2]azaphosphol-2-yl)indenyl)(cyclopentadienyl)zirconium dichloride,
(2-([1,3]azaphosphol-1-yl)indenyl)(cyclopentadienyl)zirconium dichloride,
(2-([1,2]azaphosphol-1-yl)indenyl)(cyclopentadienyl)zirconium dichloride,
(2-(tetrazol-1-yl)indenyl)(cyclopentadienyl)zirconium dichloride,
(2-(tetrazol-2-yl)indenyl)(cyclopentadienyl)zirconium dichloride,
(2-(isoindol-2-yl)indenyl)(cyclopentadienyl)zirconium dichloride,
(2-(phosphindol-1-yl)indenyl)(cyclopentadienyl)zirconium dichloride,
(2-(isophosphindol-2-yl)indenyl)(cyclopentadienyl)zirconium dichloride,
(2-(benzoimdazol-1-yl)indenyl)(cyclopentadienyl)zirconium dichloride,
(2-(indazol-1-yl)indenyl)(cyclopentadienyl)zirconium dichloride,
(2-(indazol-2-yl)indenyl)(cyclopentadienyl)zirconium dichloride,
(2-(benzotriazol-1-yl)indenyl)(cyclopentadienyl)zirconium dichloride,
(2-(benzotriazol-2-yl)indenyl)(cyclopentadienyl)zirconium dichloride,
(2-(dibenzophosphol-5-yl)indenyl)(cyclopentadienyl)zirconium dichloride,
(2-(1,2,3,4-tetrahydrodibenzophosphol-5-yl)indenyl)(cyclopentadienyl)zirconium dichloride,
(2-(1,2,3,4-tetrahydrocyclopenta[b]phosphindol-4-yl)indenyl)(cyclopentadienyl)zirconium dichloride,
(2-(phenothiazin-10-yl)indenyl)(cyclopentadienyl)zirconium dichloride,
(2-(1,2,3,4-tetrahydrocyclopenta[b]indol-4-yl)indenyl)(cyclopentadienyl)zirconium dichloride,
(2-(1,2,3,4-tetrahydrocarbazol-9-yl)indenyl)(cyclopentadienyl)zirconium dichloride,
(2-(carbazol-9-yl)indenyl)(cyclopentadienyl)zirconium dichloride,
(4,7-dimethyl-2-(pyrrol-1-yl)indenyl)(cyclopentadienyl)zirconium dichloride,
(2-(pyrrol-1-yl)indenyl)(cyclopentadienyl)hafnium dichloride,
(2-(2,4-dimethylpyrrol-1-yl)indenyl)(cyclopentadienyl) hafnium dichloride,
(2-(indol-1-yl)indenyl)(cyclopentadienyl)hafnium dichloride,
(2-(2-methylindol-1-yl)indenyl)(cyclopentadienyl)hafnium dichloride,
(2-(2,3-dimethylindol-1-yl)indenyl)(cyclopentadienyl) hafnium dichloride,
(2-(imidazol-1-yl)indenyl)(cyclopentadienyl)hafnium dichloride,
(2-(pyrazol-1-yl)indenyl)(cyclopentadienyl)hafnium dichloride,
(2-([1,2,4]triazol-4-yl)indenyl)(cyclopentadienyl)hafnium dichloride,
(2-([1,2,4]triazol-1-yl)indenyl)(cyclopentadienyl)hafnium dichloride,
(2-(phosphol-1-yl)indenyl)(cyclopentadienyl)hafnium dichloride,
(2-([1,3]azaphosphol-3-yl)indenyl)(cyclopentadienyl) hafnium dichloride,
(2-([1,2]azaphosphol-2-yl)indenyl)(cyclopentadienyl) hafnium dichloride,
(2-([1,3]azaphosphol-1-yl)indenyl)(cyclopentadienyl) hafnium dichloride,
(2-([1,2]azaphosphol-1-yl)indenyl)(cyclopentadienyl) hafnium dichloride,
(2-(tetrazol-1-yl)indenyl)(cyclopentadienyl)hafnium dichloride,
(2-(tetrazol-2-yl)indenyl)(cyclopentadienyl)hafnium dichloride,
(2-(isoindol-2-yl)indenyl)(cyclopentadienyl)hafnium dichloride,
(2-(phosphindol-1-yl)indenyl)(cyclopentadienyl)hafnium dichloride,
(2-(isophosphindol-2-yl)indenyl)(cyclopentadienyl) hafnium dichloride,
(2-(benzoimdazol-1-yl)indenyl)(cyclopentadienyl)hafnium dichloride,
(2-(indazol-1-yl)indenyl)(cyclopentadienyl)hafnium dichloride,
(2-(indazol-2-yl)indenyl)(cyclopentadienyl)hafnium dichloride, (2-(benzotriazol-1-yl)indenyl)(cyclopentadienyl)hafnium dichloride, (2-(benzotriazol-2-yl)indenyl)(cyclopentadienyl)hafnium dichloride, (2-(dibenzophosphol-5-yl)indenyl)(cyclopentadienyl) hafnium dichloride, (2-(1,2,3,4-tetrahydrodibenzophosphol-5-yl)indenyl)(cyclopentadienyl)hafnium dichloride, (2-(1,2,3,4-tetrahydrocyclopenta[b]phosphindol-4-yl)indenyl)(cyclopentadienyl)hafnium dichloride, (2-(phenothiazin-10-yl)indenyl)(cyclopentadienyl)hafnium dichloride, (2-(1,2,3,4-tetrahydrocyclopenta[b]indol-4-yl)indenyl)(cyclopentadienyl)hafnium dichloride, (2-(1,2,3,4-tetrahydrocarbazol-9-yl)indenyl)(cyclopentadienyl)hafnium dichloride, (2-(carbazol-9-yl)indenyl)(cyclopentadienyl)hafnium dichloride, (4,7-dimethyl-2-(pyrrol-1-yl)indenyl)(cyclopentadienyl) hafnium dichloride, (2-(pyrrol-1-yl)indenyl)(cyclopentadienyl)titanium dichloride, (2-(2,4-dimethylpyrrol-1-yl)indenyl)(cyclopentadienyl)titanium dichloride, (2-(indol-1-yl)indenyl)(cyclopentadienyl)titanium dichloride, (2-(2-methylindol-1-yl)indenyl)(cyclopentadienyl)titanium dichloride, (2-(2,3-dimethylindol-1-yl)indenyl)(cyclopentadienyl)titanium dichloride, (2-(imidazol-1-yl)indenyl)(cyclopentadienyl)titanium dichloride, (2-(pyrazol-1-yl)indenyl)(cyclopentadienyl)titanium dichloride, (2-([1,2,4]triazol-4-yl)indenyl)(cyclopentadienyl)titanium dichloride, (2-([1,2,4]triazol-1-yl)indenyl)(cyclopentadienyl)titanium dichloride, (2-(phosphol-1-yl)indenyl)(cyclopentadienyl)titanium dichloride, (2-([1,3]azaphosphol-3-yl)indenyl)(cyclopentadienyl)titanium dichloride, (2-([1,2]azaphosphol-2-yl)indenyl)(cyclopentadienyl)titanium dichloride, (2-([1,3]azaphosphol-1-yl)indenyl)(cyclopentadienyl)titanium dichloride, (2-([1,2]azaphosphol-1-yl)indenyl)(cyclopentadienyl)titanium dichloride, (2-(tetrazol-1-yl)indenyl)(cyclopentadienyl)titanium dichloride, (2-(tetrazol-2-yl)indenyl)(cyclopentadienyl)titanium dichloride, (2-(isoindol-2-yl)indenyl)(cyclopentadienyl)titanium dichloride, (2-(phosphindol-1-yl)indenyl)(cyclopentadienyl)titanium dichloride, (2-(isophosphindol-2-yl)indenyl)(cyclopentadienyl)titanium dichloride, (2-(benzoimdazol-1-yl)indenyl)(cyclopentadienyl)titanium dichloride, (2-(indazol-1-yl)indenyl)(cyclopentadienyl)titanium dichloride, (2-(indazol-2-yl)indenyl)(cyclopentadienyl)titanium dichloride, (2-(benzotriazol-1-yl)indenyl)(cyclopentadienyl)titanium dichloride, (2-(benzotriazol-2-yl)indenyl)(cyclopentadienyl)titanium dichloride, (2-(dibenzophosphol-5-yl)indenyl)(cyclopentadienyl)titanium dichloride, (2-(1,2,3,4-tetrahydrodibenzophosphol-5-yl)indenyl)(cyclopentadienyl)titanium dichloride, (2-(1,2,3,4-tetrahydrocyclopenta[b]phosphindol-4-yl)indenyl)(cyclopentadienyl)titanium dichloride, (2-(phenothiazin-10-yl)indenyl)(cyclopentadienyl)titanium dichloride, (2-(1,2,3,4-tetrahydrocyclopenta[b]indol-4-yl)indenyl)(cyclopentadienyl)titanium dichloride, (2-(1,2,3,4-tetrahydrocarbazol-9-yl)indenyl)(cyclopentadienyl)titanium dichloride, (2-(carbazol-9-yl)indenyl)(cyclopentadienyl)titanium dichloride, (4,7-dimethyl-2-(pyrrol-1-yl)indenyl)(cyclopentadienyl)titanium dichloride, (2-(pyrrol-1-yl)indenyl)(cyclopentadienyl)zirconium dimethyl, (2-(2,4-dimethylpyrrol-1-yl)indenyl)(cyclopentadienyl)zirconium dimethyl, (2-(indol-1-yl)indenyl)(cyclopentadienyl)zirconium dimethyl, (2-(2-methylindol-1-yl)indenyl)(cyclopentadienyl)zirconium dimethyl, (2-(2,3-dimethylindol-1-yl)indenyl)(cyclopentadienyl)zirconium dimethyl, (2-(1,2,3,4-tetrahydrocyclopenta[b]indol-4-yl)indenyl)(cyclopentadienyl)zirconium dimethyl, (2-(1,2,3,4-tetrahydrocarbazol-9-yl)indenyl)(cyclopentadienyl)zirconium dimethyl, (2-(carbazol-9-yl)indenyl)(cyclopentadienyl)zirconium dimethyl, (4,7-dimethyl-2-(pyrrol-1-yl)indenyl)(cyclopentadienyl)zirconium dimethyl, (2-(1,2,3,4-tetrahydrocarbazol-9-yl)indenyl)(cyclopentadienyl)hafnium dimethyl, (2-(pyrrol-1-yl)indenyl)(cyclopentadienyl)zirconium methyl chloride, (2-(2,4-dimethylpyrrol-1-yl)indenyl)(cyclopentadienyl)zirconium methyl chloride, (2-(indol-1-yl)indenyl)(cyclopentadienyl)zirconium methyl chloride, (2-(2-methylindol-1-yl)indenyl)(cyclopentadienyl)zirconium methyl chloride, (2-(2,3-dimethylindol-1-yl)indenyl)(cyclopentadienyl)zirconium methyl chloride, (2-(1,2,3,4-tetrahydrocyclopenta[b]indol-4-yl)indenyl)(cyclopentadienyl)zirconium methyl chloride, (2-(1,2,3,4-tetrahydrocarbazol-9-yl)indenyl)(cyclopentadienyl)zirconium methyl chloride, (2-(carbazol-9-yl)indenyl)(cyclopentadienyl)zirconium methyl chloride, (4,7-dimethyl-2-(pyrrol-1-yl)indenyl)(cyclopentadienyl)zirconium methyl chloride, (2-(1,2,3,4-tetrahydrocarbazol-9-yl)indenyl)(cyclopentadienyl)hafnium methyl chloride, (2-(pyrrol-1-yl)indenyl)(cyclopentadienyl)zirconium difluoride, (2-(2,4-dimethylpyrrol-1-yl)indenyl)(cyclopentadienyl)zirconium difluoride, (2-(indol-1-yl)indenyl)(cyclopentadienyl)zirconium difluoride, (2-(2-methylindol-1-yl)indenyl)(cyclopentadienyl)zirconium difluoride, (2-(2,3-dimethylindol-1-yl)indenyl)(cyclopentadienyl)zirconium difluoride, (2-(1,2,3,4-tetrahydrocyclopenta[b]indol-4-yl)indenyl)(cyclopentadienyl)zirconium difluoride, (2-(1,2,3,4-tetrahydrocarbazol-9-yl)indenyl)(cyclopentadienyl)zirconium difluoride, (2-(carbazol-9-yl)indenyl)(cyclopentadienyl)zirconium difluoride, (4,7-dimethyl-2-(pyrrol-1-yl)indenyl)(cyclopentadienyl)zirconium difluoride, (2-(1,2,3,4-tetrahydrocarbazol-9-yl)indenyl)(cyclopentadienyl)hafnium difluoride, (2-(pyrrol-1-yl)indenyl)(cyclopentadienyl)zirconium dibromide, (2-(2,4-dimethylpyrrol-1-yl)indenyl)(cyclopentadienyl)zirconium dibromide, (2-(indol-1-yl)indenyl)(cyclopentadienyl)zirconium dibromide, (2-(2-methylindol-1-yl)indenyl)(cyclopentadienyl)zirconium dibromide, (2-(2,3-dimethylindol-1-yl)indenyl)(cyclopentadienyl)zirconium dibromide, (2-(1,2,3,4-tetrahydrocyclopenta[b]indol-4-yl)indenyl)(cyclopentadienyl)zirconium dibromide, (2-(1,2,3,4-tetrahydrocarbazol-9-yl)indenyl)(cyclopentadienyl)zirconium dibromide, (2-(carbazol-9-yl)indenyl)(cyclopentadienyl)zirconium dibromide, (4,7-dimethyl-2-(pyrrol-1-yl)indenyl)(cyclopentadienyl)zirconium dibromide, (2-(1,2,3,4-tetrahydrocarbazol-9-yl)indenyl)(cyclopentadienyl)hafnium dibromide, (2-(pyrrol-1-yl)indenyl)(cyclopentadienyl)zirconium dibenzyl, (2-(2,4-dimethylpyrrol-1-yl)indenyl)(cyclopentadienyl)zirconium dibenzyl, (2-(indol-1-yl)indenyl)(cyclopentadienyl)zirconium dibenzyl, (2-(2-methylindol-1-yl)indenyl)(cyclopentadienyl)zirconium dibenzyl, (2-(2,3-dimethylindol-1-yl)indenyl)(cyclopentadienyl)zirconium dibenzyl, (2-(1,2,3,4-tetrahydrocyclopenta[b]indol-4-yl)indenyl)(cyclopentadienyl)zirconium dibenzyl, (2-(1,2,3,4-tetrahydrocarbazol-9-yl)indenyl)(cyclopentadienyl)zirconium dibenzyl, (2-(carbazol-9-yl)indenyl)(cyclopentadienyl)zirconium dibenzyl, (4,7-dimethyl-2-(pyrrol-1-yl)indenyl)(cyclopentadienyl)zirconium dibenzyl, (2-(1,2,3,4-tetrahydrocarbazol-9-yl)indenyl)(cyclopentadienyl)hafnium dibenzyl, (2-(pyrrol-1-yl)indenyl)(dimethylcyclopentadienyl)zirconium dichloride, (2-(2,4-dimethylpyrrol-1-yl)indenyl)(dimethylcyclopentadienyl)zirconium dichloride, (2-(indol-1-yl)indenyl)(dimethylcyclopentadienyl)zirconium dichloride, (2-(2-methylindol-1-yl)indenyl)(dimethylcyclopentadienyl) zirconium dichloride, (2-(2,3-dimethylindol-1-yl)indenyl)(dimethylcyclopentadienyl)zirconium dichloride, (2-(imidazol-1-yl)indenyl)(dimethylcyclopentadienyl)zirconium dichloride, (2-(pyrazol-1-yl)indenyl)(dimethylcyclopentadienyl)zirconium dichloride, (2-([1,2,4]triazol-4-yl)indenyl)(dimethylcyclopentadienyl) zirconium dichloride, (2-([1,2,4]triazol-1-yl)indenyl)(dimethylcyclopentadienyl) zirconium dichloride, (2-(phosphol-1-yl)indenyl)(dimethylcyclopentadienyl)zirconium dichloride, (2-([1,3]azaphosphol-3-yl)indenyl)(dimethylcyclopentadienyl)zirconium dichloride, (2-([1,2]azaphosphol-2-yl)indenyl)(dimethylcyclopentadienyl)zirconium dichloride, (2-([1,3]azaphosphol-1-yl)indenyl)(dimethylcyclopentadienyl)zirconium dichloride, (2-([1,2]azaphosphol-1-yl)indenyl)(dimethylcyclopentadienyl)zirconium dichloride, (2-(tetrazol-1-yl)indenyl)(dimethylcyclopentadienyl)zirconium dichloride, (2-(tetrazol-2-yl)indenyl)(dimethylcyclopentadienyl)zirconium dichloride, (2-(isoindol-2-yl)indenyl)(dimethylcyclopentadienyl)zirconium dichloride, (2-(phosphindol-1-yl)indenyl)(dimethylcyclopentadienyl) zirconium dichloride, (2-(isophosphindol-2-yl)indenyl)(dimethylcyclopentadienyl)zirconium dichloride, (2-(benzoimdazol-1-yl)indenyl)(dimethylcyclopentadienyl) zirconium dichloride, (2-(indazol-1-yl)indenyl)(dimethylcyclopentadienyl)zirconium dichloride, (2-(indazol-2-yl)indenyl)(dimethylcyclopentadienyl)zirconium dichloride, (2-(benzotriazol-1-yl)indenyl)(dimethylcyclopentadienyl) zirconium dichloride, (2-(benzotriazol-2-yl)indenyl)(dimethylcyclopentadienyl) zirconium dichloride, (2-(dibenzophosphol-5-yl)indenyl)(dimethylcyclopentadienyl)zirconium dichloride, (2-(1,2,3,4-tetrahydrodibenzophosphol-5-yl)indenyl)(dimethylcyclopentadienyl)zirconium dichloride, (2-(1,2,3,4-tetrahydrocyclopenta[b]phosphindol-4-yl)indenyl)(dimethylcyclopentadienyl)zirconium dichloride, (2-(phenothiazin-10-yl)indenyl)(dimethylcyclopentadienyl) zirconium dichloride, (2-(1,2,3,4-tetrahydrocyclopenta[b]indol-4-yl)indenyl) (dimethylcyclopentadienyl)zirconium dichloride, (2-(1,2,3,4-tetrahydrocarbazol-9-yl)indenyl)(dimethylcyclopentadienyl)zirconium dichloride, (2-(carbazol-9-yl)indenyl)(dimethylcyclopentadienyl)zirconium dichloride, (4,7-dimethyl-2-(pyrrol-1-yl)indenyl)(dimethylcyclopentadienyl)zirconium dichloride, (2-(pyrrol-1-yl)indenyl)(dimethylcyclopentadienyl)hafnium dichloride, (2-(2,4-dimethylpyrrol-1-yl)indenyl)(dimethylcyclopentadienyl)hafnium dichloride, (2-(indol-1-yl)indenyl)(dimethylcyclopentadienyl)hafnium dichloride, (2-(2-methylindol-1-yl)indenyl)(dimethylcyclopentadienyl) hafnium dichloride, (2-(2,3-dimethylindol-1-yl)indenyl)(dimethylcyclopentadienyl)hafnium dichloride, (2-(imidazol-1-yl)indenyl)(dimethylcyclopentadienyl) hafnium dichloride, (2-(pyrazol-1-yl)indenyl)(dimethylcyclopentadienyl) hafnium dichloride, (2-([1,2,4]triazol-4-yl)indenyl)(dimethylcyclopentadienyl) hafnium dichloride, (2-([1,2,4]triazol-1-yl)indenyl)(dimethylcyclopentadienyl) hafnium dichloride, (2-(phosphol-1-yl)indenyl)(dimethylcyclopentadienyl) hafnium dichloride, (2-([1,3]azaphosphol-3-yl)indenyl)(dimethylcyclopentadienyl)hafnium dichloride, (2-([1,2]azaphosphol-2-yl)indenyl)(dimethylcyclopentadienyl)hafnium dichloride, (2-([1,3]azaphosphol-1-yl)indenyl)(dimethylcyclopentadienyl)hafnium dichloride, (2-([1,2]azaphosphol-1-yl)indenyl)(dimethylcyclopentadienyl)hafnium dichloride, (2-(tetrazol-1-yl)indenyl)(dimethylcyclopentadienyl) hafnium dichloride, (2-(tetrazol-2-yl)indenyl)(dimethylcyclopentadienyl) hafnium dichloride, (2-(isoindol-2-yl)indenyl)(dimethylcyclopentadienyl) hafnium dichloride, (2-(phosphindol-1-yl)indenyl)(dimethylcyclopentadienyl) hafnium dichloride, (2-(isophosphindol-2-yl)indenyl)(dimethylcyclopentadienyl)hafnium dichloride, (2-(benzoimdazol-1-yl)indenyl)(dimethylcyclopentadienyl) hafnium dichloride, (2-(indazol-1-yl)indenyl)(dimethylcyclopentadienyl) hafnium dichloride, (2-(indazol-2-yl)indenyl)(dimethylcyclopentadienyl) hafnium dichloride, (2-(benzotriazol-1-yl)indenyl)(dimethylcyclopentadienyl) hafnium dichloride, (2-(benzotriazol-2-yl)indenyl)(dimethylcyclopentadienyl) hafnium dichloride, (2-(dibenzophosphol-5-yl)indenyl)(dimethylcyclopentadienyl)hafnium dichloride, (2-(1,2,3,4-tetrahydrodibenzophosphol-5-yl)indenyl)(dimethylcyclopentadienyl)hafnium dichloride, (2-(1,2,3,4-tetrahydrocyclopenta[b]phosphindol-4-yl)indenyl)(dimethylcyclopentadienyl)hafnium dichloride, (2-(phenothiazin-10-yl)indenyl)(dimethylcyclopentadienyl) hafnium dichloride, (2-(1,2,3,4-tetrahydrocyclopenta[b]indol-4-yl)indenyl) (dimethylcyclopentadienyl)hafnium dichloride, (2-(1,2,3,4-tetrahydrocarbazol-9-yl)indenyl)(dimethylcyclopentadienyl)hafnium dichloride, (2-(carbazol-9-yl)indenyl)(dimethylcyclopentadienyl) hafnium dichloride, (4,7-dimethyl-2-(pyrrol-1-yl)indenyl)(dimethylcyclopentadienyl)hafnium dichloride, (2-(pyrrol-1-yl)indenyl)(dimethylcyclopentadienyl)titanium dichloride, (2-(2,4-dimethylpyrrol-1-yl)indenyl)(dimethylcyclopentadienyl)titanium dichloride, (2-(indol-1-yl)indenyl)(dimethylcyclopentadienyl)titanium dichloride, (2-(2-methylindol-1-yl)indenyl)(dimethylcyclopentadienyl) titanium dichloride, (2-(2,3-dimethylindol-1-yl)indenyl)(dimethylcyclopentadienyl)titanium dichloride, (2-(imidazol-1-yl)indenyl)(dimethylcyclopentadienyl)titanium dichloride, (2-(pyrazol-1-yl)indenyl)(dimethylcyclopentadienyl)titanium dichloride, (2-([1,2,4]triazol-4-yl)indenyl)(dimethylcyclopentadienyl) titanium dichloride, (2-([1,2,4]triazol-1-yl)indenyl)(dimethylcyclopentadienyl) titanium dichloride, (2-(phosphol-1-yl)indenyl)(dimethylcyclopentadienyl)titanium dichloride, (2-([1,3]azaphosphol-3-yl)indenyl)(dimethylcyclopentadienyl)titanium dichloride, (2-([1,2]azaphosphol-2-yl)indenyl)(dimethylcyclopentadienyl)titanium dichloride, (2-([1,3]azaphosphol-1-yl)indenyl)(dimethylcyclopentadienyl)titanium dichloride, (2-([1,2]azaphosphol-1-yl)indenyl)(dimethylcyclopentadienyl)titanium dichloride, (2-(tetrazol-1-yl)indenyl)(dimethylcyclopentadienyl)titanium dichloride, (2-(tetrazol-2-yl)indenyl)(dimethylcyclopentadienyl)titanium dichloride, (2-(isoindol-2-yl)indenyl)(dimethylcyclopentadienyl)titanium dichloride, (2-(phosphindol-1-yl)indenyl)(dimethylcyclopentadienyl)titanium dichloride, (2-(isophosphindol-2-yl)indenyl)(dimethylcyclopentadienyl)titanium dichloride, (2-(benzoimdazol-1-yl)indenyl)(dimethylcyclopentadienyl) titanium dichloride, (2-(indazol-1-yl)indenyl)(dimethylcyclopentadienyl)titanium dichloride, (2-(indazol-2-yl)indenyl)(dimethylcyclopentadienyl)titanium dichloride, (2-(benzotriazol-1-yl)indenyl)(dimethylcyclopentadienyl)titanium dichloride, (2-(benzotriazol-2-yl)indenyl)(dimethylcyclopentadienyl)titanium dichloride, (2-(dibenzophosphol-5-yl)indenyl)(dimethylcyclopentadienyl)titanium dichloride, (2-(1,2,3,4-tetrahydrodibenzophosphol-5-yl)indenyl)(dimethylcyclopentadienyl)titanium dichloride, (2-(1,2,3,4-tetrahydrocyclopenta[b]phosphindol-4-yl)indenyl)(dimethylcyclopentadienyl)titanium dichloride, (2-(phenothiazin-10-yl)indenyl)(dimethylcyclopentadienyl) titanium dichloride, (2-(1,2,3,4-tetrahydrocyclopenta[b]indol-4-yl)indenyl) (dimethylcyclopentadienyl)titanium dichloride, (2-(1,2,3,4-tetrahydrocarbazol-9-yl)indenyl)(dimethylcyclopentadienyl)titanium dichloride, (2-(carbazol-9-yl)indenyl)(dimethylcyclopentadienyl)titanium dichloride, (4,7-dimethyl-2-(pyrrol-1-yl)indenyl)(dimethylcyclopentadienyl)titanium dichloride, (2-(pyrrol-1-yl)indenyl)(dimethylcyclopentadienyl)zirconium dimethyl, (2-(2,4-dimethylpyrrol-1-yl)indenyl)(dimethylcyclopentadienyl)zirconium dimethyl, (2-(indol-1-yl)indenyl)(dimethylcyclopentadienyl)zirconium dimethyl, (2-(2-methylindol-1-yl)indenyl)(dimethylcyclopentadienyl) zirconium dimethyl, (2-(2,3-dimethylindol-1-yl)indenyl)(dimethylcyclopentadienyl)zirconium dimethyl, (2-(1,2,3,4-tetrahydrocyclopenta[b]indol-4-yl)indenyl) (dimethylcyclopentadienyl)zirconium dimethyl, (2-(1,2,3,4-tetrahydrocarbazol-9-yl)indenyl)(dimethylcyclopentadienyl)zirconium dimethyl, (2-(carbazol-9-yl)indenyl)(dimethylcyclopentadienyl)zirconium dimethyl, (4,7-dimethyl-2-(pyrrol-1-yl)indenyl)(dimethylcyclopentadienyl)zirconium dimethyl, (2-(1,2,3,4-tetrahydrocarbazol-9-yl)indenyl)(dimethylcyclopentadienyl)hafnium dimethyl, (2-(pyrrol-1-yl)indenyl)(dimethylcyclopentadienyl)zirconium methyl chloride,
(2-(2,4-dimethylpyrrol-1-yl)indenyl)(dimethylcyclopentadienyl)zirconium methyl chloride,
(2-(indol-1-yl)indenyl)(dimethylcyclopentadienyl)zirconium methyl chloride,
(2-(2-methylindol-1-yl)indenyl)(dimethylcyclopentadienyl) zirconium methyl chloride,
(2-(2,3-dimethylindol-1-yl)indenyl)(dimethylcyclopentadienyl)zirconium methyl chloride,
(2-(1,2,3,4-tetrahydrocyclopenta[b]indol-4-yl)indenyl) (dimethylcyclopentadienyl)zirconium methyl chloride,
(2-(1,2,3,4-tetrahydrocarbazol-9-yl)indenyl)(dimethylcyclopentadienyl)zirconium
methyl chloride,
(2-(carbazol-9-yl)indenyl)(dimethylcyclopentadienyl)zirconium methyl chloride,
(4,7-dimethyl-2-(pyrrol-1-yl)indenyl)(dimethylcyclopentadienyl)zirconium methyl chloride,
(2-(1,2,3,4-tetrahydrocarbazol-9-yl)indenyl)(dimethylcyclopentadienyl)hafnium methyl chloride,
(2-(pyrrol-1-yl)indenyl)(dimethylcyclopentadienyl)zirconium difluoride,
(2-(2,4-dimethylpyrrol-1-yl)indenyl)(dimethylcyclopentadienyl)zirconium difluoride,
(2-(indol-1-yl)indenyl)(dimethylcyclopentadienyl)zirconium difluoride,
(2-(2-methylindol-1-yl)indenyl)(dimethylcyclopentadienyl) zirconium difluoride,
(2-(2,3-dimethylindol-1-yl)indenyl)(dimethylcyclopentadienyl)zirconium difluoride,
(2-(1,2,3,4-tetrahydrocyclopenta[b]indol-4-yl)indenyl) (dimethylcyclopentadienyl)zirconium difluoride,
(2-(1,2,3,4-tetrahydrocarbazol-9-yl)indenyl)(dimethylcyclopentadienyl)zirconium difluoride,
(2-(carbazol-9-yl)indenyl)(dimethylcyclopentadienyl)zirconium difluoride,
(4,7-dimethyl-2-(pyrrol-1-yl)indenyl)(dimethylcyclopentadienyl)zirconium difluoride,
(2-(1,2,3,4-tetrahydrocarbazol-9-yl)indenyl)(dimethylcyclopentadienyl)hafnium difluoride,
(2-(pyrrol-1-yl)indenyl)(dimethylcyclopentadienyl)zirconium dibromide,
(2-(2,4-dimethylpyrrol-1-yl)indenyl)(dimethylcyclopentadienyl)zirconium dibromide,
(2-(indol-1-yl)indenyl)(dimethylcyclopentadienyl)zirconium dibromide,
(2-(2-methylindol-1-yl)indenyl)(dimethylcyclopentadienyl) zirconium dibromide,
(2-(2,3-dimethylindol-1-yl)indenyl)(dimethylcyclopentadienyl)zirconium dibromide,
(2-(1,2,3,4-tetrahydrocyclopenta[b]indol-4-yl)indenyl) (dimethylcyclopentadienyl)zirconium dibromide,
(2-(1,2,3,4-tetrahydrocarbazol-9-yl)indenyl)(dimethylcyclopentadienyl)zirconium dibromide,
(2-(carbazol-9-yl)indenyl)(dimethylcyclopentadienyl)zirconium dibromide,
(4,7-dimethyl-2-(pyrrol-1-yl)indenyl)(dimethylcyclopentadienyl)zirconium dibromide,
(2-(1,2,3,4-tetrahydrocarbazol-9-yl)indenyl)(dimethylcyclopentadienyl)hafnium dibromide,
(2-(pyrrol-1-yl)indenyl)(dimethylcyclopentadienyl)zirconium dibenzyl,
(2-(2,4-dimethylpyrrol-1-yl)indenyl)(dimethylcyclopentadienyl)zirconium dibenzyl,
(2-(indol-1-yl)indenyl)(dimethylcyclopentadienyl)zirconium dibenzyl,
(2-(2-methylindol-1-yl)indenyl)(dimethylcyclopentadienyl) zirconium dibenzyl,
(2-(2,3-dimethylindol-1-yl)indenyl)(dimethylcyclopentadienyl)zirconium dibenzyl,
(2-(1,2,3,4-tetrahydrocyclopenta[b]indol-4-yl)indenyl) (dimethylcyclopentadienyl)zirconium dibenzyl,
(2-(1,2,3,4-tetrahydrocarbazol-9-yl)indenyl)(dimethylcyclopentadienyl)zirconium dibenzyl,
(2-(carbazol-9-yl)indenyl)(dimethylcyclopentadienyl)zirconium dibenzyl,
(4,7-dimethyl-2-(pyrrol-1-yl)indenyl)(dimethylcyclopentadienyl)zirconium dibenzyl,
(2-(1,2,3,4-tetrahydrocarbazol-9-yl)indenyl)(dimethylcyclopentadienyl)hafnium dibenzyl,
(2-(pyrrol-1-yl)indenyl)(trimethylcyclopentadienyl)zirconium dichloride,
(2-(2,4-dimethylpyrrol-1-yl)indenyl)(trimethylcyclopentadienyl)zirconium dichloride,
(2-(indol-1-yl)indenyl)(trimethylcyclopentadienyl)zirconium dichloride,
(2-(2-methylindol-1-yl)indenyl)(trimethylcyclopentadienyl) zirconium dichloride,
(2-(2,3-dimethylindol-1-yl)indenyl)(trimethylcyclopentadienyl)zirconium dichloride,
(2-(imidazol-1-yl)indenyl)(trimethylcyclopentadienyl)zirconium dichloride,
(2-(pyrazol-1-yl)indenyl)(trimethylcyclopentadienyl)zirconium dichloride,
(2-([1,2,4]triazol-4-yl)indenyl)(trimethylcyclopentadienyl) zirconium dichloride,
(2-([1,2,4]triazol-1-yl)indenyl)(trimethylcyclopentadienyl) zirconium dichloride,
(2-(phosphol-1-yl)indenyl)(trimethylcyclopentadienyl)zirconium dichloride,
(2-(tetrazol-1-yl)indenyl)(trimethylcyclopentadienyl)zirconium dichloride,
(2-(tetrazol-2-yl)indenyl)(trimethylcyclopentadienyl)zirconium dichloride,
(2-(isoindol-2-yl)indenyl)(trimethylcyclopentadienyl)zirconium dichloride,
(2-(benzoimdazol-1-yl)indenyl)(trimethylcyclopentadienyl) zirconium dichloride,
(2-(indazol-1-yl)indenyl)(trimethylcyclopentadienyl)zirconium dichloride,
(2-(indazol-2-yl)indenyl)(trimethylcyclopentadienyl)zirconium dichloride,
(2-(pyrrol-1-yl)indenyl)(trimethylcyclopentadienyl) hafnium dichloride,
(2-(2,4-dimethylpyrrol-1-yl)indenyl)(trimethylcyclopentadienyl)hafnium dichloride,
(2-(indol-1-yl)indenyl)(trimethylcyclopentadienyl)hafnium dichloride,
(2-(2-methylindol-1-yl)indenyl)(trimethylcyclopentadienyl) hafnium dichloride,
(2-(2,3-dimethylindol-1-yl)indenyl)(trimethylcyclopentadienyl)hafnium dichloride,
(2-(pyrrol-1-yl)indenyl)(trimethylcyclopentadienyl)titanium dichloride,
(2-(2,4-dimethylpyrrol-1-yl)indenyl)(trimethylcyclopentadienyl)titanium dichloride,
(2-(indol-1-yl)indenyl)(trimethylcyclopentadienyl)titanium dichloride,
(2-(pyrrol-1-yl)indenyl)(trimethylcyclopentadienyl)zirconium dimethyl,
(2-(2,4-dimethylpyrrol-1-yl)indenyl)(trimethylcyclopentadienyl)zirconium dimethyl, (2-(indol-1-yl)indenyl)(trimethylcyclopentadienyl)zirconium dimethyl, (2-(2-methylindol-1-yl)indenyl)(trimethylcyclopentadienyl) zirconium dimethyl, (2-(2,3-dimethylindol-1-yl)indenyl)(trimethylcyclopentadienyl)zirconium dimethyl, (2-(pyrrol-1-yl)indenyl)(trimethylcyclopentadienyl)zirconium difluoride, (2-(2,4-dimethylpyrrol-1-yl)indenyl)(trimethylcyclopentadienyl)zirconium difluoride, (2-(indol-1-yl)indenyl)(trimethylcyclopentadienyl)zirconium difluoride, (2-(2-methylindol-1-yl)indenyl)(trimethylcyclopentadienyl) zirconium difluoride, (2-(2,3-dimethylindol-1-yl)indenyl)(trimethylcyclopentadienyl)zirconium difluoride, (2-(pyrrol-1-yl)indenyl)(methylcyclopentadienyl)zirconium dichloride, (2-(2,4-dimethylpyrrol-1-yl)indenyl)(methylcyclopentadienyl)zirconium dichloride, (2-(indol-1-yl)indenyl)(methylcyclopentadienyl)zirconium dichloride, (2-(2-methylindol-1-yl)indenyl)(methylcyclopentadienyl) zirconium dichloride, (2-(2,3-dimethylindol-1-yl)indenyl)(methylcyclopentadienyl)zirconium dichloride, (2-(imidazol-1-yl)indenyl)(methylcyclopentadienyl)zirconium dichloride, (2-(pyrazol-1-yl)indenyl)(methylcyclopentadienyl)zirconium dichloride, (2-([1,2,4]triazol-4-yl)indenyl)(methylcyclopentadienyl)zirconium dichloride, (2-([1,2,4]triazol-1-yl)indenyl)(methylcyclopentadienyl)zirconium dichloride, (2-(phosphol-1-yl)indenyl)(methylcyclopentadienyl)zirconium dichloride, (2-(tetrazol-1-yl)indenyl)(methylcyclopentadienyl)zirconium dichloride, (2-(tetrazol-2-yl)indenyl)(methylcyclopentadienyl)zirconium dichloride, (2-(isoindol-2-yl)indenyl)(methylcyclopentadienyl)zirconium dichloride, (2-(benzoimdazol-1-yl)indenyl)(methylcyclopentadienyl) zirconium dichloride, (2-(indazol-1-yl)indenyl)(methylcyclopentadienyl)zirconium dichloride, (2-(indazol-2-yl)indenyl)(methylcyclopentadienyl)zirconium dichloride, (2-(pyrrol-1-yl)indenyl)(methylcyclopentadienyl)hafnium dichloride, (2-(2,4-dimethylpyrrol-1-yl)indenyl)(methylcyclopentadienyl)hafnium dichloride, (2-(indol-1-yl)indenyl)(methylcyclopentadienyl)hafnium dichloride, (2-(2-methylindol-1-yl)indenyl)(methylcyclopentadienyl) hafnium dichloride, (2-(2,3-dimethylindol-1-yl)indenyl)(methylcyclopentadienyl)hafnium dichloride, (2-(pyrrol-1-yl)indenyl)(methylcyclopentadienyl)titanium dichloride, (2-(2,4-dimethylpyrrol-1-yl)indenyl)(methylcyclopentadienyl)titanium dichloride, (2-(indol-1-yl)indenyl)(methylcyclopentadienyl)titanium dichloride, (2-(pyrrol-1-yl)indenyl)(methylcyclopentadienyl)zirconium dimethyl, (2-(2,4-dimethylpyrrol-1-yl)indenyl)(methylcyclopentadienyl)zirconium dimethyl, (2-(indol-1-yl)indenyl)(methylcyclopentadienyl)zirconium dimethyl, (2-(2-methylindol-1-yl)indenyl)(methylcyclopentadienyl) zirconium dimethyl, (2-(2,3-dimethylindol-1-yl)indenyl)(methylcyclopentadienyl)zirconium dimethyl, (2-(pyrrol-1-yl)indenyl)(methylcyclopentadienyl)zirconium difluoride, (2-(2,4-dimethylpyrrol-1-yl)indenyl)(methylcyclopentadienyl)zirconium difluoride, (2-(indol-1-yl)indenyl)(methylcyclopentadienyl)zirconium difluoride, (2-(2-methylindol-1-yl)indenyl)(methylcyclopentadienyl) zirconium difluoride, (2-(2,3-dimethylindol-1-yl)indenyl)(methylcyclopentadienyl)zirconium difluoride, (2-(pyrrol-1-yl)indenyl)(tetramethylcyclopentadienyl)zirconium dichloride, (2-(2,4-dimethylpyrrol-1-yl)indenyl)(tetramethylcyclopentadienyl)zirconium dichloride, (2-(indol-1-yl)indenyl)(tetramethylcyclopentadienyl)zirconium dichloride, (2-(2-methylindol-1-yl)indenyl)(tetramethylcyclopentadienyl)zirconium dichloride, (2-(2,3-dimethylindol-1-yl)indenyl)(tetramethylcyclopentadienyl)zirconium dichloride, (2-(imidazol-1-yl)indenyl)(tetramethylcyclopentadienyl) zirconium dichloride, (2-(pyrazol-1-yl)indenyl)(tetramethylcyclopentadienyl)zirconium dichloride, (2-([1,2,4]triazol-4-yl)indenyl)(tetramethylcyclopentadienyl)zirconium dichloride, (2-([1,2,4]triazol-1-yl)indenyl)(tetramethylcyclopentadienyl)zirconium dichloride, (2-(phosphol-1-yl)indenyl)(tetramethylcyclopentadienyl) zirconium dichloride, (2-(tetrazol-1-yl)indenyl)(tetramethylcyclopentadienyl)zirconium dichloride, (2-(tetrazol-2-yl)indenyl)(tetramethylcyclopentadienyl)zirconium dichloride, (2-(isoindol-2-yl)indenyl)(tetramethylcyclopentadienyl)zirconium dichloride, (2-(benzoimdazol-1-yl)indenyl)(tetramethylcyclopentadienyl)zirconium dichloride, (2-(indazol-1-yl)indenyl)(tetramethylcyclopentadienyl)zirconium dichloride, (2-(indazol-2-yl)indenyl)(tetramethylcyclopentadienyl)zirconium dichloride, (2-(pyrrol-1-yl)indenyl)(tetramethylcyclopentadienyl) hafnium dichloride, (2-(2,4-dimethylpyrrol-1-yl)indenyl)(tetramethylcyclopentadienyl)hafnium dichloride, (2-(indol-1-yl)indenyl)(tetramethylcyclopentadienyl) hafnium dichloride, (2-(2-methylindol-1-yl)indenyl)(tetramethylcyclopentadienyl)hafnium dichloride, (2-(2,3-dimethylindol-1-yl)indenyl)(tetramethylcyclopentadienyl)hafnium dichloride, (2-(pyrrol-1-yl)indenyl)(tetramethylcyclopentadienyl)titanium dichloride, (2-(2,4-dimethylpyrrol-1-yl)indenyl)(tetramethylcyclopentadienyl)titanium dichloride, (2-(indol-1-yl)indenyl)(tetramethylcyclopentadienyl)titanium dichloride, (2-(pyrrol-1-yl)indenyl)(tetramethylcyclopentadienyl)zirconium dimethyl,
(2-(2,4-dimethylpyrrol-1-yl)indenyl)(tetramethylcyclopentadienyl)zirconium dimethyl,
(2-(indol-1-yl)indenyl)(tetramethylcyclopentadienyl)zirconium dimethyl,
(2-(2-methylindol-1-yl)indenyl)(tetramethylcyclopentadienyl)zirconium dimethyl,
(2-(2,3-dimethylindol-1-yl)indenyl)(tetramethylcyclopentadienyl)zirconium dimethyl,
(2-(pyrrol-1-yl)indenyl)(tetramethylcyclopentadienyl)zirconium difluoride,
(2-(2,4-dimethylpyrrol-1-yl)indenyl)(tetramethylcyclopentadienyl)zirconium difluoride,
(2-(indol-1-yl)indenyl)(tetramethylcyclopentadienyl)zirconium difluoride,
(2-(2-methylindol-1-yl)indenyl)(tetramethylcyclopentadienyl)zirconium difluoride,
(2-(2,3-dimethylindol-1-yl)indenyl)(tetramethylcyclopentadienyl)zirconium difluoride,
(2-(pyrrol-1-yl)indenyl)(indenyl)zirconium dichloride,
(2-(2,4-dimethylpyrrol-1-yl)indenyl)(indenyl)zirconium dichloride,
(2-(indol-1-yl)indenyl)(indenyl)zirconium dichloride,
(2-(2-methylindol-1-yl)indenyl)(indenyl)zirconium dichloride,
(2-(2,3-dimethylindol-1-yl)indenyl)(indenyl)zirconium dichloride,
(2-(imidazol-1-yl)indenyl)(indenyl)zirconium dichloride,
(2-(pyrazol-1-yl)indenyl)(indenyl)zirconium dichloride,
(2-([1,2,4]triazol-4-yl)indenyl)(indenyl)zirconium dichloride,
(2-([1,2,4]triazol-1-yl)indenyl)(indenyl)zirconium dichloride,
(2-(phosphol-1-yl)indenyl)(indenyl)zirconium dichloride,
(2-(tetrazol-1-yl)indenyl)(indenyl)zirconium dichloride,
(2-(tetrazol-2-yl)indenyl)(indenyl)zirconium dichloride,
(2-(isoindol-2-yl)indenyl)(indenyl)zirconium dichloride,
(2-(benzoimdazol-1-yl)indenyl)(indenyl)zirconium dichloride,
(2-(indazol-1-yl)indenyl)(indenyl)zirconium dichloride,
(2-(indazol-2-yl)indenyl)(indenyl)zirconium dichloride,
(2-(pyrrol-1-yl)indenyl)(indenyl)hafnium dichloride,
(2-(2,4-dimethylpyrrol-1-yl)indenyl)(indenyl)hafnium dichloride,
(2-(indol-1-yl)indenyl)(indenyl)hafnium dichloride,
(2-(2-methylindol-1-yl)indenyl)(indenyl)hafnium dichloride,
(2-(2,3-dimethylindol-1-yl)indenyl)(indenyl)hafnium dichloride,
(2-(pyrrol-1-yl)indenyl)(indenyl)titanium dichloride,
(2-(2,4-dimethylpyrrol-1-yl)indenyl)(indenyl)titanium dichloride,
(2-(indol-1-yl)indenyl)(indenyl)titanium dichloride,
(2-(pyrrol-1-yl)indenyl)(indenyl)zirconium dimethyl,
(2-(2,4-dimethylpyrrol-1-yl)indenyl)(indenyl)zirconium dimethyl,
(2-(indol-1-yl)indenyl)(indenyl)zirconium dimethyl,
(2-(2-methylindol-1-yl)indenyl)(indenyl)zirconium dimethyl,
(2-(2,3-dimethylindol-1-yl)indenyl)(indenyl)zirconium dimethyl,
(2-(pyrrol-1-yl)indenyl)(indenyl)zirconium difluoride,
(2-(2,4-dimethylpyrrol-1-yl)indenyl)(indenyl)zirconium difluoride,
(2-(indol-1-yl)indenyl)(indenyl)zirconium difluoride,
(2-(2-methylindol-1-yl)indenyl)(indenyl)zirconium difluoride,
(2-(2,3-dimethylindol-1-yl)indenyl)(indenyl)zirconium difluoride,
(2-(pyrrol-1-yl)indenyl)(propylcyclopentadienyl)zirconium dichloride,
(2-(2,4-dimethylpyrrol-1-yl)indenyl)(propylcyclopentadienyl)zirconium dichloride,
(2-(indol-1-yl)indenyl)(propylcyclopentadienyl)zirconium dichloride,
(2-(2-methylindol-1-yl)indenyl)(propylcyclopentadienyl) zirconium dichloride,
(2-(2,3-dimethylindol-1-yl)indenyl)(propylcyclopentadienyl)zirconium dichloride,
(2-(imidazol-1-yl)indenyl)(propylcyclopentadienyl)zirconium dichloride,
(2-(pyrazol-1-yl)indenyl)(propylcyclopentadienyl)zirconium dichloride,
(2-([1,2,4]triazol-4-yl)indenyl)(propylcyclopentadienyl)zirconium dichloride,
(2-([1,2,4]triazol-1-yl)indenyl)(propylcyclopentadienyl)zirconium dichloride,
(2-(phosphol-1-yl)indenyl)(propylcyclopentadienyl)zirconium dichloride,
(2-(tetrazol-1-yl)indenyl)(propylcyclopentadienyl)zirconium dichloride,
(2-(tetrazol-2-yl)indenyl)(propylcyclopentadienyl)zirconium dichloride,
(2-(isoindol-2-yl)indenyl)(propylcyclopentadienyl)zirconium dichloride,
(2-(benzoimdazol-1-yl)indenyl)(propylcyclopentadienyl) zirconium dichloride,
(2-(indazol-1-yl)indenyl)(propylcyclopentadienyl)zirconium dichloride,
(2-(indazol-2-yl)indenyl)(propylcyclopentadienyl)zirconium dichloride,
(2-(pyrrol-1-yl)indenyl)(propylcyclopentadienyl)hafnium dichloride,
(2-(2,4-dimethylpyrrol-1-yl)indenyl)(propylcyclopentadienyl)hafnium dichloride,
(2-(indol-1-yl)indenyl)(propylcyclopentadienyl)hafnium dichloride,
(2-(2-methylindol-1-yl)indenyl)(propylcyclopentadienyl) hafnium dichloride,
(2-(2,3-dimethylindol-1-yl)indenyl)(propylcyclopentadienyl)hafnium dichloride,
(2-(pyrrol-1-yl)indenyl)(propylcyclopentadienyl)titanium dichloride,
(2-(2,4-dimethylpyrrol-1-yl)indenyl)(propylcyclopentadienyl)titanium dichloride,
(2-(indol-1-yl)indenyl)(propylcyclopentadienyl)titanium dichloride,
(2-(pyrrol-1-yl)indenyl)(propylcyclopentadienyl)zirconium dimethyl,
(2-(2,4-dimethylpyrrol-1-yl)indenyl)(propylcyclopentadienyl)zirconium dimethyl,
(2-(indol-1-yl)indenyl)(propylcyclopentadienyl)zirconium dimethyl,
(2-(2-methylindol-1-yl)indenyl)(propylcyclopentadienyl) zirconium dimethyl,
(2-(2,3-dimethylindol-1-yl)indenyl)(propylcyclopentadienyl)zirconium dimethyl,
(2-(pyrrol-1-yl)indenyl)(propylcyclopentadienyl)zirconium difluoride,
(2-(2,4-dimethylpyrrol-1-yl)indenyl)(propylcyclopentadienyl)zirconium difluoride, (2-(indol-1-yl)indenyl)(propylcyclopentadienyl)zirconium difluoride, (2-(2-methylindol-1-yl)indenyl)(propylcyclopentadienyl) zirconium difluoride, (2-(2,3-dimethylindol-1-yl)indenyl)(propylcyclopentadienyl)zirconium difluoride, (2-(pyrrol-1-yl)indenyl)(butylcyclopentadienyl)zirconium dichloride, (2-(2,4-dimethylpyrrol-1-yl)indenyl)(butylcyclopentadienyl)zirconium dichloride, (2-(indol-1-yl)indenyl)(butylcyclopentadienyl)zirconium dichloride, (2-(2-methylindol-1-yl)indenyl)(butylcyclopentadienyl)zirconium dichloride, (2-(2,3-dimethylindol-1-yl)indenyl)(butylcyclopentadienyl) zirconium dichloride, (2-(imidazol-1-yl)indenyl)(butylcyclopentadienyl)zirconium dichloride, (2-(pyrazol-1-yl)indenyl)(butylcyclopentadienyl)zirconium dichloride, (2-([1,2,4]triazol-4-yl)indenyl)(butylcyclopentadienyl)zirconium dichloride, (2-([1,2,4]triazol-1-yl)indenyl)(butylcyclopentadienyl)zirconium dichloride, (2-(phosphol-1-yl)indenyl)(butylcyclopentadienyl)zirconium dichloride, (2-(tetrazol-1-yl)indenyl)(butylcyclopentadienyl)zirconium dichloride, (2-(tetrazol-2-yl)indenyl)(butylcyclopentadienyl)zirconium dichloride, (2-(isoindol-2-yl)indenyl)(butylcyclopentadienyl)zirconium dichloride, (2-(benzoimdazol-1-yl)indenyl)(butylcyclopentadienyl)zirconium dichloride, (2-(indazol-1-yl)indenyl)(butylcyclopentadienyl)zirconium dichloride, (2-(indazol-2-yl)indenyl)(butylcyclopentadienyl)zirconium dichloride, (2-(pyrrol-1-yl)indenyl)(butylcyclopentadienyl)hafnium dichloride, (2-(2,4-dimethylpyrrol-1-yl)indenyl)(butylcyclopentadienyl)hafnium dichloride, (2-(indol-1-yl)indenyl)(butylcyclopentadienyl)hafnium dichloride, (2-(2-methylindol-1-yl)indenyl)(butylcyclopentadienyl) hafnium dichloride, (2-(2,3-dimethylindol-1-yl)indenyl)(butylcyclopentadienyl) hafnium dichloride, (2-(pyrrol-1-yl)indenyl)(butylcyclopentadienyl)titanium dichloride, (2-(2,4-dimethylpyrrol-1-yl)indenyl)(butylcyclopentadienyl)titanium dichloride, (2-(indol-1-yl)indenyl)(butylcyclopentadienyl)titanium dichloride, (2-(pyrrol-1-yl)indenyl)(butylcyclopentadienyl)zirconium dimethyl, (2-(2,4-dimethylpyrrol-1-yl)indenyl)(butylcyclopentadienyl)zirconium dimethyl, (2-(indol-1-yl)indenyl)(butylcyclopentadienyl)zirconium dimethyl, (2-(2-methylindol-1-yl)indenyl)(butylcyclopentadienyl)zirconium dimethyl, (2-(2,3-dimethylindol-1-yl)indenyl)(butylcyclopentadienyl) zirconium dimethyl, (2-(pyrrol-1-yl)indenyl)(butylcyclopentadienyl)zirconium difluoride, (2-(2,4-dimethylpyrrol-1-yl)indenyl)(butylcyclopentadienyl)zirconium difluoride, (2-(indol-1-yl)indenyl)(butylcyclopentadienyl)zirconium difluoride, (2-(2-methylindol-1-yl)indenyl)(butylcyclopentadienyl)zirconium difluoride, (2-(2,3-dimethylindol-1-yl)indenyl)(butylcyclopentadienyl) zirconium difluoride, (2-(pyrrol-1-yl)indenyl)(benzylcyclopentadienyl)zirconium dichloride, (2-(2,4-dimethylpyrrol-1-yl)indenyl)(benzylcyclopentadienyl)zirconium dichloride, (2-(indol-1-yl)indenyl)(benzylcyclopentadienyl)zirconium dichloride, (2-(2-methylindol-1-yl)indenyl)(benzylcyclopentadienyl) zirconium dichloride, (2-(2,3-dimethylindol-1-yl)indenyl)(benzylcyclopentadienyl)zirconium dichloride, (2-(imidazol-1-yl)indenyl)(benzylcyclopentadienyl)zirconium dichloride, (2-(pyrazol-1-yl)indenyl)(benzylcyclopentadienyl)zirconium dichloride, (2-([1,2,4]triazol-4-yl)indenyl)(benzylcyclopentadienyl)zirconium dichloride, (2-([1,2,4]triazol-1-yl)indenyl)(benzylcyclopentadienyl)zirconium dichloride, (2-(phosphol-1-yl)indenyl)(benzylcyclopentadienyl)zirconium dichloride, (2-(tetrazol-1-yl)indenyl)(benzylcyclopentadienyl)zirconium dichloride, (2-(tetrazol-2-yl)indenyl)(benzylcyclopentadienyl)zirconium dichloride, (2-(isoindol-2-yl)indenyl)(benzylcyclopentadienyl)zirconium dichloride, (2-(benzoimdazol-1-yl)indenyl)(benzylcyclopentadienyl) zirconium dichloride, (2-(indazol-1-yl)indenyl)(benzylcyclopentadienyl)zirconium dichloride, (2-(indazol-2-yl)indenyl)(benzylcyclopentadienyl)zirconium dichloride, (2-(pyrrol-1-yl)indenyl)(benzylcyclopentadienyl)hafnium dichloride, (2-(2,4-dimethylpyrrol-1-yl)indenyl)(benzylcyclopentadienyl)hafnium dichloride, (2-(indol-1-yl)indenyl)(benzylcyclopentadienyl)hafnium dichloride, (2-(2-methylindol-1-yl)indenyl)(benzylcyclopentadienyl) hafnium dichloride, (2-(2,3-dimethylindol-1-yl)indenyl)(benzylcyclopentadienyl)hafnium dichloride, (2-(pyrrol-1-yl)indenyl)(benzylcyclopentadienyl)titanium dichloride, (2-(2,4-dimethylpyrrol-1-yl)indenyl)(benzylcyclopentadienyl)titanium dichloride, (2-(indol-1-yl)indenyl)(benzylcyclopentadienyl)titanium dichloride, (2-(pyrrol-1-yl)indenyl)(benzylcyclopentadienyl)zirconium dimethyl, (2-(2,4-dimethylpyrrol-1-yl)indenyl)(benzylcyclopentadienyl)zirconium dimethyl, (2-(indol-1-yl)indenyl)(benzylcyclopentadienyl)zirconium dimethyl, (2-(2-methylindol-1-yl)indenyl)(benzylcyclopentadienyl) zirconium dimethyl, (2-(2,3-dimethylindol-1-yl)indenyl)(benzylcyclopentadienyl)zirconium dimethyl, (2-(pyrrol-1-yl)indenyl)(benzylcyclopentadienyl)zirconium difluoride,
(2-(2,4-dimethylpyrrol-1-yl)indenyl)(benzylcyclopentadienyl)zirconium difluoride,
(2-(indol-1-yl)indenyl)(benzylcyclopentadienyl)zirconium difluoride,
(2-(2-methylindol-1-yl)indenyl)(benzylcyclopentadienyl) zirconium difluoride,
(2-(2,3-dimethylindol-1-yl)indenyl)(benzylcyclopentadienyl)zirconium difluoride,
(2-(2,4-dimethylpyrrol-1-yl)indenyl)(2-(pyrrol-1-yl)indenyl)zirconium dichloride,
(2-(indol-1-yl)indenyl) (2-(pyrrol-1-yl)indenyl)zirconium dichloride,
(2-(2-methylindol-1-yl)indenyl)(2-(pyrrol-1-yl)indenyl)zirconium dichloride,
(2-(2,3-dimethylindol-1-yl)indenyl)(2-(pyrrol-1-yl)indenyl) zirconium dichloride,
(2-(1,2,3,4-tetrahydrocyclopenta[b]indol-4-yl)indenyl)(2-(pyrrol-1-yl)indenyl)zirconium dichloride,
(2-(1,2,3,4-tetrahydrocarbazol-9-yl)indenyl)(2-(pyrrol-1-yl) indenyl)zirconium dichloride,
(2-(carbazol-9-yl)indenyl)(2-(pyrrol-1-yl)indenyl)zirconium dichloride,
(4,7-dimethyl-2-(pyrrol-1-yl)indenyl)(2-(pyrrol-1-yl)indenyl)zirconium dichloride,
(2-(1,2,3,4-tetrahydrocarbazol-9-yl)indenyl)(2-(pyrrol-1-yl) indenyl)hafnium dichloride,
(2-(indol-1-yl)indenyl)(2-(2,4-dimethylpyrrol-1-yl)indenyl) zirconium dichloride,
(2-(2-methylindol-1-yl)indenyl)(2-(2,4-dimethylpyrrol-1-yl)indenyl)zirconium dichloride,
(2-(2,3-dimethylindol-1-yl)indenyl)(2-(2,4-dimethylpyrrol-1-yl)indenyl)zirconium dichloride,
(2-(1,2,3,4-tetrahydrocyclopenta[b]indol-4-yl)indenyl)(2-(2,4-dimethylpyrrol-1-yl)indenyl)zirconium dichloride,
(2-(1,2,3,4-tetrahydrocarbazol-9-yl)indenyl)(2-(2,4-dimethylpyrrol-1-yl)indenyl)zirconium dichloride,
(2-(carbazol-9-yl)indenyl)(2-(2,4-dimethylpyrrol-1-yl)indenyl)zirconium dichloride,
(4,7-dimethyl-2-(pyrrol-1-yl)indenyl)(2-(2,4-dimethylpyrrol-1-yl)indenyl)zirconium dichloride,
(2-(1,2,3,4-tetrahydrocarbazol-9-yl)indenyl)(2-(2,4-dimethylpyrrol-1-yl)indenyl)hafnium dichloride,
(2-(2-methylindol-1-yl)indenyl)(2-(indol-1-yl)indenyl)zirconium dichloride,
(2-(2,3-dimethylindol-1-yl)indenyl)(2-(indol-1-yl)indenyl) zirconium dichloride,
(2-(1,2,3,4-tetrahydrocyclopenta[b]indol-4-yl)indenyl)(2-(indol-1-yl)indenyl)zirconium dichloride,
(2-(1,2,3,4-tetrahydrocarbazol-9-yl)indenyl)(2-(indol-1-yl) indenyl)zirconium dichloride,
(2-(carbazol-9-yl)indenyl)(2-(indol-1-yl)indenyl)zirconium dichloride,
(4,7-dimethyl-2-(pyrrol-1-yl)indenyl)(2-(indol-1-yl)indenyl)zirconium dichloride,
(2-(1,2,3,4-tetrahydrocarbazol-9-yl)indenyl)(2-(indol-1-yl) indenyl)hafnium dichloride,
(2-(2,3-dimethylindol-1-yl)indenyl)(2-(2-methylindol-1-yl) indenyl)zirconium dichloride,
(2-(1,2,3,4-tetrahydrocyclopenta[b]indol-4-yl)indenyl)(2-(2-methylindol-1-yl)indenyl)zirconium dichloride,
(2-(1,2,3,4-tetrahydrocarbazol-9-yl)indenyl)(2-(2-methylindol-1-yl)indenyl)zirconium dichloride,
(2-(carbazol-9-yl)indenyl)(2-(2-methylindol-1-yl)indenyl) zirconium dichloride,
(4,7-dimethyl-2-(pyrrol-1-yl)indenyl)(2-(2-methylindol-1-yl)indenyl)zirconium dichloride,
(2-(1,2,3,4-tetrahydrocarbazol-9-yl)indenyl)(2-(2-methylindol-1-yl)indenyl)hafnium dichloride,
bis-(1-(pyrrol-1-yl)indenyl)zirconium dichloride,
bis-(1-(2,4-dimethylpyrrol-1-yl)indenyl)zirconium dichloride,
bis-(1-(indol-1-yl)indenyl)zirconium dichloride,
bis-(1-(2-methylindol-1-yl)indenyl)zirconium dichloride,
bis-(1-(2,3-dimethylindol-1-yl)indenyl)zirconium dichloride,
bis-(1-(1,2,3,4-tetrahydrocyclopenta[b]indol-4-yl)indenyl) zirconium dichloride,
bis-(1-(1,2,3,4-tetrahydrocarbazol-9-yl)indenyl)zirconium dichloride,
bis-(1-(carbazol-9-yl)indenyl)zirconium dichloride,
bis-(4,7-dimethyl-1-(pyrrol-1-yl)indenyl)zirconium dichloride,
bis-(1-(1,2,3,4-tetrahydrocarbazol-9-yl)indenyl)hafnium dichloride,
bis-(4-(pyrrol-1-yl)indenyl)zirconium dichloride,
bis-(4-(2,4-dimethylpyrrol-1-yl)indenyl)zirconium dichloride,
bis-(4-(indol-1-yl)indenyl)zirconium dichloride,
bis-(4-(2-methylindol-1-yl)indenyl)zirconium dichloride,
bis-(4-(2,3-dimethylindol-1-yl)indenyl)zirconium dichloride,
bis-(4-(1,2,3,4-tetrahydrocyclopenta[b]indol-4-yl)indenyl) zirconium dichloride,
bis-(4-(1,2,3,4-tetrahydrocarbazol-9-yl)indenyl)zirconium dichloride,
bis-(4-(carbazol-9-yl)indenyl)zirconium dichloride,
bis-(2,7-dimethyl-4-(pyrrol-1-yl)indenyl)zirconium dichloride,
bis-(4-(1,2,3,4-tetrahydrocarbazol-9-yl)indenyl)hafnium dichloride,
(2-(2,4-dimethylpyrrol-1-yl)indenyl)(4-(pyrrol-1-yl)indenyl)zirconium dichloride,
(2-(indol-1-yl)indenyl) (4-(pyrrol-1-yl)indenyl)zirconium dichloride,
(2-(2-methylindol-1-yl)indenyl)(4-(pyrrol-1-yl)indenyl)zirconium dichloride,
(2-(2,3-dimethylindol-1-yl)indenyl)(4-(pyrrol-1-yl)indenyl) zirconium dichloride,
(2-(1,2,3,4-tetrahydrocyclopenta[b]indol-4-yl)indenyl)(4-(pyrrol-1-yl)indenyl)zirconium dichloride,
(2-(1,2,3,4-tetrahydrocarbazol-9-yl)indenyl)(4-(pyrrol-1-yl) indenyl)zirconium dichloride,
(2-(carbazol-9-yl)indenyl)(4-(pyrrol-1-yl)indenyl)zirconium dichloride,
(4,7-dimethyl-2-(pyrrol-1-yl)indenyl)(4-(pyrrol-1-yl)indenyl)zirconium dichloride,
(2-(1,2,3,4-tetrahydrocarbazol-9-yl)indenyl)(4-(pyrrol-1-yl) indenyl)hafnium dichloride,
(2-(2,4-dimethylpyrrol-1-yl)indenyl)(1-(pyrrol-1-yl)indenyl)zirconium dichloride,
(2-(indol-1-yl)indenyl) (1-(pyrrol-1-yl)indenyl)zirconium dichloride,
(2-(2-methylindol-1-yl)indenyl)(1-(pyrrol-1-yl)indenyl)zirconium dichloride,
(2-(2,3-dimethylindol-1-yl)indenyl)(1-(pyrrol-1-yl)indenyl) zirconium dichloride,
(2-(1,2,3,4-tetrahydrocyclopenta[b]indol-4-yl)indenyl)(1-(pyrrol-1-yl)indenyl)zirconium dichloride,
(2-(1,2,3,4-tetrahydrocarbazol-9-yl)indenyl)(1-(pyrrol-1-yl) indenyl)zirconium dichloride, (2-(carbazol-9-yl)indenyl)(1-(pyrrol-1-yl)indenyl)zirconium dichloride, (4,7-dimethyl-2-(pyrrol-1-yl)indenyl)(1-(pyrrol-1-yl)indenyl)zirconium dichloride, (2-(1,2,3,4-tetrahydrocarbazol-9-yl)indenyl)(1-(pyrrol-1-yl)indenyl)hafnium dichloride, (1-(pyrrol-1-yl)indenyl)(pentamethylcyclopentadienyl)zirconium dichloride, (1-(imidazol-1-yl)indenyl)(pentamethylcyclopentadienyl)zirconium dichloride, (1-([1,2,4]triazol-4-yl)indenyl)(pentamethylcyclopentadienyl)zirconium dichloride, (1-(phosphol-1-yl)indenyl)(pentamethylcyclopentadienyl)zirconium dichloride, (1-(isoindol-2-yl)indenyl)(pentamethylcyclopentadienyl)zirconium dichloride, (1-(indol-1-yl)indenyl)(pentamethylcyclopentadienyl)zirconium dichloride, (1-(pyrrol-1-yl)indenyl)(pentamethylcyclopentadienyl)zirconium dimethyl, (1-(pyrrol-1-yl)indenyl)(pentamethylcyclopentadienyl)hafnium dichloride, (1-(pyrrol-1-yl)indenyl)(pentamethylcyclopentadienyl)titanium dichloride, (1-(pyrrol-1-yl)indenyl)(cyclopentadienyl)zirconium dichloride, (1-(imidazol-1-yl)indenyl)(cyclopentadienyl)zirconium dichloride, (1-([1,2,4]triazol-4-yl)indenyl)(cyclopentadienyl)zirconium dichloride, (1-(phosphol-1-yl)indenyl)(cyclopentadienyl)zirconium dichloride, (1-(isoindol-2-yl)indenyl)(cyclopentadienyl)zirconium dichloride, (1-(indol-1-yl)indenyl)(cyclopentadienyl)zirconium dichloride, (1-(pyrrol-1-yl)indenyl)(cyclopentadienyl)zirconium dimethyl, (1-(pyrrol-1-yl)indenyl)(cyclopentadienyl)hafnium dichloride, (1-(pyrrol-1-yl)indenyl)(cyclopentadienyl)titanium dichloride, (1-(pyrrol-1-yl)indenyl)(methylcyclopentadienyl)zirconium dichloride, (1-(imidazol-1-yl)indenyl)(methylcyclopentadienyl)zirconium dichloride, (1-([1,2,4]triazol-4-yl)indenyl)(methylcyclopentadienyl)zirconium dichloride, (1-(phosphol-1-yl)indenyl)(methylcyclopentadienyl)zirconium dichloride, (1-(isoindol-2-yl)indenyl)(methylcyclopentadienyl)zirconium dichloride, (1-(indol-1-yl)indenyl)(methylcyclopentadienyl)zirconium dichloride, (1-(pyrrol-1-yl)indenyl)(methylcyclopentadienyl)zirconium dimethyl, (1-(pyrrol-1-yl)indenyl)(methylcyclopentadienyl)hafnium dichloride, (1-(pyrrol-1-yl)indenyl)(methylcyclopentadienyl)titanium dichloride, (2-methyl-4-(phenothiazin-10-yl)indenyl)(pentamethylcyclopentadienyl)zirconium dichloride, (2-methyl-4-naphthyl-6-(indol-1-yl)indenyl)(pentamethylcyclopentadienyl)zirconium dichloride, (2-methyl-4-(phenothiazin-10-yl)-6-(indol-1-yl)indenyl)(pentamethylcyclopentadienyl)zirconium dichloride, (2-methyl-4-(pyrrol-1-yl)indenyl)(pentamethylcyclopentadienyl)zirconium dichloride, (2-methyl-4-(indol-1-yl)indenyl)(pentamethylcyclopentadienyl)zirconium dichloride, (2-methyl-4-(phenothiazin-10-yl)indenyl)(cyclopentadienyl)zirconium dichloride, (2-methyl-4-naphthyl-6-(indol-1-yl)indenyl)(cyclopentadienyl)zirconium dichloride, (2-methyl-4-(phenothiazin-10-yl)-6-(indol-1-yl)indenyl)(cyclopentadienyl)zirconium dichloride, (2-methyl-4-(pyrrol-1-yl)indenyl)(cyclopentadienyl)zirconium dichloride, (2-methyl-4-(indol-1-yl)indenyl)(cyclopentadienyl)zirconium dichloride, (2-methyl-4-(phenothiazin-10-yl)indenyl)(methylcyclopentadienyl)zirconium dichloride, (2-methyl-4-naphthyl-6-(indol-1-yl)indenyl)(methylcyclopentadienyl)zirconium dichloride, (2-methyl-4-(phenothiazin-10-yl)-6-(indol-1-yl)indenyl)(methylcyclopentadienyl)zirconium dichloride, (2-methyl-4-(pyrrol-1-yl)indenyl)(methylcyclopentadienyl)zirconium dichloride, (2-methyl-4-(indol-1-yl)indenyl)(methylcyclopentadienyl)zirconium dichloride, (2-methyl-4-(phenothiazin-10-yl)indenyl)(indenyl)zirconium dichloride, (2-methyl-4-naphthyl-6-(indol-1-yl)indenyl)(indenyl)zirconium dichloride, (2-methyl-4-(phenothiazin-10-yl)-6-(indol-1-yl)indenyl)(indenyl)zirconium dichloride, (2-methyl-4-(pyrrol-1-yl)indenyl)(indenyl)zirconium dichloride, (2-methyl-4-(indol-1-yl)indenyl)(indenyl)zirconium dichloride, rac- or meso-dimethylsilylene-bis(2-methyl-4-(phenothiazin-10-yl)-6-p-tolylindenyl)zirconium dichloride, rac- or meso-dimethylsilylene-bis(2-methyl-4-phenyl-6-(phenothiazin-10-yl)indenyl)zirconium dichloride, rac- or meso-dimethylsilylene-bis(2-methyl-4-(phenothiazin-10-yl)indenyl)zirconium dichloride, rac- or meso-dimethylsilylene-bis(2-methyl-6-(phenothiazin-10-yl)indenyl)zirconium dichloride, rac- or meso-dimethylsilylene-bis(2-methyl-4-(phenothiazin-10-yl)-6-phenylindenyl)zirconium dichloride, rac- or meso-dimethylsilylene-bis(2-methyl-4-p-tolyl-6-(phenothiazin-10-yl)indenyl)zirconium dichloride, rac- or meso-dimethylsilylene-bis(2-methyl-4-(imidazol-1-yl)-6-p-tolylindenyl)zirconium dichloride, rac- or meso-dimethylsilylene-bis(2-methyl-4-phenyl-6-(imidazol-1-yl)indenyl)zirconium dichloride, rac- or meso-dimethylsilylene-bis(2-methyl-4-(imidazol-1-yl)indenyl)zirconium dichloride, rac- or meso-dimethylsilylene-bis(2-methyl-6-(imidazol-1-yl)indenyl)zirconium dichloride, rac- or meso-dimethylsilylene-bis(2-methyl-4-(imidazol-1-yl)-6-phenylindenyl)zirconium dichloride, rac- or meso-dimethylsilylene-bis(2-methyl-4-p-tolyl-6-(imidazol-1-yl)indenyl)zirconium dichloride, rac- or meso-dimethylsilylene-bis(2-methyl-4-(pyrazol-1-yl)-6-p-tolylindenyl)zirconium dichloride, rac- or meso-dimethylsilylene-bis(2-methyl-4-phenyl-6-(pyrazol-1-yl)indenyl)zirconium dichloride, rac- or meso-dimethylsilylene-bis(2-methyl-4-(pyrazol-1-yl)indenyl)zirconium dichloride, rac- or meso-dimethylsilylene-bis(2-methyl-6-(pyrazol-1-yl)indenyl)zirconium dichloride, rac- or meso-dimethylsilylene-bis(2-methyl-4-(pyrazol-1-yl)-6-phenylindenyl)zirconium dichloride, rac- or meso-dimethylsilylene-bis(2-methyl-4-p-tolyl-6-(pyrazol-1-yl)indenyl)zirconium dichloride, rac- or meso-dimethylsilylene-bis(2-methyl-4-([1,2,4]triazol-4-yl)-6-p-tolylindenyl)zirconium dichloride, rac- or meso-dimethylsilylene-bis(2-methyl-4-phenyl-6-([1,2,4]triazol-4-yl)indenyl)zirconium dichloride, rac- or meso-dimethylsilylene-bis(2-methyl-4-([1,2,4]triazol-4-yl)indenyl)zirconium dichloride, rac- or meso-dimethylsilylene-bis(2-methyl-6-([1,2,4]triazol-4-yl)indenyl)zirconium dichloride, rac- or meso-dimethylsilylene-bis(2-methyl-4-([1,2,4]triazol-4-yl)-6-phenylindenyl)zirconium dichloride, rac- or meso-dimethylsilylene-bis(2-methyl-4-p-tolyl-6-([1,2,4]triazol-4-yl)indenyl)zirconium dichloride, rac- or meso-dimethylsilylene-bis(2-methyl-4-(phosphol-1-yl)-6-p-tolylindenyl)zirconium dichloride, rac- or meso-dimethylsilylene-bis(2-methyl-4-phenyl-6-(phosphol-1-yl)indenyl)zirconium dichloride, rac- or meso-dimethylsilylene-bis(2-methyl-4-(phosphol-1-yl)indenyl)zirconium dichloride, rac- or meso-dimethylsilylene-bis(2-methyl-6-(phosphol-1-yl)indenyl)zirconium dichloride, rac- or meso-dimethylsilylene-bis(2-methyl-4-(phosphol-1-yl)-6-phenylindenyl)zirconium dichloride, rac- or meso-dimethylsilylene-bis(2-methyl-4-p-tolyl-6-(phosphol-1-yl)indenyl)zirconium dichloride, rac- or meso-dimethylsilylene-bis(2-methyl-4-(tetrazol-2-yl)-6-p-tolylindenyl)zirconium dichloride, rac- or meso-dimethylsilylene-bis(2-methyl-4-phenyl-6-(tetrazol-2-yl)indenyl)zirconium dichloride, rac- or meso-dimethylsilylene-bis(2-methyl-4-(tetrazol-2-yl)indenyl)zirconium dichloride, rac- or meso-dimethylsilylene-bis(2-methyl-6-(tetrazol-2-yl)indenyl)zirconium dichloride, rac- or meso-dimethylsilylene-bis(2-methyl-4-(tetrazol-2-yl)-6-phenylindenyl)zirconium dichloride, rac- or meso-dimethylsilylene-bis(2-methyl-4-p-tolyl-6-(tetrazol-2-yl)indenyl)zirconium dichloride, rac- or meso-dimethylsilylene-bis(2-methyl-4-(tetrazol-1-yl)-6-p-tolylindenyl)zirconium dichloride, rac- or meso-dimethylsilylene-bis(2-methyl-4-phenyl-6-(tetrazol-1-yl)indenyl)zirconium dichloride, rac- or meso-dimethylsilylene-bis(2-methyl-4-(tetrazol-1-yl)indenyl)zirconium dichloride, rac- or meso-dimethylsilylene-bis(2-methyl-6-(tetrazol-1-yl)indenyl)zirconium dichloride, rac- or meso-dimethylsilylene-bis(2-methyl-4-(tetrazol-1-yl)-6-phenylindenyl)zirconium dichloride, rac- or meso-dimethylsilylene-bis(2-methyl-4-p-tolyl-6-(tetrazol-1-yl)indenyl)zirconium dichloride, rac- or meso-dimethylsilylene-bis(2-methyl-4-(indazol-2-yl)-6-p-tolylindenyl)zirconium dichloride, rac- or meso-dimethylsilylene-bis(2-methyl-4-phenyl-6-(indazol-2-yl)indenyl)zirconium dichloride, rac- or meso-dimethylsilylene-bis(2-methyl-4-(indazol-2-yl)indenyl)zirconium dichloride, rac- or meso-dimethylsilylene-bis(2-methyl-6-(indazol-2-yl)indenyl)zirconium dichloride, rac- or meso-dimethylsilylene-bis(2-methyl-4-(indazol-2-yl)-6-phenylindenyl)zirconium dichloride, rac- or meso-dimethylsilylene-bis(2-methyl-4-p-tolyl-6-(indazol-2-yl)indenyl)zirconium dichloride, rac- or meso-dimethylsilylene-bis(2-methyl-4-(indazol-1-yl)-6-p-tolylindenyl)zirconium dichloride, rac- or meso-dimethylsilylene-bis(2-methyl-4-phenyl-6-(indazol-1-yl)indenyl)zirconium dichloride, rac- or meso-dimethylsilylene-bis(2-methyl-4-(indazol-1-yl)indenyl)zirconium dichloride, rac- or meso-dimethylsilylene-bis(2-methyl-6-(indazol-1-yl)indenyl)zirconium dichloride, rac- or meso-dimethylsilylene-bis(2-methyl-4-(indazol-1-yl)-6-phenylindenyl)zirconium dichloride, rac- or meso-dimethylsilylene-bis(2-methyl-4-p-tolyl-6-(indazol-1-yl)indenyl)zirconium dichloride, rac- or meso-dimethylsilylene-bis(2-methyl-4-(phenoxazin-10-yl)-6-p-tolylindenyl)zirconium dichloride, rac- or meso-dimethylsilylene-bis(2-methyl-4-phenyl-6-(phenoxazin-10-yl)indenyl)zirconium dichloride, rac- or meso-dimethylsilylene-bis(2-methyl-4-(phenoxazin-10-yl)indenyl)zirconium dichloride, rac- or meso-dimethylsilylene-bis(2-methyl-6-(phenoxazin-10-yl)indenyl)zirconium dichloride, rac- or meso-dimethylsilylene-bis(2-methyl-4-(phenoxazin-10-yl)-6-phenylindenyl)zirconium dichloride, rac- or meso-dimethylsilylene-bis(2-methyl-4-p-tolyl-6-(phenoxazin-10-yl)indenyl)zirconium dichloride, rac- or meso-dimethylsilylene-bis(2-methyl-4-(phenothiazin-10-yl)-6-p-tolylindenyl)zirconium dimethyl, rac- or meso-dimethylsilylene-bis(2-methyl-4-phenyl-6-(phenothiazin-10-yl)indenyl)zirconium dimethyl, rac- or meso-dimethylsilylene-bis(2-methyl-4-(imidazol-1-yl)-6-p-tolylindenyl)zirconium dimethyl, rac- or meso-dimethylsilylene-bis(2-methyl-4-phenyl-6-(imidazol-1-yl)indenyl)zirconium dimethyl, rac- or meso-dimethylsilylene-bis(2-methyl-4-(pyrazol-1-yl)-6-p-tolylindenyl)zirconium dimethyl, rac- or meso-dimethylsilylene-bis(2-methyl-4-phenyl-6-(pyrazol-1-yl)indenyl)zirconium dimethyl, rac- or meso-dimethylsilylene-bis(2-methyl-4-([1,2,4]triazol-4-yl)-6-p-tolylindenyl)zirconium dimethyl, rac- or meso-dimethylsilylene-bis(2-methyl-4-phenyl-6-([1,2,4]triazol-4-yl)indenyl)zirconium dimethyl, rac- or meso-dimethylsilylene-bis(2-methyl-4-(phosphol-1-yl)-6-p-tolylindenyl)zirconium dimethyl, rac- or meso-dimethylsilylene-bis(2-methyl-4-phenyl-6-(phosphol-1-yl)indenyl)zirconium dimethyl, rac- or meso-dimethylsilylene-bis(2-methyl-4-(tetrazol-2-yl)-6-p-tolylindenyl)zirconium dimethyl, rac- or meso-dimethylsilylene-bis(2-methyl-4-phenyl-6-(tetrazol-2-yl)indenyl)zirconium dimethyl, rac- or meso-dimethylsilylene-bis(2-methyl-4-(tetrazol-1-yl)-6-p-tolylindenyl)zirconium dimethyl, rac- or meso-dimethylsilylene-bis(2-methyl-4-phenyl-6-(tetrazol-1-yl)indenyl)zirconium dimethyl, rac- or meso-dimethylsilylene-bis(2-methyl-4-(indazol-2-yl)-6-p-tolylindenyl)zirconium dimethyl, rac- or meso-dimethylsilylene-bis(2-methyl-4-phenyl-6-(indazol-2-yl)indenyl)zirconium dimethyl, rac- or meso-dimethylsilylene-bis(2-methyl-4-(indazol-1-yl)-6-p-tolylindenyl)zirconium dimethyl, rac- or meso-dimethylsilylene-bis(2-methyl-4-phenyl-6-(indazol-1-yl)indenyl)zirconium dimethyl, rac- or meso-dimethylsilylene-bis(2-methyl-4-(phenoxazin-10-yl)-6-p-tolylindenyl)zirconium dimethyl, rac- or meso-dimethylsilylene-bis(2-methyl-4-phenyl-6-(phenoxazin-10-yl)indenyl)zirconium dimethyl, and the like.

Mixed Catalysts

Mixed catalyst systems can also be used, for example, the invention catalyst can be used in conjunction with a "second catalyst" in the same reactor or in a series of reactors where the invention catalyst produces oligomers, macromers, or polymers with olefinic end-groups, and the "second catalyst" incorporates these oligomers, macromers, or polymers into a polymer backbone as a copolymer with other monomers, such as ethylene, propylene, butene, and other C2 to C20 olefins. Alternatively, the invention catalyst can be used in conjunction with a second catalyst in the same reactor or in a series of reactors where the second catalyst produces oligomers, macromers, or polymers with olefinic end-groups, and the invention catalyst incorporates these oligomers, macromers, or polymers into a polymer backbone as a copolymer with other monomers, such as ethylene, propylene, butene, and other C2 to C20 olefins. The "second catalyst" can be of the same family as the invention catalyst, or can be from a completely different catalyst family. Likewise, the invention catalyst can be used in conjunction with a "second catalyst" in the same reactor or in a series of reactors where the invention catalyst and the "second catalyst" produces mixtures or blends of polymers.

Invention polymerization catalyst systems can comprise additional olefin polymerization catalysts, sometimes referred to as the "second catalyst". These additional olefin polymerization catalysts are any of those well known in the art to catalyze the olefin to polyolefin reaction. Some invention catalysts systems include Group-4-6 metallocenes as additional olefin polymerization catalysts. Metallocenes include (un)bridged compounds containing one (mono(cyclopentadienyl) metallocenes) or two (bis(cyclopentadienyl) metallocenes) (un)substituted cyclopentadienyl ligand(s). In bridged metallocenes, a single, cyclopentadienyl ligand connects to a heteroatom ligand with both coordinating to the metal center, or two cyclopentadienyl ligands connect together with both cyclopentadienyl ligands coordinating to the metal center. Typical catalysts and their precursors are well known in the art. Suitable description appears in the patent literature, for example U.S. Pat. Nos. 4,871,705, 4,937,299, 5,324,800, EP-A-0418044, EP-A-0591756, WO-A-92/00333 and WO-A-94/01471. Some embodiments select the metallocene compounds from mono- or bis-cyclopentadienyl-substituted, Group-4, -5, and -6 metals in which cyclopentadienyls are (un)substituted with one or more groups or are bridged to each other or to a metal-coordinated heteroatom. Some embodiments select similar metallocene compounds except they are not necessarily bridged to each other or to a metal-coordinated heteroatom. See U.S. Pat. Nos. 5,278,264 and 5,304,614.

Some invention catalysts systems include the following additional olefin polymerization catalysts. Metallocene compounds suitable for linear polyethylene or ethylene-containing copolymer production (where copolymer means comprising at least two different monomers) are essentially those disclosed in WO-A-92/00333, WO 97/44370 and U.S. Pat. Nos. 5,001,205, 5,057,475, 5,198,401, 5,304,614, 5,308,816 and 5,324,800. Selection of metallocene compounds for isotactic or syndiotactic polypropylene blend production, and their syntheses, are well-known in the patent and academic literature, e.g. *Journal of Organometallic Chemistry* 369, 359-370 (1989). Typically, those catalysts are stereorigid, asymmetric, chiral, or bridged-chiral metallocenes. Invention activators are suited for activating these types of catalyst precursors.

Likewise, some invention catalysts systems include the following additional olefin polymerization catalysts: monocyclopentadienyl metallocenes with Group-15 or -16 heteroatoms connected, through a bridging group, to a cyclopentadienyl-ligand ring carbon. Both the cyclopentadienyl Cp-ligand and the heteroatom connect to a transition metal. Some embodiments select a Group-4 transition metal. Additionally, unbridged monocyclopentadienyl, heteroatom-containing Group-4 components of WO 97/22639 will function with this invention. Moreover, transition metal systems with high-oxidation-state, Group-5-10 transition-metal centers are known and can serve as the additional olefin polymerization catalysts with invention catalyst systems.

Invention catalyst systems can use non-cyclopentadienyl, Group-4-5 precursor compounds as the additional olefin polymerization catalysts. Non-cyclopentadienyl, Group-4-5 precursor compounds are activable to stable, discrete cationic complexes include those containing bulky, chelating, diamide ligands, such as described in U.S. Pat. No. 5,318,935 and "Conformationally Rigid Diamide Complexes: Synthesis and Structure of Tantalum (III) Alkyne Derivatives", D. H. McConville, et al, *Organometallics* 1995, 14, 3154-3156. U.S. Pat. No. 5,318,935 describes bridged and unbridged, bis-amido catalyst compounds of Group-4 metals capable of □-olefins polymerization. Bridged bis(arylamido) Group-4 compounds for olefin polymerization are described by D. H. McConville, et al., in *Organometallics* 1995, 14, 5478-5480. Synthetic methods and compound characterization are presented. Further work appearing in D. H. McConville, et al, *Macromolecules* 1996, 29, 5241-5243, describes bridged bis(arylamido) Group-4 compounds that are polymerization catalysts for 1-hexene. Additional invention-suitable transition-metal compounds include those described in WO 96/40805. Cationic Group-3- or Lanthanide olefin polymerization complexes are disclosed in copending U.S. application Ser. No. 09/408,050, filed 29 Sep. 1999, and its equivalent PCT/US99/22690. A monoanionic bidentate ligand and two monoanionic ligands stabilize those catalyst precursors; they are activable with this invention" ionic cocatalysts. Other suitable Group-4-5 non-metallocene catalysts are bimetallocyclic catalyst compounds comprising two independently selected Group-4-5 metal atoms directly linked through two bridging groups to form cyclic compounds.

Invention catalyst systems can use transition metal catalyst precursors that have a 2+ oxidation state as the additional olefin polymerization catalyst. Typical $Ni^{2+}$ and $Pd^{2+}$ complexes are diimines, see "New Pd(II)- and Ni(II)-Based Catalysts for Polymerization of Ethylene and α-Olefins", M. Brookhart, et al, *J. Am. Chem. Soc.,* 1995, 117, 6414-6415, WO 96/23010 and WO 97/02298. See additionally the related bis(imino) Group-8 and -9 organometallic compounds described by V. C. Gibson and others in "Novel olefin polymerization catalysts based on iron and cobalt", *Chem. Commun.,* 849-850, 1998.

For a review of other potential catalysts used in combination or series with the invention catalysts, see S. D. Ittel and L. K. Johnson, Chem. Rev. 2000, 1000, 1169 and V. C. Gibson and S. K. Spitzmesser, Chem. Rev. 2003, 103, 283.

Activators and Catalyst Activation

The catalyst precursors, when activated by a commonly known activator such as methyl alumoxane, form active catalysts for the polymerization or oligomerization of olefins. Activators that may be used include alumoxanes such as methyl alumoxane, modified methyl alumoxane, ethyl alumoxane, iso-butyl alumoxane and the like; Lewis acid activators include triphenyl boron, tris-perfluorophenyl boron, tris-perfluorophenyl aluminum and the like; Ionic activators include dimethylanilinium tetrakis perfluorophenyl borate, triphenyl carbonium tetrakis perfluorophenyl borate, dimethylanilinium tetrakis perfluorophenyl aluminate, and the like.

A co-activator is a compound capable of alkylating the transition metal complex, such that when used in combination with an activator, an active catalyst is formed. Co-activators include alumoxanes such as methyl alumoxane, modified alumoxanes such as modified methyl alumoxane, and aluminum alkyls such trimethyl aluminum, tri-isobutyl aluminum, triethyl aluminum, and tri-isopropyl aluminum. Co-activators are typically only used in combination with Lewis acid activators and ionic activators when the pre-catalyst is not a dihydrocarbyl or dihydride complex.

The alumoxane component useful as an activator typically is an oligomeric aluminum compound represented by the general formula $(R^x—Al—O)_n$, which is a cyclic compound, or $R^x (R^x—Al—O)_nAlR^x{}_2$, which is a linear compound. In the general alumoxane formula, $R^x$ is independently a $C_1$-$C_{20}$ alkyl radical, for example, methyl, ethyl, propyl, butyl, pentyl, isomers thereof, and the like, and "n" is an integer from 1-50. Most preferably, $R^x$ is methyl and "n" is at least 4. Methyl alumoxane and modified methyl alumoxanes are most preferred. For further descriptions see, EP 0 279 586, EP 0 594 218, EP 0 561 476, WO94/10180 and U.S. Pat. Nos. 4,665,208, 4,874,734, 4,908,463, 4,924,018, 4,952,540, 4,968,827, 5,041,584, 5,091,352, 5,103,031, 5,157,137, 5,204,419, 5,206,199, 5,235,081, 5,248,801, 5,329,032, 5,391,793, and 5,416,229.

When an alumoxane or modified alumoxane is used, the catalyst-precursor-to-activator molar ratio is from about 1:3000 to 10:1; alternatively, 1:2000 to 10:1; alternatively 1:1000 to 10:1; alternatively, 1:500 to 1:1; alternatively 1:300 to 1:1; alternatively 1:200 to 1:1; alternatively 1:100 to 1:1; alternatively 1:50 to 1:1; alternatively 1:10 to 1:1. When the activator is an alumoxane (modified or unmodified), some embodiments select the maximum amount of activator at a 5000-fold molar excess over the catalyst precursor (per metal catalytic site). The preferred minimum activator-to-catalyst-precursor ratio is 1:1 molar ratio.

Ionic activators (at times used in combination with a co-activator) may be used in the practice of this invention. Preferably, discrete ionic activators such as $[Me_2PhNH][B(C_6F_5)_4]$, $[Ph_3C][B(C_6F_5)_4]$, $[Me_2PhNH][B((C_6H_3\text{-}3,5\text{-}(CF_3)_2))_4]$, $[Ph_3C][B((C_6H_3\text{-}3,5\text{-}(CF_3)_2))_4]$, $[NH_4][B(C_6H_5)_4]$ or Lewis acidic activators such as $B(C_6F_5)_3$ or $B(C_6H_5)_3$ can be used. Preferred co-activators, when used, are alumoxanes such as methyl alumoxane, modified alumoxanes such as modified methyl alumoxane, and aluminum alkyls such as tri-isobutyl aluminum, and trimethyl aluminum.

It is within the scope of this invention to use an ionizing or stoichiometric activator, neutral or ionic, such as tri (n-butyl) ammonium tetrakis (pentafluorophenyl) borate, a trisperfluorophenyl boron metalloid precursor or a trisperfluoronaphthyl boron metalloid precursor, polyhalogenated heteroborane anions (WO 98/43983), boric acid (U.S. Pat. No. 5,942,459) or combination thereof.

Examples of neutral stoichiometric activators include tri-substituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, naphthyl or mixtures thereof. Even more preferably, the three groups are halogenated, preferably fluorinated, aryl groups. Most preferably, the neutral stoichiometric activator is trisperfluorophenyl boron or trisperfluoronaphthyl boron.

Ionic stoichiometric activator compounds may contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

Ionic catalysts can be prepared by reacting a transition metal compound with an activator, such as $B(C_6F_6)_3$, which upon reaction with the hydrolyzable ligand (X) of the transition metal compound forms an anion, such as $([B(C_6F_5)_3(X)]^-)$, which stabilizes the cationic transition metal species generated by the reaction. The catalysts can be, and preferably are, prepared with activator components which are ionic compounds or compositions. However preparation of activators utilizing neutral compounds is also contemplated by this invention.

Compounds useful as an activator component in the preparation of the ionic catalyst systems used in the process of this invention comprise a cation, which is preferably a Bronsted acid capable of donating a proton, and a compatible non-coordinating anion which anion is relatively large (bulky), capable of stabilizing the active catalyst species which is formed when the two compounds are combined and said anion will be sufficiently labile to be displaced by olefinic diolefinic and acetylenically unsaturated substrates or other neutral Lewis bases such as ethers, nitriles and the like. Two classes of compatible non-coordinating anions have been disclosed in EPA 277,003 and EPA 277,004 published 1988: 1) anionic coordination complexes comprising a plurality of lipophilic radicals covalently coordinated to and shielding a central charge-bearing metal or metalloid core, and 2) anions comprising a plurality of boron atoms such as carboranes, metallacarboranes and boranes.

In a preferred embodiment, the stoichiometric activators include a cation and an anion component, and may be represented by the following formula:

$$(L^{**}—H)_d^+(A^{d-})$$

wherein L** is an neutral Lewis base;

H is hydrogen;

$(L^{**}—H)^+$ is a Bronsted acid $A^{d-}$ is a non-coordinating anion having the charge d− d is an integer from 1 to 3.

The cation component, $(L^{}—H)_d^+$ may include Bronsted acids such as protons or protonated Lewis bases or reducible Lewis acids capable of protonating or abstracting a moiety, such as an alkyl or aryl, from the precatalyst after alkylation. The activating cation $(L^{}—H)_d^+$ may be a Bronsted acid, capable of donating a proton to the alkylated transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether, diethyl ether, tetrahydrofuran and dioxane, sulfoniums from thioethers, such as diethyl thioethers and tetrahydrothiophene, and mixtures thereof. The activating cation $(L^{**}—H)_d^+$ may also be a moiety such as silver, tropylium, carbeniums, ferroceniums and mixtures, preferably carboniums and ferroceniums; most preferably triphenyl carbonium.

The anion component $A^{d-}$ include those having the formula $[M^{k+}Q_n]^{d-}$ wherein k is an integer from 1 to 3; n is an integer from 2-6; n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than one occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference. Illustrative, but not limiting examples of boron compounds which may be used as an activating cocatalyst in combination with a co-activator in the preparation of the improved catalysts of this invention are tri-substituted ammonium salts such as: trimethylammonium tetraphenylborate, triethylammonium tetraphenylborate, tripropylammonium tetraphenylborate, tri (n-butyl)ammonium tetraphenylborate, tri(tert-butyl) ammonium tetraphenylborate, N,N-dimethylanilinium tetraphenylborate, N,N-diethylanilinium tetraphenylborate, N,N-dimethyl-(2,4,6-trimethylanilinium) tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium) tetrakis (pentafluorophenyl)borate, trimethylammonium tetrakis-(2,3,4,6-tetrafluorophenyl)borate, triethylammonium tetrakis-(2,3,4,6-tetrafluorophenyl)borate, tripropylammonium tetrakis-(2,3,4,6-tetrafluorophenyl)borate, tri(n-butyl)ammonium tetrakis-(2,3,4,6-tetrafluorophenyl)borate, dimethyl (tert-butyl)ammonium tetrakis-(2,3,4,6-tetrafluorophenyl) borate, N,N-dimethylanilinium tetrakis-(2,3,4,6-tetrafluorophenyl)borate, N,N-diethylanilinium tetrakis-(2,3,4,6-tetrafluorophenyl)borate, N,N-dimethyl-(2,4,6-trimethylanilinium)tetrakis-(2,3,4,6-tetrafluorophenyl) borate, trimethylammonium tetrakis(perfluoronaphthyl) borate, triethylammonium tetrakis(perfluoronaphthyl) borate, tripropylammonium tetrakis(perfluoronaphthyl) borate, tri(n-butyl)ammonium tetrakis(perfluoronaphthyl) borate, tri(tert-butyl)ammonium tetrakis(perfluoronaphthyl) borate, N,N-dimethylanilinium tetrakis(perfluoronaphthyl) borate, N,N-diethylanilinium tetrakis(perfluoronaphthyl) borate, N,N-dimethyl-(2,4,6-trimethylanilinium) tetrakis (perfluoronaphthyl)borate, trimethylammonium tetrakis (perfluorobiphenyl)borate, triethylammonium tetrakis (perfluorobiphenyl)borate, tripropylammonium tetrakis (perfluorobiphenyl)borate, tri(n-butyl)ammonium tetrakis (perfluorobiphenyl)borate, tri(tert-butyl)ammonium tetrakis (perfluorobiphenyl)borate, N,N-dimethylanilinium tetrakis (perfluorobiphenyl)borate, N,N-diethylanilinium tetrakis (perfluorobiphenyl)borate, N,N-dimethyl-(2,4,6-trimethylanilinium) tetrakis(perfluorobiphenyl)borate, trimethylammonium tetrakis(3,5-bis(trifluoromethyl)phenyl)borate, triethylammonium tetrakis(3,5-bis(trifluoromethyl)phenyl)borate, tripropylammonium tetrakis(3,5-bis (trifluoromethyl)phenyl)borate, tri(n-butyl)ammonium tetrakis(3,5-bis(trifluoromethyl)phenyl)borate, tri(tert-butyl)ammonium tetrakis(3,5-bis(trifluoromethyl)phenyl)borate, N,N-dimethylanilinium tetrakis(3,5-bis(trifluoromethyl)phenyl)borate, N,N-diethylanilinium tetrakis(3,5-bis (trifluoromethyl)phenyl)borate, N,N-dimethyl-(2,4,6-trimethylanilinium) tetrakis(3,5-bis(trifluoromethyl)phenyl) borate, and dialkyl ammonium salts such as: di-(iso-propyl) ammonium tetrakis(pentafluorophenyl)borate, and dicyclohexylammonium tetrakis(pentafluorophenyl)borate; and other salts such as tri(o-tolyl)phosphonium tetrakis (pentafluorophenyl)borate, tri(2,6-dimethylphenyl)phosphonium tetrakis(pentafluorophenyl)borate, tropillium tetraphenylborate, triphenylcarbenium tetraphenylborate, triphenylphosphonium tetraphenylborate, triethylsilylium tetraphenylborate, benzene(diazonium)tetraphenylborate, tropillium tetrakis(pentafluorophenyl)borate, triphenylcarbenium tetrakis(pentafluorophenyl)borate, triphenylphosphonium tetrakis(pentafluorophenyl)borate, triethylsilylium tetrakis(pentafluorophenyl)borate, benzene(diazonium)tetrakis(pentafluorophenyl)borate, tropillium tetrakis-(2,3,4,6-tetrafluorophenyl)borate, triphenylcarbenium tetrakis-(2,3,4,6-tetrafluorophenyl)borate, triphenylphosphonium tetrakis-(2,3,4,6-tetrafluorophenyl)borate, triethylsilylium tetrakis-(2,3,4,6-tetrafluorophenyl)borate, benzene(diazonium)tetrakis-(2,3,4,6-tetrafluorophenyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium)tetrakis (perfluoronaphthyl)borate, tropillium tetrakis (perfluorobiphenyl)borate, triphenylcarbenium tetrakis (perfluorobiphenyl)borate, triphenylphosphonium tetrakis (perfluorobiphenyl)borate, triethylsilylium tetrakis (perfluorobiphenyl)borate, benzene(diazonium)tetrakis (perfluorobiphenyl)borate, tropillium tetrakis(3,5-bis (trifluoromethyl)phenyl)borate, triphenylcarbenium tetrakis (3,5-bis(trifluoromethyl)phenyl)borate, triphenylphosphonium tetrakis(3,5-bis(trifluoromethyl)phenyl)borate, triethylsilylium tetrakis(3,5-bis(trifluoromethyl) phenyl)borate, and benzene(diazonium)tetrakis(3,5-bis(trifluoromethyl)phenyl)borate.

Most preferably, the ionic stoichiometric activator $(L^{**}—H)_d^+$ $(A^{d-})$ is N,N-dimethylanilinium tetrakis(perfluorophenyl)borate, N,N-dimethylanilinium tetrakis(perfluoronaphthyl)borate, N,N-dimethylanilinium tetrakis (perfluorobiphenyl)borate, N,N-dimethylanilinium tetrakis (3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis (3,5-bis(trifluoromethyl)phenyl)borate, or triphenylcarbenium tetra(perfluorophenyl)borate.

Invention catalyst precursors can also be activated with cocatalysts or activators that comprise non-coordinating anions containing metalloid-free cyclopentadienide ions. These are described in U.S. Patent Publication 2002/0058765 A1, published on 16 May 2002, and for the instant invention, require the addition of a co-activator to the catalyst pre-cursor.

The term "non-coordinating anion" (NCA) means an anion that does not coordinate to the catalyst metal cation or that does coordinate to the metal cation, but only weakly. An NCA coordinates weakly enough that a neutral Lewis base, such as an olefinically or acetylenically unsaturated monomer can displace it from the catalyst center. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal complex cation in the sense of balancing its ionic charge at +1, yet retain sufficient lability to permit displacement by an ethylenically or acetylenically unsaturated monomer during polymerization. These types of cocatalysts sometimes use scavengers such as but not limited to tri-iso-butyl aluminum, tri-n-octyl aluminum, tri-n-hexyl aluminum, triethylaluminum or trimethylaluminum.

Invention process also can employ cocatalyst compounds or activator compounds that are initially neutral Lewis acids but form a cationic metal complex and a noncoordinating anion, or a zwitterionic complex upon reaction with the alkylated transition metal compounds. The alkylated invention compound is formed from the reaction of the catalyst pre-cursor and the co-activator. For example, tris(pentafluorophenyl)boron or aluminum act to abstract a hydrocarbyl ligand to yield an invention cationic transition metal complex and stabilizing noncoordinating anion, see EP-A-0 427 697 and EP-A-0 520 732 for illustrations of analogous Group-4 metallocene compounds. Also, see the methods and compounds of EP-A-0 495 375. For formation of zwitterionic complexes using analogous Group 4 compounds, see U.S. Pat. Nos. 5,624,878; 5,486,632; and 5,527,929.

Additional neutral Lewis-acids are known in the art and are suitable for abstracting formal anionic ligands. See in particular the review article by E. Y.-X. Chen and T. J. Marks, "Cocatalysts for Metal-Catalyzed Olefin Polymerization: Activators, Activation Processes, and Structure-Activity Relationships", *Chem. Rev.,* 100, 1391-1434 (2000).

When the cations of noncoordinating anion precursors are Bronsted acids such as protons or protonated Lewis bases (excluding water), or reducible Lewis acids such as ferrocenium or silver cations, or alkali or alkaline earth metal cations such as those of sodium, magnesium or lithium, the catalyst-precursor-to-activator molar ratio may be any ratio. Combinations of the described activator compounds may also be used for activation.

When an ionic or neutral stoichiometric activator is used, the catalyst-precursor-to-activator molar ratio is from 1:10 to 1:1; 1:10 to 10:1; 1:10 to 2:1; 1:10 to 3:1; 1:10 to 5:1; 1:2 to 1.2:1; 1:2 to 10:1; 1:2 to 2:1; 1:2 to 3:1; 1:2 to 5:1; 1:3 to 1.2:1; 1:3 to 10:1; 1:3 to 2:1; 1:3 to 3:1; 1:3 to 5:1; 1:5 to 1:1; 1:5 to 10:1; 1:5 to 2:1; 1:5 to 3:1; 1:5 to 5:1; 1:1 to 1:1.2. The catalyst-precursor-to-co-activator molar ratio is from 1:100 to 100:1; 1:75 to 75:1; 1:50 to 50:1; 1:25 to 25:1; 1:15 to 15:1; 1:10 to 10:1; 1:5 to 5:1, 1:2 to 2:1; 1:100 to 1:1; 1:75 to 1:1; 1:50 to 1:1; 1:25 to 1:1; 1:15 to 1:1; 1:10 to 1:1; 1:5 to 1:1; 1:2 to 1:1; 1:10 to 2:1.

Preferred activators and activator/co-activator combinations include methylalumoxane, modified methylalumoxane, mixtures of methylalumoxane with dimethylanilinium tetrakis(pentafluorophenyl)borate or tris(pentafluorophenyl)boron, and mixtures of trimethyl aluminum with dimethylanilinium tetrakis(pentafluorophenyl)borate or tris(pentafluorophenyl)boron In some embodiments, scavenging compounds are used with stoichiometric activators. Typical aluminum or boron alkyl components useful as scavengers are represented by the general formula $R^xJZ_2$ where J is aluminum or boron, $R^x$ is as previously defined above, and each Z is independently $R^x$ or a different univalent anionic ligand such as halogen (Cl, Br, I), alkoxide ($OR^x$) and the like. Most preferred aluminum alkyls include triethylaluminum, diethylaluminum chloride, tri-iso-butylaluminum, tri-n-octylaluminum, tri-n-hexylaluminum, trimethylaluminum and the like. Preferred boron alkyls include triethylboron. Scavenging compounds may also be alumoxanes and modified alumoxanes including methylalumoxane and modified methylalumoxane.

Supported Catalysts

The catalyst compounds of the present invention may be placed uon a support. To prepare supported catalysts (preferably uniform supported catalysts), the catalyst precursor preferably dissolves in the chosen solvent. The term "uniform supported catalyst" means that the catalyst precursor, the activator and or the activated catalyst approach uniform distribution upon the support's accessible surface area, including the interior pore surfaces of porous supports. Some embodiments of supported catalysts prefer uniform supported catalysts; other embodiments show no such preference.

Invention supported catalyst systems may be prepared by any method effective to support other coordination catalyst systems, effective meaning that the catalyst so prepared can be used for oligomerizing or polymerizing olefin in a heterogenous process. The catalyst precursor, activator, co-activator if needed, suitable solvent, and support may be added in any order or simultaneously.

By one method, the activator, dissolved in an appropriate solvent such as toluene may be stirred with the support material for 1 minute to 10 hours. The total solution volume may be greater than the pore volume of the support, but some embodiments limit the total solution volume below that needed to form a gel or slurry (about 90% to 400%, preferably about 100-200% of the pore volume). The mixture is optionally heated from 30-200° C. during this time. The catalyst precursor may be added to this mixture as a solid, if a suitable solvent is employed in the previous step, or as a solution. Or alternatively, this mixture can be filtered, and the resulting solid mixed with a catalyst precursor solution. Similarly, the mixture may be vacuum dried and mixed with a catalyst precursor solution. The resulting catalyst mixture is then stirred for 1 minute to 10 hours, and the catalyst is either filtered from the solution and vacuum dried or evaporation alone removes the solvent.

Alternatively, the catalyst precursor and activator may be combined in solvent to form a solution. Then the support is added, and the mixture is stirred for 1 minute to 10 hours. The total solution volume may be greater than the pore volume of the support, but some embodiments limit the total solution volume below that needed to form a gel or slurry (about 90% to 400%, preferably about 100-200% of the pore volume). After stirring, the residual solvent is removed under vacuum, typically at ambient temperature and over 10-16 hours. But greater or lesser times and temperatures are possible.

The catalyst precursor may also be supported absent the activator; in that case, the activator (and co-activator if needed) is added to a slurry process's liquid phase. For example, a solution of catalyst precursor may be mixed with a support material for a period of about 1 minute to 10 hours. The resulting precatalyst mixture may be filtered from the solution and dried under vacuum, or evaporation alone removes the solvent. The total, catalyst-precursor-solution volume may be greater than the support's pore volume, but some embodiments limit the total solution volume below that needed to form a gel or slurry (about 90% to 400%, preferably about 100-200% of the pore volume).

Additionally, two or more different catalyst precursors may be placed on the same support using any of the support methods disclosed above. Likewise, two or more activators or an activator and co-activator may be placed on the same support.

Suitable solid particle supports are typically comprised of polymeric or refractory oxide materials, each being preferably porous. Any support material that has an average particle size greater than 10 μm is suitable for use in this invention. Various embodiments select a porous support material, such as for example, talc, inorganic oxides, inorganic chlorides, for example magnesium chloride and resinous support materials such as polystyrene polyolefin or polymeric compounds or any other organic support material and the like. Some embodiments select inorganic oxide materials as the support material including Group-2, -3, -4, -5, -13, or -14 metal or metalloid oxides. Some embodiments select the catalyst support materials to include silica, alumina, silica-alumina, and their mixtures. Other inorganic oxides may serve either alone or in combination with the silica, alumina, or silica-alumina. These are magnesia, titania, zirconia, and the like. Lewis acidic materials such as montmorillonite and similar clays may also serve as a support. In this case, the support can optionally double as the activator component. But additional activator may also be used.

The support material may be pretreated by any number of methods. For example, inorganic oxides may be calcined, chemically treated with dehydroxylating agents such as aluminum alkyls and the like, or both.

As stated above, polymeric carriers will also be suitable in accordance with the invention, see for example the descriptions in WO 95/15815 and U.S. Pat. No. 5,427,991. The methods disclosed may be used with the catalyst complexes, activators or catalyst systems of this invention to adsorb or absorb them on the polymeric supports, particularly if made up of porous particles, or may be chemically bound through functional groups bound to or in the polymer chains.

Invention catalyst carriers may have a surface area of from 10-700 $m^2/g$, a pore volume of 0.1-4.0 cc/g and an average particle size of 10-500 μm. Some embodiments select a surface area of 50-500 $m^2/g$, a pore volume of 0.5-3.5 cc/g, or an average particle size of 20-200 μm. Other embodiments select a surface area of 100-400 $m^2/g$, a pore volume of 0.8-3.0 cc/g, and an average particle size of 30-100 μm. Invention carriers typically have a pore size of 10-1000 Angstroms, alternatively 50-500 Angstroms, or 75-350 Angstroms.

Invention catalysts are generally deposited on the support at a loading level of 10-100 micromoles of catalyst precursor per gram of solid support; alternately 20-80 micromoles of catalyst precursor per gram of solid support; or 40-60 micromoles of catalyst precursor per gram of support. But greater or lesser values may be used provided that the total amount of solid catalyst precursor does not exceed the support's pore volume.

Invention catalysts can be supported for gas-phase, bulk, or slurry polymerization, or otherwise as needed. Numerous support methods are known for catalysts in the olefin polymerization art, particularly alumoxane-activated catalysts; all are suitable for this invention's broadest practice. See, for example, U.S. Pat. Nos. 5,057,475 and 5,227,440. An example of supported ionic catalysts appears in WO 94/03056. U.S. Pat. No. 5,643,847 and WO 96/04319A describe a particularly effective method. A bulk or slurry process using this invention's supported metal complexes activated with alumoxane can be used for ethylene-propylene rubber as described in U.S. Pat. Nos. 5,001,205 and 5,229,478. Additionally, those processes suit this invention's catalyst systems. Both polymers and inorganic oxides may serve as supports, as is known in the art. See U.S. Pat. Nos. 5,422,325, 5,427,991, 5,498,582 and 5,466,649, and international publications WO 93/11172 and WO 94/07928.

Monomers

In a preferred embodiment the catalyst compounds of this invention are used to polymerize or oligomerize any unsaturated monomer or monomers. Preferred monomers include $C_2$ to $C_{100}$ olefins, preferably $C_2$ to $C_{60}$ olefins, preferably $C_2$ to $C_{40}$ olefins preferably $C_2$ to $C_{20}$ olefins, preferably $C_2$ to $C_{12}$ olefins. In some embodiments preferred monomers include linear, branched or cyclic alpha-olefins, preferably $C_2$ to $C_{100}$ alpha-olefins, preferably $C_2$ to $C_{60}$ alpha-olefins, preferably $C_2$ to $C_{40}$ alpha-olefins preferably $C_2$ to $C_{20}$ alpha-olefins, preferably $C_2$ to $C_{12}$ alpha-olefins. Preferred olefin monomers may be one or more of ethylene, propylene, butene, pentene, hexene, heptene, octene, nonene, decene, dodecene, 4-methylpentene-1,3-methylpentene-1,3,5,5-trimethylhexene-1, and 5-ethylnonene-1.

In another embodiment the polymer produced herein is a copolymer of one or more linear or branched $C_3$ to $C_{30}$ prochiral alpha-olefins or $C_5$ to $C_{30}$ ring containing olefins or combinations thereof capable of being polymerized by either stereospecific and non-stereospecific catalysts. Prochiral, as used herein, refers to monomers that favor the formation of isotactic or syndiotactic polymer when polymerized using stereospecific catalyst(s).

Preferred monomers may also include aromatic-group-containing monomers containing up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including but not limited to $C_1$, to $C_{10}$ alkyl groups. Additionally two adjacent substitutions may be joined to form a ring structure. Preferred aromatic-group-containing monomers contain at least one aromatic structure appended to a polymerizable olefinic moiety. Particularly preferred aromatic monomers include styrene, alpha-methylstyrene, para-alkylstyrenes, vinyltoluenes, vinylnaphthalene, allyl benzene, and indene, especially styrene, para-methylstyrene, 4-phenyl-1-butene and allyl benzene.

Non aromatic cyclic group containing monomers are also preferred. These monomers can contain up to 30 carbon atoms. Suitable non-aromatic cyclic group containing monomers preferably have at least one polymerizable olefinic group that is either pendant on the cyclic structure or is part of the cyclic structure. The cyclic structure may also be further substituted by one or more hydrocarbyl groups such as, but not limited to, $C_1$, to $C_{10}$ alkyl groups. Preferred non-aromatic cyclic group containing monomers include vinylcyclohexane, vinylcyclohexene, cyclopentadiene, cyclopentene, 4-methylcyclopentene, cyclohexene, 4-methylcyclohexene, cyclobutene, vinyladamantane, norbornene, 5-methylnorbornene, 5-ethylnorbornene, 5-propylnorbornene, 5-butylylnorbornene, 5-pentylnorbornene, 5-hexylnorbornene, 5-heptylnorbornene, 5-octylnorbornene, 5-nonylnorbornene, 5-decylnorbornene, 5-phenylnorbornene, vinylnorbornene, ethylidene norbornene, 5,6-dimethylnorbornene, 5,6-dibutylnorbornene and the like.

Preferred diolefin monomers useful in this invention include any hydrocarbon structure, preferably $C_4$ to $C_{30}$, having at least two unsaturated bonds, wherein at least one, typically two, of the unsaturated bonds are readily incorporated into a polymer by either a stereospecific or a non-stereospecific catalyst(s). It is further preferred that the diolefin monomers be selected from alpha-omega-diene monomers (i.e. di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

Non-limiting examples of preferred polar unsaturated monomers useful in this invention include amine substituted monomers including N-methylallylamine, N-allylcyclopentylamine, and N-allyl-hexylamine; alcohol substituted monomers including 7-octen-1-ol, 7-octene-1,2-diol, 10-undecen-1-ol, 10-undecene-1,2-diol, 2-methyl-3-buten-1-ol; acetal, epoxide and or ether substituted monomers including 4-hex-5-enyl-2,2-dimethyl-[1,3]dioxolane, 2,2-dimethyl-4-non-8-enyl-[1,3]dioxolane, acrolein dimethyl acetal, butadiene monoxide, 1,2-epoxy-7-octene, 1,2-epoxy-9-decene, 1,2-epoxy-5-hexene, 2-methyl-2-vinyloxirane, allyl glycidyl ether, 2,5-dihydrofuran, 2-cyclopenten-1-one ethylene ketal, 11-methoxyundec-1-ene, and 8-methoxyoct-1-ene; siloxy containing monomers including trimethyloct-7-enyloxy silane, and trimethylundec-10-enyloxy silane, polar functionalized norbornene monomers including 5-norbornene-2-carbonitrile, 5-norbornene-2-carboxaldehyde, 5-norbornene-2-carboxylic acid, cis-5-norbornene-endo-2, 3-dicarboxylic acid, 5-norbornene-2,2,-dimethanol, cis-5-norbornene-endo-2,3-dicarboxylic anhydride, 5-norbornene-2-endo-3-endo-dimethanol, 5-norbornene-2-endo-3-exo-dimethanol, 5norbornene-2-methanol, 5-norbornene-2-ol, 5-norbornene-2-yl acetate, 2-benzoyl-5-norbornene, 2-acetyl-5-norbornene, 7-syn methoxymethyl-5-norbornen-2-one, 5-norbornen-2-ol, and 5-norbornen-2-yloxy-trimethylsilane, and partially fluorinated monomers including nonafluoro-1-hexene, allyl-1,1,2,2,-tetrafluoroethyl ether, 2,2,3,3-tetrafluoro-non-8-enoic acid ethyl ester, 1,1,2,2-tetrafluoro-2-(1,1,2,2-tetrafluoro-oct-7-enyloxy)-ethanesulfonyl fluoride, acrylic acid 2,2,3,3,4,4,5,5,6,6,7,7,8,8,8-pentadecafluoro-octyl ester, and 1,1,2,2-tetrafluoro-2-(1,1,2,2,3,3,4,4-octafluoro-dec-9-enyloxy)-ethanesulfonyl fluoride. In some embodiments of the invention, the polar unsaturated monomer is premixed with a stoichiometric amount of Lewis acid (stochiometric to the polar functionality(ies)) such as but not limited to, trimethyl aluminum, triethyl aluminum, tri-isobutyl aluminum, tri-n-hexyl aluminum, tri-n-octyl aluminum or triethyl boron.

Dienes may be used in the processes described herein, preferably alpha-omega-dienes are used alone or in combination with mono-alpha olefins.

In a preferred embodiment the process described herein may be used to produce homopolymers or copolymers. (For the purposes of this invention and the claims thereto a copolymer may comprise two, three, four or more different monomer units.) Preferred polymers produced herein include homopolymers or copolymers of any of the above monomers. In a preferred embodiment the polymer is a homopolymer of any $C_2$ to $C_{12}$ alpha-olefin. Preferably the polymer is a homopolymer of ethylene or a homopolymer of propylene. In another embodiment the polymer is a copolymer comprising ethylene and one or more of any of the monomers listed above. In another embodiment the polymer is a copolymer comprising propylene and one or more of any of the monomers listed above. In another preferred embodiment the homopolymers or copolymers described, additionally comprise one or more diolefin comonomers, preferably one or more $C_4$ to $C_{40}$ diolefins.

In another preferred embodiment the polymer produced herein is a copolymer of ethylene and one or more $C_3$ to $C_{20}$ linear, branched or cyclic monomers, preferably one or more $C_3$ to $C_{12}$ linear, branched or cyclic alpha-olefins. Preferably the polymer produced herein is a copolymer of ethylene and one or more of propylene, butene, pentene, hexene, heptene, octene, nonene, decene, dodecene, 4methylpentene-1,3-methylpentene-1,3,5,5-trimethylhexene-1, cyclopentene, 4-methylcyclopentene, cyclohexene, and 4-methylcyclohexene.

In another preferred embodiment the polymer produced herein is a copolymer of propylene and one or more $C_2$ or $C_4$ to $C_{20}$ linear, branched or cyclic monomers, preferably one or more $C_2$ or $C_4$ to $C_{12}$ linear, branched or cyclic alpha-olefins. Preferably the polymer produced herein is a copolymer of propylene and one or more of ethylene, butene, pentene, hexene, heptene, octene, nonene, decene, dodecene, 4-methylpentene-1,3-methylpentene-1, and 3,5,5-trimethylhexene-1.

In a preferred embodiment, the polymer produced herein is a homopolymer of norbornene or a copolymer of norbornene and a substituted norbornene, including polar functionalized norbornenes.

In a preferred embodiment the copolymers described herein comprise at least 50 mole % of a first monomer and up to 50 mole % of other monomers.

In another embodiment, the polymer comprises:

a first monomer present at from 40 to 95 mole %, preferably 50 to 90 mole %, preferably 60 to 80 mole %, and a comonomer present at from 5 to 60 mole %, preferably 10 to 40 mole %, more preferably 20 to 40 mole %, and a termonomer present at from 0 to 10 mole %, more preferably from 0.5 to 5 mole %, more preferably 1 to 3 mole %.

In a preferred embodiment the first monomer comprises one or more of any $C_3$ to $C_8$ linear branched or cyclic alpha-olefins, including propylene, butene, (and all isomers thereof), pentene (and all isomers thereof), hexene (and all isomers thereof), heptene (and all isomers thereof), and octene (and all isomers thereof). Preferred monomers include propylene, 1-butene, 1-hexene, 1-octene, cyclopentene, cyctohexene, cyclooctene, hexadiene, cyclohexadiene and the like.

In a preferred embodiment the comonomer comprises one or more of any $C_2$ to $C_{40}$ linear, branched or cyclic alpha-olefins (provided ethylene, if present, is present at 5 mole % or less), including ethylene, propylene, butene, pentene, hexene, heptene, and octene, nonene, decene, undecene, dodecene, hexadecene, butadiene, hexadiene, heptadiene, pentadiene, octadiene, nonadiene, decadiene, dodecadiene, styrene, 3,5,5-trimethylhexene-1,3-methylpentene-1,4-methylpentene-1, cyclopentadiene, and cyclohexene.

In a preferred embodiment the termonomer comprises one or more of any $C_2$ to $C_{40}$ linear, branched or cyclic alpha-olefins, (provided ethylene, if present, is present at 5 mole % or less), including ethylene, propylene, butene, pentene, hexene, heptene, and octene, nonene, decene, undecene, dodecene, hexadecene, butadiene, hexadiene, heptadiene, pentadiene, octadiene, nonadiene, decadiene, dodecadiene, styrene, 3,5,5-trimethylhexene-1,3-methylpentene-1,4-methylpentene-1, cyclopentadiene, and cyclohexene.

In a preferred embodiment the polymers described above further comprise one or more dienes at up to 10 weight %, preferably at 0.00001 to 1.0 weight %, preferably 0.002 to 0.5 weight %, even more preferably 0.003 to 0.2 weight %, based upon the total weight of the composition. In some embodiments 500 ppm or less of diene is added to the polymerization, preferably 400 ppm or less, preferably or 300 ppm or less. In other embodiments at least 50 ppm of diene is added to the polymerization, or 100 ppm or more, or 150 ppm or more.

Polymerization Processes

Invention catalyst complexes are useful in polymerizing unsaturated monomers conventionally known to undergo metallocene-catalyzed polymerization such as solution, slurry, gas-phase, and high-pressure polymerization. Typically one or more transition metal compounds, one or more activators, and one or more monomers are contacted to produce polymer. These catalysts may be supported and as such will be particularly useful in the known, fixed-bed, moving-bed, fluid-bed, slurry, solution, or bulk operating modes conducted in single, series, or parallel reactors.

One or more reactors in series or in parallel may be used in the present invention. The transition metal compound, activator and when required, co-activator, may be delivered as a solution or slurry, either separately to the reactor, activated in-line just prior to the reactor, or preactivated and pumped as an activated solution or slurry to the reactor. Polymerizations are carried out in either single reactor operation, in which monomer, comonomers, catalyst/activator/co-activator, optional scavenger, and optional modifiers are added continuously to a single reactor or in series reactor operation, in which the above components are added to each of two or more reactors connected in series. The catalyst components can be added to the first reactor in the series. The catalyst component may also be added to both reactors, with one component being added to first reaction and another component to other reactors. In one preferred embodiment, the precatalyst is activated in the reactor in the presence of olefin.

Ethylene-alpha-olefin (including ethylene-cyclic olefin and ethylene-alpha-olefin-diolefin) elastomers of high molecular weight and low crystallinity can be prepared utilizing the catalysts of the invention under traditional solution processes or by introducing ethylene gas into a slurry utilizing the alpha-olefin or cyclic olefin or mixture thereof with other monomers, polymerizable and not, as a polymerization diluent in which the catalyst suspension is suspended. Typical ethylene pressures will be between 10 and 1000 psig (69-6895 kPa) and the polymerization diluent temperature will typically be between −10 and 160° C. The process can be carried out in a stirred tank reactor or a tubular reactor, or more than one reactor operated in series or in parallel. See the general disclosure of U.S. Pat. No. 5,001,205 for general process conditions. All documents are incorporated by reference for description of polymerization processes, ionic activators and useful scavenging compounds.

The invention catalyst compositions can be used individually or can be mixed with other known polymerization catalysts to prepare polymer blends. Monomer and catalyst selection allows polymer blend preparation under conditions analogous to those using individual catalysts. Polymers having increased MWD for improved processing and other traditional benefits available from polymers made with mixed catalyst systems can thus be achieved.

Generally, when using invention catalysts, particularly when they are immobilized on a support, the complete catalyst system will additionally comprise one or more scavenging compounds. Here, the term scavenging compound means a compound that removes polar impurities from the reaction environment. These impurities adversely affect catalyst activity and stability. Typically, purifying steps are usually used before introducing reaction components to a reaction vessel. But such steps will rarely allow polymerization without using some scavenging compounds. Normally, the polymerization process will still use at least small amounts of scavenging compounds.

Typically, the scavenging compound will be an organometallic compound such as the Group-13 organometallic compounds of U.S. Pat. Nos. 5,153,157, 5,241,025 and WO-A-91/09882, WO-A-94/03506, WO-A-93/14132, and that of WO 95/07941. Exemplary compounds include triethyl aluminum, triethyl borane, tri-iso-butyl aluminum, methyl alumoxane, iso-butyl alumoxane, and tri-n-octyl aluminum. Those scavenging compounds having bulky or $C_6$-$C_{20}$ linear hydrocarbyl substituents connected to the metal or metalloid center usually minimize adverse interaction with the active catalyst. Examples include triethylaluminum, but more preferably, bulky compounds such as tri-iso-butyl aluminum, tri-iso-prenyl aluminum, and long-chain linear alkyl-substituted aluminum compounds, such as tri-n-hexyl aluminum, tri-n-octyl aluminum, or tri-n-dodecyl aluminum. When alumoxane is used as the activator, any excess over that needed for activation will scavenge impurities and additional scavenging compounds may be unnecessary. Alumoxanes also may be added in scavenging quantities with other activators, e.g., methylalumoxane, $[Me_2HNPh]^+[B(pfp)_4]^-$ or $B(pfp)_3$ (perfluorophenyl=pfp=$C_6F_5$).

In terms of polymer density, the polymers capable of production in accordance the invention, can range from about 0.85 to about 0.95, preferably from 0.87 to 0.93, more preferably 0.89 to 0.920. Polymer molecular weights can range from about 3000 Mn to about 2,000,000 Mn or greater. Molecular weight distributions can range from about 1.1 to about 50.0, with molecular weight distributions from 1.2 to about 5.0 being more typical. Pigments, antioxidants and other additives, as is known in the art, may be added to the polymer.

Gas Phase Polymerization

Generally, in a fluidized gas bed process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228 all of which are fully incorporated herein by reference.)

The reactor pressure in a gas phase process may vary from about 10 psig (69 kPa) to about 500 psig (3448 kPa), preferably from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in the gas phase process may vary from about 30° C. to about 120° C., preferably from about 60° C. to about 115° C., more preferably in the range of from about 70° C. to 110° C., and most preferably in the range of from about 70° C. to about 95° C. In another embodiment when high density polyethylene is desired then the reactor temperature is typically between 70 and 105° C.

The productivity of the catalyst or catalyst system in a gas phase system is influenced by the partial pressure of the main monomer. The preferred mole percent of the main monomer, ethylene or propylene, preferably ethylene, is from about 25 to 90 mole percent and the comonomer partial pressure is in the range of from about 138 kPa to about 517 kPa, preferably about 517 kPa to about 2069 kPa, which are typical conditions in a gas phase polymerization process. Also in some systems the presence of comonomer can increase productivity.

In a preferred embodiment, the reactor utilized in the present invention is capable of producing more than 500 lbs of polymer per hour (227 Kg/hr) to about 200,000 lbs/hr (90,900 Kg/hr) or higher, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and preferably greater than 65,000 lbs/hr (29,000 Kg/hr) to greater than 100,000 lbs/hr (45,500 Kg/hr), and most preferably over 100,000 lbs/hr (45,500 Kg/hr).

Other gas phase processes contemplated by the process of the invention include those described in U.S. Pat. Nos. 5,627,242, 5,665,818 and 5,677,375, and European publications EP-A-0 794 200, EP-A-0 802 202 and EP-B-634 421 all of which are herein fully incorporated by reference.

In another preferred embodiment the catalyst system in is liquid form and is introduced into the gas phase reactor into a resin particle lean zone. For information on how to introduce a liquid catalyst system into a fluidized bed polymerization into a particle lean zone, please see U.S. Pat. No. 5,693,727, which is incorporated by reference herein.

Slurry Phase Polymerization

A slurry polymerization process generally operates between 1 to about 50 atmosphere pressure range (15 psig to 735 psig, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process should be operated above the reaction diluent critical temperature and pressure. Preferably, a hexane or an isobutane medium is employed.

In one embodiment, a preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. The preferred temperature in the particle form process is within the range of about 85° C. to about 110° C. Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The catalyst, as a slurry in isobutane or as a dry free flowing powder, is injected regularly to the reactor loop, which is itself filled with circulating slurry of growing polymer particles in a diluent of isobutane containing monomer and comonomer. Hydrogen, optionally, may be added as a molecular weight control. The reactor is maintained at a pressure of 3620 kPa to 4309 kPa and at a temperature in the range of about 60° C. to about 104° C. depending on the desired polymer melting characteristics. Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the isobutane diluent and all unreacted monomer and comonomers. The resulting hydrocarbon free powder is then compounded for use in various applications.

In another embodiment, the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

In another embodiment in the slurry process of the invention the total reactor pressure is in the range of from 400 psig (2758 kPa) to 800 psig (5516 kPa), preferably 450 psig (3103 kPa) to about 700 psig (4827 kPa), more preferably 500 psig (3448 kPa) to about 650 psig (4482 kPa), most preferably from about 525 psig (3620 kPa) to 625 psig (4309 kPa).

In yet another embodiment in the slurry process of the invention the concentration of predominant monomer in the reactor liquid medium is in the range of from about 1 to 10 weight percent, preferably from about 2 to about 7 weight percent, more preferably from about 2.5 to about 6 weight percent, most preferably from about 3 to about 6 weight percent.

Another process of the invention is where the process, preferably a slurry or gas phase process is operated in the absence of or essentially free of any scavengers, such as triethylaluminum, trimethylaluminum, tri-iso-butylaluminum and tri-n-hexylaluminum and diethyl aluminum chloride, dibutyl zinc and the like. This process is described in PCT publication WO 96/08520 and U.S. Pat. No. 5,712,352, which are herein fully incorporated by reference.

In another embodiment the process is run with scavengers. Typical scavengers include trimethyl aluminum, tri-iso-butyl aluminum and an excess of alumoxane or modified alumoxane.

Homogeneous, Bulk or Solution Phase Polymerization

The catalysts described herein can be used advantageously in homogeneous solution processes. Generally this involves polymerization in a continuous reactor in which the polymer formed and the starting monomer and catalyst materials supplied, are agitated to reduce or avoid concentration gradients. Suitable processes operate above the melting point of the polymers at high pressures, from 1 to 3000 bar (10-30,000 MPa), in which the monomer acts as diluent or in solution polymerization using a solvent.

Temperature control in the reactor is obtained by balancing the heat of polymerization and with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds may also be used. The reactor temperature depends on the catalyst used. In general, the reactor temperature preferably can vary between about 0° C. and about 160° C., more preferably from about 10° C. to about 140° C., and most preferably from about 40° C. to about 120° C. In series operation, the second reactor temperature is preferably higher than the first reactor temperature. In parallel reactor operation, the temperatures of the two reactors are independent. The pressure can vary from about 1 mm Hg to 2500 bar (25,000 MPa), preferably from 0.1 bar to 1600 bar (1-16,000 MPa), most preferably from 1.0 to 500 bar (10-5000 MPa).

Each of these processes may also be employed in single reactor, parallel or series reactor configurations. The liquid processes comprise contacting olefin monomers with the above described catalyst system in a suitable diluent or solvent and allowing said monomers to react for a sufficient time to produce the desired polymers. Hydrocarbon solvents are suitable, both aliphatic and aromatic. Alkanes, such as hexane, pentane, isopentane, and octane, are preferred.

The process can be carried out in a continuous stirred tank reactor, batch reactor, or plug flow reactor, or more than one reactor operated in series or parallel. These reactors may have or may not have internal cooling and the monomer feed may or may not be refrigerated. See the general disclosure of U.S. Pat. No. 5,001,205 for general process conditions. See also, international application WO 96/33227 and WO 97/22639.

Medium and High Pressure Polymerizations

In the high pressure process for the polymerization of ethylene alone or in combination with $C_3$ to $C_{10}$ alpha-olefins and optionally other copolymerizable olefins, the temperature of the medium within which the polymerization reaction occurs is at least 120° C. and preferably above 140° C. and may range to 350° C., but below the decomposition temperature of said polymer product, typically from 310° C. to 325° C. Preferably, the polymerization is completed at a temperature within the range of 130° C. to 230° C. The polymerization is completed at a pressure above 200 bar (20 MPa), and generally at a pressure within the range of 500 bar (50 MPa) to 3500 bar (350 MPa). Preferably, the polymerization is completed at a pressure within the range from 800 bar (80 MPa) to 2500 bar (250 MPa).

For medium pressure process, the temperature within which the polymerization reaction occurs is at least 80° C. and ranges from 80° C. to 250° C., preferably from 100° C. to 220° C., and should for a given polymer in the reactor, be above the melting point of said polymer so as to maintain the fluidity of the polymer-rich phase. The pressure can be varied between 100 and 1000 bar for ethylene homopolymers and from 30 bar (3 MPa) to 1000 bar (100 MPa), especially 50 bar (5 MPa) to 500 bar (50 MPa) for processes producing ethylene copolymers containing $C_3$ to $C_{10}$ olefins and optionally other copolymerizable olefins.

More recently, polymerization conditions for high pressure and or temperature polymerizations to prepare propylene homopolymers and copolymers of propylene with $C_3$ to $C_{10}$ olefins and optionally other copolymerizable olefins have been reported. See U.S. patent applications 60/431,185 filed Dec. 5, 2002; 60/431,077, filed Dec. 5, 2002; and 60/412,541, filed Sep. 20, 2002.

After polymerization and deactivation of the catalyst, the polymer product can be recovered by processes well known in the art. Any excess reactants may be flashed off from the polymer and the polymer obtained extruded into water and cut into pellets or other suitable comminuted shapes. For general process conditions, see the general disclosure of U.S. Pat. Nos. 5,084,534, 5,408,017, 6,127,497, 6,255,410, which are incorporated herein by reference.

Experimental—Synthesis of Pre-Catalysts

All manipulations with air and moisture sensitive compounds were performed either in an atmosphere of thoroughly purified argon using a standard Schlenk technique or in a controlled atmosphere Glove Box (Vacuum Atmospheres Co.). Tetrahydrofuran (THF, Merck=Merck KGaA, Darmstadt, Germany), dimethoxyethane (DME, Acros Organics=Acros), and diethyl ether (Merck) for synthesis were purified by distillation over $LiAlH_4$, and stored over sodium benzophenone ketyl under an inert atmosphere; prior to use, the solvents were distilled from the benzophenone ketyl. Hydrocarbon solvents such as benzene (Merck), toluene (Merck) and hexanes (Merck) were typically distilled over $CaH_2$, and were stored over Na/K alloy under an inert atmosphere; prior to use, the solvents were distilled from the Na/K alloy. Methylene chloride (Merck, and $CCl_2D_2$ for NMR measurements, Cambridge Isotope Laboratories, Inc.) was distilled and stored over $CaH_2$ under an inert atmosphere; prior to use, the solvent was distilled from the $CaH_2$. Chloroform-d (Merck) was distilled over $P_4O_{10}$ and stored over molecular sieves (3 Å). Anhydrous $ZrCl_4$ (Aldrich=Aldrich Chemical Co., or Merck), $HfCl_4$ (Aldrich), $ZrCl_4(THF)_2$ (Aldrich), $Cp^*ZrCl_3$ (Aldrich, Cp*=pentamethylcyclopentadienyl), indanone-2 (Aldrich), 2.5M $^nBuLi$ in hexanes (Chemetall=Chemetall Chemical Products, or Acros), $Et_3SnCl$ (Alfa Aesar=Alfa), anhydrous $K_3PO_4$ (Aldrich or Fluka), $Na_2CO_3$ (Merck), $NaBPh_4$ (Aldrich), 1-naphthylboronic acid=1-naphthaleneboronic acid (Aldrich), para-tolylboronic acid=para-tolylboronic acid (Aldrich), $^t$BuOLi (Aldrich), $^t$BuOK (Aldrich), 2-[di(tert-butyl)phosphino]biphenyl (Strem=Strem Chemical Co), 2-di(tert-butyl)phosphino-2'-(N,N-dimethylamino)biphenyl (Strem), tri(tert-butyl)phosphine=$P^tBu_3$ (Strem), $Pd(OAc)_2$ (Strem, OAc=acetate), $Pd(dba)_2$ (Aldrich, dba=dibenzylidenacetone), bis(tri-tert-butylphosphine) palladium=$Pd(P_tBu_3)_2$ (Strem), dimethyldichlosilane (Merck), 2-bromobenzyl bromide (Aldrich), 2-methyl-4-chloroaniline (Aldrich), diphenylamine (Reakhim), benzimidazole (Merck), $LiN(TMS)_2$ (Aldrich, TMS=$SiMe_3$), pyrrole (Merck), 2,4-dimethylpyrrole (Aldrich), 2,5-dimethylpyrrole (Aldrich), indole (Acros), 2-methylindole (Merck), 2,3-dimethylindole (Lancaster=Lancaster Synthesis, Inc.), phenothiazine (Acros), 2,3,4,9-tetrahydro-1H-carbazole (Lancaster), carbazole (Aldrich), anhydrous ethanol (Merck), methanol (Merck), methyl-tert-butyl ether (Acros=Acros Organics, or Merck; MTBE), acetone (Merck), acetonitrile (grade 0, Kryochrom Ltd., St.-Petersburg, Russia), anhydrous $K_2CO_3$ (Merck), sodium metal (Merck), diethylmethylmalonate (Acros), anhydrous powdered $AlCl_3$ (Merck), para-toluene sulfonic acid (Aldrich), sodium nitrite (Merck), bromine (Merck), KOH (Merck) and CuBr (Acros) were used as obtained. Thionyl chloride (Merck) was distilled before use. 2-Bromo-1H-indene [(a) MacDowell, D. W. H.; Lindley, W. A. *J. Org. Chem.* 1982, 47, 705. (b) McEwen, I.; Rönnqvist, M.; Ahlberg, P. *J. Am. Chem. Soc.* 1993, 115, 3989. (c) Halterman, R. L.; Fahey, D. R.; Bailly, E. F.; Dockter, D. W.; Stenzel, O.; Shipman, J. L.; Khan, M. A.; Dechert, S.; Schumann, H. *Organometallics* 2000, 19, 5464.], 1H-inden-2-yl trifluoromethanesulfonate [Radivoy, G.; Yus, M.; Alonso, F. *Tetrahedron* 1999, 55, 14479.], 1,2,3,4-tetrahydrocyclopenta[b]indole [Rodriguez, J. G.; Temprano, F.; Esteban-Calderon, C.; Martinez-Ripoll, M.; Garcia-Blanco, S. *Tetrahedron,* 1985, 41, 3813.], and $Pd(dba)_2$ (dba=dibenzylidenacetone) [Ukai, T.; Kawazawa, H.; Ishii, Y.; Bonnett, J. J.; Ibers, J. A. *J. Organomet. Chem.* 1974, 65, 253.] were prepared according to the published methods. 1H-Inden-2-ylboronic acid was obtained in 43% yield from 2-bromo-1H-indene (Aldrich), magnesium turnings (Merck), and tri(isopropyl)borate (Alfa) as described in [IJpeij, E. G.; Beijer, F. H.; Arts, H. J.; Newton, C.; de Vries, J. G.; Gruter, G.-J. M., *J. Org. Chem.* 2002, 67, 169]. $[(TMEDA)CuOH]_2Cl_2$ was synthesized from CuCl (Acros), N,N,N'N'-tetramethylethylenediamine (TMEDA, Merck), and ethanol (Merck) as described in [Collman, J. P.; Zhong, M.; Zhang, C.; Costanzo, S., J. Org. Chem. 2001, 66, 7892]. Silica Gel 60, 40-63 μm (Merck and Fluka) was used as obtained. Celite 503 (Fluka Chemical Corp.) was dried in vacuum at. 180° C.

Analytical and semi-preparative liquid chromatography was performed using *Waters* Delta 600 HPLC system including 996 Photodiode Array Detector, Nova-Pack C18 or HR Silica (60A, 6 μm, 3.9 and 19×300 mm) and Symmetry C18 (5 μm, 4.6×250 mm) columns. $^1H$, and $^{13}C$ spectra were recorded with a Brucker DPX-300 for 1-10% solutions in deuterated solvents. Chemical shifts for $^1H$ and $^{13}C$ were measured relatively to tetramethylsilane (TMS). C, H microanalyses were done using CHN-O-Rapid analyzer (Heraecus Ltd., Banau, Germany).

Reaction Outline of Ligands 5-12 and Complexes 13-20.

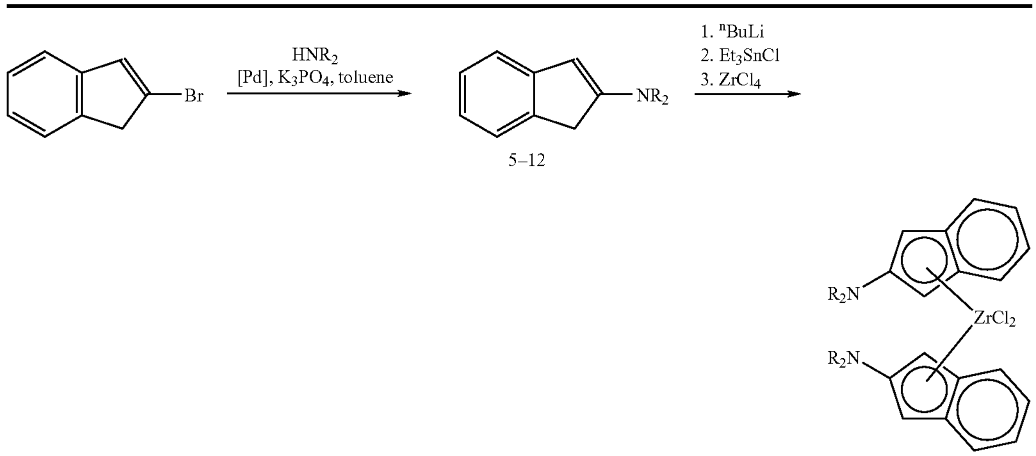

5–12

13–20

NR$_2$

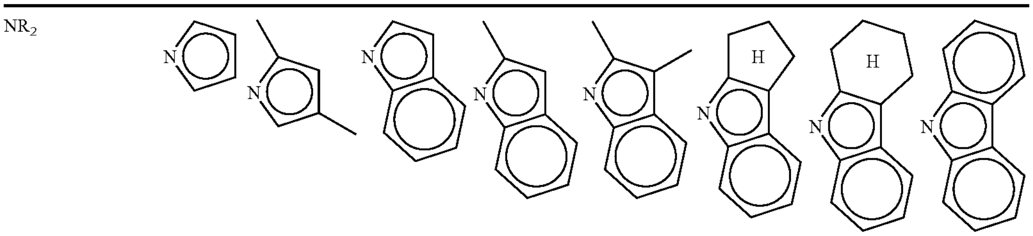

| | | | | | | | | |
|---|---|---|---|---|---|---|---|---|
| compound | 5 | 6 | 7 | 8 | 9 | 10 | 11 | 12 |
| yield, % (HPLC) | 20 (24) | 53 (70) | 60 (75) | 48 (80) | 48 (77) | 33 (87) | 61 (63) | 37 (83) |
| compound | 13 | 14 | 15 | 16 | 17 | 18 | 19 | 20 |
| yield,% | 17 | 37 | 25 | 18 | 27 | 15 | 18 | 54 |

1-(1H-inden-2-yl)-1H-pyrrole (5)

In three-necked round-bottom flask (1 L), equipped with an Allihn condenser and magnetic stirrer bar and under an argon atmosphere, to a mixture of 49.0 g (231 mmol) of anhydrous $K_3PO_4$, 30.0 g (154 mmol) of 2-bromo-1H-indene, and 11.5 ml (11.1 g, 165 mmol) of pyrrole in 500 ml of toluene and 50 ml of DME, 4.59 g (15.4 mmol) of 2-[di(tert-butyl)-phosphino]biphenyl and 1.73 g (7.70 mmol) of $Pd(OAc)_2$ were added at ambient temperature. This mixture was stirred at room temperature for 72 hours. The reaction mixture was filtered through the layer (d 100 mm, l 40 mm) of SilicaGel 60 (40-63 um) on a glass frit funnel. The SilicaGel layer was additionally washed by 200 ml of methyl-tert-butyl ether (MTBE). The combined extract was evaporated to dryness. The crude product was purified using flash chromatography (SilicaGel 60, 40-63 um, d 40 mm, l 500 mm; eluent hexanes/MTBE=10/1). This procedure gave 5.62 g (20%) of white crystalline product.

Anal. calc. for $C_{13}H_{11}N$: C, 86.15; H, 6.12. Found: C, 86.24; H, 6.19.

$^1$H NMR ($CDCl_3$): δ 8.08 (m, 1H, 7-H of indenyl), 7.92-8.01 (m, 3H, 3,4,6-H of indenyl), 7.83 (dt, J=7.2 Hz, J=1.5 Hz, 1H, 5-H of indenyl), 7.77 (t, J=7.4 Hz, 2H, 2,5-H of N-pyrrolyl), 7.00 (t, J=2.19 Hz, 2H, 3,4-H of N-pyrrolyl), 4.51 (s, 2H, $CH_2$). $^{13}$C NMR ($CDCl_3$): δ 144.7, 144.1, 138.0, 126.9, 123.8, 123.4, 120.2, 118.7, 111.2, 110.6, 37.4.

1-(1H-inden-2-yl)-2,4-dimethyl-1H-pyrrole (6)

The reaction was carried out similarly to the preparation of compound 5 starting from 7.40 ml (6.84 g, 72 mmol) of 2,4-dimethylpyrrole, 13.7 g (70 mmol) of 2-bromoindene, 44.5 g (210 mmol) of $K_3PO_4$, 1.13 g (13.0 ml of 0.2M solution in toluene, 5.60 mmol) of $^t$Bu$_3$P, 1.61 g (2.80 mmol) of $Pd(dba)_2$, 170 ml of toluene, and 35 ml of DME. The reaction mixture was stirred at 80° C. for 14 hours. Yield 7.81 g (53%) of 6.

Anal. calc. for $C_{15}H_{15}N$: C, 86.08; H, 7.22. Found: C, 85.99; H, 7.27.

$^1$H NMR ($CDCl_3$): δ 7.43 (m, 1H, 7-H of indenyl), 7.28-7.37 (m, 3H, 3,4,6-H of indenyl), 7.19 (dt, J=7.3 Hz, J=1.6 Hz, 1H, 5-H of indenyl), 6.71 (s, 1H, 5-H of N-pyrrolyl), 6.56 (s, 1H, 3-H of indenyl), 5.94 (s, 1H, 3-H of N-pyrrolyl), 3.82 (s, 2H, $CH_2$), 2.47 (s, 3H, 2-Me of N-pyrrolyl), 2.15 (s, 3H, 4-Me of N-pyrrolyl).

$^{13}$C NMR ($CDCl_3$): δ 144.6, 144.4, 138.3, 129.5, 126.8, 123.9, 123.2, 120.3, 119.5, 117.6, 114.8, 112.1, 39.6, 14.8, 11.7.

1-(1H-inden-2-yl)-1H-indole (7)

The reaction was carried out similarly to the preparation of compound 5 starting from 4.80 g (41 mmol) of indole, 8.00 g (41 mmol) of 2-bromoindene, 52.2 g (246 mmol) of $K_3PO_4$, 0.331 g (3.80 ml of 0.2M solution in toluene, 1.64 mmol) of $^t$Bu$_3$P, 0.184 g (0.82 mmol) of $Pd(OAc)_2$, 110 ml of toluene, and 20 ml of DME. The reaction mixture was stirred at 70° C. for 8.5 hours. Yield 5.64 g (60%) of 7.

Anal. calc. for $C_{17}H_{13}N$: C, 88.28; H, 5.67. Found: C, 88.10; H, 5.60.

$^1$H NMR ($CDCl_3$): δ 7.79 (m, 1H, 7-H of N-indolyl), 7.63 (m, 1H, 4-H of N-indolyl), 7.36 (m, 1H, 7-H of indenyl), 7.09-7.33 (m, 6H, 4,5,6-H of indenyl and 2,5,6-H of N-indolyl), 6.79 (s, 1H, 3-H of indenyl), 6.61 (dd, J=3.4 Hz, J=0.8 Hz, 1H, 3-H of N-indolyl), 3.84 (s, 2H, $CH_2$).

$^{13}$C NMR ($CDCl_3$): δ 144.3, 143.9, 137.7, 135.4, 130.0, 127.0, 126.3, 123.9, 123.3, 123.0, 121.3, 121.0, 120.3, 113.9, 112.2, 104.8, 39.2.

1-(1H-inden-2-yl)-2-methyl-1H-indole (8)

The reaction was carried out similarly to the preparation of compound 5 starting from 4.45 g (34 mmol) of 2-methylindole, 6.63 g (34 mmol) of 2-bromoindene, 21.6 g (102 mmol) of $K_3PO_4$, 0.404 g (4.65 ml of 0.2M solution in toluene, 2.00 mmol) of $^t$Bu$_3$P, 0.224 g (1.00 mmol) of $Pd(OAc)_2$, 80 ml of toluene, and 15 ml of DME. The reaction mixture was stirred at 75° C. for 9 hours. Yield 4.00 g (48%) of 8.

Anal. calc. for $C_{18}H_{15}N$: C, 88.13; H, 6.16. Found: C, 88.22; H, 6.09.

$^1$H NMR ($CDCl_3$): δ 7.06-7.54 (m, 8H, 4,5,6,7-H of indenyl and 4,5,6,7-H pf N-indolyl), 6.83 (s, 1H, 3-H of indenyl), 6.36 (s, 1H, 3-H of N-indolyl), 3.75 (s, 2H, $CH_2$), 2.41 (s, 3H, Me).

$^{13}$C NMR ($CDCl_3$): δ 143.0, 142.5, 140.6, 137.8, 136.8, 128.5, 127.0, 126.8, 125.1, 123.7, 121.3*, 120.2, 119.6, 110.5, 102.3, 40.0, 13.9 (* two chemically nonequivalent carbon nuclei).

1-(1H-inden-2-yl)-2,3-dimethyl-1H-indole (9)

The reaction was carried out similarly to the preparation of compound 5 starting from 7.41 g (51 mmol) of 2,3-dimethylindole, 9.95 g (51 mmol) of 2-bromoindene, 32.4 g (153 mmol) of $K_3PO_4$, 1.03 g (11.9 ml of 0.2M solution in toluene, 5.10 mmol) of $^t$Bu$_3$P, 0.572 g (2.55 mmol) of $Pd(OAc)_2$, 140 ml of toluene, and 30 ml of DME. The reaction mixture was stirred at 85° C. for 11 hours. Yield 6.37 g (48%) of 9.

Anal. calc. for $C_{19}H_{17}N$: C, 87.99; H, 6.61. Found: C, 88.13; H, 6.68.

$^1$H NMR ($CDCl_3$): δ 7.09-7.53 (m, 8H, 4,5,6,7-H of indenyl and 4,5,6,7-H of N-indolyl), 6.82 (s, 1H, 3-H of indenyl), 3.76 (s, 2H, $CH_2$), 2.35 (s, 3H, 2-Me of N-indolyl), 2.28 (s, 3H, 3-Me of N-indolyl).

$^{13}$C NMR ($CDCl_3$): δ 143.2, 143.0, 140.6, 136.9, 132.6, 129.2, 126.8, 126.5, 125.0, 123.7, 121.4, 121.2, 119.7, 117.9, 110.2, 108.9, 40.2, 11.4, 8.8.

4-(1H-inden-2-yl)-1,2,3,4-tetrahydrocyclopenta[b]indole (10)

The reaction was carried out similarly to the preparation of compound 5 starting from 6.28 g (40 mmol) of 1,2,3,4-tetrahydrocyclopenta[b]indole, 7.80 g (40 mmol) of 2-bromoindene, 25.4 g (120 mmol) of $K_3PO_4$, 0.808 g (9.30 ml of 0.2M solution in toluene, 4.00 mmol) of $^t$Bu$_3$P, 0.449 g (2.00 mmol) of $Pd(OAc)_2$, 120 ml of toluene, and 20 ml of DME. The reaction mixture was stirred at 85° C. for 11 hours. Yield 3.53 g (33%) of 10.

Anal. calc. for $C_{20}H_{17}N$: C, 88.52; H, 6.31. Found: C, 88.60; H, 6.34.

$^1$H NMR ($CDCl_3$): δ 7.68 (m, 1H, 7-H of indenyl), 7.07-7.46 (m, 7H, 4,5,6-H of indenyl and 4,5,6,7-H of N-azolyl), 6.72 (s, 1H, 3-H of indenyl), 3.81 (s, 2H, $CH_2$ of indenyl), 2.97 (m, 2H, 2-$CH_2$ of N-azolyl), 2.80 (m, 2H, 4-$CH_2$ of N-azolyl). 2.49 (m, 2H, 3-$CH_2$ of N-azolyl).

$^{13}$C NMR ($CDCl_3$): δ 144.6, 144.1, 143.8, 140.6, 138.3, 126.8, 125.7, 123.8, 123.2, 122.0, 121.5, 120.6, 120.2, 118.7, 115.5, 112.4, 39.5, 28.1, 28.0, 24.0.

9-(1H-inden-2-yl)-2,3,4,9-tetrahydro-1H-carbazole (11)

The reaction was carried out similarly to the preparation of compound 5 starting from 8.73 g (51 mmol) of 2,3,4,9-tetrahydro-1H-carbazole, 10.0 g (51 mmol) of 2-bromoindene, 32.4 g (153 mmol) of $K_3PO_4$, 1.01 g (11.6 ml 0.2M solution in toluene, 5.00 mmol) of $^tBu_3P$, 0.561 g (2.50 mmol) of $Pd(OAc)_2$, 150 ml of toluene, and 30 ml of DME. The reaction mixture was stirred at 80° C. for 8.5 hours. Yield 8.92 g (61%) of 11.

Anal. calc. for $C_2$, $H_{19}N$: C, 88.38; H, 6.71. Found: C, 88.29; H, 6.80.

$^1H$ NMR ($CDCl_3$): δ 6.96-7.38 (m, 8H, 4,5,6,7-H of indenyl and 6,7,8,9-H of N-azolyl), 6.65 (m, 1H, 3-H of indenyl), 3.68 (s, 2H, $CH_2$ of indenyl), 2.62 (m, 4H, 3-$CH_2$ and 4-$CH_2$ N-azolyl), 1.75 (m, 4H, 2-$CH_2$ and 5-$CH_2$ of N-azolyl).

$^{13}C$ NMR ($CDCl_3$): δ 143.4, 142.7, 140.1, 136.8, 135.5, 128.2, 126.8, 124.6, 123.7, 123.5, 121.6, 120.9, 119.9, 117.8, 112.1, 110.7, 40.0, 24.0, 23.5, 22.8, 21.1.

9-(1H-inden-2-yl)-9H-carbazole (12)

The reaction was carried out similarly to the preparation of compound 5 starting from 6.85 g (41 mmol) of carbazole, 8.00 g (41 mmol) of 2-bromoindene, 26.1 g (123 mmol) of $K_3PO_4$, 0.331 g (3.80 ml of 0.2M solution in toluene, 1.64 mmol) of $^tBu_3P$, 0.184 g (0.82 mmol) of $Pd(OAc)_2$, 100 ml of toluene, and 20 ml of DME. The reaction mixture was stirred at 70° C. for 7.5 hours. Yield 4.26 g (37%) of 12.

Anal. calc. for $C_{21}H_{15}N$: C, 89.65; H, 5.37. Found: C, 89.71; H, 5.31.

$^1H$ NMR ($CDCl_3$): δ 8.08 (d, J=7.8 Hz, 2H, 4,5-H of N-carbazolyl), 7.57 (d, J=8.0 Hz, 2H, 1,8-H of N-carbazolyl), 7.20-7.48 (m, 8H, 4,5,6,7-H of indenyl and 2,3,6,7-H of N-carbazolyl), 7.02 (s, 1H, 3-H of indenyl), 3.92 (s, 2H, $CH_2$).

$^{13}C$ NMR ($CDCl_3$): δ 143.2, 142.2, 140.6, 140.2, 126.9, 126.1, 125.7, 125.1, 123.7*, 121.2, 120.2*, 110.5, 39.0 (* two chemically nonequivalent carbon nuclei).

Complex 13—bis-($\eta^5$-2-(pyrrol-1-yl)indenyl)zirconium dichloride

In a round bottom flask (0.1 L) in the Glove Box, to a solution of 4.22 g (23.3 mmol) of 5 in a mixture of 60 ml of toluene and 6 ml of ether, 9.6 ml of 2.5M solution of $^nBuLi$ (24 mmol) in hexanes was added at room temperature. This mixture was stirred overnight. Then, 4.19 ml (6.04 g, 25 mmol) of $Et_3SnCl$ was added dropwise, and the reaction mixture was stirred for 3 hours at room temperature and then was filtered through Celite 503 (on glass frit funnel). The Celite layer was additionally washed by 50 ml of toluene. The combined extract was evaporated in vacuum to ca. ⅔ of its former volume. To the resulting mixture, 2.70 g (11.6 mmol) of $ZrCl_4$ was added at room temperature. This mixture was stirred for 2 days, then filtered through glass frit (G4). Crystals precipitated at −30° C. from the filtrate were separated, washed by 5 ml of cold toluene, and dried in vacuum. Yield 1.03 g (17%) of yellowish crystals of 13.

Anal. calc. for $C_{26}H_{20}Cl_2N_2Zr$: C, 59.76; H, 3.86. Found: C, 59.52; H, 3.77.

$^1H$ NMR ($CD_2Cl_2$): δ 7.56 (m, 4H, 4,4',7,7'-H in indenyl), 7.27 (m, 4H, 5,5',6,6'-H in indenyl), 6.87 (t, J=2.3 Hz, 4H, 2,2',5,5'-H in N-pyrrolyl), 6.25 (t, J=2.3 Hz, 4H, 3,3',4,4'-H in N-pyrrolyl), 5.83 (s, 4H, 1,1',3,3'-H of indenyl).

$^{13}C$ NMR ($CD_2Cl_2$): δ 142.2, 141.9, 127.6, 127.0, 120.9, 112.9, 93.9.

Complex 14—bis-($\eta^5$-2-(2,4-dimethylpyrrol-1-yl)indenyl)zirconium dichloride The reaction was carried out similarly to the preparation of compound 13 starting from 5.90 g (28.2 mmol) of 6 in a mixture of 85 ml of toluene and 17 ml of ether, 11.8 ml of 2.5M solution of $^nBuLi$ (29.6 mmol) in hexanes, 5.03 ml (7.24 g, 30 mmol) of $Et_3SnCl$, and 3.26 g (14.0 mmol) of $ZrCl_4$. Yield 3.01 g (37%) of yellowish crystals of 14.

Anal. calc. for $C_{30}H_{28}Cl_2N_2Zr$: C, 62.27; H, 4.88. Found: C, 62.06; H, 4.70.

$^1H$ NMR ($CD_2Cl_2$): δ 7.51 (m, 4H, 4,4',7,7'-H of indenyl), 7.25 (m, 4H, 5,5',6,6'-H of indenyl), 6.53 (s, 2H, 5,5'-H of N-pyrrolyl), 5.84 (s, 2H, 3,3'-H of N-pyrrolyl), 5.77 (s, 4H, 1,1',3,3'-H of indenyl), 2.25 (s, 6H, 2,2'-Me of N-pyrrolyl), 2.05 (s, 6H, 4,4'-Me of N-pyrrolyl).

$^{13}C$ NMR($CD_2Cl_2$): δ 142.7, 131.7, 127.6, 127.0, 125.0, 122.2, 119.5, 115.0, 95.8, 16.6, 13.1.

Complex 15—bis-($\eta^5$-2-(indol-1-yl)indenyl)zirconium dichloride

The reaction was carried out similarly to the preparation of compound 13 starting from 5.59 g (24.2 mmol) of 7 in a mixture of 50 ml of toluene and 10 ml of ether, 10.0 ml of 2.5M solution of $^nBuLi$ (25 mmol) in hexanes, 5.02 ml (7.23 g, 30 mmol) of $Et_3SnCl$, and 2.82 g (12.1 mmol) of $ZrCl_4$. Yield 1.89 g (25%) of yellowish crystals of 15.

Anal. calc. for $C_{34}H_{24}Cl_2N_2Zr$: C, 65.58; H, 3.88. Found: C, 65.77; H, 3.98.

$^1H$ NMR ($CD_2Cl_2$): δ 7.17-7.63 (m, 16H, 4,4',5,5',6,6',7,7'-H of indenyl and 4,4',5,5',6,6',7,7'-H of N-indolyl), 7.13 (d, J=3.6 Hz, 2H, 2,2'-H of N-indolyl), 6.64 (m, 2H, 3,3'-H of N-indolyl), 5.98 (s, 4H, 1,1',3,3'-H of indenyl).

$^{13}C$ NMR ($CD_2Cl_2$): δ 143.2, 136.7, 131.8, 128.7, 127.6, 127.3, 124.9, 123.1, 123.0, 114.0, 107.6, 107.3, 95.1.

Complex 16—bis-($\eta^5$-2-(2-methylindol-1-yl)indenyl)zirconium dichloride

The reaction was carried out similarly to the preparation of compound 13 starting from 4.07 g (16.6 mmol) of 8 in a mixture of 70 ml of toluene and 15 ml of ether, 7.2 ml of 2.5M solution of $^nBuLi$ (18 mmol) in hexanes, 3.19 ml (4.59 g, 19 mmol) of $Et_3SnCl$, and 1.93 g (8.3 mmol) of $ZrCl_4$. Yield 0.98 g (18%) of yellowish crystals of 16.

Anal. calc. for $C_{36}H_{28}Cl_2N_2Zr$: C, 66.44; H, 4.34. Found: C, 66.65; H, 4.47.

$^1H$ NMR ($CD_2Cl_2$): δ 7.61 (m, 2H, 4,4'-H of N-indolyl), 7.82 (m, 2H, 7,7'-H of N-indolyl), 7.23-7.36 (m, 12H, 4,4',5,5',6,6',7,7'-H of indenyl and 5,5',6,6'-H of N-indolyl), 6.48 (s, 2H, 3,3'-H of N-indolyl), 5.96 (br. s, 4H, 1,1',3,3'-H of indenyl), 2.10 (s, 6H, 2,2'-Me of indolyl).

$^{13}C$ NMR ($CD_2Cl_2$): δ 135.7, 135.6, 130.9, 128.6, 126.9, 126.1, 124.2, 123.5, 121.9, 114.3, 112.1 (br.), 107.7, 99.3 (br.), 17.2.

Complex 17—bis-($\eta^5$-2-(2,3-dimethylindol-1-yl)indenyl)zirconium dichloride

The reaction was carried out similarly to the preparation of compound 13 starting from 6.30 g (24.3 mmol) of 9 in a mixture of 105 ml of toluene and 10 ml of ether, 10.0 ml of 2.5M solution of $^nBuLi$ (25 mmol) in hexanes, 5.03 ml (7.24 g, 30.0 mmol) of $Et_3SnCl$, and 2.82 g (12.1 mmol) of $ZrCl_4$. Yield 2.18 g (27%) of yellowish crystals of 17.

Anal. calc. for $C_{38}H_{32}Cl_2N_2Zr$: C, 67.24; H, 4.75. Found: C, 67.11; H, 4.73.

$^1$H NMR ($CD_2Cl_2$): δ 7.78 (m, 2H, 4,4'-H of N-indolyl), 7.61 (m, 2H, 7,7'-H of N-indolyl), 7.20-7.37 (m, 12H, 4,4',5,5',6,6',7,7'-H of indenyl and 5,5',6,6'-H of N-indolyl), 5.90 (br.s, 4H, 1,1',3,3'-H of indenyl), 2.29 (s, 6H, 2,2'-Me of N-indolyl), 1.94 (s, 6H, 3,3'-Me of N-indolyl).

$^{13}$C NMR ($CD_2Cl_2$): δ 139.7, 135.5, 135.0, 131.8, 128.5, 126.8, 126.2 (br.), 124.4, 123.1, 120.3, 120.1, 114.1, 113.8, 99.1 (br.), 14.1, 13.9, 10.4, 10.2.

Complex 18—bis-($\eta^5$-2-(1,2,3,4-tetrahydrocyclopenta[b]indol-4-yl)indenyl)zirconium dichloride The reaction was carried out similarly to the preparation of compound 13 starting from 3.52 g (13.0 mmol) of 10 in a mixture of 60 ml of toluene and 6 ml of ether, 5.6 ml of 2.5M solution of $^n$BuLi (14.0 mmol) in hexanes, 2.50 ml (3.60 g, 15.0 mmol) of $Et_3SnCl$, and 1.51 g (6.50 mmol) of $ZrCl_4$. The crude product was recrystallized from toluene-hexanes mixture at −30° C. Yield 0.69 g (15%) of yellowish crystals of 17.

Anal. calc. for $C_{40}H_{32}Cl_2N_2Zr$: C, 68.36; H, 4.59. Found: C, 68.64; H, 4.73.

$^1$H NMR ($CD_2Cl_2$): δ 7.84-7.91 (m, 2H, 5,5'-H of N-azolyl), 7.46-7.52 (m, 6H, 6,6',7,7',8,8'-H of N-azolyl), 7.27 (dd, J=6.3 Hz, J=3.1 Hz, 4H, 4,4',7,7'-H of indenyl), 7.04 (dd, J=6.3 Hz, J=3.1 Hz, 4H, 5,5',6,6'-H of indenyl), 6.36 (m, 4H, 1,1',3,3'-H of indenyl), 3.08 (m, 4H, 4,4'-$CH_2$ of N-azolyl), 2.86 (m, 4H, 2,2'-$CH_2$ of N-azolyl), 2.54 (m, 4H, 3,3'-$CH_2$ of N-azolyl).

$^{13}$C NMR ($CD_2Cl_2$): δ 145.4, 144.9, 140.8, 128.0, 127.0, 126.8, 126.3, 125.2, 122.4, 121.9, 119.3, 113.9, 96.0, 29.2, 28.5, 24.2.

Complex 19—bis-($\eta^5$-2-(1,2,3,4-tetrahydrocarbazol-9-yl)indenyl)zirconium dichloride The reaction was carried out similarly to the preparation of compound 13 starting from 4.91 g (17.2 mmol) of 11 in a mixture of 70 ml of toluene and 7 ml of ether, 7.2 ml of 2.5M solution of $^n$BuLi (1 mmol) in hexanes, 3.19 ml (4.59 g, 19 mmol) of $Et_3SnCl$, and 2.00 g (8.6 mmol) of $ZrCl_4$. Yield 1.15 g (18%) of yellowish crystals of 19.

Anal. calc. for $C_{42}H_{36}Cl_2N_2Zr$: C, 69.02; H, 4.96. Found: C, 68.86; H, 5.11.

$^1$H NMR ($CD_2Cl_2$): δ 7.70 (m, 2H, 6,6'-H of N-azolyl), 7.55 (m, 2H, 9,9'-H of N-azolyl), 7.22-7.40 (m, 12H, 4,4', 5,5',6,6',7,7'-H of indenyl and 7,7',8,8'-H of N-azolyl), 5.95 (br.s, 4H, 1,1',3,3'-H of indenyl), 2.76, 2.28, 2.08, and 1.84 (four multiplets, 4×4H, 2,2'-$CH_2$, 3,3'-$CH_2$, 4,4'-$CH_2$, and 5,5'-$CH_2$ of N-azolyl).

$^{13}$C NMR ($CD_2Cl_2$): δ 137.2, 134.9, 133.7, 128.0, 125.4, 123.8, 123.1, 121.2, 120.0, 117.0, 113.2, 111.1, 95.3 (br.), 23.8, 22.1, 20.9, 19.6.

Complex 20—bis-($\eta^5$-2-(carbazol-9-yl)indenyl) zirconium dichloride

The reaction was carried out similarly to the preparation of compound 13 starting from 4.75 g (16.9 mmol) of 12 in a mixture of 50 ml of toluene and 6 ml of ether, 7.1 ml of 2.5M solution of $^n$BuLi (17.5 mmol) in hexanes, 3.02 ml (4.34 g, 18 mmol) of $Et_3SnCl$, and 1.96 g (11.6 mmol) of $ZrCl_4$. This compound was found to be practically insoluble in all common solvents. Therefore, the resulting mixture was filtered through glass frit (G4), and the solid obtained was washed by 2×15 ml of hot toluene, 2×30 ml of hot DME, and 2×30 ml of dichloromethane, then dried in vacuum. Yield 3.29 g (54%) of yellow powder of 20.

Anal. calc. for $C_{42}H_{28}Cl_2N_2Zr$: C, 69.79; H, 3.90. Found: C, 69.54; H, 3.78.

$^1$H NMR ($CD_2Cl_2$): δ 8.11 (m, 4H, 4,4',5,5'-H of N-carbazolyl), 7.56 (m, 4H, 1,1',8,8'-H of N-carbazolyl), 7.80 (m, 16H, 4,4',5,5',6,6',7,7'-H of indenyl and 2,2',3,3',6,6',7,7'-H of N-carbazolyl), 6.17 (s, 4H, 1,1',3,3'-H of indenyl).

Reaction Outline for Complex 21.

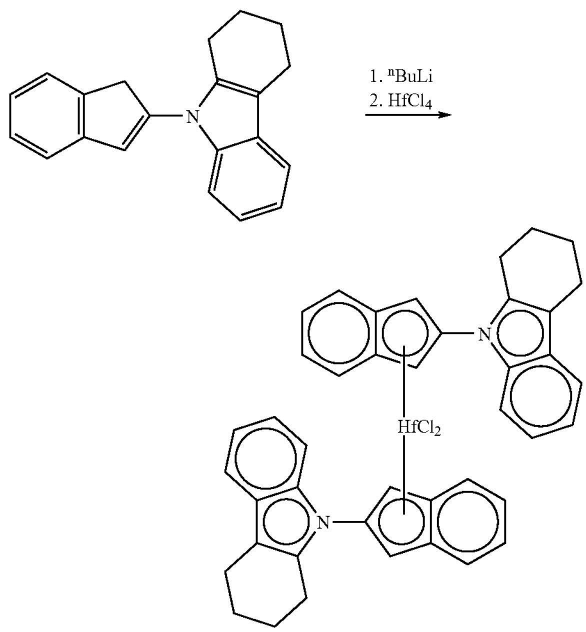

21

Complex 21—bis-($\eta^2$-2-(1,2,3,4-tetrahydrocarbazol-9-yl)indenyl) hafnium dichloride In a round bottom flask (0.15 L) in the Glove Box, to a solution of 2.41 g (8.44 mmol) of 11 in 100 ml of toluene 3.38 ml of 2.5M solution of $^n$BuLi (8.44 mmol) in hexanes were added at room temperature. This mixture was stirred overnight. Then, 1.35 g (4.22 mmol) of $ZrCl_4$ was added at room temperature. This mixture was reflux for 10 hours; then, this hot mixture filtered through Celite 503. The Celite layer was additionally washed with 2×50 ml of hot toluene. The combined extract was evaporated to ca. 40 ml. Yellowish crystals precipitated at room temperature were separated, washed by 10 ml of cold toluene, 10 ml of hexanes, and dried in vacuum. Yield 1.70 g (49%) of 21.

Anal. calc. for $C_{42}H_{36}Cl_2N_2Hf$: C, 61.66; H, 4.44. Found: C, 61.83; H, 4.52.

$^1$H NMR ($CD_2Cl_2$): δ 7.70 (m, 2H, 6,6'-H of N-azolyl), 7.60 (m, 2H, 9,9'-H of N-azolyl), 7.22-7.43 (m, 12H, 4,4', 5,5',6,6',7,7'-H of indenyl and 7,7',8,8'-H of N-azolyl), 5.88 (br.s, 4H, 1,1',3,3'-H of indenyl), 2.80, 2.30, 1.87, and 1.76 (four multiplets, 4×4H, 2,2'-$CH_2$, 3,3'-$CH_2$, 4,4'-$CH_2$, and 5,5'-$CH_2$ of N-azolyl).

$^{13}$C NMR ($CD_2Cl_2$): δ 136.8, 135.1, 133.8, 128.0, 125.2, 123.8, 122.4 (br.), 121.2, 120.0, 116.9, 113.1, 111.2, 92.6 (br.), 23.9, 22.2, 20.9, 19.7.

Reaction Outline of Ligand 22 and Complex 23.

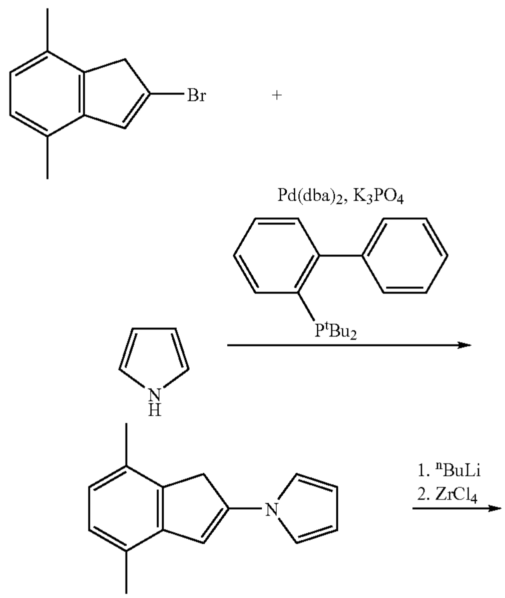

22

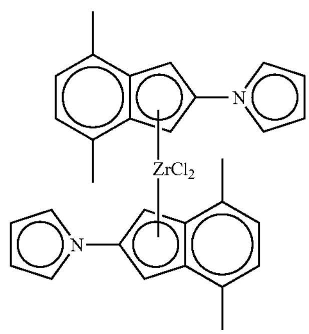

23

1-(4,7-Dimethyl-1H-inden-2-yl)-1H-pyrrole (22)

In a round bottom flask (0.1 L) in the Glove Box, a mixture of 6.69 g (30 mmol) of 2-bromo-4,7-dimethyl-1H-indene, 2.80 ml (2.68 g, 40.0 mmol) of pyrrole, 19.1 g (90 mmol) of anhydrous $K_3PO_4$, 575 mg (1.0 mmol) of Pd $(dba)_2$, and 596 mg (2.0 mmol) of 2-[di(tert-butyl)phosphino]biphenyl in 100 ml of toluene was stirred for 24 hours at 75° C. The resulting mixture was filtered through glass frit (G3). The precipitate was additionally washed with 3×50 ml of methyl-tert-butyl ether. The combined extract was evaporated to dryness. The product was isolated by flash chromatography (SilicaGel 60, 40-63 um, d 50 mm, l 500 mm; eluent hexanes/MTBE=50/1). This procedure gave 3.25 g (52%) of white solid.

Anal. calc. for $C_{15}H_{15}N$: C, 86.08; H, 7.22. Found: C, 86.31; H, 7.04.

$^1$H NMR ($CDCl_3$): δ 7.07 (t, J=2.1 Hz, 2H, 2,5-H of pyrrolyl), 6.98 (d, J=7.7 Hz, 1H, 5-H of indenyl), 6.85 (d, J=7.7 Hz, 1H, 6-H of indenyl), 6.59 (t, J=1.2 Hz, 1H, 3-H of indenyl), 6.29 (t, J=2.1 Hz, 2H, 3,4-H of pyrrolyl), 3.62 (br.s, 2H, $CH_2$), 2.36 (s, 3H, 4-Me of indenyl), 2.29 (s, 3H, 7-Me of indenyl).

$^{13}$C NMR ($CDCl_3$): δ 144.1, 142.5, 136.4, 129.8, 128.3, 126.9, 125.4, 118.8, 110.4, 109.9, 36.7, 18.3, 18.2.

Complex 23—bis-($\eta^5$-4,7-dimethyl-2-(pyrrol-1-yl)indenyl)zirconium dichloride In a round bottom flask (0.1 L) in the Glove Box, to a solution of 1.25 g (6.00 mmol) in 70 ml of toluene 2.40 ml 2.5 M $^n$BuLi (6.00 mmol) in hexanes was added at ambient temperature. The suspension formed was additionally stirred overnight, then, 0.70 g (3.00 mmol) of $ZrCl_4$ was added. This mixture was stirred for 3 hours at 110° C. and 1 day at ambient temperature. Hot mixture was filtered through Celite 503. The Celite layer was washed with 2×50 ml of hot toluene. The combined extract was evaporated to ca. 50 ml. The precipitate formed was filtered off, washed by 2×10 ml of hexanes, and dried in vacuum. Yield 0.65 g (37%) of yellowish crystalline solid.

Anal. calc. for $C_{30}H_{28}Cl_2N_2Zr$: C, 62.27; H, 4.88. Found: C, 62.39; H, 4.78.

$^1$H NMR ($CD_2Cl_2$): δ 7.10 (t, J=Hz, 4H, 2,2',5,5'-H of pyrrolyl), 6.84 (s, 4H, 5,5',6,6'-H of indenyl), 6.41 (t, J=Hz, 4H, 3,3',4,4'-H of pyrrolyl), 5.92 (s, 4H, 1,1',3,3'-H of indenyl), 2.28 (s, 12H, 4,4',7,7'-Me of indenyl).

$^{13}$C NMR ($CD_2Cl_2$): δ 138.9, 133.6, 128.2, 127.1, 121.5, 113.2, 93.5, 20.4.

Reaction Outline of Ligand 24 and Complex 25.

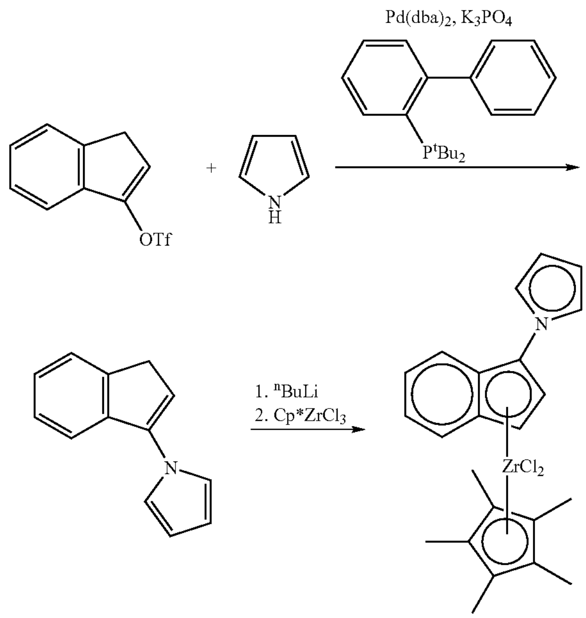

24

25

1-(1H-inden-3-yl)-1H-pyrrole (24)

In a round bottom flask (0.1 L) in the Glove Box, a mixture of 9.10 g (35 mmol) of 1H-inden-3-yl trifluoromethanesulfonate, 2.45 ml (2.35 g, 35 mmol) of pyrrole, 21.2 g (100 mmol) of anhydrous $K_3PO_4$, 805 mg (1.4 mmol) of $Pd(dba)_2$, and 821 mg (2.8 mmol) of 2-[di(tert-butyl)phosphino]biphenyl in 100 ml of toluene was stirred for 24 hours at 120° C. The resulting mixture was filtered through glass frit (G3). The precipitate was additionally washed with 3×50 ml of methyl-tert-butyl ether. The combined extract was evaporated to dryness. The product was isolated by flash chromatography (SilicaGel 60, 40-63 um, d 50 mm, l 500 mm; eluent hexanes/MTBE=20/1). This procedure gave 0.96 g (15%) of the title product.

Anal. calc. for $C_{13}H_{11}N$: C, 86.15; H, 6.12. Found: C, 86.34; H, 6.21.

$^1$H NMR ($CDCl_3$): δ 7.58 (m, 1H, 7-H of indenyl), 7.45 (m, 1H, 4-H of indenyl), 7.21-7.34 (m, 2H, 5,6-H of indenyl), 7.08 (t, J=2.1 Hz, 2H, 2,5-H of pyrrolyl), 6.33 (t, J=2.1 Hz, 2H, 3,4-H of pyrrolyl), 6.23 (t, J=2.3 Hz, 1H, 2-H of indenyl), 3.41 (d, J=2.3 Hz, 2H, $CH_2$).

$^{13}$C NMR ($CDCl_3$): δ 143.8, 142.2, 139.8, 126.4, 125.7, 124.3, 120.2, 119.7, 119.5, 109.4, 35.8.

Complex 25—(η$^5$-1-(pyrrol-1-yl)indenyl)(η$^5$-pentamethylcyclopentadienyl)zirconium dichloride In a round bottom flask (0.1 L) in the Glove Box, to a solution of 0.65 g (3.60 mmol) of 24 in 35 ml of toluene 1.44 ml of 2.5 M $^n$BuLi (3.60 mmol) in hexanes was added at vigorous stirring at ambient temperature. This mixture was additionally stirred overnight, then, 1.20 g (3.60 mmol) of $Cp^*ZrCl_3$ was added. The resulting mixture was stirred for two days at ambient temperature and then 10 hours at 80° C. The resulting hot mixture was filtered through Celite 503. The Celite layer was washed with 2×20 ml of hot toluene. The combined extract was evaporated to dryness. The residue was washed with 3×30 ml of hexanes and dried in vacuum. Yield 1.05 g (61%) of yellowish solid.

Anal. calc. for $C_{23}H_{25}Cl_2NZr$: C, 57.84; H, 5.28. Found: C, 58.11; H, 5.40.

$^1$H NMR ($CD_2Cl_2$): δ 7.66 (m, 2H, 7-H in indenyl), 7.54 (m, 1H, 4-H in indenyl), 7.31 (ddd, J=8.7 Hz, J=6.7 Hz, J=1.2 Hz, 1H, 6-H in indenyl), 7.22 (ddd, J=8.4 Hz, J=6.7 Hz, J=1.3 Hz, 1H, 5-H in indenyl),7.12 (t, J=2.2 Hz, 2H, 2,5-H in pyrrolyl), 6.35 (d, J=3.3 Hz, 1H, 2-H in indenyl), 6.30 (t, J=2.2 Hz, 2H, 3,4-H in pyrrolyl), 5.79 (dd, J=3.3 Hz, J=0.9 Hz, 1H, 3-H in indenyl), 1.90 (s, 15H, Cp*).

$^{13}$C NMR ($CD_2Cl_2$): δ 136.4, 128.2, 127.9, 127.1, 126.9, 126.4, 123.9, 123.5, 123.3, 111.4, 111.2, 95.6, 13.5.

Preparation of Complex 26—(η$^5$-2-methyl-4-(indol-1-yl-indenyl)(η$^5$-pentamethylcyclopentadienyl)zirconium dichloride

3-(2-Bromophenyl)-2-methylpropanoic acid, 3-(2-bromophenyl)-2-methylpropionyl chloride, and 4-bromo-2-methyl-1-indanone

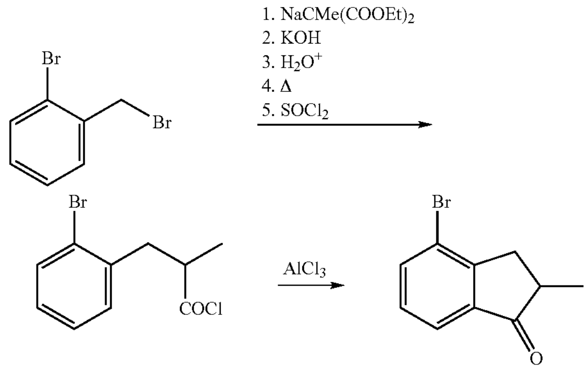

In a three-necked round-bottom 2000 ml flask equipped with a reflux condenser, dropping funnel with pressure-equalizing, and magnetic stirring bar, 20.5 g (0.89 mol) of sodium metal was dissolved in 450 ml of dry ethanol. To the resulting solution, 155 g (0.89 mol) of diethylmethylmalonate in 150 ml of dry ethanol was added dropwise over 15 minutes. This mixture was stirred for 15 minutes; then, 186 g (0.89 mol) of o-bromobenzyl bromide was added by vigorous stirring at such a rate so that the reaction mixture maintained at gentle reflux. Additionally, this mixture was refluxed for 4 hours and cooled to room temperature. A solution of 151 g of potassium hydroxide in 400 ml of water was added. This mixture was refluxed for 3 hours to saponificate the ester formed. Ethanol and water were distilled off. To the residue 500 ml of water and, then, 12 M HCl (to pH 1) were added. The substituted methylmalonic acid precipitated was separated, washed with 2×200 ml of cold water, and dried overnight on a watch glass. Crude 3-(2-bromophenyl)-2-methylpropanoic acid was obtained after decarboxilation of this substituted methylmalonic acid for 2 hours at 160° C. The product was used without further purification. Mixture of this acid and 160 ml of $SOCl_2$ was stirred for 24 hours at ambient temperature. Thionyl chloride was distilled off. The crude 3-(2-bromophenyl)-2-methylpropionyl chloride dissolved in 270 ml of $CH_2Cl_2$ was added dropwise by vigorous stirring to a suspension of 136 g (1.02 mol) of $AlCl_3$ in 1350 ml of $CH_2Cl_2$ for 1 hour at 0° C. Then, this mixture was refluxed for 3 hours, cooled to ambient temperature, and poured on 500 cm of ice. The organic layer was separated. The aqueous layer was extracted with 3×300 ml of methyl-tert-butyl ether. The combined extract was dried over $K_2CO_3$ and evaporated to dryness. Fractional distillation gave the title indanone, b.p. 131-134° C./2 mm Hg. Yield 125.5 g (75%) of colorless solid.

Anal. calc. for $C_{10}H_9BrO$: C, 53.36; H, 4.03. Found: C, 53.19; H, 3.98.

$^1$H NMR ($CDCl_3$): δ 7.76 (d, J=7.6 Hz, 1H, 7-H), 7.71 (d, J=7.6 Hz, 1H, 5-H), 7.28 (t, J=7.6 Hz, 1H, 6-H), 3.36 (dd, J=17.5 Hz, J=7.6 Hz, 1H, 3-H), 2.70-2.82 (m, 1H, 2-H), 2.67 (dd, J=17.5 Hz, J=3.8 Hz, 1H, 3'-H), 1.34 (d, J=7.3 Hz, 3H, 2-Me).

$^{13}$C{$^1$H} NMR ($CDCl_3$): δ 208.3, 152.9, 138.2, 137.2, 129.0, 122.6, 122.0, 41.8, 35.7, 16.0.

A Mixture of 4- and 7bBromo-2-methyl-1H-indene

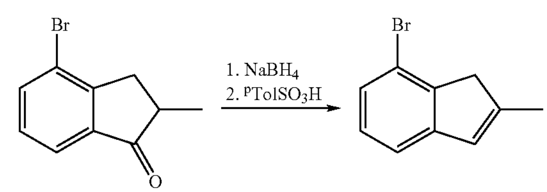

To a solution of 116 g (0.52 mol) of 4-bromo-6-chloro-2-methyl-1-indanone in 950 ml of THF-methanol (2:1, vol.), 38.3 g (1.02 mol) of $NaBH_4$ was added in small portions over 2 hours at −5° C. (Caution: temperature must be lower 0° C.). The mixture was stirred overnight at ambient temperature. The resulting mixture was poured on 1000 cm$^3$ of ice and acidified with 10% HCl to pH=4. The organic layer was separated; the aqueous layer was extracted with 3×300 ml of methyl-tert-butyl ether. This combined extract was dried over $K_2CO_3$ and evaporated to dryness. To the residue, 1500 ml of toluene was added. This toluene solution was treated with catalytic amount of $^P$TolSO$_3$H (ca. 2 g) for 2 hours at reflux. Then this mixture was cooled to room temperature and passed through short column with Silica Gel 60 (40-63 μm, d 60 mm, 1 40 mm). This column was additionally eluted with 250 ml of toluene. The combined extract was evaporated to dryness. Fractional distillation gave a mixture of the title indenes, b.p. 104-108° C./5 mm Hg. Yield 100 g (93%) of colorless solid.

Anal. calc. for $C_{10}H_9Br$: C, 57.44; H, 4.34. Found: C, 57.59; H, 4.40.

$^1H$ NMR ($CDCl_3$): δ 7.23 (dd, J=7.9 Hz, J=1.0 Hz, 1H, 6-H), 7.18 (dd, J=7.4 Hz, J=1.0 Hz, 1H, 4-H), 7.10 (m, 1H, 5-H), 6.51 (m, 1H, 3-H), 3.28 (m, 2H, 1,1'-H), 2.17 (s, 3H, 2-Me).

$^{13}C\{^1H\}$ NMR ($CDCl_3$): δ 147.3, 146.8, 143.3, 128.2, 127.1, 126.6, 118.7, 118.3, 44.2, 16.7.

A Mixture of 1-(2-methyl-1H-inden-4-yl)-1H-pyrrole and 1-(2-methyl-1H-inden-7-yl)-1H-pyrrole—Method A

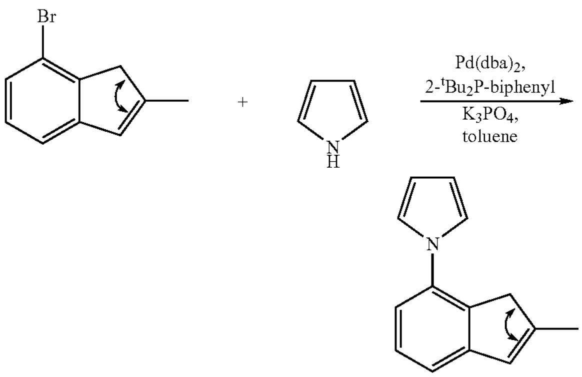

In argon atmosphere, a mixture of 70.0 g (335 mmol) of a mixture of 4- and 7-bromo-2-methyl-1H-indenes, 28.0 ml (27.1 g, 404 mmol) of pyrrole, 85.1 g of anhydrous $K_3PO_4$, 3.85 g (6.70 mmol, 2 mol. %) of $Pd(dba)_2$, 3.00 g (10.1 mmol, 3 mol. %) of 2-[di(tert-butyl)phosphino]biphenyl, and 700 ml of toluene was refluxed for 10 hours. The resulting mixture was cooled; the solution was decanted, and the precipitate was additionally washed by 3×100 ml of methyl-tert-butyl ether. The combined organic extract was evaporated using rotary evaporator. The resulting crude product was dissolved in 100 ml of hexanes. This solution was passed through short column with Silica Gel 60 (40-63 μm, d 60 mm, l 150 mm; eluent: hexanes/dichloromethane=2/1, vol). Then, the crude product was purified by vacuum distillation, b.p. 125-130° C./1 mm Hg. Yield 28.7 g (44%) of yellowish oil of ca. 1 to 1 mixture of 1-(2-methyl-1H-inden-4-yl)-1H-pyrrole (isomer A) and 1-(2-methyl-1H-inden-7-yl)-1H-pyrrole (isomer B).

Anal. calc. for $C_{14}H_{13}N$: C, 86.12; H, 6.71. Found: C, 86.25; H, 6.76.

$^1H$ NMR ($CDCl_3$): δ 7.23-7.29 (m, 2H, 5-H and 6-H in indenyl of A and B, respectively), 7.03-7.17 (m, 4H, 6,7-H and 5-H in indenyl of A and B, respectively), 7.04 (dd, J=7.9 Hz, J=1.0 Hz, 1H, 4-H in indenyl of B), 7.01 (t, J=2.2 Hz, 2,5-H in pyrrole of B), 6.96 (t, J=2.2 Hz, 2,5-H in pyrrole of A), 6.62 (m, 1H, 3-H in indenyl of A), 6.48 (m, 1H, 3-H in indenyl of B), 6.33 (t, J=2.2 Hz, 2H, 3,4-H in pyrrole of A), 6.32 (t, J=2.2 Hz, 2H, 3,4-H in pyrrole of B), 3.36 (m, 2H, $CH_2$ in indenyl of B), 3.33 (m, 2H, $CH_2$ in indenyl of A), 2.11 (m, 6H, 2-Me in indenyl of A and B).

$^{13}C\{^1H\}$ NMR ($CDCl_3$): δ 148.0, 147.1, 146.6, 145.2, 139.4, 136.8, 135.4, 133.2, 127.8, 127.0, 124.3, 121.7, 121.6, 121.3, 120.7 (two resonances), 118.9, 118.1, 109.15, 109.12, 43.0, 41.9, 16.7, 16.5.

A Mixture of 1-(2-methyl-1H-inden-4-yl)-1H-pyrrole and 1-(2-methyl-1H-inden-7-yl)-1H-pyrrole—Method B

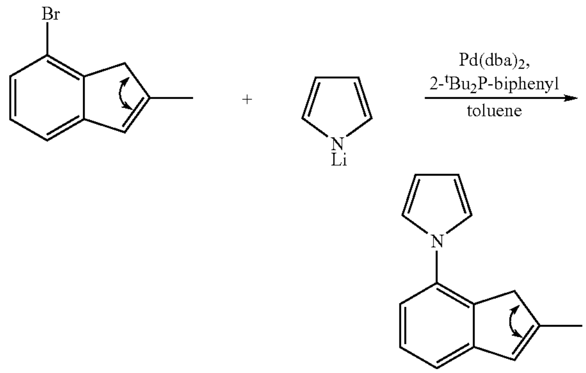

In argon atmosphere, a solution of 15.2 g (227 mmol) of pyrrole in 300 ml of toluene was metallated with 80.0 ml of 2.5 M $^n$BuLi (200 mmol) in hexanes by vigorous stirring at 0° C. The resulting mixture was warmed to room temperature and stirred for 15 minutes; then, hexanes was distilled off under vacuum. To the residue, a solution of 37.6 g (180 mmol) of a mixture of 4- and 7-bromo-2-methyl-1H-indenes in 150 ml of toluene was added; then, 898 mg (4.0 mmol) of $Pd(OAc)_2$ and 1.79 g (6.0 mmol) of 2-[di(tert-butyl)phosphino]biphenyl were added. This resulting mixture was refluxed for 1 hour and then treated as it was described above in Method A. Fractional distallation gave yellowish oil of the title product, b.p. 145° C./5 mm Hg. Yield 29.2 g (83%).

Complex 26—($\eta^5$-2-Methyl-4-(pyrrol-1-yl)indenyl)($\eta^5$-pentamethylcyclopentadienyl)zirconium dichloride

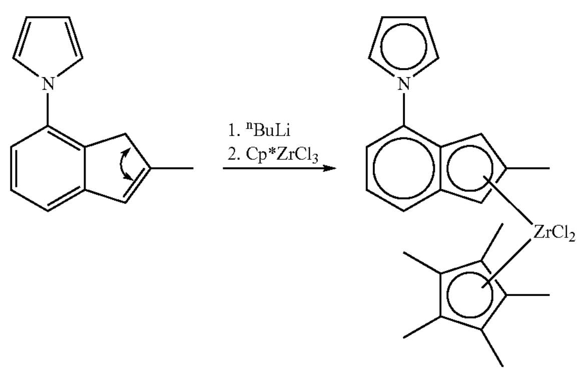

26

In the Glove Box to a solution of 904 mg (4.62 mmol) of a mixture of 1-(2-methyl-1H-inden-4-yl)-1H-pyrrole and 1-(2-methyl-1H-inden-7-yl)-1H-pyrrole in 50 ml of toluene, 1.85 ml of 2.5 M $^n$BuLi (4.62 mmol) in hexanes was added at −40° C. The resulting suspension was stirred overnight at room temperature. Then, 1.54 g (4.62 mmol) of $Cp^*ZrCl_3$ was added. This mixture was stirred for 24 hours at ambient temperature and additionally for 10 hours at 100° C. The resulting hot mixture was filtered through Celite 503. The filtrate was evaporated to dryness. The solid residue was washed with 5×10 ml of hexanes and dried in vacuum. Yield 1.34 g (59%) of yellowish solid.

Anal. calc. for $C_{24}H_{27}Cl_2NZr$: C, 58.64; H, 5.54. Found: C, 58.79; H, 5.66.

$^1$H NMR ($CD_2Cl_2$): δ 7.28 (dt, J=8.4 Hz, J=0.9 Hz, 1H, 7-H in indenyl), 7.16 (t, J=2.2 Hz, 2H, 2,5-H in pyrrole), 7.13 (dd, J=7.2 Hz, J=0.9 Hz, 1H, 5-H in indenyl), 7.06 (dd, J=8.4 Hz, J=7.2 Hz, 1H, 6-H in indenyl), 6.71 (m, 1H, 1-H in indenyl), 6.30 (t, J=2.2 Hz, 2H, 3,4-H in pyrrole), 6.23 (m, 1H, 3-H in indenyl), 2.17 (s, 3H, 2-Me in indenyl), 1.98 (s, 15H, $C_5Me_5$).

$^{13}C\{^1H\}$ NMR ($CD_2Cl_2$): δ 138.1, 133.0, 129.7, 126.9, 126.8, 123.5, 122.4, 121.4, 119.8, 114.0, 111.2, 102.7, 17.3, 13.9.

Preparation of Complex 27—($\eta^5$-2-Methyl-4-(indol-1-ylindenyl)($\eta^5$-pentamethylcyclopentadienyl) zirconium dichloride

A mixture of 1-(2-methyl-1H-inden-4-yl)-1H-indole and 1-(2-methyl-1H-inden-7-yl)-1H-indole—Method A

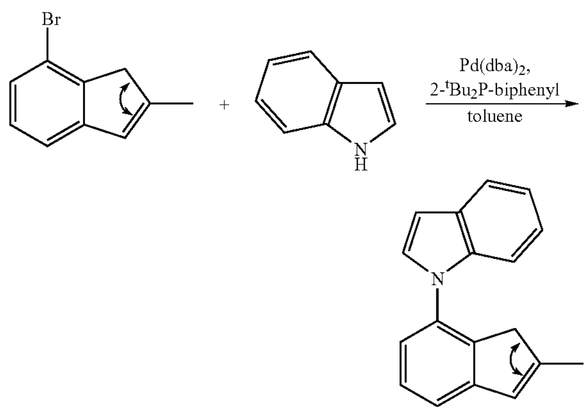

In argon atmosphere, a mixture of 25.0 g (120 mmol) of a mixture of 4- and 7-bromo-2-methyl-1H-indenes, 16.8 g (143 mmol) of indole, 35.0 g of anhydrous $K_3PO_4$, 1.38 g (2.39 mmol, 2 mol. %) of $Pd(dba)_2$, 1.07 g (3.59 mmol, 3 mol. %) of 2-[di(tert-butyl)phosphino]biphenyl, and 250 ml of toluene was refluxed for 14 hours. The resulting mixture was cooled; the solution was decanted, and the precipitate was additionally washed by 100 ml of methyl-tert-butyl ether. The combined organic extract was evaporated using rotary evaporator. The resulting crude product was dissolved in 100 ml of hexanes. This solution was passed through short column with Silica Gel 60 (40-63 μm, d 60 mm, l 150 mm; eluent: hexanes/dichloromethane=2/1, vol). Then, the crude product was purified by vacuum rectification, b.p. 122-125° C./0.5 mm Hg. Yield 6.42 g (22%) of yellow oil of ca. 1 to 1 mixture of 1-(2-methyl-1H-inden-4-yl)-1H-indole (isomer A) and 1-(2-methyl-1H-inden-7-yl)-1H-indole (isomer B). This oil crystallizes slowly at room temperature.

Anal. calc. for $C_{18}H_{15}N$: C, 88.13; H, 6.16. Found: C, 88.18; H, 6.13.

$^1$H NMR ($CDCl_3$): δ 7.68 (m, 2H, 5-H in indolyl of isomers A and B), 7.10-7.37 (m, 16H, 5,6,7-H in indenyl and 2,4,6,7,8-H in indolyl of isomer A and 4,5,6-H in indenyl and 2,4,6,7,8-H in indolyl of isomer B), 6.66 (m, 2H, 3-H in indolyl of isomers A and B), 6.51 (m, 1H, 3-H in indenyl of isomer A), 6.28 (m, 1H, 3-H in indenyl of isomer B), 2.07 (m, 3H, 2-Me in indenyl of isomer A or B), 2.05 (m, 3H, 2-Me in indenyl of isomer B or A).

$^{13}C\{^1H\}$ NMR ($CDCl_3$): δ 148.0, 147.2, 146.8, 145.2, 141.7, 138.9, 136.6, 136.2, 134.8, 131.0, 128.7, 128.63, 128.56, 128.0, 127.7, 127.0, 124.6, 124.4, 123.9, 122.3, 121.92, 121.89, 121.7, 121.0, 120.8, 119.94, 119.88, 119.1, 110.9, 110.7, 102.7, 43.1, 41.4, 16.8, 16.6.

A Mixture of 1-(2-methyl-1H-inden-4-yl)-1H-indole and 1-(2-methyl-1H-inden-7-yl)-1H-indole—Method B

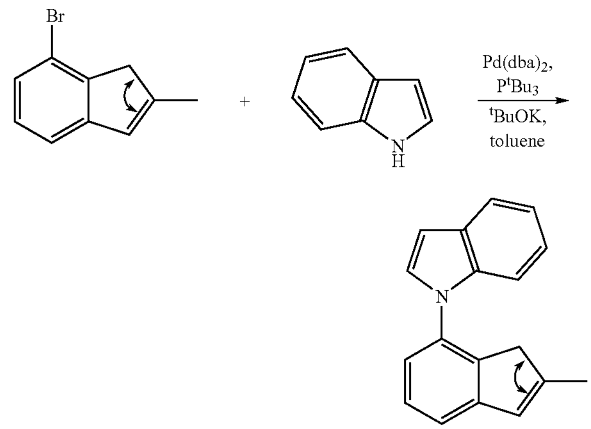

In argon atmosphere, a mixture of 5.11 g (24.4 mmol) of a mixture of 4- and 7-bromo-2-methyl-1H-indenes, 3.40 g (29.0 mmol) of indole, 3.22 g (28.7 mmol) of $^t$BuOK, 275 mg (0.48 mmol) of $Pd(dba)_2$, 214 mg (0.72 mmol) of tri(tert-butyl)phosphine, and 50 ml of toluene was refluxed for 5 hours. The solution was decanted, the residue additionally washed by 50 ml of methyl-tert-butyl ether. The combined organic solution was evaporated to dryness. The crude product was purified by flash-chromatography on Silica Gel 60 (40-63 μm, d 30 mm, l 200 mm; eluent: hexanes). Yield 3.10 g (52%).

A Mixture of 1-(2-methyl-1H-inden-4-yl)-1H-indole and 1-(2-methyl-1H-inden-7-yl)-1H-indole—Method C

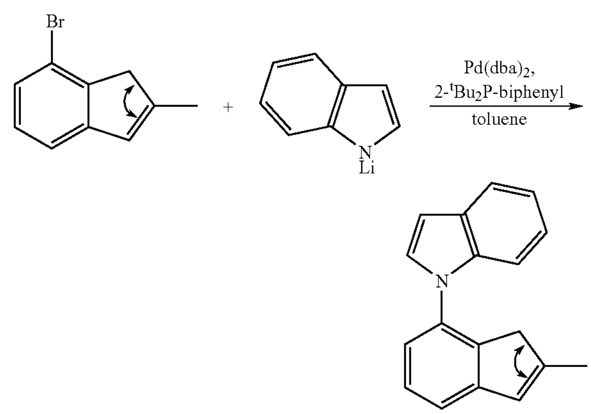

In argon atmosphere a solution of 6.44 g (55.0 mmol) of indole in 100 ml of toluene was metallated with 20.0 ml of 2.5 M $^n$BuLi (50 mmol) in hexanes by vigorous stirring at 0° C. The resulting mixture was warmed to room temperature and stirred for 15 minutes; then, hexanes was distilled off in vacuum. To the residue a solution of 9.41 g (45.0 mmol) of a mixture of 4- and 7-bromo-2-methyl-1H-indenes in 60 ml of toluene was added; then, 225 mg (1.0 mmol) of $Pd(OAc)_2$ and 448 mg (1.5 mmol) of 2-[di(tert-butyl)phosphino]biphenyl were added. The resulting mixture was refluxed for 1 hour and then treated as it was described above in Method B. Yield 9.33 g (85%).

Complex 27—($\eta^5$-2-Methyl-4-(indol-1-yl)indenyl)($\eta^5$-pentamethylcyclopentadienyl)zirconium dichloride

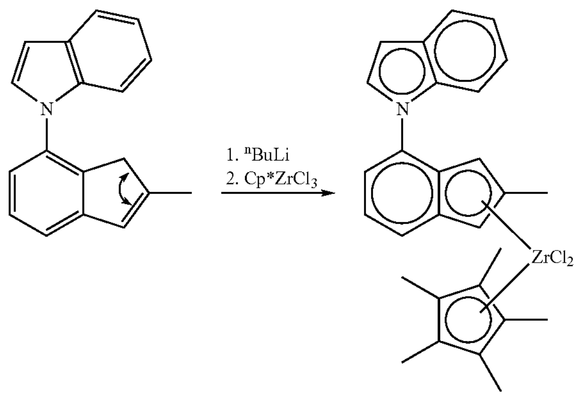

27

In the Glove Box to a solution of 950 mg (3.87 mmol) of a mixture of 1-(2-methyl-1H-inden-4-yl)-1H-indole and 1-(2-methyl-1H-inden-7-yl)-1H-indole in 40 ml of toluene, 7.74 ml of 0.5 M $^n$BuLi (3.87 mmol) in hexanes were added at room temperature. The resulting solution was stirred for 24 hours at room temperature. Then, 1.29 g (3.87 mmol) of Cp*$ZrCl_3$ was added. This mixture was stirred for 12 hours at ambient temperature and additionally for 7 hours at 100° C. The resulting hot mixture was filtered through Celite 503. The filtrate was evaporated to dryness. The solid residue was washed with 5×10 ml of hexanes and dried in vacuum. Yield 1.20 g (57%) of yellowish solid.

Anal. calc. for $C_{28}H_{29}Cl_2NZr$: C, 62.09; H, 5.40. Found: C, 62.31; H, 5.53.

$^1$H NMR ($CD_2Cl_2$): δ 7.73 (d, J=3.3 Hz, 1H, 2-H in indolyl), 7.64 (m, 1H, 5-H in indolyl), 7.44 (m, 1H, 6-H in indolyl), 7.34-7.40 (m, 2H, 47-H in indolyl), 7.10-7.19 (m, 3H, 5,6,7-H in indenyl), 6.67 (d, J=3.3 Hz, 1H, 3-H in indolyl), 6.51 (d, J=2.1 Hz, 1H, 1-H in indenyl), 6.26 (d, J=2.1 Hz, 1H, 3-H in indenyl), 2.15 (s, 3H, 2-Me in indenyl), 1.99 (s, 15H, $C_5Me_5$).

$^{13}$C{1H} NMR ($CD_2Cl_2$): δ 137.7, 136.0, 133.0, 131.3, 130.8, 130.0, 126.9, 126.6, 123.5, 122.9, 122.4, 122.2, 121.9, 113.8, 112.6, 104.8, 102.7, 17.4, 13.9.

Preparation of Complex 28—($\eta^5$-2-methyl-4-(phenothiazin-10-yl)indenyl)($\eta^5$-pentamethylcyclopentadienyl)zirconium dichloride

A Mixture of 10-(2-methyl-1H-inden-4-yl)-10H-phenothiazine and 10-(2-methyl-1H-inden-7-yl)-10H-phenothiazine

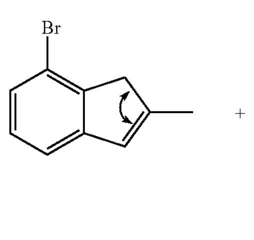

-continued

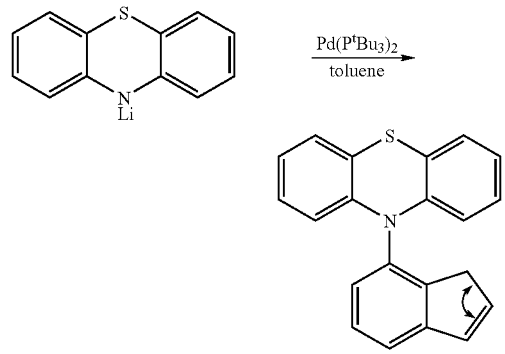

In argon atmosphere to a solution of 2.09 g (10.5 mmol) of phenothiazine in 30 ml of toluene, 4.20 ml of 2.5 M (10.5 mmol) $^n$BuLi in hexanes was added at ambient temperature. This mixture was stirred for 24 hours, and, then, 2.09 g (10.0 mmol) of a mixture of 4- and 7-bromo-2-methyl-1H-indenes and 102 mg (0.20 mmol) of $Pd(P^tBu_3)_2$ were added. The resulting mixture was stirred for 20 hours at 110° C. Then, the reaction mixture was passed through a short column with Silica Gel 60 (40-63 μm, d 30 mm, l 40 mm). This column was additionally washed by 200 ml of methyl-tert-butyl ether. The combined elute was evaporated to dryness. The residue was washed by 3×10 ml of cold acetonitrile and dried in vacuum. Yield 2.41 g (73%) of white solid of ca. 1 to 1 mixture of 10-(2-methyl-1H-inden-4-yl)-10H-phenothiazine (isomer A) and 10-(2-methyl-1H-inden-7-yl)-10H-phenothiazine (isomer B).

Anal. calc. for $C_{22}H_{17}NS$: C, 80.70; H, 5.23. Found: C, 80.55; H, 5.28.

$^1$H NMR ($CDCl_3$): δ 7.08-7.47 (m, 6H, 5,6,7-H in indenyl of isomer A and 4,5,6-H in indenyl of isomer B), 6.97 (m, 4H, 4,5-H in phenothiazine of isomers A and B), 6.71-6.81 (m, 8H, 2,3,6,7-H in phenothiazine of isomers A and B), 6.52 (m, 1H, 3-H in indenyl of isomer B), 6.42 (m, 1H, 3-H in indenyl of isomer A), 6.13 (m, 4H, 1,8-H in phenothiazine of isomers A and B), 3.41 (m, 2H, $CH_2$ of isomer A), 3.16 (m, 2H, $CH_2$ of isomer B), 2.08 (d, J=1.1 Hz, 3H, 2-Me in indenyl of isomer A), 2.07 (d, J=1.1 Hz, 3H, 2-Me in indenyl of isomer B).

$^{13}$C{$^1$H} NMR ($CDCl_3$): δ 149.0, 147.9, 147.1 (two resonances), 148.3, 145.9, 143.9, 142.9 (two resonances), 142.8, 135.5, 131.8, 129.0, 128.5, 126.9 (five resonances), 126.6, 126.5 (four resonances), 126.1, 125.7, 125.3, 124.8, 123.4, 122.17 (two resonances), 122.11 (two resonances), 119.9, 119.7, 119.2, 115.6 (two resonances), 111.9 (two resonances), 43.4, 41.1, 16.8, 16.7.

Complex 28—($\eta^5$-2-methyl-4-(phenothiazin-10-yl)indenyl) ($\eta^5$-pentamethylcyclopentadienyl)zirconium dichloride

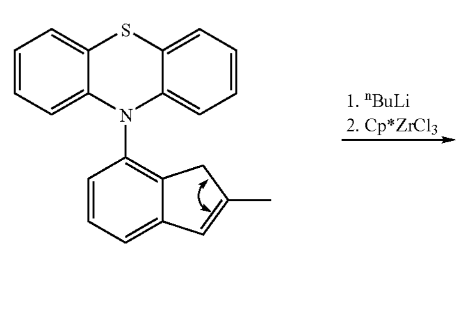

-continued

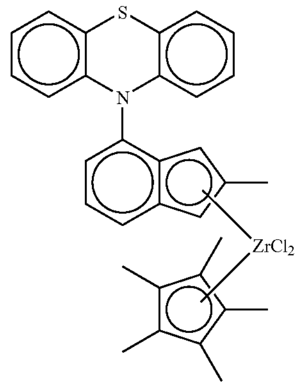

28

In the Glove Box to a solution of 900 mg (2.75 mmol) of a mixture of 10-(2-methyl-1H-inden-4-yl)-10H-phenothiazine and 10-(2-methyl-1H-inden-7-yl)-10H-phenothiazine in 30 ml of toluene, 1.10 ml of 2.5 M $^{n}$BuLi (2.75 mmol) in hexanes was added at room temperature. The resulting solution was stirred for 24 hours at room temperature. Then, 915 mg (2.75 mmol) of Cp*$ZrCl_3$ was added. This mixture was stirred for 24 hours at ambient temperature and additionally for 7 hours at 100° C. The resulting hot mixture was filtered through Celite 503. The filtrate was evaporated to ca. 15 ml. Crystals that precipitated from this solution at −30° C. were collected, washed by 10 ml of toluene and 1×10 ml of hexanes, and dried in vacuum. Yield 1.12 g (66%) of yellowish solid.

Anal. calc. for $C_{32}H_{31}Cl_2NSZr$: C, 61.61; H, 5.01. Found: C, 61.70; H, 4.96.

$^1$H NMR ($CD_2Cl_2$): δ 7.51 (d, J=8.4 Hz, 1H, 6-H in indenyl), 7.44 (d, J=7.3 Hz, 1H, 5-H in indenyl), 7.31 (dd, J=8.4 Hz, J=7.3 Hz, 1H, 7-H in indenyl), 7.10 (m, 2H, 4,5-H of phenothiazine), 6.86 (m, 4H, 2,3,6,7-H in phenothiazine), 6.64 (m, 2H, 1,8-H in phenothiazine), 6.41 (m, 1H, 3-H in indenyl), 6.36 (m, 1H, 3-H in indenyl), 2.11 (s, 3H, 2-Me in indenyl), 1.89 (s, 15H, $C_5Me_5$).

$^{13}C\{^1H\}$ NMR ($CD_2Cl_2$): δ 137.7, 131.9, 131.2, 128.9, 128.7, 127.5, 127.17, 127.14, 126.8, 125.3, 124.9, 124.7, 120.8, 119.4, 110.5, 108.5, 17.4, 14.2.

Preparation of Complex 29—($\eta^5$-2-Methyl-4-naphthyl-6-(indol-1-yl)indenyl)($\eta_5$-pentamethylcyclopentadienyl)zirconium dichloride

2-Bromo-4-chlorotoluene

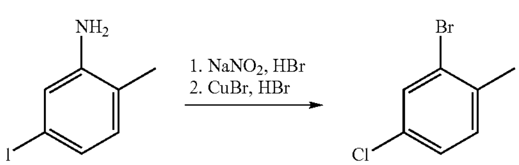

In a 3000 ml beaker, to 1200 ml of 23% aqueous HBr, 142 g (1.00 mol) of melted 2-methyl-4-chloroaniline was slowly added. This mixture was stirred for 20 minutes using a mechanical stirrer, cooled to −5° C.; and then a solution of 70.0 g (1.00 mol) of $NaNO_2$ in 400 ml of water was added dropwise over 1.5 hours at this temperature. The diazonium reagent obtained was added in several portions to a solution of 144 g (1.00 mol) of CuBr in 400 ml of 47% HBr at 0° C. The resulting mixture was warmed to 70° C., stirred for 30 minutes at this temperature, and, then, cooled to room temperature. The product was extracted with 3×500 ml of methyl-tert-butyl ether; and the combined extract was dried over $K_2CO_3$ and evaporated to dryness. Fractional distillation gave colorless oil, b.p. 81-84° C./7 mm Hg. Yield 148 g (72%).

Anal. calc. for $C_7H_6BrCl$: C, 40.92; H, 2.94. Found: C, 41.00; H, 2.99.

$^1$H NMR ($CDCl_3$): δ 7.45 (d, J=1.8 Hz, 1H, 2-H), 7.34 (dd, J=6.0 Hz, J=1.8 Hz, 1H, 4-H), 7.12 (d, J=6.0 Hz, 1H, 5-H), 2.43 (s, 3H, Me).

2-Bromo-4-chlorobenzyl bromide

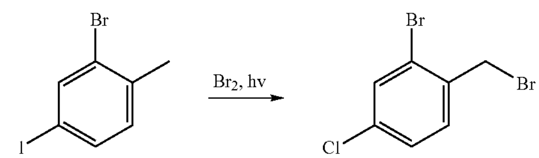

In a 500 ml three-necked round-bottom flask equipped with a reflux condenser, thermometer, dropping funnel with pressure-equalizing, magnetic stirring bar and containing 164 g (0.80 mol) of 2-bromo-4-chlorotoluene, 41.3 ml (128 g, 0.80 mmol) of bromine was added dropwise under exposure to a 500 W lamp for 3 hours at 190° C. The resulting mixture was cooled to room temperature. Fractional distillation gave colorless liquid, b.p. 111-115° C./7 mm Hg. Yield 182 g (80%).

Anal. calc. for $C_7H_5Br_2Cl$: C, 29.56; H, 1.77. Found: C, 29.76; H, 1.89.

$^1$H NMR ($CDCl_3$): δ 7.44 (d, J=1.7 Hz, 1H, 2-H), 7.36 (dd, J=6.0 Hz, J=1.7 Hz, 1H, 4-H), 7.18 (d, J=6.0 Hz, 1H, 5-H), 4.69 (s, 2H, $CH_2$).

3-(2-Bromo-4-chlorophenyl)-2-methylpropanoic acid, 3-(2-bromo-4-chlorophenyl)-2-methylpropionyl chloride, 4-bromo-6-chloro-2-methyl-1-indanone, and a mixture of 4-bromo-6-chloro-2-methyl-1H-indene and 7-bromo-5-chloro-2-methyl-1H-indene

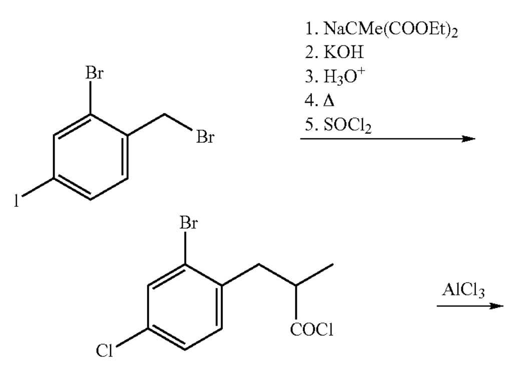

-continued

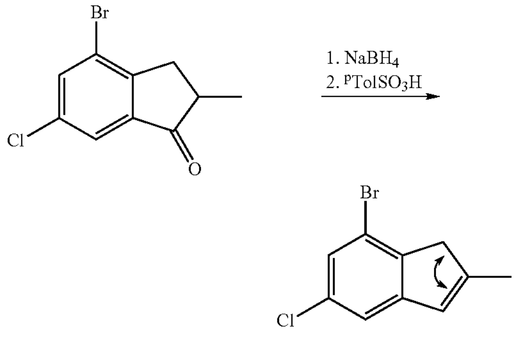

In a three-necked round-bottom 2000 ml flask equipped with a reflux condenser, dropping funnel with pressure-equalizing, and magnetic stirring bar, 20.5 g (0.87 mol) of sodium metal was dissolved in 500 ml of dry ethanol. To the resulting solution, 152 g (0.87 mol) of diethylmethylmalonate in 150 ml of dry ethanol was added dropwise within 15 minutes. This mixture was stirred for 15 minutes; then, 252 g (0.89 mmol) of 2-bromo-4-chlorobenzyl bromide were added by vigorous stirring at such a rate, so the reaction mixture was maintained at gentle reflux. Additionally, this mixture was refluxed for 4 hours and cooled to room temperature. A solution of 173 g of potassium hydroxide in 500 ml of water was added. This mixture was refluxed for 3 hours to saponificate the ester formed. Ethanol and water were distilled off. To the residue, 500 ml of water and, then, 12 M HCl (to pH 1) were added. The substituted methylmalonic acid precipitated was separated, washed with 2×300 ml of cold water and dried in vacuum. Crude 3-(2-bromo-4-chlorophenyl)-2-methylpropanoic acid was obtained after decarboxilation of this substituted methylmalonic acid for 2.5 hours at 190° C. The product was used without further purification. Mixture of this acid and 210 ml of $SOCl_2$ was stirred for 24 hours at ambient temperature. Thionyl chloride was distilled off. Fractional distillation gave 223 g of colorless oil of 3-(2-chlorophenyl)-2-methylpropionyl chloride, b.p. 134-142° C./1 mm Hg. This acid chloride dissolved in 200 ml of $CH_2Cl_2$ was added dropwise by vigorous stirring to a suspension of 122 g (0.92 mol) of $AlCl_3$ in 750 ml of $CH_2Cl_2$ for 2 hours at 0° C. Then, this mixture was refluxed for 3 hours, cooled to ambient temperature, and poured on 500 $cm^3$ of ice. The organic layer was separated. The aqueous layer was extracted with 3×300 ml of methyl-tert-butyl ether. The combined extract was dried over $K_2CO_3$ and evaporated to dryness. To a solution of crude 4-bromo-6-chloro-2-methyl-1-indanone in 1000 ml of THF-methanol (2:1, vol.), 42.0 g (1.11 mol) of $NaBH_4$ was added in small portions over 2 hours at −5° C. (Caution: temperature must be lower 0° C.). The mixture was stirred for 12 hours at ambient temperature. The resulting mixture was poured on 1000 $cm^3$ of ice and acidified with 10% HCl to pH=4. The organic layer was separated, the aqueous layer was extracted with 3×250 ml of methyl-tert-butyl ether. This combined extract was dried over $K_2CO_3$ and evaporated to dryness. To the residue, 1500 ml of toluene was added. This toluene solution was treated with a catalytic amount of $^pTolSO_3H$ (ca. 2 g) for 2 hours at reflux. Then, the mixture was cooled to room temperature and passed through short column with Silica Gel 60 (40-63 μm, d 60 mm, l 40 mm). This column was additionally eluted with 300 ml of toluene. The combined extract was evaporated to dryness. Fractional distillation gave a mixture of the title indenes, b.p. 115-121° C./2 mm Hg. Yield 144 g (67%) of colorless solid of ca. 1 to 5 mixture of 4-bromo-6-chloro-2-methylindene and 7-bromo-5-chloro-2-methylindene.

Anal. calc. for $C_{10}H_8BrCl$: C, 49.32; H, 3.31. Found: C, 49.25; H, 3.30.

$^1H$ NMR ($CDCl_3$): 4-bromo-6-chloro-2-methylindene, δ 7.36 (m, 1H, 7-H), 7.24 (m, 1H, 5-H), 6.53 (m, 1H, 3-H), 3.34 (m, 2H, 1,1'-H), 2.16 (s, 3H, 2-Me); 7-bromo-5-chloro-2-methylindene, δ 7.23 (d, J=1.6 Hz, 1H, 6-H), 7.14 (d, J=1.6 Hz, 1H, 4-H), 6.44 (m, 1H, 3-H), 3.23 (m, 2H, 1,1'-H), 2.18 (s, 3H, 2-Me).

A Mixture of 6-chloro-2-methyl-4-(1-naphthyl)-1H-indene and 5-chloro-2-methyl-7-(1-naphthyl)-1H-indene

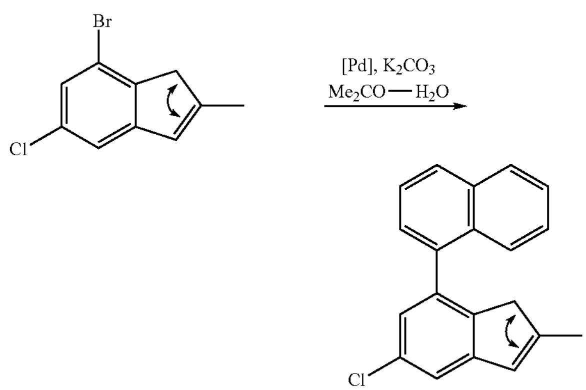

In an argon atmosphere to a mixture of 36.5 g (150 mmol) of a mixture of 4-bromo-6-chloro-2-methyl-1H-indene and 7-bromo-5-chloro-2-methyl-1H-indene, 25.8 g (150 mmol) of 1-naphthylboronic acid, and 72 g of $Na_2CO_3$ in 250 ml of water-acetone mixture (1:1, vol.), a solution of 561 mg (2.50 mmol) of $Pd(OAc)_2$ in 200 ml of acetone was added dropwise for 9 hours at reflux. The resulting mixture refluxed for additional 1 hour and then cooled to room temperature. The resulting mixture was added to 400 ml of cold water, then 200 ml of methyl-tert-butyl ether was added. The organic layer was separated. The organic layer was washed by 2×200 ml of methyl-tert-butyl ether. The combined extract was dried over $K_2CO_3$ and then evaporated to dryness. The crude product was separated using flash chromatography on Silica Gel 60 (40-63 μm, d 80 mm, l 400 mm; eluent: hexanes/methyl-tert-butyl ether=10:1, vol.). Yield 38.1 g (87%) of yellow as ca. 1 to 1 mixture of 6-chloro-2-methyl-4-(1-naphthyl)-1H-indene (isomer A) and 5-chloro-2-methyl-7-(1-naphthyl)-1H-indene (isomer B).

Anal. calc. for $C_{20}H_{15}Cl$: C, 82.61; H, 5.20. Found: C, 82.66; H, 5.29.

$^1H$ NMR ($CDCl_3$): δ7.83-7.90 (m, 4H, 4,8-H in naphthyl of isomers A and B), 7.65 (m, 1H, 5-H in naphthyl of isomer A), 7.58 (m, 1H, 5-H in naphthyl of isomer B), 7.33-7.52 (m, 9H, 5-H in indenyl of isomer A and 2,3,6,7-H in naphthyl of isomers A and B), 7.28 (d, J=1.8 Hz, 1H, 6-H in indenyl of isomer B), 7.26 (d, J=1.8 Hz, 1H, 7-H in indenyl of isomer A), 7.10 (d, J=1.8 Hz, 1H, 4-H in indenyl of isomer B), 6.47 (m, 1H, 3-H in indenyl of isomer B), 6.02 (m, 1H, 3-H in indenyl of isomer A), 3.39 (d, J=22.8 Hz, 1H, 1-H in indenyl of isomer A), 3.33 (d, J=22.8 Hz, 1H, 1'-H in indenyl of isomer A), 3.00 (d, J=22.9 Hz, 1H, 1-H in indenyl of isomer B), 2.90 (d, J=22.9 Hz, 1H, 1'-H in indenyl of isomer B), 2.01 (m, 6H, 2-Me in indenyl of isomers A and B).

$^{13}C\{^1H\}$ NMR ($CDCl_3$): δ 148.5, 147.5, 146.5, 145.0, 143.8, 140.9, 137.8, 137.6, 133.6 (two resonances), 133.1, 132.2, 131.6, 131.3, 129.3, 128.3, 128.2, 127.96, 127.92, 127.89, 127.2, 126.4, 126.3, 126.14, 126.09 (three resonances), 125.85, 125.81 (two resonances), 125.3 (two resonances), 125.1, 122.8, 119.2, 42.9, 41.9, 16.7 (two resonances).

A Mixture of 1-[2-methyl-4-(1-naphthyl)-6-(1-indol-1H-yl)-1H-inden-6-yl]-1H-indole and 1-[2-methyl-7-(1-naphthyl)-5-(1-indol-1H-yl)-1H-inden-5-yl]-1H-indole

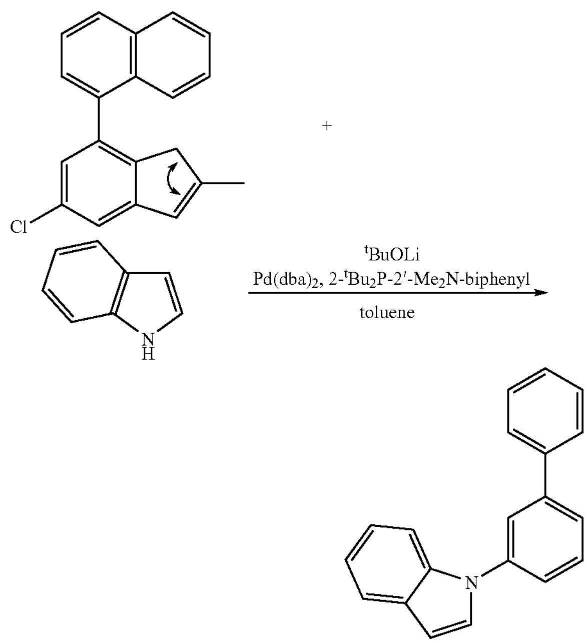

In argon atmosphere to a solution of 18.0 g (62.0 mmol) of a mixture of 6-chloro-2-methyl-4-(1-naphthyl)-1H-indene and 5-chloro-2-methyl-7-(1-naphthyl)-1H-indene in 250 ml of toluene, 15.2 g (190 mmol) of $^tBuOLi$, 7.61 g (64.0 mmol) of indole, 713 mg (1.24 mmol) of $Pd(dba)_2$, and 635 mg (1.86 mmol) of 2-di(tert-butyl)phosphino-2'-(N,N-dimethylamino)biphenyl were added. This mixture was refluxed for 9 hours, then cooled to room temperature and added to 300 ml of cold water. The organic layer was separated. The aqueous layer was washed by 2×200 ml of methyl-tert-butyl ether. The combined extract was dried over $K_2CO_3$ and evaporated to dryness. The crude product was purified by flash-chromatography on Silica Gel 60 (40-63 μm, d 80 mm, l 400 mm; eluent: hexanes/methyl-tert-butyl ether=10:1, vol.). Yield 17.6 g (73%) of yellow oil.

Anal. calc. for $C_{28}H_{21}N$: C, 90.53; H, 5.70. Found: C, 90.66; H, 5.72.

$^1H$ NMR ($CDCl_3$): δ 7.87-7.93 (m, 4H, 4,8-H in naphthyl of isomers A and B), 7.79 (m, 1H, 5-H in naphthyl of isomer A), 7.72 (m, 1H, 5-H in naphthyl of isomer B), 7.37-7.69 (m, 9H, 5,7-H in indenyl of isomer A and 6-H in indenyl of isomer B and 2,3,6,7-H in naphthyl and 2,4,7-H in indolyl of isomers A and B), 7.27 (d, J=1.8 Hz, 1H, 4-H in indenyl of isomer B), 7.20 (m, 2H, 5-H in indolyl of isomers A and B), 7.14 (m, 2H, 6-H in indolyl of isomers A and B), 6.66 (d, J=3.2 Hz, 3-H in indolyl of isomers A and B), 6.60 (m, 1H, 3-H in indenyl of isomer B), 6.15 (m, 1H, 3-H in indenyl of isomer A), 3.52 (d, J=22.8 Hz, 1H, 1-H in indenyl of isomer A), 3.45 (d, J=22.8 Hz, 1H, 1'-H in indenyl of isomer A), 3.15 (d, J=23.0 Hz, 1H, 1-H in indenyl of isomer B), 3.03 (d, J=23.0 Hz, 1H, 1'-H in indenyl of isomer B), 2.08 (m, 6H, 2-Me in indenyl of isomers A and B).

$^{13}C\{^1H\}$ NMR ($CDCl_3$): δ 148.5, 147.3, 146.9, 144.8, 143.8, 140.8, 138.6, 138.2, 137.9, 136.8, 136.1, 136.0, 135.9, 133.7 (two resonances), 132.9, 131.7, 131.4, 129.25, 129.19, 126.37, 126.27 (three resonances), 127.93, 127.86, 127.3, 126.8, 126.4, 126.28, 126.23, 126.1 (two resonances), 125.88 (two resonances), 125.81, 125.4 (two resonances), 124.4, 122.1 (two resonances), 122.5, 121.0 (two resonances), 120.1 (two resonances), 119.0, 115.1, 110.68, 110.64, 103.16, 103.08, 43.1, 42.1, 16.80, 16.75.

Complex 29—($\eta^5$-2-Methyl-4-naphthyl-6-(indol-1-yl)indenyl)($\eta^5$-pentamethylcyclopentadienyl)zirconium dichloride

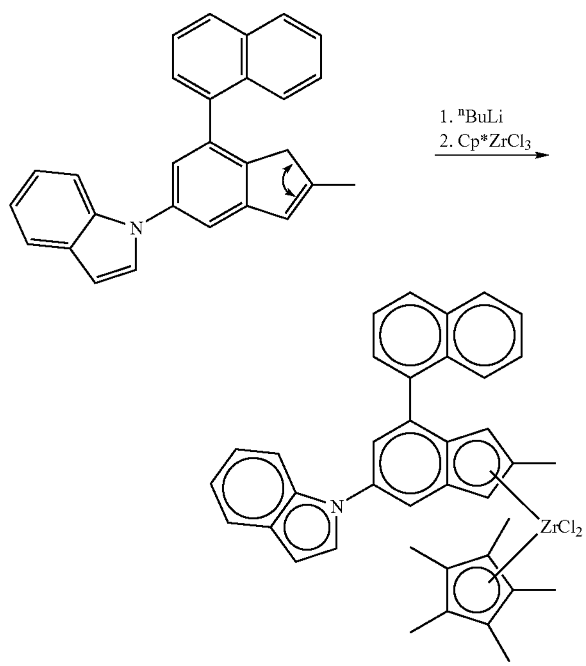

29

In the Glove Box to a solution of 2.01 g (5.40 mmol) of a mixture of 1-[2-methyl-4-(1-naphthyl)-6-(1-indol-1H-yl)-1H-inden-6-yl]-1H-indole and 1-[2-methyl-7-(1-naphthyl)-5-(1-indol-1H-yl)-1H-inden-5-yl]-1H-indole in 50 ml of toluene, 2.16 ml of 2.5 M (5.40 mmol) $^nBuLi$ in hexanes were added for 15 minutes at 0° C. The resulting solution was stirred for 16 hours at room temperature. Then, 1.74 g (5.40 mmol) of $Cp^*ZrCl_3$ was added. This mixture was stirred for 3 days at ambient temperature and additionally for 8 hours at 55° C. The resulting hot mixture was filtered through Celite 503. The filtrate was evaporated to dryness. The solid residue was washed with 4×25 ml of hexanes and dried in vacuum. Yield 2.19 g (61%) of yellowish solid.

Anal. calc. for $C_{38}H_{35}Cl_2NZr$: C, 68.34; H, 5.28. Found: C, 68.52; H, 5.37.

$^1$H NMR ($CD_2Cl_2$): δ 7.89 (dd, J=7.1 Hz, J=1.1 Hz, 1H, 7-H in indenyl), 7.82 (m, 2H, 4,8-H in naphthyl), 7.22-7.62 (m, 9H, 5-H in indenyl and 2,4,7-H in indolyl and 2,3,5,6, 7-H in naphthyl), 7.10 (m, 1H, 5-H in indolyl), 7.03 (m, 1H, 6-H in indolyl), 6.57 (d, J=3.1 Hz, 1H, 3-H in indolyl), 6.22 (br.s, 2H, 1,3-H in indenyl), 2.06 (s, 3H, 2-Me in indenyl), 1.93 (s, 15H, $C_5Me_5$).

$^{13}C\{^1H\}$ NMR ($CD_2Cl_2$): δ 139.1, 138.7, 138.1, 138.0, 135.4, 133.3, 132.9, 131.9, 130.8, 130.02, 129.93, 129.88, 129.0, 127.9, 127.5, 127.29, 127.23, 127.1, 126.8, 123.8, 122.5, 121.9, 117.9, 117.4, 112.5, 104.9, 102.2, 17.0, 14.1.

Preparation of Complex 30—rac-dimethylsilylene-bis(η$^5$-2-methyl-4-phenyl)-6-(phenothiazin-10-yl) indenyl)zirconium dichloride

Mixture of 6-chloro-2-methyl-4-phenyl-1H-indene and 5-chloro-2-methyl-7-phenyl-1H-indene

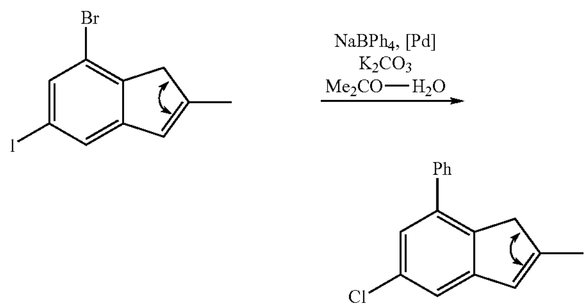

In argon atmosphere to a solution of 16.4 g (67.0 mmol) of a mixture of 4-bromo-6-chloro-2-methyl-1H-indene and 7-bromo-5-chloro-2-methyl-1H-indene in 330 ml of acetone-water (3:1, vol.), 6.64 g (19.0 mmol) of $NaBPh_4$ and 31.8 g (300 mmol) of $Na_2CO_3$ were added. To this mixture a solution of 0.305 g (1.36 mmol) of $Pd(OAc)_2$ in 55 ml of acetone was added dropwise for 3 hours at reflux. The resulting mixture was cooled to room temperature, evaporated to dryness, and extracted with 3×200 ml of methyl-tert-butyl ether. The combined extract was passed through short column with Silica Gel 60 (40-63 μm, d 50 mm, l 50 mm) to remove palladium black. This column was additionally washed with 2×500 ml of methyl-tert-butyl ether. The combined extract was evaporated to dryness. This procedure gave 11.8 g (73%) of white solid as ca. 4:3 mixture of 6-chloro-2-methyl-4-phenyl-1H-indene and 5-chloro-2-methyl-7-phenyl-1H-indene.

Anal. calc. for $C_{16}H_{13}Cl$: C, 79.83; H, 5.44. Found: C, 79.59; H, 5.31.

$^1$H NMR ($CDCl_3$): 6-chloro-2-methyl-4-phenyl-1H-indene, δ 7.14-7.55 (m, 7H, 5,7-H in indenyl and $C_6H_5$), 6.51 (m, 1H, 3-H in indenyl), 3.36 (m, 2H, $CH_2$), 2.17 (m, 3H, Me); 5-chloro-2-methyl-7-phenyl-1H-indene, δ 7.14-7.55 (m, 7H, 4,6-H in indenyl and $C_6H_5$), 6.64 (m, 1H, 3-H in indenyl), 3.38 (m, 2H, $CH_2$), 2.17 (m, 3H, Me).

$^{13}C\{^1H\}$ NMR ($CDCl_3$): δ 148.8, 148.4, 147.3, 146.0, 140.5, 139.5, 138.8, 135.2, 133.1, 129.3, 129.2, 129.1, 128.9 (two resonances), 128.7, 128.6, 127.9, 127.7, 126.9 (two resonances), 126.2, 124.3, 123.0, 119.3, 43.3, 42.8, 17.2, 17.1.

A Mixture of 1-[2-methyl-4-phenyl-6-(10H-phenothiazin-10-yl)-1H-inden-6-yl]-1H-indole and 1-[2-methyl-7-phenyl-5-(10H-phenothiazin-10-yl)-1H-inden-5-yl]-1H-indole

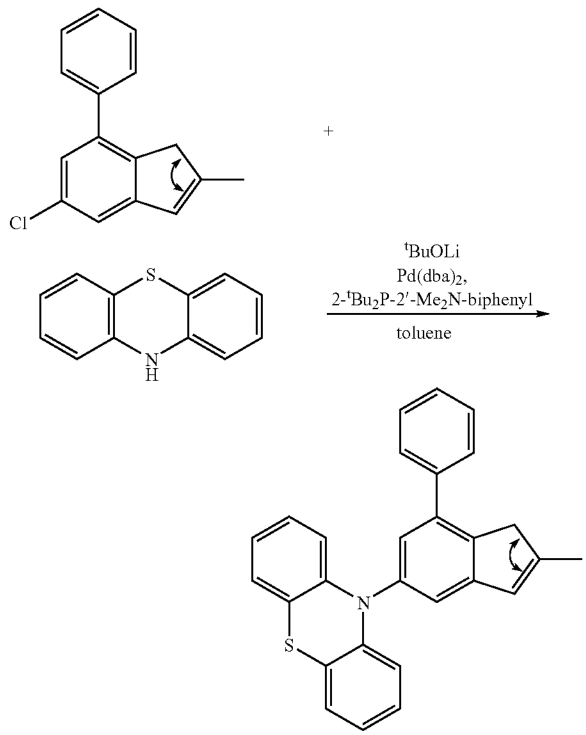

Under an argon atmosphere, a mixture of 9.63 g (40.0 mmol) of a mixture of 6-chloro-2-methyl-4-phenyl-1H-indene and 5-chloro-2-methyl-7-phenyl-1H-indene, 9.60 g (120 mmol) of $^t$BuOLi, 7.97 g (40.0 mmol) of phenothizine, 460 mg (0.80 mmol) of $Pd(dba)_2$, and 320 mg (1.60 mmol) of tri(tert-butyl)phosphine, and 80 ml of toluene was refluxed for 10 hours. The resulting mixture was cooled to room temperature, passed through short column with Silica Gel 60 (40-63 μm, d 80 mm, l 50 mm). The Silica Gel layer was additionally washed by 300 ml of methyl-tert-butyl ether. The combined elute was evaporated to dryness. The crude product was purified by flash-chromatography on Silica Gel 60 (40-63 μm, d 60 mm, l 500 mm; eluent: hexanes/methyl-tert-butyl ether=20:1, vol.). Yield 10.7 g (66%) of ca 1 to 2 mixture of 1-[2-methyl-4-phenyl-6-(10H-phenothiazin-10-yl)-1H-inden-6-yl]-1H-indole (isomer A) and 1-[2-methyl-7-phenyl-5-(10H-phenothiazin-10-yl)-1H-inden-5-yl]-1H-indole (isomer B).

Anal. calc. for $C_{28}H_{21}NS$: C, 83.34; H, 5.25. Found: C, 83.29; H, 5.20.

$^1$H NMR ($CDCl_3$): δ 6.74-7.59 (m, 7-H in indenyl of isomer A and 3,7-H in indenyl of isomer B, Ph and phenothiazine of isomers A and B), 6.59 (m, 3-H in indenyl of isomer A), 6.35 (d, J=7.7 Hz, 5-H in indenyl of isomer A), 6.32 (d, J=7.7 Hz, 5-H in indenyl of isomer B), 3.50 (s, 2H, $CH_2$ of isomer A), 3.46 (s, $CH_2$ of isomer B), 2.17 (m, 2-Me of isomers A and B).

$^{13}C\{^1H\}$ NMR ($CDCl_3$): δ 149.0, 148.4, 148.3, 147.9, 146.5, 144.6, 144.5, 143.5, 140.6, 140.2, 139.7, 139.5, 136.7, 135.7, 129.4, 128.7, 128.5*, 128.3, 127.5, 127.2, 127.0, 126.8*, 126.5*, 126.0, 124.7, 122.2, 121.2*, 119.6, 115.87, 115.81, 43.1, 42.7, 17.0, 16.8 (* two resonances).

Mixture of rac- and meso-bis[2-methyl-4-phenyl-6-(10-phenothiazin-10H-yl)-1H-inden-1-yl](dimethyl) silanes

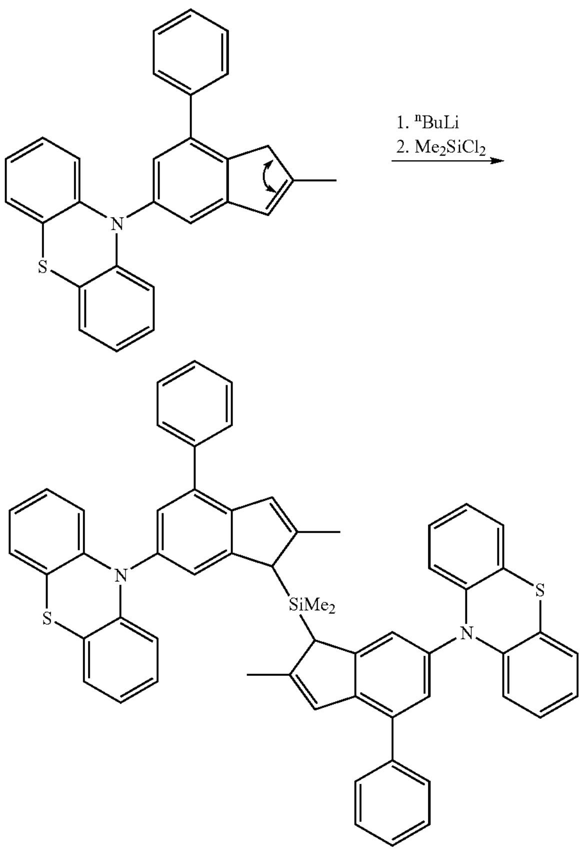

In argon atmosphere to a solution of 3.23 g (8.0 mmol) of a mixture of 1-[2-methyl-4-phenyl-6-(10H-phenothiazin-10-yl)-1H-inden-6-yl]-1H-indole and 1-[2-methyl-7-phenyl-5-(10H-phenothiazin-10-yl)-1H-inden-5-yl]-1H-indole in 60 ml of ether, 3.20 ml of 2.5 M $^n$BuLi (8.0 mmol) in hexanes was added at 0° C. This mixture was stirred for 16 hours at 20° C. Then, 0.52 g (4.0 mmol) of $Me_2SiCl_2$ was added. The resulting mixture was stirred for 30 hours at ambient temperature. To this mixture 75 ml of water was added. The organic layer was separated. The aqueous layer was washed by 2×75 ml of methyl-tert-butyl ether. The combined extract was dried over $Na_2SO_4$ and evaporated to dryness. The crude product was recrystallized from 250 ml of hexanes. Yield 2.79 g (81%) of yellowish solid of ca. 1 to 2 mixture of rac- and meso-compounds.

Anal. calc. for $C_{58}H_{46}N_2S_2Si$: C, 80.70; H, 5.37. Found: C, 80.91; H, 5.45.

$^1H$ NMR ($CDCl_3$): δ 6.19-7.59 (m, 3,3',5,5',7,7'-H in indenyl, Ph, and phenothiazine in rac- and meso-compounds), 3.90 (s, CHSi, CHSi' in rac-compound), 3.87 (s, CHSi, CHSi' in meso-compound) 2.27 (s, 2,2'-Me in meso-compound), 2.21 (s, 2,2'-Me in rac-compound), −0.02 (s, $SiMe_2$ in rac-compound), −0.15 (s, SiMe in meso-compound), −0.23 (s, 3H, SiMe' in meso-compound).

$^{13}C\{^1H\}$ NMR ($CDCl_3$): δ 149.3, 149.0, 147.8, 147.6, 144.52, 144.46, 142.8, 142.7, 140.1, 140.0, 136.4, 136.0, 126.8, 126.5, 128.2, 127.2, 126.7, 126.5, 125.9, 125.7, 124.3, 124.2, 122.2, 119.3, 119.2, 115.5, 48.3, 48.2, 18.0, −4.8, −5.1, −5.5.

Complex 30—rac-dimethylsilylene-bis($\eta^5$-2-methyl-4-phenyl)-6-(phenothiazin-10-yl)indenyl)zirconium dichloride

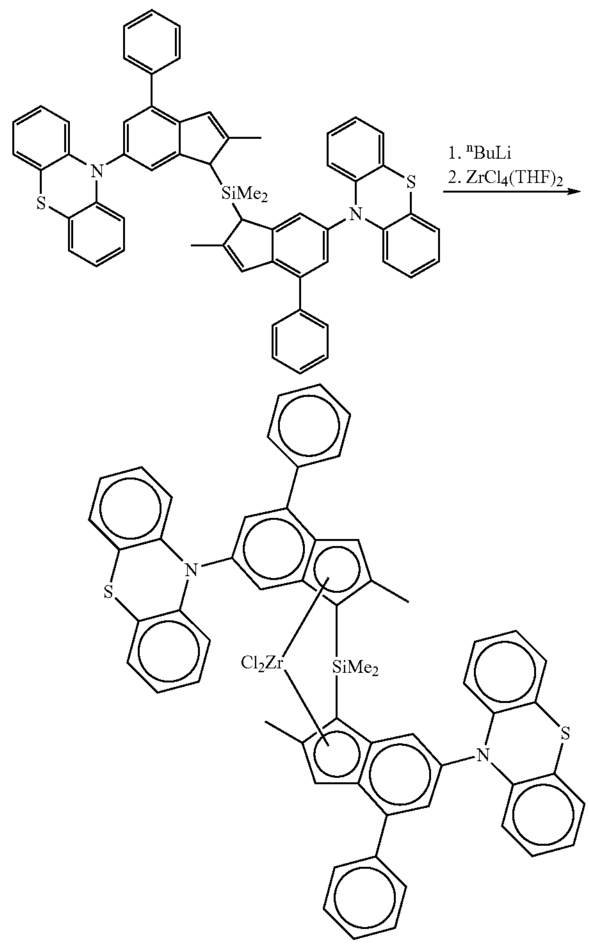

30

In argon atmosphere to a solution of 3.80 g (4.4 mmol) of a mixture of rac- and meso-bis[2-methyl-4-phenyl-6-(10-phenothiazin-10H-yl)-1H-inden-1-yl](dimethyl)silanes in 90 ml of ether 3.52 ml of 2.5 M $^n$BuLi (8.8 mmol) in hexanes were added for 15 minutes at 0° C. This mixture was stirred for 20 hours at ambient temperature and then cooled to −78° C. Then, 1.66 g (4.4 mmol) of $ZrCl_4(THF)_2$ was added. The resulting mixture was slowly (ca. 1.5 hours) warmed to ambient temperature at vigorous stirring, stirred for additional 30 hours at this temperature, and, finally, evaporated to dryness. The residue was treated with 100 ml of hot (80° C.) toluene. This hot mixture was filtered through glass frit (G4). The filtrate was evaporated to dryness. The residue was washed by 3×100 ml of hexanes and dried in vacuum. Yield 2.00 g (45%) of orange rac-complex.

Anal. calc. for $C_{58}H_{44}Cl_2N_2S_2SiZr$: C, 68.07; H, 4.33. Found: C, 68.24; H, 4.41.

$^1H$ NMR ($CD_2Cl_2$): δ 7.61-7.69 (m, 3H, 4-H in Ph and 4,5-H in phenothiazine), 7.34-7.49 (m, 4H, 2,3,5,6-H in Ph), 7.31 (d, J=1.7 Hz, 1H, 7-H in indenyl), 7.08 (m, 1H, 1-H in phenothiazine), 7.01 (m, 1H, 1-H in phenothiazine), 6.98 (d, J=1.7 Hz, 1H, 5-H in indenyl), 6.88 (m, 2H, 2,7- or 3,6-H in phenothiazine), 6.81 (m, 2H, 3,6- or 2,7-H in phenothiazine), 6.51 (d, J=1.3 Hz, 1H, 1/3-H in indenyl), 6.48 (d, J=1.3 Hz, 1H, 3/1-H in indenyl), 2.08 (s, 6H, 2,2'-Me), 1.22 (s, 6H, $SiMe_2$).

Preparation of Complex 31-meso-dimethylsilylene-bis($\eta^5$-2-methyl-4-(phenothiazin-10-yl)-6-p-tolylindenyl)zirconium dichloride

A Mixture of 10-(6-chloro-2-methyl-1H-inden-4-yl)-10H-phenothiazine and 10-(5-chloro-2-methyl-1H-inden-7-yl)-10H-phenothiazine

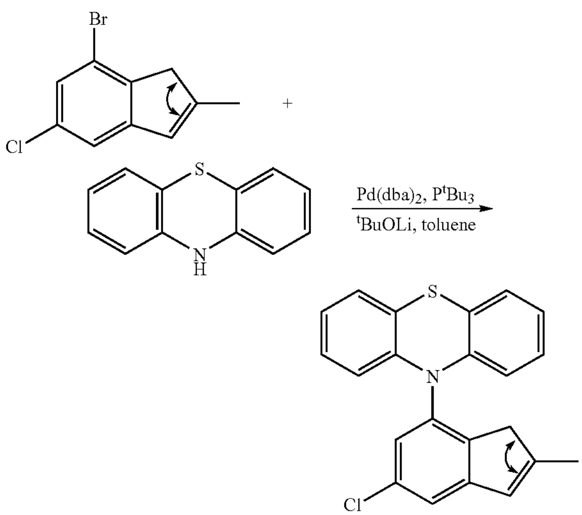

In argon atmosphere a mixture of 49.0 g (201 mmol) of a mixture of 4-bromo-6-chloro-2-methyl-1H-indene and 7-bromo-5-chloro-2-methyl-1H-indene, 40.1 g (201 mmol) of phenothiazine, 48.3 g (603 mmol) of $^t$BuOLi, 2.30 g (4.0 mmol) of $Pd(dba)_2$, 1.62 g (8.0 mmol) of tri(tert-butyl) phosphine, and 600 ml of toluene was stirred for 18 hours at ambient temperature. The solution was decanted and passed through short column with Silica Gel 60 (40-63 μm, d 80 mm, l 50 mm). The Silica Gel layer was additionally washed by 1000 $cm^3$ of methyl-tert-butyl ether. The combined organic solution was evaporated to dryness. The crude product was purified by flash-chromatography on Silica Gel 60 (40-63 μm, d 65 mm, l 750 mm; eluent: hexanes/methyl-tert-butyl ether=20:1, vol.). Yield 43.8 g (60%) of ca. 1 to 3 mixture of 10-(6-chloro-2-methyl-1H-inden-4-yl)-10H-phenothiazine and 10-(5-chloro-2-methyl-1H-inden-7-yl)-10H-phenothiazine.

Anal. calc. for $C_{22}H_{16}ClNS$: C, 73.02; H, 4.46. Found: C, 73.20; H, 4.35.

$^1H$ NMR ($CDCl_3$), 10-(6-chloro-2-methyl-1H-inden-4-yl)-10H-phenothiazine: δ 7.46 (m, 1H, 7-H in indenyl), 7.31 (d, J=1.8 Hz, 1H, 5-H in indenyl), 7.00-7.04 (m, 2H, 1,8-H in phenothiazine), 6.82-6.88 (m, 4H, 2,3,6,7-H in phenothiazine), 6.41 (m, 1H, 3-H in indenyl), 6.14-6.18 (m, 2H, 4,5-H in phenothiazine), 3.44 (s, 2H, $CH_2$), 2.098 (s, 3H, 2-Me); 10-(5-chloro-2-methyl-1H-inden-7-yl)-10H-phenothiazine: δ 7.35 (d, J=1.8 Hz, 1H, 4-H in indenyl), 7.17 (d, J=1.8 Hz, 1H, 6-H in indenyl), 6.98-7.02 (m, 2H, 1,8-H in phenothiazine), 6.76-6.87 (m, 4H, 2,3,6,7-H in phenothiazine), 6.50 (m, 1H, 3-H in indenyl), 6.16-6.21 (m, 2H, 4,5-H in phenothiazine), 3.17 (s, 2H, $CH_2$), 2.102 (s, 3H, 2-Me).

$^{13}C\{^1H\}$ NMR ($CDCl_3$), 10-(5-chloro-2-methyl-1H-inden-7-yl)-10H -phenothiazine: δ 150.2, 149.2, 142.5, 141.3, 136.0, 133.8, 128.8, 127.0, 126.6, 126.4, 126.0, 122.5, 120.4, 114.9, 40.8, 16.7.

A Mixture of 10-[2-methyl-6-(4-methylphenyl)-1H-inden-4-yl]-10H-phenothiazine and 10-[2-methyl-5-(4-methylphenyl)-1H-inden-7-yl]-10H-phenothiazine

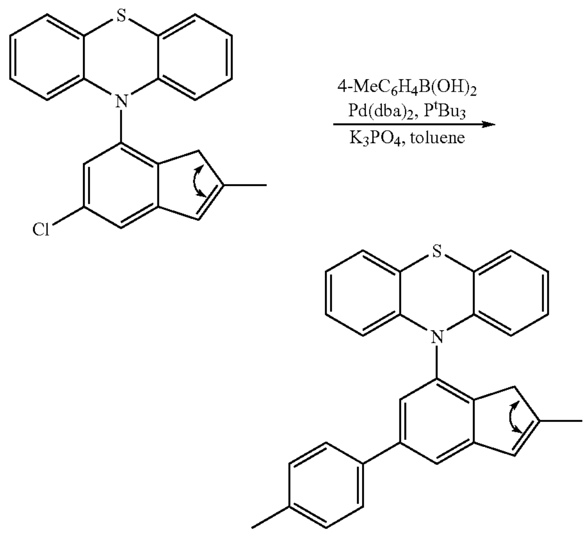

In argon atmosphere, a mixture of 18.1 g (50 mmol) of 10-(6-chloro-2-methyl-1H-inden-4-yl)-10H-phenothiazine and 10-(5-chloro-2-methyl-1H-inden-7-yl)-10H-phenothiazine, 6.80 g (50 mmol) of para-tolylboronic acid, 31.8 g of $K_3PO_4$, 575 mg (1.0 mmol) of $Pd(dba)_2$, 405 mg (2.0 mmol) of tri(tert-butyl)phosphine, and 90 ml of toluene was refluxed for 15 hours. The resulting mixture was cooled to ambient temperature and filtered through glass frit (G4). The filtrate was evaporated to dryness. The crude product was purified by flash-chromatography on Silica Gel 60 (40-63 μm, d 60 mm, l 500 mm; eluent: hexanes/methyl-tert-butyl ether=2-: 1, vol.). Yield 14.4 g (69%) of ca 2 to 5 mixture of 10-[2-methyl-6-(4-methylphenyl)-1H-inden-4-yl]-10H-phenothiazine (isomer A) and 10-[2-methyl-5-(4-methylphenyl)-1H-inden-7-yl]-10H-phenothiazine (isomer B).

Anal. calc. for $C_{29}H_{23}NS$: C, 83.41; H, 5.55. Found: C, 83.59; H, 5.62.

$^1H$ NMR ($CDCl_3$): δ 7.68 (s, 5-H in indenyl of isomer A), 7.56 (s, 6-H in indenyl of isomer B), 7.47-7.54 (m, 3,5-H in p-tolyl of isomer A and B), 7.36 (m, 4-H in indenyl of isomer B), 7.15-7.22 (m, 2,6-H in p-tolyl of isomer A and B), 6.91-6.99 (m, 7-H in indenyl of isomer A and 2,7-H in phenothiazine of isomers A and B), 6.67-6.80 (m, 1,3,6,8-H in phenothiazine), 6.53 (m, 3-H in indenyl of isomer B), 6.41 (m, 3-H in indenyl of isomer A), 6.20-6.25 (m, 4,5-H in phenothiazine of isomer B), 6.11-6.16 (m, 4,5-H in phenothiazine of isomer A), 3.42 (s, $CH_2$ of isomer A), 3.17 (s, $CH_2$ of isomer B), 2.10 (s, 2-Me of isomers A and B).

$^{13}C\{^1H\}$ NMR ($CDCl_3$): δ 150.1, 149.1, 148.5, 147.0, 144.7, 143.6, 142.6, 140.72, 140.65, 147.8, 136.0, 135.8, 132.1, 129.3, 129.2, 128.0, 127.9, 127.0, 126.74, 126.68, 124.5, 124.4, 122.5, 122.4, 122.3, 121.6, 121.1, 120.4, 120.3, 119.8, 115.9, 115.5, 114.8, 110.4, 103.7, 103.6, 43.5, 41.0, 16.9, 16.8.

Mixture of rac- and meso-bis[2-methyl-4-(10H-phenothiazin-10-yl)-6-(4-methylphenyl)-1H-inden-1-yl](dimethyl)silanes

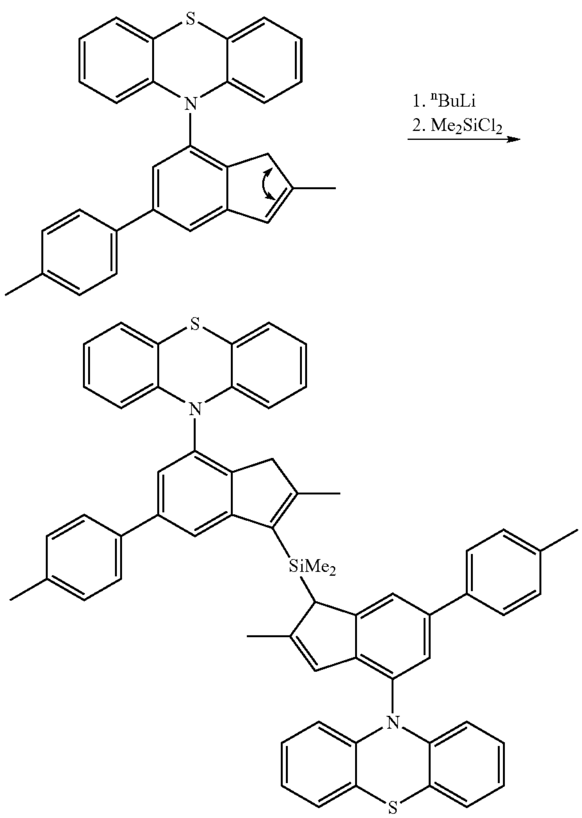

In argon atmosphere to a solution of 2.09 g (5.0 mmol) of a mixture of 10-[2-methyl-6-(4-methylphenyl)-1H-inden-4-yl]-10H-phenothiazine and 10-[2-methyl-5-(4-methylphenyl)-1H-inden-7-yl]-10H-phenothiazine in 40 ml of ether, 2.0 ml of 2.5 M $^{n}$BuLi (5.0 mmol) in hexanes were added at 0° C. This mixture was stirred for 16 hours at room temperature. At this temperature, 324 mg (2.5 mmol) of $Me_2SiCl_2$ was added. The resulting mixture was stirred for 30 hours at ambient temperature, then 50 ml of water was added. The organic layer was separated. The aqueous layer was washed by 2×50 ml of methyl-tert-butyl ether. The combined extract was dried over $Na_2SO_4$ and evaporated to dryness. The crude product was recrystallized from 150 ml of hexanes. Yield 3.37 g (76%) of white solid of ca. 1 to 2 mixture of rac- and meso-compounds.

Anal. calc. for $C_{60}H_{50}N_2S_2Si$: C, 80.86; H, 5.65. Found: C, 81.03; H, 5.75.

$^1$H NMR ($CDCl_3$): δ 7.93 (s, 5-H in indenyl of meso-isomer), 7.77 (s, 5'-H in indenyl of meso-isomer), 7.73 (s, 5,5'-H in indenyl of rac-isomer), 6.72-7.63 (m, 7,7'-H in indenyl and 2,2',3,3',5,5',6,6'-H in p-tolyl and 1,1',2,2',3,3',6,6',7,7',8,8'-H in phenothiazine of rac- and meso-isomers), 6.64 (m, 3-H in indenyl of meso-isomer), 6.62 (m, 3'-H in indenyl of meso-isomer), 6.45 (m, 3,3'-H in indenyl of rac-isomer), 6.19-6.26 (m, 4,4',5,5'-H in phenothiazine of rac- and meso-isomers), 4.02 (s, 1,1'-H in indenyl of meso-isomer), 3.50 (s, 1,1'-H in indenyl of rac-isomer), 2.89 (s, 4,4'-Me in p-tolyl of rac-isomer), 2.88 (s, 4,4'-Me in p-tolyl of meso-isomer), 2.31 (m, 2-Me in indenyl of meso-isomer), 2.22 (m, 2'-Me in indenyl of meso-isomer), 2.13 (m, 2,2'-Me in indenyl of rac-isomer), −0.13 (s, SiMe in meso-compound), −0.14 (s, $SiMe_2$ in rac-compound and SiMe' in meso-compound).

Complex 31—meso-dimethylsilylene-bis(η$^5$-2-methyl-4-(phenothiazin-10-yl)-6-p-tolylindenyl)zirconium dichloride

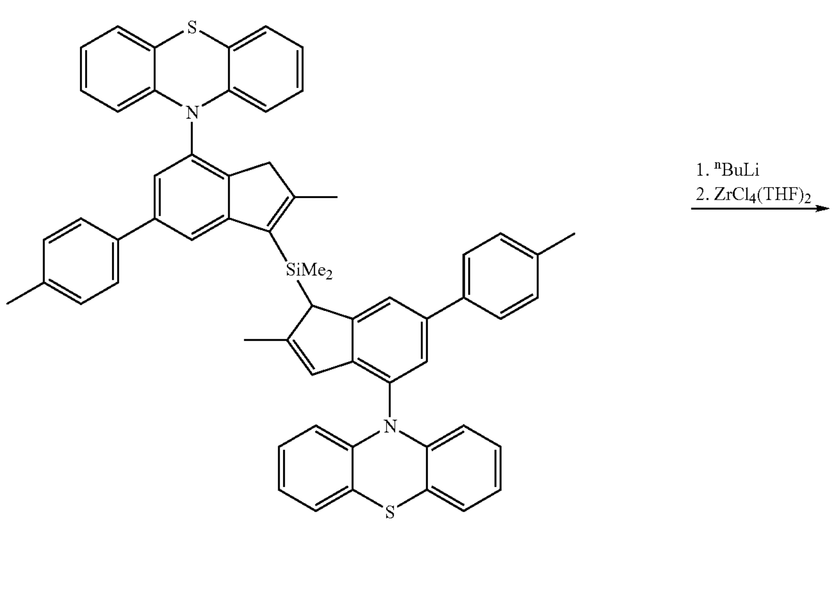

-continued

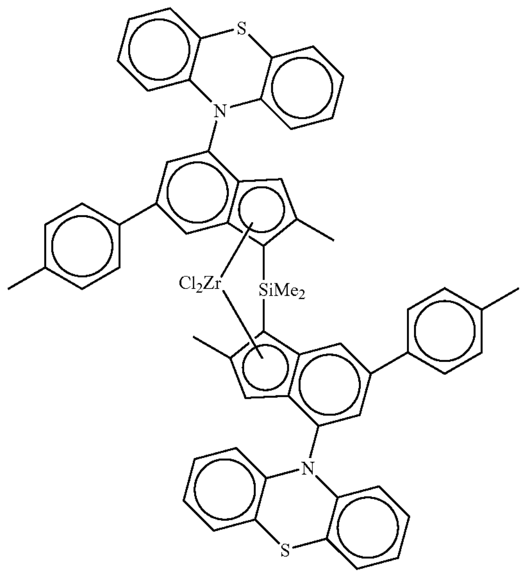

31

In the Glove Box to a solution of 5.88 g (6.6 mmol) of a mixture of rac- and meso-bis[2-methyl-4-(10H-phenothiazin-10-yl)-6-(4-methylphenyl)-1H-inden-1-yl](dimethyl) silanes in 140 ml of ether, 5.28 ml of 2.5 M $^{n}$BuLi (13.2 mmol) in hexanes was added for 15 minutes at 0° C. This mixture was stirred for 20 hours at room temperature and then cooled to −78° C. At this temperature, 2.49 g (6.6 mmol) of $ZrCl_4(THF)_2$ was added with vigorous stirring. The resulting mixture was stirred and slowly warmed to ambient temperature for 1.5 hours. This mixture stirred for 30 hours at ambient temperature and then evaporated to dryness. The residue was treated with 150 ml of hot (80° C.) toluene. The resulting toluene solution was filtered through Celite 503. The Celite layer was additionally washed by 20 ml of hot toluene. The toluene filtrate was evaporated to dryness. The yellow residue was washed by 5×100 ml of hot hexanes and dried in vacuum. This procedure gave 2.0 g (29%) of ca. 1 to 2 mixture of rac- and meso-products. The meso-product was obtained by crystallization of this mixture from 300 ml of toluene. Crystals precipitated from this solution at −30° C. were collected and dried in vacuum. Yield 730 mg (11%) of pure meso-compound. An attempt to isolate pure rac-isomer failed.

Anal. calc. for $C_{60}H_{48}Cl_2N_2S_2SiZr$: C, 68.54; H, 4.60. Found: C, 68.69; H, 4.74.

$^1$H NMR ($CD_2Cl_2$), rac-complex: δ 7.96 (m, 2H, 5,5'-H in indenyl), 7.65 (d, J=1.2 Hz, 2H, 7,7'-H in indenyl), 7.21-7.25 (m, 4H, 3,3',5,5'-H in p-tolyl), 6.97-7.05 (m, 8H, 2,2',6,6'-H in p-tolyl and 1,1',8,8'-H in phenothiazine), 6.72-6.83 (m, 14H, 3,3'-H in indenyl and 2,2',3,3',4,4',5,5',6,6',7,7'-H in phenothiazine), 2.38 (s, 6H, 4,4'-Me in p-tolyl), 2.35 (s, 6H, 2,2'-Me in indenyl), 1.52 (s, 3H, SiMe), 1.17 (s, 3H, SiMe').

Preparation of Complex 32—($\eta^5$-2-methyl-4-(phenothiazin-10-yl)-6-(indol-1-yl)indenyl)($\eta^5$-pentamethylcyclopentadienyl)zirconium dichloride A Mixture of 10-[6-(1H-indol-1-yl)-2-methyl-1H-inden-4-yl]10H-phenothiazine and 10-[5-(1H-indol-1-yl)-2-methyl-1H-inden-7-yl]-10H-phenothiazine

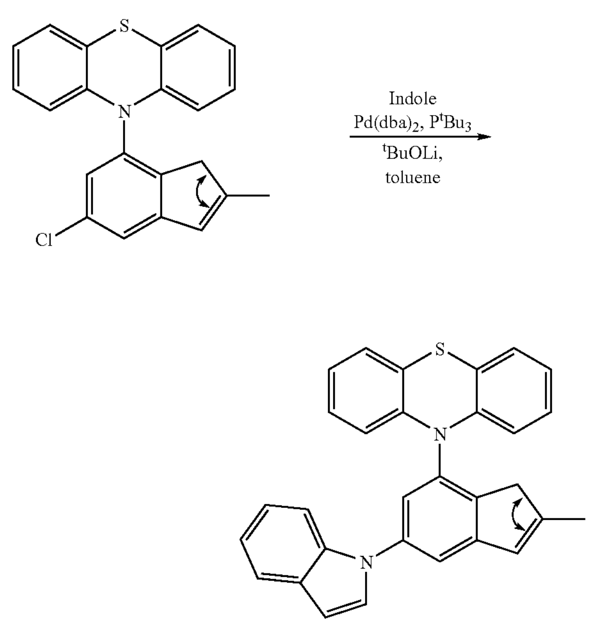

In argon atmosphere a mixture of 21.7 g (60 mmol) of a mixture of 10-[2-methyl-6-(4-methylphenyl)-1H-inden-4-yl]-10H-phenothiazine and 10-[2-methyl-5-(4-methylphenyl)-1H-inden-7-yl]-10H-phenothiazine, 7.03 g (60 mmol) of indole, 14.4 g (180 mmol) of $^t$BuOLi, 690 mg (1.2 mmol) of $Pd(dba)_2$, 486 mg (2.4 mmol) of tri(tert-butyl)phosphine, and 100 ml of toluene was refluxed for 15 hours. The solution was decanted and passed through short column with Silica Gel 60 (40-63 μm, d 80 mm, l 50 mm). The Silica Gel layer was additionally washed by 500 $cm^3$ of methyl-tert-butyl ether. The combined organic solution was evaporated to dryness. The crude product was purified by flash-chromatography on Silica Gel 60 (40-63 μm, d 65 mm, l 550 mm; eluent: hexanes/methyl-tert-butyl ether=20:1, vol.). Yield 15.5 g (60%) of ca. 1 to 2 mixture of 10-[6-(1H-indol-1-yl)-2-methyl-1H-inden-4-yl]-10H-phenothiazine (isomer A) and 10-[5-(1H-indol-1-yl)-2-methyl-1H-inden-7-yl]-10H-phenothiazine (isomer B).

Anal. calc. for $C_{30}H_{22}N_2S$: C, 81.41; H, 5.01. Found: C, 81.47; H, 5.00.

$^1$H NMR ($CDCl_3$): δ 7.50-7.69 (m, 5-H in indenyl of isomer A, 6-H in indenyl of isomer B, 4,7-H in indolyl of isomers A and B), 7.42 (d, J=1.8 Hz, 4-H in indenyl of isomer B), 7.39 (d, J=3.4 Hz, 2-H in indolyl of isomer A), 7.36 (d, J=3.3 Hz, 2-H in indolyl of isomer B), 7.29 (d, J=1.8 Hz, 6-H in indenyl of isomer A), 7.11-7.25 (m, 4,5-H of phenothiazine of isomers A and B), 7.00 (m, 5,6-H in indolyl of isomers A and B), 6.74-6.88 (m, 2,3,6,7-H in phenothiazine of isomers A and B), 6.65-6.69 (m, 3-H in indolyl of isomers A and B), 6.57 (m, 3-H in indenyl of isomer A), 6.47 (m, 3-H in indenyl of isomer B), 6.24-6.30 (m, 1,8-H in phenothiazine of isomers A and B), 3.51 (s, $CH_2$ of isomer B), 3.25 (s, $CH_2$ of isomer A), 2.12 (m, 2-Me in indenyl of isomers A and B).

$^{13}C\{^1H\}$ NMR ($CDCl_3$): δ 149.5, 148.0, 147.6, 146.4, 145.0, 143.94, 143.87, 142.9, 142.5, 141.27, 141.24, 139.1, 139.7, 139.6, 137.1, 136.8, 135.6, 131.9, 129.5, 127.07, 127.04, 126.94, 126.87, 126.64, 126.58, 126.51, 126.48, 124.67, 124.63, 122.21, 122.15, 121.8, 119.2, 118.4, 115.7, 115.5, 114.97, 114.94, 114.87, 114.84, 43.4, 40.9, 16.9, 16.7.

Complex 32—($\eta^5$-2-methyl-4-(phenothiazin-10-yl)-6-(indol-1-yl)indenyl) ($\eta_5$-pentamethylcyclopentadienyl)zirconium dichloride

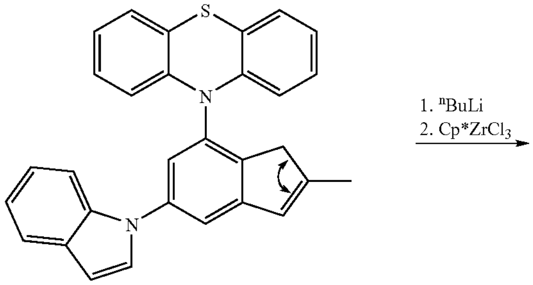

-continued

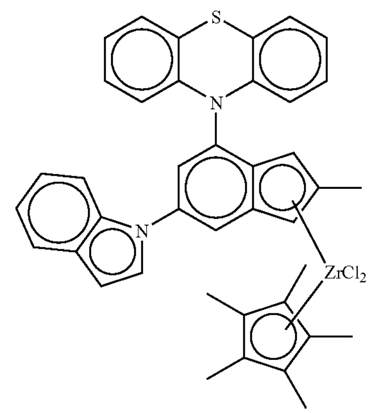

32

In the Glove Box to a solution of 2.21 g (5.0 mmol) of a mixture of 10-[6-(1H-indol-1-yl)-2-methyl-1H-inden-4-yl]-10H-phenothiazine and 10-[5-(1H-indol-1-yl)-2-methyl-1H-inden-7-yl]-10H-phenothiazine in 50 ml of toluene, 2.00 ml of 2.5 M $^n$BuLi (5.0 mmol) in hexanes were added for 15 minutes at 0° C. The resulting solution was stirred for 16 hours at room temperature. Then, 1.66 g (5.0 mmol) of $Cp^*ZrCl_3$ was added. This mixture was stirred for 12 hours at ambient temperature and additionally for 5 hours at 55° C. The resulting hot mixture was heated to 100° C. and filtered through Celite 503. Crystals precipitated at −30° C. from this filtrate were collected, washed by 3×5 ml of cold toluene, and dried in vacuum. Yield 2.10 g (57%) of yellowish solid.

Anal. calc. for $C_{40}H_{36}Cl_2N_2SZr$: C, 65.02; H, 4.91. Found: C, 64.94; H, 4.88.

$^1$H NMR ($CD_2Cl_2$): δ 7.64 (m, 1H, 5-H in indolyl), 7.59 (m, 2H, 5,7-H in indenyl), 7.40 (d, J=3.3 Hz, 1H, 2-H in indolyl), 7.22 (m, 1H, 6-H in indolyl), 7.09-7.17 (m, 4H, 4,7-H in indolyl and 4,5-H in phenothiazine), 6.86-6.96 (m, 4H, 2,3,6,7-H in phenothiazine), 6.71-6.76 (m, 2H, 1,8-H in phenothiazine), 6.68 (m, 3-H in indolyl), 6.58 (d, J=2.3 Hz, 1H, 1-H in indenyl), 6.35 (d, J=2.3 Hz, 1H, 3-H in indenyl), 2.17 (3H, 2-Me in indenyl), 1.90 (s, 15H, $C_5Me_5$).

Preparation of Complex 33-[$\eta^5$-2-(1H-benzimidazol-1-yl)indenyl]($\eta^5$-pentamethylcyclopentadienyl) zirconium dichloride 1-(1H-Inden-2-yl)-1H-benzimidazole

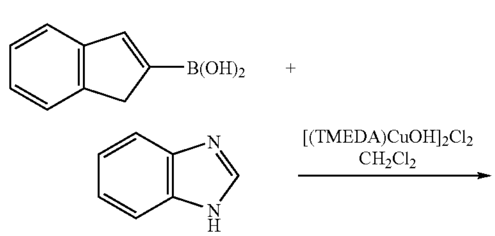

-continued

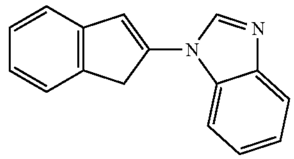

In 100 ml Erlenmeyer flask a mixture of 3.20 g (20.0 mmol) of 1H-inden-2-ylboronic acid, 1.18 g (10.0 mmol) of benzimidazole, 0.93 g (2.00 mmol) of $[(TMEDA)CuOH]_2Cl_2$, and 40 ml of dichloromethane was stirred for 20 hours (in air). The resulted mixture was passed through short column with Silica Gel 60 (40-63 μm, d 40 mm, l 20 mm). This column was additionally washed by 500 ml of dichloromethane. The combined elute was evaporated to dryness. The crude product was purified using medium-pressure chromatography on Silica Gel 60 (40-63 μm, d 40 mm, l 350 mm; eluent: hexanes/dichloromethane=1/1). Yield 530 mg (23%) of white solid.

Anal. calc. for C16H12N2r: C, 82.73; H, 5.21. Found: C, 82.65; H, 5.20.

$^1$H NMR ($CDCl_3$): δ 8.19 (br.s, 1H, 2-H in benzimidazole), 7.87 (m, 1H, 7-H in benzimidazole), 7.80 (m, 1H, 4-H in benzimidazole), 7.30-7.50 (m, 7H, 4,5,7-H in indenyl and 4,5,6,7-H in benzimidazole), 7.23 (dt, J=7.5 Hz, J=1.3 Hz, 1H, 6-H in indenyl), 7.00 (m, 1H, 3-H in indenyl), 3.99 (m, 2H, $CH_2$).

$^{13}$C NMR ($CDCl_3$): δ 144.5 (br), 143.1, 141.3 (br), 140.3, 137.9, 127.3, 125.1, 124.2, 123.6 (br), 123.2, 121.1, 120.9, 117.0, 111.9, 38.7.

Complex 33—[$\eta^5$-2-(1H-benzimidazol-1-yl)indenyl]($\eta^5$-pentamethylcyclopentadienyl)zirconium dichloride

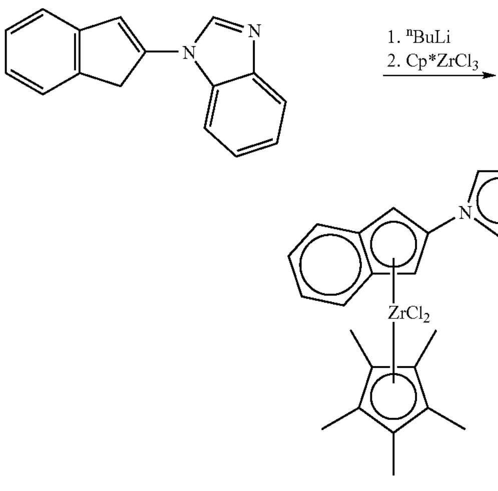

33

In a round bottom flask (0.1 L) in the Glove Box, to a suspension of 0.53 g (2.30 mmol) of 1-(1H-inden-2-yl)-1H-benzimidazole in 10 ml of toluene 0.38 g (2.30 mmol) of $LiN(TMS)_2$ was added at vigorous stirring. This mixture was additionally stirred for 10 hours at ambient temperature and, then, 0.77 g (2.30 mmol) of $Cp^*ZrCl_3$ was added. The resulted mixture was stirred for 10 hours at 95° C. and then filtered through Celite 503. The Celite layer was washed with 2×40 ml of hot toluene. The combined extract was evaporated to ca. 25 ml. Crystals precipitated from this solution at −30° C. were collected, washed by 5 ml of cold toluene, and dried in vacuum. Yield 0.40 g (44%) of white solid.

Anal. calc. for $C_{26}H_{26}Cl_2N_2Zr$: C, 59.07; H, 4.96. Found: C, 59.22; H, 5.05.

$^1$H NMR (CD2Cl2): δ 8.79 (br.s, 1H, 2-H in benzimidazole), 8.29 (m, 1H, 7-H in benzimidazole), 7.73 (m, 1H, 4-H in benzimidazole), 6.87-7.58 (m, 6-H, 4,5,6,7-H in indenyl and 5,6-H in benzimidazole), 6.25 (br.s, 2H, 1,3-H in indenyl), 2.06 (s, 15H, Cp*).

$Zr(NMe_2)_4$ (Aldrich) and $Me_3SiBr$ (Aldrich) were used as obtained. ($\eta^5$-2-Phenylindenyl)zirconium tribromide•$0.5C_7H_8$ was obtained from $Zr(NMe_2)_4$, 2-phenyl-1H-indene (Aldrich), and $Me_3SiBr$ as described in [Tagge, C. D.; Kravchenko, R. L.; Lal, T. K.; Waymouth, R. M.; *Organometallics* 1999,18, 380].

Complex 34—($\eta^5$-2-(pyrrol-1-yl)indenyl)zirconium tribromide•$0.5C_7H_8$

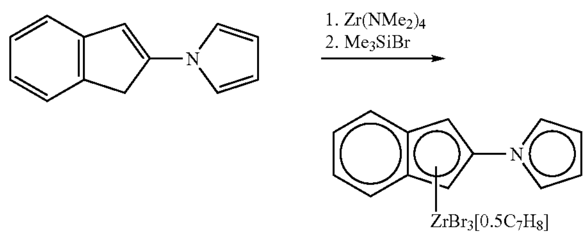

In a round bottom flask (0.25 L) in the Glove Box, a mixture of 4.01 g (15 mmol) of $Zr(NMe_2)_4$, 2.81 g (15.5 mmol) of 5, and 200 ml of ether was stirred overnight. The resulting mixture was evaporated to dryness. To the residue, 200 ml of toluene and then 13.8 g (10.6 ml, 90 mmol) $Me_3SiBr$ were added. This mixture was stirred overnight at room temperature and evaporated to 50 ml. Crystals precipitated at −30° C. were separated, washed by 15 ml of cold toluene, 2×50 ml of hexanes, and dried in vacuum. Yield 2.53 g (37%) of yellowish powder of 34.

Anal. calc. for $C_{13}H_{10}Br_3NZr$: C, 30.55; H, 1.97. Found: C, 30.44; H, 1.89.

$^1$H NMR ($CD_2Cl_2$): δ 7.63 (m, 2H, 4,7-H in indenyl), 7.30 (m, 2H, 5,6-H in indenyl), 7.21 (t, J=2.0 Hz, 2H, 2,5-H in N-pyrrolyl), 7.03-7.20 (m, 2.5H, Ph in toluene), 6.73 (s, 2H, 1,3-H of indenyl), 6.31 (t, J=2.0 Hz, 2H, 3,4-H in N-pyrrolyl), 2.48 (s, 1.5H, Me in toluene).

Complex 35-($\eta^5$-2-(pyrrol-1-yl)indenyl)(−2-(carbazol-9-yl)indenyl)zirconium dibromide

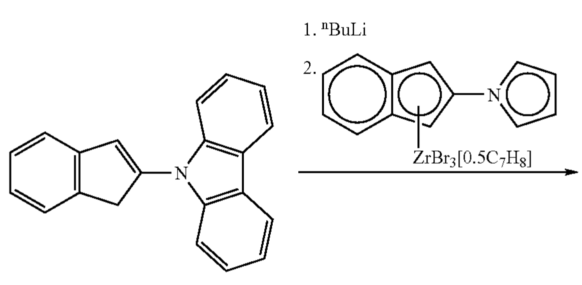

-continued

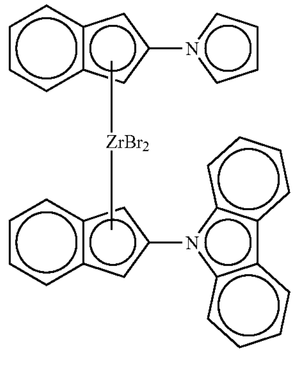

In a 10-ml vial in the Glove Box, to a solution of 281 mg (1 mmol) of 12 in 8 ml of ether, 0.4 ml of 2.5M solution of $^nBuLi$ (1 mmol) was added at room temperature. This mixture was stirred for 3 hours. In a separate round bottom flask (50 ml), to a suspension of 557 mg (1 mmol) of 34 in 20 ml of toluene, the above-obtained solution of the Li salt of 12 was added at −35° C. This mixture was additionally stirred for 30 min at this temperature and then overnight at room temperature. The resulting mixture was evaporated to dryness. The residue was extracted with 2×40 ml of hot (100° C.) toluene. The combined extract was evaporated to 10 ml, and 10 ml of hexanes was added. The suspension formed was filtered through glass frit (G3). The precipitate was washed by 2×15 ml of hexanes and dried in vacuum. Yield 153 mg (22%) of yellowish powder of 35.

Anal. calc. for $C_{34}H_{24}Br_2N_2Zr$: C, 57.39; H, 3.40. Found: C, 57.45; H, 3.48.

$^1H$ NMR ($CD_2Cl_2$): δ 8.15 (m, 2H, 4,5-H of N-carbazolyl), 7.75 (m, 2H, 1,8-H of N-carbazolyl), 7.59 (m, 2H, 4,7-H in indenyl of 2-(pyrrol-1-yl)indenyl), 7.52 (m, 2H, 4,7-H in indenyl of 2-(carbazol-9-yl)indenyl), 7.40 (m, 2H, 5,6-H in indenyl of 2-(carbazol-9-yl)indenyl), 7.34 (m, 2H, 5,6-H in indenyl of 2-(pyrrol-1-yl)indenyl), 7.21-7.25 (m, 4H, 2,3,6,7-H in N-carbazolyl), 6.76 (t, J=2.1 Hz, 2H, 2,5-H in N-pyrrolyl), 6.24 (t, J=2.1 Hz, 2H, 3,4-H in N-pyrrolyl), 6.22 (s, 2H, 1,3-H in indenyl of 2-(carbazol-9-yl)indenyl), 5.77 (s, 2H, 1,3-H in indenyl of 2-(pyrrol-1-yl)indenyl).

Complex 36—($\eta^5$-2-(pyrrol-1-yl)indenyl)($\eta^5$-2-phenylindenyl)zirconium dibromide

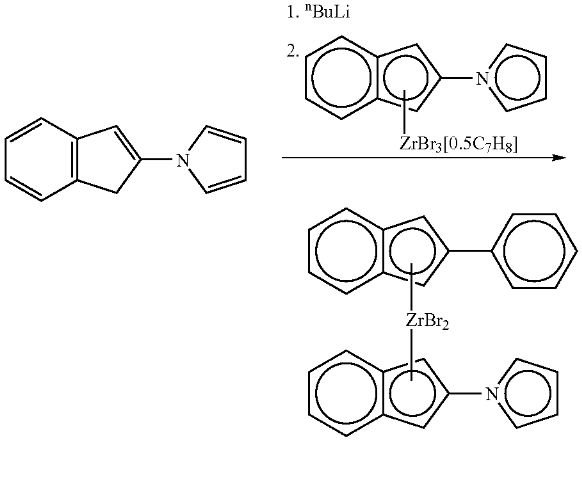

In a 20-ml vial in the Glove Box, to a solution of 362 mg (2 mmol) of 5 in 18 ml of ether, 0.8 ml of 2.5M solution of $^nBuLi$ (2 mmol) was added at room temperature. This mixture was stirred for 3 hours. In a separate round bottom flask (100 ml), to a suspension of 1.14 g (2 mmol) of ($\eta^5$-2-phenylindenyl)zirconium tribromide•$0.5C_7H_8$ in 20 ml of toluene, the above-obtained solution of the Li salt of 12 was added at −35° C. This mixture was additionally stirred for 30 min at this temperature and then overnight at room temperature. The resulting mixture was evaporated to dryness. The residue was extracted with 2×50 ml of hot (100° C.) toluene. The combined extract was evaporated to 7 ml. Crystals precipitated at −30° C. were collected, washed by 2×15 ml of hexanes, and dried in vacuum. Yield 447 mg (29%) of yellow crystals of 36.

Anal. calc. for $C_{28}H_{21}Br_2NZr$: C, 54.02; H, 3.40. Found: C, 54.20; H, 3.51.

$^1H$ NMR ($CD_2Cl_2$): δ 7.62-7.66 (m, 2H, 2,6-H in Ph), 7.47-7.52 (m, 2H, 3,5-H in Ph), 7.44 (m, 2H, 4,7-H in indenyl of 2-(pyrrol-1-yl)indenyl), 7.39-7.43 (m, 1H, 4-H in Ph), 7.35 (m, 2H, 5,6-H in indenyl of 2-(pyrrol-1-yl)indenyl), 7.20 (m, 2H, 4,7-H in indenyl of 2-phenylindenyl), 7.15 (m, 2H, 5,6-H in indenyl of 2-phenylindenyl), 6.76 (t, J=2.2 Hz, 2H, 2,5-H in N-pyrrolyl), 6.60 (s, 2H, 1,3-H in indenyl of 2-phenylindenyl), 6.24 (t, J=2.2 Hz, 2H, 3,4-H in N-pyrrolyl), 5.96 (s, 2H, 1,3-H in indenyl of 2-(pyrrol-1-yl) indenyl).

$^{13}C$ NMR ($CD_2Cl_2$): δ 141.4, 134.9, 134.3, 130.6, 130.5, 128.6, 128.5, 127.7, 127.3, 127.1, 124.4, 120.9, 112.9, 105.5, 96.0, 94.6.

Experimental—Polymerizations:

In the following experiments pressure is reported in atmospheres and pounds per square inch. The conversion factors to S.I. Units are; 1 psi equals 6.894757 kPa and 1 atm equals 101.325 kPa.

Transition metal compound (TMC) solutions were typically prepared using toluene (ExxonMobil Chemical—anhydrous, stored under $N_2$) (98%). Unless otherwise mentioned, TMC solutions are 0.2 mmol/L for $C_2$ and $C_2/C_8$ (co)polymerizations, and 0.6 mmol/L for $C_3$ and $C_3/C_2$ (co)polymerizations.

Solvents, polymerization grade toluene and hexanes were supplied by ExxonMobil Chemical Co. and thoroughly dried and degassed prior to use.

1-octene (98%) is purchased from Aldrich Chemical Company and dried by stirring over NaK overnight followed by filtration through basic alumina (Aldrich Chemical Company, Brockman Basic 1).

Polymerization grade ethylene was used and further purified by passing it through a series of columns: 500 cc Oxyclear cylinder from Labclear (Oakland, Calif.) followed by a 500 cc column packed with dried 3 Å mole sieves purchased from Aldrich Chemical Company, and a 500 cc column packed with dried 5 Å mole sieves purchased from Aldrich Chemical Company.

Polymerization grade propylene was used without further purification.

MAO (methylalumoxane, 10 wt % in toluene) was purchased from Albemarle Corporation and was used as a 1 wt % or 2 wt % in toluene solution. Micromoles of MAO reported in the experimental section are based on the micromoles of aluminum in MAO. The formula weight of MAO is 58.0 grams/mole. TiBAl (triisobutylaluminum, neat) was purchased from AKZO Nobel and was used as a 5 mmol/L solution in toluene. Dimethylanilinium tetrakis(perfluorophenyl)borate ([DMAH][B(pfp)$_4$], [$PhNMe_2H$][B($C_6F_5$)$_4$], A2) was purchased from Albemarle Corporation or Boulder Scientific Company and used without further purification.

Reactor Description and Preparation: Polymerizations were conducted in an inert atmosphere ($N_2$) drybox using autoclaves equipped with an external heater for temperature control, glass inserts (internal volume of reactor=23.5 mL for C2 and C2/C8 runs; 22.5 mL for C3 and C2/C3 runs), septum inlets, regulated supply of nitrogen, ethylene and propylene, and equipped with disposable PEEK mechanical stirrers (800 RPM). The autoclaves were prepared by purging with dry nitrogen at 110° C. or 115° C. for 5 hours and then at 25° C. for 5 hours.

Ethylene Polymerization or Ethylene/1-octene Copolymerization: The reactor was prepared as described above, and then purged with ethylene. Toluene, 1-octene when used, and activator (MAO or A2) were added via syringe at room temperature and atmospheric pressure. The reactor was then brought to process temperature (80° C.) and charged with ethylene to process pressure (75 psig=517.1 kPa) while stirring at 800 RPM. The transition metal compound "TMC" (0.02 μmol, unless indicated otherwise) was added via syringe with the reactor at process conditions. In cases where TiBAl (0.08 μmol, 5 mmol/L in toluene) was used (examples EO-41 through EO-56), it was added to the TMC first, and the resulting solution was then added to the reactor at process conditions. Amounts of reagents not specified above are given in Tables 2 and 4. Ethylene was allowed to enter (through the use of computer controlled solenoid valves) the autoclaves during polymerization to maintain reactor gauge pressure (+/−2 psig). Reactor temperature was monitored and typically maintained within +/−1° C. Polymerizations were halted by addition of approximately 50 psid $O_2$/Ar (5 mole % $O_2$) gas mixture to the autoclaves for approximately 30 seconds. The polymerizations were quenched after a predetermined cumulative amount of ethylene had been added or for a maximum of 20 minutes polymerization time. The final conversion (in psi) of ethylene added/consumed is reported in the Tables 2 and 4, in addition to the quench time for each run. The reactors were cooled and vented. The polymer was isolated after the solvent was removed in-vacuo. Yields reported include total weight of polymer and residual catalyst. Catalyst activity is reported as grams of polymer per mmol transition metal compound per atmosphere ethylene per hour of reaction time (g/mmol·hr·atm).

Propylene Polymerization: The reactor was prepared as described above, then heated to 40° C. and then purged with propylene gas at atmospheric pressure. Hexanes, MAO, and liquid propylene (1.066 mL, unless indicated otherwise in Table 6) were added via syringe. The reactor was then heated to process temperature (70° C.) while stirring at 800 RPM. The TMC was added via syringe with the reactor at process conditions. Amounts of reagents not specified above are given in Table 6. Reactor temperature was monitored and typically maintained within +/−1° C. Polymerizations were halted by addition of approximately 50 psid $O_2$/Ar (5 mole % $O_2$) gas mixture to the autoclaves for approximately 30 seconds. The polymerizations were quenched based on a predetermined pressure loss of approximately 5 psid. The quench time is reported in Table 6 for each run. The reactors were cooled and vented. The polymer was isolated after the solvent was removed in-vacuo. Yields reported include total weight of polymer and residual catalyst. Catalyst activity is reported as grams of polymer per mmol transition metal compound per hour of reaction time (g/mmol·hr).

Ethylene/Propylene Copolymerization: The reactor was prepared as described above, and then purged with ethylene. Reactors were heated to 40° C. and ethylene was then added to the reactor to a target pressure of 10 psig (single addition), followed by the addition of hexanes, MAO, and then liquid propylene (1.066 mL). All additions were made via syringe. The reactor was then heated to process temperature (70° C.) while stirring at 800 RPM. The TMC was added via syringe with the reactor at process conditions. Amounts of reagents not specified above are given in Table 8. Reactor temperature was monitored and typically maintained within +/−1° C. Polymerizations were halted by addition of approximately 50 psid $O_2$/Ar (5 mole % $O_2$) gas mixture to the autoclaves for approximately 30 seconds. The polymerizations were quenched based on a predetermined pressure loss of approximately 5 psid. The quench time is reported in Table 8 for each run. The reactors were cooled and vented. The polymer was isolated after the solvent was removed in-vacuo. Yields reported include total weight of polymer and residual catalyst. Catalyst activity is reported as grams of polymer per mmol transition metal compound per hour of reaction time (g/mmol·hr).

Polymer Characterization:

Polymer characterization results for polyethylene samples are reported in Table 3, for ethylene-1-octene copolymers are reported in Table 5, for polypropylene samples are reported in Table 7, and for ethylene-propylene copolymers are reported in Table 9.

For analytical testing, polymer sample solutions were prepared by dissolving polymer in 1,2,4-trichlorobenzene (TCB, 99+% purity from Sigma-Aldrich) containing 2,6-di-tert-butyl-4-methylphenol (BHT, 99% from Aldrich) at 160° C. in a shaker oven for approximately 3 hours. The typical concentration of polymer in solution is between 0.4 to 0.9 mg/mL with a BHT concentration of 1.25 mg BHT/mL of TCB. Samples are cooled to 135° C. for testing.

Molecular weights (weight average molecular weight (Mw) and number average molecular weight (Mn)) and molecular weight distribution (MWD=Mw/Mn), which is also sometimes referred to as the polydispersity (PDI) of the polymer, were measured by Gel Permeation Chromatography using a Symyx Technology GPC equipped with evaporative light scattering detector and calibrated using polystyrene standards (Polymer Laboratories: Polystyrene Calibration Kit S-M-10: Mp (peak Mw) between 5000 and 3,390,000). Samples were run in TCB at (135° C. sample temperatures, 160° C. oven/columns) using three Polymer Laboratories: PLgel 10 μm Mixed-B 300×7.5 mm columns in series. No column spreading corrections were employed. Numerical analyses were performed using Epoch® software available from Symyx Technologies.

The sample preparation for SAMMS (Sensory Array Modular Measurement System) thermal analysis measurements involved depositing the stabilized polymer solution onto a silanized wafer (Part Number S10457, Symyx). The solvent was then evaporated off at ~145° C. By this method, approximately between 0.12 and 0.24 mg of polymer is deposited onto each corresponding wafer cell. Thermal analysis was measured on a Symyx Technologies SAMMS instrument that measures polymer melt temperatures via the 3 ω technique. The analysis first employs a rapid-scan protocol that heats each cell from 27° C. to 200° C. in ~35 seconds and then rapidly cools the sample to room temperature. This complete procedure takes approximately 60 seconds per cell and is used to minimize each sample's thermal history. The second step involves running a high-resolution scan protocol to measure the second melt of the sample. The protocol heats each cell from 27° C. to 200° C. in ~3 minutes and then rapidly cools the sample to room temperature. The high-resolution scan takes approximately three times the amount of time to complete as the rapid-scan protocol. If multiple melting peaks are present, Epoch® Software reports the largest amplitude peak. SAMMS data is reported under the heading of Tm (° C.) in Tables 3 and 5.

For propylene homopolymers, the thermal analysis was performed using a 1290 TA Instruments Differential Scanning Calorimeter (DSC) by first heating the sample from 25° C. to 220° C. at 10° C./min, holding the temperature at 220° C. for 5 minutes, then cooling at 10° C./min from 220° C. to 25° C., and finally again heating to 220° C. at 10° C./min. The second heat results have been reported under the heading of DSC (° C.) in Table 7. A value of zero indicates that the polymer had no melting point. Multiple numbers indicate a polymer with more than one melting point.

Samples for infrared analysis were prepared by depositing the stabilized polymer solution onto a silanized wafer (Part number S10860, Symyx). By this method, approximately between 0.12 and 0.24 mg of polymer is deposited on the wafer cell. The samples were subsequently analyzed on a Brucker Equinox 55 FTIR spectrometer equipped with Pikes's MappIR specular reflectance sample accessory. Spectra, covering a spectral range of 5000 $cm^{-1}$ to 500 $cm^{-1}$, were collected at a 2 $cm^{-1}$ resolution with 32 scans.

For ethylene-1-octene copolymers, the wt. % copolymer is determined via measurement of the methyl deformation band at ~1375 $cm^{-1}$. The peak height of this band is normalized by the combination and overtone band at ~4321 $cm^{-1}$, which corrects for path length differences. The normalized peak height is correlated to individual calibration curves from $^1$H NMR data to predict the wt. % copolymer content within a concentration range of ~2 to 35 wt. % for octene. Typically, $R^2$ correlations of 0.98 or greater are achieved. These numbers are reported in Table 5 under the heading, Octene wt %).

For ethylene-propylene copolymers, the wt. % ethylene is determined via measurement of the methylene rocking band (~770 $cm^{-1}$ to 700 $cm^{-1}$). The peak area of this band is normalized by sum of the band areas of the combination and overtone bands in the 4500 $cm^{-1}$ to 4000 $cm^{-1}$ range. The normalized band area is then correlated to a calibration curved from $^{13}$C NMR data to predict the wt. % ethylene within a concentration range of ~5 to 40 wt. %. Typically, $R^2$ correlations of 0.98 or greater are achieved. These numbers are reported in Table 9 under the heading, Ethylene (wt %).

For propylene homo-polymers, an infrared spectroscopy-based partial least-squares (PLS) model was developed for predicting an IR tacticity index, reported as an estimated Tm, for isotactic polypropylene (iPP). The model was built using PLSplus/IQ add-on application to the Grams/AI (Version 7.00) software from ThermoGalactic. The model is based on a training set consisting of IR spectra of iPP samples with known Tm values spanning a range of ~100° C. to ~166° C. The iPPs were prepared in lab and commercial reactors using metallocene and Ziegler-Natta catalyst systems. Their average Mw ranged from 157 k to 436 k. Their IR spectra were collected from solution cast films supported on gold-coated silicon wafers via a Bruker Equinox 55 FTIR spectrometer with a Pike MappIR specular reflectance sample accessory. Each sample was prepared and cast in triplicate. Briefly, before model development, each spectra was baseline-corrected with a cubic function fit, mean-centered, and path length-corrected using the ~1165/1155 $cm^{-1}$ band. Then the optimum number of PLS factors to include in the final model was determined using leave-one-out cross validation analysis and the selected spectral region of 1364 $cm^{-1}$ to 764 $cm^{-1}$. This resulted in a model with 7 factors and standard error of prediction of 3 C. These calculated Tm's are reported in Table 7 under the heading, FTIR Crystallinity Index (° C.). Values reported under 100° C., are outside the calibration range of the model.

TABLE 2

Ethylene Polymerization Runs - Part 1.

| Ex # | TMC | MAO* (μmol) | Total Toluene (mL) | Final Conversion (psi) | Quench Time (sec) | Polymer Yield (g) | Activity (g/mmol · atm · hr) |
|---|---|---|---|---|---|---|---|
| PE-1 | 13 | 9.98 | 3.80 | 20.1 | 514.8 | 0.0700 | 4,797 |
| PE-2 | 13 | 9.98 | 3.80 | 20.1 | 1060.9 | 0.0800 | 2,660 |
| PE-3 | 13 | 9.98 | 3.80 | 20.1 | 520.3 | 0.0628 | 4,258 |
| PE-4 | 13 | 9.98 | 3.80 | 20.1 | 446.5 | 0.0679 | 5,365 |
| PE-5 | 20 | 9.98 | 3.80 | 18.8 | 1200.6 | 0.0032 | 94 |
| PE-6 | 20 | 9.98 | 3.80 | 5.0 | 1200.3 | 0.0032 | 94 |
| PE-7 | 20 | 9.98 | 3.80 | 2.7 | 1201.0 | 0.0043 | 126 |
| PE-8 | 20 | 9.98 | 3.80 | 6.9 | 1201.2 | 0.0060 | 176 |
| PE-9 | 15 | 9.98 | 3.80 | 11.4 | 1201.0 | 0.0175 | 514 |
| PE-10 | 15 | 9.98 | 3.80 | 12.5 | 1201.8 | 0.0158 | 464 |
| PE-11 | 15 | 9.98 | 3.80 | 12.1 | 1201.1 | 0.0156 | 458 |
| PE-12 | 15 | 9.98 | 3.80 | 12.8 | 1200.2 | 0.0152 | 447 |
| PE-13 | 14 | 9.98 | 3.80 | 22.4 | 1200.4 | 0.0400 | 1,176 |
| PE-14 | 14 | 9.98 | 3.80 | 20.9 | 1200.9 | 0.0390 | 1,146 |
| PE-15 | 14 | 9.98 | 3.80 | 25.0 | 1150.4 | 0.0360 | 1,104 |
| PE-16 | 14 | 9.98 | 3.80 | 25.0 | 1152.0 | 0.0610 | 1,868 |
| PE-17 | 16 | 9.98 | 3.80 | 2.7 | 1200.6 | 0.0050 | 147 |
| PE-18 | 16 | 9.98 | 3.80 | 2.9 | 1200.6 | 0.0080 | 235 |
| PE-19# | 16 | 9.98 | 3.80 | — | — | — | — |
| PE-20 | 16 | 9.98 | 3.80 | 5.0 | 1200.0 | 0.0080 | 235 |
| PE-21 | 17 | 9.98 | 3.80 | 5.8 | 1201.1 | 0.0030 | 88 |
| PE-22 | 17 | 9.98 | 3.80 | 3.2 | 1200.2 | 0.0030 | 88 |
| PE-23 | 17 | 9.98 | 3.80 | 4.9 | 1200.8 | 0.0030 | 88 |

TABLE 2-continued

Ethylene Polymerization Runs - Part 1.

| Ex # | TMC | MAO* (μmol) | Total Toluene (mL) | Final Conversion (psi) | Quench Time (sec) | Polymer Yield (g) | Activity (g/mmol · atm · hr) |
|---|---|---|---|---|---|---|---|
| PE-24 | 17 | 9.98 | 3.80 | 2.7 | 1200.5 | 0.0030 | 88 |
| PE-25 | 17 | 10.00 | 5.00 | 9.0 | 1200.9 | 0.0279 | 820 |
| PE-26 | 17 | 10.00 | 5.00 | 5.2 | 1200.9 | 0.0046 | 135 |
| PE-27 | 17 | 10.00 | 5.00 | 4.6 | 1200.6 | 0.0053 | 156 |
| PE-28 | 17 | 10.00 | 5.00 | 5.6 | 1200.9 | 0.0049 | 144 |
| PE-29 | 19 | 9.98 | 3.80 | 6.0 | 1200.7 | 0.0060 | 176 |
| PE-30 | 19 | 9.98 | 3.80 | 6.4 | 1200.6 | 0.0200 | 588 |
| PE-31 | 19 | 9.98 | 3.80 | 6.0 | 1200.5 | 0.0170 | 500 |
| PE-32 | 19 | 9.98 | 3.80 | 6.3 | 1200.9 | 0.0180 | 529 |
| PE-33 | 25 | 10.00 | 5.00 | 20.1 | 180.3 | 0.0830 | 16,244 |
| PE-34 | 25 | 10.00 | 5.00 | 20.1 | 196.6 | 0.0856 | 15,363 |
| PE-35 | 25 | 10.00 | 5.00 | 20.1 | 167.1 | 0.0864 | 18,244 |
| PE-36 | 25 | 10.00 | 5.00 | 20.1 | 224.7 | 0.0847 | 13,298 |
| PE-37 | 23 | 10.00 | 5.00 | 20.1 | 186.3 | 0.0644 | 12,198 |
| PE-38 | 23 | 10.00 | 5.00 | 20.3 | 232.2 | 0.0686 | 10,422 |
| PE-39 | 23 | 10.00 | 5.00 | 20.1 | 184.5 | 0.0642 | 12,276 |
| PE-40 | 23 | 10.00 | 5.00 | 20.3 | 182.7 | 0.0646 | 12,473 |

*Micromoles of Al in MAO;
#Reactor disabled before catalyst injection.

TABLE 3

Ethylene Polymerization Runs - Part 2.

| Ex # | TMC | Mw | Mn | PDI | Tm (° C.) |
|---|---|---|---|---|---|
| PE-1 | 13 | 557,291 | 184,578 | 3.0 | 136.3 |
| PE-2 | 13 | 478,470 | 113,795 | 4.2 | 138.4 |
| PE-3 | 13 | 753,037 | 467,790 | 1.6 | 137.1 |
| PE-4 | 13 | 790,149 | 343,209 | 2.3 | 134.7 |
| PE-5 | 20 | — | — | — | — |
| PE-6 | 20 | — | — | — | — |
| PE-7 | 20 | — | — | — | — |
| PE-8 | 20 | — | — | — | — |
| PE-9 | 15 | 770,007 | 272,322 | 2.8 | 138.8 |
| PE-10 | 15 | 758,872 | 143,829 | 5.3 | 136.4 |
| PE-11 | 15 | 818,697 | 486,057 | 1.7 | 137.2 |
| PE-12 | 15 | 819,620 | 264,559 | 3.1 | 139.6 |
| PE-13 | 14 | 1,409,935 | 892,972 | 1.6 | 136.6 |
| PE-14 | 14 | 1,514,803 | 978,480 | 1.5 | 136.6 |
| PE-15 | 14 | 1,537,822 | 980,023 | 1.6 | 136.9 |
| PE-16 | 14 | 1,558,486 | 990,252 | 1.6 | 137.4 |
| PE-17 | 16 | — | — | — | — |
| PE-18 | 16 | — | — | — | — |
| PE-19 | 16 | — | — | — | — |
| PE-20 | 16 | — | — | — | — |
| PE-21 | 17 | — | — | — | — |
| PE-22 | 17 | — | — | — | — |
| PE-23 | 17 | — | — | — | — |
| PE-24 | 17 | — | — | — | — |
| PE-25 | 17 | 1,233,454 | 470,125 | 2.6 | — |
| PE-26 | 17 | — | — | — | — |
| PE-27 | 17 | — | — | — | — |
| PE-28 | 17 | — | — | — | — |
| PE-29 | 19 | — | — | — | — |
| PE-30 | 19 | 1,628,237 | 820,134 | 2.0 | 137.3 |
| PE-31 | 19 | 1,731,924 | 792,607 | 2.2 | 139.6 |
| PE-32 | 19 | 1,708,550 | 808,108 | 2.1 | 138.9 |
| PE-33 | 25 | 850,364 | 400,368 | 2.1 | — |
| PE-34 | 25 | 824,676 | 381,851 | 2.2 | — |
| PE-35 | 25 | 879,485 | 430,903 | 2.0 | — |
| PE-36 | 25 | 889,225 | 408,696 | 2.2 | — |
| PE-37 | 23 | 2,024,290 | 1,290,239 | 1.6 | — |
| PE-38 | 23 | 1,797,395 | 730,129 | 2.5 | — |
| PE-39 | 23 | 1,759,494 | 714,754 | 2.5 | — |
| PE-40 | 23 | 1,878,412 | 786,010 | 2.4 | — |

TABLE 4

Ethylene-1-Octene Polymerization Runs - Part 1.

| Ex # | TMC | Activator | Activator* (μmol) | 1-Octene (μmol) | Total Toluene (mL) | Final Conversion (psi) | Quench Time (sec) | Polymer Yield (g) | Activity (g/mmol · atm · hr) |
|---|---|---|---|---|---|---|---|---|---|
| EO-1 | 13 | MAO | 9.98 | 638.1 | 3.80 | 20.1 | 204.3 | 0.0480 | 8,287 |
| EO-2 | 13 | MAO | 9.98 | 638.1 | 3.80 | 20.1 | 403.3 | 0.0530 | 4,637 |
| EO-3 | 13 | MAO | 9.98 | 638.1 | 3.80 | 20.1 | 349.6 | 0.0464 | 4,683 |
| EO-4 | 13 | MAO | 9.98 | 638.1 | 3.80 | 20.1 | 504.4 | 0.0428 | 2,994 |
| EO-5 | 20 | MAO | 9.98 | 638.1 | 3.80 | 6.6 | 1200.0 | 0.0041 | 121 |
| EO-6 | 20 | MAO | 9.98 | 638.1 | 3.80 | 5.5 | 1201.1 | 0.0037 | 109 |
| EO-7 | 20 | MAO | 9.98 | 638.1 | 3.80 | 25.0 | 243.5 | 0.0009 | 130 |
| EO-8 | 20 | MAO | 9.98 | 638.1 | 3.80 | 3.1 | 1201.2 | 0.0027 | 79 |
| EO-9 | 15 | MAO | 9.98 | 638.1 | 3.80 | 6.3 | 1200.8 | 0.0055 | 162 |
| EO-10 | 15 | MAO | 9.98 | 638.1 | 3.80 | 14.0 | 1200.6 | 0.0060 | 176 |
| EO-11 | 15 | MAO | 9.98 | 638.1 | 3.80 | 6.4 | 1201.3 | 0.0055 | 162 |
| EO-12 | 15 | MAO | 9.98 | 638.1 | 3.80 | 10.1 | 1200.9 | 0.0050 | 147 |
| EO-13 | 14 | MAO | 9.98 | 638.1 | 3.80 | 14.3 | 1200.4 | 0.0250 | 735 |
| EO-14 | 14 | MAO | 9.98 | 638.1 | 3.80 | 17.2 | 1200.6 | 0.0240 | 705 |
| EO-15 | 14 | MAO | 9.98 | 638.1 | 3.80 | 12.8 | 1200.1 | 0.0250 | 735 |
| EO-16 | 14 | MAO | 9.98 | 638.1 | 3.80 | 18.8 | 1201.1 | 0.0580 | 1,704 |
| EO-17 | 16 | MAO | 9.98 | 638.1 | 3.80 | 2.6 | 1200.8 | 0.0020 | 59 |
| EO-18 | 16 | MAO | 9.98 | 638.1 | 3.80 | 5.5 | 1200.6 | 0.0060 | 176 |
| EO-19 | 16 | MAO | 9.98 | 638.1 | 3.80 | 5.3 | 1201.0 | 0.0050 | 147 |
| EO-20 | 16 | MAO | 9.98 | 638.1 | 3.80 | 2.9 | 1200.9 | 0.0050 | 147 |
| EO-21 | 17 | MAO | 9.98 | 638.1 | 3.80 | 15.1 | 1200.3 | 0.0570 | 1,675 |
| EO-22 | 17 | MAO | 9.98 | 638.1 | 3.80 | 13.6 | 1201.3 | 0.0560 | 1,645 |
| EO-23 | 17 | MAO | 9.98 | 638.1 | 3.80 | 3.5 | 1201.8 | 0.0020 | 59 |
| EO-24 | 17 | MAO | 9.98 | 638.1 | 3.80 | 5.3 | 1200.8 | 0.0030 | 88 |
| EO-25 | 17 | MAO | 10.00 | 637.1 | 4.90 | 6.0 | 1201.0 | 0.0095 | 279 |
| EO-26 | 17 | MAO | 10.00 | 637.1 | 4.90 | 5.0 | 1200.9 | 0.0040 | 118 |
| EO-27 | 17 | MAO | 10.00 | 637.1 | 4.90 | 5.3 | 1201.0 | 0.0031 | 91 |
| EO-28 | 17 | MAO | 10.00 | 637.1 | 4.90 | 6.0 | 1200.8 | 0.0035 | 103 |
| EO-29 | 19 | MAO | 9.98 | 638.1 | 3.80 | 3.7 | 1200.3 | 0.0050 | 147 |
| EO-30 | 19 | MAO | 9.98 | 638.1 | 3.80 | 6.0 | 1201.0 | 0.0100 | 294 |
| EO-31 | 19 | MAO | 9.98 | 638.1 | 3.80 | 6.0 | 1201.0 | 0.0120 | 353 |
| EO-32 | 19 | MAO | 9.98 | 638.1 | 3.80 | 6.9 | 1200.4 | 0.0070 | 206 |
| EO-33 | 25 | MAO | 10.00 | 637.1 | 4.90 | 20.3 | 75.3 | 0.0798 | 37,408 |
| EO-34 | 25 | MAO | 10.00 | 637.1 | 4.90 | 20.1 | 99.0 | 0.0852 | 30,374 |
| EO-35 | 25 | MAO | 10.00 | 637.1 | 4.90 | 20.1 | 85.5 | 0.0815 | 33,626 |
| EO-36 | 25 | MAO | 10.00 | 637.1 | 4.90 | 20.1 | 145.1 | 0.0906 | 22,035 |
| EO-37 | 23 | MAO | 10.00 | 637.1 | 4.90 | 20.1 | 180.4 | 0.0370 | 7,237 |
| EO-38 | 23 | MAO | 10.00 | 637.1 | 4.90 | 20.1 | 159.3 | 0.0397 | 8,792 |
| EO-39 | 23 | MAO | 10.00 | 637.1 | 4.90 | 20.1 | 199.3 | 0.0376 | 6,658 |
| EO-40 | 23 | MAO | 10.00 | 637.1 | 4.90 | 20.1 | 268.6 | 0.0385 | 5,056 |
| EO-41 | 13 | A2 | 0.02 | 637.1 | 4.90 | 4.7 | 1201.0 | 0.0010 | 29 |
| EO-42 | 13 | A2 | 0.02 | 637.1 | 4.90 | 20.1 | 725.6 | 0.0281 | 1,366 |
| EO-43 | 13 | A2 | 0.02 | 637.1 | 4.90 | 20.1 | 321.0 | 0.0298 | 3,275 |
| EO-44 | 13 | A2 | 0.02 | 637.1 | 4.90 | 20.1 | 721.5 | 0.0268 | 1,310 |
| EO-45 | 14 | A2 | 0.02 | 637.1 | 4.90 | 5.0 | 1201.0 | 0.0025 | 73 |
| EO-46 | 14 | A2 | 0.02 | 637.1 | 4.90 | 4.4 | 1200.3 | 0.0005 | 15 |
| EO-47 | 14 | A2 | 0.02 | 637.1 | 4.90 | 6.9 | 1200.6 | 0.0062 | 182 |
| EO-48 | 14 | A2 | 0.02 | 637.1 | 4.90 | 8.4 | 1200.1 | 0.0071 | 209 |
| EO-49 | 25 | A2 | 0.02 | 637.1 | 4.90 | 7.0 | 1200.2 | 0.0017 | 50 |
| EO-50 | 25 | A2 | 0.02 | 637.1 | 4.90 | 20.1 | 291.1 | 0.0307 | 3,720 |
| EO-51 | 25 | A2 | 0.02 | 637.1 | 4.90 | 20.1 | 215.8 | 0.0377 | 6,163 |
| EO-52 | 25 | A2 | 0.02 | 637.1 | 4.90 | 20.1 | 781.6 | 0.0277 | 1,250 |
| EO-53 | 23 | A2 | 0.02 | 637.1 | 4.90 | 5.0 | 1200.5 | 0.0005 | 15 |
| EO-54 | 23 | A2 | 0.02 | 637.1 | 4.90 | 20.1 | 978.5 | 0.0238 | 858 |
| EO-55 | 23 | A2 | 0.02 | 637.1 | 4.90 | 13.0 | 1200.9 | 0.0114 | 335 |
| EO-56 | 23 | A2 | 0.02 | 637.1 | 4.90 | 11.9 | 1200.7 | 0.0113 | 332 |

*For experiments using MAO as the activator, micromoles refers to the micromoles of Al in MAO.

TABLE 5

Ethylene-1-Octene Polymerization Runs - Part 2.

| Ex # | TMC | Mw | Mn | PDI | Octene (wt %) | Tm (° C.) |
|---|---|---|---|---|---|---|
| EO-1 | 13 | 402,055 | 187,712 | 2.1 | 6.9 | 115.2 |
| EO-2 | 13 | 284,023 | 136,432 | 2.1 | 9.0 | 118.8 |
| EO-3 | 13 | 466,528 | 165,845 | 2.8 | 5.8 | 117.9 |
| EO-4 | 13 | 457,414 | 132,290 | 3.5 | 5.6 | 119.9 |
| EO-5 | 20 | — | — | — | — | — |
| EO-6 | 20 | — | — | — | — | — |
| EO-7 | 20 | — | — | — | — | — |
| EO-8 | 20 | — | — | — | — | — |
| EO-9 | 15 | — | — | — | — | — |
| EO-10 | 15 | — | — | — | — | — |
| EO-11 | 15 | — | — | — | — | — |
| EO-12 | 15 | — | — | — | — | — |
| EO-13 | 14 | 644,951 | 34,365 | 18.8 | 4.0 | 125.9 |
| EO-14 | 14 | 1,277,533 | 1,257,567 | 1.0 | 4.5 | 123.7 |
| EO-15 | 14 | 467,598 | 24,896 | 18.8 | 3.8 | 127.9 |
| EO-16 | 14 | 1,309,765 | 832,031 | 1.6 | 3.3 | 124.4 |
| EO-17 | 16 | — | — | — | — | — |
| EO-18 | 16 | — | — | — | — | — |
| EO-19 | 16 | — | — | — | — | — |
| EO-20 | 16 | — | — | — | — | — |
| EO-21 | 17 | 1,033,293 | 650,135 | 1.6 | 3.0 | 129.2 |
| EO-22 | 17 | 1,161,741 | 742,459 | 1.6 | 3.1 | 124.8 |
| EO-23 | 17 | — | — | — | — | — |
| EO-24 | 17 | — | — | — | — | — |
| EO-25 | 17 | — | — | — | — | — |
| EO-26 | 17 | — | — | — | — | — |
| EO-27 | 17 | — | — | — | — | — |
| EO-28 | 17 | — | — | — | — | — |
| EO-29 | 19 | — | — | — | — | — |
| EO-30 | 19 | — | — | — | — | — |
| EO-31 | 19 | — | — | — | — | — |
| EO-32 | 19 | — | — | — | — | — |
| EO-33 | 25 | 592,289 | 287,790 | 2.1 | 2.7 | — |

TABLE 5-continued

Ethylene-1-Octene Polymerization Runs - Part 2.

| Ex # | TMC | Mw | Mn | PDI | Octene (wt %) | Tm (° C.) |
|---|---|---|---|---|---|---|
| EO-34 | 25 | 608,419 | 275,857 | 2.2 | 2.9 | — |
| EO-35 | 25 | 654,801 | 338,526 | 1.9 | 2.6 | — |
| EO-36 | 25 | 590,291 | 258,752 | 2.3 | 2.4 | — |
| EO-37 | 23 | 331,175 | 169,108 | 2.0 | 4.7 | — |
| EO-38 | 23 | 348,014 | 175,600 | 2.0 | 4.7 | — |
| EO-39 | 23 | 313,487 | 163,742 | 1.9 | 4.6 | — |
| EO-40 | 23 | 340,317 | 178,702 | 1.9 | 4.4 | — |
| EO-41 | 13 | — | — | — | — | — |
| EO-42 | 13 | 519,261 | 229,535 | 2.3 | 4.9 | — |
| EO-43 | 13 | 459,495 | 201,936 | 2.3 | 5.3 | — |
| EO-44 | 13 | 531,055 | 238,962 | 2.2 | 5.0 | — |
| EO-45 | 14 | — | — | — | — | — |
| EO-46 | 14 | — | — | — | — | — |
| EO-47 | 14 | — | — | — | — | — |
| EO-48 | 14 | — | — | — | — | — |
| EO-49 | 25 | — | — | — | — | — |
| EO-50 | 25 | 1,408,696 | 807,536 | 1.7 | 1.4 | — |
| EO-51 | 25 | 1,225,156 | 699,864 | 1.8 | 1.6 | — |
| EO-52 | 25 | 1,558,882 | 893,182 | 1.7 | 1.5 | — |
| EO-53 | 23 | — | — | — | — | — |
| EO-54 | 23 | 519,927 | 120,131 | 4.3 | 3.6 | — |
| EO-55 | 23 | — | — | — | — | — |
| EO-56 | 23 | — | — | — | — | — |

TABLE 6

Propylene Polymerization Runs - Part 1.

| Ex# | TMC | TMC (μmol) | MAO* (μmol) | Total Hexane (μL) | Total Toluene (μL) | Quench Time (sec) | Polymer Yield (g) | Activity (g/mmol · hr) |
|---|---|---|---|---|---|---|---|---|
| PP-1 | 25 | 0.08 | 40 | 3733 | 399 | 901.17 | 0.0098 | 489 |
| PP-2 | 25 | 0.08 | 40 | 3733 | 399 | 900.08 | 0.0083 | 415 |
| PP-3 | 25 | 0.10 | 50 | 3633 | 499 | 900.73 | 0.0104 | 416 |
| PP-4 | 25 | 0.10 | 50 | 3633 | 499 | 900.84 | 0.0134 | 536 |
| PP-5 | 13 | 0.08 | 40 | 3733 | 399 | 901.15 | 0.0178 | 889 |
| PP-6 | 13 | 0.08 | 40 | 3733 | 399 | 901.49 | 0.0157 | 784 |
| PP-7 | 13 | 0.10 | 50 | 3633 | 499 | 900.11 | 0.0233 | 932 |
| PP-8 | 13 | 0.10 | 50 | 3633 | 499 | 900.27 | 0.0214 | 856 |
| PP-9 | 14 | 0.08 | 40 | 3733 | 399 | 901.23 | 0.0036 | 180 |
| PP-10 | 14 | 0.08 | 40 | 3733 | 399 | 900.09 | 0.0037 | 185 |
| PP-11 | 14 | 0.10 | 50 | 3633 | 499 | 901.48 | 0.0049 | 196 |
| PP-12 | 14 | 0.10 | 50 | 3633 | 499 | 900.87 | 0.0046 | 184 |
| PP-13 | 23 | 0.08 | 40 | 3733 | 399 | 900.83 | 0.0128 | 639 |
| PP-14 | 23 | 0.08 | 40 | 3733 | 399 | 900.29 | 0.0133 | 665 |
| PP-15 | 23 | 0.10 | 50 | 3633 | 499 | 901.05 | 0.0159 | 635 |
| PP-16 | 23 | 0.10 | 50 | 3633 | 499 | 900.38 | 0.015 | 600 |

*Micromoles of Al in MAO.

TABLE 7

Propylene Polymerization Runs - Part 2.

| Ex# | TMC | Mw | Mn | PDI | FTIR Crystallinity Index (° C.) | DSC (° C.) |
|---|---|---|---|---|---|---|
| PP-1 | 25 | — | — | — | — | — |
| PP-2 | 25 | — | — | — | — | — |
| PP-3 | 25 | 0 | 0 | 0.00 | 91.4* | — |
| PP-4 | 25 | 0 | 0 | 0.00 | 88.1* | 0 |
| PP-5 | 13 | 10,347 | 5,363 | 1.93 | — | 0 |
| PP-6 | 13 | 10,387 | 5,305 | 1.96 | — | — |
| PP-7 | 13 | 11,424 | 5,693 | 2.01 | — | 0 |
| PP-8 | 13 | 10,215 | 5,148 | 1.98 | — | — |
| PP-9 | 14 | — | — | — | — | — |
| PP-10 | 14 | — | — | — | — | — |
| PP-11 | 14 | — | — | — | — | — |
| PP-12 | 14 | — | — | — | — | — |
| PP-13 | 23 | — | — | — | — | — |
| PP-14 | 23 | 3,234 | 2,420 | 1.34 | — | — |
| PP-15 | 23 | 3,033 | 2,258 | 1.34 | — | 0 |
| PP-16 | 23 | 3,099 | 2,321 | 1.33 | — | — |

*Values reported under 100° C. are outside of the calibration range of the model.

TABLE 8

Ethylene/Propylene Copolymerization Runs - Part 1.

| Ex# | TMC | TMC (μmol) | MAO* (μmol) | Total Hexane (ml) | Total Toluene (ml) | Final Conversion (psi) | Quench Time (sec) | Yield (g) | Activity (g/mmol · hr) |
|---|---|---|---|---|---|---|---|---|---|
| EP-1 | 25 | 0.08 | 40 | 3.767 | 0.265 | 5.0 | 66.7 | 0.0338 | 22,797 |
| EP-2 | 25 | 0.08 | 40 | 3.767 | 0.265 | 5.0 | 135.3 | 0.0288 | 9,582 |
| EP-3 | 25 | 0.10 | 50 | 3.700 | 0.331 | 5.0 | 51.8 | 0.0354 | 24,612 |
| EP-4 | 25 | 0.10 | 50 | 3.700 | 0.331 | 5.0 | 59.5 | 0.0364 | 22,016 |
| EP-5 | 13 | 0.08 | 40 | 3.767 | 0.265 | 5.0 | 314.7 | 0.0398 | 5,692 |
| EP-6 | 13 | 0.08 | 40 | 3.767 | 0.265 | 5.0 | 348.4 | 0.0396 | 5,114 |
| EP-7 | 13 | 0.10 | 50 | 3.700 | 0.331 | 5.0 | 258.4 | 0.044 | 6,130 |
| EP-8 | 13 | 0.10 | 50 | 3.700 | 0.331 | 5.0 | 279.7 | 0.0404 | 5,199 |
| EP-9 | 14 | 0.08 | 40 | 3.767 | 0.265 | 1.7 | 901.1 | 0.0146 | 729 |
| EP-10 | 14 | 0.08 | 40 | 3.767 | 0.265 | 1.7 | 901.4 | 0.0137 | 684 |
| EP-11 | 14 | 0.10 | 50 | 3.700 | 0.331 | 2.1 | 900.5 | 0.0141 | 564 |
| EP-12 | 14 | 0.10 | 50 | 3.700 | 0.331 | 1.5 | 900.6 | 0.0159 | 636 |
| EP-13 | 23 | 0.08 | 40 | 3.767 | 0.265 | 4.9 | 901.4 | 0.0285 | 1,423 |
| EP-14 | 23 | 0.08 | 40 | 3.767 | 0.265 | 5.0 | 883.1 | 0.0299 | 1,524 |
| EP-15 | 23 | 0.10 | 50 | 3.700 | 0.331 | 5.0 | 770.4 | 0.0309 | 1,444 |
| EP-16 | 23 | 0.10 | 50 | 3.700 | 0.331 | 5.0 | 742.5 | 0.0269 | 1,304 |

*Micromoles of Al in MAO.

TABLE 9

Ethylene/Propylene Copolymerization Runs - Part 2.

| Ex# | TMC | Mw | Mn | PDI | Comonomer Incorporation (wt %) |
|---|---|---|---|---|---|
| EP-1 | 25 | 16,107 | 6,629 | 2.4 | 33.9 |
| EP-2 | 25 | 8,091 | 3,655 | 2.2 | 53.7* |
| EP-3 | 25 | 16,520 | 6,573 | 2.5 | 36.7 |
| EP-4 | 25 | 15,280 | 5,806 | 2.6 | 33.2 |
| EP-5 | 13 | 23,574 | 9,137 | 2.6 | 28.7 |
| EP-6 | 13 | 26,052 | 9,499 | 2.7 | 24.1 |
| EP-7 | 13 | 27,407 | 9,521 | 2.9 | 29.3 |
| EP-8 | 13 | 27,691 | 8,737 | 3.2 | 27.0 |
| EP-9 | 14 | — | — | — | — |
| EP-10 | 14 | — | — | — | — |
| EP-11 | 14 | — | — | — | — |
| EP-12 | 14 | 160,534 | 51,127 | 3.1 | 32.6 |
| EP-13 | 23 | 6,018 | 3,404 | 1.8 | 32.4 |

TABLE 9-continued

Ethylene/Propylene Copolymerization Runs - Part 2.

| Ex# | TMC | Mw | Mn | PDI | Comonomer Incorporation (wt %) |
|---|---|---|---|---|---|
| EP-14 | 23 | 6,984 | 3,754 | 1.9 | 31.4 |
| EP-15 | 23 | 6,157 | 3,441 | 1.8 | 28.6 |
| EP-16 | 23 | 6,156 | 3,494 | 1.8 | 28.8 |

*Outside FTIR calibration range of 5.14 to 38.79 wt % ethylene.

While certain representative embodiments and details have been shown to illustrate the invention, it will be apparent to skilled artisans that various process and product changes from those disclosed in this application may be made without departing from this invention's scope, which the appended claims define.

All cited patents, test procedures, priority documents, and other cited documents are fully incorporated by reference to the extent that this material is consistent with this specification and for all jurisdictions in which such incorporation is permitted.

Certain features of the present invention are described in terms of a set of numerical upper limits and a set of numerical lower limits. This specification discloses all ranges formed by any combination of these limits. All combinations of these limits are within the scope of the invention unless otherwise indicated.

The invention claimed is:

1. A composition represented by the formula:

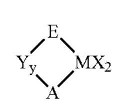

wherein M is a group 3, 4, 5 or 6 transition metal atom, or a lanthanide metal atom, or actinide metal atom;

E is an indenyl ligand that is substituted in any position of the indenyl ligand with at least one aromatic heterocyclic substituent or psuedoaromatic heterocyclic substituent, $Hc_z$ that is bonded to the indenyl ring through a nitrogen or phosphorous ring heteroatom wherein z represents the number of Hc substituents bonded to the indenyl ring and is 1, 2, 3, or 4, wherein the aromatic heterocyclic substituent or psuedoaromatic heterocyclic substituent Hc is selected from the group consisting of:

methylpyrrol-1-yl, dimethylpyrrol-1-yl, triinethylpyrrol-1-yl, tetramethylpyrrol-1-yl, ethylpyrrol-1-yl, diethylpyrrol-1-yl, triethylpyrrol-1-yl, tetraethylpyrrol-1-yl, propylpyrrol-1-yl, dipropylpyrrol-1-yl, tripropylpyrrol-1-yl, tetrapropylpyrrol-1-yl, butylpyrrol-1-yl, dibutylpyrrol-1-yl, tributylpyrrol-1-yl, tetrabutylpyrrol-1-yl, pentylpyrrol-1-yl, dipentylpyrrol-1-yl, tripentylpyrrol-1-yl, tetrapentylpyrrol-1-yl, hexylpyrrol-1-yl, dihexylpyrrol-1-yl, trihexylpyrrol-1-yl, tetrahexylpyrrol-1-yl, heptylpyrrol-1-yl, diheptylpyrrol-1-yl, triheptylpyrrol-1-yl, tetraoctylpyrrol-1-yl, nonylpyrrol-1-yl, dinonylpyrrol-1-yl, trinonylpyrrol-1-yl, tetranonylpyrrol-1-yl, decylpyrrol-1-yl, didecylpyrrol-1-yl, tridecylpyrrol-1-yl, tetradecylpyrrol-1-yl, undecylpyrrol-1-yl, diundecylpyrrol-1-yl, dodecenylpyrrol-1-yl, didodecenylpyrrol-1-yl, tridecenylpyrrol-1-yl, ditridecenylpyrrol-1-yl, tetradecenylpyrrol-1-yl, ditetradecenylpyrrol-1-yl, pentadecenylpyrrol-1-yl, dipentadecenylpyrrol-1-yl, hexadecenylpyrrol-1-yl, dihexadecenylpyrrol-1-yl, heptadecenylpyrrol-1-yl, diheptadecenylpyrrol-1-yl, octadecenylpyrrol-1-yl, dioctadecenylpyrrol-1-yl, nonadecenylpyrrol-1-yl, dinonadecenylpyrrol-1-yl, eicoscnylpyrrol-1-yl, dieicoseriylpyrrol-1-yl, heneicosenylpyrrol-1-yl, diheneicosenylpyrrol-1-yl, docosenyipyrrol-1-yl, didocosenylpyrrol-1-yl, tricosenylpyrrol-1-yl, ditricosenylpyrrol-1-yl, tetracosenylpyrrol-1-yl, ditetracosenyipyrrol-1-yl, pentacosenylpyrrol-1-yl, dipentacosenylpyrrol-1-yl, hexacosenylpyrrol-1-yl, dihexacosenylpyrrol-1-yl, heptacosenylpyrrol-1-yl, diheptacosenylpyrrol-1-yl, octacosenylpyrrol-1-yl, dioctacosenylpyrrol-1-yl, nonacosenylpyrrol-1-yl, dinonacosenylpyrrol-1-yl, triacontenylpyrrol-1-yl, ditriacontenylpyrrol-1-yl, ethylmethylpyrrol-1-yl, propylmethylpyrrol-1-yl, butylmethylpyrrol-1-yl, pentylmethylpyrrol-1-yl, hexylmethylpyrrol-1-yl, heptylmethylpyrrol-1-yl, octylmethylpyrrol-1-yl, nonylmethylpyrrol-1-yl, decylmethylpyrrol-1-yl, undecylmethylpyrrol-1-yl, dodecylmethylpyrrol-1-yl, tridecylmethylpyrrol-1-yl, tetradecylmethylpyrrol-1-yl, pentadecylmethylpyrrol-1-yl, hexadecylmethylpyrrol-1-yl, heptadecylmethylpyrrol-1-yl, octadecylmethylpyrrol-1-yl, nonadecylmethylpyrrol-1-yl, eicosylmethylpyrrol-1-yl, heneicosylmethylpyrrol-1-yl, docosylmethylpyrrol-1-yl, tricosylmethylpyrrol-1-yl, tetracosylmethylpyrrol-1-yl, pentacosylmethylpyrrol-1-yl, hexacosylmethylpyrrol-1-yl, heptacosylmethylpyrrol-1-yl, octacosylmethylpyrrol-1-yl, nonacosylmethylpyrrol-1-yl, triacontylmethylpyrrol-1-yl vinylpyrrol-1-yl, propenylpyrrol-1-yl, butenylpyrrol-1-yl, pentenylpyrrol-1-yl, hexenylpyrrol-1-yl, cyelopropylpyrrol-1-yl, cyclobutylpyrrol-1-yl, cyclopentylpyrrol-1-yl, cyclohexylpyrrol-1-yl, cycloheptylpyrrol-1-yl, cyclooctylpyrrol-1-yl, cyclononylpyrrol-1-yl, cyclodecylpyrrol-1-yl, cycloundecylpyrrol-1-yl, cyclododecylpyrrol-1-yl, cyclotetradecylpyrrol-1-yl, cyclopentenylpyrrol-1-yl, cyclohexenylpyrrol-1-yl, cycloheptenylpyrrol-1-yl, cyclooctenylpyrrol-1-yl, cyclodecenylpyrrol-1-yl, cyclododecenylpyrrol-1-yl, methylvinylpyrrol-1-yl, methylpropenylpyrrol-1-yl, methylbutenylpyrrol-1-yl, methylpentertylpyrrol-1-yl, methylhexenylpyrol-1-yl, methylcyclopropylpyrrol-1-yl, methylcyolobutylpyrrol-1-yl, methylcyclopentylpyrrol-1-yl, methylcyclohexylpyrrol-1-yl, methyIcycloheptylpyrrol-1-yl, methylcyclooctylpyrrol-1-yl, methylcyclononylpyrrol-1-yl, methylcyclodecylpyrrol-1-yl, methylcycloundecylpyrrol-1-yl, methylcyclododecylpyrrol-1-yl, methylcyclotetradecylpyrrol-1-yl, methylcyclopentenylpyrrol-1-yl, methylcyclohexenylpyrrol-1-yl, methylcycloheptenylpyrrol-1-yl, methylcyclooctenylpyrrol-1-yl, methylcyclodecenylpyrrol-1-yl, methylcyclododecenylpyrrol-1-yl, phenylpyrrol-1-yl, tolylpyrrol-1-yl, mesitylpyrrol-1-yl, (ethylphenyl)pyrrol-1-yl, (propylphenyl)pyrrol-1-yl, (butylphenyl)pyrrol-1-yl, (pentylphenyl)pyrrol-1-yl, (hexylphenyl)pyrrol-1-yl, (dimethylphenyl)pyrrol-1-yl, (trimethylphenyl)pyrrol-1-yl, (diethylphenyl)pyrrol-1-yl, (diethylmethylphenyl)pyrrol-1-yl, (dipropylphenyl) pyrrol-1-yl, (dipropylmethylphenyl)pyrrol-1-yl, benzylpyrrol-1-yl, (phenethyl)pyrrol-1-yl, napthylpyrrol-1-yl, (trifluoromethyl)pyrrol-1-yl, methylphenylpyrrol-1-yl, methyltolylpyrrol-1-yl, methylmesitylpyrrol-1-yl, methyl(ethylphenyl)pyrrol-1-yl, methyl(propylphenyl) pyrrol-1-yl, methyl(butylphenyl)pyrrol-1-yl, methyl (pentylphenyl)pyrrol-1-yl, methyl(hexylphenyl)pyrrol-1-yl, methyl(dimethylphenyl)pyrrol-1-yl, methyl (trimethylphenyl)pyrrol-1-yl, methyl(diethylphenyl) pyrrol-1-yl, methyl(diethylmethylphenyl)pyrrol-1-yl, methyl(dipropylphenyl)pyrrol-1-yl, methyl(dipropylmethylphenyl)pyrrol-1-yl, methylbenzylpyrrol-1-yl, methyl(phenethyl)pyrrol-1-yl, methylnapthylpyrrol-1-yl, methyl(trifiuoromethyl)pyrrol-1-yl, imidazol-1-yl, methylimidazol-1-yl, dimethylimidazol-1-yl, trimethylimidazol-1-yl, ethylimidazol-1-yl, propylimidazol-1-yl, butylimidazol-1-yl, pentylimidazol-1-yl, hexylimidazol-1-yl, heptylimidazol-1-yl, octylimidazol-1-yl, nonylimidazol-1-yl, decylimidazol-1-yl, undecylimidazol-1-yl, dodecylimidazol-1-yl, methylethylimidazol-1-yl, methylpropylimidazol-1-yl, methylbutylimidazol-1-yl, methylpentylimidazol-1-yl, methylhexylimidazol-1-yl, methylheptylimidazol-1-yl, methyloctylimidazol-1-yl, methylnonylimidazol-1-yl, methyldecylimidazol-1-yl, methylundecylimildazol-1-yl, methyldodecylimildazol-1-yl, phenylimidazol-1-yl, tolylhrimidazol-1-yl, benzylimidazol-1-yl, (trifluoronaethyl)imidazol-1-yl, cyclopropylimidazol-1-yl, cyclobutylimidazol-1-yl, cyclopentylimidazol-1-yl, cyclohexylimidazol-1-yl, cycloheptylimidazol-1-yl, cyclooctylimidazol-1-yl, cyclononylimidazol-1-yl, cyclodecylimidazol-1-yl, cycloundecylimidazol-1-yl, cyclododecylimidazol-1-yl, methylphenylimidazol-1-yl, methyltolytimidazol-1-yl, methylbenzylimidazol-1-yl, methyl(trifluoroinethyl)imidazol-1-yl, methylcyciopropylimidazol-1-yl, methylcyclobutylimidazol-1-yl, methylcyclopentylimidazol-1-yl, methylcyclohexylimidazol-1-yl, methylcycloheptylimidazol-1-yl, methylcyclooctylimidazol-1-yl, methylcyclononylimidazol-1-yl, methylcyclodecylimidazol-1-yl, methylcycloundecylimidazol-1-yl, methylcyciododecylimidazol-1-yl, diethylimidazol-1-yl, dipropylimidazol-1-yl, dibutylimidazol-1-yl, dipentylimidazol-1-yl, dihexylimidazol-1-yl, pyrazol-1-yl, methylpyrazol-1-yl, dimethylpyrazol-1-yl, trimethylpyrazol-1-yl, ethylpyrazol-1-yl, propylpyrazol-1-yl,b butylpyrazol-1-yl, pentylpyrazol-1-yl, hexylpyrazol-1-yl, heptylpyrazol- 1-yl, octylpyrazol-1-yl, nonylpyrazol-1-yl, decylpyrazol-1-yl, undecylpyrazol-1-yl, dodecylpyrazol-1-yl, methylethylpyrazol-1-yl, methylpropylpyrazol-1-yl, methylbutylpyrazol-1-yl, methylpentylpyrazol-1-yl, methylhexylpyrazol-1-yl, methylheptylpyrazol-1-yl, methyloctylpyrazol-1-yl, methylnonylpyrazol-1-yl, methyldecylpyrazol-1-yl, methylundecylpyrazol-1-yl, methyldodccylpyrazol-1-yl, phenylpyrazol-1-yl, tolylpyrazol-1-yl, benzylpyrazol-1-yl, (trifluoromethyl)pyrazol-1-yl cyclopropylpyrazol-1-yl, cyclobutylpyrazol-1-yl, cyclopentylpyrazol-1-yl, cyclohexylpyrazol-1-yl, cycloheptylpyrazol-1-yl, cyclooctylpyrazol-1-yl, cyclonanylpyrazol-1-yl, cyclodecylpyrazol-1-yl, cycloundecylpyrazol-1-yl, cyclododecylpyrazol-1-yl, methylphenylpyrazol-1-yl, methyltolylpyrazol-1-yl, methylbenzylpyrazol-1-yl, methyl(trifluoromethyl)pyrazol-1-yl, methylcyclopropylpyrazol-1-yl, methylcyclobutylpyrazol-1-yl, methylcyclopentylpyrazol-1-yl, methylcyclohexylpyrazol-1-yl, methylcycloheptylpyrazol-1-yl, methylcyclooctylpyrazol-1-yl, methylcyclononylpyrazol-1-yl, methyloyclodecylpyrazol-1-yl, methylcycloundecylpyrazol-1-yl, methylcyclododecylpyrazol-1-yl, diethylpyrazol-1-yl, dipropylpyrazol-1-yl, dibutylpyrazol-1-yl, dipentylpyrazol-1-yl, dihexylpyrazol-1-yl, triazol-#-yl, (#=1, 2, or, 4), methyltriazol-#-yl, (#=1, 2, or, 4), dimethyltriazol-#-yl, (#=1, 2, or, 4), ethyltriazol-#-yl, (#=1, 2, or, 4), propyltriazol-#-yl, (#=1, 2, or, 4), butyltriazol-#-yl, (#=1, 2, or, 4), pentyltriazol-#-yl, (#=1, 2, or, 4), hexyltriazol-#-yl, (#=1, 2, or, 4), heptyltriazol-#-yl, (#=1, 2, or, 4), octyltriazol-#-yl, (#=1, 2, or, 4), nonyltriazol-#-yl, (#=1, 2, or, 4), decyltriazol-#-yl, (#=1, 2, or, 4), undecyltriazol-#-yl, (#=1, 2, or, 4), dodecyltriazol-#-yl, (#=1, 2, or, 4), methylethyltriazol-#-yl, (#=1, 2, or, 4), methylpropyltriazol-#-yl, (#=1, 2, or, 4), methylbutyltriazol-#-yl, (#=1, 2, or, 4), methylpentyltriazol-#-yl, (#=1, 2, or, 4), methylhexyltriazol-#-yl, (#=1, 2, or, 4), methylheptyltriazol-#-yl, (#=1, 2, or, 4), methyloctyltriazol-#-yl, (#=1, 2, or, 4), methylnonyltriazol-#-yl, (#=1, 2, or, 4), methyldecyltriazol-#-yl, (#=1, 2, or, 4), methylundecyltriazol-#-yl, (#=1, 2, or, 4), methyldodecyltriazol-#-yl, (#=1, 2, or, 4), phenyltriazol-#-yl, (#=1, 2, or, 4), tolyltriazol-#-yl, (ft =1, 2, or, 4), benzyltriazol-#-yl, (#=1, 2, or, 4), (trifluoromethyl)triazol-#-yl, (#=1, 2, or, 4), cyclopropyltriazol-#-yl, (#=1, 2, or, 4), cyclobutyltriazol-#-yl, (#=1, 2, or, 4), cyclopentyltriazol-#-yl, (#=1, 2, or, 4), cyclohexyltriazol-#-yl, (#=1, 2, or, 4), cycloheptyltriazol-#-yl, (#=1, 2, or, 4), cyclooctyltriazol-#-yl, (#=1, 2, or, 4), cyclononyltriazol-#-yl, (#=1, 2, or, 4), cyclodecyltriazol-#-yl, (#=1, 2, or, 4), cycloundecyltriazol-#-yl, (#=1, 2, or, 4), cyclododecyltriazol-#-yl, (#=1, 2, or, 4), methylphenyltriazol-#-yl, (#=1, 2, or, 4), metbyltolyltriazol-#-yl, (#=1, 2, or, 4), methylbenzyltriazol-#-yl, (#=1, 2, or, 4), methyl(trifluornethyl)triazol#-yl, (#=1, 2, or, 4), methylcyclopropyltriazol-#-yl, (#=1, 2, or, 4), methylcyclobutyltriazol-#-yl, (#=1, 2, or, 4), methylcyclopentyltriazol-#-yl, (#=1, 2, or, 4), methylcyclohexyltriazol-#-yl, (#=1, 2, or, 4), methyloycloheptyltriazol-#-yl, (#=1, 2, or, 4), methylcyclooctyltriazol-#-yl, (#1, 2, or, 4), methylcyclononyltriazol-#-yl, (#=1, 2, or, 4), methylcyclodecyltriazol-#-yl, (#=1, 2, or, 4), methylcycloundecyltriazol-#-yl, (#=1, 2, or, 4), methylcyolododecyltriazol-#-yl, (#=1, 2, or, 4), diethyltriazol-#-yl, (#=1, 2, or, 4), dipropyltriazol-#-yl, (#=1, 2, or, 4), dibutyltriazol-#-yl, (#=1, 2, or, 4), dipentyltriazol-#-yl, (#=1, 2, or, 4), dihexyltriazol-#-yl, (#=1, 2, or, 4), triphosphol-#-yl (#=1, 2, or, 4), methyltriphosphol-#-yl, (#=1, 2, or, 4), dimethyltriphosphol-#-yl, (#=1, 2, or, 4), ethyltriphosphol-#-yl, (#=1, 2, or, 4), propyltriphosphol-#-yl, (#=1, 2, or, 4), butyltriphosphol-#-yl, (#=1, 2, or, 4), pentyltriphosphol-#-yl, (#=1, 2, or, 4), hexyltriphospbol-#-yl, (#=1, 2, or, 4), heptyltriphosphol-#-yl, (#=1, 2, or, 4), octyltriphosphol-#-yl, (#=1, 2, or, 4), nonyltriphosphol-#-yl, (#=1, 2, or, 4), decyltriphosphol-#-yl, (#=1, 2, or, 4), undecyltriphosphol-#-yl, (#=1, 2, or, 4), dodecyltriphosphol-#-yl, (#=1, 2, or, 4), methylethyltriphosphol-#-yl, (#=1, 2, or, 4), methylpropyltriphosphol-#-yl, (#=1, 2, or, 4), methylbutyltriphosphol-#-yl, (#=1, 2, or, 4), methylperityltriphosphol-#-yl, (#=1, 2, or, 4), methylhexyltriphosphol-#-yl, (#=1, 2, or, 4), methylheptyltriphosphol-#-yl, (#=1, 2, or, 4), methyloctytriphosphol-#-yl, (#=1, 2, or, 4), methylnonyltriphosphol-#-yl, (#=1, 2, or, 4), methyldecyltriphosphol-#-yl, (#=1, 2, or, 4), methylundecyltriphosphol-#-yl, (#=1, 2, or, 4), methyldodecyltriphosphol-#-yl, (#=1, 2, or, 4), phenyltripliosphol-#-yl, (#=1, 2, or, 4), tolyltriphosphol-#-yl, (#=1, 2, or, 4), benzyltriphosphol-#-yl, (#=1, 2, or, 4), (trifluoromethyl)triphosphol-#-yl, (#=1, 2, or, 4), cyclopropyltriphosphol-#-yl, (#=1, 2, or, 4), cyclobutyltripbosphol-#-yl, (#=1, 2, or, 4), cyclopentyltripbosphol-#-yl, (#=1, 2, or, 4), cyolohexyltriphosphol-#-yl, (#=1, 2, or, 4), cycloheptyltriphosphol-#-yl, (#1, 2, or, 4), cyclooctyltriphosphol-#-yl, (#=1, 2, or, 4), cyclononyltriphosphol-#-yl, (#=1, 2, or, 4), cyclodecyltriphosphol-#-yl, (#=1, 2, or, 4), cycloundecyltripbosphol-#-yl, (#=1, 2, or, 4), cyclododecyltriphosphol-#-yl, (#=1, 2, or, 4), methylphenyltriphosphol-#-yl, (#=1, 2, or, 4), methyltolyltriphosphol-#-yl, (#=1, 2, or, 4), methylbenzyltriphosphol-#-yl, (#=1, 2, or, 4), methyl(trifluoromethyl)triphosphol-#-yl, (#=1, 2, or, 4), methylcyclopropyltriphosphol-#-yl, (#=1, 2, or, 4), methylcyclobutyltriphosphol-#-yl, (#=1, 2, or, 4), methylcyclopentyltriphosphol-#-yl, (#=1, 2, or, 4), methylcyclohexyltriphosphol-#-yl, (#=1, 2, or, 4), methylcycloheptyltriphosphol-#-yl, (#=1, 2, or, 4), methylcyclooctyltriphosphol-#-yl, (#=1, 2, or, 4), methylcyclononyltriphosphol-#-yl, (#=1, 2, or, 4), methylcyclodecyltriphosphol-#-yl, (#=1, 2, or, 4), methylcycloondecyltriphosphol-#-yl, (#=1, 2, or, 4), methylcyclododeoyltriphosphol-#-yl, (#=1, 2, or, 4), diethyltriphosphol-#-yl, (#=1, 2, or, 4), dipropyltriphosphol-#-yl, (#=1, 2, or, 4), dibutyltriphosphol-#-yl, (#=1, 2, or, 4), dipentyltriphosphol-#-yl, (#=1, 2, or, 4), dihexyltriphosphol-#-yl, (#=1, 2, or, 4), phosphol-1-yl, methylphosphol-1-yl, dimethylphosphol-1-yl, trimethylphosphol-1-yl, tetramethylphosphol-1-yl, ethylphosphol-1-yl, propylphosphol-1-yl, butylphosphol-1-yl, pentylphosphol-1-yl, hexylphasphol-1-yl, heptylphosphol-1-yl, octylphosphol-1-yl, nonylphosphol-1-yl, decylphosphol-1-yl, undecylphosphol-1-yl, dodecylphosphol-1-yl, methylethylphosphol-1-yl, methylpropylphosphol-1-yl, methylbutylphosphol-1-yl, methylperitylphosphol-1-yl, methylhexylphosphol-1-yl, methylheptylphosphol-1-yl, methyloctylphosphol-1-yl, methylnonylphosphol-1-yl, methyldecylphosphol-1-yl, methylundecylphosphol-1-yl, methyldodecylphosphol-1-yl, phenylphosphol-1-yl, tolylphosphol-1-yl, benzylphosphol-1-yl, (trifluoromethyl)phosphol-1-yl, cyclopropylphosphol-1-yl, cyclobutylphosphol-1-yl, cyclopentylphosphol-1-yl, cyclohexylphosphol-1-yl, cycloheptylphosphol-1-yl, cyclooctylphosphol-1-yl, cyclononylphosphol-1-yl, cyclodecylphosphol-1-yl, cycloundecylphosphol-1-yl, cyclododecylphosphol-1-yl, methylphenylphosphol-1-yl, methyltolylphosphol-1-yl, methylbenzylphosphol-1-yl, methyl(trifluoromethyl)phosphol-1-yl, methylcyclopropylphosphol-1-yl, methylcyclobutylphosphol-1-yl, methylcyclopentylphosphol-1-yl, methylcyclohexylphosphol-1-yl, methylcycloheptylphosphol-1-yl, methylcyclooctylphosphol-1-yl, methylcyclononylphosphol-1-yl, methylcyclodecylphosphol-1-yl, methylcycloundecylphosphol-1-yl, methylcyclododecylphosphol-1-yl, diethylphosphol-1-yl, dipropylphosphol-1-yl, dibutylphosphol-1-yl, dipentylphosphol-1-yl, dihexylphosphol-1-yl, azaphosphol-#-yl, (#=1, 2, or, 3), methylazaphosphol-#-yl, (#=1, 2, or, 3), dimethylazapbosphol-#-yl, (#=1, 2, or, 3), trimethylazaphosphol-#-yl, (#=1, 2, or, 3), ethylazaphosphol-#-yl, (#=1, 2, or, 3), propylazaphosphol-#-yl, (#=1, 2, or, 3), butylazaphosphol-#-yl, (#=1, 2, or, 3), pentylazaphosphol-#-yl, (#=1, 2, or, 3), hexylazaphosphol-#-yl, (#=1, 2, or, 3), heptylazaphosphol-#-yl, (#=1, 2, or, 3), octylazaphosphol-#-yl, (#=1, 2, or, 3), nonylazaphosphol-#-yl, (#=1, 2, or, 3), decylazaphosphol-#-yl, (#=1, 2, or, 3), undecylazaphospbol-#-yl, (#=1, 2, or, 3), dodecylazaphosphol-#-yl, (#=1, 2, or, 3), methylethylazaphosphol-#-yl, (#=1, 2, or, 3), methylpropylazaphosphol-#-yl, (#=1, 2, or, 3), methylbutylazaphosphol-#-yl, (#=1, 2, or, 3), methylpentylazaphosphol-#-yl, (#=1, 2, or, 3), methylhexylazaphosphol-#-yl, (#=1, 2, or, 3), methylheptylazaphosphol-#-yl, (#=1, 2, or, 3), methyloctylazaphosphol-#-yl, (#=1, 2, or, 3), methylnonylazaphosphol-#-yl, (#=1, 2, or, 3), methyldecylazaphosphol-#-yl, (#=1, 2, or, 3), methylundecylazaphosphol-#-yl, (#=1, 2, or, 3), methyldodecylazaphosphol-#-yl, (#=1, 2, or, 3), phenylazaphosphol-#-yl, (#=1, 2, or, 3), tolylazaphosphol-#-yl, (#=1, 2, or, 3), benzylazaphosphol-#-yl, (#=1, 2, or, 3), (trifluoromethyl)azaphosphol-#-yl, (#=1, 2, or, 3), cyclopropylazaphosphol-#-yl, (#=1, 2, or, 3), cyclobutylazaphosphol-#-yl, (#=1, 2, or, 3), cyclopentylazaphosphol-#-yl, (#=1, 2, or, 3), cyclohexytazaphosphol-#-yl, (#=1, 2, or, 3), cycloheptylazaphosphol-#-yl, (#=1, 2, or, 3), cyclooctylazaphosphoi-#-yl, (#=1, 2, or, 3), cyclononylazaphosphol-#-yl, (#=1, 2, or, 3), cyclodecylazaphosphol-#-yl, (#=1, 2, or, 3), cycloundecylazaphosphol-#-yl, (#=1, 2, or, 3), cyclododeeylazaphosphol-#-yl, (#=1, 2, or, 3), methylphenylazaphosphol-#-yl, (#=1, 2, or, 3), methyltolylazaphosphol-#-yl, (#=1, 2, or, 3), methylbenzylazaphosphol-#-yl, (#=1, 2, or, 3), methyl(trifluoroxnethyl)azaphosphol-#-yl, (#=1, 2, or, 3), methylcyclopropylazaphosphol-#-yl, (#=1, 2, or, 3), methylcyclobutylazaphosphol-#-yl, (#=1, 2, or, 3), methylcyclopentylazaphosphol-#-yl, (#=1, 2, or, 3), methylcyclohexylazaphosphol-#-yl, (#=1, 2, or, 3), methylcycloheptylazaphosphol-#-yl, (#=1, 2, or, 3), methylcyclooctylazaphosphol-#-yl, (#=1, 2, or, 3), methylcyclononylazaphosphol-#-yl, (#=1, 2, or, 3), methylcyclodecylazaphosphol-#-yl, (#=1, 2, or, 3), methylcycloundecylazaphosphol-#-yl, (#=1, 2, or, 3), methylcyclodoclecylazaphosphol-#-yl, (#=1, 2, or, 3), diethylazaphosphol-#-yl, (#=1, 2, or, 3), dipropylazaphosphol-#-yl, (#=1, 2, or, 3), dibutylazaphosphol-#-yl, (#=1, 2, or, 3), dipentylazaphosphol-#-yl, (#=1, 2, or, 3), dihexylazaphosphol-#-yl, (#=1, 2, or, 3), diazaphosphol-#-yl, (#=1, 2, 3, or, 4), methyldiazaphosphol-#-yl, (#=1, 2, 3, or, 4), dimethyldiazaphosphol-#-yl, (#=1, 2, 3, or, 4), ethyldiazaphosphol-#-yl, (#=1, 2, 3, or, 4), propyldiazaphosphol-#-yl, (#=1, 2, 3, or, 4), butyldiazaphosphol-#-yl, (#=1, 2, 3, or, 4), pentyldiazaphosphol-#-yl, (#=1, 2, 3, or, 4), hexyldiazaphosphol-#-yl, (#1, 2, 3, or, 4), heptyldiazaphosphol-#-yl, (#=1, 2, 3, or, 4), octyldiazaphosphol-#-yl, (#=1, 2, 3, or, 4), nonyldiazaphosphol-#-yl, (#=1, 2, 3, or, 4), deoyldiazaphosphol-#-yl, (#=1, 2, 3, or, 4), undecyldiazaphosphol-#-yl, (#=1, 2, 3, or, 4), dodecyldiazaphosphol-#-yl, (#=1, 2, 3, or, 4), methylethyldiazaphosphol-#-yl, (#=1, 2, 3, or, 4), methylpropyldiazaphosphol-#-yl, (#=1, 2, 3, or, 4), methylbutyldiazaphosphol-#-yl, (#=1, 2, 3, or, 4), methylpentyldiazaphosphol-#-yl, (#1, 2, 3, or, 4), methylhexyldiazaphosphol-#-yl, (#=1, 2, 3, or, 4), methylheptyldiazaphosphol-#-yl, (#=1, 2, 3, or, 4), methyloctyldiazaphosphol-#-yl, (#=1, 2, 3, or, 4), methylnonyldiazaphosphol-#-yl, (#=1, 2, 3, or, 4), methyldecyldiazaphosphol-#-yl, (#=1, 2, 3, or, 4), methylundecyldiazaphosphol-#-yl, (#=1, 2, 3, or, 4), methyldodecyldiazaphosphol-#-yl, (#=1, 2, 3, or, 4), phenyldiazaphosphol-#-yl, (#=1, 2, 3, or, 4), tolyldiazaphosphol-#-yl, (#=1, 2, 3, or, 4), benzyldiazaphosphol-#-yl, (#=1, 2, 3, or, 4), (trifluoroinethyl), diazaphosphol-#-yl, (#=1, 2, 3, or, 4), cyclopropyldiazaphosphol-#-yl, (#=1, 2, 3, or, 4), cyclobutyldiazaphosphol-#-yl, (#=1, 2, 3, or, 4), cyclopentyldiazaphosphol-#-yl, (#1, 2, 3, or, 4), cyclohexyldiazaphosphol-#-yl, (#=1, 2, 3, or, 4), cycloheptyldiazaphosphol-#-yl, (#=1, 2, 3, or, 4), cyclooctyldiazaphosphol-#-yl, (#=1, 2, 3, or, 4), cyclononyldiazaphosphol-#-yl, (#=1, 2, 3, or, 4), cyclodecyldiazaphosphol-#-yl, (#=1, 2, 3, or, 4), cycloundecyldiazaphosphol-#-yl, (#=1, 2, 3, or, 4), cyclododecyldiazaphosphol-#-yl, (#=1, 2, 3, or, 4), methylphenyldiazaphosphol-#-yl, (#1, 2, 3, or, 4), methyltolyldiazaphosphol-#-yl, (#=1, 2, 3, or, 4), methylbenzyldiazaphosphol-yl, (#=1, 2, 3, or, 4), methyl (trifluoromethyl)diazaphosphol-#-yl, (#1, 2, 3, or, 4), methylcyclopropyldiazaphosphol-#-yl, (#=1, 2, 3, or, 4), methylcyclobutyldiazaphosphol-#-yl, (#=1, 2, 3, or, 4), methytcyclopentyldiazaphosphol-#-yl, (#1, 2, 3, or, 4), methylcyclohexyldiazaphosphol-#-yl, (#=1, 2, 3, or, 4), methylcycloheptyldiazaphosphol-#-yl, (#1, 2, 3, or, 4), methylcyclooctyldiazaphosphol-#-yl, (#1, 2, 3, or, 4), methylcyclononyldiazapbospliol-#-yl, (#1, 2, 3, or, 4), methylcyclodecyldiazaphosphol-#-yl, (#1, 2, 3, or, 4), methylcycloundecyldiazaphosphol-#-yl, (#=1, 2, 3, or, 4), methylcyclododecyldiazaphospbol-#-yl, (#=1, 2, 3, or, 4), diethyldiazaphosphol-#-yl, (#=1, 2, 3, or, 4), dipropyldiazapliosphol-#-yl, (#1, 2, 3, or, 4), dibutyldiazaphosphol-#-yl, (#=1, 2, 3, or, 4), dipentyldiazaphosphol-#-yl, (#=1, 2, 3, or, 4), dihexyldiazaphosphol-#-yl, (#=1, 2, 3, or, 4), azadiphosphol-1-yl, methylazadiphosphol-1-yl, dimethylazadiphosphol-1-yl, ethylazadiphosphol-1-yl, propylazadiphosphol-1-yl, butylazadiphosphol-1-yl, pentylazadiphosphol-1-yl, hexylazadiphosphol-1-yl, heptylazadiphosphol-1-yl, octylazadiphosphol-1-yl, nonylazadiphosphol-1-yl, decylazadiphosphol-1-yl, undecylazadiphosphol-1-yl, dodecylazadiphosphol-1-yl, methylethylazadiphosphol-1-yl, methylpropylazadiphosphol-1-yl, methylbutylazadiphosphol-1-yl, methylpentylazadiphosphol-1-yl, methylhexylazadiphosphol-1-yl, methylheptylazadiphosphol-1-yl, methyloctylazadiphosphol-1-yl, methylnonylazadiphosphol-1-yl, methyldecylazadiphosphol-1-yl, methylundecylazadiphosphol-1-yl, methyldodecylazadiphosphol-1-yl, phenylazadiphosphol-1-yl, tolylazadiphosphol-1-yl, beazylazadiphosphol-1-yl, (trifluoromethyl)azadiphosphol-1-yl, cyclopropylazadiphosphal-1-yl, cyclobutylazadiphosphol-1-yl, cyclopentylazadiphosphol-1-yl, cyclohexylazadiphosphol-1-yl, cycloheptylazadiphosphol-1-yl, cyclooctylazadiphosphol-1-yl, cyclononylazadiphosphol-1-yl, cyclodecylazadiphosphol-1-yl, cycloundeoylazadiphosphol-1-yl, cyclododecylazadiphosphol-1-yl, methylphenylazadiphosphol-1-yl, methyltolylazadiphosphol-1-yl, methylbenzylazadiphosphol-1-yl, methyl(trifluoromethyl)azadiphosphol-1-yl, methylcyolopropylazadiphosphol-1-yl, methylcyclobutylazadiphosphol-1-yl, methylcyclopentylazadiphosphol-1-yl, methylcyclohexylazadiphosphol-1-yl, methylcycloheptylazadiphosphol-1-yl, methylcyclooctylazadiphosphol-1-yl, methyleyclononylazadiphosphol-1-yl, methylcyclodecylazadiphosphol-1-yl, methylcycloundecylazadiphosphol-1-yl, methylcyclododecylazadiphosphol-1-yl, diethylazadiphosphol-1-yl, dipropylazadiphosphol-1-yl, dibutylazadiphosphol-1-yl, dipentylazadiphosphol-1-yl, dihexylazadiphosphol-1-yl, indol-1-yl, methylindol-1-yl, dimethylindol-1-yl, trimethylindol-1-yl, tetramethylindol-1-yl, pentarnethylindol-1-yl, hexamethylindol-1-yl, ethylindol-1-yl, propylindol-1-yl, butylindol-1-yl, pentylindol-1-yl, hexylindol-1-yl, heptylindol-1-yl, octylindol-1-yl, nonylindol-1-yl, decylindol-1-yl, undecylindol-1-yl, dodecylindol-1-yl, methylethylindol-1-yl, methylpropylindol-1-yl, methylbutylindol-1-yl, methylpentylindol-1-yl, methylhexylindol-1-yl, methylheptylindol-1-yl, methyloctylindol-1-yl, methylnonylindol-1-yl, methyldecylindol-1-yl, methylundecylindol-1-yl, methyldodecylindol-1-yl, phenylindol-1-yl, tolylindol-1-yl, benzylindol-1-yl, (trifluoromethyl)indol-1-yl, cyclopropylindol-1-yl, cyclobutylindol-1-yl, cyclopentylindol-1-yl, cyclohexylindol-1-yl, cycloheptylindol-1-yl, cyclooctylindol-1-yl, cyclononylindol-1-yl, cyclodecylindol-1-yl, cycloundecylindol-1-yl, cyclododecylindol-1-yl, methylphenylindol-1-yl, methyltolylindol-1-yl, methylbenzylindol-1-yl, methyl (trifluoromethyl)indo-1-yl, methylcyclopropylindol-1-yl, methylcyclobutylindol-1-yl, methylcyclopentylindol-1-yl, methylcyclohexylindol-1-yl, methylcycloheptylindol-1-yl, methylcyclooctylindol-1-yl, methylcyclononylindol-1-yl, methylcyclodecylindol-1-yl, methylcycloundecylindol-1-yl, methylcyclododecylindol-1-yl, diethylindol-1-yl, dipropylindol-1-yl, dibutylindol-1-yl, dipentylindol-1-yl, dihexylindol-1-yl, isoindol-2-yl, methylisoindol-2-yl, dimethylisoindol-2-yl, trimethylisoindol-2-yl, tetramethylisoindol-2-yl, pentamethylisoindol-2-yl, hexmethylisoindol-2-yl, ethylisoindol-2-yl, propylisoindol-2-yl, butylisoindol-2-yl, pentylisoindol-2-yl, hexylisoindol-2-yl, heptylisoindol-2-yl, octylisoindol-2-yl, nonylisoindol-2-yl, decylisoindol-2-yl, undecylisoindol-2-yl, dodecylisoindol-2-yl, methylethylisoindol-2-yl, methylpropylisoindol-2-yl, methylbutylisoindol-2-yl, methylpentylisoindol-2-yl, methylhexylisoindol-2-yl, methylheptylisoindol-2-yl, methyloctylisoindol-2-yl, methylnonylisoindol-2-yl, methyldecylisoindol-2-yl, methylundecylisoindal-2-yl, methyldodecylisoindol-2-yl, phenylisoindol-2-yl, tolylisoindol-2-yl, benzylisoindol-2-yl, (trifluororn-ethyl), isoindol-2-yl, cyclopropytisoindol-2-yl, cyclobutylisoindol-2-yl, cyclopentylisoindol-2-yl, cyclohexylisoindol-2-yl, cycloheptylisoindol-2-yl, cyclooctylisoindol-2-yl, cyclononylisoindol-2-yl, cyclodecylisoindol-2-yl, cycloundecylisoindol-2-yl, cyclododecylisoindol-2-yl, methylphenylisoindol-2-yl, methyltolylisoindol-2-yl, methylbenzylisoindol-2-yl, methyl(trifluoromethyl)isoindol-2-yl, methylcyclopropylisoindol-2-yl, methylcyclobutylisoindol-2-yl, methylcyclopentylisoindol-2-yl, methylcyclohexylisoindol-2-yl, methylcycloheptylisoindol-2-yl, methylcyclooctylisoindol-2-yl, methylcyclononylisoindol-2-yl, methylcyclodecylisoindol-2-yl, methylcycloundecylisoindol-2-yl, methylcyclododecylisoindol-2-yl, diethylisoindol-2-yl, dipropylisoindol-2-yl, dibutylisoindol-2-yl, dipentylisoindol-2-yl, dihexylisoindol-2-yl, isophosphindol-2-yl, methylisophosphindol-2-yl, dimethylisophosphindol-2-yl, (trimethylisophosphindol-2-yl, tetramethylisophosphindol-2-yl, pentmethylisophosphindol-2-yl, hexamethylisophosphindol-2-yl, ethylisophosphindol-2-yl, propylisophosphindol-2-yl, butylisophosphindol-2-yl, pentylisophosphindol-2-yl, hexylisophosphindol-2-yl, heptylisophosphindol-2-yl, octylisophosphindol-2-yl, nonylisophosphindol-2-yl, decylisophosphindol-2-yl, undecylisophosphindol-2-yl, dodecylisophosphindol-2-yl, methylethylisophosphindol-2-yl, methylpropylisophosphindol-2-yl, methylbutylisophosphindol-2-yl, methylpentylisophosphindol-2-yl, methylhexylisophosphindol-2-yl, methylheptylisophosphindol-2-yl, methyloctylisophosphindol-2-yl, methylnonylisophosphindol-2-yl, methyldecylisophosphindol-2-yl, mehhylundecylisophosphindol-2-yl, methyldodecylisophosphindol-2-yl, phenylisophosphindol-2-yl, tolylisophosphindol-2-yl, benzylisophosphindol-2-yl, (trifluoromethyl)isophosphiudol-2-yl, cyclopropylisophosphindol-2-yl, cyclobutylisophosphindol-2-yl, cyclopentylisophosphindol-2-yl, cyclohexylisophosphindol-2-yl, cycloheptylisophosphindol-2-yl, cyclooctylisophosphindol-2-yl, cyclononylisophosphindol-2-yl, cyclodecylisophosphindol-2-yl, cycloundecylisophosphindol-2-yl, cyclododecylisophosphindol-2-yl, methylphenylisophosphindol-2-yl, methyltolylisophosphindol-2-yl, methylbenzylisophosphindol-2-yl, methyl(trifluoromethyl), isophosphindol-2-yl, methylcyclopropylisophosphindol-2-yl, methylcyclobutylisophosphindol-2-yl, methylcyclopentylisophosphindol-2-yl, methylcyclohexylisophosphindol-2-yl, methylcycloheptylisophosphindol-2-yl, methylcyclooctylisophosphindol-2-yl, methylcyclononylisophosphindol-2-yl, methylcyclodecylisophosphindol-2-yl, methylcycloundecylisophosphindol-2-yl, methylcyclododecylisophosphindol-2-yl, diethylisophosphindol-2-yl, dipropylisophosphindol-2-yl, dibutylisophosphindol-2-yl, dipentylisophosphindol-2-yl, dihexylisophosphindol-2-yl, carbazol-9-yl, methylcarbazol-9-yl, dimethylcarbazol-9-yl, trimethylcarbazol-9-yl, tetramethylcarbazol-9-yl, pentamethylcarbazol-9-yl, hexamethylcarbazol-9-yl, heptamethylcarbazol-9-yl, octamethylcarbazol-9-yl, ethylcarbazol-9-yl, propylcarbazol-9-yl, butylcarbazol-9-yl, pentylcarbazol-9-yl, hexylcarbazol-9-yl, heptylcarbazol-9-yl, octylcarbazol-9-yl, nonylcarbazol-9-yl, decylcarbazol-9-yl, undecylcarbazol-9-yl, dodeeylcarbazol-9-yl, methylethylcarbazol-9-yl, methylpropylcarbazol-9-yl, methylbutylcarbazol-9-yl, methylpentylcarbazol-9-yl, methylhexylcarbazol-9-yl, methylheptylcarbazol-9-yl, methyloetylcarbazol-9-yl, methylnonylcarbazol-9-yl, methyldecylcarbazal-9-yl, methylundecylcarbazol-9-yl, methyldodecylcarbazol-9-yl, phenylcarbazol-9-yl, tolylcarbazol-9-yl, benzylcarbazol-9-yl, (trifluoromethyl)carbazo-9-yl, cyclopropylcarbazol-9-yl, cyclobutylcarbazol-9-yl, cyclopentylcarbazol-9-yl, cyclohexylcarbazol-9-yl, cycloheptylcarbazol-9-yl, cyclooctylcarbazol-9-yl, cyclononylcarbazol-9-yl, cyclodecylcarbazol-9-yl, cycloundecylcarbazol-9-yl, cyclododecylcarbazol-9-yl, methylphenylcazbazol-9-yl, methyltolylcarbazol-9-yl, methylbenzylcarbazol-9-yl, methyl(trifluoromethyl) carbazol-9-yl, methylcyclopropylcarbazol-9-yl, methylcyclobutylcarbazol-9-yl, methylcyclopentylcarbazol-9-yl, methylcyclohexylcarbazol-9-yl, methylcycloheptylcarbazol-9-yl, methylcyclooctylcarbazol-9-yl, methylcyclononylcarbazol-9-yl, methylcyclodecylcarbazol-9-yl, methylcycloundecylcarbazol-9-yl, methyloyelododecylcarbazol-9-yl, diethylcarbazol-9-yl, dipropylcarbazol-9-yl, dibutylcarbazol-9-yl, dipentylcarbazol-9-yl, dihexylcarbazol-9-yl, 4,5,6,7-tetrahyroindol-1-yl, methyl-4,5 ,6,7-tetrahyroindol-1-yl, dimethyl-4,5,6,7-tetrahyroindol-1-yl, ethyl-4,5,6,7-tetrahyroindol-1-yl, propyl-4,5,6,7-tetrahyroindol-1-yl, butyl-4,5,6,7-tetrahyroindol-1-yl, pentyl-4,5,6,7-tetrahyroindol-1-yl, hexyl-4,5,6,7-tetrahyroindol-1-yl, heptyl-4,5,6,7-tetrahyroindol-1-yl, octyl-4,5,6,7-tetrahyroindol-1-yl, nonyl-4,5,6,7-tetrahyroindol-1-yl, decyl-4,5,6,7-tetrahyroindol-1-yl, undecyl-4,5,6,7-tetrahyroindol-1-yl, dodecyl-4,5 ,6,7-tetrahyroindol-1-yl, methylethyl-4,5,6,7-tetrabyroindol-1-yl, methylpropyl-4,5,6,7-tetrahyroindol-1-yl, methylbutyl-4,5,6,7-tetrahyroindol-1-yl, methylpentyl-4,5,6,7-tetrahyroindol-1-yl, methylhexyl-4,5,6,7-tetrahyroindol-1-yl, methylheptyl-4,5,6,7-tetrahyroindol-1-yl, methyloctyl-4,5,6,7-tetrahyroindol-1-yl, methylnonyl-4,5,6,7-tetrahyroindol-1-yl, methyldecyl-4,5,6,7-tetrahyroindol-1-yl, methylundecyl-4,5,6,7-tetrahyroindol-1-yl, methyldodecyl-4,5,6,7-tetrahyroindol-1-yl, phenyl-4,5,6,7-tetrahyroindol-1-yl, tolyl-4,5,6,7-tetrahyroindol-1-yl, benzyl-4,5,6,7-tetrahyroindol-1-yl, (trifluoromethyl)-4,5,6,7-tetrahyroindol-1-yl, cyclopropyl-4,5,6,7-tetrahyroindol-1-yl, cyclobutyl-4,5,6,7-tetrahyroindol-1-yl, cyclopentyl-4,5,6,7-tetrahyroindol-1-yl, cyclohexyl-4,5,6,7-tetrahyroindol-1-yl, cycloheptyl-4,5,6,7-tetrahyroindol-1-yl, cyclooctyl-4,5,6,7-tetrahyroindol-1-yl, cyclononyl-4,5,6,7-tetrahyroindol-1-yl, cyclodecyl-4,5,6,7-tetrahyroindol-1-yl, cycloundecyl-4,5,6,7-tetrahyroindol-1-yl, cyclododecyl-4,5,6,7-tetrahyroindol-1-yl, methylphenyl-4,5,6,7-tetrahyroindol-1-yl, methyltolyl-4,5,6,7-tetrahyroindol-1-yl, methylbenzyl-4,5,6,7-tetrahyroindol-1-yl, methyl(trifluoromethyl)-4,5,6,7-tetrahyroindol-1-yl, methylcyclopropyl-4,5,6,7-tetrahyroindol-1-yl, methylcyclobutyl-4,5,6,7-tetrahyroindol-1-yl, methylcyolopentyl -4,5,6,7-tetrahyroindol-1-yl, methylcyclohexyl-4,5,6,7-tetrahyroindoil-1-yl, methylcycloheptyl-4,5,6,7-tetrahyroindol-1-yl, methylcyclooctyl-4,5,6,7-tetrahyroindol-1-yl, methylcyclononyl-4,5,6,7-tetrahyroindol-1-yl, methylcyclodecyl-4,5,6,7-tetrahyroindol-1-yl, methylcycloundecyl-4,5,6,7-tetrahyroindol-1-yl, methylcyclododecyl-4,5,6,7-tetrahyroindol-1-yl, diethyl-4,5,6,7-tetrahyroindol-1-yl, dipropyl-4,5,6,7-tetrahyroindol-1-yl, dibutyl-4,5,6,7-tetrahyroindol-1-yl, dipentyl-4,5,6,7-tetrahyroindol-1-yl, dihexyl-4,5,6,7-tetrahyroindol-1-yl, phosphindol-1-yl, methylphosphindol-1-yl, dimethylphosphindol-1-yl, trimethylphosphindol-1-yl, tetramethylphosphindol-1-yl, pentamethylphosphindol-1-yl, hexamethylphosphindol-1-yl, ethylphosphindol-1-yl, propylphosphindol-1-yl, butylphosphindol-1-yl, pentylphosphindol-1-yl, hexylphosphindol-1-yl, heptylphosphindol-1-yl, octylphosphindol-1-yl, nonylphosphindol-1-yl, decylphosphindol-1-yl, undecylphosphindol-1-yl, dodecylphosphindol-1-yl, methylethylphosphindol-1-yl, methylpropylphosplindol-1-yl, methylbutylphosphindol-1-yl, methylpentylphosphindol-1-yl, methylhexylphosphindol-1-yl, methylheptylphosphindol-1-yl, methyloctylphosphindol-1-yl, methylnonylphosphindol-1-yl, methyldecylphosphindol-1-yl, methylundecylphosphindol-1-yl, methyldodecylphosphindol-1-yl, phenylphosphindol-1-yl, tolylphosphindol-1-yl, benzylphosphindol-1-yl, (trifluoromethyl)phosphindol-1-yl, cyclopropylphosphindol-1-yl, cyclobutylphosphindol-1-yl, cyclopentylphosphindol-1-yl, cyclohexylphosphindol-1-yl, cycloheptylphosphindol-1-yl, cyclooctylphosphindol-1-yl, cyclononylphosphindol-1-yl, cyclodecylphosphindol-1-yl, cycloundecylphospbindol-1-yl, cyclododeoylphosphindol-1-yl, methylphenylphosphindol-1-yl, methyltolylphosphindol-1-yl, methylbenzylphosphindol-1-yl, methyl(trifluoromethyl)phosphiudol-1-yl, methylcyclopropylphosphindol-1-yl, methylcyclobutylphosphindol-1-yl, methylcyclopentylphosphindol-1-yl, methylcyclohexylphosphindol-1-yl, methylcycloheptylphosphindol-1-yl, methylcyclooctylphosphindol-1-yl, methylcyclononylphosphindol-1-yl, methylcyclodecylphosphindol-1-yl, methylcycloundecylphosphindol-1-yl, methylcyclododecylphosphindol-1-yl, diethylphosphindol-1-yl, dipropylphosphindol-1-yl, dibutylphosphindol-1-yl, dipentylphosphindol-1-yl, dihexylphosphindol-1-yl, 1,2,3,4-tetrahydrocarbazol-9-yl, methyl-1,2,3,4-tetrahydrocarbazol-9-yl, dimethyl-1,2,3,4-tetrahydrocarbazol-9-yl, trimethyl-1,2,3,4-tetrahydrocarbazol-9-yl, tetramethyl-1,2,3,4-tetrahydrocarbazol-9-yl, ethyl-1,2,3,4-tetrahydrocarbazol-9-yl, propyl-1,2,3,4-tetrahydrocarbazol-9-yl, butyl-1,2,3,4-tetrahydrocarbazol-9-yl, pentyl-1,2,3,4-tetrahydrocaxbazol-9-yl, hexyl-1,2,3,4-tetrahydrocarbazol-9-yl heptyl-1,2,3,4-tetrahydrocarhazol-9-yl, octyl-1,2,3,4-tetrahydrocarbazol-9-yl, nonyl-1,2,3,4-tetrahydrocarhazol-9-yl, decyl-1,2,3,4-tetrahydrocarbazol-9-yl, undecyl-1,2,3,4-tetrahydrocarbazol-9-yl, dodecyl-1,2,3,4-tetrahydrocarbazol-9-yl, methylethyl-1,2,3,4-tetrahydrocarbazol-9-yl, methylpropyl-1,2,3,4-tetrahydrocarbazol-9-yl, methylbutyl-1,2,3,4-tetrahydrocarbazol-9-yl, methylpentyl-1,2,3,4-tetrahydrocarbazol-9-yl, methylhexyl-1,2,3,4-tetralhydrocarbazol-9-yl, methylheptyl-1,2,3,4-tetrabydrocarbazol-9-yl, methyloctyl-1,2,3,4-tetrahydrocarbazol-9-yl, methylnonyl-1,2,3,4-tetrahydrocarbazol-9-yl, methyldecyl-1,2,3,4-tetrnhydroearbazol-9-yl, methylundecyl-1,2,3,4-tetrahydrocarbazol-9-yl, methyldodecyl-1,2,3,4-tetrahydrocarbazol-9-yl, phenyl-1,2,3,4-tetrahydrocarbazol-9-yl, tolyl-1,2,3,4-tetrahydrocarbazol-9-yl, benzyl-1,2,3,4-tetrahydrocarbazol-9-yl, (trifluoromethyl)-1,2,3,4-tetrahydrocarbazol-9-yl, cyclopropyl-1,2,3,4-tetrahydrocarbazol-9-yl, cyclobutyl-1,2,3,4-tetrahydrocarbazol-9-yl, cyclopentyl-1,2,3,4-tetrahydrocarbazol-9-yl, cyclohexyl-1,2,3,4-tetrahydrocarbazol-9-yl, cyoloheptyl-1,2,3,4-tetrahydrocarbazol-9-yl, cyclooctyl-1,2,3,4-tetrahydrocarbazol-9-yl, cyclononyl-1,2,3,4-tetrahydrocarbazol-9-yl, cyclodecyl-1,2,3,4-tetrahydrocarbazol-9-yl, cycloundecyl-1,2,3,4-tetrahydrocarbazol-9-yl, cyclododecyl-1,2,3,4-tetrahydrocarbazol-9-yl, methylphenyl-1,2,3,4- tetrahydrocarbazol-9-yl, methyltolyl-1,2,3,4-tetrahydrocarbazol-9-yl, methylbenzyl-1,2,3,4-tetrahydrocarbazol-9-yl, methyl(trifluoromethyl)-1,2,3,4-tetrahydrocarbazol-9-yl, methylcyclopropyl-1,2,3,4-tetrahydrocarbazol-9-yl, methylcyclobutyl-1,2,3,4-tetrahydrocarbazol-9-yl, methylcyclopentyl-1,2,3,4-tetrahydrocarbazol-9-yl, methylcyclohexyl-1,2,3,4-tetrahydrocarbazol-9-yl, methylcycloheptyl-1,2,3,4-tetrahydrocarbazol-9-yl, methylcyclooctyl-1,2,3,4-tetrahydrocarbazol-9-yl, methylcyclononyl-1,2,3,4-tetrahydrocabazol-9-yl, methylcyclodecyl-1,2,3,4-tetrahydrocarbazol-9-yl, methylcycloundecyl-1,2,3,4-tetrahydrocarbazol-9-yl, methylcyclododecyl-1,2,3,4-tetrahydrocarbazol-9-yl, diethyl-1,2,3,4-tetrahydrocarbazol-9-yl, dipropyl-1,2,3,4-tetrahydrocarbazol-9-yl, dibutyl-1,2,3,4-tetrahydrocarbazol-9-yl, dipentyl-1,2,3,4-tetrahydrocarbazol-9-yl, dihexyl-1,2,3,4-tetrahydrocarbazol-9-yl, benzoimidazol-1-yl, methylbenzoimidazol-1-yl, dimethylbenzoimidazol-1-yl, trimethylbenzoimidazol-1-yl, tetramethylbenzoimidazoi-1-yl, pentamethylbenzoimidazol-1-yl, ethylbenzoimidazol-1-yl, propylbenzoimidazol-1-yl, butylbenzoimidazol-1-yl, pentylbenzoimidazol-1-yl, hexylbenzoimidazol-1-yl, heptylbenzoimidazol-1-yl, octylbenzoimidazol-1-yl, nonylbenzoimidazol-1-yl, decylbenzoimidazol-1-yl, undecylbenzoimidazol-1-yl, dodecylbenzoimidazol-1-yl, methylethylbenzoimidazol-1-yl, methylpropylbeuzoimidazol-1-yl, methylbutylbenzoimidazol-1-yl, methylpontylbenzoimidazol-1-yl, methylhexylbenzoimidazol-1-yl, methylheptylbenzoimidazol-1-yl, methyloctylbenzoimidazol-1-yl, methylnonylbenzoimidazol-1-yl, methyldecylbenzoimidazol-1-yl, methylundecylbenzoimidazol-1-yl, methyldodecylbenzoimidazol-1-yl, phenylbenzoimidazol-1-yl, tolylbehzoimidazol-1-yl, benzylbenzoimidazol-1-yl, (trifluoromethyl)benzoimidazal-1-yl, cyclopropylbeuzoimidazol-1-yl, cyclobutylbenzoimidazol-1-yl, cyclopentylbenzoimidazol-1-yl, cyclohexylbenzoimidazol-1-yl, cycloheptylbenzaimidazol-1-yl, cyclooctylbenzoimidazol-1-yl, cyclononylbenzoimidazol-1-yl, cyclodecylbeuzoimidazol-1-yl, cycloundecylbenzoimidazol-1-yl, cyclododecylbenzoimidazol-1-yl, methylphenylbenzoimidazol-1-yl, methyltolylbenzoimidazol-1-yl, methylbenzylbenzoimidazol-1-yl, methyl(trifluoromethyl)benzoimidazol-1-yl, methylcyclopropylbenzoimidazol-1-yl, methylcyclobutylbenzoimidazol-1-yl, methylcyclopentylbenzoimidazol-1-yl, methylcyclohexylbenzoimidazol-1-yl, methylcycloheptylbenzoimidazol-1-yl, methylcyclooctylbenzoimidazol-1-yl, methylcyclononylbenzoimidazol-1-yl, methylcyclodecylbenzoimidazol-1-yl, methylcycloundecylbenzoimidazol-1-yl, methylcyclododecylbenzoimidazol-1-yl, diethylbenzoimidazol-1-yl, dipropylbenzoimidazol-1-yl, dibutylbenzoimidazol-1-yl, dipentylbenzoimidazol-1-yl, dihexylbenzoimidazol-1-yl, indazol-1-yl, methylindazol-1-yl, dimethylindazol-1-yl, trimethylindazol-1-yl, tetramethylindazol-1-yl, pentamethylindazol-1-yl, ethylindazol-1-yl, propylindazol-1-yl, butylindazol-1-yl, pentylindazol-1-yl hexylindazol-1-yl, heptylindazol-1-yl, octylindazol-1-yl, nonylindazol-1-yl, decylindazol-1-yl, undecylindazol-1-yl, dodecylindazol-1-yl, methylethylindazol-1-yl, methylpropylindazol-1-yl, methylbutylindazol-1-yl, methylpentylindazol-1-yl, methylhexylindazol-1-yl, methylheptylindazol-1-yl, methyloctylindazol-1-yl, methylnonylindazol-1-yl, methyldecylindazol-1-yl, methylundecylindazol-1-yl, methyldodecylindazol-1-yl, phenylindazol-1-yl, tolylindazol-1-yl, benzylindazol-1-yl, (trifluoromethyl)indazol-1-yl, cyclopropylindazol-1-yl, cyclobutylindazol-1-yl, cyclopentylindazol-1-yl, cyclohexylindazol-1-yl, cycloheptylindazol-1-yl, cyclooctylindazol-1-yl, cyclononylindazol-1-yl, cyclodecylindazol-1-yl, cycloundecylindazol-1-yl, cyclododecylindazol-1-yl, methylphenylindazol-1-yl, methyltolylindazol-1-yl, methylbenzylindazol-1-yl, methyl(trifluoromethyl)indazol-1-yl, methylcyclopropylindazol-1-yl, methylcyclobutylindazol-1-yl, methylcyclopentylindazol-1-yl, methyloyclohexylindazol-1-yl, methylcyoioheptylindazol-1-yl, methylcyclooctylindazol-1-yl, methylcyclononylindazol-1-yl, methylcyclodecylindazol-1-yl, methylcycloundecylindazol-1-yl, methylcyclododecylindazol-1-yl, diethylindazol-1-yl, dipropylindazol-1-yl, dibutylindazol-1-yl, dipentylindazol-1-yl, dihexylindazol-1-yl, benzotriazol-1-yl, methylbenzotriazol-1-yl, dimethylbenzotriazol-1-yl, trimethylbeuzotriazol-1-yl, tetramethylbenzotriazol-1-yl, ethylbenzotriazol-1-yl, propylbenzotriazol-1-yl, butylbenzotriazol-1-yl, pentylbenzotriazol-1-yl, hexylbenzotriazol-1-yl, heptylbenzotriazol-1-yl, octylbenzotriazol-1-yl, nonylbenzotriazol-1-yl, decylbenzotriazol-1-yl, undecylbenzotriazol-1-yl, dodecylbenzotriazol-1-yl, methylethylbenzotriazol-1-yl, methylpropylbenzotriazol-1-yl, miethylbutylbenzotriazol-1-yl, methylpentylbcnzotriazol-1-yl, methylhexylbenzotriazol-1-yl, miethylheptylbenzotriazol-1-yl, methyloctylbenzotriazol-1-yl, methylnonylbenzotri azol-1-yl, methyldecylbenzotriazol-1-yl, methylundecylbenzotriazol-1-yl, methyldodecylbenzotriazol-1-yl, phenylbenzotiazol-1-yl, tolylbenzotriazol-1-yl, benzylbenzotriazol-1-yl, (trifluoromethyl)benzotriazol-1-yl, cyclopropylbenzotriazol-1-yl, cyclobutylbenzotriazol-1-yl, cyclopentylbenzotriazol-1-yl, cyclohexylbenzotriazol-1-yl, cycloheptylbenzotriazol-1-yl, cyclooctylbenzotriazol-1-yl, cyclononylbenzotriazol-1-yl, cyclodecylbenzotriazol-1-yl, cycloundecylbenzotriazol-1-yl, cyclododecylbenzotriazol-1-yl, methylpbenylbenzotriazol-1-yl, methyltolylbenzotriazol-1-yl, methylbenzylbenzotriazol-1-yl, methyl(trifluoromethyl)benzotriazol-1-yl, methylcyclopropylbenzotriazol-1-yl, methylcyclobutylbenzotriazol-1-yl, methylcyclopentylbenzotriazol-1-yl, methylcyclohexylbenzotriazol-1-yl, methylcycloheptylbenzotriazol-1-yl, methylcyclooctylbenzotriazol-1-yl, methylcyclononylbcnzotriazol-1-yl, methylcyclodecylbenzotriazol-1-yl, methylcycloundecylbenzotriazol-1-yl, methylcyclododecylbenzotriazol-1-yl, diethylbenzotriazol-1-yl, dipropylbenzotriazol-1-yl, dibutylbenzotriazol-1-yl, dipentylbenzotriazol-1-yl, dihexylbenzotriazol-1-yl, dibenzophosphol-5-yl, methyldibenzophosphol-5-yl, dimethyldibenzophosphol-5-yl, timethyldibenzophosphol-5-yl, tetramethyldibenzophosphol-5-yl, pentamethyldibenzophosphol-5-yl, hexamethyldibenzophosphol-5-yl, heptamethyldibenzophosphol-5-yl, octamethyldibenzophasphol-5-yl, ethyldibenzophosphol-5-yl, propyldibenzophosphol-5-yl, butyldibenzophosphol-5-yl, pentyldibenzophosphol-5-yl, hexyldibcnzophosphol-5-yl, heptyldibenzophosphol-5-yl, octyldibenzophosphol-5-yl, nonyldibenzophosphol-5-yl, decyldibenzophosphol-5-yl, undecyldibenzophosphol-5-yl, dodecyldibenzophosphol-5-yl, methylethyldibenzophosphol-5-yl, methylpropyldibenzophosphol-5-yl, methylbutyldibenzophosphol-5-yl, methylpentyldibenzophosphol5-yl, methylhexyldibenzophosphol-5-yl, methylheptyldibenzophosphbol-5-yl, methyloctyldibenzophosphol-5-yl, methylnonyldibenzophosphol-5-yl, methyldecyldibenzophosphol-5-yl, methylundecyldibenzophosphol-5-yl, methyldodecyldibenzophosphol-5-yl, phenyldibenzophosphol-5-yl, tolyldibenzophosphol-5-yl, benzyldibenzophosphol-5-yl, (trifluoromethyl)dibenzophosphol-5-yl, cyclopropyldibenzophosphol-5-yl, cyclobutyldibenzophosphol-5-yl, cyclopentyldibenzophosphol-5-yl, cyclohexyldibenzophosphol-5-yl, cycloheptyldibenzophosphol-5-yl, cyclooctyldibenzophosphol-5-yl, cyclononyldibenzophosphol-5-yl, cyclodecyldibenzophosphol-5-yl, cyclundecdibenzophosphol-5-yl, cyclododecyldibenzophosphol-5-yl, niethylphenyldibenzophosphol-5-yl, methyltolyldibenzophosphol-5-yl, methylbenzyldibenzophosphol-5-yl, methyl (trifluoromethyl)dibenzophosphol-5-yl, methylcyclopropyldibenzophosphol-5-yl, methylcyclobutyldibenzophosphol-5-yl, methylcyclopentyldibenzophosphol-5-yl, methylcyclohexyldibenzophosphol-5-yl, methylcycloheptyldibenzophosphol-5-yl, methylcyclooctyldibenzophosphol-5-yl, methylcyclononyldibenzophosphol-5-yl, methylcyclodecyldibenzophosphol-5-yl, methylcycloundecyldibenzophosphol5-yl, methylcyclododecyldibenzophosphol-5-yl, diethyldibenzophosphol-5-yl, dipropyldibenzophosphol-5-yl, dibutyldibenzophosphol-5-yl, dipentyldibenzophosphol-5-yl, dihexyldibenzophosphol-5-yl, 1,2,3,4-tetrahydrocyclopenta [b]indol-4-yl, methyl-1,2,3,4-tetrahydrocyclopenta[b] indol-4-yl, dimethyl-1,2,3,4-tetrahydrocyclopenta[b] indol-4-yl, trimethyl-1,2,3,4-tetrahydrocyclopenta[b] indol-4-yl, ethyl-1,2,3,4-tetrahydxocyclopenta[b] indol-4-yl, propyl-1,2,3,4-tetrahydrocyclopenta[b] indol-4-yl, butyl-1,2,3,4-tetrahydzocyclopenta[b] indol-4-yl, pentyl-1,2,3,4-tetrahydiocyclopenta[b] indol-4-yl, hexyl-1,2,3,4-tetrahydrocyclopenta[b] indol-4-yl, heptyl-1,2,3,4-tetrahydrocyclopenta[b] indol-4-yl, octyl-1,2,3,4-tetrahydrocyclopenta[b]indol-4-yl, nonyl-1,2,3,4-tetrahydrocyclopenta[b]indol-4-yl, decyl-1,2,3,4-tetrahydrocyclopenta[b]indol-4-yl, undecyl-1,2,3,4-tetrahydrocyclopenta[b]indol-4-yl, dodecyl-1,2,3,4-tetrahydro cyclopenta[b]indol-4-yl, methylethyl-1,2,3,4-tetrahydrocyclopenta[b]indol-4-yl, methylpropyl -1,2,3,4-tetrahydrocyclopenta[b]indol-4-yl, methylbutyl -1,2,3,4-tetrahydrocyclopenta[b]indol-4-yl, methylpentyl -1,2,3,4-tetrahydrocyclopenta[b]indol-4-yl, methylhexyl -1,2,3,4-tetrahydrocyclopenta[b] indol-4-yl, methylheptyl -1,2,3,4-tetrahydrocyclopenta [b]indol-4-yl, methyloctyl -1,2,3,4-tetrahydrocyclopenta[b]indol-4-yl, methylnonyl -1,2,3,4-tetrahydrocyclopenta[b]indol-4-yl, methyldecyl -1,2,3,4-tetrahydrocyclopenta[b]indol-4-yl, methylundecyl -1,2,3,4-tetrahydrocyclopenta[b]indol-4-yl, methyldodecyl -1,2,3,4-tetrahydxocyctopenta[b]indol-4-yl, phenyl-1,2,3,4-tetrahydrocyclopenta[b]indol-4-yl, tolyl-1,2,3,4-tetrahydrocyclopenta[b]indol-4-yl, benzyl-1,2,3,4-tetrahydrocyclopenta[b]indol-4-yl, (trifluoromethyl), 1,2,3,4-tetrahydrocyclopenta[b]indol-4-yl, cyclopropyl -1,2,3,4-tetrahydrocyclopenta[b]indol-4-yl, cyclobutyl -1,2,3,4-tetrahydrocyclopenta[b]indol-4-yl, cyclopentyl -1,2,3,4-tetrahydrocyclopenta[b] indol-4-yl, cyclohexyl -1,2,3,4-tetrahydrocyclopenta [b]indol-4-yl, cycloheptyl -1,2,3,4-tetrahydrocyclopenta [b]indol-4-yl, cyclooctyl -1,2,3,4-tetrahydrocyclopenta [b]indol-4-yl, cyclononyl -1,2,3,4-tetrahydrocyclopenta[b]indol-4-yl, cycloclecyl -1,2,3,4-tetrahydroeyclopenta[b]indol-4-yl, cycloundecyl -1,2,3,4-tetrahydrocyclopenta[b]indol-4-yl, cyclododecyl -1,2,3,4-tetrahydrocyclopenta[b]indol-4-yl, methylphenyl -1,2,3,4-tetrahydrocyclopenta[b]indol-4-yl, methyltolyl -1,2,3,4-tetrahydrocyclopenta[b]indol-4-yl, methylbenzyl -1,2,3,4-tetrahydrocyclopenta[b]indol-4-yl, methyl(trifluoromethyl) -1,2,3,4-tetrahydrocyclopenta[b]indol-4-yl, methylcyclopropyl -1,2,3,4-tetrahydrocyclopenta[b]indol-4-yl, methylcyclobutyl -1,2,3,4-tetrahydrocyclopenta[b]indol-4-yl, methylcyclopentyl -1,2,3,4-tetrahydrocyclopenta[b]indol-4-yl, methylcyclohexyl -1,2,3,4-tetrahydrocyclopenta[b]indol-4-yl, methylcycloheptyl -1,2,3,4-tetrahydrocyclopenta[b]indol-4-yl, methylcyclooctyl -1,2,3,4-tetrahydrocyclopenta[b]indol-4-yl, methylcyclononyl -1,2,3,4-tetrabydrocyclopenta[b]indol-4-yl, methylcyclodecyl -1,2,3,4-tetrahydroeyciopenta[b]indol-4-yl, methylcycloundecyl -1,2,3,4-tetrahydrocyclopenta[b]indol-4-yl, methylcyclododecyl -1,2,3,4-tetrahydrocyclopenta [b]indol-4-yl, diethyl-1,2,3,4-tetrahydrocyclopenta[b] indol-4-yl, dipropyl-1,2,3,4-tetrahydrocyclopenta[b] indol-4-yl, dibtityl-1,2,3,4-tetrahydrocyclopenta[b] indol-4-yl, dipentyl-1,2,3,4-tetrahydrocyclopenta[b] indol-4-yl, dihoxyl-1,2,3,4-tetrahydrocyclopenta[b] indol-4-yl, tetrahydro-8-phospha-cyclopenta[a]inden-1-yl, phenothaizin-10-yl, methylphenothaizin-10-yl, dimethylphenothaizin-10-yl, trimetliylphenothaizin-10-yl, ethylphenothaizin-10-yl, propylphenothaizin-10-yl, butylphenothaizin-10-yl, pentylphenothaizin-10-yl, hexylphenothaizin-10-yl, heptylphenofflaizin-10-yl, octylphenothaizin-10-yl, nonylphenothaizin-10-yl, decylphenotbaizin-10-yl, undecylphenothaizin-10-yl, dodecylphenothaizin-10-yl, methylethylphenothaizin-10-yl, niethylpropylphenothaizin-10-yl, methylbutylphenothaizin-10-yl, methylpentylphenothaizin-10-yl, niethylhexylphenothaizin-10-yl, methyllieptylphenothaizin-10-yl, methyloctylphenothaizin-10-yl, methylnomylphenothaizin-10-yl, methyldecylphenothaizin-10-yl, methylundecylphenothaizin-10-yl, methyldodecylphenothaizin-10-yl, phenylphenothaizin-10-yl, tolylphenothaizin-10-yl, benzylphenothaizin-10-yl, (trifluoromethyl)phenothaizin-10-yl, cyclopropylphenothaizin-10-yl, cyclobutylphenothaizin-10-yl, cycopentylphenothaizin-10-yl, cyclohexylphenothaizin-10-yl, cycloheptylphenothaizin-10-yl, cyclooctylphenothaizin-10-yl, cyclononylphenothaizin-10-yl, cyclodecylphenothaizin-10-yl, cycloundecylphenothaizin-10-yl, cyclododecylphenothaizin-10-yl, methylphenylphenothaizin-10-yl, methyltolylphenothaizin-10-yl, methylbenzylphenothaizin-10-yl, methyl(trifluoromethyl)phenothaizin-10-yl, methylyclopropylphenothaizin-10-yl, methylcyclobutylphenothaizin-10-yl, methylcyclopentylphenothaizin-10-yl, methylcyclobexylphenothaizin-10-yl, methylcycloheptylphenothaizin-10-yl, methylcyclooctylphenothaizin-10-yl, methylcyclononylphenothaizin-10-yl, methylcyclodecylphenothaizin-10-yl, methylcycloundecylphcnothaizin-10-yl, methylcyclododecylphenothaizin-10-yl, diethylphenothaizin-10-yl, dipropylphenothaizin-10-yl, dibutylplienothaizin-10-yl, dipentylphenothaizin-10-yl, dihexylphenothaizin-10-yl, phenoxazin-10-yl, methylphenoxazin-10-yl, dimethylphenoxazin-10-yl, trimethylphenoxazin-10-yl, ethylphenoxazin-10-yl, propylphenoxazin-10-yl, butylphenoxazin-10-yl, pentylphenoxazin-10-yl, hexylphenoxazin-10-yl, heptylphenoxazin-10-yl, octylphenoxazin-10-yl, nonylplienoxazin-10-yl, decylphenoxazin-10-yl, undecylphenoxazin-10-yl, dodecylphenoxazin-10-yl, methylethylphenoxazin-10-yl, methylpropylphenoxazin-10-yl , mthylbutylphenoxazin-10-yl, methylpentylphenoxazin-10-yl, methylbexylphenoxazin-10-yl, methylheptylphenoxazin-10-yl, methyloctylphenoxazin-10-yl, methylnonylphenoxazin-10-yl, methyldecylphenoxazin-10-yl, methylundecylphenoxazin-10-yl, methyldodecylphenoxazin-10-yl, phenylphenoxazin-10-yl, tolylphenoxazin-10-yl, benzylphenoxazin-10-yl, (trifluoromethyl)phenoxazin-10-yl, cyclopropylphenoxazin-10-yl, cyclobutylphenoxazin-10-yl, cyclopentylphenoxazin-10-yl, cyclohexylphenoxazin-10-yl, cycloheptylphenoxazin -10-yl, cyclooctylphenoxazin-10-yl, cyclononylphenoxazin-10-yl, cyclodecylphenoxazin-10-yl, cycloundecylphenoxazin-10-yl, cyclododecylphenoxazin-10-yl, methylphenylphenoxazin-10-yl, methyltolylphenoxazin-10-yl, methylbenzylphenoxazin-10-yl, methyl(trifluoromethyl)phenoxazin-10-yl, methylcyclopropylphenoxazin-10-yl, methylcyclobutylphenoxazin-10-yl, methylcyclopentylphenoxazin-10-yl, methylcyclohexylphenoxazin-10-yl, methylcycloheptylphenoxazin-10-yl, methylcyclooctylphenoxazin-10-yl, methylcyclononylphenoxazin-10-yl, methylcyclodecylphenoxazin-10-yl, methylcycloundecylphenoxazin-10-yl, methylcyclododecylphenoxazin-10-yl, diethylphenoxazin-10-yl, dipropylphenoxazin-10-yl, dibutylphenoxazin-10-yl, dipentylphenoxazin-10-yl, dihexylphenoxazin-10-yl, phenoselenazin-10-yl, phenotellurazin-10-yl, 4H-[1,4]oxazin-4-yl, methyl-4H-[1,4]oxazin-4-yl, dimethyl-4H-[1,4]oxazin-4-yl, trimethyl-4H-[1,4]oxazin-4-yl, tetramethyl-4H-[1,4]oxazin-4-yl, ethyl-4H-[1,4]oxazin-4-yl, propyl-4H-[1,4]oxazin-4-yl, butyl-4H-[1,4]oxazin-4-yl, pentyl-4H-[1,4]oxazin-4-yl, hexyl-4H-[1,4]oxazin-4-yl, heptyl-4H-[1,4]oxazin-4-yl, octyl-4H-[1,4]oxazin-4-yl, nonyl-4H-[1,4]oxazin-4-yl, decyl-4H-[1,4]oxazin-4-yl, undecyl-4H-[1,4]oxazin-4-yl, dodecyl-4H-[1,4]oxazin-4-yl, methylethyl-4H-[1,4]oxazin-4-yl, methylpropyl-4H-[1,4]oxazin-4-yl, methylbutyl -4H-[1,4]oxazin-4-yl, methylpentyl-4H-[1,4]oxazin-4-yl, methylhexyl-4H-[1,4]oxazin -4-yl, methylheptyl-4H-[1,4]oxazin-4-yl, methyloctyl-4H-[1,4]oxazin-4-yl, methylnonyl-4H-[1,4]oxazin-4-yl, methyldecyl-4H-[1,4]oxazin-4-yl, methylundecyl -4H-[1,4]oxazin-4-yl, methyldodecyl-4H-[1,4]oxazin-4-yl, phenyl-4H-[1,4]oxazin-4-yl, tolyl-4H-[1,4]oxazin-4-yl, benzyl-4H-[1,4]oxazin-4-yl, (trifluoromecthyl)-4H-[1,4]oxazin-4-yl, cyclopropyl-4H-[1,4]oxazin-4-yl, cyclobutyl-4H-[1,4]oxazin-4-yl, cyclopentyl-4H-[1,4]oxazin-4-yl, cyclohexyl-4H-[1,4]oxazin-4-yl, cycloheptyl-4H-[1,4]oxazin-4-yl, cyclooctyl-4H-[1,4]oxazin-4-yl, cyclononyl-4H-[1,4]oxazin-4-yl, oyclodecyl-4H-[1,4]oxazin-4-yl, cycloundecyl-4H-[1,4]oxazin-4-yl, cyclododecyl-4H -[1,4]oxazin-4-yl, methylphenyl-4H-[1,4]oxazin-4-yl, methyltolyl-4H-[1,4]oxazin-4-yl, methylbenzyl-4H-[1,4]oxazin-4-yl, methyl(trifluoromethyl)-4H-[1,4]oxazin-4-yl, methylcyclopropyl-4H-[1,4]oxazin-4-yl, methylcyclobutyl-4H-[1,4]oxazin-4-yl, methylcyclopentyl-4H-[1,4]oxazin-4-yl, methyloyclohexyl-4H-[1,4]oxazin-4-yl, methylcyolohcpcyl-4H-[1,4]oxazin-4-yl, methylcyclooctyl-4H-[1,4]oxazin-4-yl, methylcyclononyl-4H-[1,4]oxazin-4-yl, methylcyclodecyl-4H-[1,4]oxazin-4-yl, methylcycloundecyl-4H-[1,4]oxazin-4-yl, methyloyclododecyl-4H-[1,4]oxazin-4-yl, diethyl-4H-[1,4]oxazin-4-yl, diprapyl-4H-[1,4]oxazin-4-yl, dibutyl-4H-[1,4]oxazin -4-yl, dipentyl-4H-[1,4]oxazin-4-yl, dihexyl-4H-[1,4]oxaizin-4-yl, 4H-[1,4]thiazin-4-yl, methyl-4H-[1,4]thiazhi-4-yl, dimethyl-4H-[1,4]thiazin-4-yl, trimethyl-4H -[1,4]thiazin-4-yl, tetramethyl-4H-[1,4]thiazin-4-yl, ethyl-4H-[1,4]thiazin-4-yl, propyl-4H-[1,4]thiazin-4-yl, butyl-4H-[1,4]thiazin-4-yl, pentyl-4H-[1,4]thiazin-4-yl, hexyl-4H-[1,4]thiazin-4-yl, heptyl-4H-[1,4]thiazin-4-yl, octyl-4H-[1,4]thiazin-4-yl, nonyl-4H-[1,4]thiazin-4-yl, decyl-4H-[1,4]thiazin-4-yl, undecyl-4H-[1,4]thiazin-4-yl, dodecyl-4H-[1,4]thiazin-4-yl, methylethyl-4H-[1,4]thiazin-4-yl, methylpropyl-4H -[1,4]thiazin-4-yl, methylbutyl-4H-[1,4]thiazin-4-yl, methylpentyl-4H-[1,4]thiazin-4-yl, methylhexyl-4H-[1,4]thiazin-4-yl, methylheptyl-4H-[1,4]thiazin-4-yl, methyloctyl -4H-[1,4]thiazin-4-yl, methylnonyl-4H-[1,4]thiazin-4-yl, methyldecyl-4H-[1,4]thiazin-4-yl, methylundecyl-4H-[1,4]thiazin-4-yl, methyldodecyl-4H-[1,4]thiazin-4-yl, phenyl-4H-[1,4]thiazin-4-yl, tolyl-4H-[1,4]thiazin-4-yl, benzyl-4H-[1,4]thiazin-4-yl, (triluoromethyl)-4H-[1,4]thiazin-4-yl, cyclopropyl-4H-[1,4]thiazin-4-yl, cyclobutyl -4H-[1,4]thiazin-4-yl, cyclopentyl-4H-[1,4]thiazin-4-yl, cyclohexyl-4H-[1,4]thiazin -4-yl, cycloheptyl-4H-[1,4]thiazin-4-yl, cyclooctyl-4H-[1,4]thiazin-4-yl, cyclononyl-4H -[1,4]thiazin-4-yl, cyclodcyl-4H-[1,4]thiazin-4-yl, cycloundecyl-4H-[1,4]thiazin-4-yl, cyclododecyl-4H-[1,4]thiazin-4-yl, methylphenyl-4H-[1,4]thiazin-4-yl, meniethyltolyl -4H-[1,4]thiazin-4-yl, methylbenzyl-4H-[1,4]thiazin-4-yl, methyl(trifloromethyl)-4H-[1,4]thiazin-4-yl, methylcyclopropyl-4H-[1,4]thiazin-4-yl, methylcyclobutyl-4H-[1,4]thiazin-4-yl, methyl cyclopentyl-4H-[1,4]thiazin-4-yl, methylcyclohexyl-4H-[1,4]thiazin-4-yl, methylcycloheptyl-4H-[1,4]thiazin-4-yl, methyleyclaoetyl-4H -[1,4]thiazin-4-yl, methylcyclononyl-4H-[1,4]thiazin-4-yl, methylyelodecyl-4H -[1,4]thiazin-4-yl, methylcycloundecyl-4H-[1,4]thiazin-4-yl, methylcyclododecyl-4H -[1,4]thiazin-4-yl, diethyl-4H-[1,4]thiazin-4-yl, dipropyl-4H-[1,4]thiazin-4-yl, dibutyl-4H-[1,4]thiazin-4-yl, dipentyl-4H-[1,4]thiazin-4-yl, dihexyl-4H-[1,4]thiazin-4-yl, 4H-[1,4]selenazin-4-yl, methyl-4H-[1,4]selenazin-4-yl, dimethyl-4H-[1,4]selenazin-4-yl, trimethyl-4H-[1,4]selenazin-4-yl, tetrancthyl-4H-[1,4]selenazin-4-yl, 4H -[1,4]tellurazin-4-yl, methyl-4H-[1,4]tellurazin-4-yl, dimethyl-4H-[1,4]tellurazin-4-yl, trimethyl-4H-[1,4]tellurazin-4-yl, tetramethyl-4H-[1,4]tellurazin-4-yl, 4H-1H-pyridin -1-yl-4-thione, methyl-1H-pyridin-1-yl-4-thione, dimethyl-1H-pyridin-1-yl-4-thione, trimethyl-1H-pyridin-1-yl-4-thione, tetramethyl-1H-pyridin-1-yl-4-thione, 1H -pyridin-1-yl-4-one, methyl-1H-pyridin-1-yl-4-one, dimethyl-1H-pyridin-1-yl-4-one, trimethyl-1H-pyridin-1-yl-4-one, tetramethyl-1H-pyridin-1-yl-4-one, 1H-pyridin-1-yl-4-selone, methyl-1H-pyridin-1-yl-4-selone, dimethyl-1H-pyridin-1-yl-4-selone, trimethyl-1H-pyridin-1-yl-4-selone, tetTaxrietbyl-1H-pyridin-1-yl-4-selone, 1H -pyridin-1-yl-4-tellone, methyl-1H-pyrildin-1-yl-4-tellone, dimethyl-1H-pyridin-1-yl-4-tellone, trimethyl-1H-pyridin-1-yl-4-tellone, tetramethyl-1H-pyridin-1-yl-4-tellone, benzoazaphosphol-1-yl, benzoazaphosphol-3-yl, benzodiazaphosphol-1-yl, benzodiazaphosphol-3-yl, bcnzoazadiphosphol-1-yl, bcnzoazadiphosphoi-3-yl, 1,2,3, 4-tetrahydro-dibenzophosphol-5-yl, 1,2,3,8-tetrahydro-8-phosphacyclopenta[a]inden-8-yl, tetrazol-1-yl, methyhetrazol-1-yl, ethyltetrazol-1-yl, propyltetrazol-1-yl, butyltetrazol-1-yl, pentyltetrazol-1-yl, hexyltetrazol-1-yl, phenyltetrazol-1-yl, tetrazol-2-yl, methyltetrazol-2-yl, ethyltetrazol-2-yl, propyltetrazol-2-yl, butyltetrazol-2-yl, pentyltetrazol-2-yl, hexyltetrazol-2-yl, and phenyltetrazol-2-yl;

and additionally, B maybe substituted with 0, 1, 2, 3, 4, 5 or 6 R groups, where each R is, independently selected from the group consisting of:

hydrogen, methyl, ethyl, propyl, butyl, pentyl, hexyl, heptyt, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, vinyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decyrryl, undecynyl, dodecynyt, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, triacontynyl, cyclopropyl, cyclobutyl, cyclopentyl, cyclohexyl, cycloheptyl, cyclooctyl, cyclononyl, cyclodecyl, cycloundecyl, cyclododecyl, cyclotetradecyl, cyclopentenyl, cyclohexenyl, cycloheptenyl, cyclooctenyl, cyclodecenyl, cyclododeccnyl, methylcyclohexyl, ethylcyclohexyl, propylcyclohexyl, dimethylcyclohexyl, diethylcyclohexyl, dipropylcyclohexyl, phenyl, tolyl, mesityl, ethylphenyl, propylphenyl, butylphenyl, pentylphenyl, hexylphenyl, dimethylphenyl, trimerhylphenyl, diethylphenyl, diethylmethylphenyl, dipropylphenyl, dipropylmethylphenyl, benzyl, phenethyl, napthyl, norbornyl, adamantyl, trifluoromethyl, methyltrifluoromethyl, trimethylsilyl, trimethylzermyl, trimethylstannyl, trimethylsilylmethyl, trimethylgermybnethyl, trimethylstannyl, methyl, methoxymethyl, ethoxylnethyl, propoxymethyl, butoxymethyl, phenoxymethyl, methylsulfanyl, ethylsulfanyl, propylsulfanyl, butylsulfanyl, phenylsulfanyl, dimethylaminomethyl, dimethylaminoethyl, diphenylaminomethyl, diphenylaminoethyl, phenylaminomethyl, phenylaminoethyl, methylaminomethyl, diniethylphosphinomethyl, dimethylphosphinoethyl, diphenylphosphinomethyl, phenylphosphinoethyl, methylphosphinornetbyl, perfluoroethyl, perfluoropropyl, perfluorobutyl, perfluoropentyl, perfluorohexyl, perfluoroheptyl, perfluorooctyl, perfluorononyl, perfluorodecyl, perfluoroundecyl, perfluorododecyl, perfluorotridecyl, perthtorotetradecyl, periluoropentadecyl, perfluorohexadecyl, perfluoroheptadecyl, perfluorooctadecyl, perfluorouonadecyl, perfluoroeicosyl, fluoromethyl, fluoroethyl, fluoropropyl, fluorobutyl, fluoropentyl, fluorohexyl, fluoroheptyl, fluorooctyl, fluorononyl, fluorodecyl, fluoroundecyl, fluorododecyl, fluorotridecyl, fluorotetradecyl, fluoropentadecyl, fluorohexadecyl, fluoroheptadecyl, fluorooctadecyl, fluorononadecyl, fluoroeicosyl, thienyl, furanyl, pyrrolyl, phospholyl, methylthienyl, methylfuranyl, methylpyrrolyl, methylphospholyl, ethylthienyl, ethylfuranyl, ethylpyrrolyl, ethylphospholyl, propylthienyl, propylfuranyl, propylpyrrolyl, propylphospholyl, butylthienyl, butylfuranyl, butylpyrrolyl, butylphospholyl, pentylthienyl, pentylfuranyl, pentylpyrrolyl, penylphospholyl, hexylthienyl, hexylfuranyl, hexylpyrrolyl, hexylphospholyl, heptylthienyl, heptylfuranyl, heptylpyrrolyl, heptylphospholyl, octylthienyl, octylfuranyl, octylpyrrolyl, octylphospholyl, nonylthienyl, nonylfuranyl, nonylpyrrolyl, nonylphospholyl, decylthienyl, decylfuranyl, decylpyrrolyl, decylphospholyl, undecylthienyl, undecylfuranyl, undecylpyrrolyl, undecylphospholyl, dodecylthienyl, dodecylfuranyl, dodecylpyrrolyl, dodecylphosphotyl, dimethylthienyl, dimethylfuranyl, dimethylpyrrolyl, dimethylphospholyl, diethylthienyl, diethylfuranyl, diethylpyrrolyl, diethylphospholyl, dipropylthienyl, dipropylfuranyl, dipropylpyrrolyl, dipropylphospholyl, dibutylthienyl, dibutylfuranyl, dibutylpyrrolyl, dibutylphospholyl, dipentylthienyl, dipentylfuranyl, dipentylpyrrolyl, dipenylphospholyl, dihexylthienyl, dihexylfuranyl, dihexylpyrrolyl, dihexylphospholyl, trinmethythienyl, trimethylfuranyl, trimethylpyrrolyl, trimethylphospholyl, benzothiopheneyl, benzofuranyl, phenylthienyl, phenylfuranyl, phenylpyrrolyl, phenylphospholyl, tolylthienyl, tolylfuranyl, tolylpyrrolyl, tolylphospholyl, mesitylthienyl, mesitylfuranyl, mesitylpyrrolyl, mesitylphospholyl, fluorophenyl, difluorophenyl, trifluorophenyl, tetrafluorophenyl, pentafluorophenyl, trifluoromethylphenyl, fluorobenzyl, difluorobenzyl, trifluorobenzyl, tetrafluorobenzyl, pentafluorobenzyl, and trifluoromethylbenzyl;

A is independently selected from the group consisting of: cyclopenta[b]thienyl, oyclopenta[b]furanyl, cyclopenta[b]selenophenyl, cyclopenta[b]tellurophenyl, cyclopenta[b]pyrrolyl, cyclopenta[b]phospholyl, cyclopenta[b]arsolyl, cyclopenta[b]stibolyl, methylcyclopenta[b]thienyl, methylcyclopenta[b]furanyl, methylcyclopenta[b]selenophenyl, methytcyclopenta[b]tellurophenyl, methylcyclopenta[b]pyrrolyl, methylcyclopenta[b]phospholyl, methylcyclopenta[b]arsolyl, methylcyclopenta[b]stibolyl, dimethyleyclopenta[b]thienyl, dimethylcyclopenta[b]furanyl, dimethylcyclopenta[b]pyrrolyl, dimethylcyclopenta[b]phospholyl, trimethylcyclopenta[b]thienyl, trimethylcyclopenta[b]furanyl, trimethylcyclopenta[b]pyrrolyl, trimethylcyclopenta[b]phospholyl, tetramethylcyclopenta[b]thienyl, tetramethylcyclopenta[b]furanyl, tetramethylcyclopenta[b]pyrrolyl, tetramethylcyclopenta[b]phospholyl, pentamethylcyclopenta[b]thienyl, pentamethylcyclopenta[b]furanyl, pentamethylcyclopenta[b]pyrrolyl, pentamethylcyclopenta[b]phospholyl, hexamethylcyclopenta[b]pyrrolyl, hexamethylcyclopenta[b]phospholyl, ethylcyclopenta[b]thienyl, ethylcyclopenta[b]furanyl, ethylcyclopenta[b]pyrrolyl, ethylcyclopenta[b]phospholyl, diethylcyclopenta[b]thienyl, diethylcyclopenta[b]furanyl, diethylcyclopenta[b]pyrrolyl, diethylcyclopenta[b]phospholyl, triethylcyclopenta[b]thienyl, triethylcyclopenta[b]furanyl, triethylcyclopenta[b]pyrrolyl, triethylcyclopenta[b]phospholyl, propylcyclopenta[b]thienyl, propylcyclopenta[b]fuxanyl, propylcyclopenta[b]pyrrolyl, propylcyclopenta[b]phospholyl, dipropylcyclopenta[b]thienyl, dipropylcyclopenta[b]furanyl, dipropylcyclopenta[b]pyrrolyl, dipropylcyclopenta[b]phospholyl, tripropylcyclopenta[b]thienyl, tripropylcyclopenta[b]thienyl, tripropylcyclopenta[b]pyrrolyl, tripropylcyclopenta[b]phospholyl, butylcyclopenta[b]

thienyl, butylcyclopenta[b]furanyl, butylcyclopenta[b] pyrrolyl, butylcyclopenta[b]phospholyl, dibutylcyclopenta[b]thienyl, dibutylcyclopenta[b]furanyl, dibutylcyclopenta[b]pyrrolyl, dibutyloyclopenta[b] phospholyl, tributylcyclopenta[b]thienyl, tributylcyclopenta[b]furanyl, tributylcyclopenta[b]pyrrolyl, tributylcyclopenta[b]phospholyl, ethylmethylcyclopenta[b]thienyl, ethylmethylcyclopenta[b]furanyl, ethylmethylcyclopenta[b]furanyl, ethylmethylcyclopenta [b]phospholyl, methylpropylcyclopenta[b]thienyl, methylpropylcyclopenta[b]furanyl, methylpropylcyclopenta[b]furanyl, methylpropylcyclopenta[b]phospholyl, butylmethylcyclopenta[b]thienyl, butylmethylcyclopenta[b]furanyl, butylmethylcyclopenta[b] pyrrolyl, butylmethylcyclopenta[b]phospholyl, cyclopenta[c]thienyl, cyclopenta[c]furanyl, cyclopenta [c]selenophenyl, cyclopenta[c]tellurophenyl, cyclopenta[c]pyrrolyl, cyclopenta[c]phospholyl, cyclopenta [c]arsolyl, cyclopenta[c]stibolyl, methylcyclopenta[c] thienyl, methylcyclopenta[c]thienyl, methylcyclopenta [c]selenophenyl, methylcyclopenta[c]tellurophenyl, methylcyclopenta[c]pyrrolyl, methylcyclopenta[c] phospholyl, methylcyclopenta[c]arsolyl, methylcyclopenta[c]stiboyl, dimethylcyclopenta[c]thienyl, dimethylcyclopenta[c]furanyl, dimethylcyclopenta[c]furanyl, dimethylcyclopenta[c]phospholyl, trimethylcyclopenta [c]thienyl, trimethylcyclopenta[c]furanyl, trimethylcyclopenta[c]pyrrolyl, trimethylcyclopenta[c]phospholyl, tetramethylcyclopenta[c]thienyl, tetramethylcyclopenta[c]furanyl, tetramethylcyclopenta[c]pyrrolyl, tetramethylcyclopenta[c]phospholyl, pentaamethylcyclopenta[c]thienyl, pentamethylcyclopenta[c]furanyl, pentamethylcyclopenta[c]pyrrolyl, pentamethylcyclopenta[c]phospholyl, hexamethylcyclopenta[c]pyrrolyl, hexamethylcyclopenta[c]phospholyl, ethylcyclopenta [c]thienyl, ethylcyclopenta[c]thienyl, ethylcyclopenta [c]pyrrolyl, ethylcyclopenta[c]phospholyl, diethylcyclopenta[c]thienyl, diethylcyclopenta[c]furanyl, diethylcyclopenta[c]pyrrolyl, diethylcyclopenta[c] phospholyl, triethylcyclopenta[c]thienyl, triethylcyclopenta[c]furanyl, triethylcyclopena[c]pyrrolyl, triethylcyclopenta[c]phospholyl, propylcyclopenta[c]thienyl, propylcyclopenta[c]furanyl, propylcyclopenta[c]pyrrolyl, propylcyclopenta[c]phospholyl, dipropylcyclopenta[c]thienyl, dipropylcyclopenta[c]furanyl, dipropylcyclopenta[c]pyrrolyl, dipropylcyclopenta[c] phospholyl, tripropyleyclopenta[c]thienyl, trpropylcyeloperita[c]furanyl, tripropylcyclopenta[c] pyrrolyl, tripropylcyclopenta[c]phospholyl, butylcyclopenta[c]thienyl, butylcyclopenta[c]furanyl, butylcyclopenta[c]furanyl, butylcyclopenta[c]phospholyl, dibutylcyclopenta[c]thienyl, dibutylcyclopenta[c]furanyl, dibutylyclopenta[c]pyrrolyl, dibutylcyclopenta[c] phospholyl, tributylyclopenta[c]thienyl, tributylcyclopenta[c]furanyl, tributylcyclopenta[c]furanyl, tributylcyclopenva[c]phospholyl, ethylmethyleyclopenta[c]thienyl, ethylmethylcyclopenta[c]furanyl, ethylmethylcyclopenta[c]pyrrolyl, ethylmethylcyelopenta [c]phospholyl, methylpropylcyclopenta[c]thienyl, methylpropylcyclopenta[c]furanyl, methylpropylcyclopenta[c]pyrrolyl, methylpropylcyclopent[c]phospholyl, butyhnethylcyclopenta[c]thienyl, butyhnethykyclopenta[c]furanyl, butylmethylcyclopenta[c]furanyl, butylmethylcycloperita[c]phospholyl, indenyl, methylindenyl, dimethylindenyl, trimethylindenyl, tetramethylindenyl, pentamethylindenyl, hexamethylindenyl, heptamethylindenyt, ethylindenyl, diethylindenyl, triethylindenyl, propylindenyl, dipropylindenyl, tripropylindenyl, butylindenyl, dibutylindenyl, tributylindenyl, pentylindenyl, dipentylindenyl, tripentylindenyl, hexylindenyl, dihexylindenyl, trihexylindenyl, heptylindenyl, octylindenyl, nonylindenyl, decylindenyl, phenylindenyl, methylphenylindenyl, ethylphenylindenyl, propylphenylindenyl, butylphenylindenyl, pentylphenylindenyl, hexylphonylindenyl, heptylphenylindenyl, octylphenylindenyl, nonylphenylindenyl, decylphenylindenyl, dimethylphenylindenyl, trimethylphenylindenyl, dipropylphenylindenyl, methylpropylphenylindenyl, tolylindenyl, methyltolylindenyl, ethyltolylindenyl, propyltolylindenyl, butyltolylindenyl, pentyltolylindenyl, hexyltolylindenyl, heptyltolylindenyl, octyltolylindenyl, nonyltolylindenyl, decyltolylindenyl, dimethyltolylindenyl, trimethyltolylindenyl, dipropyltolylindenyl, methylpropyltolylindenyl, naphthylindenyl, methylnaphthylindenyl, ethylnaphtbylindenyl, propylnaplithylindenyl, butylnaphthylindenyl, pentylnaphthylindenyl, hexylnaphthylindenyl, heptylnaphthylindenyl, octylnaphthylindenyl, nonylnaphthylindenyl, decylnaphthylindenyl, dimethytnaphthylindenyl, trimethylnaphthylindenyl, dipropylnaphthylindenyl, methylpropylnaphthylindenyl, (propylphenyl)indenyl, methyl(propylphenyl)indenyl, ethyl(propylphenyl)indenyl, propyl(propylphenyl)indenyl, butyl(propylphenyl)indenyl, dimethyl(propylphenyl)indenyl, trimethyl (propylphenyl)indenyl, methylpropyl(propylphenyl) indenyl, (dipropylphenyl)indenyl, methyl (dipropylpheiiyl)indenyl, ethyl(dipropylphenyl) indenyl, propyl(dipropylphenyl)indenyl, butyl (dipropylphenyl)indenyl, dimethyl(dipropylphenyl) indenyl, trimethyl(propylphenyl)indenyl, methylpropyl (propylphenyl)indenyl, (dimethyeyl)indenyl, methyl (dimethyeyl)indenyl, ethyl(dipropyphenyl)indenyl, propyl(diroplphenyl)indenyl, butyl(dipropyphenyl)indenyl, dimethyl(dipropyphenyl)indenyl, trimethyl (dipropyphenyl)indenyl, methylpropyl(dipropyphenyl) indenyl, (dimethylphenyl)indenyl, methyl (dimethylphenyl)indenyl, ethyl(dimetbylphenyl) indenyl, propyl(dimethylphenyl)indenyl, butyl (dimethylphenyl)indenyl, trimethyl(dimethlylphenyl) indeayl, trimethyl(dimethylphenyl)indenyl, methylpropyl(dimethylphenyl)indenyl, trimethylsilylindenyl, trifluormethylindenyl, trifluoromethylphenylindenyl, (benzothiopheneyl)indenyl, (benzofuranyl)indenyl, (fluorophenyl)indenyl, (difluorophenyl)indenyl, (trifluorophenyl)indenyl, (tetrafluorophenyl)indenyl, (pentafluorophenyl)indenyl, (trifluoromethylphenyl)indenyl, (thienyl)indenyl, (furanyl)indenyl, (pyrrolyl)indenyl, (phospholyl)indenyl, (methylthienyl)indenyl, (methylfuranyl)indenyl, (methylpyrrolyl)indenyl, (methylphospholyl)indenyl, (dimethylthienyl)indenyl, (dimethylfuranyl)indenyl, (dimethylpyrrolyl)indenyl, (dimethylphospholyl)indenyl, (ethylthienyl)indenyl, (ethylfuranyl)indenyl, (ethylpyrrolyl)indenyl, (ethylphospholyl)indenyl, (propylthienyl)indenyl, (propylfuranyl)indenyl, (propylpyrrolyl)indenyl, (propylphospholyl)indenyl, (butylthienyl)indenyl, (butylfuranyl) indenyl, (butylpyrrolyl)indenyl, (butylphospholyl) indenyl, methyl(benzothiopheneyl)indenyl, methyl (benzofuranyl)indenyl, methyl(fluorophenyl)indenyl, methyl(difluorophenyl)indenyl, methyl(trifluorophenyl)indenyl, methyl(tetrafluorophenyl)indenyl, methyl (pentafluorophenyl)indenyl, methyl(trifluoromethylphenyl)indenyl, methyl(thienyl)indenyl, methyl (furanyl)indenyl, methyl(pyrrolyl)indenyl, methyl (phospholyl)indenyl, methyl(methylthienyl)indenyl, methyl(methylfuranyl)indenyl, methyl(methylpyrrolyl) indenyl, methyl(methylphospholyl)indenyl, methyl (dimethylthienyl)indenyl, methyl(dimethylfuranyl)indenyl, methyl(dimethylpyrrolyl)indenyl, methyl (dimethylphospholyl)indenyl, methyl(ethylthienyl) indenyl, methyl(ethylfuranyl)indenyl, methyl (ethylpyrrolyl)indenyl, methyl(ethylphospholyl) indenyl, methyl(propylthienyl)indenyl, methyl (propylfuranyl)indenyl, methyl(propylpyrrolyl) indenyl, methyl(propytphospholyl)indenyl, methyl (butylthienyl)indenyl, methyl(butylfuranyl)indenyl, methyl(butylpyrrolyl)indenyl, methyl(butylphospholyl)indenyl, propyl(benzothiopheneyl)indenyl, propyl (benzofuranyl)indenyl, propyl(fluorophenyl)indenyl, propyl(difluorophenyl)indenyl, propyl(trifluorophenyl) indenyl, propyl(tetrafluorophenyl)indenyl, propyl(pentafluorophenyl)indenyl, propyl(trifluoromethylphenyl) indenyl, propyl(thienyl)indenyl, propyl(furanyl) indenyl, propyl(pyrrolyl)indenyl, propyl(phospholyl) indenyl, propyl(methylthienyl)indenyl, propyl (methytfuranyl)indenyl, propyl(methylpyrrolyl) indenyl, propyl(methylphospholyl)indenyl, propyl (dimethylthienyl)indenyl, propyl(dimethylfuranyl) indenyl, propyl(dimethylpyrrolyl)indenyl, propyl (dimethylphospholyl)iudenyl, propyl(ethylthienyl) indenyl, propyl(ethylfuranyl)indenyl, propyl (ethylpyrrolyl)indenyl, propyl(ethylphospholyl) indenyl, propyl(propylthienyl)indenyl, propyl (propylfuranyl)indenyl, propyl(propylpyrrolyl)indenyl, propyl(propylphospholyl)indenyl, propyl(butylthienyl) indenyl, propyl(butylfuranyl)indenyl, propyl(butylpyrrolyl)indenyl, propyl(butylphospholyl)indenyl, tetrahydroindenyl, methyltetrahydroindenyl, dimethyltetrahydroindenyl, trimethyltetrahydroindenyl, tetramethyltetrahydroindenyl, pentamethyltertrahydroindenyl, hexamethyltetrahydroindenyl, heptamethyltetrahydroindenyl, ethyltetrahydroindenyl, propyltetrahydroindenyl, butyltetrahydroindenyl, pentyltetrahydroindenyl, hexyltetrahydroindenyl, heptyltetrahydroindenyl, octyltetrahydroindenyl, nonyltetrahydroindenyl, decyltetrahydroindenyl, phenyltetrahydroindenyl, methylphenyltetrahydroindenyl, ethylphenyltetrahydroindenyl, propylphenyltetrahydroindenyl, butylphenyltetrahydroindenyl, pentylphenyltetrahydroindenyl, hexylphenyltetrahydroindenyl, heptylphenyltetrahydroindenyl, octylphenyltetrahydroindenyl, nonylphenyltetrahydroindenyl, decylphenyltetrahydroindenyl, dimethylphenyltetrahydroindenyl, trimethylphenyltetrahydroindenyl, dipropylphenyltetrahydroindenyl, methylpropylphenyltetrahydroindenyl, tolyltetrahydroindenyl, methyltolyltetrahydroindenyl, ethyltolyltetrahydroindenyl, propylolyltetrahydroindenyl, butyltolyltetrahydroindenyl, dimethyltolyltetrahydroindenyl, trimethyltolyltetrahydroindenyl, dipropyltolyltetrahydroindenyl, methylpropyltolyltetrahydroindenyl, naphthyltetrahydroindenyl, methylnaphthyltetrahydroindenyl, ethylnaphthyltetrahydroindenyl, propylnaplithyltetrahydroindenyl, butylnaphthyltetrahydroindenyl, dimethylnaphthyltetrahydroindenyl, trimethylnaphthyltetrahydroindenyl, dipropylnaphthyltetrahydroindenyl, methylpropylnaphthyltetrahydroindenyl, (propylphenyl)tetrahydroindenyl, methyl(propylphenyl)tetrahydroindenyl, ethyl(propylphenyl)tetrahydroindenyl, propyl(propylphenyl)tetrahydroirdenyl, butyl(propylphenyl)tetrahydroindenyl, dimethyl(propylphenyl)tetrahydroindenyl, trimethyl(propylphenyl)tetrahydroindenyl, methylpropyl(propylphenyl)tetrahydroindenyl, (dipropylphenyl) tetrahydroindenyl, methyl(dipropylplicnyl)tetrahydroindenyl, ethyl(dipropylphenyl)tetrahydroindenyl, propyl(dipropylphenyl)tetrahydroindenyl, butyl(dipropylphenyl)tetrahydroindenyl, dimethyl(dipropylphenyl)tetrahydroindenyl, trimethyl(dipropylphenyl)tetrahydroindenyl, methylpropyl(dipropylphenyl) tetrahydroindenyl, (dimethylphenyl)tetrahydrohidenyl, methyl(dimthylphenyl)tetrahyclroindenyl, ethyl(dimethylphenyl)tetrahydroindenyl, propyl(dimethylphenyl)tetrahydroindenyl, butyl(dimethylphenyl)tetrahydroindenyl, trimethyl(dimethylphenyl) tetrahydroindenyl, trimethyl(dimethylphenyl) tetraliydroindenyl, methylpropyl(dimethylphenyl) tetrahydroindenyl, (trimethylphenyl)tetrahydroindenyl, methyl(trimethylphenyl)tetrahydroindenyl, ethyl(trimethylphenyl)tetrahydroindenyl, propyl(trimethylphenyl)tetrahydroindenyl, butyl(trimethylphenyl)tetrahydroindenyl, dimethyl(trimethylphenyl) tetrahydroindenyl, trimethyl(trimethylphenyl) tetrahydroindenyl, methylpropyl(trimethylphenyl) tetrahydroindenyl, cyclopentadienyl, methylcyclopentadienyl, dimethylcyclopentadienyl, trimethylcyeiopentadienyl, tetramethylcyclop entadienyl, pentamethylcyclopentadienyl, ethylcyclopentadienyl, diethylcyclopentadienyl, triethylcyclopentadienyl, tetraethylcyclopentadienyl, pentaethylcyclopentadienyl, propylcyclopentadienyl, dipropylcyclopentadienyl, tripropylcyclopentadienyl, tetrapropylcyclopentadienyl, pentapropylcyclopentadienyl, butyloyclopentadienyl, dibutylcyclopentadienyl, tributylcyclopentadienyl, tetrabutylcyclopentadienly, pentabutylcyclopentadienyl, pentylcyclopentadienyl, dipentylcyclopentadienyl, tripentylcyclopentadienyl, tetrapentylcyclopentadienly, pentapentylcyclopentadienyl, hexylcyclopentadienyl, dihexylcyclopentadienyl, trihexylcyclopentadienyl, tetrahexylcyclopentadienly, pentahexylcyclopentadienyl, heptylcyclopentadienyl, diheptylcyclopentadienyl, octylcyclopentadienyl, dioctylcyclopentadienyl, nonylcyclopentadienyl, dinonylcyclopentadienyl, decylcyclopentadienyl, didecylcyclopentadienyl, undecylcyclopentadienyl, dodecylcyclopentadienyl, tridecylcyclopentadienyl, tetradecylcyclopentadienyl, pentadecylcyclopentadienyl, hexadecylcyclopentadienyl, heptadecylcyclopentadienyl, octadecylcyclopentadienyl, nonadecylcyclopentadienyl, eicosylcyclopentadienyl, heneicosylcyclopentadienyl, docosylcyclopentadienyl, tricosylcyclopentadienyl, tetracosylcyclopentadienyl, pentacosylcyclopentadienyl, hexacosylcyclopentadienyl, heptacosylcyclopentadienyl, octacosylcyclopentadienyl, nonacosylcyclopentadienyl, triacontylcyclopentadienyl, vinylcyclopentadienyl, allylcyclopentadienyl, propenylcyclopentadienyl, butenylcyclopentadienyl, propynylcyclopentadienyl, butynylcyclopentadienyl, cyclopropylcyclopentadienyl, cyclobutylcyclopentadienyl, cyclopentylcyclopentadienyl, cyclohexylcyclopentadienyl, phenylcyclopentadienyl, (dimethylphenyl)cyclopentadienyl, tolylcyclopentadienyl, benzylcyclopentadienyl, phenethylcyclopentadienyl, trimethylsilylcyclopentadienyl, trimethylgermylcyclopentadienyl, trimethylstannylcyclopentadienyl, triethylsilylcyclopentadienyl, dimethylethylsilylcyclopentadienyl, biphenylcyclopentadienyl, pyrenylcyclopentadienyl, trifluoromethylcyclopentadienyl, trifluoromethylmethylcyclopentadienyl, norbornylcyclopentadienyl, methylethylcyclopentadienyl, methylpropylcyclopentadienyl, methylbutylylcyclopentadienyl, methylphenylcyclopentadienyl, methylcyclohexylcylopentadienyl, methyltolylcyclopentadienyl, trimethylsilylmethylcylopentadienyl, methylbenzylcylopentadienyl, methylphenethylcylopentadienyl, ruethylvinylcylopentadienyl, methylallylcylopentadienyl, (benzothiopheneyl)cyclopentadienyl, (benzofuranyl) cyclopentadienyl, (fluorophenyl)cyclopentadienyl, (difluorophenyl)cyclopentadienyl, (trifluorophenyl)cyclopentadienyl, (tetrafluzorophenyl)cyclopentadienyl, (pentafluorophenyl)cyclopentadienyl, (trifluoromethylphenyl)cyclopentadienyl, (thienyl)oyclopentadienyl, (furanyl)cyclopentadienyl, (pyrrolyl)cyclopentadienyl, (phospholyl)oyclopentadienyl, (methylthienyl)cyclopentadienyl, (methylfuranyl)cyclopentadienyl, (methylpyrrolyl)cyclopentadienyl, (methylphosphoIyl)cyclopentadienyl, (dimethylthienyl)cyclopentadienyl, (dimethylfuranyl)cyclopentadienyl, (dimethylpyrrolyl) cyclopentadienyl, (dimethylphosphalyl)cyclopentadienyl, methyl(benzothiopheneyl)cyclopentadienyl, methyl(benzofuranyl)cyclopeatadienyl, methyl(fluorophenyl)cyclopentadienyl, methyl(difluorophenyl)cyclopentadienyl, methyl(trifluorophenyl)cyclopentadienyl, methyl(tetrafluorophenyl)cyclopentadienyl, methyl(pentafluorophenyl)cyclopentadienyl, methyl (trifluoromethylphenyl)cyclopentadienyl, methyl(thienyl)cyclopentadienyl, methyl(furanyl)cyclopentadienyl, methyl(pyrrolyl)cyclopentadienyl, methyl (phospholyl)cyclopentadienyl, methyl(methylthienyl) cyclopentadienyl, methyl(methylfuranyl) cyclopentadienyl, methyl(methylpyrrolyl) cyclopentadienyl, methyl(methylphospholyl) cyclopentadienyl, methyl(dimethylthienyl) cyclopentadienyl, methyl(dimethylfuranyl) cyclopentadienyl, methyl(dimethylpyrrolyl) cyclopentadienyl, methyl(dimethylphospholyl) cyclopentadienyl, fluorenyl, methylfluorenyl, dimethylfluorenyl, trimethylfluorenyl, tetramethylfluorenyl, ethylfluorenyl, diethylfluorenyl, triethylfluorenyl, tetraethylfluorenyl, propylfluorenyl, dipropylfluorenyl, tripropylfluorenyl, tetrapropylfluorenyl, butylfluorenyl, dibutylfluorenyl, tributylfhlorenyl, tetrabutylfluorenyl, pentylfluorenyl, dipentylfluorenyl, tripentylfluorenyl, tetrapentylfluorenyl, hexylfluorenyl, dihexylfluorenyl, trihexylfluorenyl, tetrahexylfluorenyl, heptylfluorenyl, diheptylfluorenyl, octylfluorenyl, dioctylfluorenyl, nonylfluorenyl, dinonylfluorenyl, decylfluorenyl, didecylfluorenyl, dodecylfluorenyl, didodecylfluorenyl, trifluoromethylfluorenyl, bis(trifluoromethyl)fluorenyl, trimethylsilylfluorenyl, bis(trimethylsilyl)fluorenyl, cyclohexylfluorenyl, bis(cyclohexyl)fluorenyl, phenylfluorenyl, diphenylfluorenyl, tolylfluorenyl, bis(tolyl)fluorenyl, octahydrofluorenyl, methyloctahydrofluorenyl, dimethyloctahydrofluorenyl, trimethyloctahydrofluorenyl, tetramethyloctahydrofluorenyl, ethyloctahydrofluorenyl, diothyloctahydrofluorenyl, propyloctahydrofluorenyl, dipropyloctahydrofluorenyl, butyloctahydrofluorenyl, dibutyloctahydrofluorenyl, pentyloctalhydrofluorenyl, dipentyloctahydrofluorenyl, hexyloctahydrofluorenyl, dihexyloctahydrofluorenyl, heptyloctahydrofluorenyl, diheptyloctahydrofluorenyl, octyloctahydrofluorenyl, dioctyloctahydrofluorenyl, methyloctahydrodibenzyl [b,h]fluorenyl, dimethyloctahydrodibenzyl[b,h]fluorenyl, trimethyloctahydrodibenzyl[b,h]fluorenyl, tetramethyloctahydrodibenzyl[b,h]fluorenyl, pentamethyloctahydrodibenzyl[b,h]fluorenyl, hexamethyloctahydrodibenzyl[b,h]fluorenyl, heptamethyloctahydrodibenzyl[b,h]fluorenyl, octamethyloctahydrodibenzyl[b,h]fluorenyl, (benzothiopheneyl)fluorenyl, (benzofuranyl)fluorenyl, (fluorophenyl)fluorenyl, (difluorophenyl)fluorenyl, (trifluorophenyl)fluorenyl, (tetrafluorophenyl)fluorenyl, (pentafluorophenyl)fluorenyl, (trifluoromethylphenyl)fluorenyl, (thienyl) fluorenyl, (furanyl)fluorenyl, (pyrroly)fluorenyl, (phospholyl)fluorenyl, (methylthienyl)fluorenyl, (methylfuranyl)fluorenyl, (methylpyrrolyl)fluorenyl, (methylphospholyl)fluorenyl, (dimethylthienyl)fluorenyl, (dimethylfuranyl)fluorenyl, (dimethylpyrrolyl)fluorenyl, (dimethylphospholyl)fluorenyl, bis(benzothiopheneyl) fluorenyl, bis(benzofuranyl)fluorenyl, bis(fluorophenyl)fluorenyl, bis(difluorophenyl)fluorenyl, bis(trifluorophenyl)fluorenyl, bis(tetrafluorophenyl)fluorenyl, bis(pentafluorophenyl)fluorenyl, bis(trifluoromethylphenyl)fluorenyl, bis(thienyl)fluorenyl, bis (furanyl)fluorenyl, bis(pyrrolyl)fluorenyl, bis (phospholyl)fluorenyl, bis(methylthienyl)fluorenyl, bis (methylfuranyl)fluorenyl, bis(methylpyrrolyl) fluorenyl, bis(methylphospholyl)fluorenyl, bis (dimethylthienyl)fluorenyl, bis(dimethylfuranyl) fluorenyl, bis(dimethylpyrrolyl)fluorenyl, bis (dimethylphospholyl)fluorenyl, azacyclopentadienyl, phosphacyclopentadienyl, stibacyclopentadienyl, arsacyclopentadienyl, boracyclopentadienyl, methylazacyclopentadienyl, methylphosphacyclopentadienyl, methylstibacyclopentadienyl, methylarsacyclopentadienyl, methylboracyclopentadienyl, 1,2-diazacyclopentadienyl, 1,2-diphosphacyclopentadienyl, 1,2-distibacyclopentadienyl, 1,2-diarsacyclopentadienyl, 1,2-diboracyclopentadienyl, 1,2-azaphosphacyclopentadienyl, 1,2-azastibacyclopentadienyl, 1,2-azarsacyclopentadienyl, 1,2-azaboracyclopentadienyl, 1,2-arsaphosphacyclopentadienyl, 1,2-arsastibacyclopentadienyl, 1,2-arsaboracyclopentadienyl, 1,2-boraphosphacyclopentadienyl, 1,2-borastibacyclopentadienyl, 1,2-phosphastibacyclopentadienyl, 1,3-diazacyclopentadienyl, 1,3-diphosphacyclopentadienyl, 1,3-distibacyclopentadienyl, 1,3-diarsacyclopentadienyl, 1,3-diboracyclopentadienyl, 1,3-azaphosphacyclopentadienyl, 1,3-azastibacyclopentadienyl, 1,3-azarsacyclopentadienyl, 1,3-azaboracyclopentadienyl, 1,3-arsaphosphacyclopentadienyl, 1,3-arsastibacyclopentadienyl, 1,3-arsaboracyclopeiitadienyl, 1,3-boraphosphacyclopentadienyl, 1,3-borastibacyclopentadienyl, 1,3-phosphastibacyclopentadienyl, pentadienyl, methylpentadienyl, dimethylpentadienyl, trimethylpentadienyl, tetramethylpentadienyl, pentamethylpentadienyl, hexamethylpentadienyl, heptamethylpentadienyl, allyl, methylallyl, dimethylallyl, trimethylallyl, tetramethylallyl, pentamethylallyl, boratabenzene, methylboratabenzene, phenylboratabenzene, N,N-dimethylaminoboratabenzene, N,N-diethylaminoboratabenzene, and N,N-dipropylaminoboratabenzene, or A may, independently, be defined as E;

Y is a bridging group selected from the group consisting of:

dimethylsilylene, diethylsilylene, dipropylsilylene, dibutylsilylene, dipentylsilylene, dihexylsilylene, diheptylsilylene, dioctylsilylene, dinonylsilylene, didecylsilylene, diundecylsilylene, didodecylsilylene, ditridecylsilylene, ditetradecylsilylene, dipentadecylsilylene, dihexadecylsilylene, diheptadecylsilylene, dioctadecylsilylene, dirionadecylsilylene, dieicosylsilylene, dliheneicosylsilylene, didocosylsilylene, ditricosylsilylene, ditetracosylsilylene, dipentacosylsilylene, dihexacosylsilylene, diheptacosylsilylene, dioctacosylsilylene, dinonacosylsilylene, ditriacontylsilylene, dicyclohexylsilylene, dicyclopentylsilylene, dicycloheptylsilylene, dicyclooctylsilylene, dicyclodecylsilylene, dicyclododecylsilylene, dinapthylsilylene, diphenylsilylene, ditolylsilylene, dibenzylsilylene, diphenethylsilylene, di(butylphenethyl)silylene, methylethylsilylene, methylpropylsilylene, methylbutylsilylene, methylhexylsilylene, methylphenylsilylene, ethylphenylsilylene, ethylpropylsilylene, ethylbutylsilylene, propylphenylsilylene, tetramethyldisilylene, dimethylgemylene, diethylgermylene, diphenylgermylene, methylphenylgermylene, cyclotrimethylenesilylene, cyclotetramethylenesilylene, cyclopentamethylenesilylene, methylene, dimethylmethylene, diethylmethylene, dibutylmethylene, dipropylmethylene, diphenylmethylene, ditolylmethylene, di(butylphenyl)methylene, di(trimethylsilylphenyl)methylene, di(triethylsilylphenyl)methylene, dibenzylmethylene, cyclotetramethylenemethylene, cyclopentmethylenemethylene, ethylene, methylethylene, dimethylethylene, trimethylethylene, tetramethylethylene, cyclopropylene, cyclobutylene, cyclopentylene, cyclohexylene, cycloheptylene, cyclooctylene, propanediyl, methylpropanediyl, dimethylpropanediyl, trimethylpropanediyl, tetramethylpropanediyl, pentamethylpropanediyl, hexamethylpropanediyl, tetramethyldisiloxylene, vinylene, ethene-1,1-diyl, divinylsilylene, dipropenylsilylene, dibutenysilylene, methylvinylsilylene, methylpropenylsilylene, methylbutenylsilylene, dimethylsilylmethylene, diphenylsilylmethylene, dimethylsilylethylene, diphenylsilylethylene, dimethylsilylpropylene, diphenylsilylpropylene, dimethylstannylene, diphenylstannylene, methylphenylstannylene, cyclohexylazanediyl, methylazanediyl, ethylazanediyl, propylazanediyl, butylazanediyl, pentylazanediyl, hexylazanediyl, phenylazanediyl, perfluorophenylazanediyl, methylphosphanediyl, ethylphosphanediyl, propylphosphanediyl, butylphosphanediyl, pentylphosphanediyl, hexylphosphanediyl, cyclohexylphosphanediyl, phenylphosphanediyl, methylboranediyl, ethylboranediyl, propylboranediyl, butylboranediyl, pentylboranediyl, hexylboranediyl, phenylboranediyl, and, cyclohexylboranediyl; and is present when y is one and absent when y is zero;

y is zero or one;

X are independently selected from the group consisting of: hydride, fluoride, chloride, bromide, iodide, methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, vinyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hoxynyl, heptynyl, octynyl, nonynyl, docynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, triacontynyl, cyclopropyl, cyclobutyl, cyclopentyl, cyclohexyl, cycloheptyl, cyclooctyl, cyclononyl, cyclodecyl, cycloundecyl, cyclododecyl, cyclotetradecyl, cyclopentenyl, cyclohexenyl, cycloheptenyl, cyclooctenyl, cyclodecenyl, cyclododecenyl, methylcyclohexyl, ethylcyclohexyl, propylcyclohexyl, dimethylcyclohexyl, diethylcyclohexyl, dipropylcyclohexyl, phenyl, tolyl, mesityl, ethylphenyl, propylphenyl, butylphenyl, pentylphenyl, hexylphenyl, dimethylphenyl, trimethylphenyl, diethylphenyl, diethylmethylphenyl, dipropylphenyl, dipropylmethylphenyl, benzyl, phenethyl, napthyl, trifluoromethyl, methoxy, ethoxy, propoxy, butoxy, dimethylamido, diethylamido, methylethylamido, phenoxy, benzoxy, allyl, 1,1-dimethyl, allyl, acetylacetonate, 1,1,1,5,5,5-hexafluoroacetylacetonate, 1,1,1-trifluoroacetylacetonate, 2-carboxymethylallyl, 1,1,1-trifluoro-5,5-dimethylacetylacctonate, methoxymethyl, ethoxymethyl, propoxymethyl, butoxymethyl, phenoxyrnethyl, methylsulfanyl, ethylsulfanyl, propylsulfanyl, butylsulfanyl, phenylsulfanyl, dimethylaminomethyl, dimethylaminoethyl, diphenylaminomethyl, diphenylaminoethyl, phenylaminomethyl, phenylaminoethyl, methylaminomethyl, dimethylphosphinomethyl, dimethylphosphinoethyl, diphenylphosphinomethyl, phenylphosphinoethyl, methylphosphinomethyl, trimethylsilylmethyl, trimethylgermylmethyl, trimethylstannylmethyl, fluoromethyl, fluoroethyl, fluoropropyl, fluorobutyl, fluoropentyl, fluorohexyl, fluoroheptyl, fluorooctyl, fluorononyl, fluorodecyl, fluoroundecyl, fluorododecyl, fluorotridecyl, fluorotetradecyl, fluoropentadecyl, fluorohexadecyl, fluoroheptadecyl, fluorooctadecyl, fluorononadecyl, fluoroeicosyl, fluorobenzyl, difluorobenzyl, trifluorobenzyl, tetrafluorobenzyl, pentafluorobenzyl, trifluoromethylbenzyl, Both, X, methylidene, ethylidene, propylidene, tetramethylene, pentamethylene, hexametethylene, butadiene, methylbutadiene, dimethylbutadiene, pentadiene, methylpontadiene, dimethylpentadiene, hexadione, methylhexadiene, dimethylhexadiene, propandiyl, butandiyl, pentandiyl, hexandiyl, heptandiyl, octandiyl, nonandiyl, decandiyl, dodecandiyl, tetradecandiyl, hexadecandiyl, octadecandiyl, azapropandiyl, azabutandlyl, azapentandiyl, azahexandiyl, azaheptandiyl, azaoctandiyl, azanonandiyl, azadecandiyl, azadodecandiyl, phosphapropandiyl, phosphabutandiyl, phosphapentandiyl, thiapropandiyl, thiabutandiyl, thiapentandiyl, catecholate, butylcatecholate, diazabutandiyl, diazapentandiyl, diazahexandiyl, dioxabutandiyl, dioxapentandiyl, and dioxahexandiyl; and provided that when A is independently defined as E, and y is one, and Y is bonded to the one position of each indenyl ligand, and per indenyl ligand there is only one aromatic heterocyclic substitutent or pseudoaromatic heterocyclic substituent that is bonded to the indenyl ligand, such substituent being bonded to the 4-position of the indenyl ligand, then such substituent is not an unsubstituted or hydrocarbyl substituted pyrrol-1-yl substituent including ring-fused hydrocarbyl substituted pyrrol-1-yl substituents such as indol-1-yl, isoindol-2-yl, carbazol-9-yl, 2,3,4,9-tetrahydrocarbazol-9-yl, and 1,2,3,4-tetrahydrocyclopenta[b]indol-4-yl.

2. The composition of claim 1 wherein the composition is further represented by the formula:

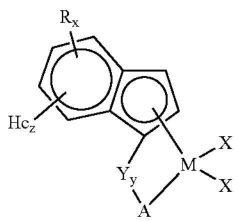

wherein: M, X, A, y, Hc, z, R, and Y are as defined in claim 1; x represents the number of R substituents bonded to the indenyl ligand and is 2, 3, 4, 5, or 6; and x+y+z=7.

3. The composition of claim 1 wherein the composition is further represented by the formula:

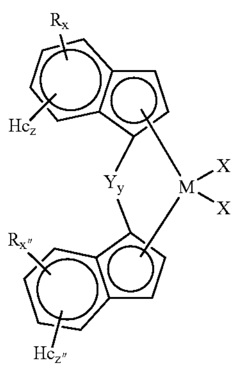

wherein: M, X, y, Hc, R, and Y are as defined in claim 1;

each z and z" represents the number of He substituents bonded to each respective indenyl ligand and is, independently, 1, 2, 3 or 4;

each x and x" represents the number of R substituents bonded to each respective indenyl ligand and is, independently, 2, 3, 4, 5, or 6;

x+y+z=7; and x"+y+z"=7.

4. The composition of claim 1 wherein the composition is further represented by the formula:

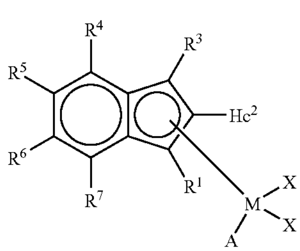

wherein: M, X, Hc, R, and A are as defined in claim 1; and each Hc is bonded to the indenyl ligand at the number 2 position.

5. The composition of claim 1 wherein the composition is further represented by the formula:

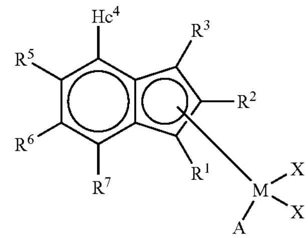

wherein: M, A and X are as defined in claim 1, $Hc_4$ is an aromatic heterocyclic substituted or psuedoaromatic heterocyclic substituent that is bonded to the indenyl ligand through a nitrogen or phosphorous ring heteroatom; and each $R^1$, $R^2$, $R^3$, $R^5$, $R^6$, and $R^7$ is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents, and optionally, adjacent $R^1$, $R^2$, $R^3$, $R^5$, $R^6$, or $R^7$ groups may join together to form a substituted or unsubstituted, saturated, partially unsaturated, or aromatic cyclic or polycyclic substituent.

6. The composition of claim 1 wherein the composition is further represented by the formula:

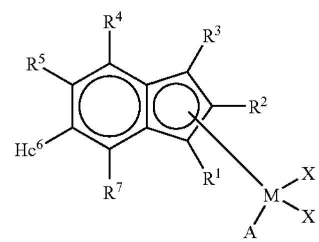

wherein: M, X and A are as defined in claim 1; $Hc_6$ is an aromatic heterocyclic substituent or psuedoaromatic heterocyclic substituent that is bonded to the indenyl ligand through a nitrogen or phosphorous ring heteroatom; and each $R^1$, $R^2$, $R^3$, $R^5$, $R^6$, and $R^7$ is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents, and optionally, adjacent $R^1$, $R^2$, $R^3$, $R^5$, $R^6$, or $R^7$ groups may join together to form a substituted or unsubstituted, saturated, partially unsaturated, or aromatic cyclic or polycyclic substituent.

7. The composition of claim 1 wherein the composition is further represented by the formula:

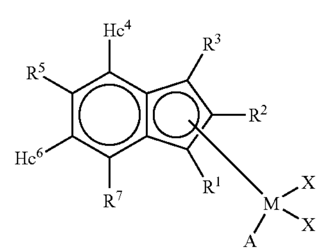

wherein: M, A, and X are as defined in claim 1; each $Hc^4$, and $Hc^6$ is, independently, an aromatic heterocyclic substituent or pseudoaromatic heterocyclic substituent that is bonded to the indenyl ligand through a nitrogen or phosphorous ring heteroatom; and each $R^1$, $R^2$, $R^3$, $R^5$, and $R^7$ is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents, and optionally, adjacent $R^1$, $R^2$, $R^3$, $R^5$, or $R^7$ groups may join together to form a substituted or unsubstituted, saturated, partially unsaturated, or aromatic cyclic or polycyclic substituent.

8. The composition of claim 1 wherein the composition is further represented by the formula:

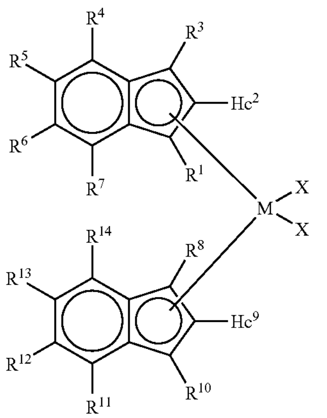

wherein: M, R, Hc and X are as defined as in claim 1.

9. The composition of claim 1 wherein the composition is further represented by the formula:

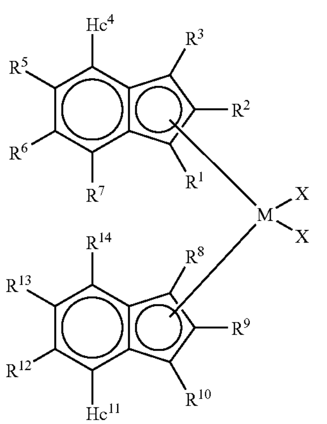

wherein: M and X, are as defined as in claim 1; each H4 and Hc11 is, independently, an aromatic heterocyclic substituent or pseudoaromatic heterocyclic substituent that is bonded to the indenyl ligand through a nitrogen or phosphorous ring heteroatom; and each $R^1$, $R^2$, $R^3$, $R^5$, $R^6$, $R^7$, $R^8$, $R^9$, $R^{10}$, $R^{11}$, $R^{12}$, $R^{13}$and $R^{14}$ is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents, and optionally, adjacent $R^1$, $R^2$, $R^3$, $R^5$, $R^6$, $R^7$, $R^8$, $R^9$, $R^{10}$, $R^{11}$, $R^{12}$, $R^{13}$, or $R^{14}$ groups may join together to form a substituted or unsubstituted, saturated, partially unsaturated, or aromatic cyclic or polycyclic substituent.

10. The composition of claim 1 wherein the composition is further represented by the formula:

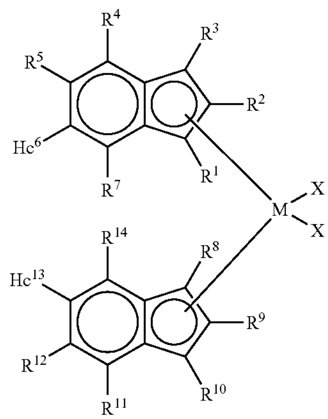

wherein: M and X, are as defined as in claim 1; each $Hc^6$ and $Hc^{13}$ is, independently, an aromatic heterocyclic substituent or pseudoaromatic heterocyclic substituent that is bonded to the indenyl ligand through a nitrogen or phosphorous ring heteroatom; and each $R^1$, $R^2$, $R^3$, $R^5$, $R^7$, $R^8$, $R^9$, $R^{10}$, $R^{11}$, $R^{12}$, $R^{13}$, and $R^{14}$ is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents, and optionally, adjacent $R^1$, $R^2$, $R^3$, $R^5$, $R^7$, $R^8$, $R^9$, $R^{10}$, $R^{11}$, $R^{12}$, $R^{13}$, or $R^{14}$ groups may join together to form a substituted or unsubstituted, saturated, partially unsaturated, or aromatic cyclic or polycyclic substituent.

11. The composition of claim 1 wherein the composition is further represented by the formula:

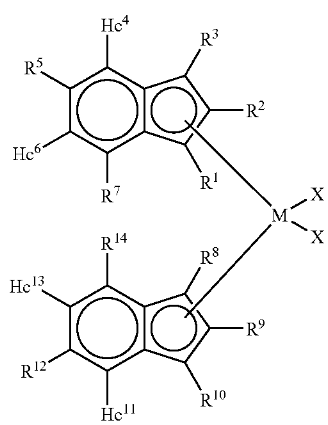

wherein: M and X, are as defined as in claim 1; each $Hc^4$ $Hc^6$, $Hc^{11}$, and $Hc^{13}$ is, independently, an aromatic heterocyclic substituent or pseudoaromatic heterocyclic substituent that is bonded to the indenyl ligand through a nitrogen or phosphorous ring heteroatom; and each $R^1$, $R^2$, $R^3$, $R^5$, $R^7$, $R^8$, $R^9$, $R^{10}$, $R^{12}$, and $R^{14}$ is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents, and optionally, adjacent $R^1$, $R^2$, $R^3$, $R^5$, $R^7$, $R^8$, $R^9$, $R^{10}$, $R^{12}$, or $R^{14}$ groups may join together to form a substituted or unsubstituted, saturated, partially unsaturated, or aromatic cyclic or polycyclic substituent.

12. The composition of claim 1 wherein the composition is further represented by the formula:

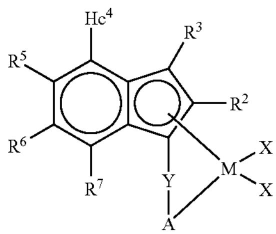

wherein: M, X, A and Y are as defined in claim 1; Hc4 is an aromatic heterocyclic substituent or pseudoaromatic heterocyclic substituent that is bonded to the indenyl ligand through a nitrogen or phosphorous ring heteroatom; each $R^2$, $R^3$, $R^5$, $R^6$, and $R^7$ is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents, and optionally, adjacent $R^2$, $R^3$, $R^5$, $R^6$, and $R^7$ groups may join together to form a substituted or unsubstituted, saturated, partially unsaturated, or aromatic cyclic or polycyclic substituent; and provided that when A is an indenyl ligand bonded to Y in the one position of the indenyl ring and A is substituted with one aromatic heterocycle substituent or one pseudoaromatic heterocyclic substituent that is bonded to the indenyl ring through a nitrogen or phosphorous ring heteroatom (Hc), and each Hc is bonded to each indenyl ligand in the 4-position of the indenyl ligand, then Hc is not an unsubstituted or hydrocarbyl substituted pyrrol-1-yl substituent including ring-fused hydrocarbyl substituted pyrrol-1-yl substituents such as indol-1-yl, isoindol-2-yl, carbazol-9-yl, 2,3,4,9-tetrahydrocarbazol-9-yl, and 1,2,3,4-tetrahydrocyclopenta[b]indol-4-yl.

13. The composition of claim 1 wherein the composition is further represented by the formula:

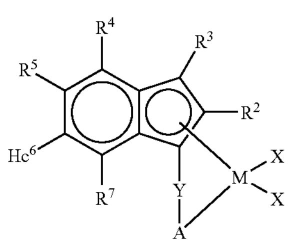

wherein: M, X, A and Y are as defined in claim 1; $Hc^6$ is an aromatic heterocyclic substituent or pseudoaromatic heterocyclic substituent that is bonded to the indenyl ligand through a nitrogen or phosphorous ring heteroatom; and each $R^2$, $R^3$, $R^4$, $R^5$, and $R^7$ is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents, and optionally, adjacent $R^2$, $R^3$, $R^4$, $R^5$and $R^7$ groups may join together to form a substituted or unsubstituted, saturated, partially unsaturated, or aromatic cyclic or polycyclic substituent.

14. The composition of claim 1 wherein the composition is further represented by the formula:

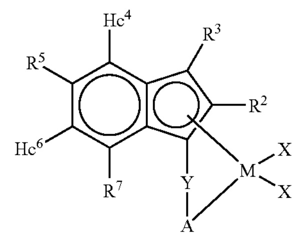

wherein: M, X, A and Y are as defined in claim 1; each $Hc^4$ and $Hc^6$ is, independently, an aromatic heterocyclic substituent or pseudoaromatic heterocyclic substituent that is bonded to the indenyl ligand though a nitrogen or phosphorous ring heteroatom; and each $R^2$, $R^3$, $R^5$, and $R^7$ is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents, and optionally, adjacent $R^2$, $R^3$, $R^5$, or $R^7$ groups may join together to form a substituted or unsubstituted, saturated, partially unsaturated, or aromatic cyclic or polycyclic substituent.

15. The composition of claim 1 wherein the composition is further represented by the formula:

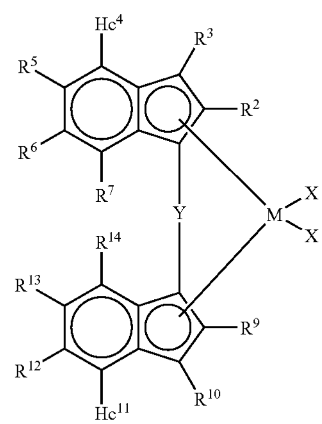

wherein: M, X and Y are as defined in claim 1; each $Hc^4$ and $Hc^{11}$ is, independently, an aromatic heterocyclic substituent or pseudoaromatic heterocyclic substituent that is bonded to the indenyl ligand through a nitrogen or phosphorous ring heteroatom; and each $R^2$, $R^3$, $R^5$, $R^6$, $R^7$, $R^9$, $R^{10}$, $R^{12}$, $R^{13}$, and $R^{14}$ is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents, and optionally, adjacent $R^2$, $R^3$, $R^5$, $R^6$, $R^7$, $R^9$, $R^{10}$, $R^{12}$, $R^{13}$ or $R^{14}$ groups may jointogether to form a substituted or unsubstituted, saturated, partially unsaturated, or aromatic cyclic or polycyclic substituent; and provided that each Hc is not an unsubstituted or hydrocarbyl substituted pyrrol-1-yl substituent including ring-fused hydrocarbyl substituted pyrrol-1-yl substituents such as indol-1-yl, isoindol-2-yl, carbazol-9-yl, 2,3,4,9-tetrahydrocarbazol-9-yl, and 1,2,3,4-tetrahydrocyclopenta[b]indol-4-yl.

16. The composition of claim 1 wherein the composition is further represented by the formula:

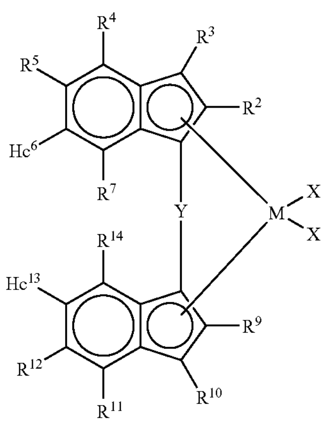

wherein: M and X, are as defined as in claim 1; each $Hc^6$ and $Hc^{13}$ is, independently, an aromatic heterocyclic substituent or pseudoaromatic heterocyclic substituent that is bonded to the indenyl ligand through a nitrogen or phosphorous ring heteroatom; and each $R^2$, $R^3$, $R^4$, $R^5$, $R^7$, $R^9$, $R^{10}$, $R^{11}$, $R^{12}$, $R^{13}$ is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents, and optionally, adjacent $R^2$, $R^3$, $R^4$, $R^5$, $R^7$, $R^9$, $R^{10}$, $R^{11}$, $R^{12}$, or $R^{13}$ groups may join together to form a substituted or unsubstituted, saturated, partially unsaturated, or aromatic cyclic or polycyclic substituent.

17. The composition of claim 1 wherein the composition is further represented by the formula:

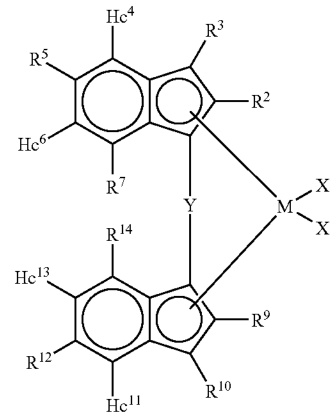

wherein: M and X and Y are as defined as in claim 1; each $Hc^4$, $Hc^6$, $Hc^{11}$, and $Hc^{13}$ is, independently, an aromatic heterocyclic substituent or pseudoaromatic heterocyclic substituent that is bonded to the indenyl ligand through a nitrogen or phosphorous ring heteroatom; and each $R^2$, $R^3$, $R^5$, $R^7$, $R^9$, $R^{10}$, $R^{12}$, and $R^{14}$ is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents, and optionally, adjacent $R^2$, $R^3$, $R^5$, $R^7$, $R^9$, $R^{10}$, $R^{12}$, and $R^{14}$ groups may join together to form a substituted or unsubstituted, saturated, partially unsaturated, or aromatic cyclic or polycyclic substituent.

18. The compound of any one of claims 1, 2, 3, 4, or 8, wherein M is titanium, zirconium, or hafnium.

19. The compound of any one of claims 1, 2, 3, 4, or 8, wherein M is zirconium or hafnium.

20. The compound of any one of claims 1, 2, 3, 4, or 8 wherein each R is independently selected from the group consisting of hydrogen, methyl, ethyl, propyl, butyl, pentyl, hexyl, heptyl, octyl, nonyl, decyl, undecyl, dodecyl, phenyl, substituted phenyls, and all isomers thereof.

21. The compound of any one of claims 1, 2, 3, 4, or 8, wherein each R is independently selected from the group consisting of hydrogen, methyl, ethyl, n-propyl, iso-propyl, butyl, s-butyl, i-butyl, t-butyl, n-hexyl, cyclohexyl, phenyl, tolyl, mesityl, and naphthyl.

22. The compound of any one of claims 1, 2, 3, 4 , or 8, wherein each Hc is independently selected from the group consisting of compounds represented by the formulae:

Hc1

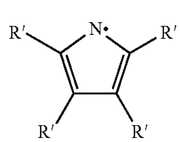

pyrrol-1-yl

Hc2

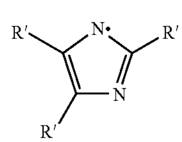

imidazol-1-yl

Hc3

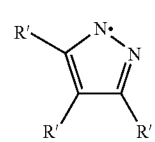

pyrazol-1-yl

Hc4

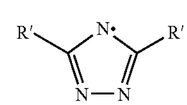

[1,2,4]triazol-4-yl

-continued
Hc8
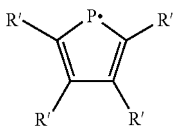
phosphol-1-yl
Hc31
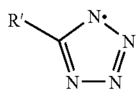
tetrazol-1-yl
Hc32
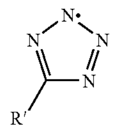
tetrazol-2-yl
Hc35
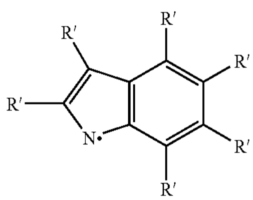
indol-1-yl
Hc36
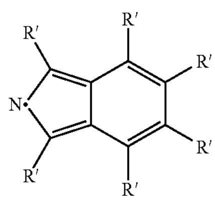
isoindol-2-yl
Hc37
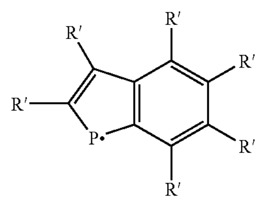
phosphindol-1-yl
Hc38
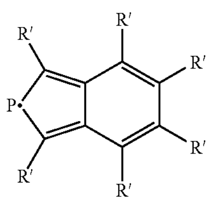
isophosphindol-2-yl
Hc39
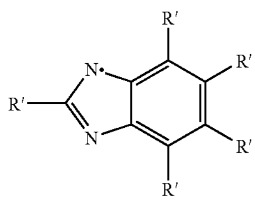
benzoimdazol-1-yl
Hc40
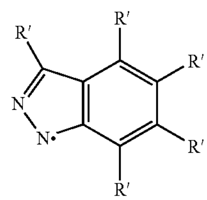
indazol-1-yl
Hc41
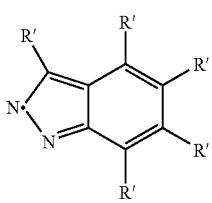
indazol-2-yl
Hc42
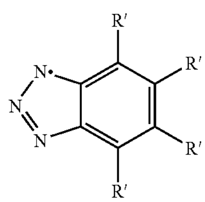
benzotriazol-1-yl
Hc43
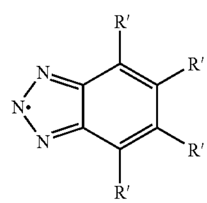
benzotriazol-2-yl
Hc85
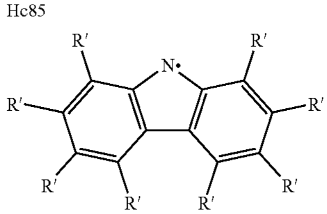
carbazol-9-yl
Hc86
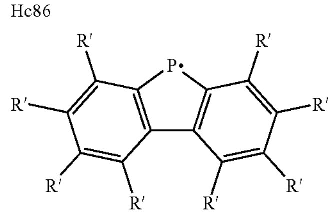
dibenzophosphol-5-yl
Hc87
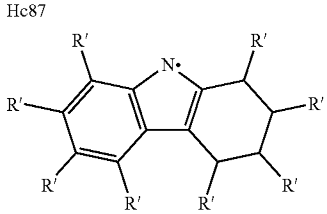
1,2,3,4-tetrahydro-carbazol-9-yl
Hc88
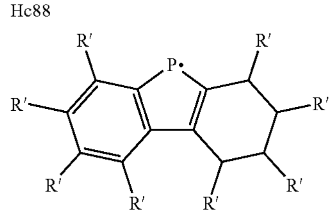
1,2,3,4-tetrahydro-dibenzophosphol-5-yl -continued Hc89

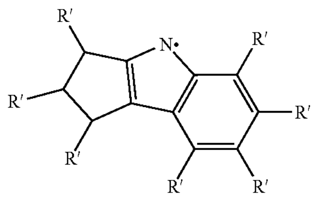

1,2,3,4-tetrahydro-cyclopenta[b]indol-4-yl

Hc90

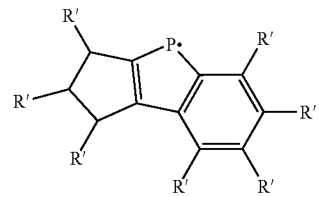

1,2,3,4-tetrahydro-cyclopenta[b]phosphindol-4-yl

Hc91

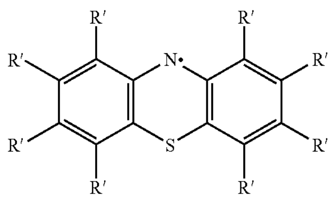

phenothiazin-10-yl

Hc92

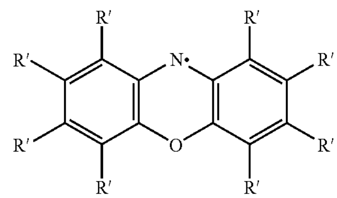

phenoxazin-10-yl wherein each R is defined as in claim 1.

23. The compound of claim 22 wherein each R is, independently, selected from the group consisting of hydrogen, hydrocarbyl radicals, substituted hydrocarbyl radicals.

24. The compound of any one of claims 2, 3, 4, or 8, where z is one or two.

25. The compound of any one of claims 2, 3, 4, or 8, wherein x is five or six.

26. The composition of any one of claims 2, 3, 4, or 8, wherein y is zero, z is one, and x is six.

27. The composition of any one of claims 2, 3, 4, or 8, wherein y is zero, z is one or two, and x is five or six.

28. The composition of any one of claims 2, 3, 4, or 8, wherein y is one, z is one or two, and x is four or five.

29. The composition of claim 3, wherein y is zero, z is one, z" is one, x is six, and x" is six.

30. The compound of claim 3, wherein z and z" are the same.

31. The compound of claim 3, wherein x and x" are the same.

32. The composition of claim 3, wherein y is one, z is one or two, z" is one or two, x" is four or five, and x is four or five.

33. The composition of claim 32, wherein z and z" are the same, x and x" are the same, or z and z" are the same and x and x" are the same.

34. A catalyst system comprising the composition claim 1 and an activator.

35. The catalyst system of claim 34 wherein the activator comprises an alumoxane.

36. The catalyst system of claim 34 wherein the activator comprises a non-coordinating anion.

37. The catalyst system of claim 34 wherein the activator comprises one or more of: trimethylammonium tetraphenylborate, triethylammonium tetraphenylborate, tripropylammonium tetraphenylborate, tri(n-butyl)ammonium tetraphenylborate, tri(tert-butyl)ammonium tetraphenylborate, N,N-dimethylanilinium tetraphenylborate, N,N-diethylanilinium tetraphenylborate, N,N-dimethyl-(2,4,6-trimethylanilinium) tetraphenylborate, trimethylammonium tetrakis (pentafluorophenyl)borate, triethylammonium tetrakis (pentafluorophenyl)borate, tripropylammonium tetrakis (pentafluorophenyl)borate, tri(n-butyl)ammonium tetrakis (pentafluorophenyl)borate, tri(sec-butyl)ammonium tetrakis (pentafluorophenyl)borate, N,N-dimethylanilinium tetrakis (pentafluorophenyl)borate, N,N-diethylanilinium tetrakis (pentafluorophenyl)borate, N,N-dimethyl-(2,4,6-trimethylanilinium-) tetrakis(pentafluorophenyl)borate, trimethylammonium tetrakis-(2,3,4,6-tetrafluorophenyl)borate, triethylammonium tetrakis-(2,3,4,6-tetrafluorophenyl) borate, tripropylammonium tetrakis-(2,3,4,6-tetrafluorophenyl)borate, tri(n-butyl)ammonium tetrakis-(2,3,4,6-tetrafluorophenyl)borate, dimethyl(tert-butyl)ammonium tetrakis-(2,3,4,6-tetrafluorophenyl)borate, N,N-dimethylanilinium tetrakis-(2,3,4,6-tetrafluorophenyl)borate, N,N-diethylanilinium tetrakis-(2,3,4,6-tetrafluorophenyl)borate, N,N-dimethyl-(2,4,6-trimethylanilinium)tetrakis-(2,3,4,6-tetrafluorophenyl)borate, trimethylammonium tetrakis(perfluoronaphthyl)borate, triethylammonium tetrakis(perfluoronaphthyl)borate, tripropylammonium tetrakis (perfluoronaphthyl)borate, tri(n-butyl)ammonium tetrakis (perfluoronaphthyl)borate, tri(tert-butyl)ammonium tetrakis (perfluoronaphthyl)borate, N,N-dimethylanilinium tetrakis (perfluoronaphthyl)borate, N,N-diethylanilinium tetrakis (perfluoronaphthyl)borate, N,N-dimethyl-(2,4,6-trimethylanilinium-) tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(tert-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium-) tetrakis (perfluorobiphenyl)borate, trimethylammonium tetrakis(3,5-bis(trifluoromethyl)phenyl)borate, triethylammonium tetrakis(3,5-bis(trifluoromethyl)phenyl)borate, tripropylammonium tetrakis(3,5-bis(trifluoromethyl)phenyl)borate, tri (n-butyl)ammonium tetrakis(3,5-bis(trifluoromethyl)phenyl)borate, tri(tert-butyl)ammonium tetrakis(3,5-bis (trifluoromethyl)phenyl)borate, N,N-dimethylanilinium tetrakis(3,5-bis)trifluoromethyl)phenyl)borate, N,N-diethylanilinium tetrakis(3,5-bis(trifluoromethyl)phenyl)borate, N,N-dimethyl-(2,4,6-trimethylanilinium) tetrakis(3,5-bis (trifluoromethyl)phenyl)borate, di-(iso-propyl)ammonium tetrakis(pentafluorophenyl)borate, dicyclohexylammonium tetrakis(pentafluorophenyl)borate, tri(o-tolyl)phosphonium tetrakis(pentafluorophenyl)borate, tri(2,6-dimethylphenyl) phosphonium tetrakis(pentafluorophenyl)borate, tropillium tetraphenylborate, triphenylcarbenium tetraphenylborate, triphenylphosphonium tetraphenylborate, triethylsilylium tetraphenylborate, benzene(diazonium)tetraphenylborate, tropillium tetrakis(pentafluorophenyl)borate, triphenylcarbenium tetrakis(pentafluorophenyl)borate, triphenylphosphonium tetrakis(pentafluorophenyl)borate, triethylsilylium tetrakis(pentafluorophenyl)borate, benzene(diazonium)tetrakis(pentafluorophenyl)borate, tropiilium tetrakis-(2,3,4,6-tetrafluorophenyl)borate, triphenylcarbenium tetrakis-(2,3,4,6-tetrafluorophenyl)borate, triphonyiphosphonium tetrakis-(2,3,4,6-tetrafluorophenyl)borate, triethylsilylium tetrakis-(2,3,4,6-tetrafluorophenyl)borate, benzene(diazonium)tetrakis-(2,3,4,6-tetrafluorophenyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium)tetrakis (perfluoronaphthyl)borate, tropillium tetrakis (perfluorobiphenyl)borate, triphenylcarbenium tetrakis (perfluorobiphenyl)borate, triphenylphosphonium tetrakis (perfluorobiphenyl)borate, triethylsilylium tetrakis (perfluorobiphenyl)borate, benzene(diazonium)tetrakis (perfluorobiphenyl)borate, tropillium tetrakis(3,5-bis (trifluoromethyl)phenyl)borate, triphenylcarbenium tetrakis (3,5-bis(trifluoromethyl)phenyl)borate, triphenylphosphonium tetrakis(3,5-bis(trifluoromethyl)phenyl)borate, triethylsilylium tetrakis(3,5-bis(trifluoromethyl) phenyl)borate, or benzene(diazonium)tetrakis(3,5-bis(trifluoromethyl)phenyl)borate.

38. The catalyst system of claim 34 wherein the activator comprises one or more of: N,N-dimethylanilinium tetrakis (perfluorophenyl)borate, N,N-dimethylanilinium tetrakis (perfluoronaphthyl)borate, N,N-dimethylanilinium tetrakis (perfluorobiphenyl)borate, N,N-dimethylanilinium tetrakis (3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis (3,5-bis(trifluoromethyl)phenyl)borate, or triphenylcarbenium tetra(perfluorophenyl)borate.

39. A process to polymerize unsaturated monomers comprising contacting monomer with the catalyst system of claim 34.

40. The process of claim 39 wherein the polymerization occurs in the gas phase.

41. The process of claim 39 wherein the polymerization occurs in the solution phase.

42. The process of claim 39 wherein the polymerization occurs in the slurry phase.

43. The process of claim 39, wherein the unsaturated monomer comprises ethylene.

44. The process of claim 39, wherein the unsaturated monomer comprises propylene.

45. The process of claim 39, wherein the unsaturated monomer comprises ethylene and propylene.

46. A process to make elastomeric polymers comprising contacting olefin monomers with activator and the compound of claim 2, where y is zero, the compound of claim 3 where y is zero, the compound of claim 4 or the compound of claim 8.

47. A process to make crystalline polymers comprising contacting olefin monomers with activator and the compound of claim 15.

48. The process of claim 45 wherein the monomer comprises propylene.

49. The process of claim 46 wherein the monomer comprises propylene.

* * * * *

UNITED STATES PATENT AND TRADEMARK OFFICE

CERTIFICATE OF CORRECTION

PATENT NO. : 7,276,567 B2
APPLICATION NO. : 11/078920
DATED : October 2, 2007
INVENTOR(S) : Jo Ann Marie Canich et al.

It is certified that error appears in the above-identified patent and that said Letters Patent is hereby corrected as shown below:

In the Claims

In claim 1, column 205, line 9, delete "B" and substitute therefor --E--.

In claim 1, column 205, line 25, after the word "nonynyl," delete "decyrryl," and substitute therefor --decynyl,--.

In claim 1, column 205, line 25, after the word "undecynyl," delete "dodecynyt," and substitute therefor --dodecynyl,--.

Cancel claims 22 and 23.

Signed and Sealed this
Seventh Day of April, 2015

Michelle K. Lee
*Director of the United States Patent and Trademark Office*